US009523277B2

(12) United States Patent
Dean

(10) Patent No.: US 9,523,277 B2
(45) Date of Patent: Dec. 20, 2016

(54) TURBINE ENGINE

(75) Inventors: Jack A. Dean, Paris, TX (US); Jeanne Dean, legal representative, Paris, TX (US)

(73) Assignee: RECOGEN, LLC, Amarillo, TX (US)

( * ) Notice: Subject to any disclaimer, the term of this patent is extended or adjusted under 35 U.S.C. 154(b) by 1661 days.

(21) Appl. No.: 11/792,603

(22) PCT Filed: Dec. 2, 2005
(Under 37 CFR 1.47)

(86) PCT No.: PCT/US2005/043760
§ 371 (c)(1),
(2), (4) Date: Oct. 29, 2008

(87) PCT Pub. No.: WO2007/053157
PCT Pub. Date: May 10, 2007

(65) Prior Publication Data

US 2011/0173991 A1 Jul. 21, 2011

Related U.S. Application Data

(60) Provisional application No. 60/634,610, filed on Dec. 7, 2004.

(51) Int. Cl.
*F01D 1/32* (2006.01)
*F01D 5/06* (2006.01)

(52) U.S. Cl.
CPC . *F01D 1/32* (2013.01); *F01D 5/06* (2013.01); *F05B 2220/32* (2013.01); *F05D 2220/31* (2013.01); *F05D 2220/32* (2013.01); *Y02E 20/14* (2013.01); *Y02T 50/671* (2013.01)

(58) Field of Classification Search
CPC .......... F01D 1/32; F01D 5/06; F05D 2230/31; Y02E 20/14
USPC .......................................... 415/80, 115, 116
See application file for complete search history.

(56) References Cited

U.S. PATENT DOCUMENTS

| | | | |
|---|---|---|---|
| 593,219 | A | 11/1897 | House |
| 709,242 | A | 9/1902 | Prescott et al. |
| 753,735 | A | 3/1904 | Prescott et al. |
| 768,884 | A | 8/1904 | O'Brien |
| 999,776 | A | 8/1911 | Gill |
| 1,065,985 | A | 7/1913 | Swem |

(Continued)

*Primary Examiner* — Ninh H Nguyen
(74) *Attorney, Agent, or Firm* — Shannon L Warren

(57) ABSTRACT

A multiple-fluid, multiple-substance, multiple-phase, multiple-pressure, multiple-temperature, multiple-stage turbine engine. In preferred embodiments, one or more fluids are supplied by passageways in the turbine shaft or supplied by non-shaft passageways, or both, through rotor passageways to multiple-phase, multiple-fluid, multiple-substance nozzles affixed to one or more perimeters, radial surfaces, axial surfaces, and/or curved or slanted surfaces of the turbine rotor assemblies. The multiple perimeters, radial surfaces, axial surfaces, and/or curved or slanted surfaces of the turbine rotor assemblies are preferably configured and located for multiple inlet and exit velocities of the nozzles, multiple inlet and exit pressures of the nozzles, or combinations thereof. The one or more fluids entering the turbine may each be a substance of single phase, or a substance of multiple phases, or a mix of the single-phase and/or multiple-phase conditions for two or more entrance fluids.

3 Claims, 172 Drawing Sheets

(56) References Cited

U.S. PATENT DOCUMENTS

| | | | | |
|---|---|---|---|---|
| 1,110,302 | A | 9/1914 | Flatau | |
| 1,681,607 | A | 9/1927 | Bowen | |
| 1,880,747 | A | 10/1927 | Bowen | |
| 2,346,936 | A | 4/1944 | Ogle | |
| 3,026,088 | A | 3/1962 | Green | |
| 3,758,223 | A | 9/1973 | Eskeli | |
| 3,828,553 | A * | 8/1974 | Eskeli | 60/330 |
| 3,879,152 | A | 4/1975 | Eskeli | |
| 3,938,336 | A | 2/1976 | Eskeli | |
| 4,003,673 | A | 1/1977 | Eskeli | |
| 4,030,856 | A | 6/1977 | Eskeli | |
| 4,332,520 | A * | 6/1982 | House | 415/63 |
| 4,336,039 | A | 6/1982 | Sohre | |
| 4,441,322 | A | 4/1984 | Ritzi | |
| 4,452,566 | A | 6/1984 | Kardas | |
| 4,453,885 | A | 6/1984 | Denton | |
| 4,682,729 | A | 7/1987 | Doman et al. | |
| 5,525,034 | A * | 6/1996 | Hays | 415/80 |
| 6,533,539 | B1 | 3/2003 | Johnson | |
| 7,314,347 | B2 * | 1/2008 | Johnson | 415/80 |
| 2004/0005214 | A1 | 1/2004 | Johnson | |

* cited by examiner 10
16
40
72
48
22
20
267
167
74
50
34
52
24
28
150
12
54
46
70
18
62

TURBINE ENGINE

CROSS-REFERENCE TO RELATED APPLICATIONS

This is the national stage of International Patent Application No. PCT/US2005/043760, which claims priority in U.S. Provisional Patent Application No. 60/634,610, filed Dec. 7, 2004, the disclosures of which applications are incorporated by reference herein as is fully set forth.

STATEMENT REGARDING FEDERALLY SPONSORED RESEARCH OR DEVELOPMENT

Not Applicable

BACKGROUND OF THE INVENTION

This invention relates to turbine engines. In particular, the invention relates to multiple-fluid, multiple-substance, multiple-phase, multiple-pressure, multiple-temperature, and/or multiple-stage turbine engines and to systems and methods that incorporate or use them.

Background art steam turbine, water turbine and gas turbine designs have been known for decades. Numerous attempts have been made at enhancing current designs, improving efficiencies, decreasing maintenance, and decreasing manufacturing and installation costs. Many of these designs and attempts have focused on devices capable of using inlet fluid(s) which is/are often relatively high pressure and/or high temperature and in a vaporous condition to avoid component damage, with some designs focused on lower pressure and/or temperatures associated with by-product, or waste, streams for the inlet fluid(s). Even designs which focus on two-phase inlet fluids often fall short of accomplishing the intended goal, especially in the areas of costs associated with manufacturing, installation and, especially, operation and maintenance. In addition to steam, liquid water, air, natural gas, fuel oil and geothermal fluid being used for some applications, other substances or elements, such as nitrogen, oxygen, hydrogen, argon or engine exhaust, to name a few, are/may be used as inlet fluid(s).

A background art design for these turbines incorporates one or more stages, wherein a stage is comprised, in general, of a stationary element and a rotating element. The stationary element of a stage functions principally as either a nozzle or a means of redirecting the direction of flow of the fluid entering the element. Typically, for the first stage, the stationary element functions as a nozzle; for subsequent stages, if any, the stationary element can function in capacity, nozzling, redirecting, or a combination thereof. The rotating element functions principally as the recipient of high velocity fluid directed to impart rotary motion to the turbine (rotor), but can, on larger turbines, also function in a nozzle capacity, as a reaction blade versus an impulse blade. For turbines incorporating two or more stages, the staging classification is generally designated as either velocity-compound or pressure-compound. Turbines can have either velocity-compound sections or pressure-compound sections or a combination thereof.

For velocity-compound sections, the stationary element of the first stage of a velocity-compound section functions principally as a nozzle to increase the velocity of the fluid exiting from the nozzle, while the stationary element of the following stages principally function only to redirect the fluid path to the optimal direction for the associated rotating element(s). The fluid exiting a nozzle has a potential to develop mechanical work and/or power from the turbine. With velocity-compounding, this fluid velocity potential is essentially divided amongst the number of stages. Noteworthy, the pressure drop across the stationary elements of the second or more stages is ideally nil, but, realistically, a small pressure drop is caused essentially by friction and a relatively small transfer of heat.

In contrast, for pressure-compound sections, the pressure drop across the stationary elements of the second or more stages is designed to decrease, not remain ideally zero. This feature, in turn, increases the fluid velocity exiting the stationary element and entering the rotating element of each stage. With pressure-compounding, the fluid pressure potential is essentially divided amongst a number of stages, wherein the velocity potential exiting each nozzle is ideally converted into its maximum work potential before entering the next stationary element (nozzle). Pressure-compounding in turbines is especially suited for, but not limited to, inlet fluids of higher pressures, as the pressure drop per stage is less across more than one stage and, thus, increases turbine efficiency and turbine mechanical work or output energy. While some turbines are designed essentially as a velocity-compound turbine or as a pressure-compound turbine, often turbines are designed to incorporate a combination of these features.

For approximately a century, background art turbine designs have illustrated many different arrangements of stationary and rotating elements, with each design attempting to increase turbine efficiency, decrease maintenance and turbine outages, decrease manufacturing costs and time, decrease the detrimental effects of a liquid fluid state existing or developing within the turbine, such as a background art steam turbine, or decrease the detrimental effects of a fluid condition of high temperature, such as a background art gas turbine. Due to concerns with the effects of a liquid fluid condition, especially for background art steam turbines, qualified operations personnel are almost universally used to operate steam turbine power facilities. Additionally, some other fluid applications for turbines also incorporate operations personnel for equipment and personnel safety, or for concerns with the effects of high temperature, as in the case of background art gas turbines used for stationary and mobile applications. Automatic controls and devices are used to reduce the potential for detrimental conditions to occur, but many facilities still incur the costs for operational personnel for reasons associated with good business practice, safety, and the potential for equipment failure.

Background art turbines are relatively expensive, owing to the close tolerances associated with their stages and seals, sophisticated materials applicable to the high pressure and high temperatures of the turbine inlet fluid, complex arrangements of stages and associated components, internal cooling capacities and apparatus, structural support system for the turbine rotor(s) and/or rotor section(s), and the need for ancillary support and systems, all of which are designed to provide long, non-destructive life to the turbine and enhance its efficiency. Thus, operators protect the investment in the turbine by taking appropriate actions in the event of malfunctions or unsatisfactory operating parameters and conditions. The costs associated with operators and maintenance personnel are not insignificant.

When a turbine is incorporated into a power generation facility, a significant portion of the annual facility expense is associated with the operational requirements of the turbine. For a facility using a turbine that can operate using a turbine inlet fluid in either a liquid state or vapor state, or both, i.e., multiple-phase, the operational requirements compared to those of a background art turbine are reduced or eliminated. Such reduction or elimination significantly decreases the facility's expenses. Additionally, a turbine that is mechanically sound when operated on either liquid or vapor can be easily sized to match the requirements of its customer, whether very large or very small. Likewise, a turbine that can use more than one inlet fluid at a time can serve a multiple purpose in one machine, as opposed to using a separate turbine for each fluid.

For a background art gas turbine or combustion turbine, the temperature of the fluid in the combustion chamber or liner section(s) must be controlled so as to be compatible with the physical configuration and metallurgical properties of the materials of construction. Often cooling air or another cooling medium is directed in and about the combustion process to affect the physical location of the combustion process in the combustion chamber or liner section(s) and accompanying areas of hot gases and/or to affect the temperature of the combustion fluid that contacts the material. The fluid exiting the combustion chamber or liner section(s) enters the turbine section and associated stages. The temperature of the fluid entering the turbine section, commonly called the turbine inlet temperature (TIT), is managed at a temperature that is physically and metallurgically compatible with the configuration and materials of construction of the turbine, in particular, the first stage nozzles. In general, for a background art gas turbine or combustion turbine, the combustion fluid is cooled to a turbine inlet temperature in the low-to-mid 2,000 degree Fahrenheit (F) range. Thus, enormous quantities of cooling medium are used to bring the combustion temperature down to approximately 2,000+ degrees F.

The background art is characterized by U.S. Pat. Nos. 593,219; 709,242; 753,735; 768,884; 999,776; 1,065,985; 1,110,302; 1,681,607; 1,880,747; 2,346,936; 3,026,088; 3,758,223; 3,879,152; 3,938,336; 4,003,673; 4,030,856; 4,336,039; 4,441,322; 4,452,566; 4,453,885; 4,682,729; and 6,533,539; and U.S. Patent Application No. 2004/0005214; the disclosures of which patents and patent application are incorporated by reference as if fully set forth herein.

House in U.S. Pat. No. 593,219 discloses a rotary engine which utilizes a significant portion of the steam velocity energy exiting peripheral nozzles to induce air into the discharge stream of the steam nozzle. The inventor claims the air provides a substance ("surface") upon which the steam velocity can react to provide rotary motion to the rotor. Such entrance of air significantly reduces the efficiency of the turbine. The discharge of steam, and air, can be either along the peripheral surface of the rotor or the sides of the rotor; however, the efficiency of the engine is greatly compromised.

Gill in U.S. Pat. No. 999,776 discloses a reaction engine that purposely reduces the otherwise available tangential reactionary force to reduce what was believed, at the time, to be an impractical engine speed. This device incorporates nozzles that are rotatable 180 degrees so as to reverse the direction of rotation by rotating the nozzles about a radial axis. The inefficiencies associated with the reduced pressure are not recovered with the claimed advantage of reduced speed.

Eskeli in U.S. Pat. No. 3,758,223 discloses a reaction type turbine rotor, with a stationary feeder for reducing a supply pressure and increasing the exit velocity of stationary nozzles, which essentially mirrors a background art axial-flow steam turbine device that uses a stationary inlet nozzle assembly and imparts the increased velocity to rotate a turbine rotor. In the device of Eskeli, this process is accomplished in essentially a radial direction while the process occurs essentially in an axial direction for a background art steam turbine. The device of Eskeli is designed only for use of liquids or vapors. Thus, it is not designed to be used with a mixture of vapor and liquid.

Eskeli in U.S. Pat. No. 3,879,152 discloses a method and apparatus for generation of power in response to a fluid flowing from a higher pressure to a lower pressure in rotating reaction turbine. The higher pressure fluid is let down (reduced) to establish a velocity of sufficient direction and magnitude to be greater than the rotating fluid inside a reaction turbine rotor. The lower pressure fluid inside said rotor is then increased due to centrifugal force, wherein the centrifugal force becomes a parasitic load and subtracts from the net power output, thus reducing an otherwise higher claimed efficiency. Additionally, the device is designed for use of either liquid or vapor, but not simultaneously both or a combination thereof.

Eskeli in U.S. Pat. No. 4,030,856 discloses essentially a liquid pump and pump discharge throttle (external to pump casing) combination in one housing, as opposed to two separate entities.

Sohre in U.S. Pat. No. 4,336,039 discloses a turbine that converts radial fluid flow into tangential velocity to produce work. His invention is a reaction radial outflow turbine (a refinement of the basic Hero engine) that requires no stator nozzles, having contoured supersonic nozzles near the periphery of the turbine rotor. Such contoured nozzles provide a substantial, but not nearly complete, tangential velocity to the steam leaving the nozzle.

Ritzi in U.S. Pat. No. 4,441,322 discloses a device which separates a two-phase, inlet fluid (vapor and liquid) into a vapor stream and a liquid stream, each of which is used to produce rotary motion of a turbine rotor. For two-phase fluids, such as geothermal fluids and some waste fluids, contaminates can cause severe imbalance of the rotating drum and potentially cause blockage of the liquid exit nozzles of the rotor, thus, causing mechanical damage or inefficient operation.

Denton in U.S. Pat. No. 4,453,885 discloses a device with counter-rotating jets generally, but not specifically, oriented in a tangential direction. This causes the device to have uneven torque/power transmission.

BRIEF SUMMARY OF THE INVENTION

The purpose of preferred embodiments of the present invention is to provide a multiple-fluid, multiple-substance, multiple-phase, multiple-pressure, multiple-temperature, multiple-stage turbine engine. One advantage of preferred embodiments of the present invention is that the invention can operate using a turbine inlet fluid that is in either a liquid state or a vapor state, or both, and can be easily sized to match the requirements of a customer; there is no requirement for operators. Moreover, the turbine size, and corresponding power plant size, can be tailored to the energy needs of the customer, as opposed to the case of a centralized power plant wherein the electricity must be transmitted great distances to customers, at a cost.

Another advantage of preferred embodiments of the present invention is that more than one turbine engine can be coupled to and/or operated in conjunction with one or more other turbine engines of the present invention. Coupled turbines can use a variety of coupling methods/devices, such as rigidly couplings, hydraulically couplings, magnetically couplings, or "slip" couplings, to name a few. One or more turbine engine(s), or portion(s) of turbine engine(s), of the present invention may be operated in conjunction with one or more other turbine engine(s), whether of the present invention or background art turbine(s). Arrangement(s) of turbine engines, whether solely of the present invention or in combination with background art turbine(s), may be in whatever practical, economical, thermodynamic, fluidic, aesthetical and/or functional fashion is so desired or beneficial.

Another advantage of the present invention is that the invention, whether as a preferred embodiment or not, uses nozzle(s) or orifice(s) or nozzle unit(s), wherein the inlet energy of fluid(s) passing therethrough is converted to kinetic energy, and the kinetic energy is converted to turbine mechanical work or output energy, without the use of blades, as described and generally used in background art turbines and mentioned in the "Background of Invention" section above. For the present invention herein disclosed, in addition to the definition of nozzle(s) as generally described in engineering references and literature, nozzle(s) also include portion(s) of nozzle(s), set(s) of nozzle(s) and/or combustion chamber-nozzle unit(s). The axis of fluid flow through, or partially through, said nozzle(s) can be linear or non-linear, or a combination thereof, through the profile of the axis. A nozzle's longitudinal axis is the axis of fluid as said fluid passes or discharges from the nozzle's exit area (i.e., the axis of the fluid discharging therefrom). In alternative and/or preferred embodiment(s) of the present invention herein disclosed, shroud(s), or other fluid deflection or fluid redirection device(s)/method(s), may be used to change the path of the discharging fluid stream, either immediately after or at some distance after exiting the nozzle exit area, from the direction of the nozzle longitudinal axis to some other direction.

Another advantage of preferred embodiments of the present invention is that the invention can use the same inlet fluid substance at different inlet pressures, inlet temperatures, or inlet state conditions (phases) and at the same or different inlet locations. Preferably, the present invention can also use different inlet fluid substances, either all at the same inlet conditions or at different inlet conditions, relative to each other. For different inlet fluid substances, such substances preferably enter at the same inlet location or different inlet locations, or a combination thereof.

Another advantage of preferred embodiments of the present invention is that the invention can utilize a variety of inlet fluids, in either a liquid state or a vaporous state, or combination thereof. In preferred embodiments, the inlet fluid(s) is/are directed 1) from the inner and/or center portion of the turbine shaft and rotor section(s), through passageways, to nozzles or orifices located at, on, at a distance from (through connecting passageway(s)), integral with and/or recessed in/below a radial plane surface or at, on, at a distance from (through connecting passageway(s)), integral with and/or recessed in/below an axial plane surface or at, on, at a distance from (through connecting passageway(s)), integral with and/or recessed in/below a turbine circumferential perimeter or at, on, at a distance from (through connecting passageway(s)), integral with and/or recessed in/below a turbine curved or slanted surface, or combination thereof, 2) from non-shaft passageway(s) (or array(s) of non-shaft passageways in substitution of, and/or having the same practical effect as, said non-shaft passageway(s)), typically, but not limited to, turbine casing or shell component passageway(s), to inner and/or center portion(s) of turbine rotor(s) or rotor section(s), through passageways, to nozzles or orifices located at, on, at a distance from (through connecting passageway(s)), integral with and/or recessed in/below a radial plane surface or at, on, at a distance from (through connecting passageway(s)), integral with and/or recessed in/below an axial plane surface or at, on, at a distance from (through connecting passageway(s)), integral with and/or recessed in/below a turbine perimeter or at, on, at a distance from (through connecting passageway(s)), integral with and/or recessed in a curved or slanted surface, or combination thereof, or 3) a combination thereof. The nozzles or orifices have a fluid discharge which is directed at a three-dimensional acute angle to and/or parallel to a direction that is opposite the tangential direction of rotation of the turbine, at a three-dimensional acute angle to and/or parallel to the orientation of the turbine axial planes, at a three-dimensional acute angle to and/or parallel to the orientation of the turbine radial planes, and/or at a three-dimensional acute angle to and/or tangential to the orientation of a curved or slanted surface of the turbine rotor(s) and/or rotor section(s) or combinations thereof.

Yet another advantage of preferred embodiments of the present invention is that the invention, when using an inlet fluid that is either a liquid or a vapor-liquid mixture having a quality of less than one hundred percent (<100%), flashes some, or all, of the inlet fluid to vapor or an increased vapor quality state. Such capability is especially suited for the waste fluids of process facilities, process bleed fluids, pressure letdown (reducing) applications, boil-off (e.g., refinery fluids), and/or geothermal fluids, to name a few. Typically, fluid streams that have relative excess heat or energy are either passed through heat extraction equipment (coolers, condensers) to reduce the energy content to a level more easily accepted by the balance of the system of which the fluid is a part, or passed through or into a liquid-vapor separator or flash chamber, whether said separator or flash chamber is stationary (gravity) or rotary (centrifugal), to provide two separate streams of fluid, one being liquid and the other being vapor, generally at a reduced pressure and increased, unrecovered energy losses therewith; however, some geothermal applications using rotary separation have attempted to capture some of the liquid momentum energy with negligible overall success. In preferred embodiments, the present invention may be used to convert otherwise unrecovered energy, for example, throttling energy losses and liquid momentum energy losses, into useful energy, such as turbine mechanical work, for example, and, thus, yield an otherwise unavailable revenue source for the customer. For geothermal applications, as well as many waste stream applications, the geothermal or waste stream fluid is usually a multiple-phase substance; however, the fluid(s), whether dry vapor, multiple-phase fluid, energy-laden liquid, or multiple-substances, preferably enter(s) the present invention directly (without a separation process), wherein the energy of the vapor(s), the energy of the liquid(s), and/or the energy of the mixture(s), is/are extracted from the nozzle fluid velocity(ies) to produce turbine mechanical work or output energy.

A further advantage of preferred embodiments of the present invention is that the invention may use 1) an inlet fluid substance that has two or more different inlet conditions, routed through two or more different turbine passageways to two or more nozzles, portion(s) of nozzle(s), set(s) of nozzles and/or combustion chamber-nozzle units, located at, on, at a distance from (through connecting passageway(s)), integral with and/or recessed in/below a radial plane surface or at, on, at a distance from (through connecting passageway(s)), integral with and/or recessed in/below an axial plane surface or at, on, at a distance from (through connecting passageway(s)), integral with and/or recessed in/below a turbine perimeter or at, on, at a distance from (through connecting passageway(s)), integral with and/or recessed in a curved or slanted surface, or combination thereof and/or 2) an inlet fluid substance that has two or more different inlet conditions, routed through the same turbine passageway(s) to one or more nozzle(s), portion(s) of nozzle(s), set(s) of nozzles and/or combustion chamber-nozzle unit(s), located at, on, at a distance from (through connecting passageway(s)), integral with and/or recessed in a radial plane surface or at, on, at a distance from (through connecting passageway(s)), integral with and/or recessed in an axial plane surface or at, on, at a distance from (through connecting passageway(s)), integral with and/or recessed in a turbine perimeter or at, on, at a distance from (through connecting passageway(s)), integral with and/or recessed in a curved or slanted surface, or combination thereof. For a facility using, for example, a steam turbine that can operate using high pressure steam (i.e., water as a substance) as the inlet fluid to the first stage and lower pressure steam, steam/liquid water mixture, and/or liquid water, combined into one passageway or through separate passageways, as inlet fluid(s) to subsequent, but not necessarily the second or next, stage(s), as a preferred embodiment of the present invention does, provides a means of 1) decreasing capital cost per unit of production (e.g., electricity kilowatt hours), 2) increasing turbine mechanical work or output energy, and/or 3) using and extracting useful energy from one or more bypass or side stream(s), waste stream(s), exhaust stream(s), letdown stream(s), and/or other spent stream(s) from locations in, or external to, a process or system, whether said stream(s) are routed through multiple passageways and/or combined or routed, partially or fully, in singular or separate passageway(s), or combination thereof.

In preferred embodiments, the present invention may use two or more different inlet fluid substances. Preferably, the characteristic arrangements and passage of these substances may include, but are not limited to, one or more of the following scenarios: (a) each of these different inlet fluid substances may be routed 1) through one or more of its own respective turbine shaft passageway(s) and one or more rotor passageway(s) to nozzle(s), portion(s) of nozzle(s), set(s) of nozzles and/or combustion chamber-nozzle unit(s), with one or more locations (positions) of nozzle(s) at, on, at a distance from (through connecting passageway(s)), integral with and/or recessed in the turbine perimeter(s) or at, on, at a distance from (through connecting passageway(s)), integral with and/or recessed in turbine radial plane surface(s) or at, on, at a distance from (through connecting passageway(s)), integral with and/or recessed in turbine axial plane surface(s) or at, on, at a distance from (through connecting passageway(s)), integral with and/or recessed in turbine curved or slanted surface(s), or combination thereof, 2) through one or more of its own respective non-shaft passageway(s), typically, but not limited to, turbine casing or shell components, to inner and/or center portion(s) of the turbine rotor(s) and/or rotor section(s), through one or more rotor passageway(s) to nozzle(s), portion(s) of nozzle(s), set(s) of nozzles and/or combustion chamber-nozzle unit(s), with one or more locations (positions) of nozzle(s) at, on, at a distance from (through connecting passageway(s)), integral with and/or recessed in the turbine perimeter(s) or at, on, at a distance from (through connecting passageway(s)), integral with and/or recessed in turbine radial plane surface(s) or at, on, at a distance from (through connecting passageway(s)), integral with and/or recessed in turbine axial plane surface(s) or at, on, at a distance from (through connecting passageway(s)), integral with and/or recessed in turbine curved or slanted surface(s), or combination thereof, or 3) a combination thereof; (b) the scenario of "(a)" above, with each such different substance exiting the nozzle(s), portion(s) of nozzle(s), set(s) of nozzles, and/or combustion chamber-nozzle unit(s) into an exit environment containing only the substance(s) which passed through the nozzle(s), portion(s) of nozzle(s), set(s) of nozzles, and/or combustion chamber-nozzle unit(s); (c) the scenario of "(a)" above, with each such different substance exiting the nozzle(s), portion(s) of nozzle(s), set(s) of nozzles, and/or combustion chamber-nozzle unit(s) into an exit environment containing a mixture of the same substance(s) from different inlets and associated passageways; (d) the scenario of "(a)" above, with each such different substance exiting the nozzle(s), portion(s) of nozzle(s), set(s) of nozzles, and/or combustion chamber-nozzle unit(s) into an exit environment containing a mixture of its own substance and one or more other substance(s); (e) the scenario of "(a)" above, where the fluid exiting the nozzle(s), portion(s) of nozzle(s), set(s) of nozzles, and/or combustion chamber-nozzle unit(s) is not one or more of the same substance(s) that is an inlet fluid, but rather a fluid that is the result of reaction of two or more inlet fluids, for example, air as one inlet fluid passing through its respective passageway(s) to the inlet section (chamber or combustion chamber) of the nozzle(s), or at any point prior to and/or after the nozzle(s), and natural gas as a second inlet fluid passing through its respective passageway(s) to the inlet section (chamber or combustion chamber) of the nozzle(s), or at any point prior to and/or after the nozzle(s), wherein the two fluids react (burn or other chemical process) to result in a fluid exiting the nozzle(s) which is a different fluid substance than the two or more inlet fluids; (f) a combination of scenarios "(a)", "(b)", "(c)", "(d)" and/or "(e)" above for the same overall turbine embodiment; and (g) the scenario of "(d)" above, wherein the mixture of its own substance with that of one or more other substance(s) occurs at or in the vicinity of the inlet or any point prior to or en route from the inlet, occurs at any point in the passageway(s) through the shaft, non-shaft portion(s) and/or rotor(s) or rotor section(s), occurs at any point at, in, before, after or about the nozzle(s), portion(s) of nozzle(s), set(s) of nozzles and/or combustion chamber-nozzle unit(s), occurs at any point in the exit environment of the nozzle(s), portion(s) of nozzle(s), set(s) of nozzles and/or combustion chamber-nozzle unit(s), or occurs at combination(s) thereof.

Another advantage of preferred embodiments of the present invention is that the invention may use 1) an inlet fluid substance that has two or more different inlet conditions, routed through two or more different turbine passageways to two or more nozzles, portions of nozzle(s), sets of nozzles and/or combustion chamber-nozzle units, located at, on, at a distance from (through connecting passageway(s)), integral with and/or recessed in the turbine perimeter(s) or located at, on, at a distance from (through connecting passageway(s)), integral with and/or recessed in turbine radial plane surface(s) or located at, on, at a distance from (through connecting passageway(s)), integral with and/or recessed in turbine axial plane surface(s) or located at, on, at a distance from (through connecting passageway(s)), integral with and/or recessed in turbine curved or slanted surface(s), or combination(s) thereof, 2) an inlet fluid substance that has two or more different inlet conditions, routed through the same turbine passageway(s) to one or more nozzle(s), portions of nozzle(s), set(s) of nozzles and/or combustion chamber-nozzle unit(s), located at, on, at a distance from (through connecting passageway(s)), integral with and/or recessed in the turbine perimeter(s) or located at, on, at a distance from (through connecting passageway(s)), integral with and/or recessed in turbine radial plane surface(s) or located at, on, at a distance from (through connecting passageway(s)), integral with and/or recessed in turbine axial plane surface(s) or located at, on, at a distance from (through connecting passageway(s)), integral with and/or recessed in turbine curved or slanted surface(s), or combination(s) thereof, 3) two or more different inlet fluid substances, whether at the same, similar or different inlet conditions, routed through two or more different turbine passageways or through the same turbine passageway(s) to one or more nozzle(s), portions of nozzle(s), set(s) of nozzles and/or combustion chamber-nozzle unit(s), located at, on, at a distance from (through connecting passageway(s)), integral with and/or recessed in the turbine perimeter(s) or located at, on, at a distance from (through connecting passageway(s)), integral with and/or recessed in turbine radial plane surface(s) or located at, on, at a distance from (through connecting passageway(s)), integral with and/or recessed in turbine axial plane surface(s) or located at, on, at a distance from (through connecting passageway(s)), integral with and/or recessed in turbine curved or slanted surface(s), or combination(s) thereof, and/or 4) combination(s) thereof.

For a facility using a gas turbine (combustion turbine) that can operate using turbine inlet fluid of high temperature, up to and including the temperature of combustion or reaction and/or temperature of nozzle exit fluid(s), as a preferred embodiment of the present invention does, the expensive cost of medium moving equipment (e.g., air compressor), both capital cost and parasitic load usage, is greatly reduced in preferred embodiments of the present invention. Additionally, using a gas turbine or combustion turbine that can operate using a turbine inlet fluid of high temperature, as preferred embodiments of the present invention do, the operational personnel requirements, maintenance, and size per unit of output are significantly reduced, resulting in a considerable cost savings to the customer/user. Further, a gas turbine or combustion turbine that can operate using reaction fluids (e.g., combustion exhaust) as an inlet fluid, as a preferred embodiment of the present invention does, can enhance the reduction, elimination, control, prevention and/or mitigation of pollutants that may otherwise result and/or be discharged into the environment and, thus, provide almost unlimited application flexibility to satisfy regulatory statutes and/or requirements at less cost than background art turbines. Further yet, a gas turbine or combustion turbine that can operate using multiple-phase fluid(s) and/or propellant(s), as the present invention does, has efficiency, monetary and/or environmental advantages.

In another preferred embodiment, the present invention uses (a) air and (b) hydrogen as inlet fluids. These inlet fluids can be further characterized as an oxidizer (e.g., air) and a non-fossil fuel (e.g., hydrogen). For this application, an oxidizer and non-carbon-based fuel are used for the following reasons: (1) the reaction of oxidizer and fuel produce turbine mechanical work or output energy and/or (2) the reaction of oxidizer and fuel produce no fuel-derived carbon-based pollutants (e.g., carbon dioxide or carbon monoxide). Additionally, in addition to, or sometimes in reduction of, the fuel or oxidizer used in this example, (1) steam (vaporous water as a substance) or liquid water, or a combination, may be used to reduce, eliminate, control, prevent and/or mitigate pollutants (e.g., oxide compounds of nitrogen, typically referenced as NOx) that may otherwise result and/or be discharged into the environment, (2) ammonia, as liquid or vapor or combination, may be used to reduce, eliminate, control, prevent and/or mitigate pollutants that may otherwise result and/or be discharged into the environment, (3) any other substance, including, but not limited to, fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination thereof may be used.

In another preferred embodiment, the present invention uses (a) air and (b) natural gas and/or other gaseous fuel such as propane, hydrogen or butane to name a few examples, as inlet fluids. These inlet fluids can be further characterized as an oxidizer (e.g., air) and one or more gaseous fuels. For this application, an oxidizer and one or more fuel(s) may be used for the following reasons: (1) the reaction of oxidizer and fuel(s) produce turbine mechanical work or output energy, (2) the fuel(s) may be used at appropriate times as a function of any one or more fuel's availability, (3) primarily one fuel is used at a time, but two or more fuels are used for a period of time to switch from one fuel to the other fuel(s) without the necessity to secure or stop the operation of the turbine, (4) two or more fuels can be used concurrently for (a) practical reasons, operational and/or maintenance functions, permit or regulatory requirements or requests, curtailments, (b) elective use for efficiency, power or economic benefits/purposes, and/or ©) any other needs or requirements deemed appropriate, and/or (5) one or more of the fuels is used to reduce, eliminate, control, prevent and/or mitigate pollutants, that may otherwise result and/or be discharged into the environment. Additionally, in addition to, or sometimes in reduction of, any, or all, fuel(s) and/or oxidizer used in this example, (1) steam (vaporous water as a substance) or liquid water, or a combination, may be used to reduce, eliminate, control, prevent and/or mitigate pollutants, that may otherwise result and/or be discharged into the environment, (2) ammonia, as liquid or vapor or combination, may be used to reduce, eliminate, control, prevent and/or mitigate pollutants, that may otherwise result and/or be discharged into the environment, (3) any other substance, including, but not limited to, fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination(s) thereof may be used.

In another preferred embodiment, the present invention uses (a) air and (b) liquid fuel such as diesel oil, fuel oil, kerosene or naphtha to name a few examples, as inlet fluids. These inlet fluids can be further characterized as an oxidizer (e.g., air) and one or more liquid fuels. For this application, an oxidizer and one or more fuel(s) may be used for the following reasons: (1) the reaction of oxidizer and fuel(s)

produce turbine mechanical work or output energy, (2) the fuel(s) may be used at appropriate times as a function of any one or more fuel's availability, (3) primarily one fuel is used at a time, but two or more fuels are used for a period of time to switch from one fuel to the other fuel(s) without the necessity to secure or stop the operation of the turbine, (4) two or more fuels can be used concurrently for (a) practical reasons, operational and/or maintenance functions, permit or regulatory requirements or requests, curtailments, (b) elective use for efficiency, power or economic benefits/purposes, and/or ©) any other needs or requirements deemed appropriate, and/or (5) one or more of the fuels is used to reduce, eliminate, control, prevent and/or mitigate pollutants, that may otherwise result and/or be discharged into the environment. Additionally, in addition to, or sometimes in reduction of, any, or all, fuel(s), oxidizer(s) and/or reaction fluid(s) used in this example, (1) steam (vaporous water as a substance) or liquid water, or a combination, may be used to reduce, eliminate, control, prevent and/or mitigate pollutants, that may otherwise result and/or be discharged into the environment, (2) ammonia, as liquid or vapor or combination, may be used to reduce, eliminate, control, prevent and/or mitigate pollutants, that may otherwise result and/or be discharged into the environment, (3) any other substance, including, but not limited to, fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination(s) thereof may be used.

In another preferred embodiment, the present invention uses air, natural gas, and/or hydrogen as inlet fluids. These inlet fluids can be further characterized as an oxidizer (e.g., air), a fossil fuel (sometimes referenced as a net-positive-to-the-environment, carbon-based fuel) (e.g., natural gas), and/or a non-fossil fuel (sometimes referenced as a non-net-positive-to-the-environment, either carbon-based or non-carbon-based fuel) (e.g., hydrogen). For this application, an oxidizer and one or more fuel(s) may be used for the following reasons: (1) the reaction of oxidizer and fuel(s) produce turbine mechanical work or output energy, (2) either or both fuel(s) may be used at the same time as a function of either, or both, fuel's availability, (3) primarily one fuel is used at a time, but both fuels are used for a period of time to switch from one fuel to the other fuel without the necessity to secure or stop the operation of the turbine, (4) primarily one fuel is used at a time, but both fuels can be used concurrently for (a) practical reasons, operational and/or maintenance functions, permit or regulatory requirements or requests, curtailments, (b) elective use for efficiency, power or economic benefits/purposes, and/or ©) any other needs or requirements deemed appropriate, and/or (5) the non-carbon-based fuel is used to reduce, eliminate, control, prevent and/or mitigate pollutants that may otherwise result and/or be discharged into the environment. Additionally, in addition to, or sometimes in reduction of, the natural gas and/or hydrogen used in this example, (1) steam (vaporous water as a substance) or liquid water, or a combination, may be used to reduce, eliminate, control, prevent and/or mitigate pollutants that may otherwise result and/or be discharged into the environment, (2) ammonia, as liquid or vapor or combination, may be used to reduce, eliminate, control, prevent and/or mitigate pollutants that may otherwise result and/or be discharged into the environment, (3) any other substance, including, but not limited to, fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination(s) thereof may be used.

In another preferred embodiment, the present invention uses a) air, b) either gaseous fuel or liquid fuel or both, and/or c) hydrogen as inlet fluids. These inlet fluids can be further characterized as an oxidizer (e.g., air), a fuel other than hydrogen (e.g., natural gas, propane, diesel, kerosene), and a non-fossil fuel (e.g., hydrogen). For this application, an oxidizer and one or more fuel(s) may be used for the following reasons: (1) the reaction of oxidizer and fuel(s) produce turbine mechanical work or output energy, (2) either the gaseous or liquid, or both, types of fuel may be used at the same time as a function of either, or both, types of fuel's availability, (3) primarily one fuel is used at a time, but two or more fuels are used for a period of time to switch from one fuel to the other fuel(s) without the necessity to secure or stop the operation of the turbine, (4) primarily one fuel is used at a time, but two or more fuels can be used concurrently for (a) practical reasons, operational and/or maintenance functions, permit or regulatory requirements or requests, curtailments, (b) elective use for efficiency, power or economic benefits/purposes, and/or ©) any other needs or requirements deemed appropriate, and/or (5) the non-fossil fuel is used to reduce, eliminate, control, prevent and/or mitigate pollutants that may otherwise result and/or be discharged into the environment. Additionally, in addition to, or sometimes in reduction of, the non-hydrogen fuel and/or hydrogen fuel used in this example, (1) steam (vaporous water as a substance) or liquid water, or a combination, may be used to reduce, eliminate, control, prevent and/or mitigate pollutants that may otherwise result and/or be discharged into the environment, (2) ammonia, as liquid or vapor or combination, may be used to reduce, eliminate, control, prevent and/or mitigate pollutants that may otherwise result and/or be discharged into the environment, (3) any other substance, including, but not limited to, fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination thereof may be used.

In another preferred embodiment, the present invention uses air, natural gas and/or other gaseous fuel such as propane, hydrogen or butane to name a few examples, and/or liquid fuel such as diesel oil, fuel oil, kerosene or naphtha to name a few examples, as inlet fluids. These inlet fluids can be further characterized as an oxidizer (e.g., air) and one or more traditional or new (whether naturally occurring or not), synthetic or man-derived, fuel(s). For this application, an oxidizer and one or more fuel(s) may be used for the following reasons: (1) the reaction of oxidizer and fuel(s) produce turbine mechanical work or output energy, (2) the fuel(s) may be used at appropriate times as a function of any one or more fuel's availability, (3) primarily one fuel is used at a time, but two or more fuels are used for a period of time to switch from one fuel to the other fuel(s) without the necessity to secure or stop the operation of the turbine, (4) primarily one fuel is used at a time, but two or more fuels can be used concurrently for a) practical reasons, operational and/or maintenance functions, permit or regulatory requirements or requests, curtailments, b) elective use for efficiency, power or economic benefits/purposes, and/or c) any other needs or requirements deemed appropriate, and/or (5) one or more of the fuels is used to reduce, eliminate, control, prevent and/or mitigate pollutants that may otherwise result and/or be discharged into the environment. Additionally, in addition to, or sometimes in reduction of, any, or all, fuel(s), oxidizer(s) and/or reaction fluid(s) used in this example, (1) steam (vaporous water as a substance) or liquid water, or a combination, may be used to reduce, eliminate, control, prevent and/or mitigate pollutants that may otherwise result and/or be discharged into the environment, (2) ammonia, as liquid or vapor or combination, may be used to reduce, eliminate, control, prevent and/or mitigate pollutants that may otherwise result and/or be discharged into the environment, (3) any other substance, including, but not limited to, fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination thereof may be used. Any, and all, combinations of (1) one or more oxidizers, (2) one or more fuels or reactants, (3) one or more pollution control, pollution reduction or pollution elimination/prevention substances or processes, and/or (4) propellants can be used in a preferred embodiment of the present invention.

In another preferred embodiment, the present invention uses the following inlet fluids: (1) air, (2) natural gas and/or other gaseous fuel such as propane, hydrogen or butane to name a few examples, and/or liquid fuel such as diesel oil, fuel oil, kerosene or naphtha to name a few examples, and (3) fuel combustion reaction product(s)/fluid(s) or reactant reaction product(s)/fluid(s), especially, but not limited to, when said fluid(s) contain or carry excess oxidizer(s), such as air or oxygen, when said fluid(s) are used for recirculation (e.g, EGR) or dilution purposes, and/or when said fluid(s) are mixed with or contain additional oxidizer fluid(s) or reaction fluid(s), whether such oxidizer fluid(s) or reaction fluid(s) are from like or unlike sources of the initial oxidizer fluid(s) or reaction fluid(s). These inlet fluids can be further characterized as an oxidizer (e.g., air), one or more traditional fuel(s) and one or more reaction fluid(s). For this application, an oxidizer, one or more fuel(s), and one or more reaction fluid(s) may be used for the following reasons: (1) the reaction of oxidizer and fuel(s) produce turbine mechanical work or output energy, (2) the fuel(s) may be used at appropriate times as a function of any one or more fuel's availability, (3) primarily one fuel is used at a time, but two or more fuels are used for a period of time to switch from one fuel to the other fuel(s) without the necessity to secure or stop the operation of the turbine, (4) primarily one fuel is used at a time, but two or more fuels can be used concurrently for (a) practical reasons, operational and/or maintenance functions, permit or regulatory requirements or requests, curtailments, (b) elective use for efficiency, power or economic benefits/purposes, and/or (c) any other needs or requirements deemed appropriate, and/or (5) one or more of the fuel(s) and/or one or more of the reaction fluid(s) is/are used to reduce, eliminate, control, prevent and/or mitigate pollutants that may otherwise result and/or be discharged into the environment. Additionally, in addition to, or sometimes in reduction of, any, or all, fuel(s), oxidizer(s) and/or reaction fluid(s) used in this example, (1) steam (vaporous water as a substance) or liquid water, or a combination, may be used to reduce, eliminate, control, prevent and/or mitigate pollutants that may otherwise result and/or be discharged into the environment, (2) ammonia, as liquid or vapor or combination, may be used to reduce, eliminate, control, prevent and/or mitigate pollutants that may otherwise result and/or be discharged into the environment, (3) any other substance, including, but not limited to, additional and/or other fuel combustion product(s)/fluid(s) or reactant reaction product(s)/fluid(s), either or both of which may generally be designated as exhaust gas(es), exhaust fluid(s) or reaction fluid(s) and/or may be used as exhaust gas recirculation (EGR) fluid(s) or exhaust gas dilution fluid(s), so used to enhance the reduction, elimination, control, prevention and/or mitigation of pollutants that may otherwise result and/or be discharged into the environment may be used, (4) steam (vaporous water as a substance) or liquid water or any (or all) other propellant(s), or a combination, may be used to enhance, supplement, augment, or otherwise increase the turbine mechanical work or output energy, or (5) any combination thereof may be used. Any, and all, combinations of (1) one or more oxidizer(s), (2) one or more fuel(s) or reactant(s), (3) one or more reaction fluid(s), (4) one or more pollution control, pollution reduction or pollution elimination/prevention substances or processes, and/or (5) one or more propellant(s) can be used in a preferred embodiment of the present invention.

In another preferred embodiment, the present invention uses one or more oxidizer(s) (e.g., air, oxygen, peroxide, to name a few examples), in any combination and in any phase(s) or condition(s), and one or more fuel(s) (including, but not limited to, fuels mentioned herein), in any combination(s) and in any phase(s) or condition(s), and/or fuel or reactant reaction fluid(s), in any combination(s) and in any phase(s) or condition(s). Such oxidizer(s), fuel(s) and/or reaction fluid(s) can be used either with or without the addition of other substances (1) used to enhance the reduction, elimination, control, prevention and/or mitigation of pollutants (a) that may otherwise result or (b) that may otherwise be discharged into the environment, or (c) both, (2) used as propellant(s) to enhance, supplement, augment, or otherwise increase the turbine mechanical work or output energy, or (3) both. Any, and all, combinations of (1) one or more oxidizer(s), (2) one or more fuel(s) or reactant(s), (3) one or more reaction fluid(s), (4) one or more pollution control, pollution reduction, pollution elimination/prevention, or pollution mitigation substance(s) or process(es), (5) one or more substance(s) used (a) in conjunction with oxidizer(s), fuel(s) (reactant(s)), and/or pollution control substance(s) or process(es) mentioned heretofore, (b) independent thereof (in solitude), or ©) both, to increase the turbine mechanical work or output energy, and/or (6) any and all combination(s) thereof can be used in and with the present invention and preferred embodiments.

In a preferred embodiment, the present invention uses two or more different inlet fluid pressures and/or other thermodynamic conditions. The present invention may use one turbine stage. The present invention may use two or more turbine stages; one being pressure-compounding, or likened to pressure-compounding, stages; the other being velocity-compounding, or likened to velocity-compounding, stages; or a combination of the two. In simple embodiments, the present invention significantly reduces manufacturing cost and/or provides for mass production, eliminates size constraints, provides for near maintenance-free operation, reduces installation costs, increases overall turbine efficiency, and/or increases overall system efficiency.

An object of preferred embodiments of the present invention is to provide a method and apparatus for the generation and production of mechanical work and/or power. For combustion or reaction process(es) in general and, in particular, for the combustion or reaction process(es) of, in, about or for a bladeless turbine, another object of preferred embodiments of the present invention is to provide a method and apparatus for the reduction, elimination, control, prevention and/or mitigation of pollutants that may otherwise result and/or be discharged into the environment. Another object of preferred embodiments of the present invention is to provide a method for the use of excreted fluid energy from turbine engine to further provide a useful thermal energy. Yet another object of preferred embodiments of the present invention is to provide a method for effecting a change in the ratio of the quantity of turbine mechanical work or output energy to the quantity of thermal energy. Another object of preferred embodiments of the present invention is to provide a method for effecting change(s) in, or setting specific, thermodynamic properties (e.g., pressure, temperature, specific enthalpy, etc.) of thermal energy fluid.

Preferred embodiments of the present invention include: a turbine engine that is capable of using (and operating with) a variety of fluid(s), fluid input(s), and fluid condition(s), whether for inlet fluid(s) and/or subsequent fluid location(s) as fluid(s) pass in, through and out the turbine engine; a process of optimizing and marrying inlet fluid characteristics, as well as the characteristics associated with fluid(s) at subsequent locations in passing in, through and out the turbine engine; means for extracting as much mechanical work or output energy as possible from each fluid as it is processed in, through and out the turbine engine; control of fluid(s) and its/their release of energy to produce mechanical work or output energy; a method for controlling the mechanical work or output energy and thermal energy ratios for a given energy input to a system or portion of a system encompassing the turbine engine of the present invention; a method for controlling and effecting change(s) in, or setting specific, thermodynamic properties (e.g., pressure, temperature, specific enthalpy, etc.) of thermal energy fluid at, about or, in general, in the exiting passageway(s) (e.g., piping, tube(s), duct(s) and other such fluid transport hardware) of the turbine engine of the present invention, up to and including the point of usage of said thermal energy by user(s) of said turbine engine exit fluid thermal energy; a means and/or method for producing fluid(s) (e.g., fuel combustion exhaust fluid) that is/are/can be used to reduce, eliminate, control, prevent and/or mitigate pollutants that may otherwise result and/or be discharged into the environment; a method for incorporating and controlling fluid(s) (e.g., fuel combustion exhaust fluid) that is/are/can be used to reduce, eliminate, control, prevent and/or mitigate pollutants that may otherwise result and/or be discharged into the environment; and a method for incorporating bladeless turbine engine(s) in a system, power plant cycle or other process system, or as a standalone engine or prime mover, or both to (1) generate mechanical work or output energy from the turbine engine, (2) generate mechanical work or output energy and/or heat energy (thermal energy) exhaust fluid(s) from the turbine engine, and/or (3) enhance the reduction, elimination, control, prevention and/or mitigation of pollutants that may otherwise result and/or be discharged into the environment.

Preferred embodiments of the turbine engine of the present invention comprise a turbine body, a turbine casing or shell, a turbine cavity or chamber, a turbine rotor and/or rotor sections, a turbine shaft, turbine seals and turbine bearings. For these embodiments, 1) the turbine has one or more fluid nozzle(s), portion(s) of nozzle(s), set(s) of nozzles and/or combustion chamber-nozzle unit(s), where said nozzle(s), portion(s) of nozzle(s), set(s) of nozzles and/or combustion chamber-nozzle unit(s) are delineated, in general, as nozzle(s) and hereinafter are referenced as "nozzle(s)", that are hydraulically connected by one or more nozzle (including combustion chamber-nozzle unit(s)) fluid passageway(s) to one or more rotor fluid passage way(s) to one or more shaft passageway(s) in one or more turbine shaft(s), for which the turbine shaft(s) is/are tubular, hollow, perforated or in some other way permissive of fluid passage, or combination thereof, 2) the turbine has one or more fluid nozzle(s), portion(s) of nozzle(s), set(s) of nozzles and/or combustion chamber-nozzle unit(s), that are hydraulically connected by one or more nozzle (including combustion chamber-nozzle unit(s)) fluid passageway(s) to one or more rotor fluid passage way(s) to one or more non-shaft, typically, but not limited to, turbine casing or shell components, passageway(s), or 3) a combination thereof.

In preferred embodiments, the turbine is contained within the turbine cavity of the turbine body. The turbine shaft axis and the turbine body axis may or may not be aligned, centered or concentric to one another. When not aligned, centered or concentric to one another, there exists a greater volumetric area in one portion of the turbine cavity or chamber of the turbine body than in another. The turbine cavity or chamber may be oriented so that this greater volumetric area assists in collection of nozzle fluid exit vapors at or near the vertically top or upper portion of the turbine casing/body/chamber for ease of discharge of said fluid(s) from the turbine body. The lesser volumetric area may be located in direct opposition to the location of the greater volumetric area, i.e., at a vertically bottom or lower portion of the turbine casing for this particular situation, thus, assisting in the collection of the nozzle fluid exit liquids, which occupy less volume per unit mass than the nozzle fluid exit vapors.

Preferred embodiments are designed and arranged so as to control and/or optimize collectively, and individually to the greatest extent possible, the turbine output energy (mechanical work and/or power) and the characteristics of the fluid(s) exiting the turbine engine for efficient use as a thermal energy commodity to satisfy customer needs and reduce costs and/or generate revenues. In preferred embodiments, the present invention provides a turbine efficiency capability and system efficiency capacity unparalleled by any turbine or turbine system process currently available on the market.

In a preferred embodiment, the invention is a turbine engine comprising: a turbine engine body having a turbine chamber; a first shaft mounted on said turbine engine body, said first shaft having a first shaft longitudinal axis, a first shaft passageway, and a second shaft passageway; a first turbine rotor mounted on said first shaft and within said turbine chamber, said first turbine rotor having a first portion having a first circumferential perimeter, a second portion having a second circumferential perimeter, a first plane of rotation that is perpendicular to said first shaft longitudinal axis, a first radial surface that is parallel to said first plane of rotation, a plurality of first rotor passageways that are in communication with said first shaft passageway, a plurality of second rotor passageways that are in communication with said second shaft passageway, a plurality of first nozzles that are mounted on said first circumferential perimeter, a plurality of second nozzles that are mounted on said first radial surface, a plurality of third nozzles that are mounted on said second circumferential perimeter, each of which first nozzles having a first nozzle longitudinal axis, being in communication with one of said first rotor passageways and discharging into a intermediate chamber, each of which second nozzles having a second nozzle longitudinal axis, being in communication with one of said second rotor passageways and discharging into said intermediate chamber, each of which third nozzles having a third nozzle longitudinal axis, being in communication with one of said intermediate chamber and discharging into said turbine chamber. Preferably, said turbine rotor has a third portion having a third circumferential perimeter, said third portion dividing said intermediate chamber into a first intermediate chamber portion and a second intermediate chamber portion, a plurality of fourth nozzles that are mounted on said third circumferential perimeter, each of which fourth nozzles having a fourth nozzle longitudinal axis, being in communication with said first intermediate chamber portion and discharging into said second intermediate chamber portion. Preferably, the first longitudinal axis of each first nozzle is disposed at a first angle with respect to said plane of rotation, said first angle being zero degrees. Preferably, the first longitudinal axis of at least one first nozzle is disposed at a first angle with respect to said plane of rotation, said first angle being zero degrees. Preferably, the first longitudinal axis of each first nozzle is disposed at a first angle with respect to said plane of rotation, said first angle being other than zero degrees. Preferably first longitudinal axis of at least one first nozzle is disposed at a first angle with respect to said plane of rotation, said first angle being other than zero degrees.

Preferably, the second longitudinal axis of each second nozzle is disposed at a second angle with respect to said plane of rotation, said second angle being zero degrees. Preferably, the second longitudinal axis of at least one second nozzle is disposed at a second angle with respect to said plane of rotation, said second angle being zero degrees. Preferably, the second longitudinal axis of each second nozzle is disposed at a second angle with respect to said plane of rotation, said second angle being other than zero degrees. Preferably, the second longitudinal axis of at least one second nozzle is disposed at a second angle with respect to said plane of rotation, said second angle being other than zero degrees.

In this preferred embodiment, the first longitudinal axis of each first nozzle is disposed at a third angle with respect to a line that is in the plane of rotation of each first nozzle and that is parallel to a tangent of said first circumferential perimeter at the location of each first nozzle, said third angle being zero degrees. Preferably, the first longitudinal axis of at least one first nozzle is disposed at a third angle with respect to a line that is in the plane of rotation of each first nozzle and that is parallel to a tangent of said first circumferential perimeter at the location of each first nozzle, said third angle being zero degrees. Preferably, the first longitudinal axis of each first nozzle is disposed at a third angle with respect to a line that is in the plane of rotation of each first nozzle and that is parallel to a tangent of said first circumferential perimeter at the location of each first nozzle, said third angle being other than zero degrees. Preferably, the first longitudinal axis of at least one first nozzle is disposed at a third angle with respect to a line that is in the plane of rotation of each first nozzle and that is parallel to a tangent of said first circumferential perimeter at the location of each first nozzle, said third angle being other than zero degrees. Preferably, the first longitudinal axis of each first nozzle forms an oblique angle with the direction of rotation. Preferably, the first longitudinal axis of each first nozzle forms an acute angle with a direction that is opposite the direction of rotation. Preferably, the second longitudinal axis of each second nozzle is disposed at a fourth angle with respect to a line that is in the plane of rotation of each first nozzle and that is parallel to a tangent of said second circumferential perimeter at the location of each second nozzle, said fourth angle being zero degrees. Preferably, the second longitudinal axis of at least one second nozzle is disposed at a fourth angle with respect to a line that is in the plane of rotation of each first nozzle and that is parallel to a tangent of said second circumferential perimeter at the location of each second nozzle, said fourth angle being zero degrees. Preferably, the second longitudinal axis of each second nozzle is disposed at a fourth angle with respect to a line that is in the plane of rotation of each first nozzle and that is parallel to a tangent of said second circumferential perimeter at the location of each second nozzle, said fourth angle being other than zero degrees. Preferably, the second longitudinal axis of at least one second nozzle is disposed at a fourth angle with respect to a line that is in the plane of rotation of each first nozzle and that is parallel to a tangent of said second circumferential perimeter at the location of each second nozzle, said fourth angle being other than zero degrees. Preferably, the second longitudinal axis of each second nozzle forms an oblique angle with the direction of rotation. Preferably, the second longitudinal axis of each second nozzle forms an acute angle with a direction that is opposite the direction of rotation.

In a preferred embodiment, the turbine engine further comprises: a first pressure port having a first control valve providing a connection between said first intermediate chamber portion and said second intermediate chamber portion; a second pressure port having a second control valve providing a connection between said second intermediate chamber portion and said turbine chamber; and a third control valve providing a connection between said first intermediate chamber portion and said turbine chamber. Preferably, said first intermediate chamber portion is in communication with said second intermediate chamber portion when said first control valve is in a position other than closed, said second intermediate chamber portion is in communication with said turbine chamber when said second control valve is in a position other than closed, and said first intermediate chamber portion is in communication with said turbine chamber when said third control valve is in a position other than closed; and operation of said control valves is operative to maintain the thermodynamic conditions and/or pressure ratios of the nozzles.

In another preferred embodiment, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into said first intermediate chamber portion. Preferably, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into said first second chamber portion. Preferably, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into both said first intermediate chamber portion and said second intermediate chamber portion.

In another preferred embodiment, the turbine engine further comprises: a second shaft mounted on said turbine engine body, said second shaft having a second shaft longitudinal axis that is coincident with said first shaft longitudinal axis and a third shaft passageway; a second turbine rotor mounted on said second shaft and within said turbine chamber, said second turbine rotor having a third portion having a third circumferential perimeter, said third portion dividing said intermediate chamber into a first intermediate chamber portion and a second intermediate chamber portion, a second direction of rotation that is either the same or opposite direction as said first direction of rotation, a second plane of rotation that is perpendicular to said second shaft longitudinal axis, a plurality of fourth nozzles that are mounted on said third circumferential perimeter, each of which fourth nozzles having a fourth nozzle longitudinal axis, being in communication with said first intermediate chamber portion and discharging into said second intermediate chamber portion. Preferably, said second turbine rotor further comprises a plurality of third rotor passageways that are in communication with said third shaft passageway, a second radial surface that is parallel to said second plane of rotation, a plurality of fifth nozzles that are mounted on said second radial surface, each of which fifth nozzles having a fifth nozzle longitudinal axis, being in communication with one of said third rotor passageways and discharging into said second intermediate chamber portion. Preferably, said second shaft further comprises a fourth shaft passageway; and said second turbine rotor further comprises a plurality of fourth rotor passageways that are in communication with said fourth shaft passageway, a third radial surface that is parallel to said second plane of rotation, a plurality of sixth nozzles that are mounted on said third radial surface, each of which sixth nozzles having a sixth nozzle longitudinal axis, being in communication with one of said fourth rotor passageways and discharging into said second intermediate chamber portion. Preferably, said second shaft further comprises a fourth shaft passageway; and said second turbine rotor further comprises a fourth portion having a fourth circumferential perimeter, a plurality of fourth rotor passageways that are in communication with said fourth shaft passageway, a plurality of sixth nozzles that are mounted on said fourth circumferential perimeter, each of which sixth nozzles having a sixth nozzle longitudinal axis, being in communication with one of said fourth rotor passageways and discharging into said first intermediate chamber portion.

In another preferred embodiment, the invention is a turbine engine comprising: a turbine engine body having a turbine chamber; a first shaft mounted in said turbine engine body, said first shaft having a first longitudinal axis, and a first shaft passageway, and a second shaft passageway; a first turbine rotor mounted on said first shaft and within said turbine chamber, said first turbine rotor having a first portion having a first circumferential perimeter, a second portion having a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted on said first circumferential perimeter, each of which first nozzles having a first nozzle longitudinal axis and being in communication with one of said first rotor passageways and discharging into a first intermediate chamber, a plurality of second nozzles that are mounted on said first radial surface, each of which second nozzles having a second nozzle longitudinal axis and being in communication with one of said second rotor passageways and discharging into a second intermediate chamber, a plurality of third nozzles that are mounted on said second circumferential perimeter, and each of which third nozzles having a third nozzle longitudinal axis and being in communication with one of said second intermediate chamber and discharging into said turbine chamber; a second shaft mounted on said turbine engine body, said second shaft having a second longitudinal axis that is coincident with said first longitudinal axis, a third shaft passageway, and a fourth shaft passageway; a second turbine rotor mounted on said second shaft and within said turbine chamber, said second turbine rotor having a third portion having a circumferential perimeter, a second plane of rotation that is perpendicular to said second shaft longitudinal axis, a second radial surface that is parallel to said second plane of rotation, a third radial surface that is parallel to said second plane of rotation, a plurality of third rotor passageways that are in communication with said third shaft passageway, a plurality of fourth rotor passageways that are in communication with said fourth shaft passageway, a plurality of fourth nozzles that are mounted on said third circumferential perimeter, each of which fourth nozzles having a fourth nozzle longitudinal axis and being in communication with one of said first intermediate chamber and discharging into said second intermediate chamber, a plurality of fifth nozzles that are mounted on said second radial surface, each of which fifth nozzles having a fifth nozzle longitudinal axis and being in communication with one of said third rotor passageways and discharging into said first intermediate chamber, a plurality of sixth nozzles that are mounted on said third radial surface, each of which sixth nozzles having a sixth nozzle longitudinal axis and being in communication with one of said fourth rotor passageways and discharging into said second intermediate chamber.

In yet another preferred embodiment, the invention is a turbine engine comprising: a turbine engine body having a turbine chamber; a first shaft mounted in said turbine engine body, said first shaft having a first longitudinal axis, and a first shaft passageway, and a second shaft passageway; a first turbine rotor mounted on said first shaft and within said turbine chamber, said first turbine rotor having a first portion having a first circumferential perimeter, a second portion having a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted on said first circumferential perimeter, each of which first nozzles having a first nozzle longitudinal axis and being in communication with one of said first rotor passageways and discharging into a first intermediate chamber, a plurality of second nozzles that are mounted on said first radial surface, each of which second nozzles having a second nozzle longitudinal axis and being in communication with one of said second rotor passageways and discharging into a second intermediate chamber, a plurality of third nozzles that are mounted on said second circumferential perimeter, and each of which third nozzles having a third nozzle longitudinal axis and being in communication with one of said second intermediate chamber and discharging into said turbine chamber; a second shaft mounted on said turbine engine body, said second shaft having a second longitudinal axis that is coincident with said first longitudinal axis, a third shaft passageway, and a fourth shaft passageway; a second turbine rotor mounted on said second shaft and within said turbine chamber, said second turbine rotor having a third portion having a third circumferential perimeter, a fourth portion having a fourth circumferential perimeter, a second plane of rotation that is perpendicular to said second shaft longitudinal axis, a second radial surface that is parallel to said second plane of rotation, a plurality of third rotor passageways that are in communication with said third shaft passageway, a plurality of fourth rotor passageways that are in communication with said fourth shaft passageway, a plurality of fourth nozzles that are mounted on said third circumferential perimeter, each of which fourth nozzles having a fourth nozzle longitudinal axis and being in communication with one of said third rotor passageways and discharging into said first intermediate chamber, a plurality of fifth nozzles that are mounted on said fourth circumferential perimeter, each of which fifth nozzles having a fifth nozzle longitudinal axis and being in communication with one of said first intermediate chamber and discharging into said second intermediate chamber, a plurality of sixth nozzles that are mounted on said second radial surface, each of which sixth nozzles having a sixth nozzle longitudinal axis and being in communication with one of said fourth rotor passageways and discharging into said second intermediate chamber.

In a further preferred embodiment, the invention is a turbine engine comprising: a turbine engine body having a turbine chamber; a shaft mounted on said turbine engine body, said shaft having a first shaft longitudinal axis and a first shaft passageway; a turbine rotor mounted on said shaft and within said turbine chamber, said turbine rotor having a first portion having a first circumferential perimeter and a second portion having a second circumferential perimeter, a direction of rotation, a plane of rotation that is perpendicular to said first shaft longitudinal axis, a plurality of first rotor passageways that are in communication with said first shaft passageway, a plurality of first nozzles that are mounted on said first circumferential perimeter, a plurality of second nozzles that are mounted on said second circumferential perimeter, each of which first nozzles having a first nozzle longitudinal axis, being in communication with one of said first rotor passageways and discharging into an intermediate chamber, each of which second nozzles having a second nozzle longitudinal axis, being in communication with said intermediate chamber and discharging into said turbine chamber. Preferably, said turbine rotor has a third portion having a third circumferential perimeter, said third portion dividing said intermediate chamber into a first intermediate chamber portion and a second intermediate chamber portion, a plurality of third nozzles that are mounted on said third circumferential perimeter, each of which third nozzles having a third nozzle longitudinal axis, being in communication with said first intermediate chamber portion and discharging into said second intermediate chamber portion. Preferably, the first longitudinal axis of each first nozzle is disposed at a first angle with respect to said plane of rotation, said first angle being zero degrees. Preferably, the first longitudinal axis of at least one first nozzle is disposed at a first angle with respect to said plane of rotation, said first angle being zero degrees. Preferably, the first longitudinal axis of each first nozzle is disposed at a first angle with respect to said plane of rotation, said first angle being other than zero degrees. Preferably, the first longitudinal axis of at least one first nozzle is disposed at a first angle with respect to said plane of rotation, said first angle being other than zero degrees. Preferably, the second longitudinal axis of each second nozzle is disposed at a second angle with respect to said plane of rotation, said second angle being zero degrees. Preferably, the second longitudinal axis of at least second nozzle is disposed at a second angle with respect to said plane of rotation, said second angle being zero degrees. Preferably, the second longitudinal axis of each second nozzle is disposed at a second angle with respect to said plane of rotation, said second angle being other than zero degrees.

In this preferred embodiment, the second longitudinal axis of at least second nozzle is disposed at a second angle with respect to said plane of rotation, said second angle being other than zero degrees. Preferably, the first longitudinal axis of each first nozzle is disposed at a third angle with respect to a line that is in the plane of rotation of each first nozzle and that is parallel to a tangent of said first circumferential perimeter at the location of each first nozzle, said third angle being zero degrees. Preferably, the first longitudinal axis of at least one first nozzle is disposed at a third angle with respect to a line that is in the plane of rotation of each first nozzle and that is parallel to a tangent of said first circumferential perimeter at the location of each first nozzle, said third angle being zero degrees. Preferably, the first longitudinal axis of each first nozzle is disposed at a third angle with respect to a line that is in the plane of rotation of each first nozzle and that is parallel to a tangent of said first circumferential perimeter at the location of each first nozzle, said third angle being other than zero degrees. Preferably, the first longitudinal axis of at least one first nozzle is disposed at a third angle with respect to a line that is in the plane of rotation of each first nozzle and that is parallel to a tangent of said first circumferential perimeter at the location of each first nozzle, said third angle being other than zero degrees. Preferably, the first longitudinal axis of each first nozzle forms an oblique angle with the direction of rotation. Preferably, the first longitudinal axis of each first nozzle forms an acute angle with a direction that is opposite the direction of rotation. Preferably, the second longitudinal axis of each second nozzle is disposed at a fourth angle with respect to a line that is in the plane of rotation of each first nozzle and that is parallel to a tangent of said second circumferential perimeter at the location of each second nozzle, said fourth angle being zero degrees. Preferably, the second longitudinal axis of at least one second nozzle is disposed at a fourth angle with respect to a line that is in the plane of rotation of each first nozzle and that is parallel to a tangent of said second circumferential perimeter at the location of each second nozzle, said fourth angle being zero degrees. Preferably, the second longitudinal axis of each second nozzle is disposed at a fourth angle with respect to a line that is in the plane of rotation of each first nozzle and that is parallel to a tangent of said second circumferential perimeter at the location of each second nozzle, said fourth angle being other than zero degrees. Preferably, the second longitudinal axis of at least one second nozzle is disposed at a fourth angle with respect to a line that is in the plane of rotation of each first nozzle and that is parallel to a tangent of said second circumferential perimeter at the location of each second nozzle, said fourth angle being other than zero degrees. Preferably, the second longitudinal axis of each second nozzle forms an oblique angle with the direction of rotation. Preferably, the second longitudinal axis of each second nozzle forms an acute angle with a direction that is opposite the direction of rotation.

In a preferred embodiment, the turbine engine further comprises: a first pressure port having a first control valve providing a connection between said first intermediate chamber portion and said second intermediate chamber portion; a second pressure port having a second control valve providing a connection between said second intermediate chamber portion and said turbine chamber; and a third control valve providing a connection between said first intermediate chamber portion and said turbine chamber. Preferably, said first intermediate chamber portion is in communication with said second intermediate chamber portion when said first control valve is in a position other than closed, said second intermediate chamber portion is in communication with said turbine chamber when said second control valve is in a position other than closed, and said first intermediate chamber portion is in communication with said turbine chamber when said third control valve is in a position other than closed; and operation of said control valves is operative to maintain the thermodynamic conditions and pressure ratios of the nozzles. Preferably, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into said second intermediate chamber portion. Preferably, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into said first intermediate chamber portion. Preferably, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into said second intermediate chamber portion. Preferably, said shaft has a second shaft passageway; and said turbine rotor has a first radial surface that is parallel to said plane of rotation, a plurality of second rotor passageways that are in communication with said second shaft passageway, a plurality of fourth nozzles that are mounted on said first radial surface, each of which fourth nozzles having a fourth nozzle longitudinal axis, being in communication with a second rotor passageway and discharging into both said first intermediate chamber portion and said second intermediate chamber portion.

In another preferred embodiment, the invention is a turbine engine comprising: a turbine engine body having a turbine chamber; a shaft mounted on said turbine engine body, said shaft having a first shaft longitudinal axis, a first shaft passageway, and a second shaft passageway; a turbine rotor mounted on said shaft and within said turbine chamber, said turbine rotor having a first portion having circumferential perimeter, a first plane of rotation that is perpendicular to said first shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted on said first circumferential perimeter, a plurality of second nozzles that are mounted on said first radial surface, each of which first nozzles having a first nozzle longitudinal axis, being in communication with one of said first rotor passageways and discharging into a first intermediate chamber, each of which second nozzles having a second nozzle longitudinal axis, being in communication with said first intermediate chamber and discharging into said turbine chamber.

In a preferred embodiment, the present invention is a turbine engine comprising: a shaft having a shaft longitudinal axis and at least one shaft passageway; a rotor having a first section having a circumferential perimeter, a plane of rotation that is perpendicular to said shaft longitudinal axis and a plurality of first rotor passageways that are in communication with said at least one shaft passageway; a plurality of first nozzles that are mounted at, on, at a distance from (through connecting passageway(s)), integral with and/or recessed in said circumferential perimeter, each of which first nozzles having a nozzle longitudinal axis and being in communication with one of said first rotor passageways; and a turbine engine body having a first turbine chamber and associated exit(s) or passageway(s) therefrom; wherein the angle between each first nozzle longitudinal axis and said plane of rotation for each first nozzle that is mounted at, on, at a distance from (through connecting passageway(s)), integral with and/or recessed in said circumferential perimeter is equal to or other than zero degrees. Preferably, the angle between each first nozzle longitudinal axis and a line parallel to a tangent of said circumferential perimeter at the location of each first nozzle is equal to or other than zero degrees. Alternatively, the each first nozzle longitudinal axis forms a three-dimensional acute angle with a direction that is opposite the tangential direction of rotation of said circumferential perimeter. Preferably, the first nozzles are mounted at, on, at a distance from (through connecting passageway(s)), integral with and/or recessed in said circumferential perimeter so that the resultants of the forces acting parallel to said shaft longitudinal axis that are imposed on said rotor by discharges from said first nozzles during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of preferred embodiments of the present invention, but preferably said nozzles are located so as to eliminate or minimize shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation).

In an alternative embodiment, shroud(s), or other fluid deflection or fluid re-direction device(s)/method(s), whether affixed to said nozzle(s) or not, is/are provided to change the direction of the discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the first turbine chamber.

In a preferred embodiment, the present invention is a turbine engine comprising: a shaft having a shaft longitudinal axis; at least one non-shaft passageway (or array of non-shaft passageways in substitution of, and/or having the same practical effect as, said non-shaft passageway), typically, but not limited to, at least one turbine casing or shell component passageway; a rotor having a first section having a circumferential perimeter, a plane of rotation that is perpendicular to said shaft longitudinal axis and a plurality of first rotor passageways that are in communication with said at least one non-shaft passageway; a plurality of first nozzles that are mounted at, on, at a distance from (through connecting passageway(s)), integral with and/or recessed in said circumferential perimeter, each of which first nozzles having a nozzle longitudinal axis and being in communication with one of said first rotor passageways; and a turbine engine body having a first turbine chamber and associated exit(s) or passageway(s) therefrom; wherein the angle between each first nozzle longitudinal axis and said plane of rotation for each first nozzle that is mounted at, on, at a distance from (through connecting passageway(s)), integral with and/or recessed in said circumferential perimeter is equal to or other than zero degrees. Preferably, the angle between each first nozzle longitudinal axis and a line parallel to a tangent of said circumferential perimeter at the location of each first nozzle is equal to or other than zero degrees. Alternatively, the each first nozzle longitudinal axis forms a three-dimensional acute angle with a direction that is opposite the tangential direction of rotation of said circumferential perimeter. Preferably, the first nozzles are mounted at, on, at a distance from (through connecting passageway(s)), integral with and/or recessed in said circumferential perimeter so that the resultants of the forces acting parallel to said shaft longitudinal axis that are imposed on said rotor by discharges from said first nozzles during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not effecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the first turbine chamber.

In a preferred embodiment, the present invention is a turbine engine comprising: a shaft having a shaft longitudinal axis and at least one shaft passageway; at least one non-shaft passageway (or array of non-shaft passageways in substitution of, and/or having the same practical effect as, said at least one non-shaft passageway), typically, but not limited to, at least one turbine casing or shell component passageway; a rotor having a first section having a circumferential perimeter, a plane of rotation that is perpendicular to said shaft longitudinal axis and a plurality of first rotor passageways that are in communication with said at least one shaft passageway and said at least one non-shaft passageway, wherein (1) said rotor passageway(s) associated with said at least one shaft passageway is/are distinct and separate from said rotor passageway(s) associated with said at least one non-shaft passageway, (2) at least one said rotor passageway is associated with a combination of said at least one shaft passageway and said at least one non-shaft passageway, or (3) combination of both; a plurality of first nozzles that are mounted at, on, at a distance from (through connecting passageway(s)), integral with and/or recessed in said circumferential perimeter, each of which first nozzles having a nozzle longitudinal axis and being in communication with one of said first rotor passageways; and a turbine engine body having a first turbine chamber and associated exit(s) or passageway(s) therefrom; wherein the angle between each first nozzle longitudinal axis and said plane of rotation for each first nozzle that is mounted at, on, at a distance from (through connecting passageway(s)), integral with and/or recessed in said circumferential perimeter is equal to or other than zero degrees. Preferably, the angle between each first nozzle longitudinal axis and a line parallel to a tangent of said circumferential perimeter at the location of each first nozzle is equal to or other than zero degrees. Alternatively, the each first nozzle longitudinal axis forms a three-dimensional acute angle with a direction that is opposite the tangential direction of rotation of said circumferential perimeter. Preferably, the first nozzles are mounted at, on, at a distance from (through connecting passageway(s)), integral with and/or recessed in said circumferential perimeter so that the resultants of the forces acting parallel to said shaft longitudinal axis that are imposed on said rotor by discharges from said first nozzles during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not effecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in the first turbine chamber.

In a preferred embodiment, the present invention is a turbine engine comprising: a shaft having a shaft longitudinal axis and at least one shaft passageway; at least one non-shaft passageway (or array of non-shaft passageways in substitution of, and/or having the same practical effect as, said non-shaft passageway), typically, but not limited to, at least one turbine casing or shell component passageway; a rotor having a first section having a circumferential perimeter, a plane of rotation that is perpendicular to said shaft longitudinal axis and a plurality of first rotor passageways that are in communication with said at least one shaft passageway and/or at least one non-shaft passageway, with (1) said rotor passageway(s) associated with said at least one shaft passageway being distinct and separate from said rotor passageway(s) associated with said at least one non-shaft passageway, (2) said rotor passageway(s) being combined of said at least one shaft passageway and said at least one non-shaft passageway, or (3) combination of both; a plurality of first combustion chamber-nozzle units that are mounted at, on, at a distance from (through connecting passageway(s)), integral with and/or recessed in said circumferential perimeter, each of which first combustion chamber-nozzle units having a nozzle longitudinal axis and being in communication with one of said first rotor passageways; and a turbine engine body having a first turbine chamber and associated exit(s) or passageway(s) therefrom; wherein the angle between each first combustion chamber-nozzle unit longitudinal axis and said plane of rotation for each first combustion chamber-nozzle unit that is mounted at, on, at a distance from (through connecting passageway(s)), integral with and/or recessed in said circumferential perimeter is equal to or other than zero degrees. Preferably, the angle between each first combustion chamber-nozzle unit longitudinal axis and a line parallel to a tangent of said circumferential perimeter at the location of each first combustion chamber-nozzle unit is equal to or other than zero degrees. Alternatively, each first combustion chamber-nozzle unit longitudinal axis forms a three-dimensional acute angle with a direction that is opposite the tangential direction of rotation of said circumferential perimeter. Preferably, the first combustion chamber-nozzle units are mounted at, on, at a distance from (through connecting passageway(s)), integral with and/or recessed in said circumferential perimeter so that the resultants of the forces acting parallel to said shaft longitudinal axis that are imposed on said rotor by discharges from said first combustion chamber-nozzle units during operation cancel, or tend to cancel, one another. The combustion chamber-nozzle unit(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said combustion chamber-nozzle unit(s) in said turbine(s) of the present invention, but preferably said combustion chamber-nozzle units are located so as to eliminate or minimize the effect of shaft, non-rotating moments (i.e., the sum of shaft, non-rotating moments associated with the location and position of combustion chamber-nozzle unit(s) is minimal or zero, at best, and wherein non-rotating moments are those shaft moments, or components of said moments, not effecting, or tending to effect, rotation of said turbine shaft about its longitudinal axis of rotation). In an alternative embodiment, shroud(s), or other fluid deflection or fluid re-direction device(s)/method(s), whether affixed to combustion chamber-nozzle unit(s) or not, is/are incorporated into the present invention to change the direction of discharging fluid stream(s) from the direction of the combustion chamber-nozzle unit longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. In a preferred embodiment, an ignition source is provided for the present invention either in or about the turbine chamber(s), or in or about a part of the turbine rotor or rotor section assembly(ies), including combustion chamber-nozzle(s), or both. Preferably, the turbine engine further comprises: cooling coil(s) for removing energy from fluid(s) in the first turbine chamber and/or for removing energy from fluid(s) in, at, about, before or in vicinity of said at least one shaft passageway and/or said at least one non-shaft passageway.

Preferred embodiments of the present invention may have one or more of the following rotor, or rotor section, passageway configurations: (1) a rotor, or rotor section, passageway is in communication with one shaft passageway, (2) a rotor, or rotor section, passageway is in communication with two or more shaft passageways, (3) two or more rotor, or rotor section, passageways are in communication with one shaft passageway, (4) a rotor, or rotor section, passageway is in communication with one non-shaft passageway, typically, but not limited to, a turbine casing or shell component passageway, (5) a rotor, or rotor section, passageway is in communication with two or more non-shaft passageways, typically, but not limited to, two or more turbine casing or shell component passageways, (6) two or more rotor, or rotor section, passageways are in communication with one non-shaft passageway, typically, but not limited to, turbine casing or shell component passageway, or (7) any, or all, possible combination(s) of rotor, or rotor section, passageway(s) being in communication, jointly, separately or both, with shaft passageway(s) and/or non-shaft passageway(s), typically, but not limited to, turbine casing or shell component passageway(s).

In another preferred embodiment, the present invention is a turbine engine disclosed herein further comprising: a second section having a plurality of second rotor passageways that are in communication with said at least one shaft passageway, and a plurality of second nozzles that are mounted at, on, at a distance from (through connecting passageway(s)), integral with and/or recessed in said second section, each of which second nozzles having a nozzle longitudinal axis and being in communication with one of said second rotor passageways; wherein the angle between each second nozzle longitudinal axis and said plane of rotation for each second nozzle that is mounted at, on, at a distance from (through connecting passageway(s)), integral with and/or recessed in said second section is equal to or other than zero degrees. Preferably, said rotor further comprises: a second section having a second turbine chamber and associated exit(s) or passageway(s) therefrom, a plurality of second rotor passageways that are in communication with said at least one shaft passageway, and a plurality of second nozzles that are mounted at, on, at a distance from (through connecting passageway(s)), integral with and/or recessed in said second section, each of which second nozzles having a nozzle longitudinal axis and being in communication with one of said second rotor passageways; wherein the angle between each second nozzle longitudinal axis and said plane of rotation for each second nozzle that is mounted at, on, at a distance from (through connecting passageway(s)), integral with and/or recessed in said second section is equal to or other than zero degrees; and wherein, during operation, the discharge from said plurality of first nozzles is captured in said first turbine chamber and directed, in part or in whole, to said plurality of second nozzles. Preferably, the first nozzle(s) and second nozzle(s) are mounted so that the resultants of the forces acting parallel to said shaft longitudinal axis that are imposed on said rotor by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not effecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or for removing energy from fluid(s) in the first turbine chamber.

In another preferred embodiment, the present invention is a turbine engine disclosed herein further comprising: a second section having a plurality of second rotor passageways that are in communication with said at least one non-shaft passageway, and a plurality of second nozzles that are mounted at, on, at a distance from (through connecting passageway(s)), integral with and/or recessed in said second section, each of which second nozzles having a nozzle longitudinal axis and being in communication with one of said second rotor passageways; wherein the angle between each second nozzle longitudinal axis and said plane of rotation for each second nozzle that is mounted at, on, at a distance from (through connecting passageway(s)), integral with and/or recessed in said second section is equal to or other than zero degrees. Preferably, said rotor further comprises: a second section having a second turbine chamber and associated exit(s) or passageway(s) therefrom, a plurality of second rotor passageways that are in communication with said at least one non-shaft passageway, and a plurality of second nozzles that are mounted at, on, at a distance from (through connecting passageway(s)), integral with and/or recessed in said second section, each of which second nozzles having a nozzle longitudinal axis and being in communication with one of said second rotor passageways; wherein the angle between each second nozzle longitudinal axis and said plane of rotation for each second nozzle that is mounted at, on, at a distance from (through connecting passageway(s)), integral with and/or recessed in said second section is equal to or other than zero degrees; and wherein, during operation, the discharge from said plurality of first nozzles is captured in said first turbine chamber and directed, in part or in whole, to said plurality of second nozzles. Preferably, the first nozzle(s) and second nozzle(s) are mounted so that the resultants of the forces acting parallel to said shaft longitudinal axis that are imposed on said rotor by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or for removing energy from fluid(s) in the first turbine chamber.

In another preferred embodiment, the present invention is a turbine engine disclosed herein further comprising: a second section having a plurality of second rotor passageways that are in communication with said at least one shaft passageway and/or with said at least one non-shaft passageway, and a plurality of second nozzles that are mounted at, on, at a distance from (through connecting passageway(s)), integral with and/or recessed in said second section, each of which second nozzles having a nozzle longitudinal axis and being in communication with one of said second rotor passageways; wherein the angle between each second nozzle longitudinal axis and said plane of rotation for each second nozzle that is mounted at, on, at a distance from (through connecting passageway(s)), integral with and/or recessed in said second section is equal to or other than zero degrees. Preferably, said rotor further comprises: a second section having a second turbine chamber and associated exit(s) or passageway(s) therefrom, a plurality of second rotor passageways that are in communication with said at least one shaft passageway and/or with said at least one non-shaft passageway, and a plurality of second nozzles that are mounted at, on, at a distance from (through connecting passageway(s)), integral with and/or recessed in said second section, each of which second nozzles having a nozzle longitudinal axis and being in communication with one of said second rotor passageways; wherein the angle between each second nozzle longitudinal axis and said plane of rotation for each second nozzle that is mounted at, on, at a distance from (through connecting passageway(s)), integral with and/or recessed in said second section is equal to or other than zero degrees; and wherein, during operation, the discharge from said plurality of first nozzles is captured in said first turbine chamber and directed, in part or in whole, to said plurality of second nozzles. Preferably, the first nozzle(s) and second nozzle(s) are mounted so that the resultants of the forces acting parallel to said shaft longitudinal axis that are imposed on said rotor by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or for removing energy from fluid(s) in the first turbine chamber.

In another preferred embodiment, the present invention is a turbine engine disclosed herein further comprising: a second section having a plurality of second rotor passageways that are in communication with said at least one shaft passageway and/or with said at least one non-shaft passageway, typically, but not limited to, at least one turbine casing or shell component passageway, and a plurality of second combustion chamber-nozzle units that are mounted at, on, at a distance from (through connecting passageway(s)), integral with and/or recessed in said second section, each of which second combustion chamber-nozzle units having a nozzle longitudinal axis and being in communication with one of said second rotor passageways; wherein the angle between each second combustion chamber-nozzle unit longitudinal axis and said plane of rotation for each second combustion chamber-nozzle unit that is mounted at, on, at a distance from (through connecting passageway(s)), integral with and/or recessed in said second section is equal to or other than zero degrees. Preferably, said rotor further comprises: a second section having a second turbine chamber and associated exit(s) or passageway(s) therefrom, a plurality of second rotor passageways that are in communication with said at least one shaft passageway and/or with said at least one non-shaft passageway, and a plurality of second combustion chamber-nozzle units that are mounted at, on, at a distance from (through connecting passageway(s)), integral with and/or recessed in said second section, each of which second combustion chamber-nozzle units having a nozzle longitudinal axis and being in communication with one of said second rotor passageways; wherein the angle between each second combustion chamber-nozzle unit longitudinal axis and said plane of rotation for each second combustion chamber-nozzle unit that is mounted at, on, at a distance from (through connecting passageway(s)), integral with and/or recessed in said second section is equal to or other than zero degrees; and wherein, during operation, the discharge from said plurality of first combustion chamber-nozzle units is captured in said first turbine chamber and directed, in part or in whole, to said plurality of second combustion chamber-nozzle units. Preferably, the first combustion chamber-nozzle unit(s) and second combustion chamber-nozzle unit(s) are mounted so that the resultants of the forces acting parallel to said shaft longitudinal axis that are imposed on said rotor by discharges from said first combustion chamber-nozzle unit(s) and said second combustion chamber-nozzle unit(s) during operation cancel, or tend to cancel, one another. The combustion chamber-nozzle unit(s) generating the cancelling force(s) can, but do not have to, be located adjacent to one another, but preferably said combustion chamber-nozzle units are located so as to eliminate or minimize the effect of shaft, non-rotating moments (i.e., the sum of shaft, non-rotating moments associated with the location and position of combustion chamber-nozzle unit(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said combustion chamber-nozzle unit(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber, for removing energy from fluid(s) in the first turbine chamber, and/or for removing energy from fluid(s) in, at, about, before or in vicinity thereafter of said at least one shaft passageway (including its accompanying rotor passageway(s)) and/or in, at, about, before or in vicinity thereafter of said at least one non-shaft passageway (including its accompanying rotor passageway(s)).

In another preferred embodiment, the present invention is a turbine engine comprising: a shaft having a shaft longitudinal axis and at least one shaft passageway and/or at least one non-shaft passageway (or array of non-shaft passageways in substitution of, and/or having the same practical effect as, said at least one non-shaft passageway), typically, but not limited to, at least one turbine casing or shell component passageway, a rotor having a first section having a plane of rotation that is perpendicular to said shaft longitudinal axis, a radial surface that is parallel to said plane of rotation, a direction of rotation, a plurality of first rotor passageways that are in communication with said at least one shaft passageway and/or said at least one non-shaft passageway, and a plurality of first nozzles that are mounted at, on, at a distance from (through connecting passageway(s)), integral with and/or recessed in said radial surface, each of which first nozzles having a nozzle longitudinal axis and being in communication with one of said first rotor passageways; and a turbine engine body having a first turbine chamber, and associated exit(s) or passageway(s) therefrom, that encloses said turbine; wherein the angle between each first nozzle longitudinal axis and a plane parallel to said plane of rotation for each first nozzle that is mounted at, on, at a distance from (through connecting passageway(s)), integral with and/or recessed in said radial surface is equal to zero degrees, i.e., the nozzle longitudinal axis can be at any position (direction) within said plane parallel to said plane of rotation. Preferably, the first angle between each first nozzle longitudinal axis and a plane parallel to said plane of rotation for each first nozzle that is mounted at, on, at a distance from (through connecting passageway(s)), integral with and/or recessed in said radial surface is not equal to zero degrees and the second angle between each first nozzle longitudinal axis and a datum plane parallel to the tangential direction of rotation and parallel to said shaft longitudinal axis is equal to or other than zero degrees, relative to the direction that is opposite the tangential direction of rotation of the turbine shaft, where zero degrees is in the direction that is opposite the tangential direction of rotation. In preferred embodiments, this first angle may be plus or minus (positive or negative) with respect to the plane parallel to said plane of rotation and this second angle may be plus or minus (positive or negative), or zero degrees, with respect to the datum plane. If the first angle is minus, i.e., the first nozzle points toward the radial surface, then the second angle may be any angle. If the first angle is positive, i.e., the first nozzle points away from the radial surface, then the second angle may be any angle. Preferably, the first nozzles are mounted at, on, at a distance from (through connecting passageway(s)), integral with and/or recessed in said radial surface so that the resultants of the forces acting parallel to said shaft longitudinal axis that are imposed on said rotor by discharges from said first nozzles during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the first turbine chamber.

In a preferred embodiment of the embodiment of the present invention described in the preceding paragraph, each first nozzle is in communication with a rotating combustion chamber (e.g., a combustion chamber-nozzle unit) that is in communication with (1) one or more fuel passageway(s) and one or more combustion air (or oxidizer) passageway(s), at a minimum, or (2) said fuel and oxidizer passageways and a) one or more reaction fluid passageway(s), b) one or more passageway(s) for substance(s) and/or process(es) used to enhance the reduction, elimination, control, prevention and/or mitigation of pollutants that may otherwise result and/or be discharged into the environment, c) one or more propellant passageway(s), or d) combinations thereof, and combustion of a fuel-air (fuel-oxidizer) mixture occurs upstream, at and/or downstream of the throat of each first nozzle during operation, in accordance with the desired effect(s), including, but not limited to, thermodynamic, vectorial, reaction product(s), and/or environmental, of the combustion fluid(s) exiting the nozzle(s). Preferably, the first combustion chamber-nozzle units are mounted at, on, at a distance from (through connecting passageway(s)), integral with and/or recessed in said radial surface so that the resultants of the forces acting parallel to said shaft longitudinal axis that are imposed on said rotor by discharges from said first combustion chamber-nozzle units during operation cancel, or tend to cancel, one another. The combustion chamber-nozzle unit(s) generating the cancelling force(s) can, but do not have to, be located adjacent to one another nor do(es) angle(s) between said combustion chamber-nozzle unit longitudinal axis(es) and referenced plane(s), line(s), axis(es) or other datum reference(s) need to be the same as all, or any, other said angle(s) for any, or all, other said combustion chamber-nozzle unit(s) in said turbine(s) of the present invention, but preferably said combustion chamber-nozzle units are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said combustion chamber-nozzle unit(s) or not, is/are incorporated into the present invention to change the direction of discharging fluid stream(s) from the direction of the nozzle longitudinal axis, i.e., the vectorial direction of the fluid stream exiting the combustion chamber-nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. In a preferred embodiment, an ignition source is provided for the present invention either in or about the turbine chamber(s), or in or about a part of the turbine rotor or rotor section assembly(ies), including combustion chamber-nozzle unit(s), or both. Preferably, the turbine engine further comprises: cooling coil(s) for removing energy from fluid(s) in the first turbine chamber and/or for removing energy from fluid(s) in, at, about, before or in vicinity thereafter of said at least one shaft passageway (including its accompanying rotor passageway(s)) and/or in, at, about, before or in vicinity thereafter of said at least one non-shaft passageway (including its accompanying rotor passageway(s)).

In another preferred embodiment, the present invention is a method for generating power comprising: connecting generator(s) to the shaft(s) of turbine engine(s) disclosed herein; introducing fluid(s) under pressure to said at least one shaft passageway and/or to said at least one non-shaft passageway (or array of non-shaft passageways in substitution of, and/or having the same practical effect as, said non-shaft passageway), typically, but not limited to, turbine casing or shell component passageway(s), hydraulically connected to fluid nozzle(s), portion(s) of nozzle(s), set(s) of nozzles and/or combustion chamber-nozzle unit(s), thereby causing said shaft(s) to rotate; and input energy(ies) being converted to mechanical work or output energy via the nozzle(s). Preferably, said fluid(s) is/are selected from the group consisting of: steam, water, and a mixture of steam and water. Preferably, said fluid is air. Preferably, said fluid is fuel. Preferably, the proportion of steam and the proportion of water introduced to said shaft passageway(s) and/or said non-shaft passageway(s) is selected to match (1) the amount of mechanical work or output energy generated by the turbine engine to a customer need, (2) the amount of thermal energy exiting the turbine engine to a customer need, and/or (3) both. Preferably, the proportion of fuel and the proportion of air introduced to said shaft passageway(s) and/or said non-shaft passageway(s) is selected to match (1) the amount of mechanical work or output energy generated by the turbine engine to a customer need, (2) the amount of thermal energy exiting the turbine engine to a customer need, (3) the desired products of reaction to performance, economic and/or environmental needs, and/or (4) combination thereof.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis, a first shaft passageway and a second shaft passageway; a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said second shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said second shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis and a first shaft passageway; a first non-shaft passageway (or array of non-shaft passageways in substitution of, and/or having the same practical effect as, said first non-shaft passageway), typically, but not limited to, a first turbine casing or shell component passageway; a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first non-shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said first shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said first shaft passageway. Preferably, the first nozzle(s) and second nozzle(s) are mounted so that the resultants of the forces acting parallel to said shaft longitudinal axis that are imposed on said first and second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis and a first shaft passageway; a first non-shaft passageway (or array of non-shaft passageways in substitution of, and/or having the same practical effect as, said first non-shaft passageway), typically, but not limited to, a first turbine casing or shell component passageway; a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said first non-shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said first non-shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis; a first non-shaft passageway (or array of first non-shaft passageways in substitution of, and/or having the same practical effect as, said first non-shaft passageway) and a second non-shaft passageway (or array of second non-shaft passageways in substitution of, and/or having the same practical effect as, said second non-shaft passageway), each of which is typically, but not limited to, turbine casing or shell component passageway; a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first non-shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said second non-shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said second non-shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best; and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis, a first shaft passageway and a second shaft passageway; a first non-shaft passageway (or array of non-shaft passageways in substitution of, and/or having the same practical effect as, said first non-shaft passageway), typically, but not limited to, a first turbine casing or shell component passageway; a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said second shaft passageway and said first non-shaft passageway, either (1) at least one said second rotor passageway is in separate communication with said second shaft passageway and at least one said second rotor passageway is in separate communication with said first non-shaft passageway, or (2) at least one said second rotor passageway is in joint communication with both said second shaft passageway and said first non-shaft passageway, or (3) combination thereof, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said first non-shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis, a first shaft passageway; a first non-shaft passageway (or array of first non-shaft passageways in substitution of, and/or having the same practical effect as, said first non-shaft passageway) and a second non-shaft passageway (or array of second non-shaft passageways in substitution of, and/or having the same practical effect as, said second non-shaft passageway), each of which is typically, but not limited to, turbine casing or shell component passageway(s); a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first shaft passageway and said first non-shaft passageway, either (1) at least one said first rotor passageway is in separate communication with said first shaft passageway and at least one said first rotor passageway is in separate communication with said first non-shaft passageway, or (2) at least one said first rotor passageway is in joint communication with both said first shaft passageway and said first non-shaft passageway, or (3) combination thereof, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said second non-shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said second non-shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis, a first shaft passageway; a first non-shaft passageway (or array of first non-shaft passageways in substitution of, and/or having the same practical effect as, said first non-shaft passageway) and a second non-shaft passageway (or array of second non-shaft passageways in substitution of, and/or having the same practical effect as, said second non-shaft passageway), each of which is typically, but not limited to, turbine casing or shell component passageway(s); a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first non-shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said first shaft passageway and said second non-shaft passageway, either (1) at least one said second rotor passageway is in separate communication with said first shaft passageway and at least one said second rotor passageway is in separate communication with said second non-shaft passageway, or (2) at least one said second rotor passageway is in joint communication with both said first shaft passageway and said second non-shaft passageway, or (3) combination thereof, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said second non-shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis, a first shaft passageway; a first non-shaft passageway (or array of first non-shaft passageways in substitution of, and/or having the same practical effect as, said first non-shaft passageway) and a second non-shaft passageway (or array of second non-shaft passageways in substitution of, and/or having the same practical effect as, said second non-shaft passageway), each of which is typically, but not limited to, turbine casing or shell component passageway(s); a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first non-shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said first shaft passageway and said second non-shaft passageway, either (1) at least one said second rotor passageway is in separate communication with said first shaft passageway and at least one said second rotor passageway is in separate communication with said second non-shaft passageway, or (2) at least one said second rotor passageway is in joint communication with both said first shaft passageway and said second non-shaft passageway, or (3) combination thereof, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said first shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis; a first non-shaft passageway (or array of first non-shaft passageways in substitution of, and/or having the same practical effect as, said first non-shaft passageway) and a second non-shaft passageway (or array of second non-shaft passageways in substitution of, and/or having the same practical effect as, said second non-shaft passageway), each of which is typically, but not limited to, turbine casing or shell component passageway(s); a first turbine mounted on said shaft and within said first turbine chamber, said first turbine comprising a first rotor having a first section having a first circumferential perimeter, a first plane of rotation that is perpendicular to said shaft longitudinal axis, a first radial surface that is parallel to said plane of rotation and a plurality of first rotor passageways that are in communication with said first non-shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; and a second turbine mounted on said shaft and within said second turbine chamber, said second turbine comprising a second rotor having a second section having a second circumferential perimeter, a second plane of rotation that is perpendicular to said shaft longitudinal axis, a second radial surface that is parallel to said second plane of rotation and a plurality of second rotor passageways that are in communication with said second non-shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; wherein said first turbine chamber is in communication with said second non-shaft passageway. Preferably, the first nozzle(s) and second nozzle(s) are mounted so that the resultants of the forces acting parallel to said shaft longitudinal axis that are imposed on said first and said second rotors by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber, a second turbine chamber and a third turbine chamber, each with associated exit(s) or passageway(s) therefrom; a first shaft mounted in said turbine engine body, said first shaft having a longitudinal axis, a first shaft passageway and a second shaft passageway; a second shaft mounted in said turbine engine body, said second shaft having a longitudinal axis and a third shaft passageway; a first turbine mounted on said first shaft and within said first turbine chamber, said first turbine comprising a first rotor having a first section having a first circumferential perimeter, a first plane of rotation that is perpendicular to said first shaft longitudinal axis, a first radial surface that is parallel to said plane of rotation and a plurality of first rotor passageways that are in communication with said first shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; a second turbine mounted on said first shaft and within said second turbine chamber, said second turbine comprising a second rotor having a second section having a second circumferential perimeter, a second plane of rotation that is perpendicular to said first shaft longitudinal axis, a second radial surface that is parallel to said second plane of rotation and a plurality of second rotor passageways that are in communication with said second shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; a third turbine mounted on said second shaft and within said third turbine chamber, said third turbine comprising a third rotor having a third section having a third circumferential perimeter, a third plane of rotation that is perpendicular to said second shaft longitudinal axis, a third radial surface that is parallel to said third plane of rotation and a plurality of third rotor passageways that are in communication with said third shaft passageway, and a plurality of third nozzles that are mounted at, on, at a distance from (through connecting passageway(s)), integral with and/or recessed in said third circumferential perimeter and/or said third radial surface, each of which third nozzles having a third nozzle longitudinal axis and being in communication with one of said third rotor passageways; wherein said first turbine chamber is in communication with said second shaft passageway and said third shaft passageway. Preferably, but not required, the bottom of said first turbine chamber is located at a higher elevation than the uppermost part of the third rotor, as fluid, typically, but not limited to, liquid, in the first turbine chamber flows to the third turbine chamber; however, when fluid, whether liquid or vapor, is present in said first turbine chamber, said flow occurs due to pressure differential between said first turbine chamber and said third turbine chamber. Preferably, the first nozzle(s) and second nozzle(s) are mounted so that the resultants of the forces acting parallel to said first shaft longitudinal axis that are imposed on said first and said second rotors by discharges from said first nozzle(s) and said second nozzle(s) during operation cancel, or tend to cancel, one another. Preferably, the third nozzle(s) are mounted so that the resultants of the forces acting parallel to said second shaft longitudinal axis that are imposed on said third rotor by discharges from said third nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

In another preferred embodiment, the present invention is a turbine engine comprising: a turbine engine body having a first turbine chamber, a second turbine chamber and a third turbine chamber, each with associated exit(s) or passageway(s) therefrom; a first shaft mounted in said turbine engine body, said first shaft having a longitudinal axis; a second shaft mounted in said turbine engine body, said second shaft having a longitudinal axis; a first non-shaft passageway, a second non-shaft passageway and a third non-shaft passageway, each of which is typically, but not limited to, turbine casing or shell component passageway(s); a first turbine mounted on said first shaft and within said first turbine chamber, said first turbine comprising a first rotor having a first section having a first circumferential perimeter, a first plane of rotation that is perpendicular to said first shaft longitudinal axis, a first radial surface that is parallel to said plane of rotation and a plurality of first rotor passageways that are in communication with said first non-shaft passageway, and a plurality of first nozzles that are mounted at, on, at a distance from (through connecting passageway(s)), integral with and/or recessed in said first circumferential perimeter and/or said first radial surface, each of which first nozzles having a first nozzle longitudinal axis and being in communication with one of said first rotor passageways; a second turbine mounted on said first shaft and within said second turbine chamber, said second turbine comprising a second rotor having a second section having a second circumferential perimeter, a second plane of rotation that is perpendicular to said first shaft longitudinal axis, a second radial surface that is parallel to said second plane of rotation and a plurality of second rotor passageways that are in communication with said second non-shaft passageway, and a plurality of second nozzles that are mounted at, on, at a distance from (through connecting passageway(s)), integral with and/or recessed in said second circumferential perimeter and/or said second radial surface, each of which second nozzles having a second nozzle longitudinal axis and being in communication with one of said second rotor passageways; a third turbine mounted on said second shaft and within said third turbine chamber, said third turbine comprising a third rotor having a third section having a third circumferential perimeter, a third plane of rotation that is perpendicular to said second shaft longitudinal axis, a third radial surface that is parallel to said third plane of rotation and a plurality of third rotor passageways that are in communication with said third non-shaft passageway, and a plurality of third nozzles that are mounted at, on, at a distance from (through connecting passageway(s)), integral with and/or recessed in said third circumferential perimeter and/or said third radial surface, each of which third nozzles having a third nozzle longitudinal axis and being in communication with one of said third rotor passageways; wherein said first turbine chamber is in communication with said second non-shaft passageway and said third non-shaft passageway. Preferably, but not required, the bottom of said first turbine chamber is located at a higher elevation than the uppermost part of the third rotor, as fluid, typically, but not limited to, liquid, in the first turbine chamber flows to the third turbine chamber; however, when fluid, whether liquid or vapor, is present in said first turbine chamber, said flow occurs due to pressure differential between said first turbine chamber and said third turbine chamber. Preferably, the first nozzle(s) and second nozzle(s) are mounted so that the resultants of the forces acting parallel to said first shaft longitudinal axis that are imposed on said first and said second rotors by discharges from said first nozzle(s) and said second nozzle(s) during operation cancel, or tend to cancel, one another. Preferably, the third nozzle(s) are mounted so that the resultants of the forces acting parallel to said second shaft longitudinal axis that are imposed on said third rotor by discharges from said third nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in the second turbine chamber and/or, for certain turbine engine operation(s), removing energy from fluid(s) in the first turbine chamber.

As can be envisioned from the many foregoing (and subsequent) paragraphs regarding various arrangements, quantities and configurations of turbine chambers, turbine shafts/rotors and turbine shaft passageways, non-shaft passageways, communication between turbine chambers and turbine shaft/non-shaft passageways, and circumferential perimeter surfaces and radial surfaces, other arrangements, quantities and configurations also constitute preferred embodiments of the present invention. Thus, in preferred embodiments, the present invention is/are turbine engine(s) comprising: one or more turbine body(ies); one or more turbine chamber(s); one or more turbine shaft(s), each said shaft having a shaft longitudinal axis and with, or without, said shaft passageway(s); no, or one or more, non-shaft passageway(s), where said passageway(s) are typically, but not limited to, turbine casing or shell component passageway(s); one or more turbine rotor(s) having one or more section(s) having one or more, or any combination(s) of, circumferential perimeter surface(s), radial surface(s), axial surfaces, and/or curved, spherical or slanted surface(s); one or more plane(s) of rotation that is/are perpendicular to said one or more shaft longitudinal axis(es); plurality(ies) of turbine rotor passageway(s) that is/are in communication with said shaft passageway(s) and/or said non-shaft passageway(s); one or more nozzle(s) include portion(s) of nozzle(s), set(s) of nozzle(s) and/or combustion chamber-nozzle unit(s) that is/are in communication with said rotor passageway(s).

In yet another preferred embodiment, the present invention is a turbine engine comprising: a turbine engine body having a turbine chamber and associated exit(s) or passageway(s) therefrom; a first shaft mounted in said turbine engine body, said first shaft having a first longitudinal axis, a first shaft passageway, and a second shaft passageway; a first turbine rotor mounted on said shaft and within said turbine chamber, said first turbine rotor having a first circumferential perimeter, a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted at, on, at a distance from (through connecting passageway(s)), integral with and/or recessed in said first circumferential perimeter, a plurality of second nozzles that are mounted at, on, at a distance from (through connecting passageway(s)), integral with and/or recessed in said first radial surface, and a plurality of third nozzles that are mounted at, on, at a distance from (through connecting passageway(s)), integral with and/or recessed in said second circumferential perimeter, each of which first nozzles having a first nozzle longitudinal axis and being in communication with one of said first rotor passageways and discharging into a first intermediate chamber, each of which second nozzles having a second nozzle longitudinal axis and being in communication with one of said second rotor passageways and discharging into a second intermediate chamber, and each of which third nozzles having a third nozzle longitudinal axis and being in communication with one of said second intermediate chamber and discharging into said turbine chamber; a second shaft mounted on said turbine engine body, said second shaft having a second longitudinal axis that is coincident with said first longitudinal axis, and a third shaft passageway; a second turbine rotor mounted on said second shaft and within said turbine chamber, said second turbine rotor having a third circumferential perimeter, a second plane of rotation that is perpendicular to said second shaft longitudinal axis, a second radial surface that is parallel to said second plane of rotation and a plurality of third rotor passageways that are in communication with said third shaft passageway, a plurality of fourth nozzles that are mounted at, on, at a distance from (through connecting passageway(s)), integral with and/or recessed in said third circumferential perimeter, a plurality of fifth nozzles that are mounted at, on, at a distance from (through connecting passageway(s)), integral with and/or recessed in said second radial surface, each of which fifth nozzles having a fifth nozzle longitudinal axis and being in communication with one of said third rotor passageways and discharging into said first intermediate chamber, and each of which fourth nozzles having a fourth nozzle longitudinal axis and being in communication with said first intermediate chamber and discharging into said second intermediate chamber. The direction of rotation of said first shaft can be the same direction of rotation of said second shaft, or the direction of rotation of said first shaft can be opposite the direction of rotation of said second shaft. Preferably, the first nozzle(s), second nozzle(s) and third nozzle(s) are mounted so that the resultants of the forces acting parallel to said first shaft longitudinal axis that are imposed on said first rotor by discharges from said first nozzle(s), said second nozzle(s) and said third nozzle(s) during operation cancel, or tend to cancel, one another. Preferably, the fourth nozzle(s) and fifth nozzle(s) are mounted so that the resultants of the forces acting parallel to said second shaft longitudinal axis that are imposed on said second rotor by discharges from said fourth nozzle(s) and said fifth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In yet another preferred embodiment, the present invention is a turbine engine comprising: a turbine engine body having a turbine chamber and associated exit(s) or passageway(s) therefrom; a first shaft mounted in said turbine engine body, said first shaft having a first longitudinal axis, a first shaft passageway, and a second shaft passageway; a first turbine rotor mounted on said first shaft and within said turbine chamber, said first turbine rotor having a first circumferential perimeter, a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted at, on, at a distance from (through connecting passageway(s)), integral with and/or recessed in said first circumferential perimeter, a plurality of second nozzles that are mounted at, on, at a distance from (through connecting passageway(s)), integral with and/or recessed in said first radial surface, and a plurality of third nozzles that are mounted at, on, at a distance from (through connecting passageway(s)), integral with and/or recessed in said second circumferential perimeter, each of which first nozzles having a first nozzle longitudinal axis and being in communication with one of said first rotor passageways and discharging into a first intermediate chamber, each of which second nozzles having a second nozzle longitudinal axis and being in communication with one of said second rotor passageways and discharging into a second intermediate chamber, and each of which third nozzles having a third nozzle longitudinal axis and being in communication with one of said second intermediate chamber and discharging into said turbine chamber; a second shaft mounted on said turbine engine body, said second shaft having a second longitudinal axis that is coincident with said first longitudinal axis, and a third shaft passageway; a second turbine rotor mounted on said second shaft and within said turbine chamber, said second turbine rotor having a third circumferential perimeter, a second plane of rotation that is perpendicular to said second shaft longitudinal axis, a second radial surface that is parallel to said second plane of rotation and a plurality of third rotor passageways that are in communication with said third shaft passageway, a plurality of fourth nozzles that are mounted at, on, at a distance from (through connecting passageway(s)), integral with and/or recessed in said third circumferential perimeter, a plurality of fifth nozzles that are mounted at, on, at a distance from (through connecting passageway(s)), integral with and/or recessed in said second radial surface, each of which fifth nozzles having a fifth nozzle longitudinal axis and being in communication with one of said third rotor passageways and discharging into said second intermediate chamber, and each of which fourth nozzles having a fourth nozzle longitudinal axis and being in communication with said first intermediate chamber and discharging into said second intermediate chamber. The direction of rotation of said first shaft can be the same direction of rotation of said second shaft, or the direction of rotation of said first shaft can be opposite the direction of rotation of said second shaft. Preferably, the first nozzle(s), second nozzle(s) and third nozzle(s) are mounted so that the resultants of the forces acting parallel to said first shaft longitudinal axis that are imposed on said first rotor by discharges from said first nozzle(s), said second nozzle(s) and said third nozzle(s) during operation cancel, or tend to cancel, one another. Preferably, the fourth nozzle(s) and fifth nozzle(s) are mounted so that the resultants of the forces acting parallel to said second shaft longitudinal axis that are imposed on said second rotor by discharges from said fourth nozzle(s) and said fifth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In yet another preferred embodiment, the present invention is a turbine engine comprising: a turbine engine body having a turbine chamber and associated exit(s) or passageway(s) therefrom; a first shaft mounted in said turbine engine body, said first shaft having a first longitudinal axis, and a first shaft passageway; a first turbine rotor mounted on said first shaft and within said turbine chamber, said first turbine rotor having a first circumferential perimeter, a second circumferential perimeter, a first plane of rotation that is perpendicular to said shaft longitudinal axis, a plurality of first rotor passageways that are in communication with said first shaft passageway, a plurality of first nozzles that are mounted at, on, at a distance from (through connecting passageway(s)), integral with and/or recessed in said first circumferential perimeter, and a plurality of second nozzles that are mounted at, on, at a distance from (through connecting passageway(s)), integral with and/or recessed in said second circumferential perimeter, each of which first nozzles having a first nozzle longitudinal axis and being in communication with one of said first rotor passageways and discharging into a first intermediate chamber, each of which second nozzles having a second nozzle longitudinal axis and being in communication with a second intermediate chamber and discharging into said turbine chamber; a second shaft mounted in said turbine engine body, said second shaft having a second longitudinal axis that is coincident with said first longitudinal axis, a second shaft passageway, and a third shaft passageway; a second turbine rotor mounted on said second shaft and within said turbine chamber, said second turbine rotor having a third circumferential perimeter, a second plane of rotation that is perpendicular to said second shaft longitudinal axis, a first radial surface that is parallel to said second plane of rotation, a second radial surface that is parallel to said second plane of rotation, a plurality of second rotor passageways that are in communication with said second shaft passageway, and a plurality of third rotor passageways that are in communication with said third shaft passageway, a plurality of third nozzles that are mounted at, on, at a distance from (through connecting passageway(s)), integral with and/or recessed in said third circumferential perimeter, each of which third nozzles having a third nozzle longitudinal axis and being in communication with said first intermediate chamber and discharging into said second intermediate chamber, a plurality of fourth nozzles that are mounted at, on, at a distance from (through connecting passageway(s)), integral with and/or recessed in said first radial surface, each of which fourth nozzles having a fourth nozzle longitudinal axis and being in communication with one of said second rotor passageways and discharging into said first intermediate chamber, a plurality of fifth nozzles that are mounted at, on, at a distance from (through connecting passageway(s)), integral with and/or recessed in said second radial surface, and each of which fifth nozzles having a fifth nozzle longitudinal axis and being in communication with one of said third rotor passageways and discharging into said second intermediate chamber. The direction of rotation of said first shaft can be the same direction of rotation of said second shaft, or the direction of rotation of said first shaft can be opposite the direction of rotation of said second shaft. Preferably, the first nozzle(s) and second nozzle(s) are mounted so that the resultants of the forces acting parallel to said first shaft longitudinal axis that are imposed on said first rotor by discharges from said first nozzle(s) and said second nozzle(s) during operation cancel, or tend to cancel, one another. Preferably, the third nozzle(s), fourth nozzle(s) and fifth nozzle(s) are mounted so that the resultants of the forces acting parallel to said second shaft longitudinal axis that are imposed on said second rotor by discharges from said third nozzle(s), said fourth nozzle(s) and said fifth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in said turbine chamber.

In yet another preferred embodiment, the present invention is a turbine engine comprising: a turbine engine body having a turbine chamber and associated exit(s) or passageway(s) therefrom; a first shaft mounted in said turbine engine body, said first shaft having a first longitudinal axis, and a first shaft passageway, and a second shaft passageway; a first turbine rotor mounted on said first shaft and within said turbine chamber, said first turbine rotor having a first circumferential perimeter, a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into a first intermediate chamber, a plurality of second nozzles that are mounted at, on, at a distance from (through connecting passageway(s)), integral with and/or recessed in said first radial surface, each of which second nozzles having a second nozzle longitudinal axis and being in communication with one of said second rotor passageways and discharging into a second intermediate chamber, a plurality of third nozzles that are mounted at, on, at a distance from (through connecting passageway(s)), integral with and/or recessed in said second circumferential perimeter, and each of which third nozzles having a third nozzle longitudinal axis and being in communication with one of said second intermediate chamber and discharging into said turbine chamber; a second shaft mounted on said turbine engine body, said second shaft having a second longitudinal axis that is coincident with said first longitudinal axis, a third shaft passageway, and a fourth shaft passageway; a second turbine rotor mounted on said second shaft and within said turbine chamber, said second turbine rotor having a third circumferential perimeter, a second plane of rotation that is perpendicular to said second shaft longitudinal axis, a second radial surface that is parallel to said second plane of rotation, a third radial surface that is parallel to said second plane of rotation, a plurality of third rotor passageways that are in communication with said third shaft passageway, a plurality of fourth rotor passageways that are in communication with said fourth shaft passageway, a plurality of fourth nozzles that are mounted at, on, at a distance from (through connecting passageway(s)), integral with and/or recessed in said third circumferential perimeter, each of which fourth nozzles having a fourth nozzle longitudinal axis and being in communication with one of said first intermediate chamber and discharging into said second intermediate chamber, a plurality of fifth nozzles that are mounted at, on, at a distance from (through connecting passageway(s)), integral with and/or recessed in said second radial surface, each of which fifth nozzles having a fifth nozzle longitudinal axis and being in communication with one of said third rotor passageways and discharging into said first intermediate chamber, a plurality of sixth nozzles that are mounted at, on, at a distance from (through connecting passageway(s)), integral with and/or recessed in said third radial surface, each of which sixth nozzles having a sixth nozzle longitudinal axis and being in communication with one of said fourth rotor passageways and discharging into said second intermediate chamber. The direction of rotation of said first shaft can be the same direction of rotation of said second shaft, or the direction of rotation of said first shaft can be opposite the direction of rotation of said second shaft. Preferably, the first nozzle(s), second nozzle(s) and third nozzle(s) are mounted so that the resultants of the forces acting parallel to said first shaft longitudinal axis that are imposed on said first rotor by discharges from said first nozzle(s), said second nozzle(s) and said third nozzle(s) during operation cancel, or tend to cancel, one another. Preferably, the fourth nozzle(s), fifth nozzle(s) and sixth nozzle(s) are mounted so that the resultants of the forces acting parallel to said second shaft longitudinal axis that are imposed on said second rotor by discharges from said fourth nozzle(s), said fifth nozzle(s) and said sixth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s)

of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In yet another preferred embodiment, the present invention is a turbine engine comprising: a turbine engine body having a turbine chamber and associated exit(s) or passageway(s) therefrom; a first shaft mounted in said turbine engine body, said first shaft having a first longitudinal axis, and a first shaft passageway, and a second shaft passageway; a first turbine rotor mounted on said first shaft and within said turbine chamber, said first turbine rotor having a first circumferential perimeter, a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into a first intermediate chamber, a plurality of second nozzles that are mounted at, on, at a distance from (through connecting passageway(s)), integral with and/or recessed in said first radial surface, each of which second nozzles having a second nozzle longitudinal axis and being in communication with one of said second rotor passageways and discharging into a second intermediate chamber, a plurality of third nozzles that are mounted at, on, at a distance from (through connecting passageway(s)), integral with and/or recessed in said second circumferential perimeter, and each of which third nozzles having a third nozzle longitudinal axis and being in communication with one of said second intermediate chamber and discharging into said turbine chamber; a second shaft mounted on said turbine engine body, said second shaft having a second longitudinal axis that is coincident with said first longitudinal axis, a third shaft passageway, and a fourth shaft passageway; a second turbine rotor mounted on said second shaft and within said turbine chamber, said second turbine rotor having a third circumferential perimeter (which may or may not be of the same dimensions as said first circumferential perimeter), a fourth circumferential perimeter, a second plane of rotation that is perpendicular to said second shaft longitudinal axis, a second radial surface that is parallel to said second plane of rotation, a plurality of third rotor passageways that are in communication with said third shaft passageway, a plurality of fourth rotor passageways that are in communication with said fourth shaft passageway, a plurality of fourth nozzles that are mounted at, on, at a distance from (through connecting passageway(s)), integral with and/or recessed in said third circumferential perimeter, each of which fourth nozzles having a fourth nozzle longitudinal axis and being in communication with one of said third rotor passageways and discharging into said first intermediate chamber, a plurality of fifth nozzles that are mounted at, on, at a distance from (through connecting passageway(s)), integral with and/or recessed in said fourth circumferential perimeter, each of which fifth nozzles having a fifth nozzle longitudinal axis and being in communication with one of said first intermediate chamber and discharging into said second intermediate chamber, a plurality of sixth nozzles that are mounted at, on, at a distance from (through connecting passageway(s)), integral with and/or recessed in said second radial surface, each of which sixth nozzles having a sixth nozzle longitudinal axis and being in communication with one of said fourth rotor passageways and discharging into said second intermediate chamber. The direction of rotation of said first shaft can be the same direction of rotation of said second shaft, or the direction of rotation of said first shaft can be opposite the direction of rotation of said second shaft. Preferably, the first nozzle(s), second nozzle(s) and third nozzle(s) are mounted so that the resultants of the forces acting parallel to said first shaft longitudinal axis that are imposed on said first rotor by discharges from said first nozzle(s), said second nozzle(s) and said third nozzle(s) during operation cancel, or tend to cancel, one another. Preferably, the fourth nozzle(s), fifth nozzle(s) and sixth nozzle(s) are mounted so that the resultants of the forces acting parallel to said second shaft longitudinal axis that are imposed on said second rotor by discharges from said fourth nozzle(s), said fifth nozzle(s) and said sixth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of each turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed.

Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a first longitudinal axis, a first shaft passageway, and a second shaft passageway; a turbine rotor mounted on said shaft and within said turbine chamber, said turbine rotor having a first circumferential perimeter, a second circumferential perimeter, a third circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted at, on, at a distance from (through connecting passageway(s)), integral with and/or recessed in said first circumferential perimeter, a plurality of second nozzles that are mounted at, on, at a distance from (through connecting passageway(s)), integral with and/or recessed in said second circumferential perimeter, a plurality of third nozzles that are mounted at, on, at a distance from (through connecting passageway(s)), integral with and/or recessed in said first radial surface, and a plurality of fourth nozzles that are mounted at, on, at a distance from (through connecting passageway(s)), integral with and/or recessed in said third circumferential perimeter, each of which first nozzles having a first nozzle longitudinal axis, being in communication with one of said first rotor passageways and discharging into a first intermediate chamber, each of which second nozzles having a second nozzle longitudinal axis, being in communication with said first intermediate chamber and discharging into a second intermediate chamber, each of which third nozzles having a third nozzle longitudinal axis, being in communication with one of said second rotor passageways and discharging into said second intermediate chamber, and each of which fourth nozzles having a fourth nozzle longitudinal axis and being in communication with one of said second intermediate chamber and discharging into said turbine chamber. Preferably, the first nozzle(s), second nozzle(s), third nozzle(s) and fourth nozzle(s) are mounted so that the resultants of the forces acting parallel to said shaft longitudinal axis that are imposed on said rotor by discharges from said first nozzle(s), said second nozzle(s), said third nozzle(s) and said fourth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated, with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said first intermediate turbine chamber, for removing energy from fluid(s) in said second intermediate turbine chamber, and/or for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a first longitudinal axis, a first shaft passageway, and a second shaft passageway; a turbine rotor mounted on said shaft and within said turbine chamber, said turbine rotor having a first circumferential perimeter, a second circumferential perimeter, a third circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted at, on, at a distance from (through connecting passageway(s)), integral with and/or recessed in said first circumferential perimeter, a plurality of second nozzles that are mounted at, on, at a distance from (through connecting passageway(s)), integral with and/or recessed in said second circumferential perimeter, a plurality of third nozzles that are mounted at, on, at a distance from (through connecting passageway(s)), integral with and/or recessed in said first radial surface, and a plurality of fourth nozzles that are mounted at, on, at a distance from (through connecting passageway(s)), integral with and/or recessed in said third circumferential perimeter, each of which first nozzles having a first nozzle longitudinal axis, being in communication with one of said first rotor passageways and discharging into a first intermediate chamber, each of which second nozzles having a second nozzle longitudinal axis, being in communication with said first intermediate chamber and discharging into a second intermediate chamber, each of which third nozzles having a third nozzle longitudinal axis, being in communication with one of said second rotor passageways and discharging into said second intermediate chamber, and each of which fourth nozzles having a fourth nozzle longitudinal axis and being in communication with one of said second intermediate chamber and discharging into said turbine chamber; a first pressure port having a first control valve providing a connection between said second intermediate chamber and said turbine chamber; and a second pressure port having a second control valve providing a connection between said first intermediate chamber and said turbine chamber; and a third pressure port having a third control valve providing a connection between said first intermediate chamber and said second intermediate chamber; wherein said first intermediate chamber is in communication with said second intermediate chamber when said third control valve is in a position other than closed, said second intermediate chamber is in communication with said turbine chamber when said first control valve is in a position other than closed, and said first intermediate chamber is in communication with said turbine chamber when said second control valve is in a position other than closed; and wherein operation of said control valves is operative to maintain, within design limits and/or desired operating scenario, the thermodynamic conditions in said chambers and/or pressure ratios of said nozzles. In other preferred embodiments, other combinations of opened and closed valves are employed. Preferably, the turbine engine further comprises: a non-shaft passageway (or array of non-shaft passageways in substitution of, and/or having the same practical effect as, said non-shaft passageway) typically, but not limited to, turbine casing or shell component passageway(s), being in communication with said first intermediate chamber. Preferably, the turbine engine further comprises: a non-shaft passageway (or array of non-shaft passageways in substitution of, and/or having the same practical effect as, said non-shaft passageway) typically, but not limited to, turbine casing or shell component passageway(s), being in communication with said second intermediate chamber. Preferably, the turbine engine further comprises: a first non-shaft passageway (or array of first non-shaft passageways in substitution of, and/or having the same practical effect as, said first non-shaft passageway) typically, but not limited to, turbine casing or shell component passageway(s), being in communication with said first intermediate chamber and a second non-shaft passageway (or array of second non-shaft passageways in substitution of, and/or having the same practical effect as, said second non-shaft passageway) typically, but not limited to, turbine casing or shell component passageway(s), being in communication with said second intermediate chamber. Preferably, the first nozzle(s), second nozzle(s), third nozzle(s) and fourth nozzle(s) are mounted so that the resultants of the forces acting parallel to said shaft longitudinal axis that are imposed on said rotor by discharges from said first nozzle(s), said second nozzle(s), said third nozzle(s) and said fourth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said first intermediate turbine chamber, for removing energy from fluid(s) in said second intermediate turbine chamber, and/or for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway) typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a circumferential perimeter, a plane of rotation that is perpendicular to said shaft longitudinal axis, a plurality of rotor passageways that are in communication with said non-shaft passageway, a plurality of nozzles that are mounted at, on, at a distance from (through connecting passageway(s)), integral with and/or recessed in said circumferential perimeter, each of which nozzles having a nozzle longitudinal axis, being in communication with one of said rotor passageways and discharging into said turbine chamber. Preferably, the nozzle(s) are mounted so that the resultants of the forces acting parallel to said shaft longitudinal axis that are imposed on said rotor by discharges from said nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway) typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a plane of rotation that is perpendicular to said shaft longitudinal axis, a radial surface that is parallel to said plane of rotation, a plurality of rotor passageways that are in communication with said non-shaft passageway, a plurality of nozzles that are mounted at, on, at a distance from (through connecting passageway(s)), integral with and/or recessed in said radial surface, each of which nozzles having a nozzle longitudinal axis, being in communication with one of said rotor passageways and discharging into said turbine chamber. Preferably, the nozzle(s) are mounted so that the resultants of the forces acting parallel to said shaft longitudinal axis that are imposed on said rotor by discharges from said nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation).

In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway) typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a circumferential perimeter, a plane of rotation that is perpendicular to said shaft longitudinal axis, a radial surface that is parallel to said plane of rotation, a plurality of rotor passageways that are in communication with said non-shaft passageway, a plurality of first nozzles that are mounted at, on, at a distance from (through connecting passageway(s)), integral with and/or recessed in said circumferential perimeter, each of which first nozzles having a first nozzle longitudinal axis, being in communication with one of said rotor passageways and discharging into said turbine chamber, and a plurality of second nozzles that are mounted at, on, at a distance from (through connecting passageway(s)), integral with and/or recessed in said radial surface, each of which second nozzles having a second nozzle longitudinal axis, being in communication with one of said rotor passageways and discharging into said turbine chamber. Preferably, the first nozzle(s) and second nozzle(s) are mounted so that the resultants of the forces acting parallel to said shaft longitudinal axis that are imposed on said rotor by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway) typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a first circumferential perimeter and a second circumferential perimeter, a plane of rotation that is perpendicular to said shaft longitudinal axis, a plurality of first rotor passageways that are in communication with said non-shaft passageway, a plurality of second rotor passageways that are in communication with an intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said turbine chamber. Preferably, the first nozzle(s) and second nozzle(s) are mounted so that the resultants of the forces acting parallel to said shaft longitudinal axis that are imposed on said rotor by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway), typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a first circumferential perimeter, a second circumferential perimeter, a plane of rotation that is perpendicular to said shaft longitudinal axis, a radial surface that is parallel to said plane of rotation, a plurality of first rotor passageways that are in communication with said non-shaft passageway, a plurality of second rotor passageways that are in communication with an intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said intermediate chamber and discharging into said turbine chamber, and a plurality of third nozzles that are mounted at, on, at a distance from (through connecting passageway(s)), integral with and/or recessed in said radial surface, each of which third nozzles having a third nozzle longitudinal axis and being in communication with said intermediate chamber and discharging into said turbine chamber. Preferably, the first nozzle(s), second nozzle(s) and third nozzle(s) are mounted so that the resultants of the forces acting parallel to said shaft longitudinal axis that are imposed on said rotor by discharges from said first nozzle(s), said second nozzle(s) and said third nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a first non-shaft passageway (or array of first non-shaft passageways in substitution of, and/or having the same practical effect as, said first non-shaft passageway), typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a second non-shaft passageway (or array of second non-shaft passageways in substitution of, and/or having the same practical effect as, said second non-shaft passageway) and said second non-shaft passageway(s) being commonly referenced as equalizing hole(s) or equalizing passage(s), said turbine rotor having a first circumferential perimeter, a second circumferential perimeter that may, or may not, be of the same diameters (inside and outside) associated with said first circumferential perimeter, a plane of rotation that is perpendicular to said shaft longitudinal axis, a radial surface parallel to said plane of rotation and having said second non-shaft passageway, a plurality of first rotor passageways that are in communication with said first non-shaft passageway and said second non-shaft passageway, a plurality of second rotor passageways that are in communication with said second non-shaft passageway, which second non-shaft passageway is in communication with said first non-shaft passageway, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said turbine chamber, and a plurality of second nozzles that are mounted at, on, at a distance from (through connecting passageway(s)), integral with and/or recessed in said second circumferential perimeter, each of which second nozzles having a second nozzle longitudinal axis and being in communication with one of said second rotor passageway and discharging into said turbine chamber. Preferably, the first nozzle(s) and second nozzle(s) are mounted so that the resultants of the forces acting parallel to said shaft longitudinal axis that are imposed on said rotor by discharges from said first nozzle(s) and said second nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis; a first non-shaft passageway (or array of first non-shaft passageways in substitution of, and/or having the same practical effect as, said first non-shaft passageway), typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a second non-shaft passageway (or array of second non-shaft passageways in substitution of, and/or having the same practical effect as, said second non-shaft passageway) and said second non-shaft passageway(s) being commonly referenced as equalizing hole(s) or equalizing passage(s), said turbine rotor having a third non-shaft passageway (or array of third non-shaft passageways in substitution of, and/or having the same practical effect as, said third non-shaft passageway) and said third non-shaft passageway(s) being commonly referenced as equalizing hole(s) or equalizing passage(s), said turbine rotor having a first circumferential perimeter, a second circumferential perimeter, a third circumferential perimeter and a fourth circumferential perimeter, any, or all, of said circumferential perimeters may, or may not, be of the same diameters (inside and outside) associated with said other circumferential perimeters, a plane of rotation that is perpendicular to said shaft longitudinal axis, a first radial surface parallel to said plane of rotation and having said second non-shaft passageway, a second radial surface parallel to said plane of rotation and having said third non-shaft passageway, a plurality of first rotor passageways that are in communication with said first non-shaft passageway and said second non-shaft passageway, a plurality of second rotor passageways that are in communication with a first intermediate chamber and said third non-shaft passageway, which said third non-shaft passageway is in communication with a second intermediate chamber, a plurality of third rotor passageways that are in communication with said second non-shaft passageway, which second non-shaft passageway is in communication with said first non-shaft passageway, a plurality of fourth rotor passageways that are in communication with said second intermediate chamber and said third non-shaft passageway, which said third non-shaft passageway is in communication with said first intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with one of said second rotor passageways and discharging into said turbine chamber, a plurality of third nozzles that are mounted at, on, at a distance from (through connecting passageway(s)), integral with and/or recessed in said third circumferential perimeter, each of which third nozzles having a third nozzle longitudinal axis and being in communication with one of said third rotor passageways and discharging into said second intermediate chamber, a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with one of said fourth rotor passageways and discharging into said turbine chamber. Preferably, the first nozzle(s), second nozzle(s), third nozzle(s) and fourth nozzle(s) are mounted so that the resultants of the forces acting parallel to said shaft longitudinal axis that are imposed on said rotor by discharges from said first nozzle(s), said second nozzle(s), said third nozzle(s) and said fourth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis and a shaft passageway; a first non-shaft passageway (or array of first non-shaft passageways in substitution of, and/or having the same practical effect as, said first non-shaft passageway), typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a second non-shaft passageway (or array of second non-shaft passageways in substitution of, and/or having the same practical effect as, said second non-shaft passageway) and said second non-shaft passageway(s) being commonly referenced as equalizing hole(s) or equalizing passage(s), said turbine rotor having a first circumferential perimeter, a second circumferential perimeter, a third circumferential perimeter and a fourth circumferential perimeter, any, or all, of said circumferential perimeters may, or may not, be of the same diameters (inside and outside) associated with said other circumferential perimeters, a plane of rotation that is perpendicular to said shaft longitudinal axis, a first radial surface parallel to said plane of rotation and having said second non-shaft passageway, a second radial surface parallel to said plane of rotation and a third radial surface parallel to said plane of rotation, a plurality of first rotor passageways that are in communication with said first non-shaft passageway and said second non-shaft passageway, a plurality of second rotor passageways that are in communication with a first intermediate chamber, a plurality of third rotor passageways that are in communication with said second non-shaft passageway and said second non-shaft passageway is in communication with said first non-shaft passageway, a plurality of fourth rotor passageways that are in communication with a second intermediate chamber, a plurality of fifth rotor passageways that are in communication with said shaft passageway, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with one of said second rotor passageways and discharging into said turbine chamber, a plurality of third nozzles that are mounted at, on, at a distance from (through connecting passageway(s)), integral with and/or recessed in said third circumferential perimeter, each of which third nozzles having a third nozzle longitudinal axis and being in communication with one of said third rotor passageways and discharging into said second intermediate chamber, a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with one of said fourth rotor passageways and discharging into said turbine chamber, a plurality of fifth nozzles that are mounted at, on, at a distance from (through connecting passageway(s)), integral with and/or recessed in said second radial surface, each of which fifth nozzles having a fifth nozzle longitudinal axis and being in communication with one of said fifth rotor passageways and discharging into said first intermediate chamber, a plurality of sixth nozzles that are mounted at, on, at a distance from (through connecting passageway(s)), integral with and/or recessed in said third radial surface, each of which sixth nozzles having a sixth nozzle longitudinal axis and being in communication with one of said fifth rotor passageways and discharging into said second intermediate chamber. Preferably, the first nozzle(s), second nozzle(s), third nozzle(s), fourth nozzle(s), fifth nozzle(s) and sixth nozzle(s) are mounted so that the resultants of the forces acting parallel to said shaft longitudinal axis that are imposed on said rotor by discharges from said first nozzle(s), said second nozzle(s), said third nozzle(s), said fourth nozzle(s), said fifth nozzle(s) and said sixth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a turbine chamber and associated exit(s) or passageway(s) therefrom; a shaft mounted in said turbine engine body, said shaft having a longitudinal axis and a shaft passageway; a first non-shaft passageway (or array of first non-shaft passageways in substitution of, and/or having the same practical effect as, said first non-shaft passageway), a second non-shaft passageway (or array of second non-shaft passageways in substitution of, and/or having the same practical effect as, said second non-shaft passageway) and a third non-shaft passageway (or array of third non-shaft passageways in substitution of, and/or having the same practical effect as, said third non-shaft passageway), each of which is typically, but not limited to, turbine casing or shell component passageway(s); a turbine rotor mounted on said shaft and within said turbine chamber, said turbine rotor being an open-face (or partial-open-face) rotor (i.e., not fully enclosed on one, or both, sides), said turbine rotor having a fourth non-shaft passageway (or array of fourth non-shaft passageways in substitution of, and/or having the same practical effect as, said fourth non-shaft passageway) and said fourth non-shaft passageway(s) being commonly referenced as equalizing hole(s) or equalizing passage(s), said turbine rotor having a first circumferential perimeter, a second circumferential perimeter, a third circumferential perimeter and a fourth circumferential perimeter, any, or all, of said circumferential perimeters may, or may not, be of the same diameters (inside and outside) associated with said other circumferential perimeters, a plane of rotation that is perpendicular to said shaft longitudinal axis, a radial surface parallel to said plane of rotation and having said fourth non-shaft passageway, a plurality of first rotor passageways that are in communication with said first non-shaft passageway and said fourth non-shaft passageway, a plurality of second rotor passageways that are in communication with a first intermediate chamber and said third non-shaft passageway, a plurality of third rotor passageways that are in communication with said fourth non-shaft passageway and said fourth non-shaft passageway is in communication with said first non-shaft passageway, a plurality of fourth rotor passageways that are in communication with a second intermediate chamber and said second non-shaft passageway, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with one of said second rotor passageways and discharging into said turbine chamber, a plurality of third nozzles that are mounted at, on, at a distance from (through connecting passageway(s)), integral with and/or recessed in said third circumferential perimeter, each of which third nozzles having a third nozzle longitudinal axis and being in communication with one of said third rotor passageways and discharging into said second intermediate chamber, a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with one of said fourth rotor passageways and discharging into said turbine chamber. Preferably, the first nozzle(s), second nozzle(s), third nozzle(s) and fourth nozzle(s) are mounted so that the resultants of the forces acting parallel to said shaft longitudinal axis that are imposed on said rotor by discharges from said first nozzle(s), said second nozzle(s), said third nozzle(s) and said fourth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis; a first non-shaft passageway (or array of first non-shaft passageways in substitution of, and/or having the same practical effect as, said first non-shaft passageway) and a second non-shaft passageway (or array of second non-shaft passageways in substitution of, and/or having the same practical effect as, said second non-shaft passageway), each of which is typically, but not limited to, turbine casing or shell component passageway(s); a first turbine rotor mounted on said shaft and within said first turbine chamber, said first turbine rotor being an open-face (or partial-open-face) rotor (i.e., not fully enclosed on one, or both, sides), said first turbine rotor having a first circumferential perimeter, a second circumferential perimeter, a third circumferential perimeter and a fourth circumferential perimeter, a first plane of rotation that is perpendicular to said shaft longitudinal axis, a plurality of first rotor passageways that are in communication with said first non-shaft passageway, a plurality of second rotor passageways that are in communication with a first intermediate chamber, a plurality of third rotor passageways that are in communication with a second intermediate chamber, a plurality of fourth rotor passageways that are in communication with a third intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, and a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber; a second turbine rotor mounted on said shaft and within said second turbine chamber, said second turbine rotor being an open-face (or partial-open-face) rotor (i.e., not fully enclosed on one, or both, sides), said second turbine rotor having a fifth circumferential perimeter, a sixth circumferential perimeter and a seventh circumferential perimeter, a second plane of rotation that is perpendicular to said shaft longitudinal axis, a plurality of fifth rotor passageways that are in communication with said second non-shaft passageway, a plurality of sixth rotor passageways that are in communication with a fourth intermediate chamber, a plurality of seventh rotor passageways that are in communication with a fifth intermediate chamber, a plurality of fifth nozzles that are mounted at, on, at a distance from (through connecting passageway(s)), integral with and/or recessed in said fifth circumferential perimeter, each of which fifth nozzles having a fifth nozzle longitudinal axis and being in communication with one of said fifth rotor passageways and discharging into said fourth intermediate chamber, a plurality of sixth nozzles that are mounted at, on, at a distance from (through connecting passageway(s)), integral with and/or recessed in said sixth circumferential perimeter, each of which sixth nozzles having a sixth nozzle longitudinal axis and being in communication with said sixth rotor passageway(s) and discharging into said fifth intermediate chamber, a plurality of seventh nozzles that are mounted at, on, at a distance from (through connecting passageway(s)), integral with and/or recessed in said seventh circumferential perimeter, each of which seventh nozzles having a seventh nozzle longitudinal axis and being in communication with said seventh rotor passageway(s) and discharging into said second turbine chamber. Preferably, the first nozzle(s), second nozzle(s), third nozzle(s), fourth nozzle(s), fifth nozzle(s), sixth nozzle(s) and seventh nozzle(s) are mounted so that the resultants of the forces acting parallel to said shaft longitudinal axis that are imposed on said first and said second rotors by discharges from said first nozzle(s), said second nozzle(s), said third nozzle(s), said fourth nozzle(s), said fifth nozzle(s), said sixth nozzle(s) and said seventh nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a first turbine chamber and a second turbine chamber (within said first turbine chamber), each with associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway), typically, but not limited to, turbine casing or shell component passageway(s); a turbine rotor mounted on said shaft and within said first turbine chamber and said second turbine chamber, said turbine rotor being an open-face (or partial-open-face) rotor (i.e., not fully enclosed on one, or both, sides), said turbine rotor having a first circumferential perimeter, a second circumferential perimeter, a third circumferential perimeter, a fourth circumferential perimeter and a fifth circumferential perimeter, said fifth circumferential perimeter forming a barrier between said first turbine chamber and said second turbine chamber, a first plane of rotation that is perpendicular to said shaft longitudinal axis, a first radial surface parallel to said plane of rotation, a second radial surface parallel to said plane of rotation, a plurality of first rotor passageways that are in communication with said non-shaft passageway, a plurality of second rotor passageways that are in communication with a first intermediate chamber, a plurality of third rotor passageways that are in communication with a second intermediate chamber, a plurality of fourth rotor passageways that are in communication with a third intermediate chamber, a plurality of fifth rotor passageways that are in communication with said second intermediate chamber, a plurality of sixth rotor passageways that are in communication with said third intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber, a plurality of fifth nozzles that are mounted at, on, at a distance from (through connecting passageway(s)), integral with and/or recessed in said first radial surface, each of which fifth nozzles having a fifth nozzle longitudinal axis and being in communication with said fifth rotor passageway(s) and discharging into said second turbine chamber, a plurality of sixth nozzles that are mounted at, on, at a distance from (through connecting passageway(s)), integral with and/or recessed in said second radial surface, each of which sixth nozzles having a sixth nozzle longitudinal axis and being in communication with said sixth rotor passageway(s) and discharging into said first turbine chamber. Preferably, the first nozzle(s), second nozzle(s), third nozzle(s), fourth nozzle(s), fifth nozzle(s) and sixth nozzle(s) are mounted so that the resultants of the forces acting parallel to said shaft longitudinal axis that are imposed on said turbine rotor by discharges from said first nozzle(s), said second nozzle(s), said third nozzle(s), said fourth nozzle(s), said fifth nozzle(s) and said sixth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis and a shaft passageway; a non-shaft passageway (or array of non-shaft passageways in substitution of, and/or having the same practical effect as, said non-shaft passageway), typically, but not limited to, turbine casing or shell component passageway(s); a first turbine rotor mounted on said shaft and within said first turbine chamber, said first turbine rotor being an open-face (or partial-open-face) rotor (i.e., not fully enclosed on one, or both, sides), said first turbine rotor having a first circumferential perimeter, a second circumferential perimeter, a third circumferential perimeter and a fourth circumferential perimeter, a first plane of rotation that is perpendicular to said shaft longitudinal axis, a plurality of first rotor passageways that are in communication with said non-shaft passageway, a plurality of second rotor passageways that are in communication with a first intermediate chamber, a plurality of third rotor passageways that are in communication with a second intermediate chamber, a plurality of fourth rotor passageways that are in communication with a third intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, and a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber; a second turbine rotor mounted on said shaft and within said second turbine chamber, said second turbine rotor being an open-face (or partial-open-face) rotor (i.e., not fully enclosed on one, or both, sides), said second turbine rotor having a fifth circumferential perimeter, a sixth circumferential perimeter, a seventh circumferential perimeter and an eighth circumferential perimeter, a second plane of rotation that is perpendicular to said shaft longitudinal axis, a plurality of fifth rotor passageways that are in communication with said shaft passageway, a plurality of sixth rotor passageways that are in communication with a fourth intermediate chamber, a plurality of seventh rotor passageways that are in communication with a fifth intermediate chamber, a plurality of eighth rotor passageways that are in communication with a sixth intermediate chamber, a plurality of fifth nozzles that are mounted at, on, at a distance from (through connecting passageway(s)), integral with and/or recessed in said fifth circumferential perimeter, each of which fifth nozzles having a fifth nozzle longitudinal axis and being in communication with one of said fifth rotor passageways and discharging into said fourth intermediate chamber, a plurality of sixth nozzles that are mounted at, on, at a distance from (through connecting passageway(s)), integral with and/or recessed in said sixth circumferential perimeter, each of which sixth nozzles having a sixth nozzle longitudinal axis and being in communication with said sixth rotor passageway(s) and discharging into said fifth intermediate chamber, a plurality of seventh nozzles that are mounted at, on, at a distance from (through connecting passageway(s)), integral with and/or recessed in said seventh circumferential perimeter, each of which seventh nozzles having a seventh nozzle longitudinal axis and being in communication with said seventh rotor passageway(s) and discharging into said sixth intermediate chamber, a plurality of eighth nozzles that are mounted at, on, at a distance from (through connecting passageway(s)), integral with and/or recessed in said eighth circumferential perimeter, each of which eighth nozzles having an eighth nozzle longitudinal axis and being in communication with said eighth rotor passageway(s) and discharging into said second turbine chamber; and wherein said first turbine chamber is in communication with said shaft passageway. Preferably, the first nozzle(s), second nozzle(s), third nozzle(s), fourth nozzle(s), fifth nozzle(s), sixth nozzle(s), seventh nozzle(s) and eighth nozzle(s) are mounted so that the resultants of the forces acting parallel to said shaft longitudinal axis that are imposed on said first and said second rotors by discharges from said first nozzle(s), said second nozzle(s), said third nozzle(s), said fourth nozzle(s), said fifth nozzle(s), said sixth nozzle(s), said seventh nozzle(s) and said eighth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis and a shaft passageway; a non-shaft passageway (or array of non-shaft passageways in substitution of, and/or having the same practical effect as, said non-shaft passageway), typically, but not limited to, turbine casing or shell component passageway(s); a first turbine rotor mounted on said shaft and within said first turbine chamber, said first turbine rotor being an open-face (or partial-open-face) rotor (i.e., not fully enclosed on one, or both, sides), said first turbine rotor having a first circumferential perimeter, a second circumferential perimeter, a third circumferential perimeter and a fourth circumferential perimeter, a first plane of rotation that is perpendicular to said shaft longitudinal axis, a plurality of first rotor passageways that are in communication with said non-shaft passageway, a plurality of second rotor passageways that are in communication with a first intermediate chamber, a plurality of third rotor passageways that are in communication with a second intermediate chamber, a plurality of fourth rotor passageways that are in communication with a third intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, and a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber; a second turbine rotor mounted on said shaft and within said second turbine chamber, said second turbine rotor being an open-face (or partial-open-face) rotor (i.e., not fully enclosed on one, or both, sides), said second turbine rotor having a fifth circumferential perimeter, a sixth circumferential perimeter, a seventh circumferential perimeter and an eighth circumferential perimeter, a second plane of rotation that is perpendicular to said shaft longitudinal axis, a plurality of fifth rotor passageways that are in communication with said shaft passageway, a plurality of sixth rotor passageways that are in communication with a fourth intermediate chamber, a plurality of seventh rotor passageways that are in communication with a fifth intermediate chamber, a plurality of eighth rotor passageways that are in communication with a sixth intermediate chamber, a plurality of fifth nozzles that are mounted at, on, at a distance from (through connecting passageway(s)), integral with and/or recessed in said fifth circumferential perimeter, each of which fifth nozzles having a fifth nozzle longitudinal axis and being in communication with one of said fifth rotor passageways and discharging into said fourth intermediate chamber, a plurality of sixth nozzles that are mounted at, on, at a distance from (through connecting passageway(s)), integral with and/or recessed in said sixth circumferential perimeter, each of which sixth nozzles having a sixth nozzle longitudinal axis and being in communication with said sixth rotor passageway(s) and discharging into said fifth intermediate chamber, a plurality of seventh nozzles that are mounted at, on, at a distance from (through connecting passageway(s)), integral with and/or recessed in said seventh circumferential perimeter, each of which seventh nozzles having a seventh nozzle longitudinal axis and being in communication with said seventh rotor passageway(s) and discharging into said sixth intermediate chamber, a plurality of eighth nozzles that are mounted at, on, at a distance from (through connecting passageway(s)), integral with and/or recessed in said eighth circumferential perimeter, each of which eighth nozzles having an eighth nozzle longitudinal axis and being in communication with said eighth rotor passageway(s) and discharging into said second turbine chamber; and wherein said shaft passageway is in communication with said non-shaft passageway. Preferably, the first nozzle(s), second nozzle(s), third nozzle(s), fourth nozzle(s), fifth nozzle(s), sixth nozzle(s), seventh nozzle(s) and eighth nozzle(s) are mounted so that the resultants of the forces acting parallel to said shaft longitudinal axis that are imposed on said first and said second rotors by discharges from said first nozzle(s), said second nozzle(s), said third nozzle(s), said fourth nozzle(s), said fifth nozzle(s), said sixth nozzle(s), said seventh nozzle(s) and said eighth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as above-mentioned, regarding relative location(s), relative angle(s), and sum of shaft, non-rotating moments being minimal or zero. Preferably, the turbine engine further comprises: cooling coil(s) for removing energy from fluid(s) in said turbine chamber In a further preferred embodiment, the present invention is a turbine engine comprising: a turbine engine body having a first turbine chamber and a second turbine chamber, each with associated exit(s) or passageway(s) therefrom; a shaft mounted in said turbine engine body, said shaft having a longitudinal axis; a non-shaft passageway (or array of non-shaft passageways in substitution of, and/or having the same practical effect as, said non-shaft passageway), typically, but not limited to, turbine casing or shell component passageway(s); a first turbine rotor mounted on said shaft and within said first turbine chamber, said first turbine rotor being an open-face (or partial-open-face) rotor (i.e., not fully enclosed on one, or both, sides), said first turbine rotor having a first circumferential perimeter, a second circumferential perimeter, a third circumferential perimeter and a fourth circumferential perimeter, a first plane of rotation that is perpendicular to said shaft longitudinal axis, a plurality of first rotor passageways that are in communication with said non-shaft passageway, a plurality of second rotor passageways that are in communication with a first intermediate chamber, a plurality of third rotor passageways that are in communication with a second intermediate chamber, a plurality of fourth rotor passageways that are in communication with a third intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, and a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber; a second turbine rotor mounted on said shaft and within said second turbine chamber, said second turbine rotor being an open-face (or partial-open-face) rotor (i.e., not fully enclosed on one, or both, sides), said second turbine rotor having a fifth circumferential perimeter, a sixth circumferential perimeter, a seventh circumferential perimeter and an eighth circumferential perimeter, a second plane of rotation that is perpendicular to said shaft longitudinal axis, a plurality of fifth rotor passageways that are in communication with said non-shaft passageway, a plurality of sixth rotor passageways that are in communication with a fourth intermediate chamber, a plurality of seventh rotor passageways that are in communication with a fifth intermediate chamber, a plurality of eighth rotor passageways that are in communication with a sixth intermediate chamber, a plurality of fifth nozzles that are mounted at, on, at a distance from (through connecting passageway(s)), integral with and/or recessed in said fifth circumferential perimeter, each of which fifth nozzles having a fifth nozzle longitudinal axis and being in communication with one of said fifth rotor passageways and discharging into said fourth intermediate chamber, a plurality of sixth nozzles that are mounted at, on, at a distance from (through connecting passageway(s)), integral with and/or recessed in said sixth circumferential perimeter, each of which sixth nozzles having a sixth nozzle longitudinal axis and being in communication with said sixth rotor passageway(s) and discharging into said fifth intermediate chamber, a plurality of seventh nozzles that are mounted at, on, at a distance from (through connecting passageway(s)), integral with and/or recessed in said seventh circumferential perimeter, each of which seventh nozzles having a seventh nozzle longitudinal axis and being in communication with said seventh rotor passageway(s) and discharging into said sixth intermediate chamber, and a plurality of eighth nozzles that are mounted at, on, at a distance from (through connecting passageway(s)), integral with and/or recessed in said eighth circumferential perimeter, each of which eighth nozzles having an eighth nozzle longitudinal axis and being in communication with said eighth rotor passageway(s) and discharging into said second turbine chamber. Preferably, the first nozzle(s), second nozzle(s), third nozzle(s), fourth nozzle(s), fifth nozzle(s), sixth nozzle(s), seventh nozzle(s) and eighth nozzle(s) are mounted so that the resultants of the forces acting parallel to said shaft longitudinal axis that are imposed on said first and said second rotors by discharges from said first nozzle(s), said second nozzle(s), said third nozzle(s), said fourth nozzle(s), said fifth nozzle(s), said sixth nozzle(s), said seventh nozzle(s) and said eighth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a first turbine chamber and a second turbine chamber, each with associated exit(s) or passageway(s) therefrom; a non-shaft passageway (or array of non-shaft passageways in substitution of, and/or having the same practical effect as, said non-shaft passageway), typically, but not limited to, turbine casing or shell component passageway(s); a first turbine shaft mounted in said turbine engine body, said first turbine shaft having a first longitudinal axis; a first turbine rotor mounted on said first turbine shaft and within said first turbine chamber, said first turbine rotor being an open-face (or partial-open-face) rotor (i.e., not fully enclosed on one, or both, sides), said first turbine rotor having a first circumferential perimeter, a second circumferential perimeter, a third circumferential perimeter and a fourth circumferential perimeter, a first plane of rotation that is perpendicular to said shaft longitudinal axis, a plurality of first rotor passageways that are in communication with said non-shaft passageway, a plurality of second rotor passageways that are in communication with a first intermediate chamber, a plurality of third rotor passageways that are in communication with a second intermediate chamber, a plurality of fourth rotor passageways that are in communication with a third intermediate chamber, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, and a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber; a second turbine shaft mounted in said turbine engine body, said second turbine shaft having a second longitudinal axis, a second turbine rotor mounted on said second turbine shaft and within said second turbine chamber, said second turbine rotor being an open-face (or partial-open-face) rotor (i.e., not fully enclosed on one, or both, sides), said second turbine rotor having a fifth circumferential perimeter, a sixth circumferential perimeter, a seventh circumferential perimeter and an eighth circumferential perimeter, a second plane of rotation that is perpendicular to said shaft longitudinal axis, a plurality of fifth rotor passageways that are in communication with said non-shaft passageway, a plurality of sixth rotor passageways that are in communication with a fourth intermediate chamber, a plurality of seventh rotor passageways that are in communication with a fifth intermediate chamber, a plurality of eighth rotor passageways that are in communication with a sixth intermediate chamber, a plurality of fifth nozzles that are mounted at, on, at a distance from (through connecting passageway(s)), integral with and/or recessed in said fifth circumferential perimeter, each of which fifth nozzles having a fifth nozzle longitudinal axis and being in communication with one of said fifth rotor passageways and discharging into said fourth intermediate chamber, a plurality of sixth nozzles that are mounted at, on, at a distance from (through connecting passageway(s)), integral with and/or recessed in said sixth circumferential perimeter, each of which sixth nozzles having a sixth nozzle longitudinal axis and being in communication with said sixth rotor passageway(s) and discharging into said fifth intermediate chamber, a plurality of seventh nozzles that are mounted at, on, at a distance from (through connecting passageway(s)), integral with and/or recessed in said seventh circumferential perimeter, each of which seventh nozzles having a seventh nozzle longitudinal axis and being in communication with said seventh rotor passageway(s) and discharging into said sixth intermediate chamber, and a plurality of eighth nozzles that are mounted at, on, at a distance from (through connecting passageway(s)), integral with and/or recessed in said eighth circumferential perimeter, each of which eighth nozzles having an eighth nozzle longitudinal axis and being in communication with said eighth rotor passageway(s) and discharging into said second turbine chamber. The direction of rotation of said first shaft can be the same direction of rotation of said second shaft, or the direction of rotation of said first shaft can be opposite the direction of rotation of said second shaft. Preferably, said second turbine shaft longitudinal axis is coincident with said first turbine shaft longitudinal axis, but said coincidence is not required; however, said coincidence is most practical and cost effective. Preferably, the first nozzle(s), second nozzle(s), third nozzle(s), fourth nozzle(s), fifth nozzle(s), sixth nozzle(s), seventh nozzle(s) and eighth nozzle(s) are mounted so that the resultants of the forces acting parallel to said shaft longitudinal axis that are imposed on said first and said second rotors by discharges from said first nozzle(s), said second nozzle(s), said third nozzle(s), said fourth nozzle(s), said fifth nozzle(s), said sixth nozzle(s), said seventh nozzle(s) and said eighth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to effect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (1) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

In a further preferred embodiment, the present invention is a turbine engine comprising: a turbine engine body having a first turbine chamber and a second turbine chamber, each with associated exit(s) or passageway(s) therefrom; a first non-shaft passageway (or array of first non-shaft passageways in substitution of, and/or having the same practical effect as, said first non-shaft passageway), a second non-shaft passageway (or array of second non-shaft passageways in substitution of, and/or having the same practical effect as, said second non-shaft passageway), a third non-shaft passageway (or array of third non-shaft passageways in substitution of, and/or having the same practical effect as, said third non-shaft passageway), a fourth non-shaft passageway (or array of fourth non-shaft passageways in substitution of, and/or having the same practical effect as, said fourth non-shaft passageway), a fifth non-shaft passageway (or array of fifth non-shaft passageways in substitution of, and/or having the same practical effect as, said fifth non-shaft passageway), each of which is typically, but not limited to, turbine casing or shell component passageway(s); a first turbine shaft mounted in said turbine engine body, said first turbine shaft having a first longitudinal axis; a first turbine rotor mounted on said first turbine shaft and within said first turbine chamber, said first turbine rotor being an open-face (or partial-open-face) rotor (i.e., not fully enclosed on one, or both, sides), said first turbine rotor having a first circumferential perimeter, a second circumferential perimeter, a third circumferential perimeter and a fourth circumferential perimeter, a first plane of rotation that is perpendicular to said shaft longitudinal axis, a plurality of first rotor passageways that are in communication with said non-shaft passageway, a plurality of second rotor passageways that are in communication with a first intermediate chamber and said second non-shaft passageway, a plurality of third rotor passageways that are in communication with a second intermediate chamber and said third non-shaft passageway, a plurality of fourth rotor passageways that are in communication with a third intermediate chamber and said fourth non-shaft passageway, a plurality of first nozzles that are mounted at, on, at a distance from (through connecting passageway(s)), integral with and/or recessed in said first circumferential perimeter, each of which first nozzles having a first nozzle longitudinal axis and being in communication with one of said first rotor passageways and discharging into said first intermediate chamber, a plurality of second nozzles that are mounted at, on, at a distance from (through connecting passageway(s)), integral with and/or recessed in said second circumferential perimeter, each of which second nozzles having a second nozzle longitudinal axis and being in communication with said second rotor passageway(s) and discharging into said second intermediate chamber, a plurality of third nozzles that are mounted at, on, at a distance from (through connecting passageway(s)), integral with and/or recessed in said third circumferential perimeter, each of which third nozzles having a third nozzle longitudinal axis and being in communication with said third rotor passageway(s) and discharging into said third intermediate chamber, and a plurality of fourth nozzles that are mounted at, on, at a distance from (through connecting passageway(s)), integral with and/or recessed in said fourth circumferential perimeter, each of which fourth nozzles having a fourth nozzle longitudinal axis and being in communication with said fourth rotor passageway(s) and discharging into said first turbine chamber; a second turbine shaft mounted in said turbine engine body, said second turbine shaft having a second longitudinal axis, a second turbine rotor mounted on said second turbine shaft and within said second turbine chamber, said second turbine rotor being an open-face (or partial-open-face) rotor (i.e., not fully enclosed on one, or both, sides), said second turbine rotor having a fifth circumferential perimeter, a sixth circumferential perimeter, a seventh circumferential perimeter and an eighth circumferential perimeter, a second plane of rotation that is perpendicular to said shaft longitudinal axis, a plurality of fifth rotor passageways that are in communication with said non-shaft passageway, a plurality of sixth rotor passageways that are in communication with a fourth intermediate chamber and said second non-shaft passageway, a plurality of seventh rotor passageways that are in communication with a fifth intermediate chamber and said third non-shaft passageway, a plurality of eighth rotor passageways that are in communication with a sixth intermediate chamber and said fourth non-shaft passageway, a plurality of fifth nozzles that are mounted at, on, at a distance from (through connecting passageway(s)), integral with and/or recessed in said fifth circumferential perimeter, each of which fifth nozzles having a fifth nozzle longitudinal axis and being in communication with one of said fifth rotor passageways and discharging into said fourth intermediate chamber, a plurality of sixth nozzles that are mounted at, on, at a distance from (through connecting passageway(s)), integral with and/or recessed in said sixth circumferential perimeter, each of which sixth nozzles having a sixth nozzle longitudinal axis and being in communication with said sixth rotor passageway(s) and discharging into said fifth intermediate chamber, a plurality of seventh nozzles that are mounted at, on, at a distance from (through connecting passageway(s)), integral with and/or recessed in said seventh circumferential perimeter, each of which seventh nozzles having a seventh nozzle longitudinal axis and being in communication with said seventh rotor passageway(s) and discharging into said sixth intermediate chamber, a plurality of eighth nozzles that are mounted at, on, at a distance from (through connecting passageway(s)), integral with and/or recessed in said eighth circumferential perimeter, each of which eighth nozzles having an eighth nozzle longitudinal axis and being in communication with said eighth rotor passageway(s) and discharging into said second turbine chamber, and wherein said first turbine chamber is in communication with said second turbine chamber via said fifth non-shaft passageway. The direction of rotation of said first shaft can be the same direction of rotation of said second shaft, or the direction of rotation of said first shaft can be opposite the direction of rotation of said second shaft. Preferably, said second turbine shaft longitudinal axis is coincident with said first turbine shaft longitudinal axis, but said coincidence is not required; however, said coincidence is most practical and cost effective. Preferably, the first nozzle(s), second nozzle(s), third nozzle(s), fourth nozzle(s), fifth nozzle(s), sixth nozzle(s), seventh nozzle(s) and eighth nozzle(s) are mounted so that the resultants of the forces acting parallel to said shaft longitudinal axis that are imposed on said first and said second rotors by discharges from said first nozzle(s), said second nozzle(s), said third nozzle(s), said fourth nozzle(s), said fifth nozzle(s), said sixth nozzle(s), said seventh nozzle(s) and said eighth nozzle(s) during operation cancel, or tend to cancel, one another. The nozzle(s) generating the cancelling force(s) can, but do not have to, be located adjacent to one another nor do(es) angle(s) between said nozzle longitudinal axis(es) and referenced plane(s), line(s), axis(es) or other datum reference(s) need to be the same as all, or any, other said angle(s) for any, or all, other said nozzle(s) in said turbine(s) of the present invention, but preferably said nozzles are located so as to eliminate or minimize the effect of shaft, non-rotating moments (i.e., the sum of shaft, non-rotating moments associated with the location and position of nozzle(s) is minimal or zero, at best, and wherein non-rotating moments are those shaft moments, or components of said moments, not affecting, or tending to affect, rotation of said turbine shaft about its longitudinal axis of rotation). In an alternative embodiment, shroud(s), or other fluid deflection or fluid re-direction device(s)/method(s), whether affixed to said nozzle(s) or not, is/are incorporated into the present invention to change the direction of discharging fluid stream(s) from the direction of the nozzle longitudinal axis, i.e., the vectorial direction of the fluid stream exiting the nozzle exit area is altered or changed. Preferably, when shroud(s), or said fluid vectorial re-direction device(s) or method(s), is/are employed, (I) the angle of exiting fluid(s) from said shroud(s), or said fluid vectorial re-direction device(s) or method(s), may be at any three-dimensional angle, or multiple angles for certain preferred embodiments, (2) the resultants of the forces, associated with the discharge stream(s) of the shroud(s), and/or other re-direction device(s)/method(s), acting parallel to shaft longitudinal axis(es) during operation cancel, or tend to cancel, one another, and (3) the shroud(s), and/or other re-direction device(s)/method(s), generating the cancelling force(s) ascribe to the same criteria and guidance, as abovementioned, regarding relative location(s), relative angle(s), and sum of shaft, non-rotating moments being minimal or zero. Preferably, the turbine engine further comprises: cooling coil(s) for removing energy from fluid(s) in said turbine chamber.

For the present invention herein disclosed, in addition to a nozzle's definition as generally described in engineering references and literature, the terms “nozzle”, “nozzles” and “nozzle(s)” include portion(s) of nozzle(s), set(s) of nozzle(s) and/or combustion chamber-nozzle unit(s), as may be appropriate. The axis of fluid flow through, or partially through, said nozzle(s) can be linear or non-linear, or a combination thereof through said nozzle's profile. A nozzle's longitudinal axis is described as the axis of fluid as said fluid passes or discharges from said nozzle's exit area. In alternative and/or preferred embodiment(s) of the present invention herein disclosed, a shroud, or other fluid deflection or fluid re-direction device(s)/method(s), can be used to change the path of the discharging fluid stream, either immediately after or at some distance after said fluid exits the nozzle exit area, from the direction of the nozzle longitudinal axis to some other direction.

Not all nozzles need be designed and/or located such that the turbine mechanical work or output energy is optimized. For example, when an application has a wide variance in thermodynamic property(ies), such as steam quality or inlet fuel pressure, to name a couple, the present invention may use one shaft passageway and/or one non-shaft passageway in communication with more than one rotor or rotor section, with said nozzle(s), portion(s) of nozzle(s), set(s) of nozzle(s) and/or combustion chamber-nozzle unit(s) located at different radii from the axis of rotation. If thermodynamic conditions are relatively constant and steady-state, then, in general, nozzle design and location can be determined for the best turbine engine efficiency. If thermodynamic conditions and properties vary significantly during operation of the turbine engine, then, in general, the design and placement of nozzles, at different radii, can be such that, for example, the summation of the conversions from kinetic energy to turbine mechanical work or output energy for said nozzles is reasonably constant for the range of said variances. That is, the turbine engine efficiency is/may be neither the worst nor the best for a given set of thermodynamic conditions.

Nozzle shapes and sizes are preferably designed and configured for subsonic, sonic and supersonic flow applications. In preferred embodiments of the present invention, there may be a mix of said three flow applications. Nozzle design(s) and configuration(s) can include, but not limited to, specific shapes/profiles/contours and sizes appropriate for fluid substance(s) and thermodynamic conditions of, for example, energy-laden liquid water nozzle(s), pressurized steam nozzle(s), pressurized air nozzle(s), geothermal fluid nozzle(s), combustion chamber nozzle(s) or rocket nozzle(s), and jet nozzle(s), to name a few.

For some embodiments of the present invention, each shaft passageway is in communication with at least one nozzle, portion(s) of at least one nozzle and/or at least one combustion chamber-nozzle unit. For some embodiments of the present invention, each non-shaft passageway (or array of non-shaft passageways in substitution of, and/or having the same practical effect as, said non-shaft passageway), typically, but not limited to, turbine casing or shell component passageway(s), is in communication with at least one nozzle, portion(s) of at least one nozzle and/or at least one combustion chamber-nozzle unit. For such embodiments with only one, or collectively all as one, shaft passageway in communication with only one nozzle, portion(s) of only one nozzle or only one combustion chamber-nozzle unit or with only one, or collectively all as one, non-shaft passageway in communication with only one nozzle, portion(s) of only one nozzle or only one combustion chamber-nozzle unit, dynamic balance of the rotating assembly can be accomplished, for example, using counterweight(s) or counterweight device(s)/method(s), whether said counterweights or devices are automatic or manual. For such embodiments with only one shaft passageway in communication with only one nozzle, portion(s) of only one nozzle or only one combustion chamber-nozzle unit and with only one non-shaft passageway in communication with only one nozzle, portion(s) of only one nozzle or only one combustion chamber-nozzle unit, or collective combinations of said shaft passageway(s) and/or said non-shaft passageway(s) such that the present invention contains only two said nozzles, dynamic balance can be accomplished, for example, by preferably arranging each of said two nozzles, portion(s) of the two nozzles or the two combustion chamber-nozzle units in diametrical opposing configuration; however, for said embodiments, counterweight(s) or counterweight device(s)/method(s) are/can be incorporated due, in part or in whole, to irregularities or differences in (1) radial distances of one nozzle relative to the other, (2) thermodynamic conditions, for example, pressure, temperature, quality or flow rate, to name a few, (3) material non-homogeneity, or (4) combinations thereof. Preferably, each shaft passageway is in communication with at least two or more nozzles, portion(s) of at least two or more nozzles or at least two or more combustion chamber-nozzle units. Preferably, each non-shaft passageway is in communication with at least two or more nozzles, portion(s) of at least two or more nozzles or at least two or more combustion chamber-nozzle units.

Preferably, circumferential perimeter surface(s) is/are parallel to the axis of rotation, but said surface(s) need not be parallel to said axis. For some preferred embodiments of the present invention, it is desirable for said surface(s) to be non-parallel to the axis of rotation for mechanical or thermodynamic purposes, for example, deflecting and/or reducing condensate or its accumulation, reducing rotor windage, ease of installation and removal of nozzle(s), to name a few. Additionally, preferably, radial plane surface(s) is/are parallel to the plane of rotation, but said radial surface(s) need not be parallel to said plane of rotation. In preferred embodiments, either circumferential perimeter surface(s) or radial surface(s), or both, are slanted relative to the axis of rotation and relative to the plane of rotation, respectively.

For some embodiments of the present invention, axial thrust (sometimes called axial end play) on the turbine shaft(s) results from unequal force(s) on one side of rotor(s), or rotor section(s), relative to another side, with said force(s) having a resultant axial component parallel to the longitudinal axis of the turbine shaft(s). For said embodiments, orientation and/or location of nozzle(s), set(s) of nozzles and/or combustion chamber-nozzle unit(s), can be placed to reduce or eliminate the sum of said unequal force(s); however, in so placing said nozzle(s), set(s) of nozzles and/or combustion chamber-nozzle unit(s), the sacrifice, if any, in, for example, turbine mechanical work or output energy, balance of shaft moments (as described elsewhere), availability and/or use of thermal energy, effects of thermodynamic conditions, dynamic shaft balance, to name a few, may be too significant for economical, operational or maintenance, and/or environment reasons, to name a few, in which instance(s) said shaft axial thrust or shaft axial end play may/will be present. For such occurrences, where shaft axial thrust or shaft axial end play is present, other devices or methods may be employed to reduce, eliminate and/or absorb said axial thrust; said devices or methods include, but are not limited to, thrust bearings, increase/decrease cross-sectional area(s) effecting axial thrust, and/or turbine component (or entire turbine engine) mirroring, where mirroring is the concept of placing/adding component(s) in a reverse (mirror) orientation on the shaft(s), for example, (1) if a turbine rotor is experiencing greatest axial thrust on the left-hand surface of said rotor due to entering high pressure fluid acting only, or predominately, on said surface, then unequal axial forces can be countered by installing another like rotor, but reversed orientation, for which entering high pressure fluid acts in like fashion on like right-hand surface, (2) if it is impractical, or otherwise undesirable, to install additional component(s), then a like turbine engine of the present invention, of reverse orientation, can be attached to the first turbine engine shaft, where such attachment is incorporated on a common (or single) shaft or attachment is accomplished through a solidly coupled method, or (3) combination thereof. For applications incorporating control valves for intermediate chamber(s) and axial thrust detection device(s), said thrust detection device(s) can provide an input parameter for control of, for example, pressure in particular intermediate chamber(s) and, thus, affect changes in said axial thrust. Shroud(s), or other fluid deflection or fluid re-direction device(s)/method(s), and nozzle(s), portion(s) of nozzle(s), set(s) of nozzles and/or combustion chamber-nozzle unit(s), as referenced herein for the present invention, can incorporate side stream channel(s) or pathway(s), at different angle(s), for alternate direction of some, or all, fluid passing therein said shroud(s) and/or nozzle(s) to affect a balancing axial thrust component, whether said alternate directing of fluid is automatic or manual, or fixed or variable.

Seals, whether for the shaft or other components, can either be affixed to a stationary turbine component (e.g., body or shell section end) or be affixed to a rotating component (e.g., shaft or rotor).

In other preferred embodiments, the present invention is a system for generation or generation and distribution of power that incorporates a turbine engine disclosed herein. In other preferred embodiments, the present invention is a method for generation or generation and distribution of power that uses a turbine engine disclosed herein. Further, the present invention has application to not only the generation of electricity and thermal energy usage, but the present invention can be applied as a prime mover for water vehicles (for example, boats, ships, submarines, jet skis, hovercraft, to name a few), land vehicles (automobiles, trucks, motorcycles, to name a few), atmospheric vehicles (airplanes, helicopters, dirigibles/airships, to name a few) and/or mechanical drive applications.

Further aspects of the present invention will become apparent from consideration of the drawings and the ensuing description of preferred embodiments of the present invention. A person skilled in the art will realize that other embodiments of the present invention are possible and that the details of the present invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
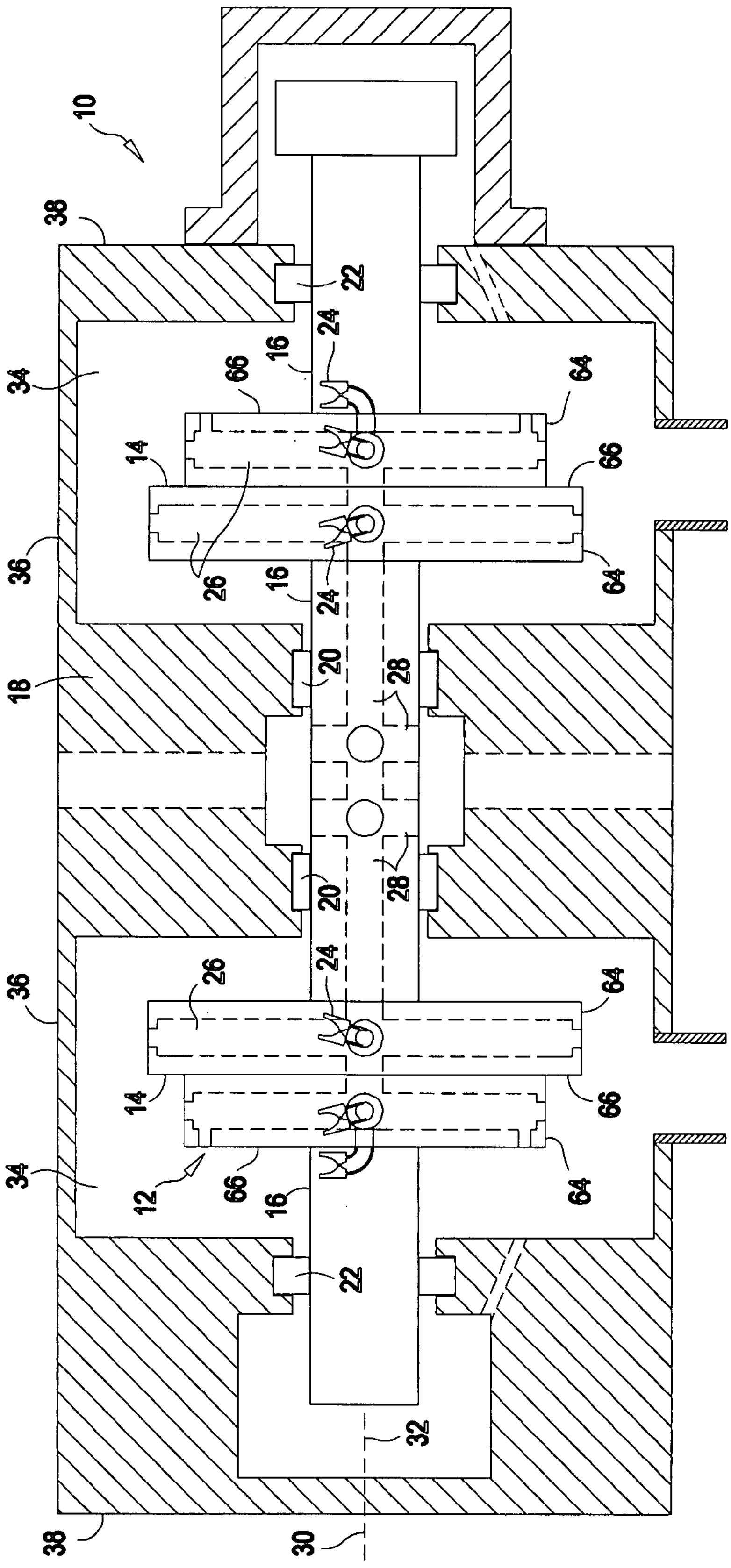
FIG. 1 is a cross-sectional view of the turbine engine of a preferred embodiment of the invention.

The following reference numerals are used to indicate the parts and environment of the invention on the drawings:

10 turbine engine
12 turbine rotor, rotor
14 rotor section
16 turbine shaft
18 turbine body
20 turbine shaft seal
22 turbine shaft bearing
24 nozzle
26 rotor passageway
28 shaft passageway
30 turbine axis, axis of rotation
32 turbine shaft axis
34 turbine cavity, turbine chamber
36 casing, shell section
38 shell section end
40 coupling
46 first inlet fluid
48 second inlet fluid
50 third inlet fluid
52 exhaust, outlet
54 compressor
56 fluid axis
58 direction of rotation
60 condensing/cooling coil or bank
62 rotor seal, casing seal
64 turbine rotor perimeter, circumferential perimeter
66 turbine rotor radial surface, radial surface
70 first inlet fluid port
72 second inlet fluid port
74 third inlet fluid port
80 first control valve
82 second control valve
84 third control valve
86 fourth control valve
88 fifth control valve
30 sixth control valve
100 power plant system
102 boiler
104 fuel
106 generator
108 distribution system
110 thermal chiller
114 warm water
116 cold water
120 water heater
122 cool water
124 hot water
126 pump
130 solar thermal system
132 solar pump
134 solar collector
136 equalizing hole
138 third inlet port
140 second turbine chamber (for same rotor, but not an intermediate chamber, i.e., a second chamber within a first chamber)
142 drive gear
144 driven gear
146 crossover line, pipe
148 flow direction
150 first boiler/heat exchanger/heat recovery steam generator (HRSG)—first type
152 second boiler/heat exchanger/heat recovery steam generator (HRSG)—first type
154 first boiler/heat exchanger/heat recovery steam generator (HRSG)—second type
156 second boiler/heat exchanger/heat recovery steam generator (HRSG)—second type
167 fourth inlet fluid
168 fifth inlet fluid
169 sixth inlet fluid
170 seventh inlet fluid
171 eighth inlet fluid
172 ninth inlet fluid
173 tenth inlet fluid
174 eleventh inlet fluid
175 twelfth inlet fluid
176 thirteenth inlet fluid
177 fourteenth inlet fluid
178 fifteenth inlet fluid
179 sixteenth inlet fluid
180 seventh control valve
182 eighth control valve
184 ninth control valve 186 tenth control valve
188 eleventh control valve
190 twelfth control valve
192 thirteenth control valve
194 fourteenth control valve
196 fifteenth control valve
198 sixteenth control valve
200 seventeenth control valve
202 eighteenth control valve
204 nineteenth control valve
206 twentieth control valve
267 fourth inlet fluid port
268 fifth inlet fluid port
269 sixth inlet fluid port
270 seventh inlet fluid port
271 eighth inlet fluid port
272 ninth inlet fluid port
273 tenth inlet fluid port
274 eleventh inlet fluid port
275 twelfth inlet fluid port
276 thirteenth inlet fluid port
277 fourteenth inlet fluid port
278 fifteenth inlet fluid port
279 sixteenth inlet fluid port

DETAILED DESCRIPTION OF THE INVENTION

In a preferred embodiment, the present invention is a turbine engine, with capacities and capabilities to use multiple fluid streams or sources; multiple fluid substances; fluids in the liquid phase, vapor phase, or combination thereof (e.g., multiple fluid phases); multiple fluid pressures; multiple fluid temperatures; and/or multiple stages. For the purposes of this disclosure, the term "bladeless turbine" means "a turbine engine that incorporates, in part or in whole, nozzle(s) (subsonic, sonic and/or supersonic in character) affixed to, attached to, integral with, or essentially part of, a turbine rotating member (e.g., turbine rotor), and said nozzle(s) is/are characterized in the following manner: (1) as fluid passes into, through and out said nozzle(s), such nozzle(s) receive the pressure/temperature energy of the entering fluid, convert or change that energy into velocity/kinetic energy and subsequently convert or change the velocity/kinetic energy into mechanical energy/work/power, all in one element (said rotating nozzle component), and/or (2) said nozzle(s) are not characterized as previously mentioned in an early portion of this disclosure, where, for example, in the first stage, a nozzle is the stationary element and only converts or changes the pressure/temperature energy of the fluid entering into the stationary element into velocity/kinetic energy, while the rotating element converts or changes the velocity/kinetic energy into mechanical energy/work/power." In a preferred embodiment, the present invention is a bladeless turbine. For the purposes of this disclosure, the term "acute" means "at an angle that ranges from zero (0) to ninety (90) degrees measured from the indicated datum." The angle may be positive or negative with respect to the datum, e.g., up or down, or to one side or another.

Referring first to FIG. 1, a preferred embodiment of turbine engine 10 is presented. In this embodiment, multiple-fluid, multiple-phase, multiple-pressure, multiple-stage turbine engine 10 of the present invention is comprised of at least one turbine rotor 12, which is made up of at least one rotor section 14, at least one turbine shaft 16, turbine body 18, at least one turbine shaft seal 20 and at least one turbine shaft bearing 22. In this embodiment, turbine engine 10 has at least one nozzle 24 which is hydraulically connected by at least one rotor passageway 26 in the turbine rotor 12 to at least one internal shaft passageway 28 in turbine shaft 16. Each internal shaft passageway 28 is connected to at least one rotor passageway 26. FIGS. 107, 108, 180-185, 204, 205, 212 and 218 illustrate other preferred embodiments of the present invention using at least one internal shaft passageway 28. FIGS. 109-118, 120-131, 134, 138, 140-143, 175, 186, 187, 189-193, 196-199, 213-216, 219 and 222-226 illustrate preferred embodiments of the present invention using at least one non-shaft passageway, e.g., first inlet fluid port 70 in FIGS. 109-118, 120-131, 134, 138 and 140-143. FIGS. 119, 132, 133, 135, 136, 139, 144-174, 176-179, 188, 194, 195, 200-203, 206-211 and 217 illustrate preferred embodiments of the present invention using at least one internal shaft passageway 28 and at least one non-shaft passageway. Turbine axis 30 may or may not be aligned with turbine shaft axis 32. Each nozzle 24 is preferably mounted at, on, at a distance from (through connecting passageway(s)), integral with and/or recessed in a rotor perimeter 64 or a rotor radial surface 66.

Figure 2:
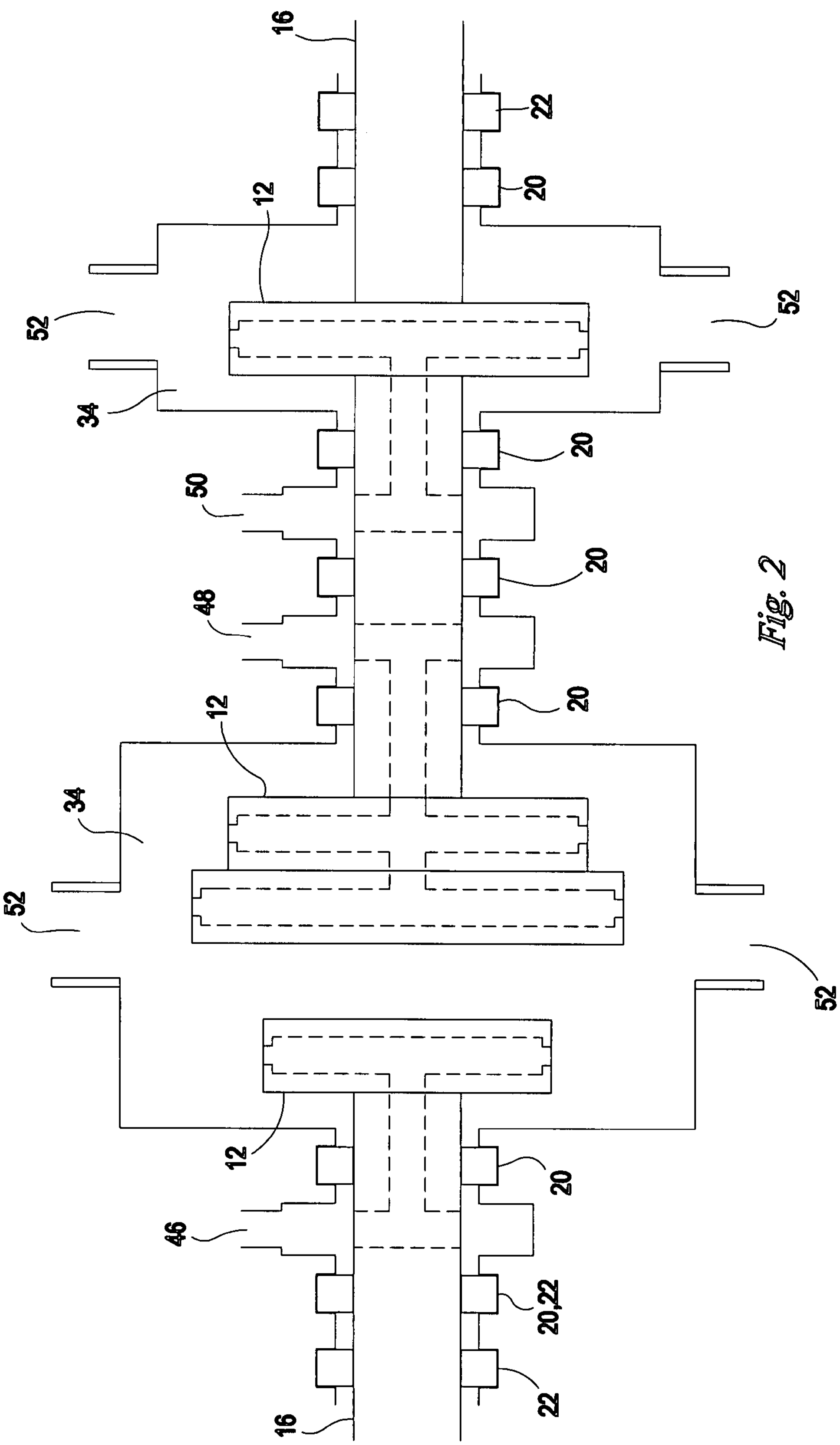
FIG. 2 is a cross-sectional view of the turbine engine of another preferred embodiment of the invention.
Figure 4:
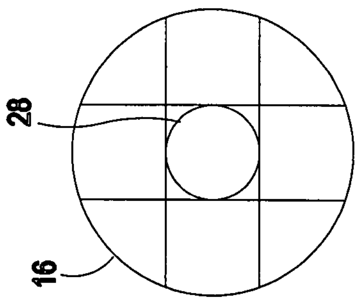
FIG. 4 is a cross-sectional view of the turbine shaft of FIG. 3.
Figure 3:
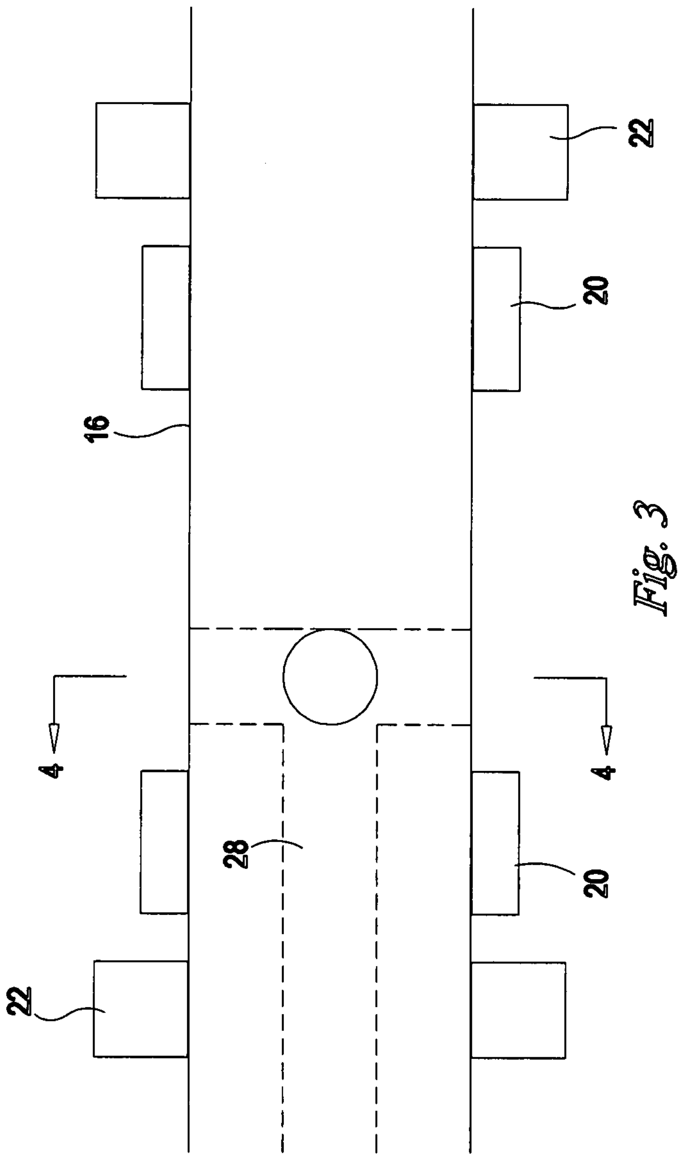
FIG. 3 is a cross-sectional view of the turbine shaft of a preferred embodiment of the invention.

Referring again to FIG. 1, turbine rotor 12 is contained within turbine cavity or turbine chamber 34 of turbine body 18. Turbine chamber 34 preferably serves the primary function of collecting the fluid(s) exiting each nozzle 24, or set(s) of nozzles. As such, for a turbine engine with one or more turbine rotors, turbine chambers are preferably provided as follows: (1) one turbine chamber for each turbine rotor 12, as illustrated in FIG. 1, for example, (2) one turbine chamber for two or more turbine rotors, as illustrated in FIG. 2, for example, or (3) a combination thereof, also as illustrated in FIG. 2, for example.

In preferred embodiments, turbine body 18 is generally rounded, but is not necessarily circular (depending upon the turbine application), with a general appearance of that of a hollow tube that is enclosed at both ends. Referring again to FIG. 1, the tube-like portion of the turbine body is called the casing or shell section 36. Each end of turbine body 18, called casing or shell section end 38, generally matches the cross-sectional profile of turbine body 18 at the connection point of the shell section ends and shell section 36. The shell section ends may or may not be designed such that the turbine shaft penetrates the shell section ends and exposes turbine shaft 16 to environments and/or conditions external to turbine body 18. For designs in which turbine shaft 16 does not penetrate the shell section ends, a non-invasive shaft and coupling design (e.g., a magnetic coupling 40) may be used to transmit the mechanical work and/or power energy of turbine shaft 16 to an external user of the mechanical work and/or power energy, such as a generator, pump, gearing assembly, or any other device or user of the turbine engine output energy or mechanical energy.

Figure 12:
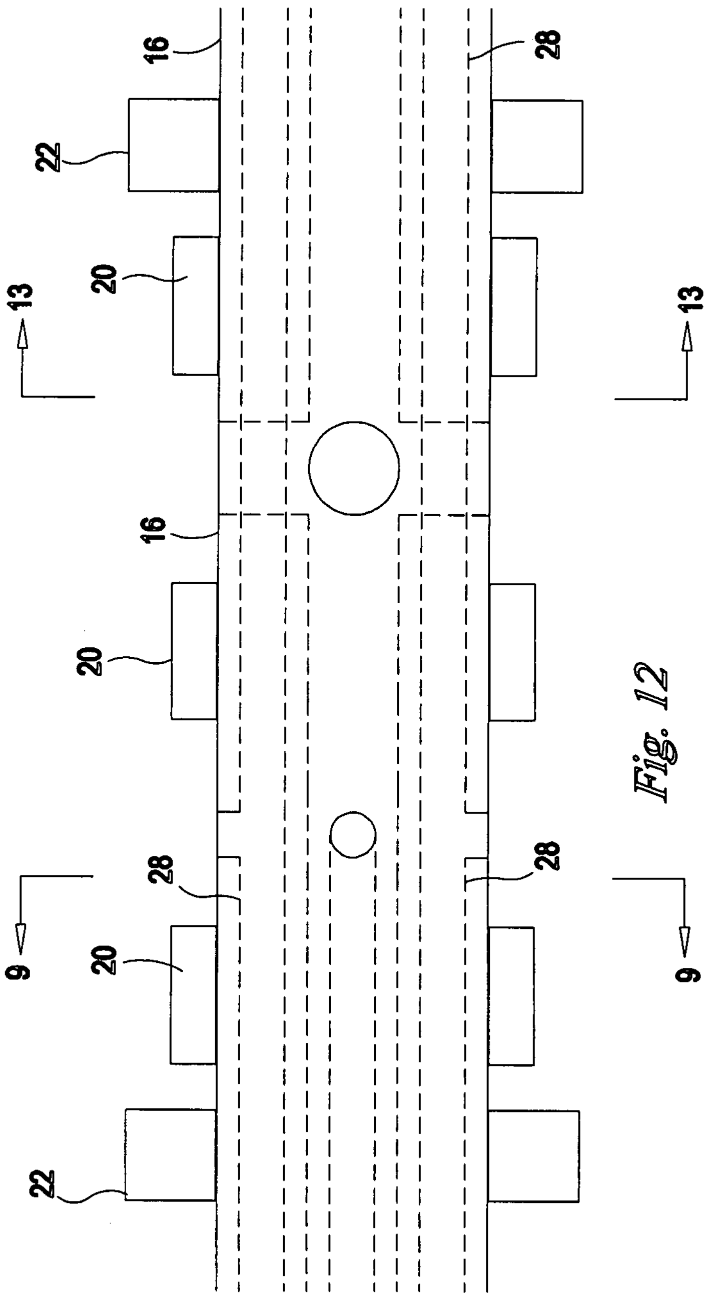
FIG. 12 is a cross-sectional view of the turbine shaft of another preferred embodiment of the invention.
Figure 14:
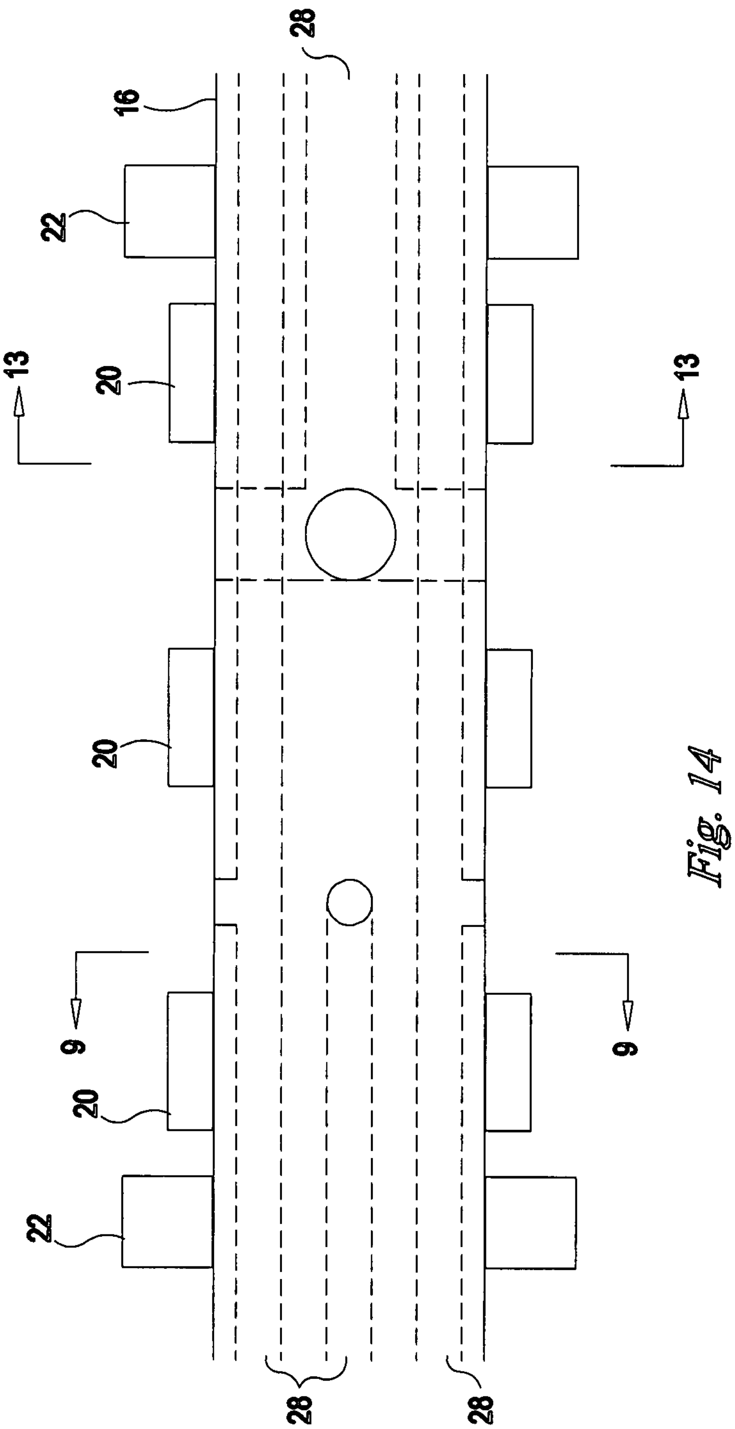
FIG. 14 is a cross-sectional view of the turbine shaft of another preferred embodiment of the invention.
Figure 16:
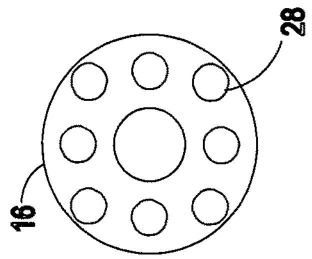
FIG. 16 is a cross-sectional view of the turbine shaft of FIG. 15.

In preferred embodiments, the internal shaft passageways have differing configurations relative to each bearing 22 and shaft 20. Referring to FIGS. 3 through 17, turbine shaft 16 is tubular, hollow, perforated or in some other way permissive of fluid passage, or combination thereof, with one or more than one internal shaft passageway 28. Shaft passageway center lines may be located (1) at the centerline of turbine shaft 16, (2) at a centerline parallel to, but offset from, the centerline of turbine shaft 16, (3) at a centerline non-parallel to the centerline of turbine shaft 16, or (4) a combination thereof. Shaft passageway(s) may extend over the full length of turbine shaft 16 or over a portion of the length, or a combination of both for two or more passageways. Shaft passage way(s) may travel to and through one end of turbine shaft 16, both ends of turbine shaft 16, a combination thereof, or a portion thereof, as illustrated in FIGS. 12 and 14. The cross-section of the turbine shaft passageway(s) may be circular, non-circular, or a combination thereof.

Figure 109:
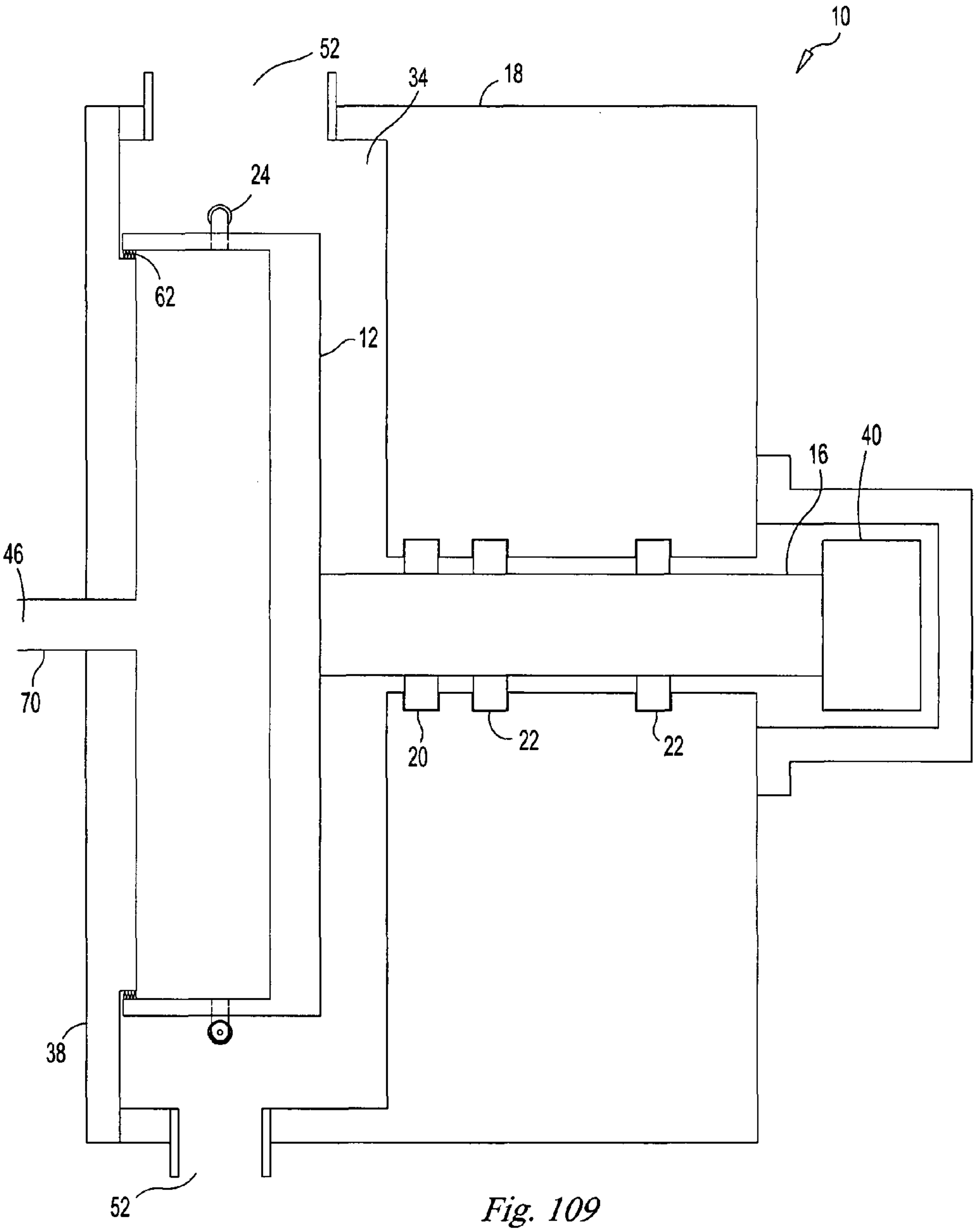
FIGS. 109-111 are cross-sectional views of other preferred single stage turbine shaft and rotor embodiments of the invention.
Figure 110:
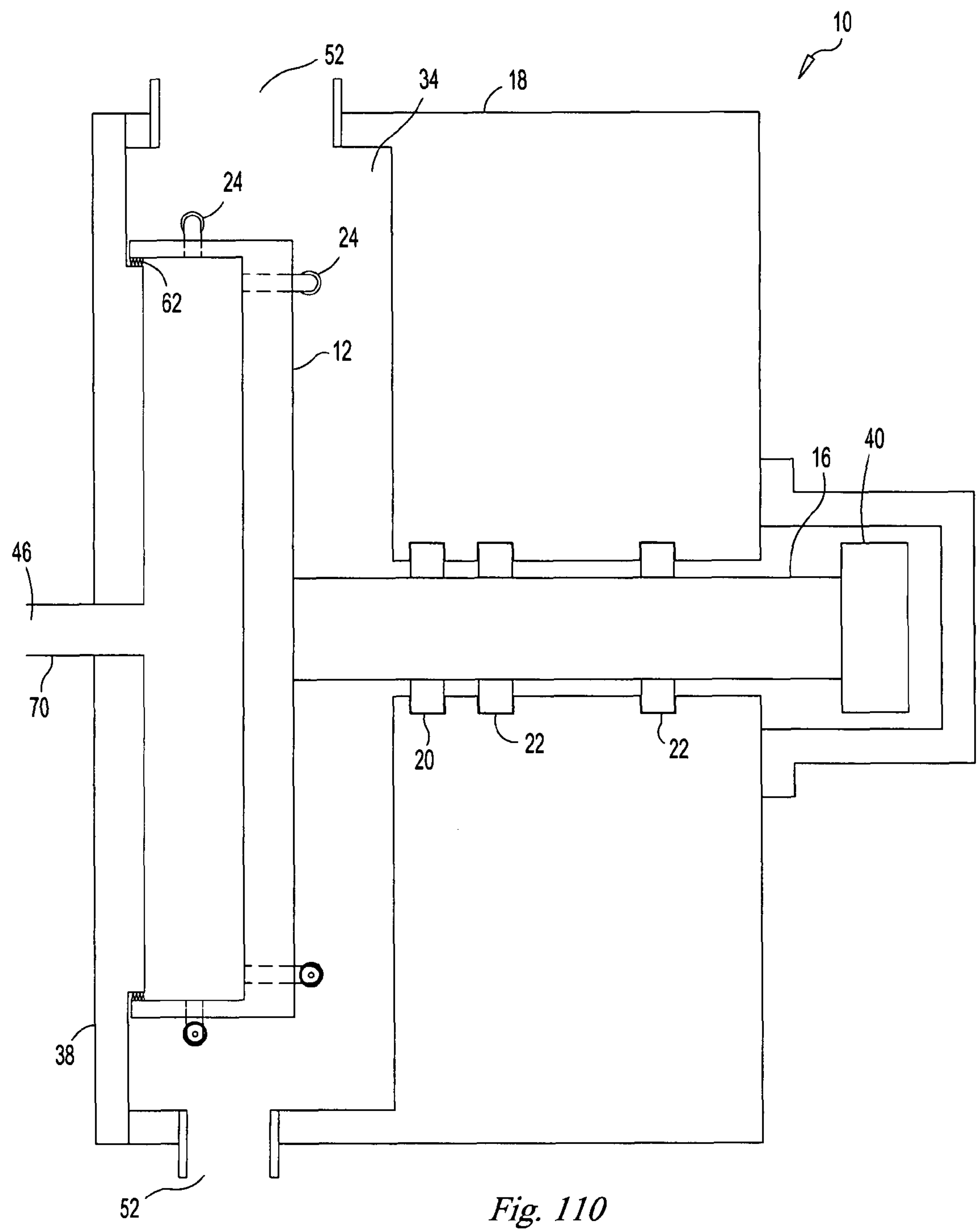
Figure 111:
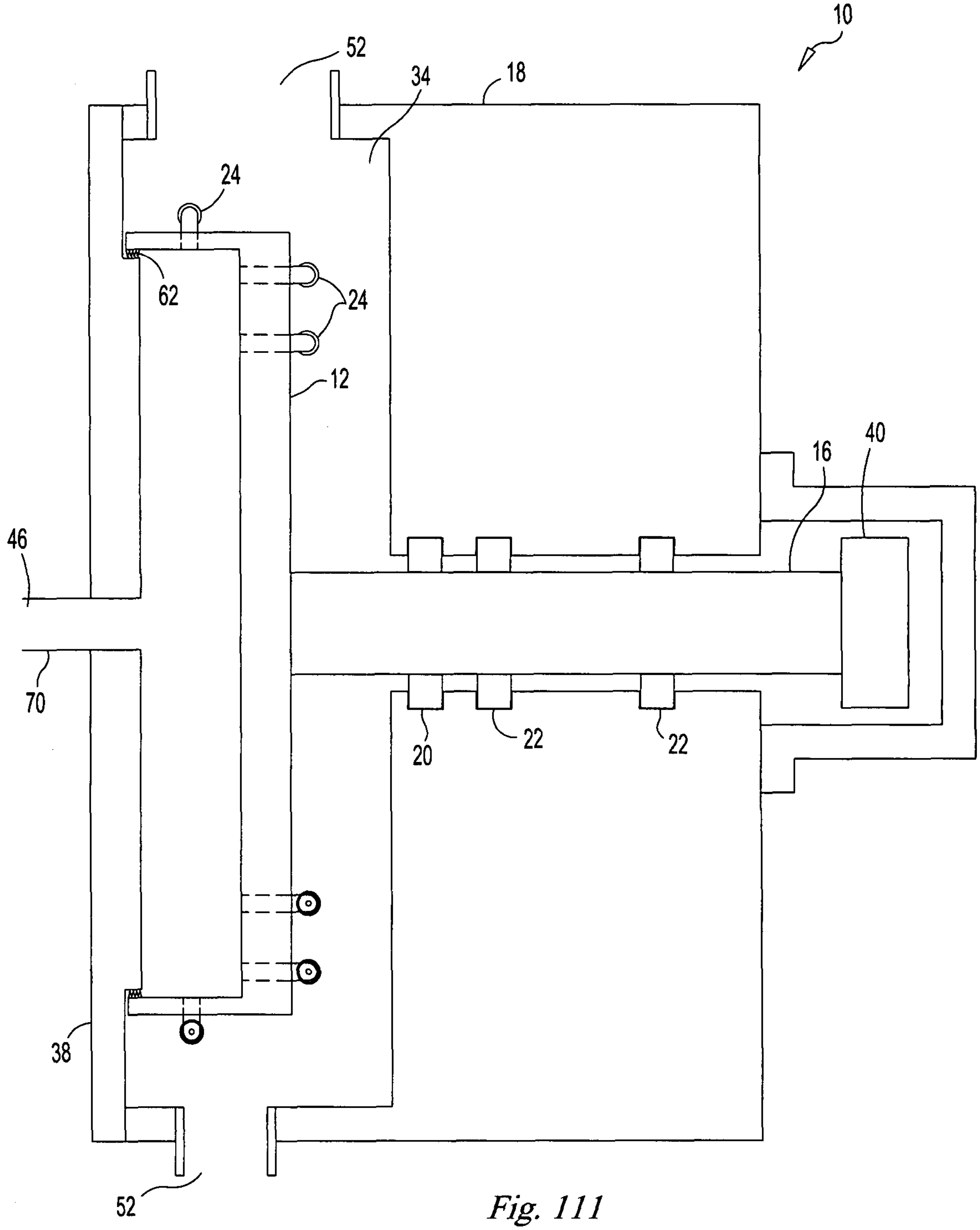
Figure 112:
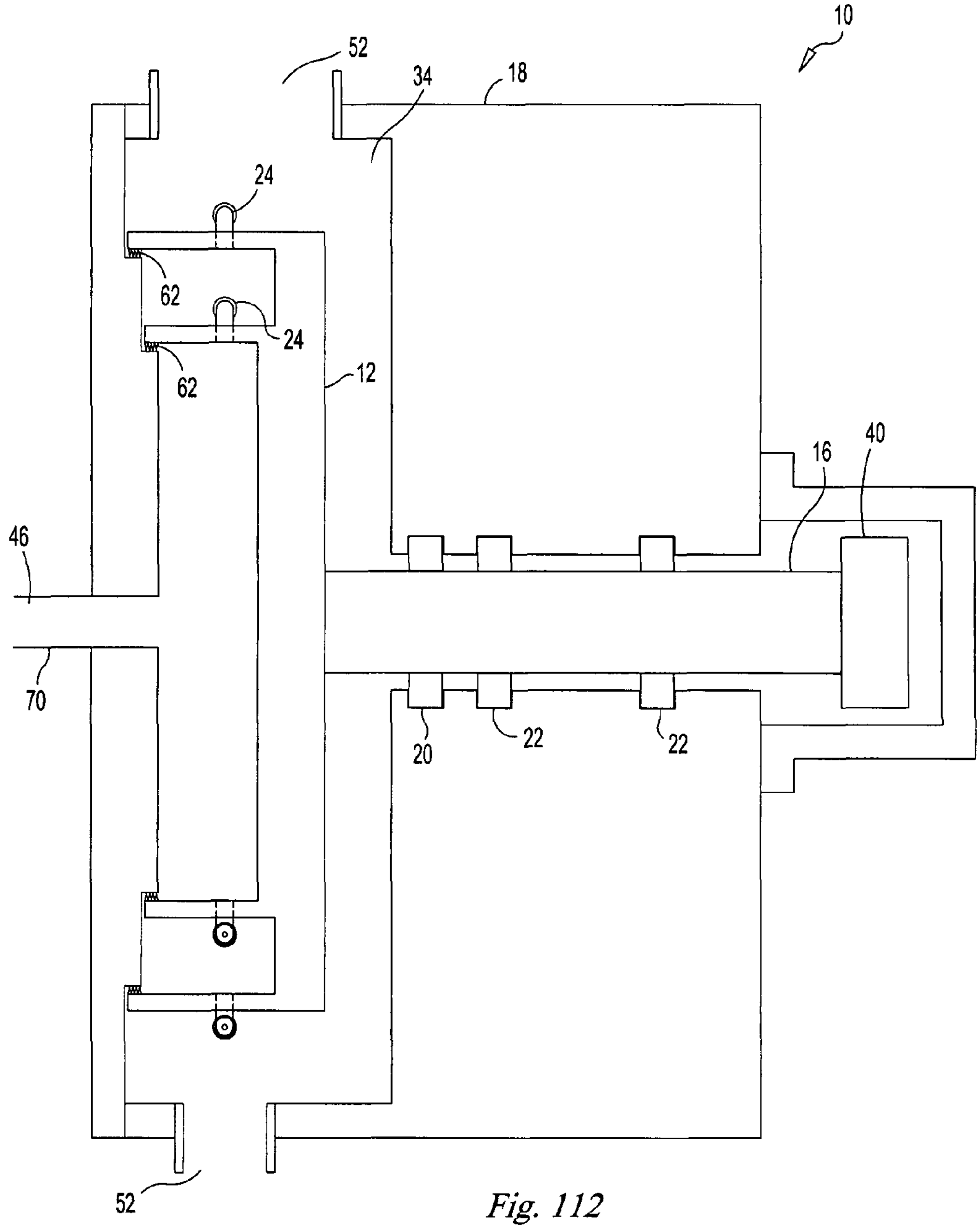
FIGS. 112-115 are cross-sectional views of other preferred pressure-compound embodiments of the invention.
Figure 113:
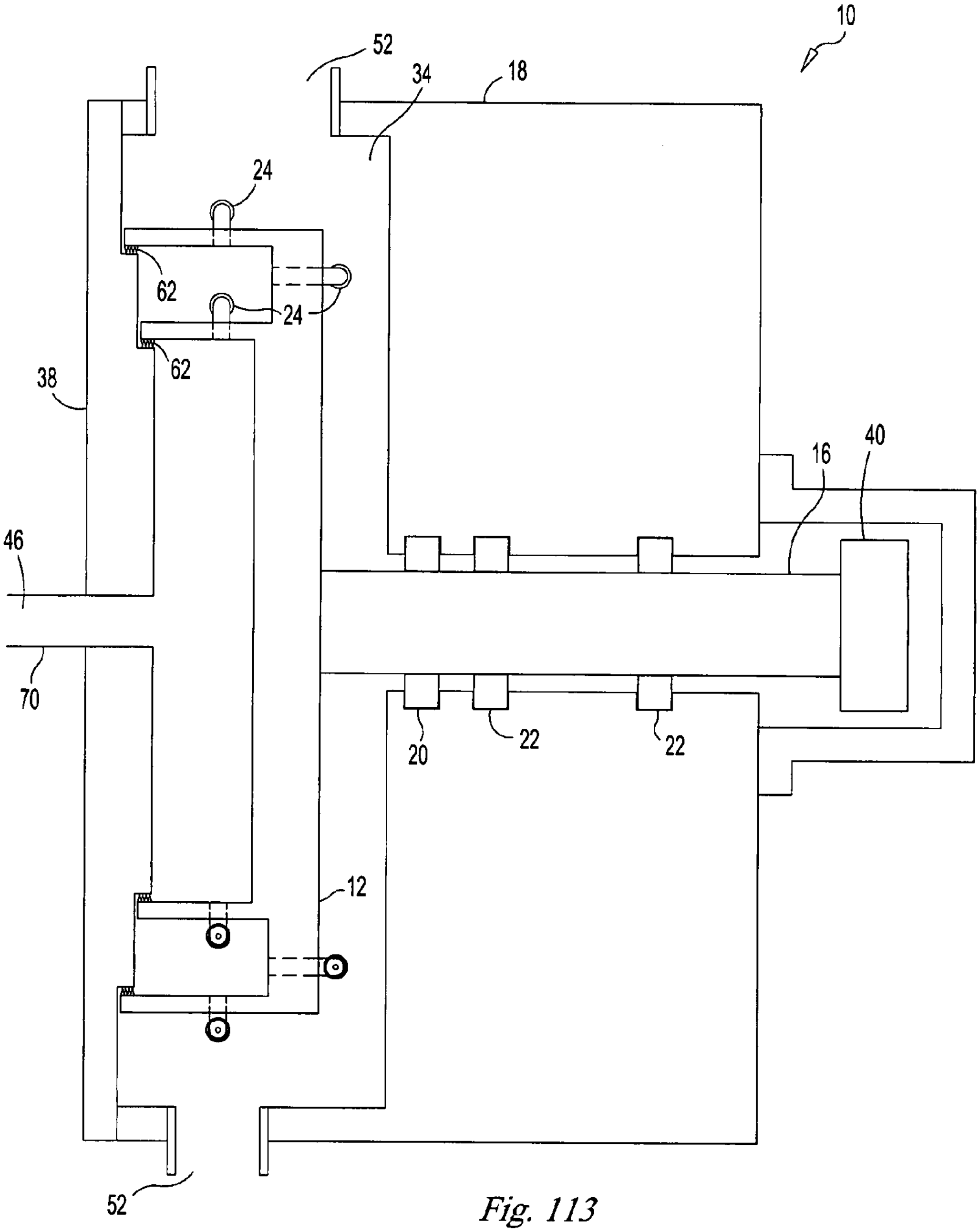
Figure 114:
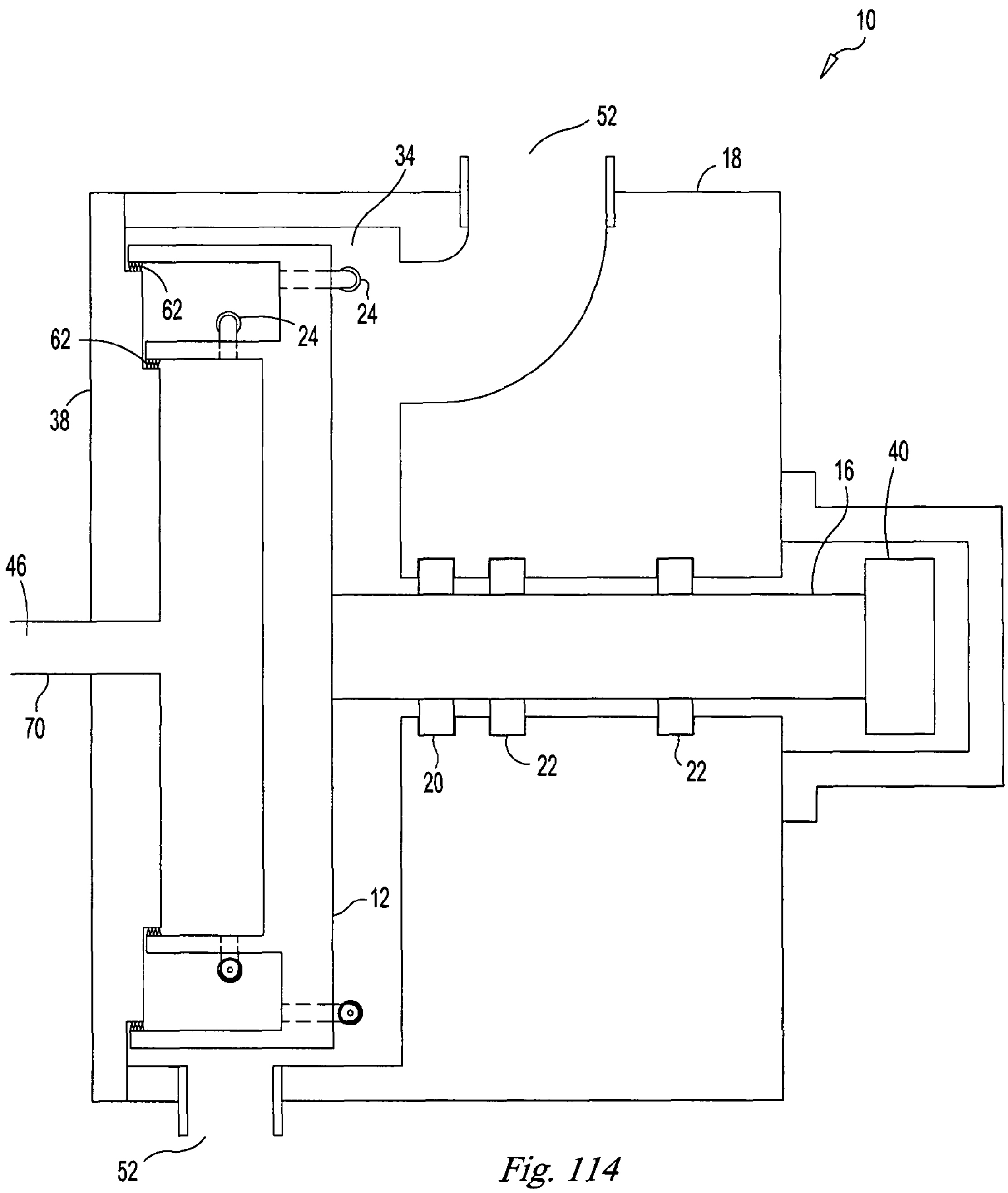
Figure 115:
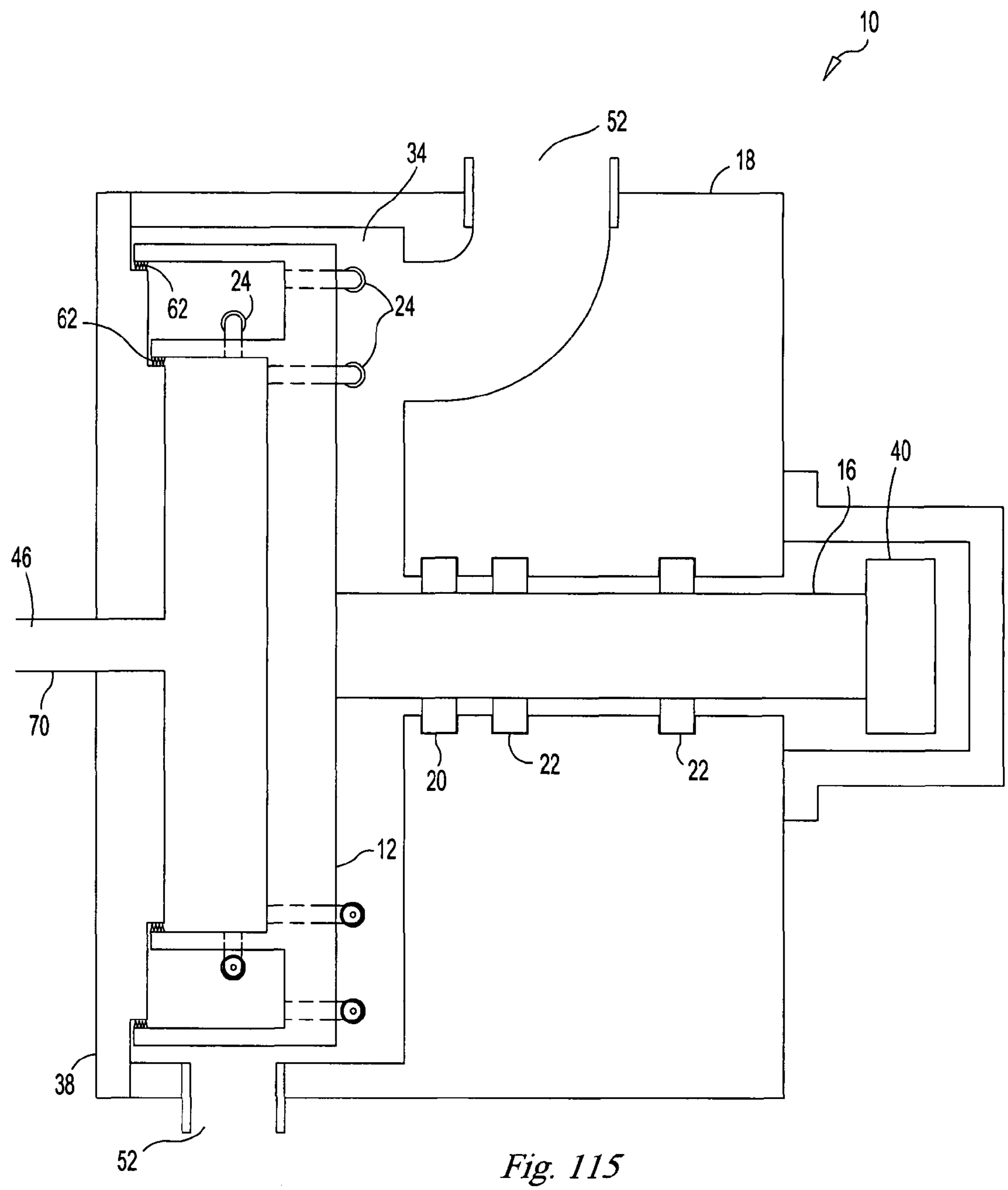
Figure 141:
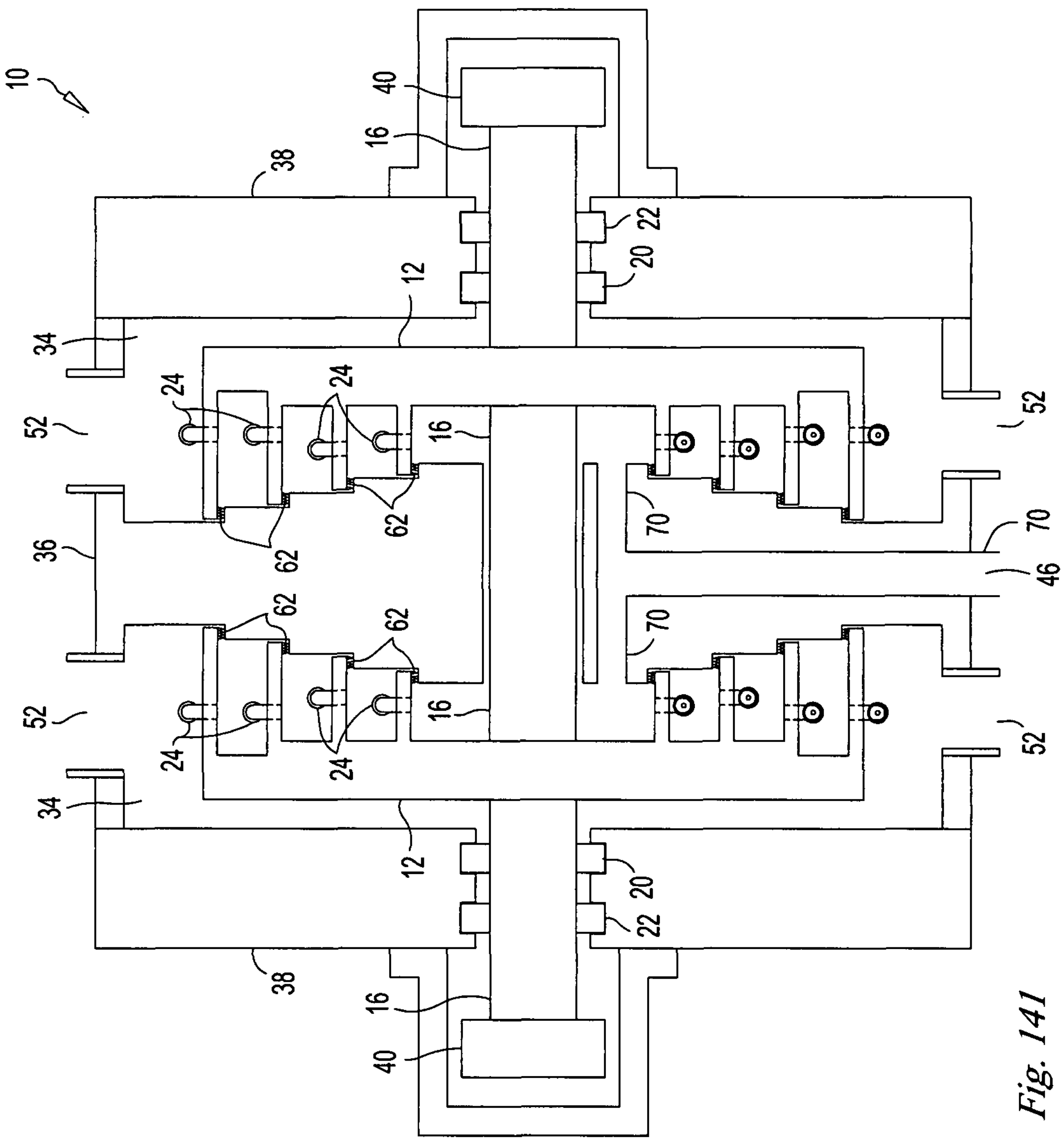
Figure 142:
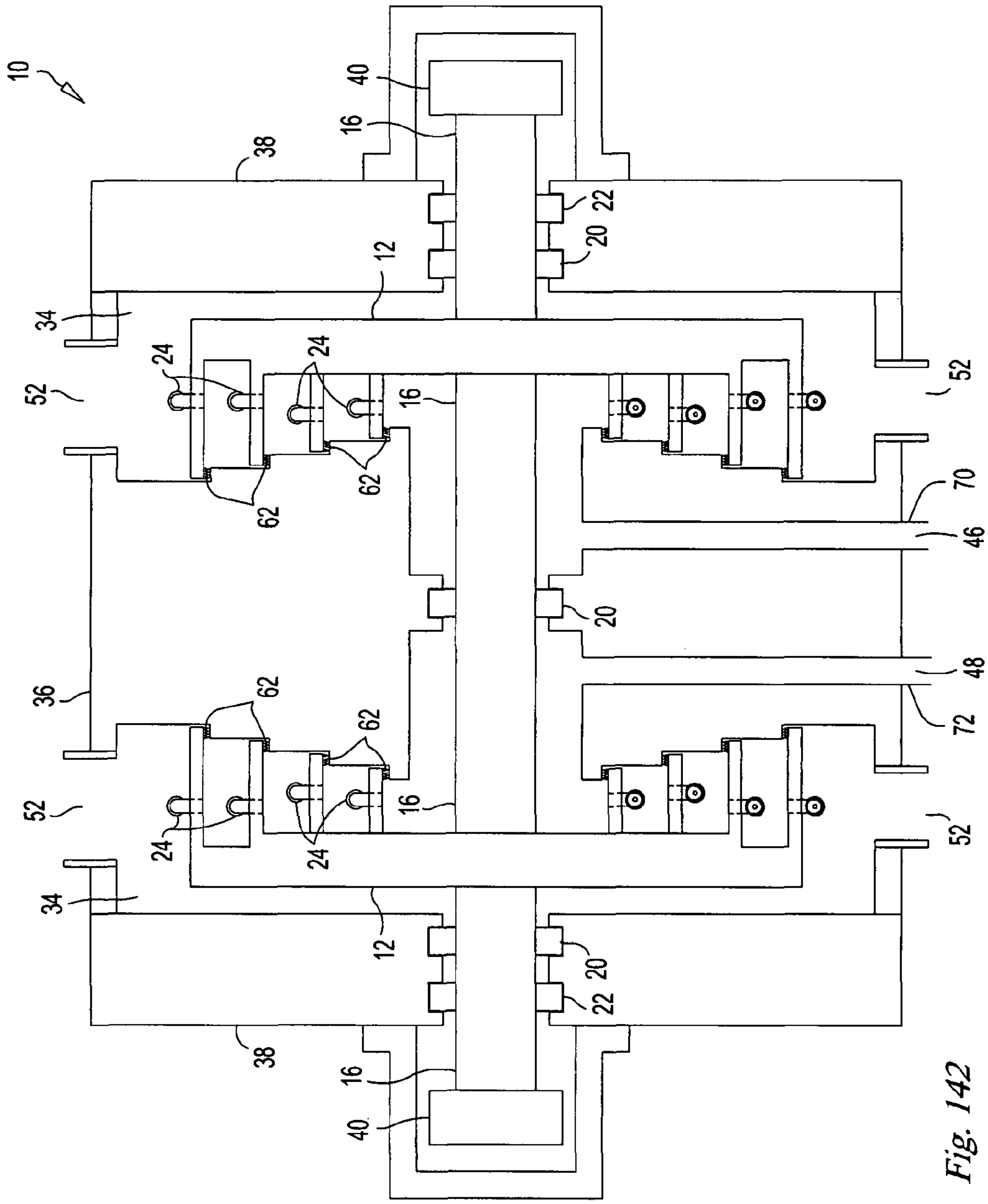
Figure 143:
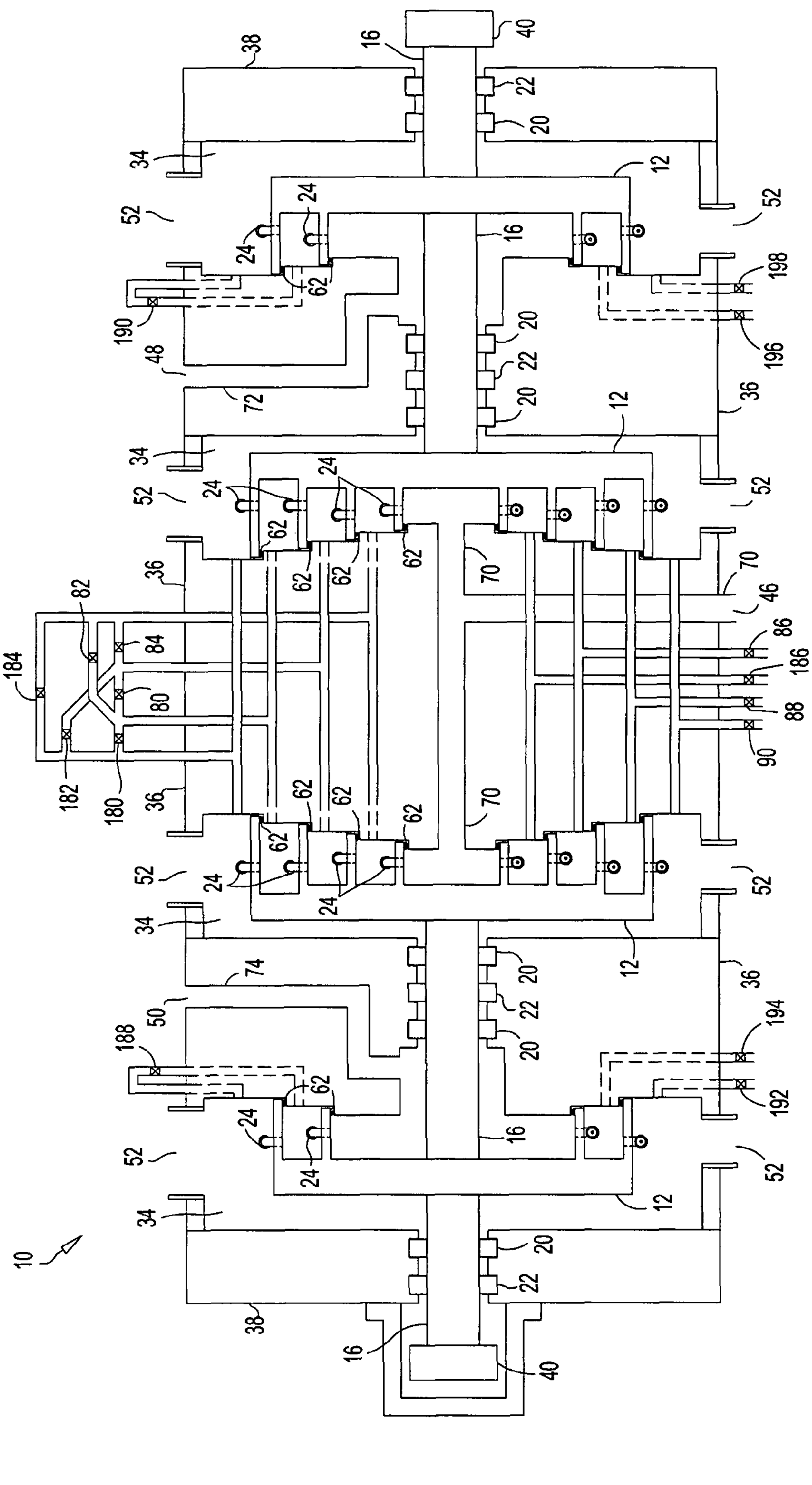
Figure 144:
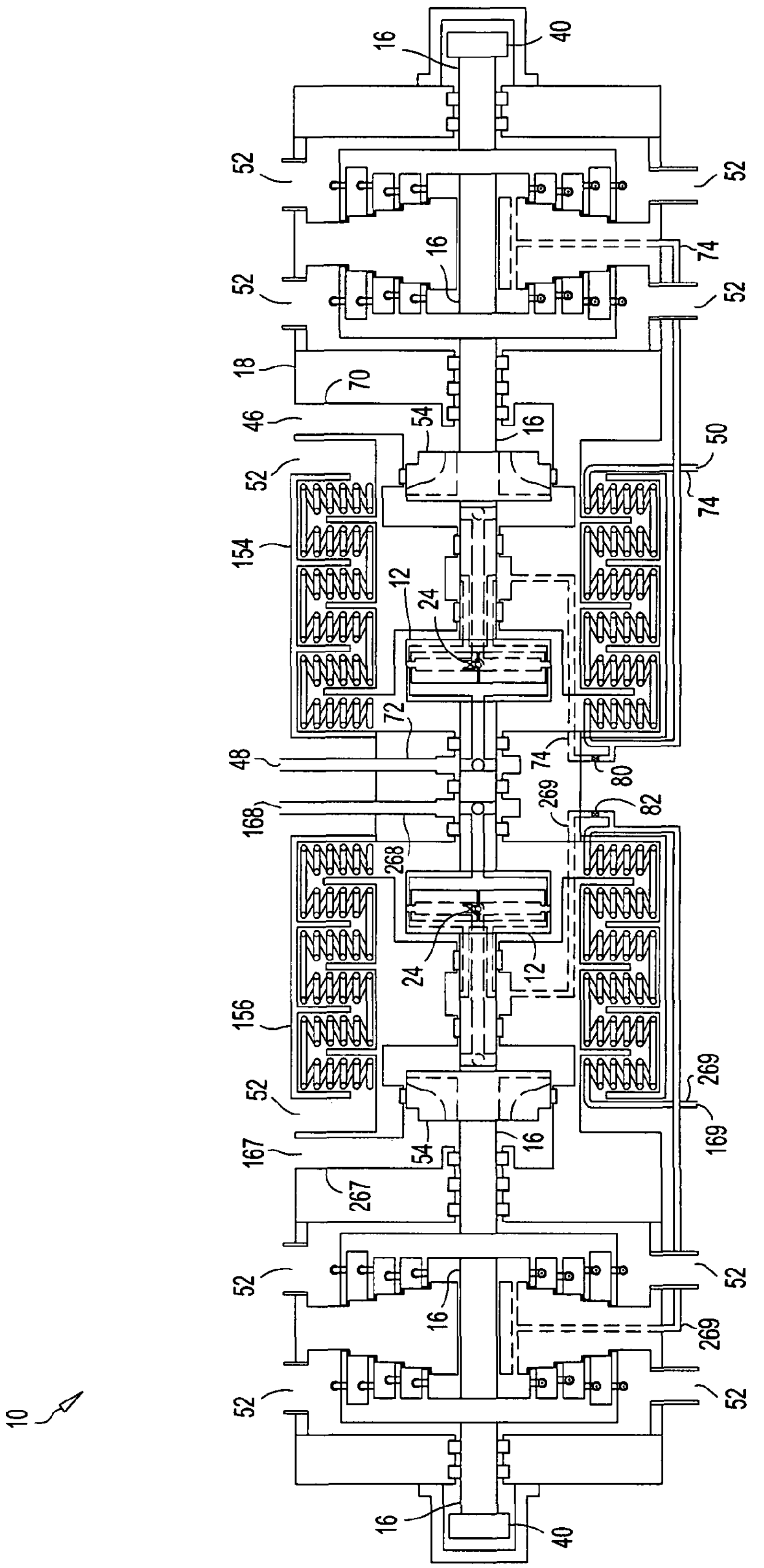
FIGS. 144-164 are cross-sectional views of preferred combined cycle embodiments of the invention.
Figure 145:
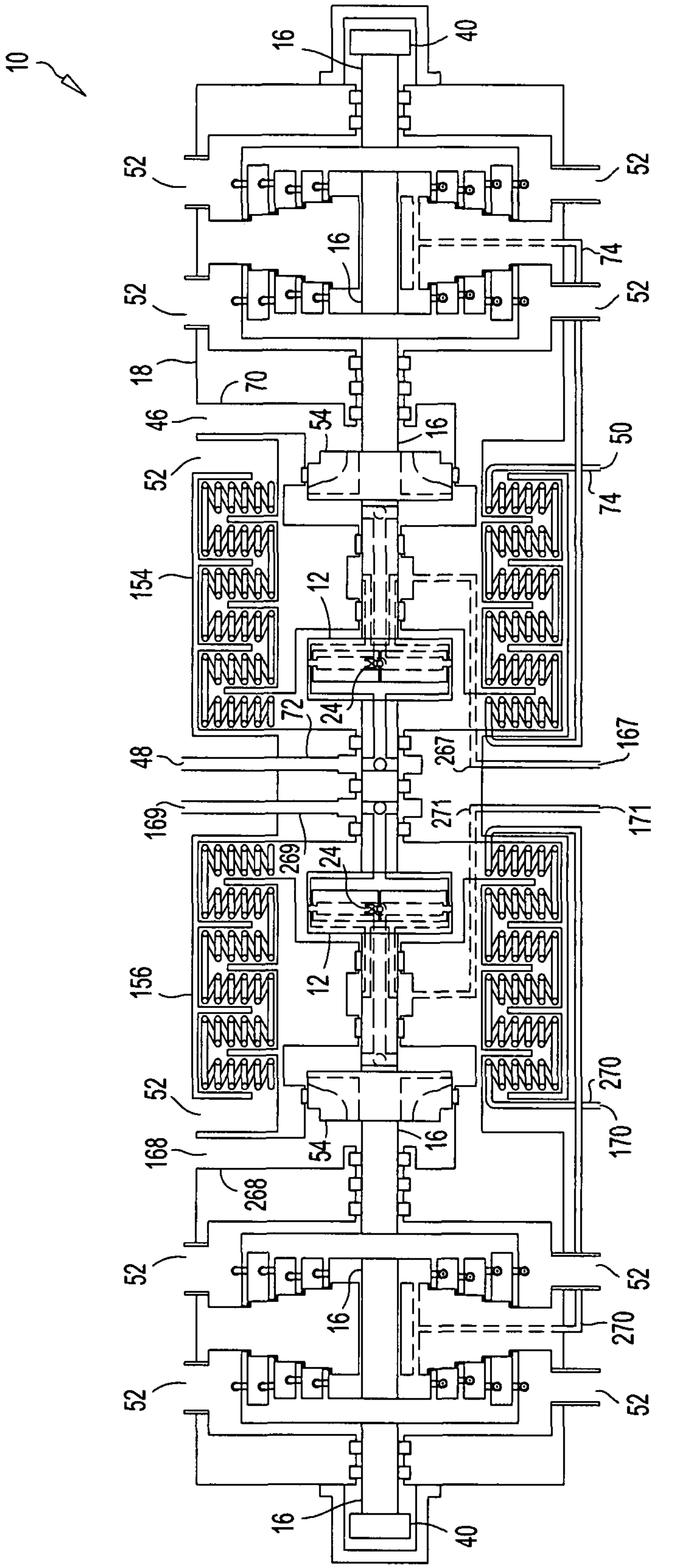
Figure 146:
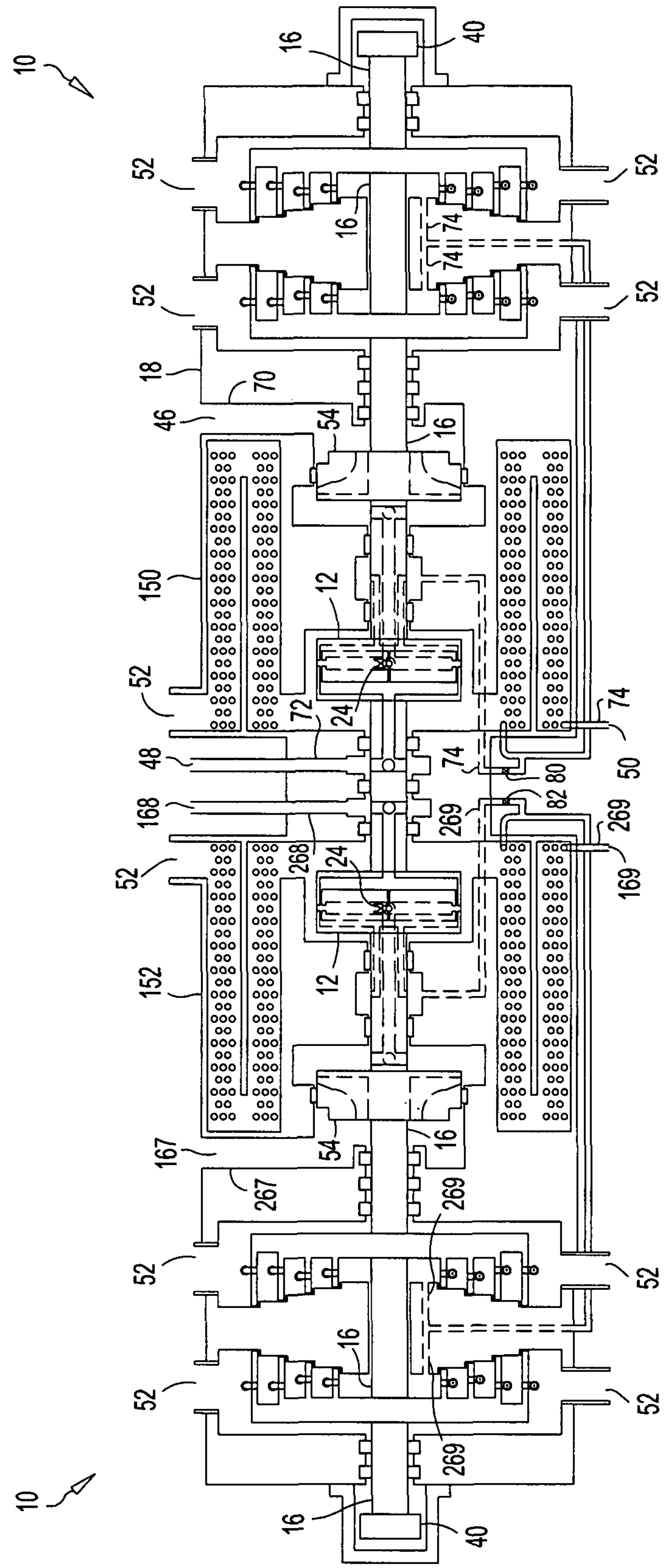
Figure 147:
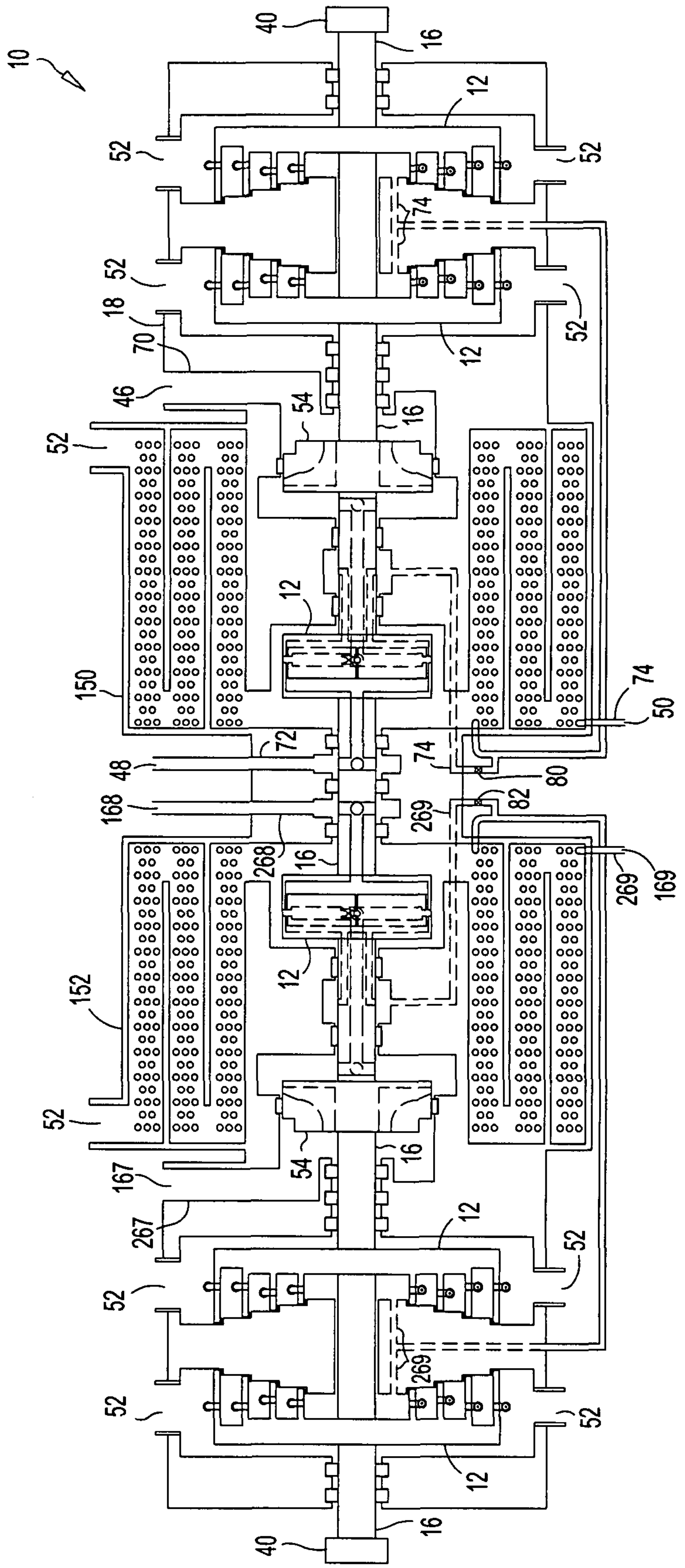
Figure 199:
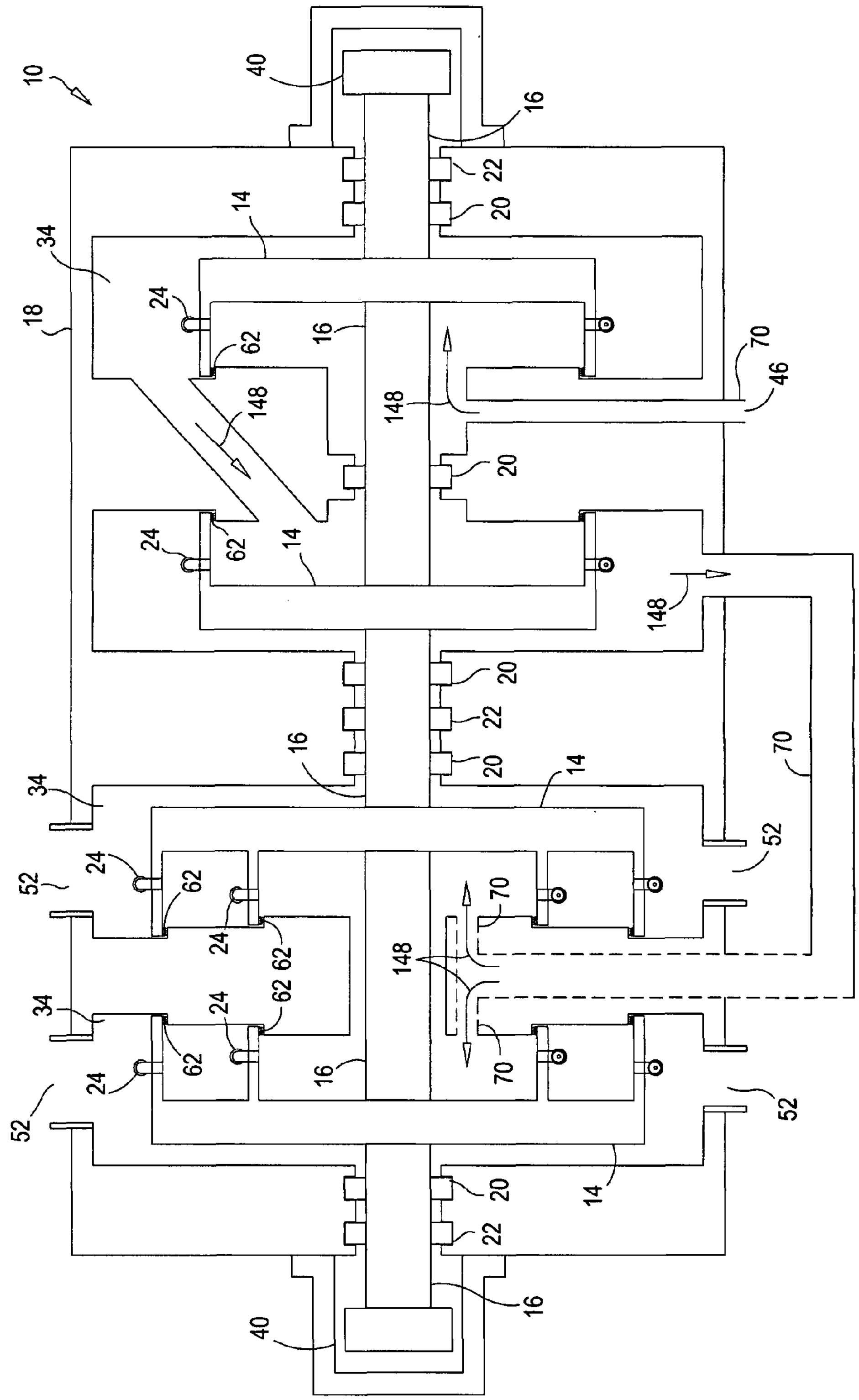
Figure 200:
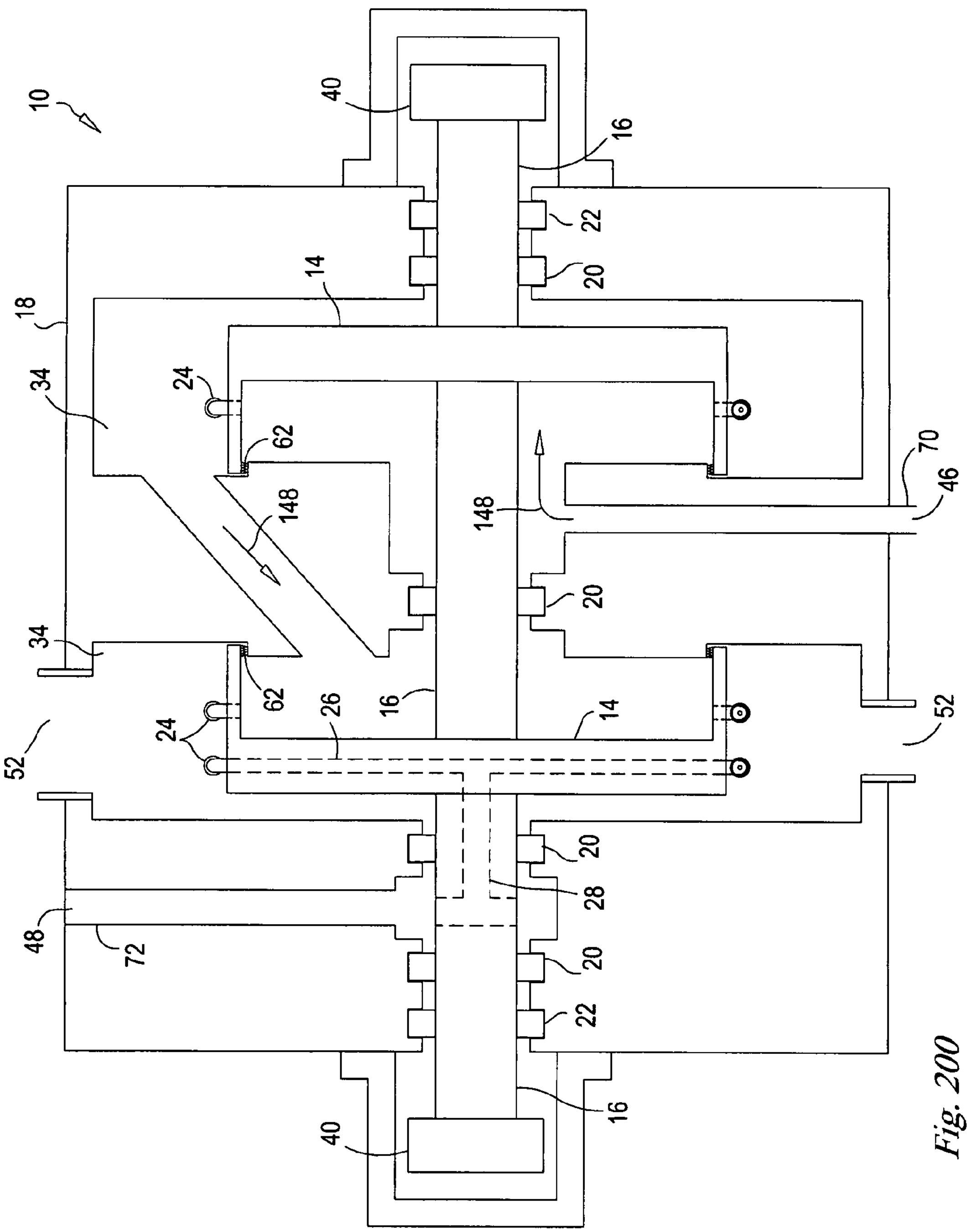
Figure 201:
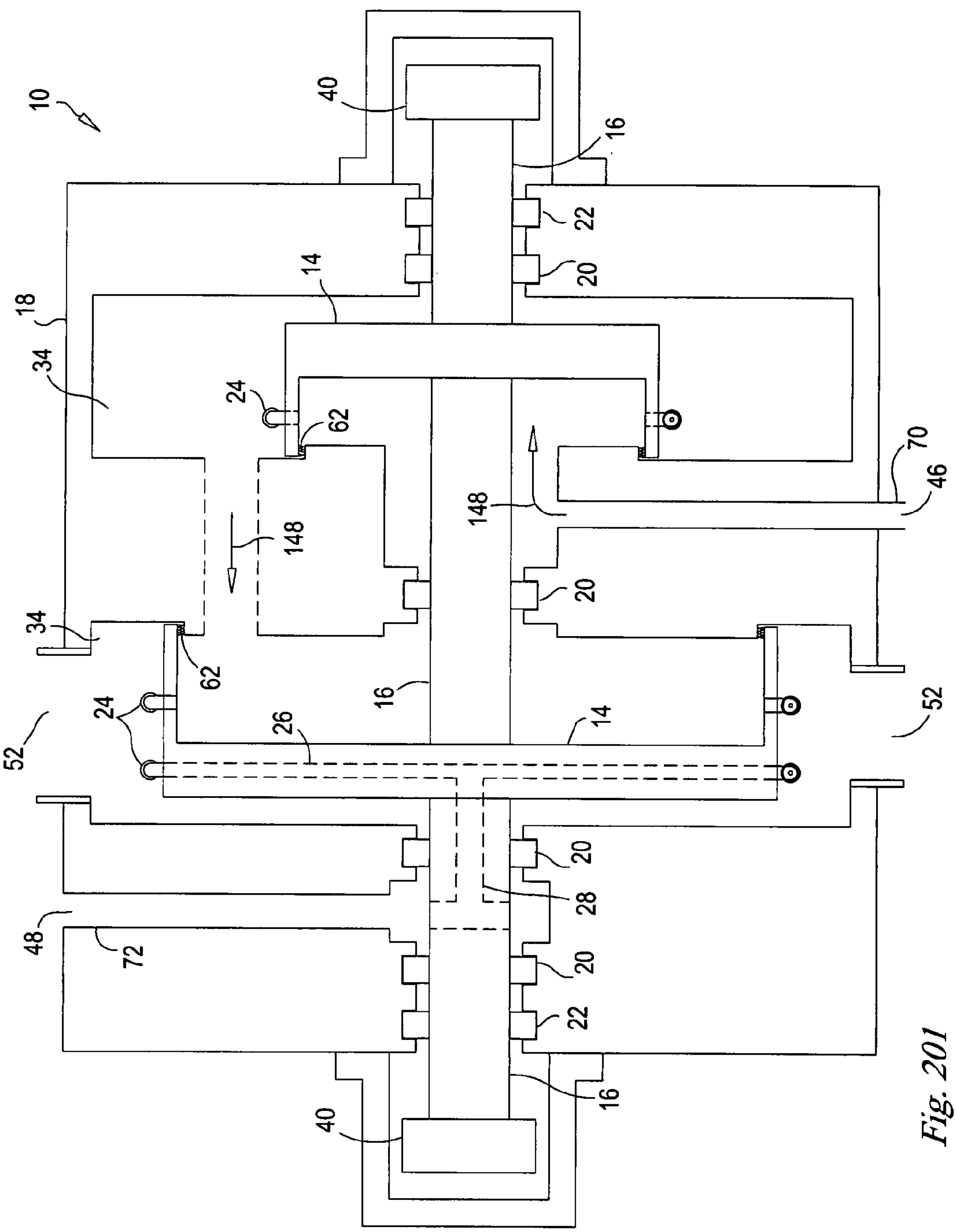
Figure 202:
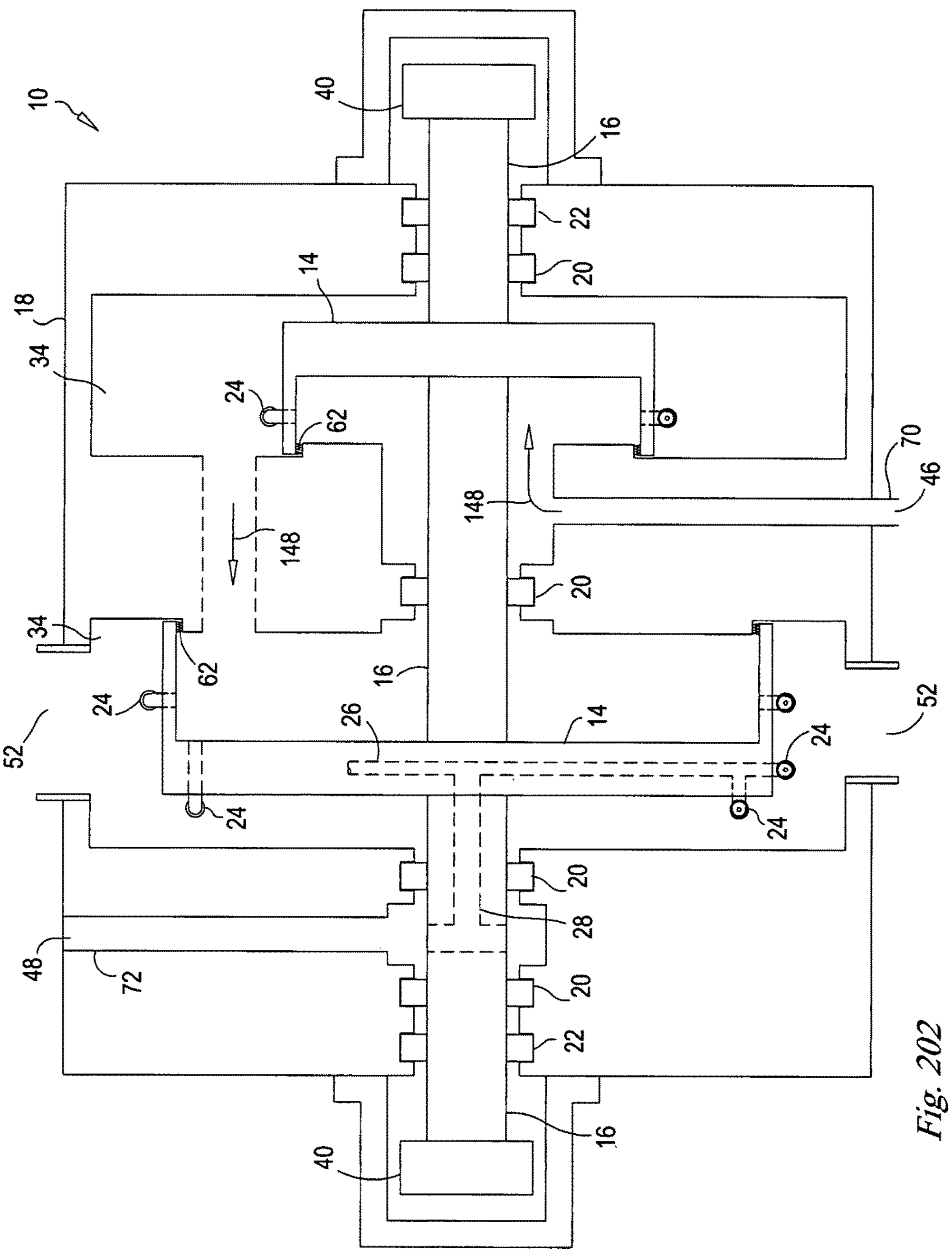
Figure 203:
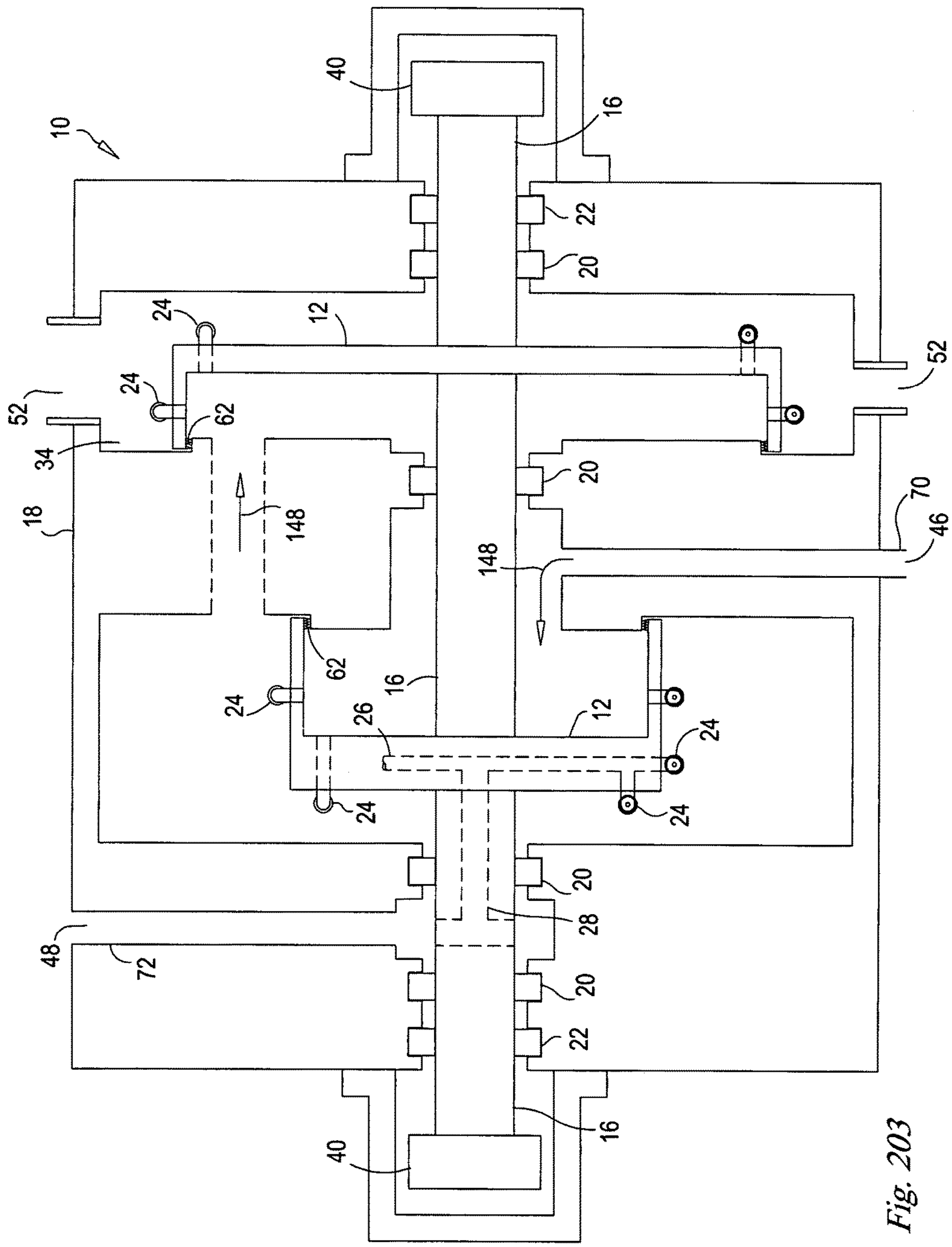
Figure 204:
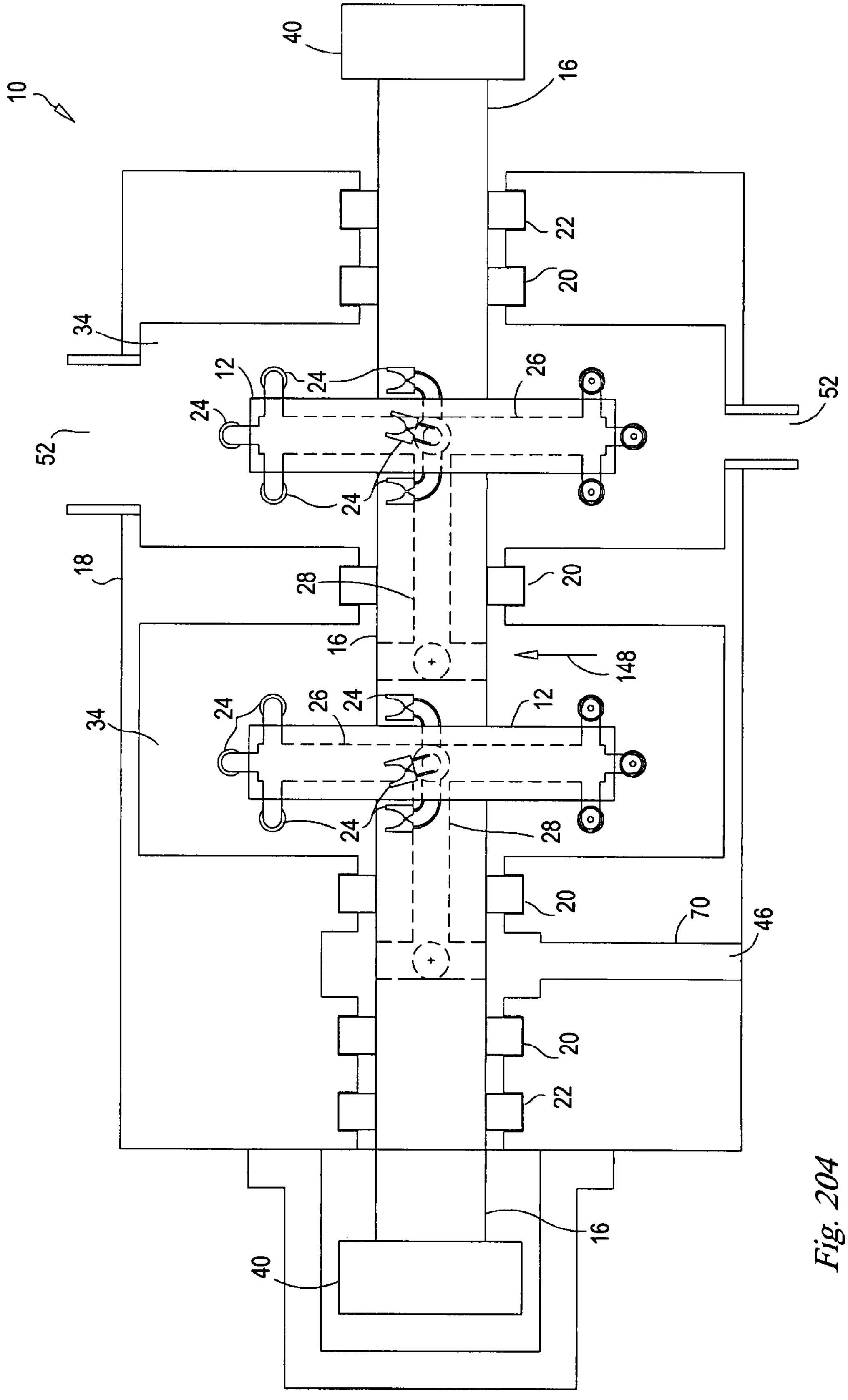
Figure 205:
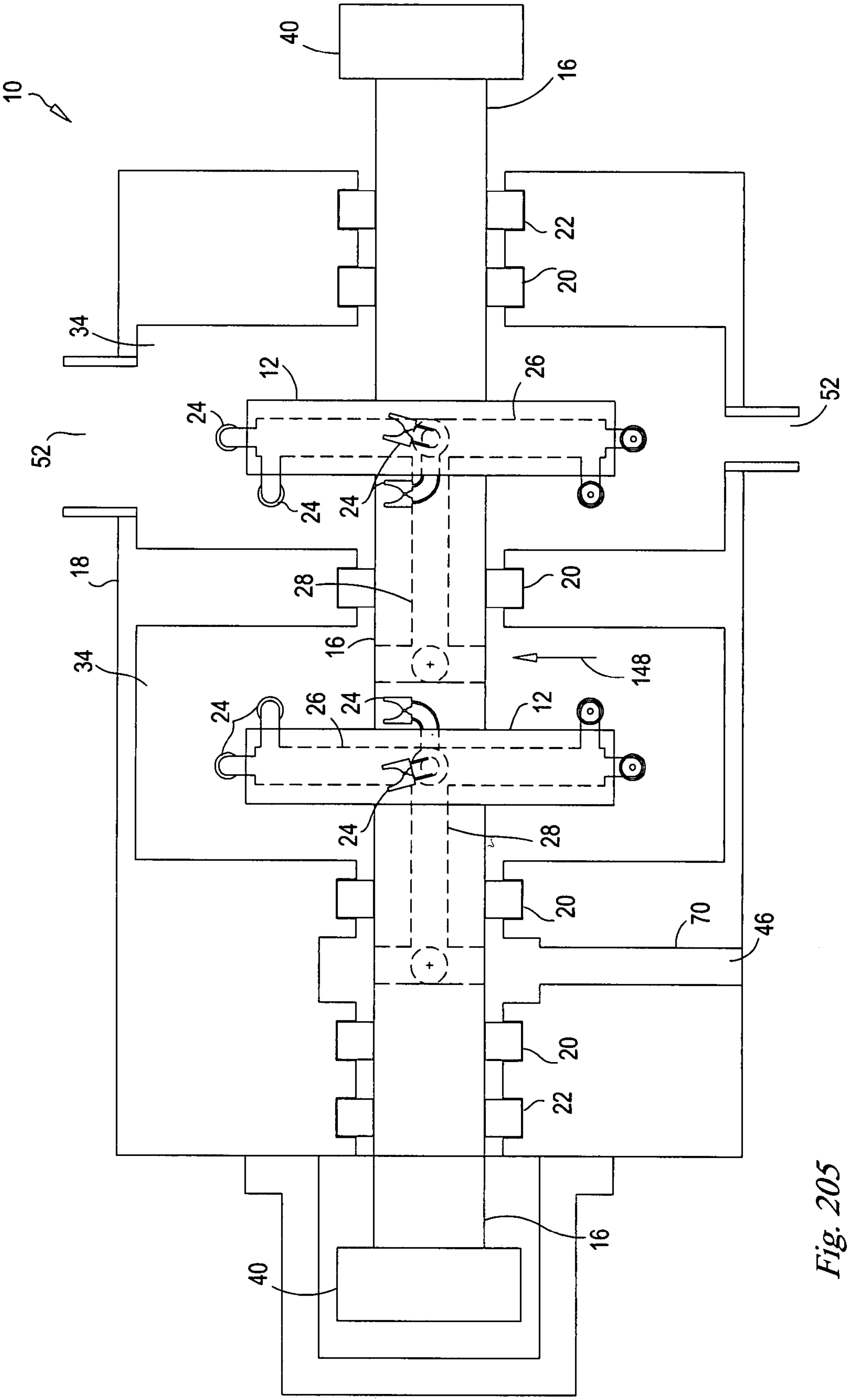
Figure 206:
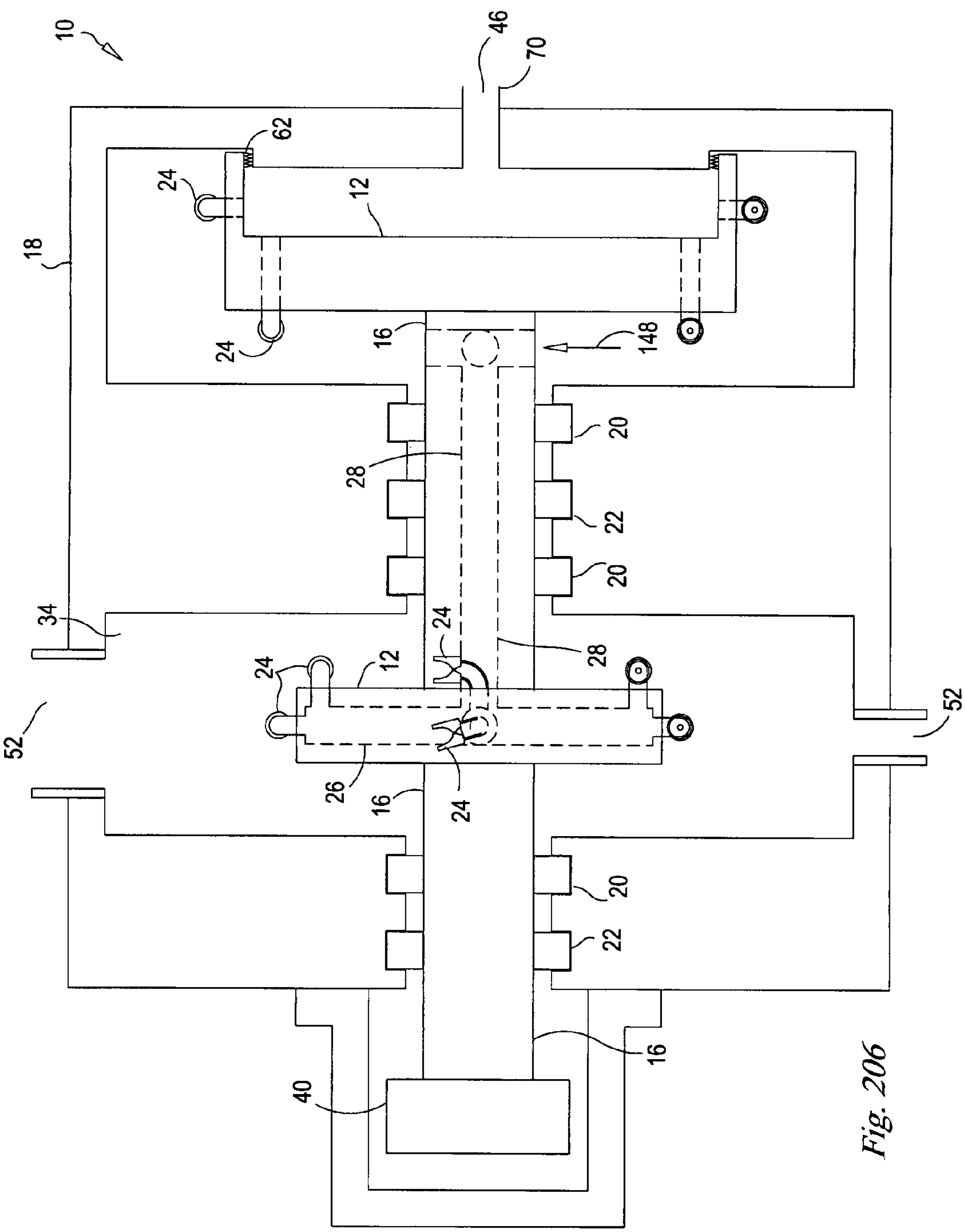
Figure 207:
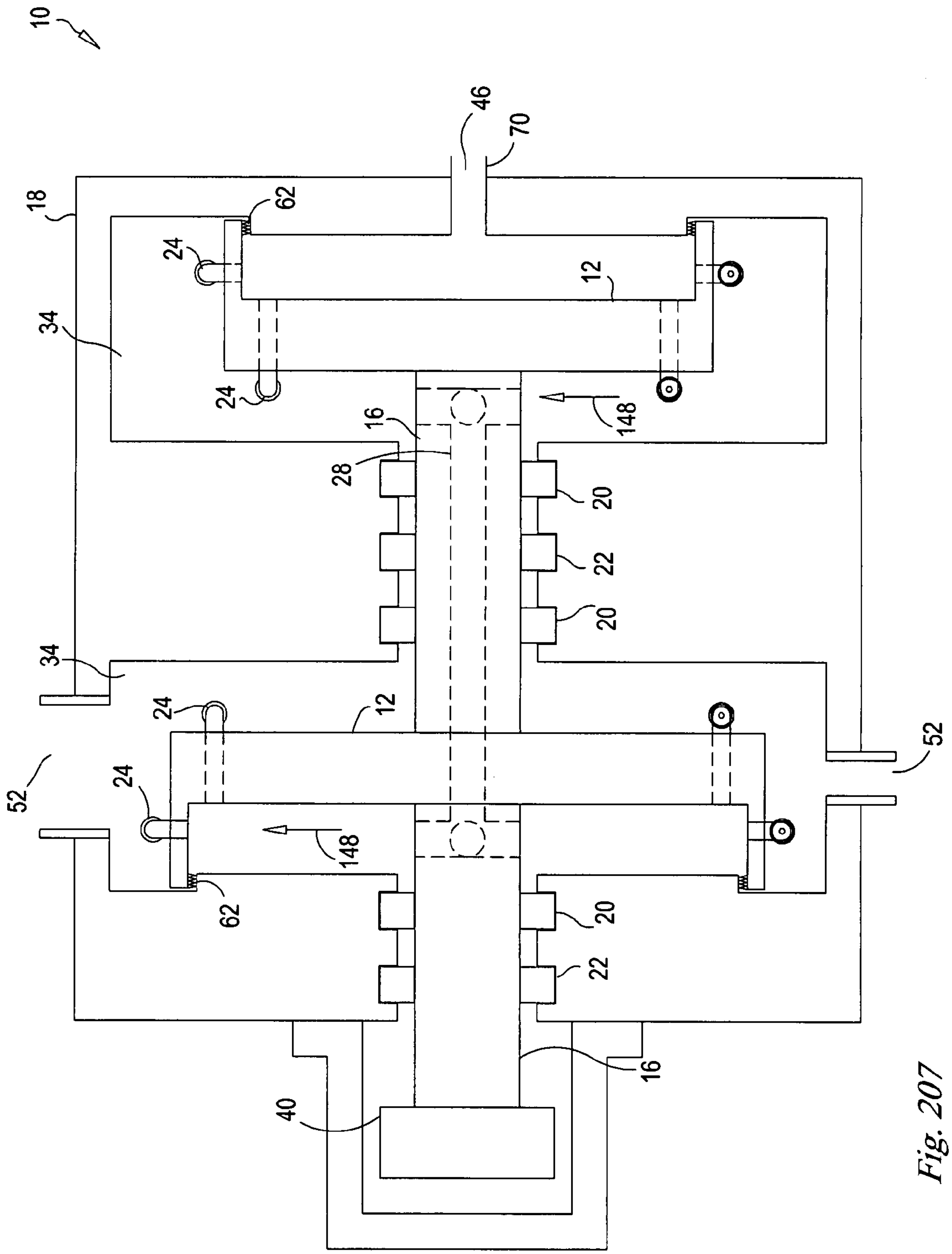
Figure 208:
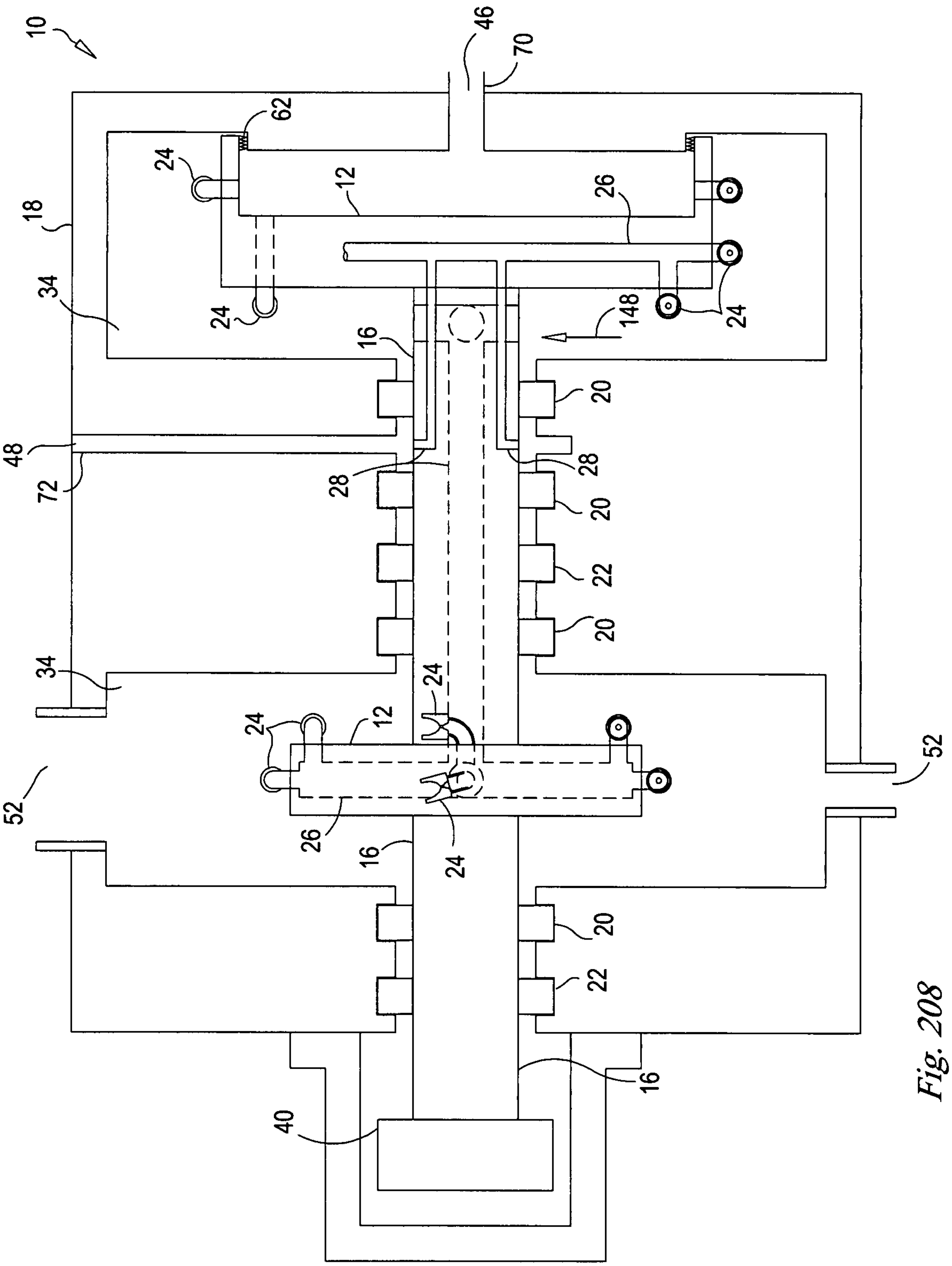
Figure 209:
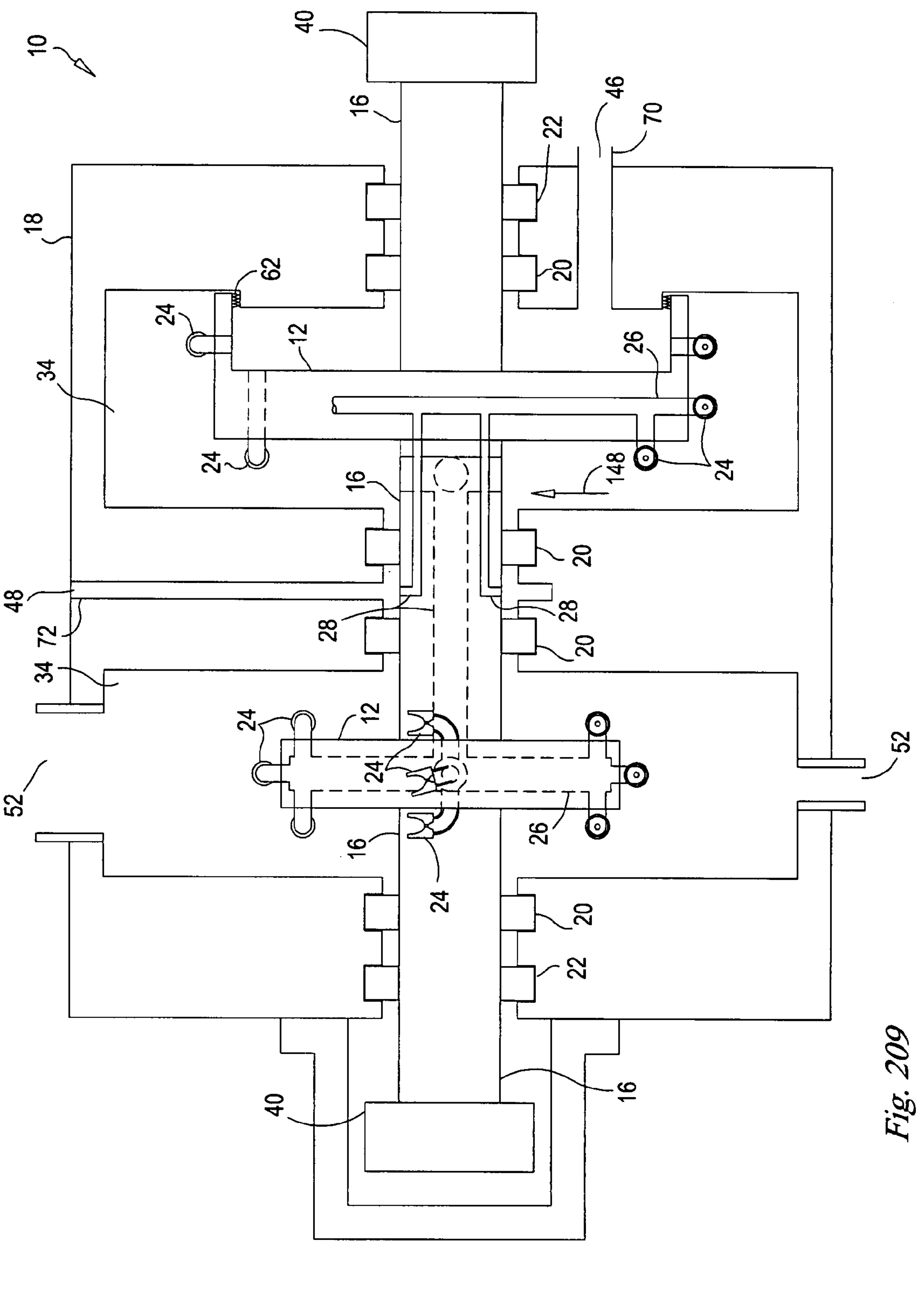
Figure 210:
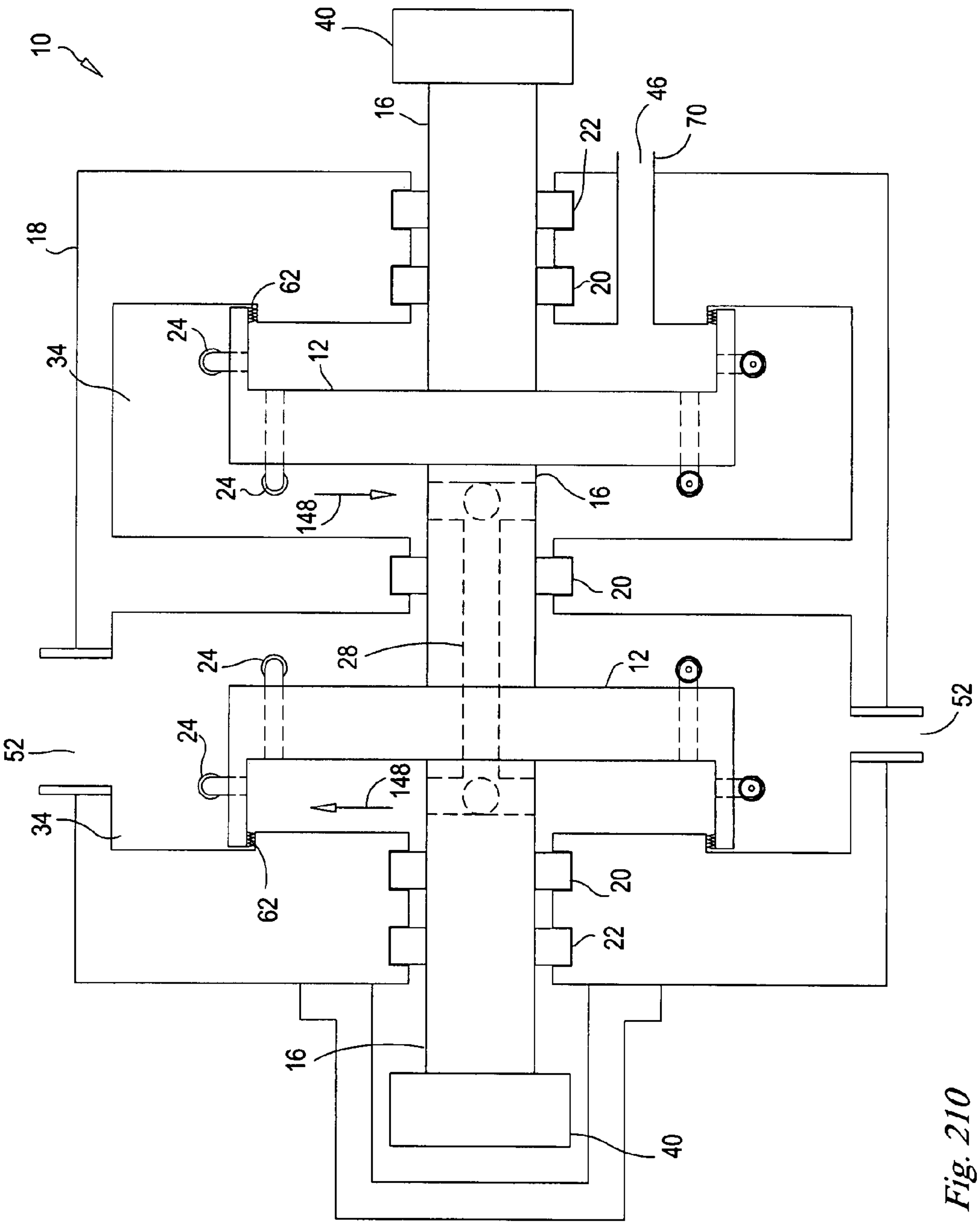
Figure 211:
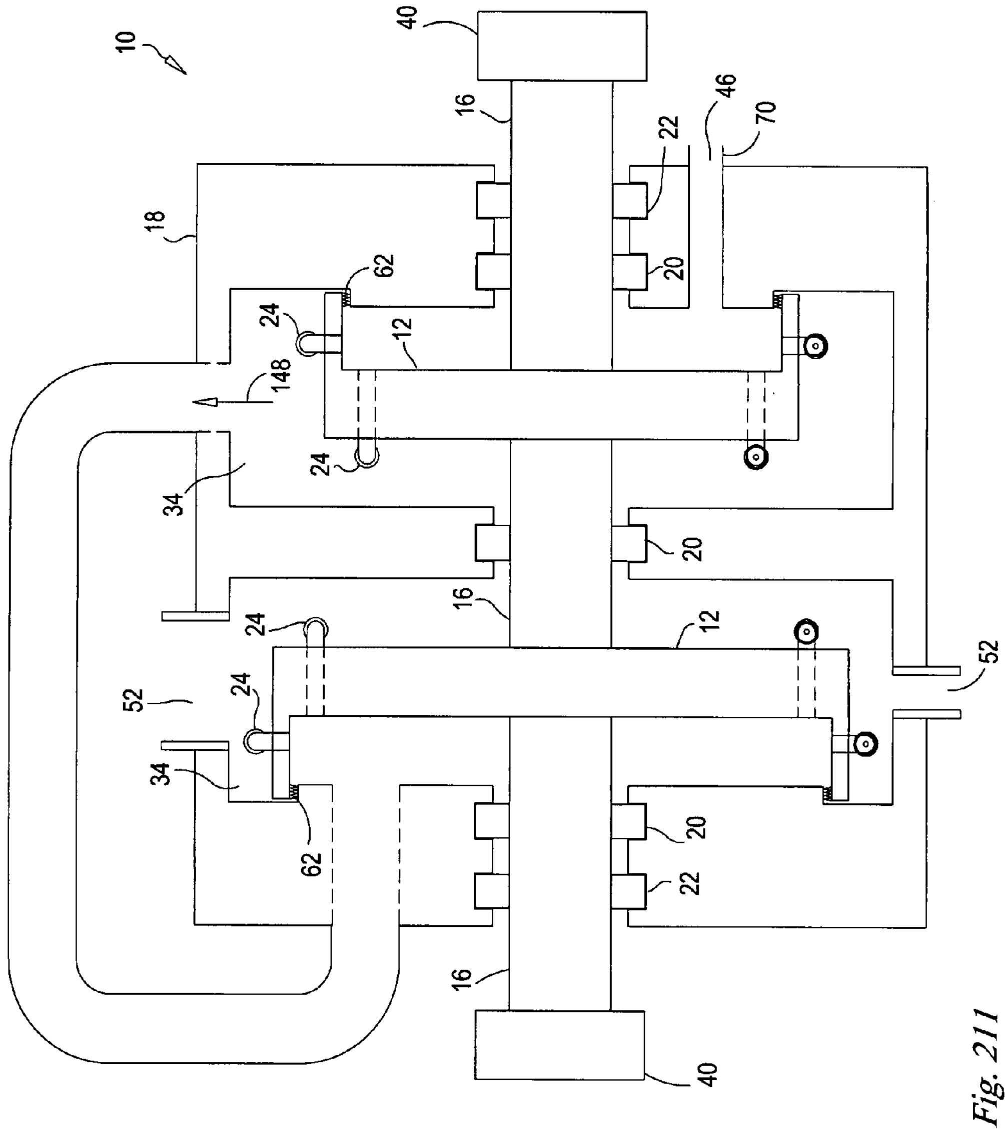
Figure 212:
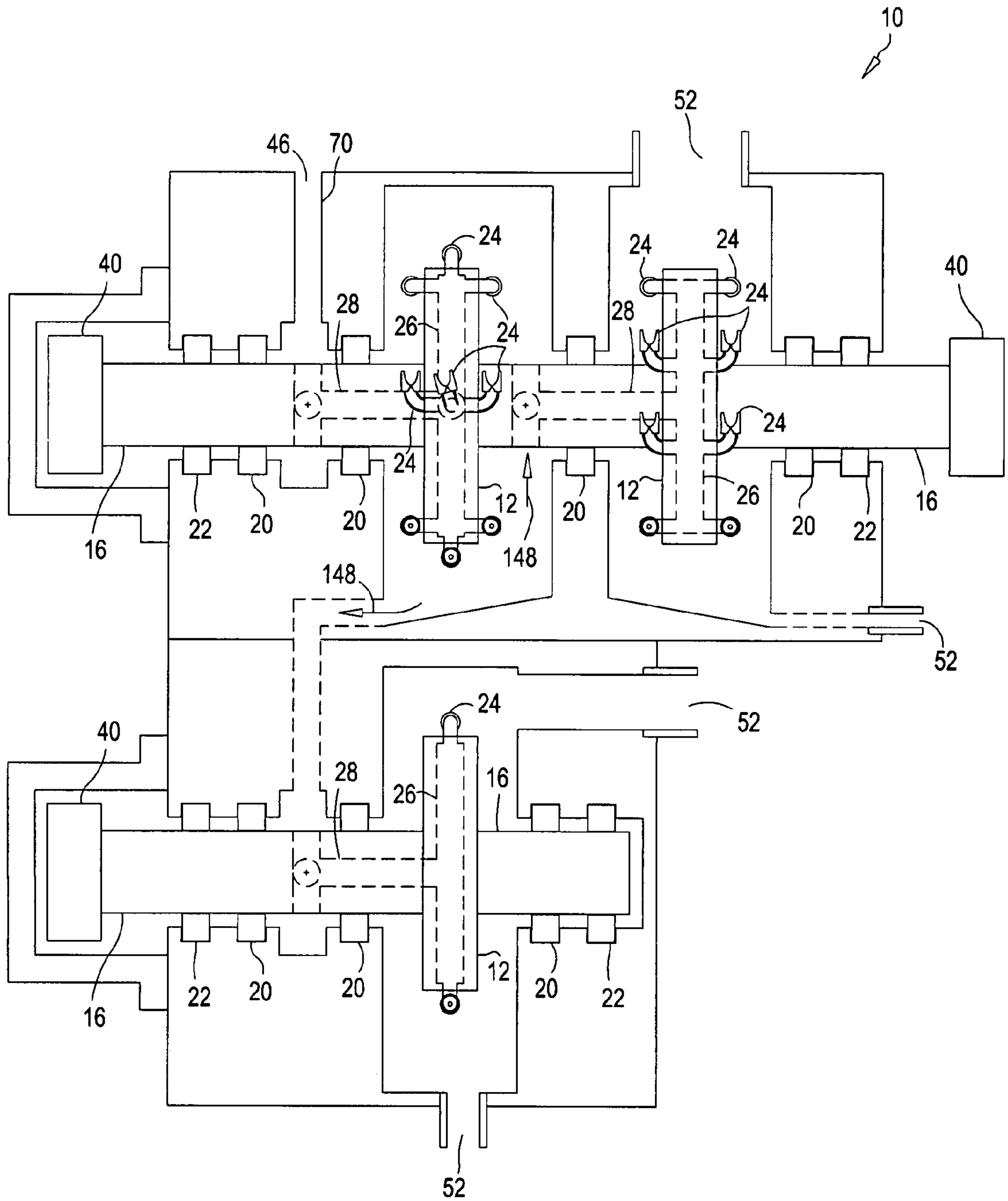
Figure 213:
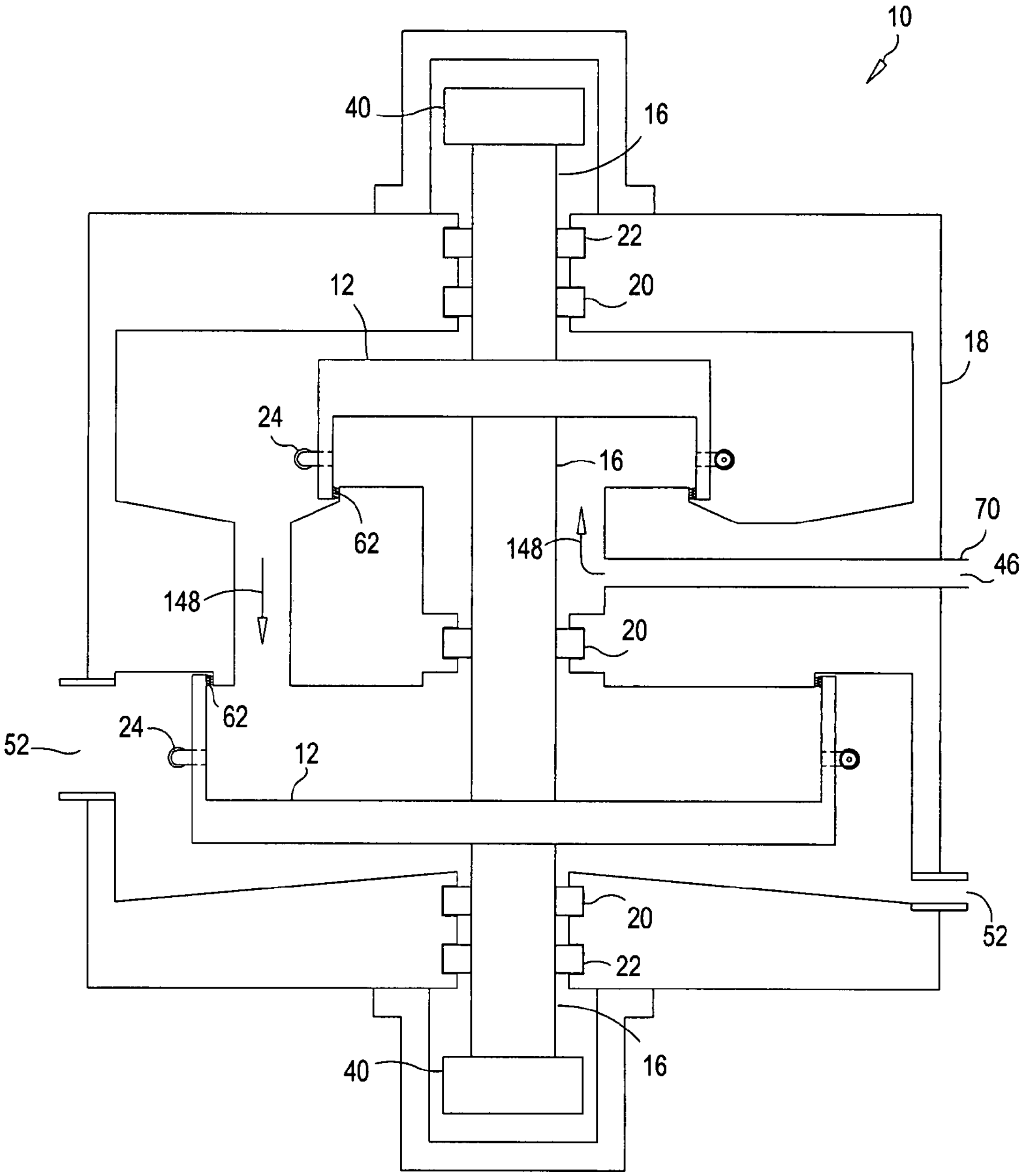
Figure 214:
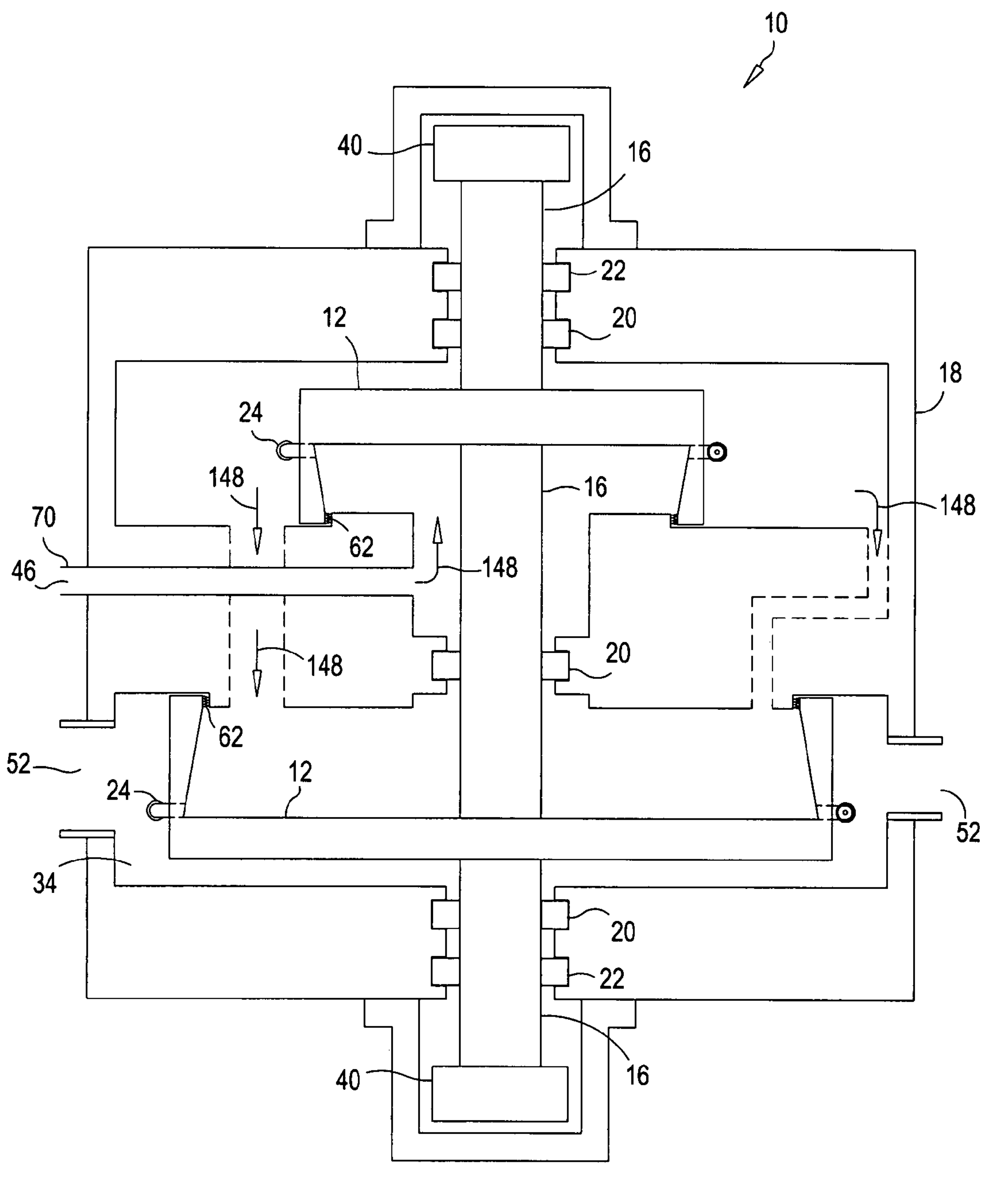
Figure 215:
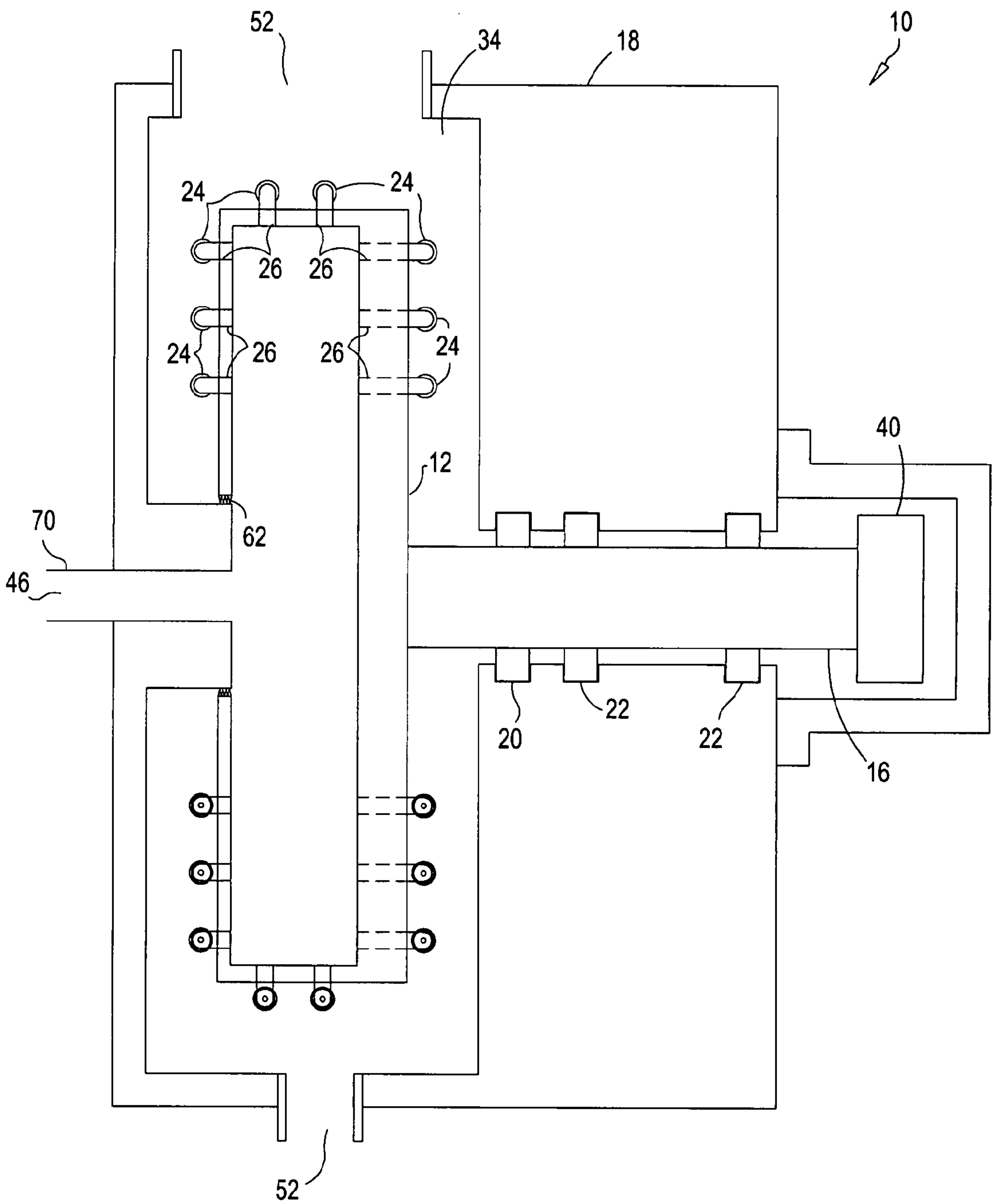
FIGS. 215-217 are cross-sectional views of other preferred single stage turbine shaft and rotor embodiments of the invention.
Figure 216:
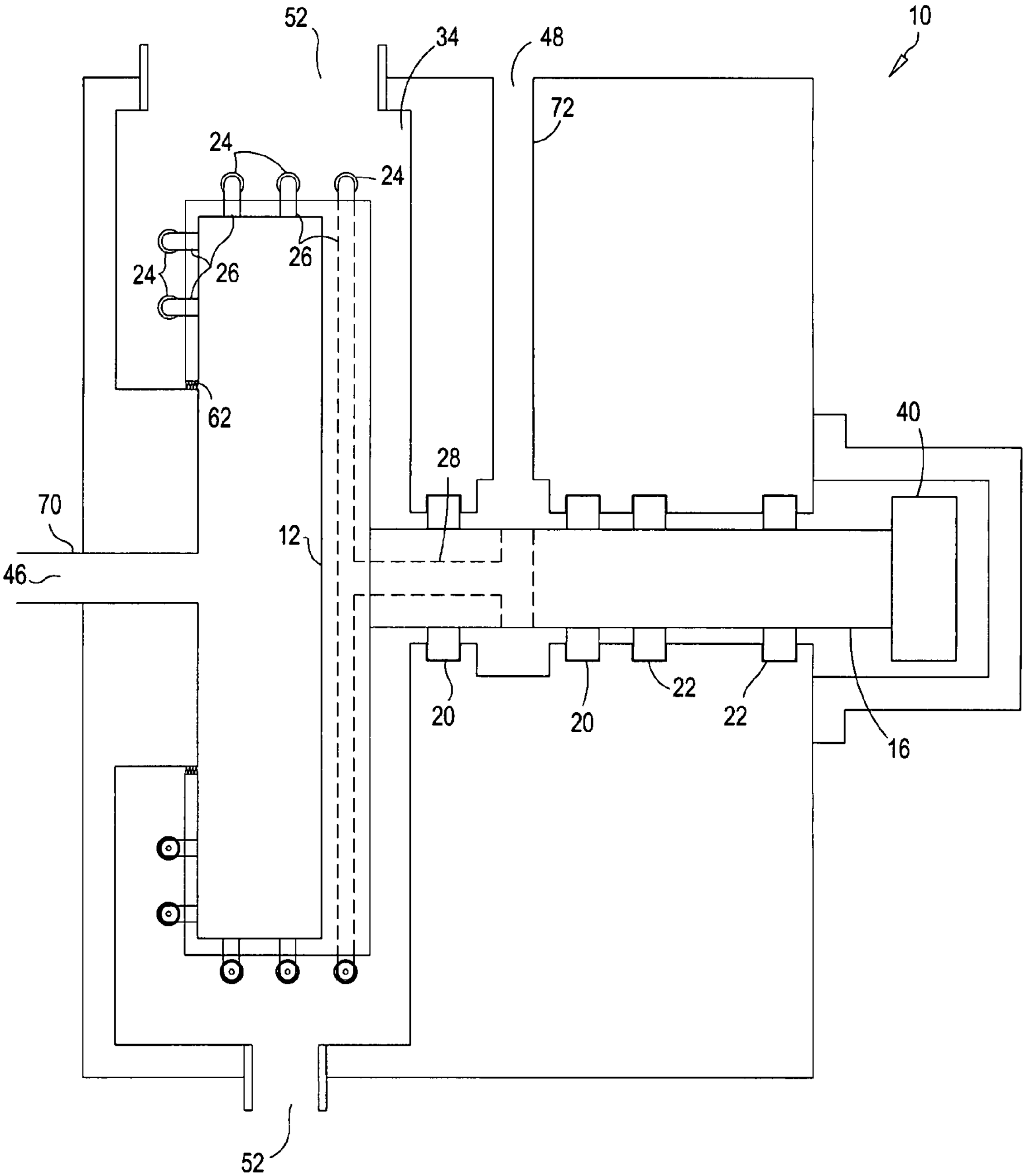
Figure 219:
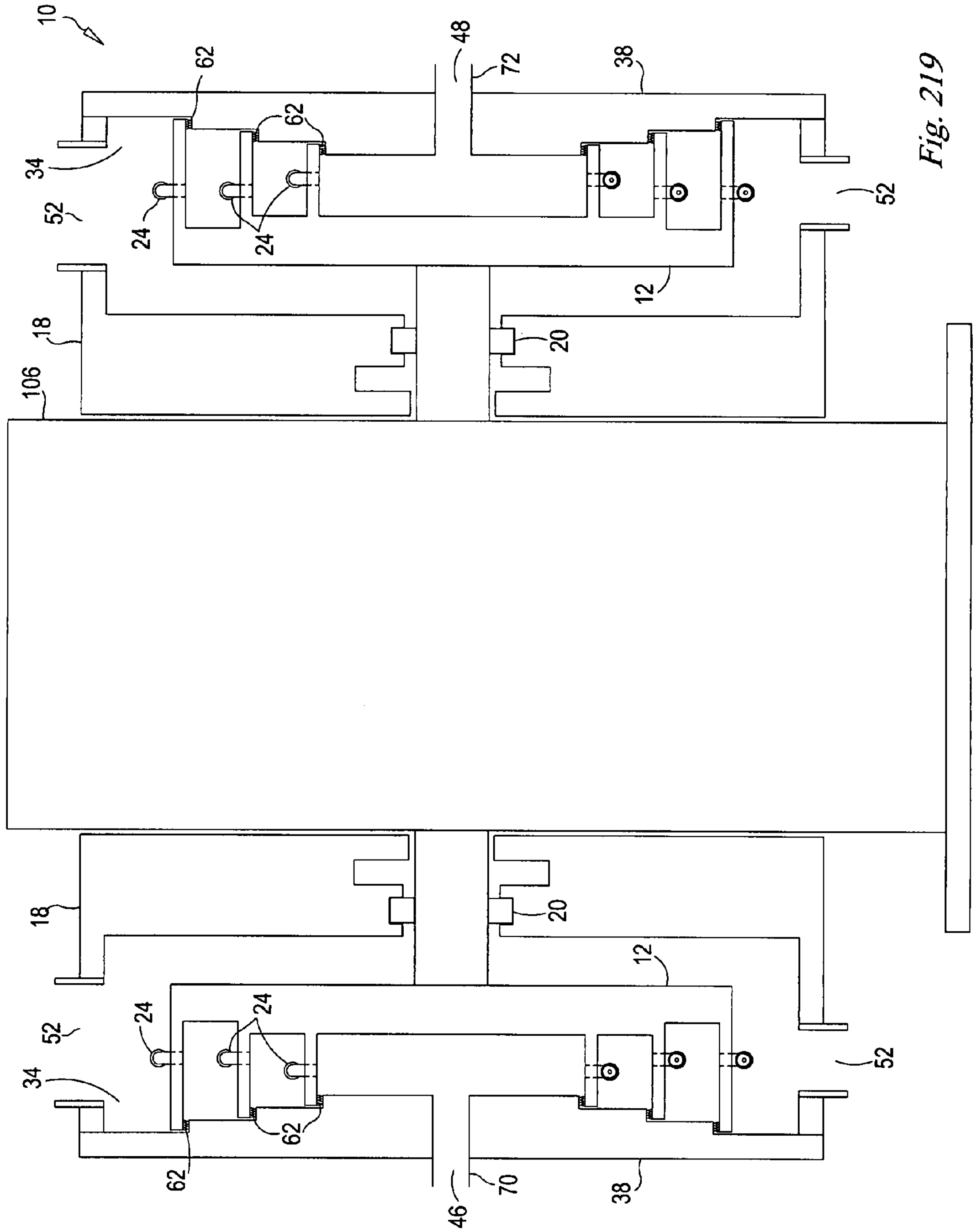
FIG. 219 is a cross-sectional view of another preferred pressure-compound embodiment of the invention, with generator.
Figure 220:
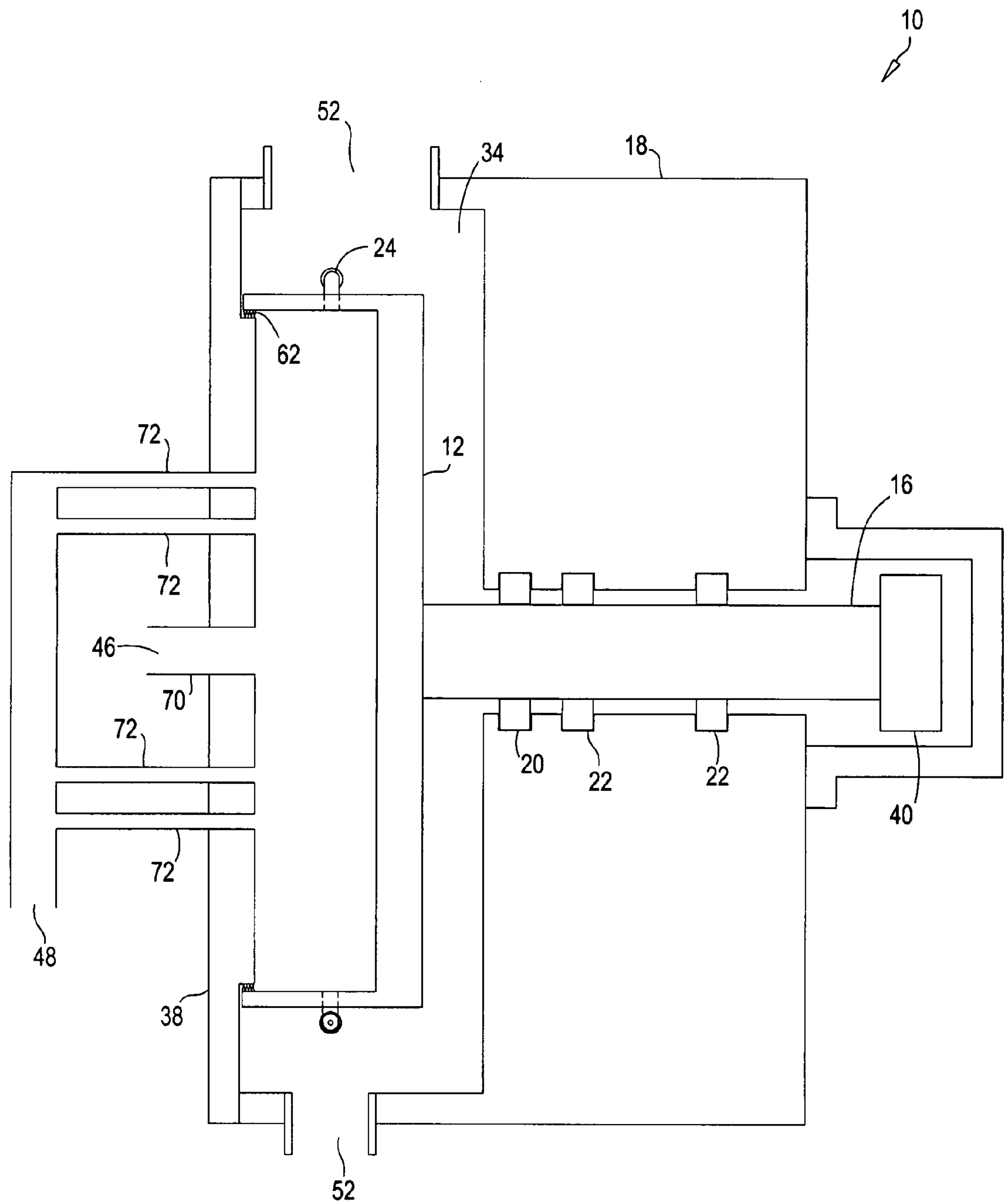
FIG. 220 is a cross-sectional view of another preferred single stage turbine shaft and rotor embodiments of the invention.
Figure 221:
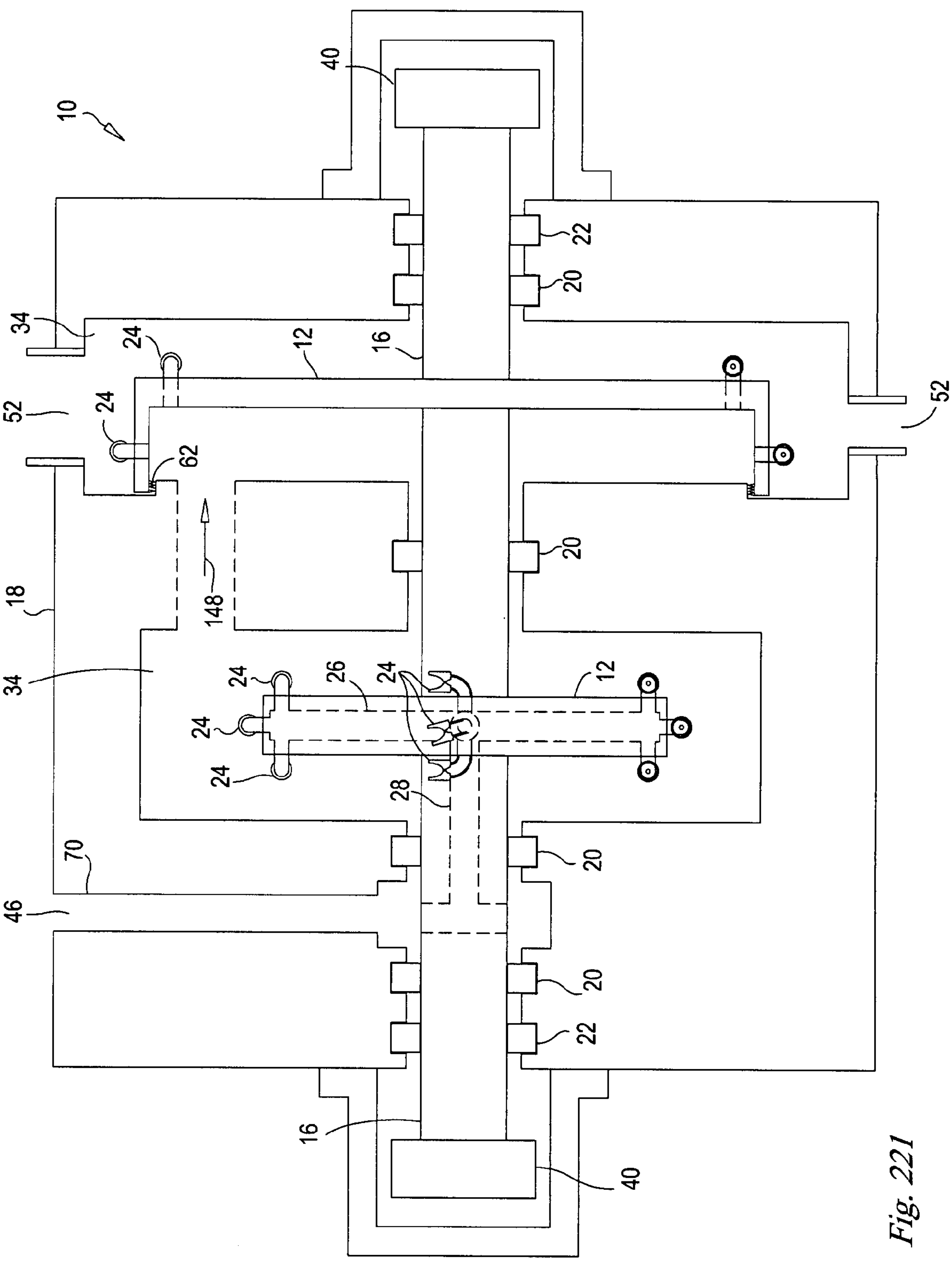
FIG. 221 is a cross-sectional view of another preferred pressure-compound embodiment of the invention.
Figure 222:
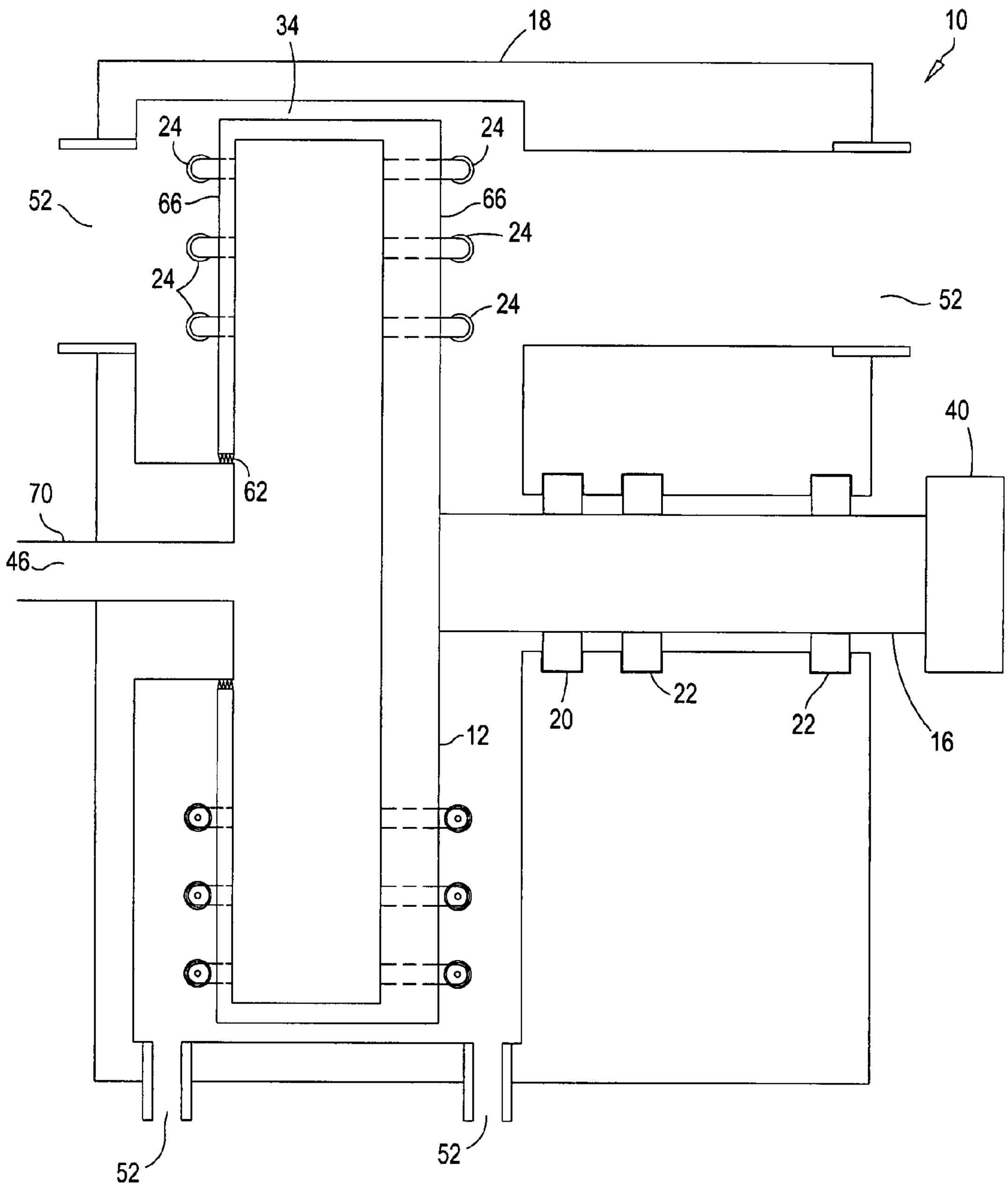
FIGS. 222-224 are cross-sectional views of other preferred single stage turbine shaft and rotor embodiments of the invention.
Figure 223:
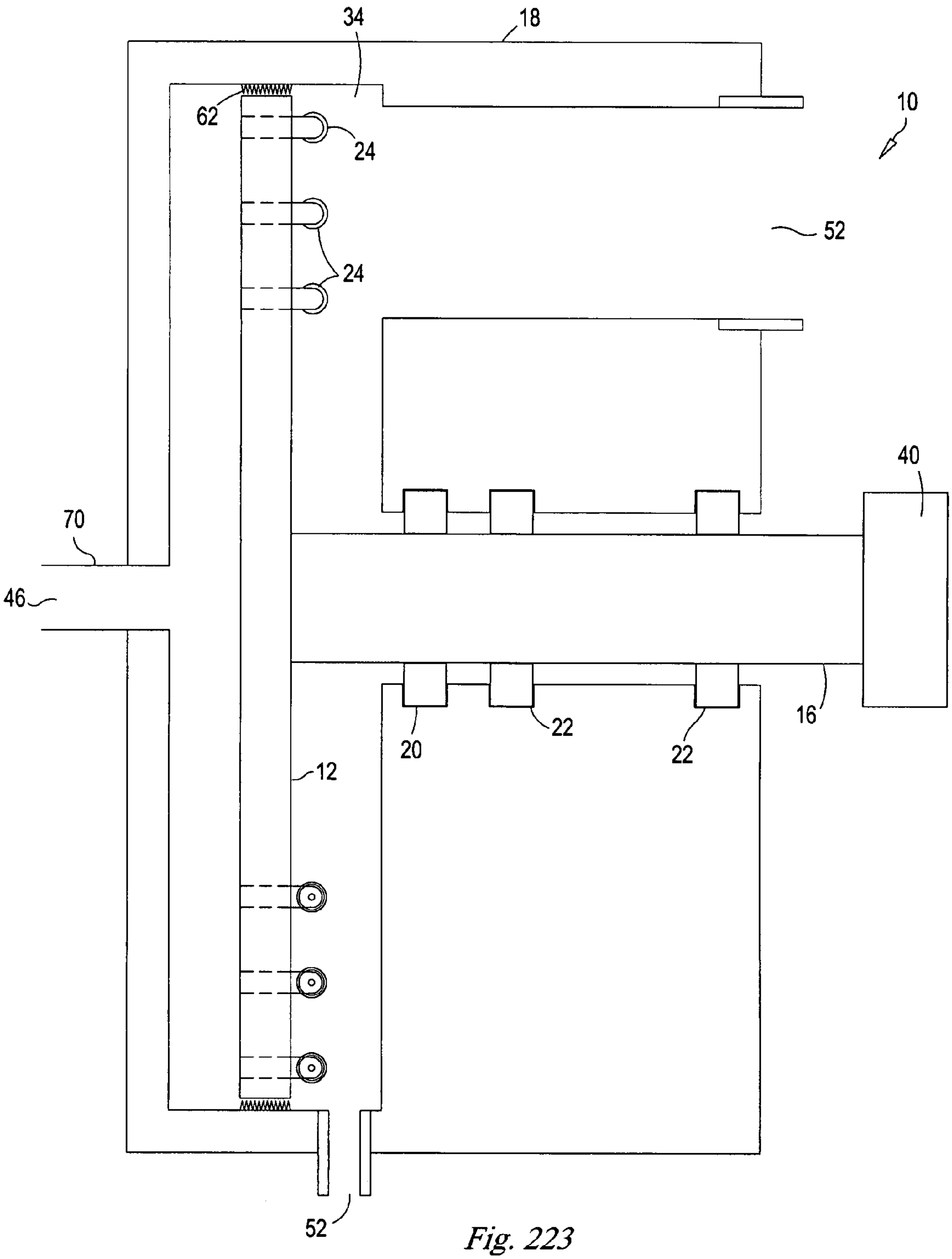
Figure 224:
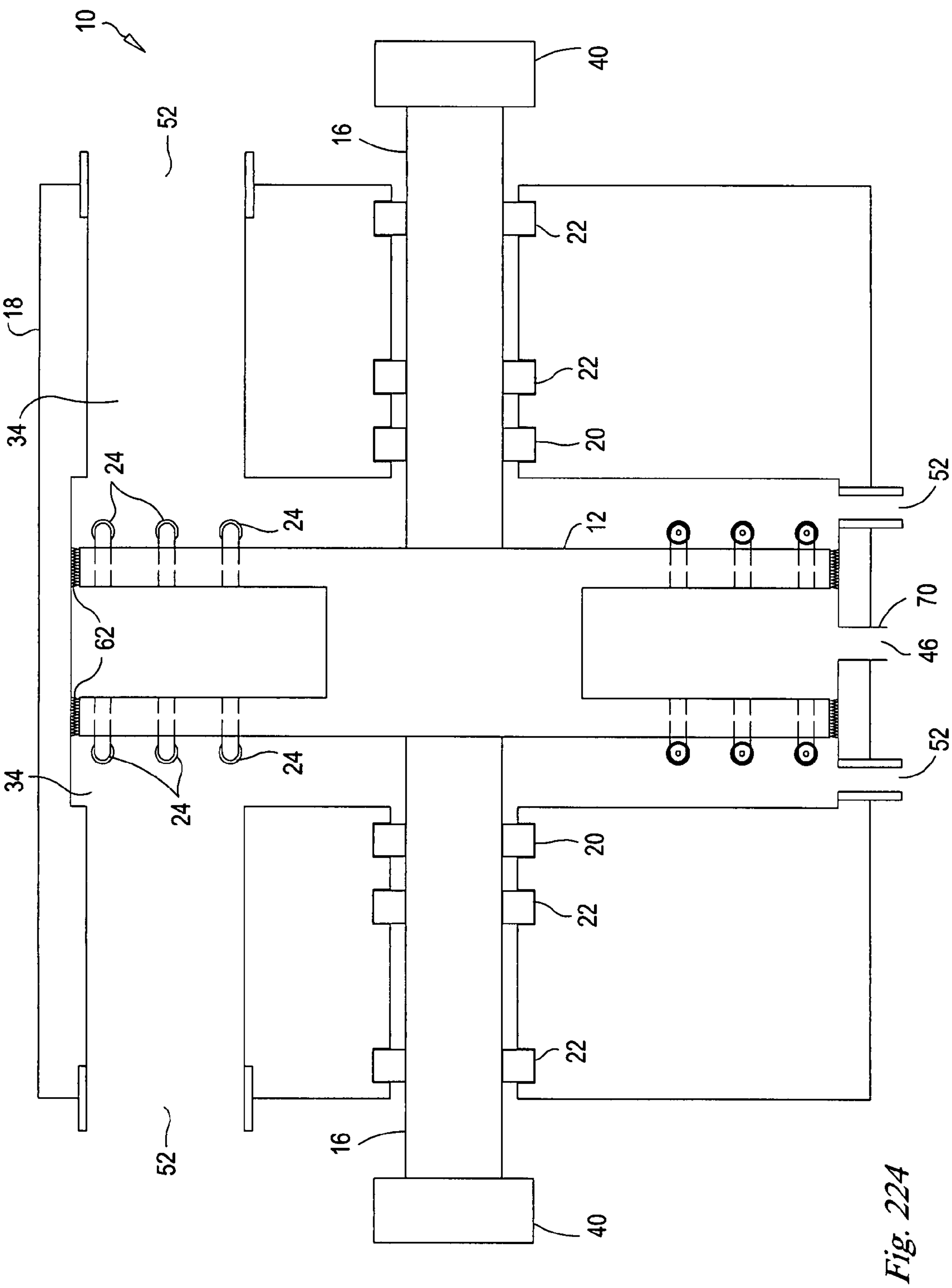
Figure 225:
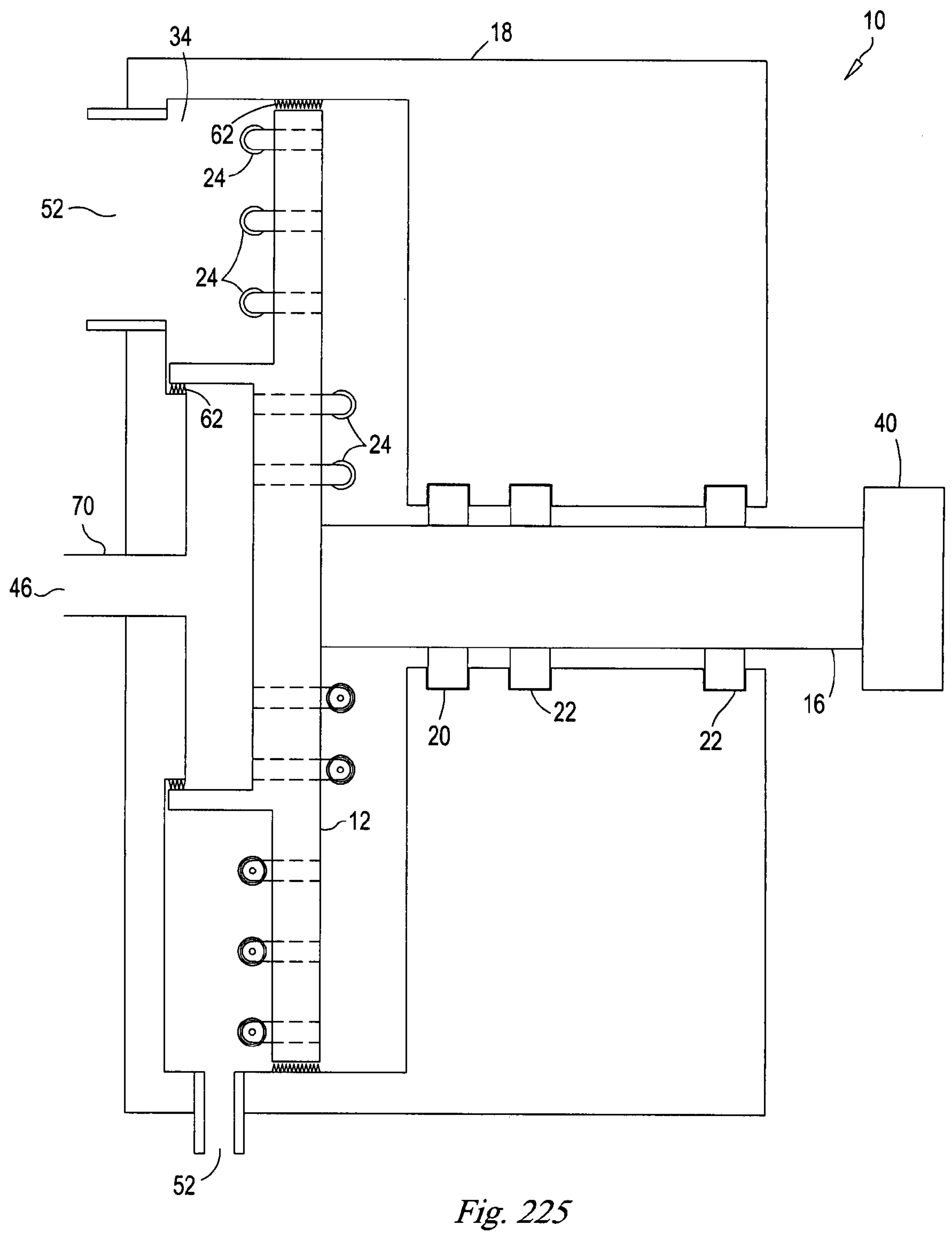
FIGS. 225 and 226 are cross-sectional views of other preferred pressure-compound embodiments of the invention.
Figure 226:
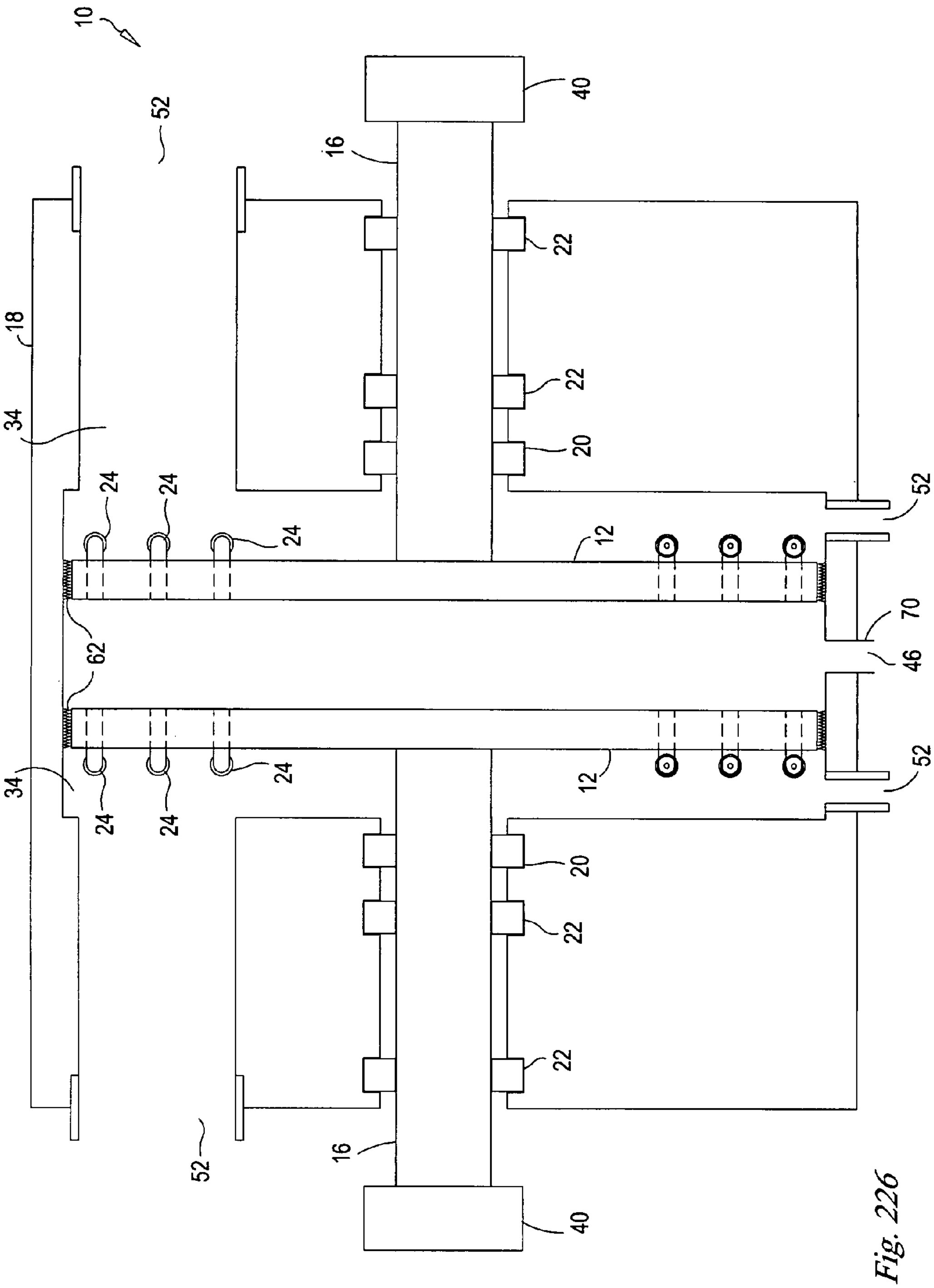
Figure 227:
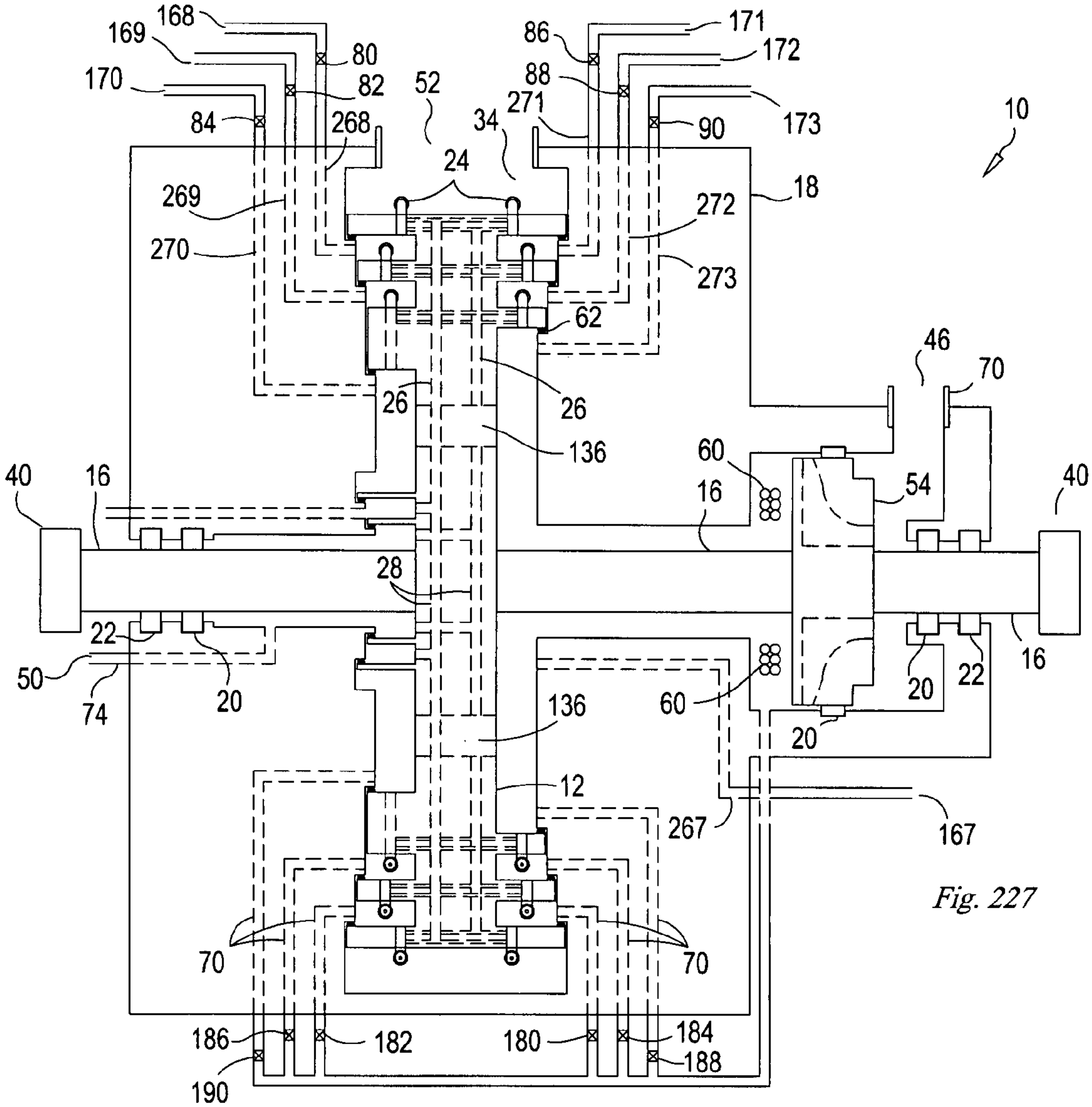
FIG. 227 is a cross-sectional view of another preferred embodiment of the invention.

In other preferred embodiments of the present invention, non-shaft passageway(s) is/are incorporated to route inlet fluid(s) to rotor passageway(s) or to route turbine chamber and/or intermediate chamber fluid(s) to subsequent rotor passageway(s). Non-shaft passageways may be arranged so that (1) one non-shaft passageway, e.g., first inlet fluid port 70, hydraulically connects to rotor passageway(s) for one rotor, or rotor section, as illustrated in FIG. 109, for example, (2) one non-shaft passageway, e.g., first inlet fluid port 70, hydraulically connects to rotor passageway(s) for two or more rotors, or rotor sections, as illustrated in FIG. 141, for example, (3) two or more non-shaft passageways, e.g., first inlet fluid port 70 and second inlet fluid port 72, hydraulically connect to rotor passageway(s) for one rotor, or rotor section, as illustrated in FIG. 220, for example, or (3) combinations thereof, where one combination is illustrated in FIG. 199, for example. A non-shaft passageway may be either a single non-shaft passageway or an array of non-shaft passageways in substitution of, and/or having the same practical effect as, said single non-shaft passageway(s)), as illustrated in FIG. 220 with second inlet fluid 48, for example. Non-shaft passageway(s) are typically, but not limited to, turbine casing or shell component passageway(s), where said passageway(s) (1) originate from point(s) on the outside (external penetration) of the turbine body 18, as illustrated in FIGS. 109-136, 138-164, 186-195, 206-210, 215-217, 219, 220 and 222-226, for examples, (2) originate internally, as illustrated in FIG. 221, for example, or (3) originate both externally and internally, as illustrated in FIGS. 165-179, 196-203, 211, 213 and 214, for examples. Non-shaft passageway(s) generally, but not necessarily, direct fluid(s) to inner and/or center portion(s) of turbine rotor(s) or rotor section(s), intermediate chamber(s) and/or turbine chamber(s).

In a preferred embodiment of the present invention, an end of turbine shaft 16 abuts turbine rotor 12 perpendicularly, and the turbine shaft passageway centerline(s) and shape(s) closely match (cross) the turbine rotor passageway centerline(s) and shape(s). Alternatively, rather than the shape of the turbine shaft passageway closely matching the shape of the turbine rotor passageway, the shape of one passageway relative to another passageway can be purposely mismatched to permit certain flow path(s), with minimal or no flow restriction. One or both ends of turbine shaft 16 may be fitted with a taper to match a corresponding taper in turbine rotor 12. Turbine shaft 16 may be provided with a perpendicular connection to a first turbine rotor 12 on one end and a tapered connection to a second turbine rotor 12 on the other end. For applications incorporating a tapered connection of turbine shaft 16 to turbine rotor 12, typically, but not necessarily always, the turbine shaft taper is a long taper, i.e., the radial dimensional change of the taper (outside dimension of the shaft) per axial dimension of taper length is relatively small (e.g., one-half inch taper per one foot of length).

In preferred embodiments, inlet fluid(s) is/are at one thermodynamic condition or two or more different thermodynamic conditions, where such different thermodynamic conditions are associated with one or more substances, or the same substance at different thermodynamic conditions. Typically, parameters such as pressure, temperature, quality, enthalpy, and/or entropy, for examples, are used to determine a thermodynamic condition. For applications using one inlet fluid, the inlet fluid is preferably routed (1) through one or more shaft passageway(s) located in the center portion of turbine shaft 16, (2) through one or more shaft passageway(s) located in the non-center portion of turbine shaft 16, (3) through one or more non-shaft passageway(s) located in shell section end 38, (4) through one or more non-shaft passageway(s) located in turbine casing/shell section 36 and/or turbine body 18, (5) through one or more non-shaft passageway(s) located in web portion(s) of rotor(s) or rotor section(s), where said non-shaft passageway(s) are commonly referenced as equalizing hole(s) or equalizing passage(s) 136, or (6) a combination thereof. For applications using two or more inlet fluids, the inlet fluids are preferably routed through shaft passageways, non-shaft passageways, or both said passageways. Using shaft passageways only, two or more inlet fluids are preferably routed (1) one fluid through one or more shaft passageway(s) located in the center portion of turbine shaft 16, (2) a second fluid through one or more particular shaft passageway(s) located in the non-center portion of turbine shaft 16, (3) a third (and so on, as appropriate) fluid through one or more different particular shaft passageway(s) located in the non-center portion of turbine shaft 16, or (4) combinations thereof, including only in non-center portions of turbine shaft 16. Using non-shaft passageways only, two or more inlet fluids are preferably routed (1) one fluid through one or more non-shaft passageway(s) located in shell section end 38, in turbine casing/shell section 36 and/or turbine body 18, or combination thereof, (2) a second fluid through one or more non-shaft passageway(s) located in shell section end 38, in turbine casing/shell section 36 and/or turbine body 18, or combination thereof, (3) a third (and so on, as appropriate) fluid through one or more non-shaft passageway(s) located in shell section end 38, in turbine casing/shell section 36 and/or turbine body 18, or combination thereof, or (4) combinations thereof, including only in shell section end 38, only in turbine casing/shell section 36, or only in turbine body 18. Using at least one shaft passageway and at least one non-shaft passageways, two or more inlet fluids are preferably routed (1) at least one fluid through said at least one shaft passageway, in accordance with shaft passageway routing scenarios aforementioned in this paragraph, and (2) at least one fluid through said at least one non-shaft passageway, in accordance with non-shaft passageway routing scenarios aforementioned in this paragraph. In addition to multiplicity, turbine shaft passageways may transverse the entire length of turbine shaft 16, a partial length of turbine shaft 16, two or more partial lengths of turbine shaft 16, or a combination thereof. In addition to multiplicity, turbine non-shaft passageways may transverse shell section end 38, casing/shell section 36, turbine body 18 to location(s) and/or rotor or rotor section web(s) (1) at, about or near the center portion(s) of turbine rotor(s) and/or rotor section(s), (2) at, about or near any accessible or useful diametrical/radial distance within said turbine rotor(s) and/or rotor section(s), (3) at, about or near intermediate chamber(s), (4) at, about or near turbine chamber(s), or (5) combinations thereof.

FIGS. 1 through 17, along with FIGS. 109-136 and 138-226, also illustrate some of the preferred arrangements for relative locations of each turbine shaft seal 20 and each turbine shaft bearing 22. The turbine shaft seals 20 are incorporated in such a manner as to direct inlet fluid(s) through particular passageway(s) in turbine shaft 16 or to prevent or reduce the passage of fluid(s) from one chamber to another chamber or from one area to another area. For applications wherein inlet fluids of different thermodynamic conditions are used, the seals 20 are used to segregate such fluids to the appropriate turbine shaft passageway(s) for a particular inlet fluid. Likewise, for applications wherein inlet fluids of different substances are used, the seals 20 are used to segregate such fluids to the appropriate turbine shaft passage way(s) for a particular inlet fluid. And, of course, for applications in which the inlet fluids differ thermodynamically and in substance, the turbine shaft seals 20 provide the appropriate segregation. All, or any, of the turbine shaft seals 20 need not be the same size, type or quantity as other turbine shaft seal(s). Factors such as shaft (revolutions per minute) RPM and variance thereof, substance(s) and variance thereof, thermodynamic condition(s) and variance thereof, load and variance thereof, flow rates and variance thereof, pressure differential and variance thereof, to name a few, are determinate in turbine shaft seal selection and placement.

In addition to turbine shaft seals 20, rotary seals 62 are incorporated in embodiments of the present invention in such a manner as to assist containment of inlet fluid(s) in particular passageway(s) in turbine rotor 12 and/or, for certain arrangements, to assist containment of fluids in turbine chambers and/or intermediate chambers. FIGS. 109 through 136, 138 through 180, 186 through 203, 206 through 211 and 213 through 226 illustrate some of the preferred arrangements for relative locations of rotor seal 62. In most, but not all, arrangements, rotor seals 62 are primarily, but not only, associated with sealing fluid(s), whether single stream or multiple streams, that have passed from non-shaft passageways. For applications wherein inlet fluids of different thermodynamic conditions are used, the seals 62 are preferably used to segregate such fluids to the appropriate turbine rotor passageway(s) for a particular inlet fluid. Likewise, for applications wherein inlet fluids of different substances are used, the seals 62 are preferably used to segregate such fluids to the appropriate turbine rotor passageway(s) for a particular inlet fluid. And, of course, for applications in which the inlet fluids differ thermodynamically and in substance, the turbine rotor seals 62 preferably provide the appropriate segregation.

Figure 218:
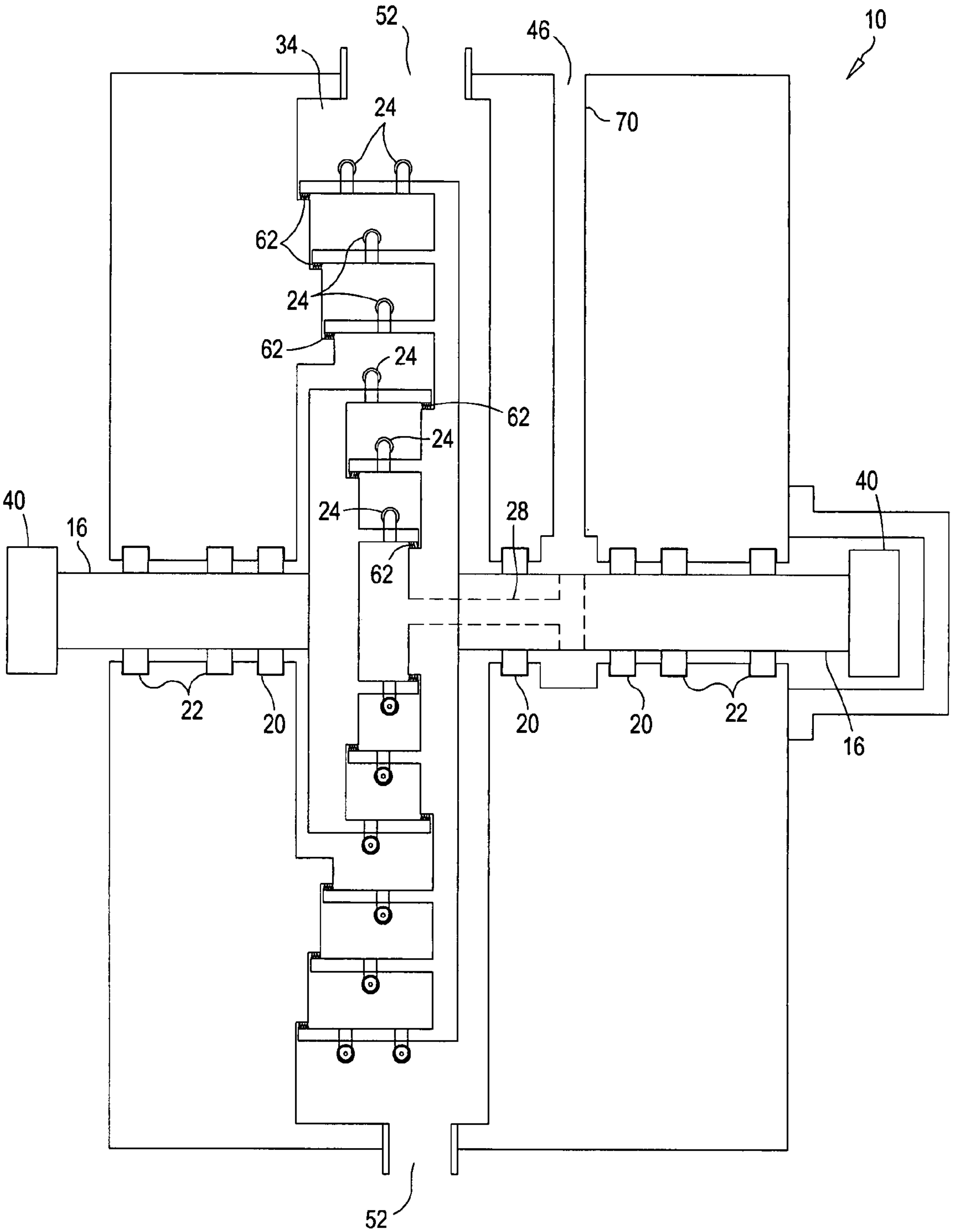
FIG. 218 is a cross-sectional view of another preferred pressure-compound embodiment of the invention.

The turbine bearings are preferably located along turbine shaft 16, arranged appropriately for proper and adequate support of turbine shaft 16. FIGS. 1 through 17, 109-136, 138-218 and 220-226 illustrate some bearing arrangements that are envisioned. The type of bearings is selected to be appropriate for the application(s). One type of bearing is used throughout the turbine or a mixture of two or more types of bearings are used, as appropriate for the application. As with the type of bearing, bearing lubrication, if any, may be one or more types and/or lubricants. For some preferred embodiments of the present invention, it is desirable to use "dry" bearings, such as ceramic-type bearings, to name one example, which require little, if any, lubricant. Certain ceramic bearings can use the inlet fluid(s) as a lubricant, even when said inlet fluid is vaporous, or said ceramic bearings can operate dry, i.e., no lubricant, for certain applications of the present invention. The particular application determines the bearing configuration(s), bearing type(s) and bearing lubrication/lubricant(s). As is illustrated in FIG. 219, for example, it is noteworthy that, for some preferred embodiments of the present invention, one or more turbine engine(s) is/are connected to driven device (e.g., a generator 106), wherein the bearing(s) of said driven device provide all shaft-bearing load(s) for said turbine engine. For other preferred embodiments of the present invention, the turbine engine may have (1) one turbine engine shaft bearing (i.e., partial turbine shaft-bearing load) and the remainder bearing(s) contained within the driven device or (2) some combination of bearings less than the total quantity required for the turbine engine to operate as a standalone device.

After the inlet fluid(s) pass(es) through designated turbine shaft passageway(s) and/or designated turbine non-shaft passageway(s), the fluid(s) enter one or more rotor passageway(s) in the turbine rotor(s). In a preferred embodiment, turbine engine 10 has one or more rotors or rotor sections, wherein the rotor(s) or rotor sections sometimes differ in diametrical and/or axial dimensions, sometimes differ in cross-sectional shapes (circular, non-circular, or combination), or sometimes is/are combination(s) thereof. While a preferred rotor or rotor section shape generally assumes the shape of a rounded (circular) disk, rotor(s) or rotor section(s) may be oval, spherical or near-spherical in shape about the rotor axis of rotation, or a combination of disk-like, oval and/or sphere-like (curved). While the advantages of a disk-like rotor or rotor section include, but are not limited to, ease of manufacture and ease of sectioning (providing multiple rotor sections), the advantages of a sphere-like (curved) rotor or rotor section include, but are not limited to, a finer control on placement of nozzle connections, so as to afford the most ideal location of nozzle(s), portion(s) of nozzle(s), set(s) of nozzle(s) and/or combustion chamber-nozzle unit(s) to accommodate a much wider range of inlet fluid conditions and, thus, accommodate a wider range of pressure ratios, especially for applications in which pressure fluctuations of the chamber into which the nozzle exit fluid is discharging must be maintained near-zero or relatively small, or for applications in which the chamber thermodynamic condition must be controlled for the mixing of two or more nozzle discharge fluid substances and/or thermodynamic conditions. An oval-like or sphere-like rotor can have two or more rotor sections, just as the disk-like rotor can. A curved rotor or rotor section can be convex (outwardly shaped, like a sphere) or concave (inwardly shape, like a dish). In general, a rotor or rotor section shape is primarily determined by the application. Two or more rotors are/may be used in the following scenarios.

Figure 7:
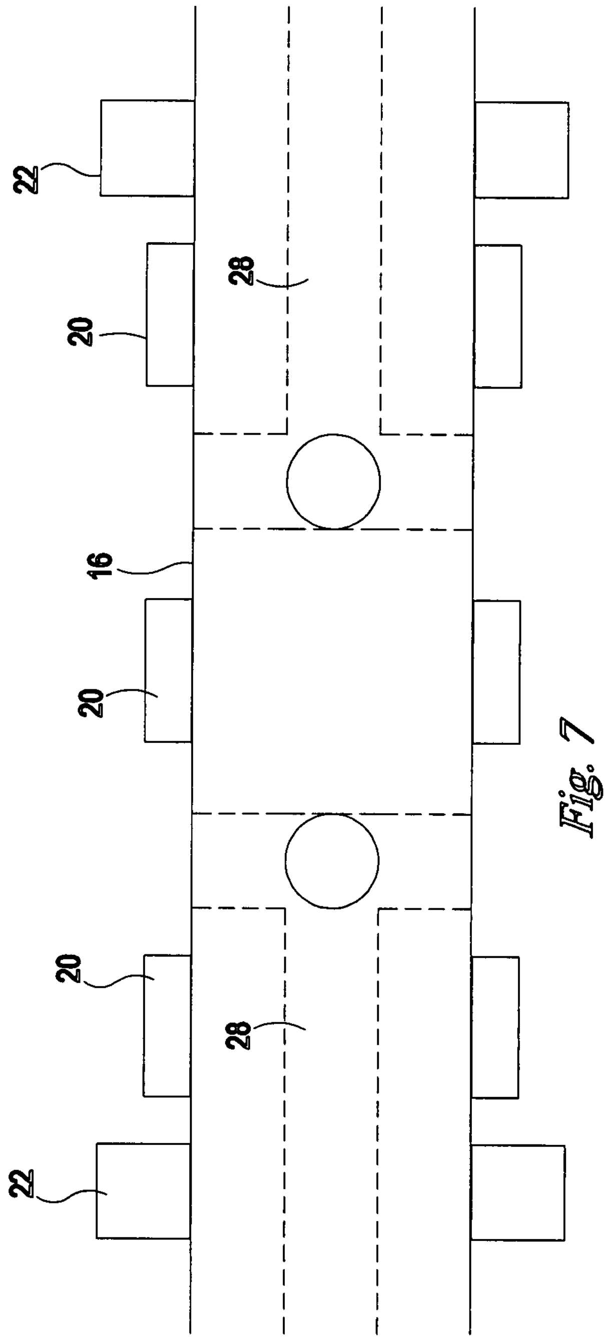
FIG. 7 is a cross-sectional view of the turbine shaft of another preferred embodiment of the invention.
Figure 9:
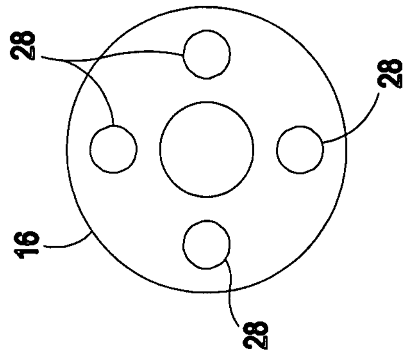
FIG. 9 is a cross-sectional view of the turbine shaft of FIG. 8.
Figure 8:
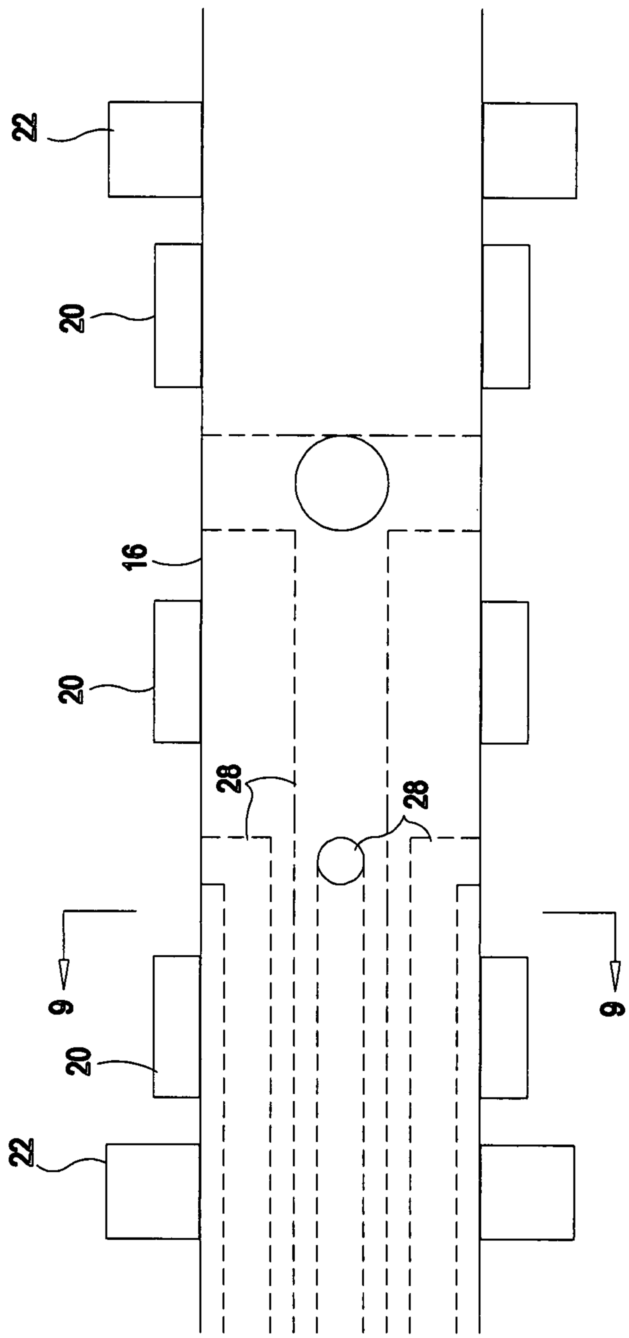
FIG. 8 is a cross-sectional view of the turbine shaft of another preferred embodiment of the invention.
Figure 10:
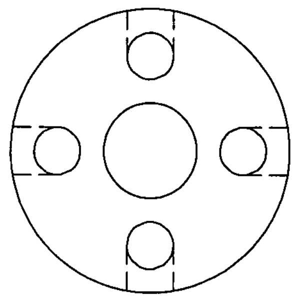
FIG. 10 is a cross-sectional view of the turbine shaft of another preferred embodiment of the invention.
Figure 11:
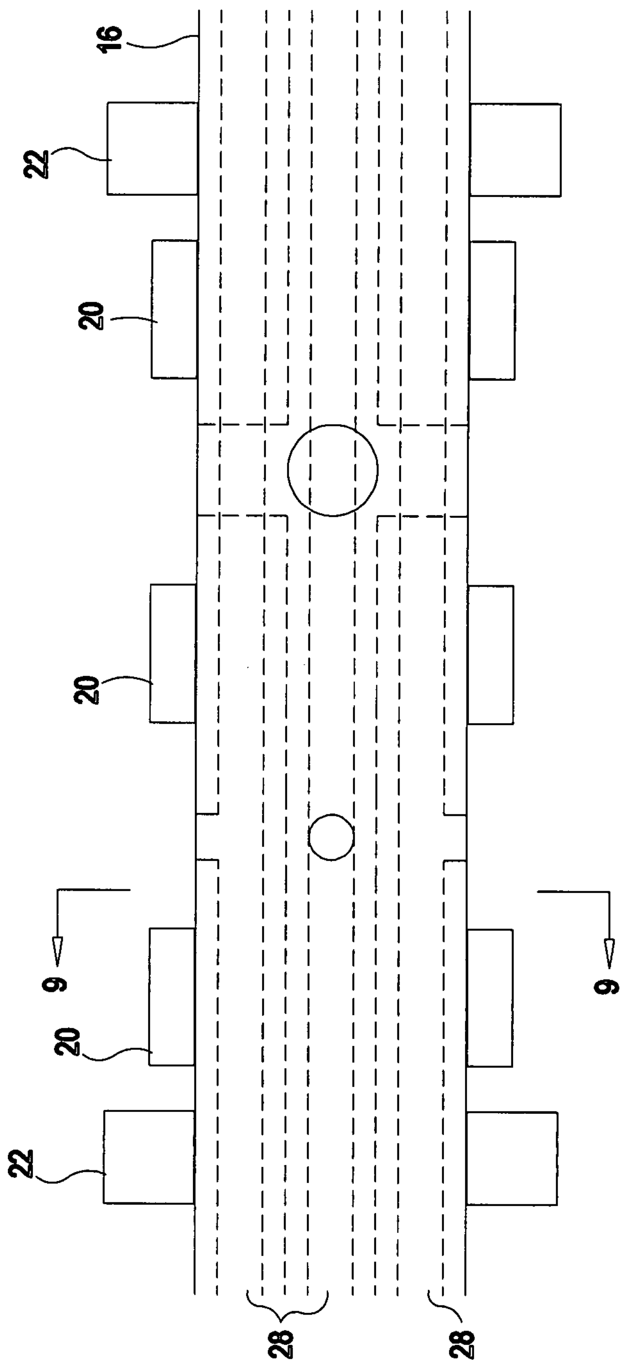
FIG. 11 is a cross-sectional view of the turbine shaft of another preferred embodiment of the invention.
Figure 13:
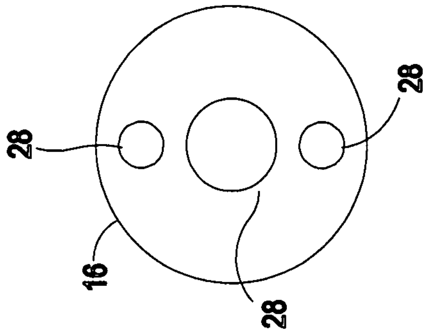
FIG. 13 is a cross-sectional view of the turbine shaft of FIG. 12.

In one scenario, there are two or more different inlet fluid substances, and each inlet fluid can be routed individually to one or more separate rotor(s), as is envisioned in FIG. 7. This example illustrates two inlet fluid paths, separated by appropriate seals, that pass individually through turbine shaft 16 to one or more separate rotor(s) for each inlet fluid. As envisioned in FIG. 2, each inlet fluid is routed to two or more separate rotor sections, some of which are illustrated in FIG. 2, FIGS. 23-42, FIGS. 45-48 and FIG. 57, as examples. As is further envisioned in FIG. 2 and illustrated in FIGS. 107, 108, 119, 144-179, 180-185, 194, 195, 201-203, 208, 209, 216, 217 and 220, for examples, different substances can be mixed in the turbine chamber, which receives the exit fluid from nozzle(s), portion(s) of nozzle(s), set(s) of nozzle(s) and/or combustion chamber-nozzle unit(s), whether said different substances are routed through turbine shaft passageways, non-shaft passageways, or combinations thereof.

In another scenario, there are two or more inlet fluids of the same substance but with different thermodynamic conditions, and each inlet fluid is routed individually to one or more separate rotor(s), again as is envisioned in FIGS. 2 and 7, and illustrated in FIGS. 107, 128, 139, 140, 142-144, 146-164, 186, 187, 189-193 and 219, as examples. Alternatively, each inlet fluid is routed to two or more rotor sections, as is envisioned in FIG. 18 and FIGS. 15 and 20, for example, or routed through non-shaft passageways.

Figure 5:
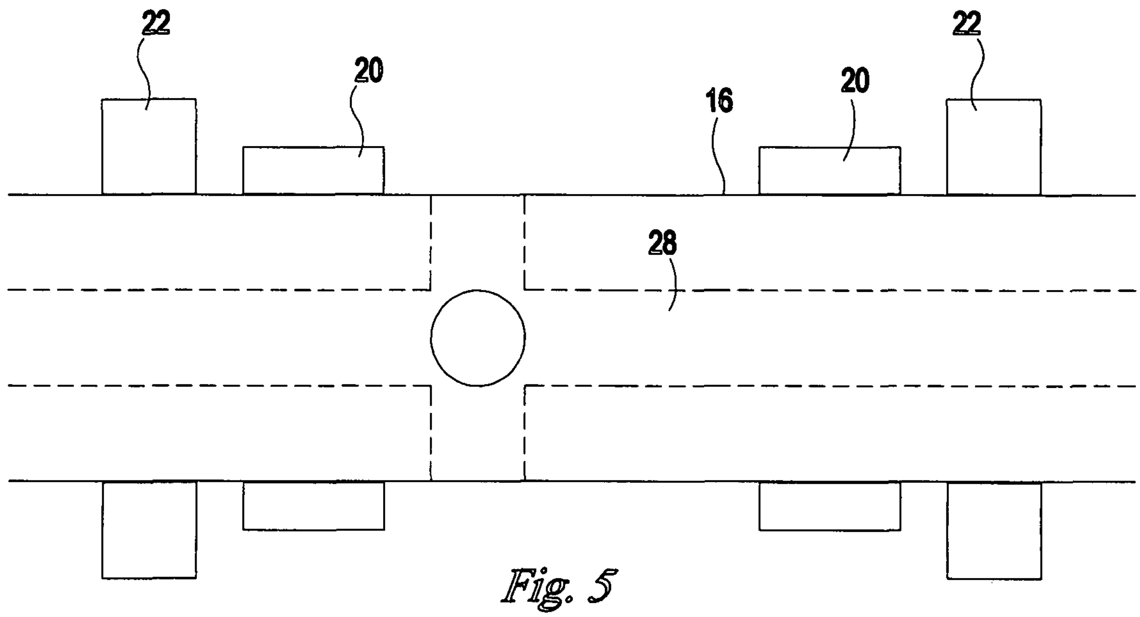
FIG. 5 is a cross-sectional view of the turbine shaft of another preferred embodiment of the invention.
Figure 6:
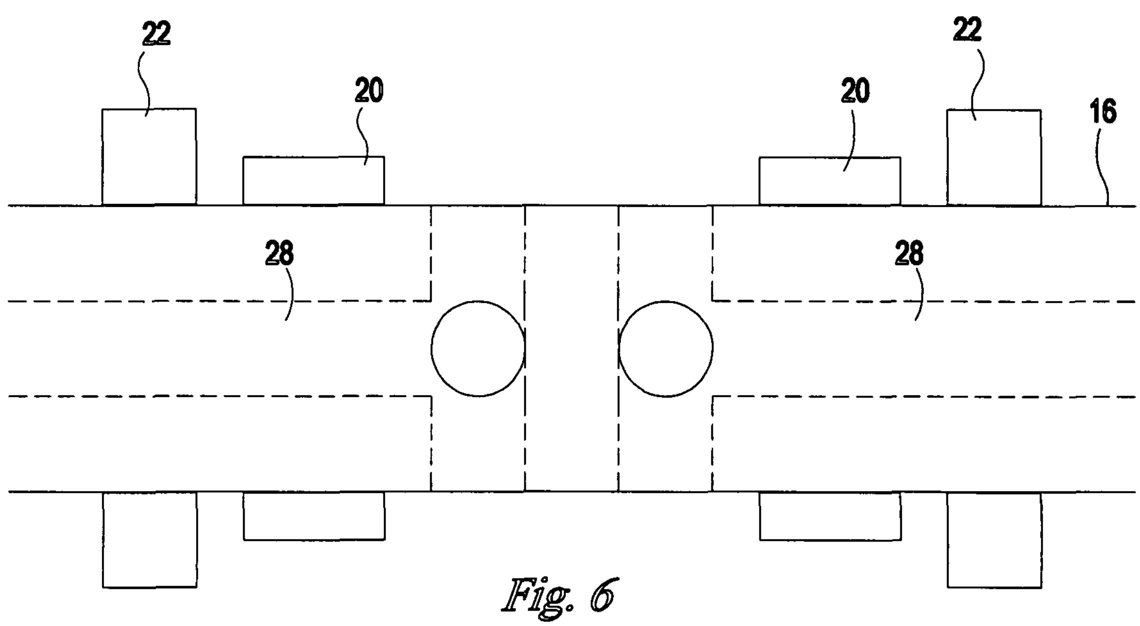
FIG. 6 is a cross-sectional view of the turbine shaft of another preferred embodiment of the invention.

In yet another scenario, when a particular inlet fluid flow rate has reached a maximum for one rotor, one or more additional rotor(s) are physically added to the same turbine shaft 16 to accommodate increased/additional flow rate of the particular inlet fluid into turbine engine 10, as is envisioned in FIGS. 5 and 6, as examples. These examples illustrate the potential, due to the configuration of turbine shaft passageways, to add a rotor to a turbine shaft that has only one rotor on one end of the turbine shaft and appropriate plug device(s) on the other end of the turbine shaft or turbine shaft passageway(s). Another rotor is added by removing the plug device(s) and attaching the additional rotor, as an attaching means is manufactured as part of the turbine shaft. As is/can be further envisioned in FIG. 1, as another example, one or more rotor(s) or rotor section(s) are attached to each end of the turbine shaft, in which only the rotor(s) or rotor section(s) on one end is/are initially used and the rotor passageways of the rotor(s) or rotor section(s) on the other end of the turbine shaft have appropriate plugging device(s) and, upon removing said plug devices, nozzle(s), set(s) of nozzles, or combustion chamber-nozzle unit(s) can be attached. Other rotor(s) or rotor section(s) is/are physically added when the efficient flow rate capacity of the initial rotor(s) or rotor section(s) is/are exceeded. Thus, the addition of one or more rotor(s) or rotor section(s) provide a path for excess fluid to flow to additional nozzle(s), set(s) of nozzles, or combustion chamber-nozzle unit(s) to produce additional turbine mechanical work or output energy. Physically adding additional rotor(s) or rotor section(s) may not be as practical as the method of increasing flow capacity discussed in the following paragraph, but said addition of rotor(s) or rotor section(s) is preferred for certain applications. Combinations of a particular size of turbine body, turbine chamber(s), turbine shaft, turbine seal(s) and turbine bearing(s) can produce a wide range of turbine mechanical work or output energy by simply changing (1) the number of rotor(s) or rotor section(s), (2) the number of nozzle(s), set(s) of nozzles, or combustion chamber-nozzle unit(s), or (3) both (i.e., one size fits many applications), which provide for inexpensive mass production of the present invention to accommodate many customers.

Figure 186:
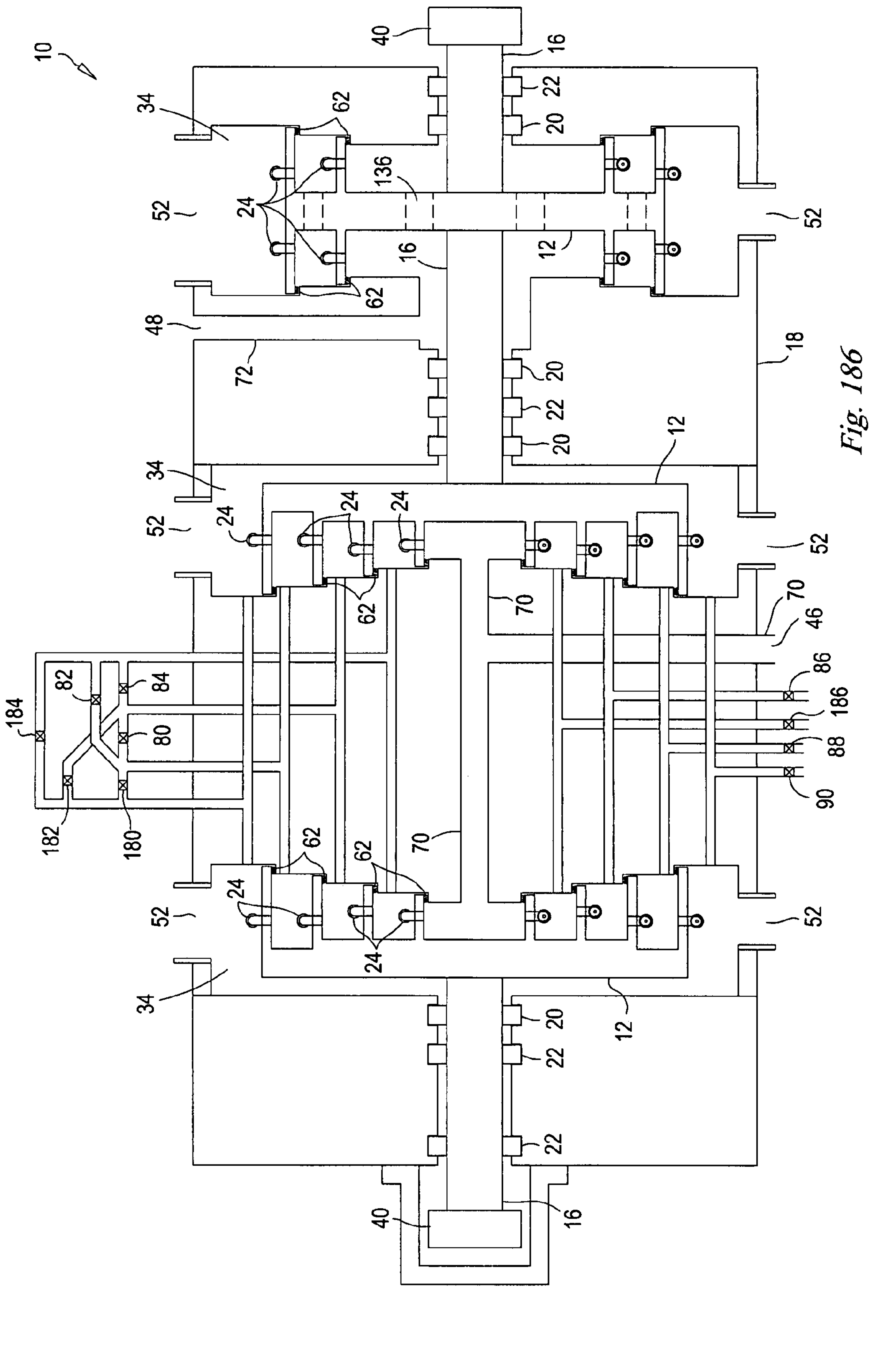
FIGS. 186-190 are cross-sectional views of other preferred pressure-compound embodiments of the invention.
Figure 187:
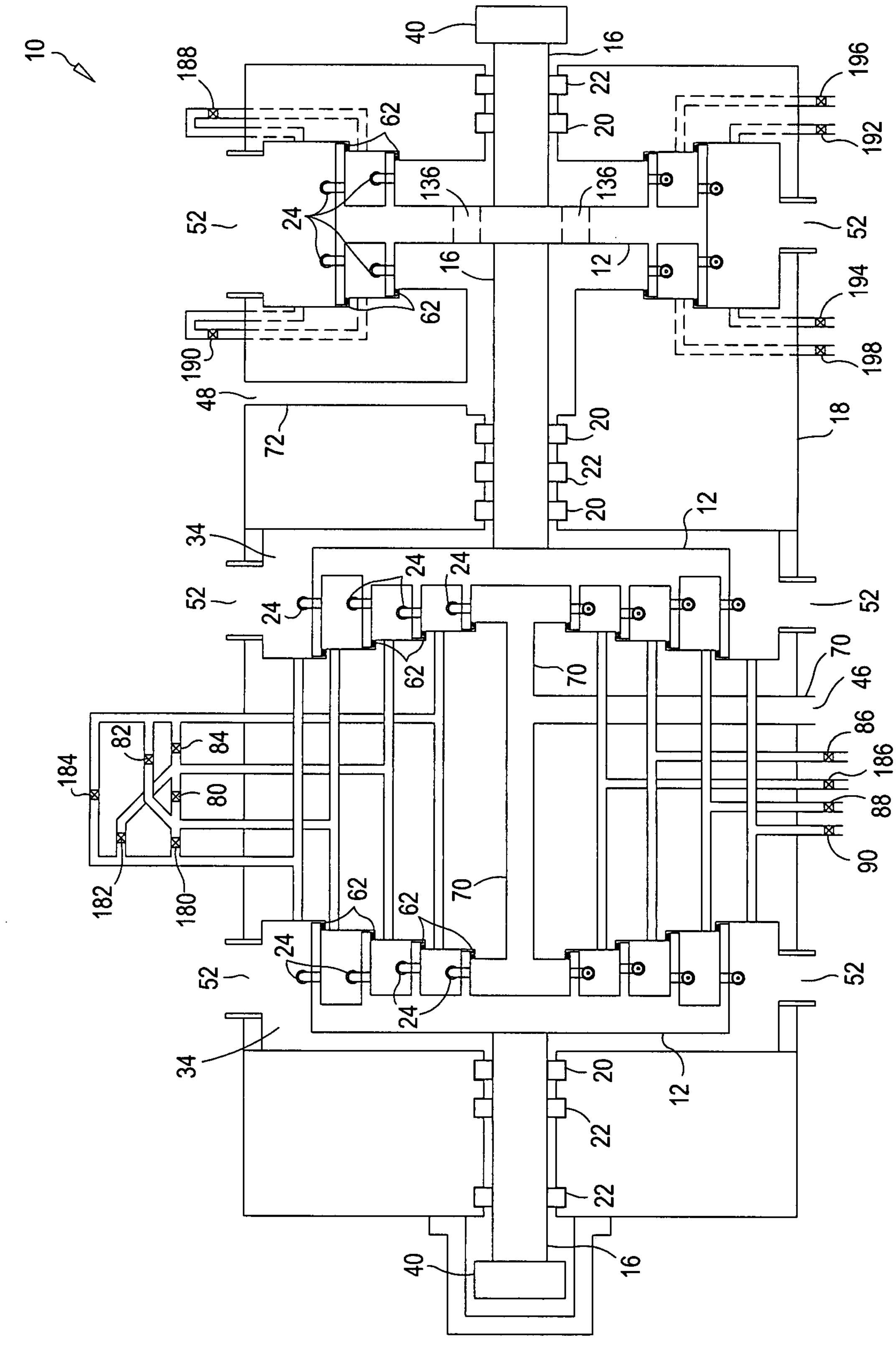
Figure 188:
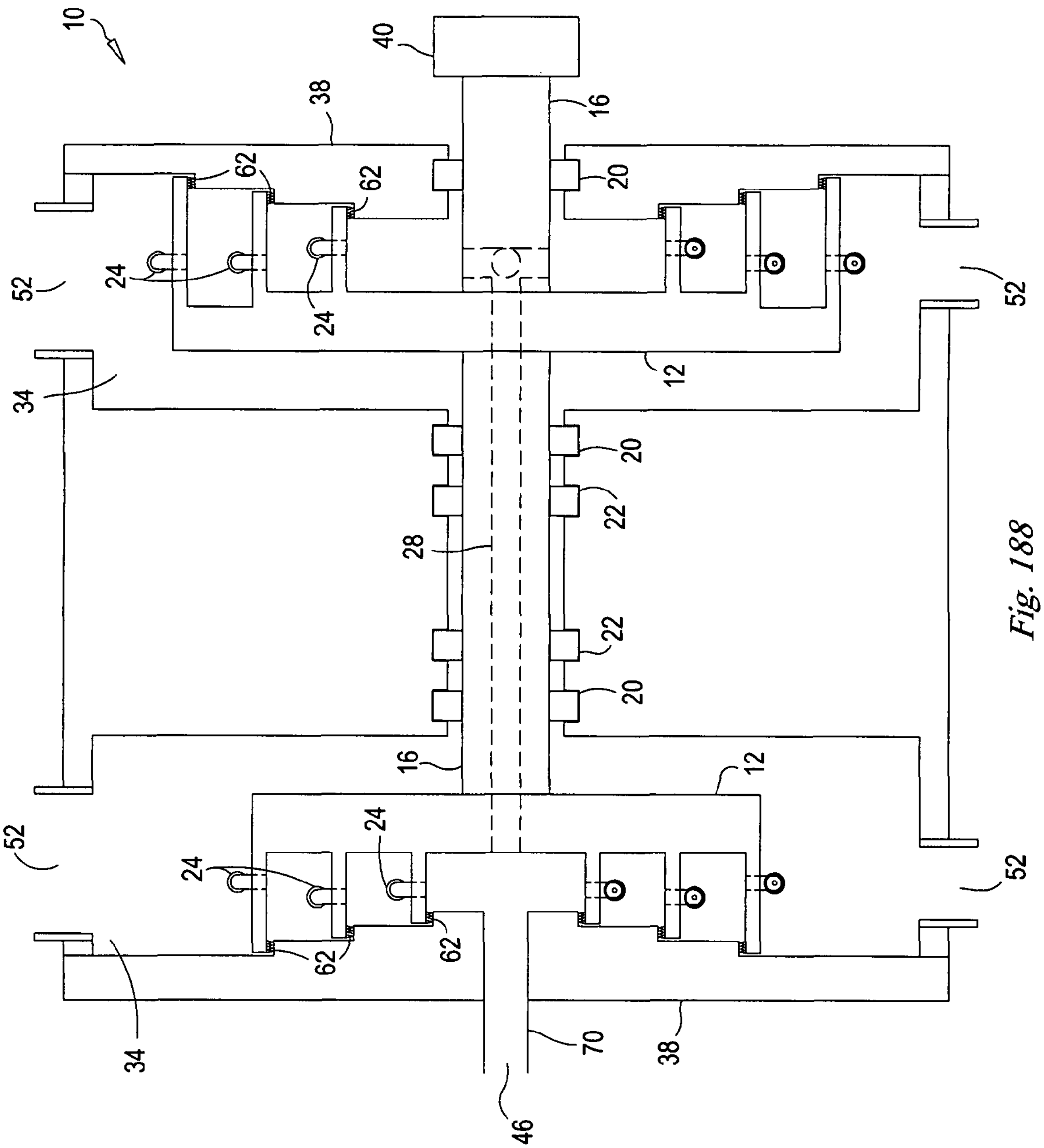
Figure 189:
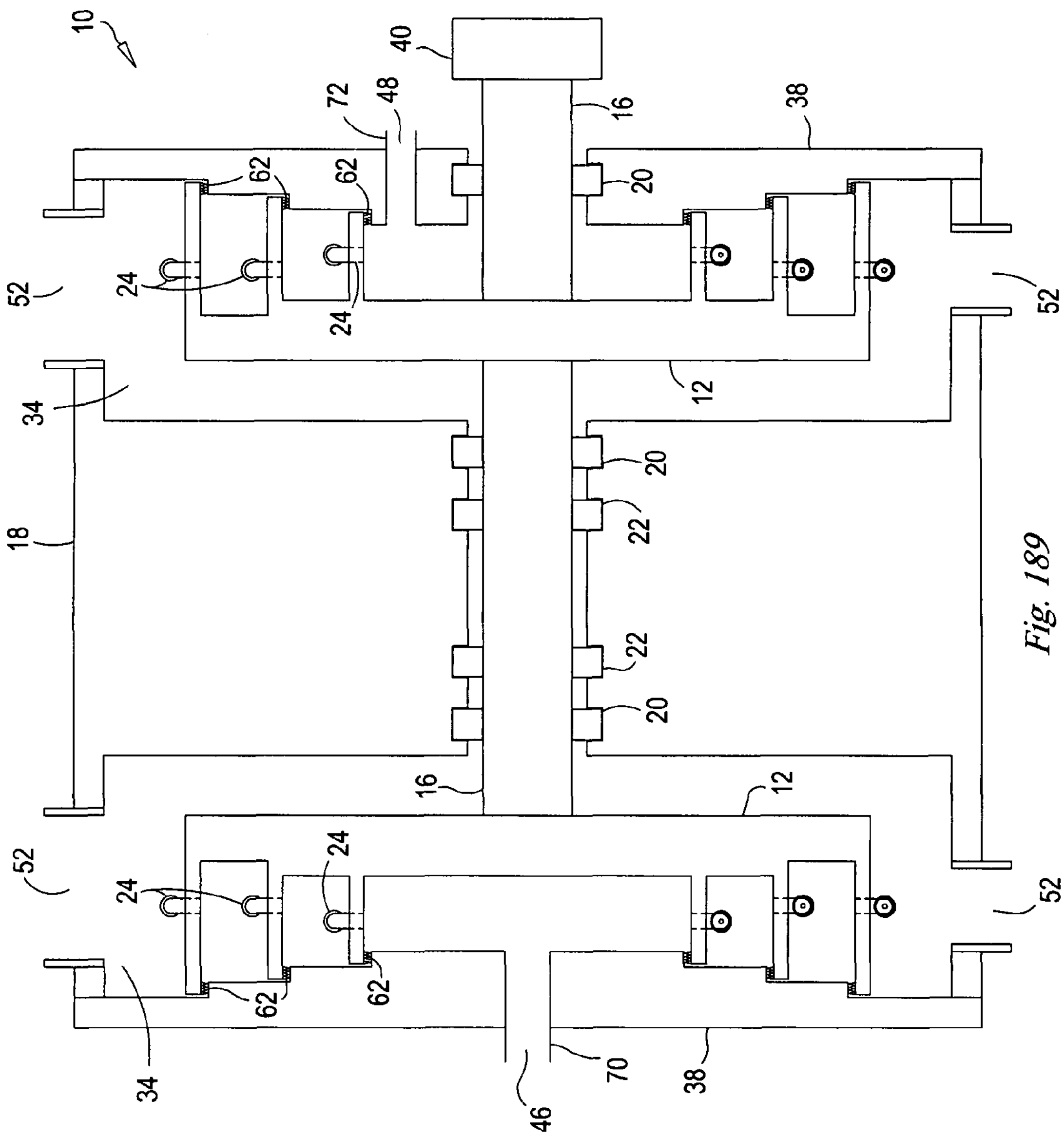
Figure 190:
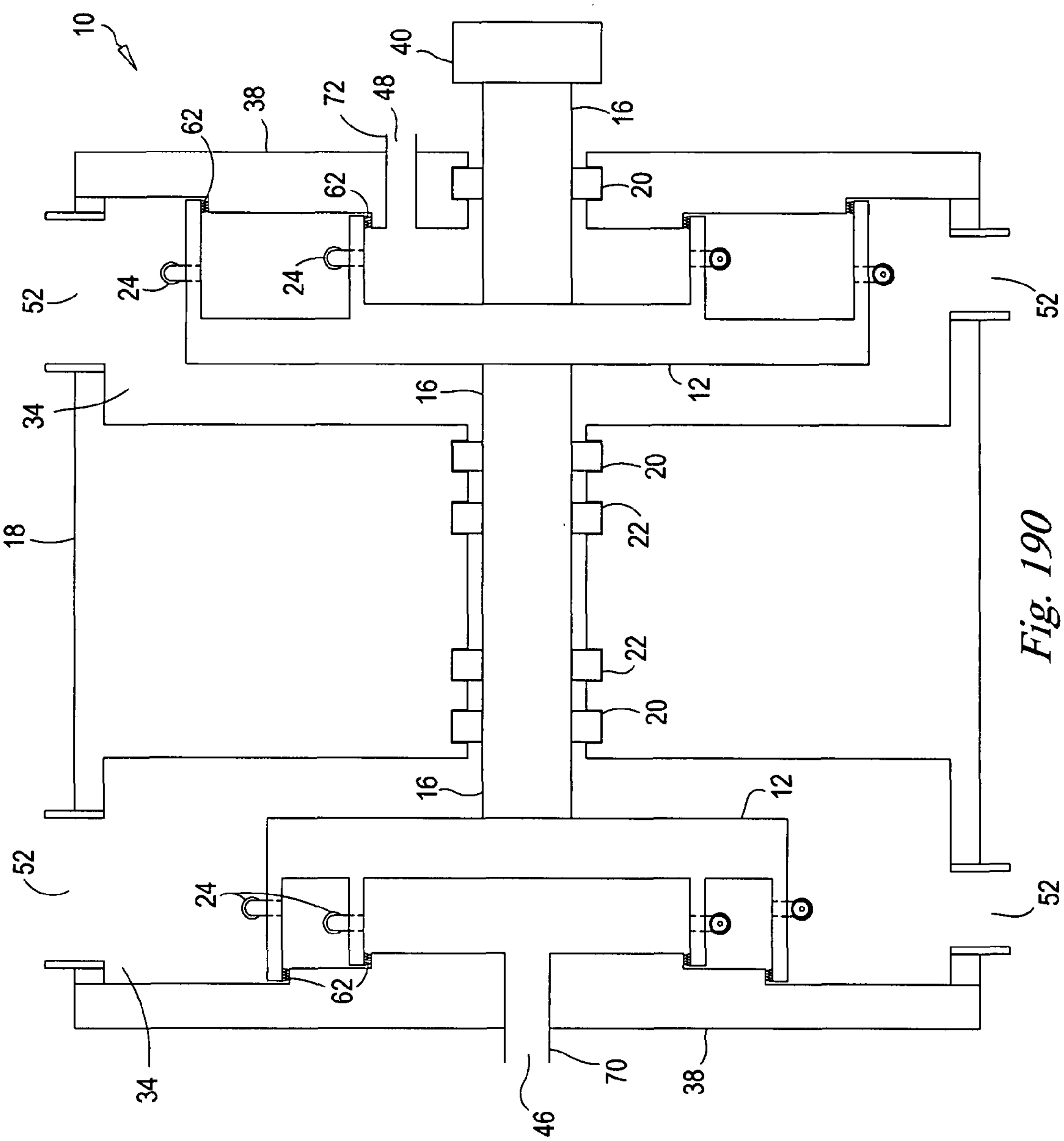
Figure 191:
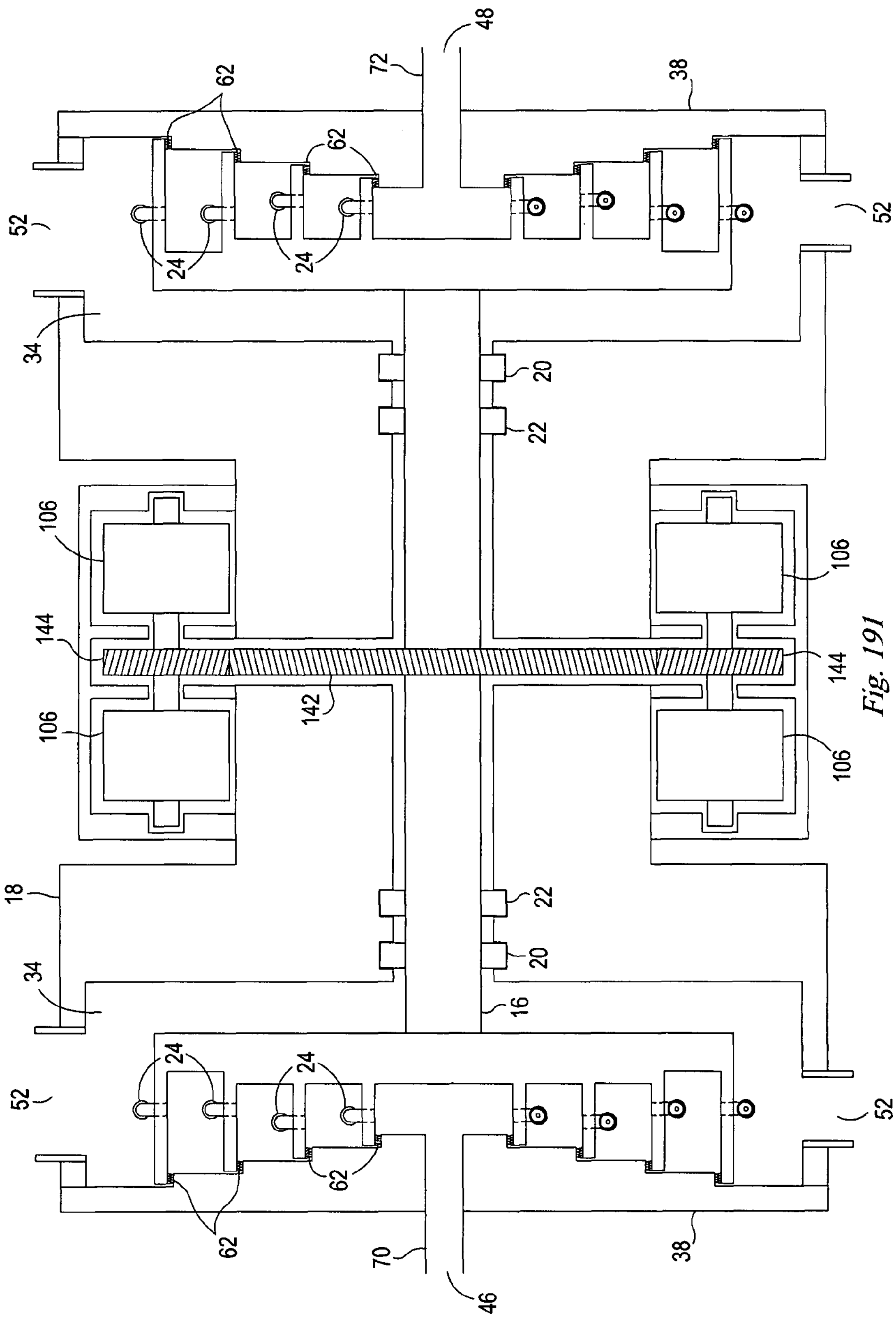
FIG. 191 is a cross-sectional view of another preferred pressure-compound embodiment of the invention, with generators.
Figure 192:
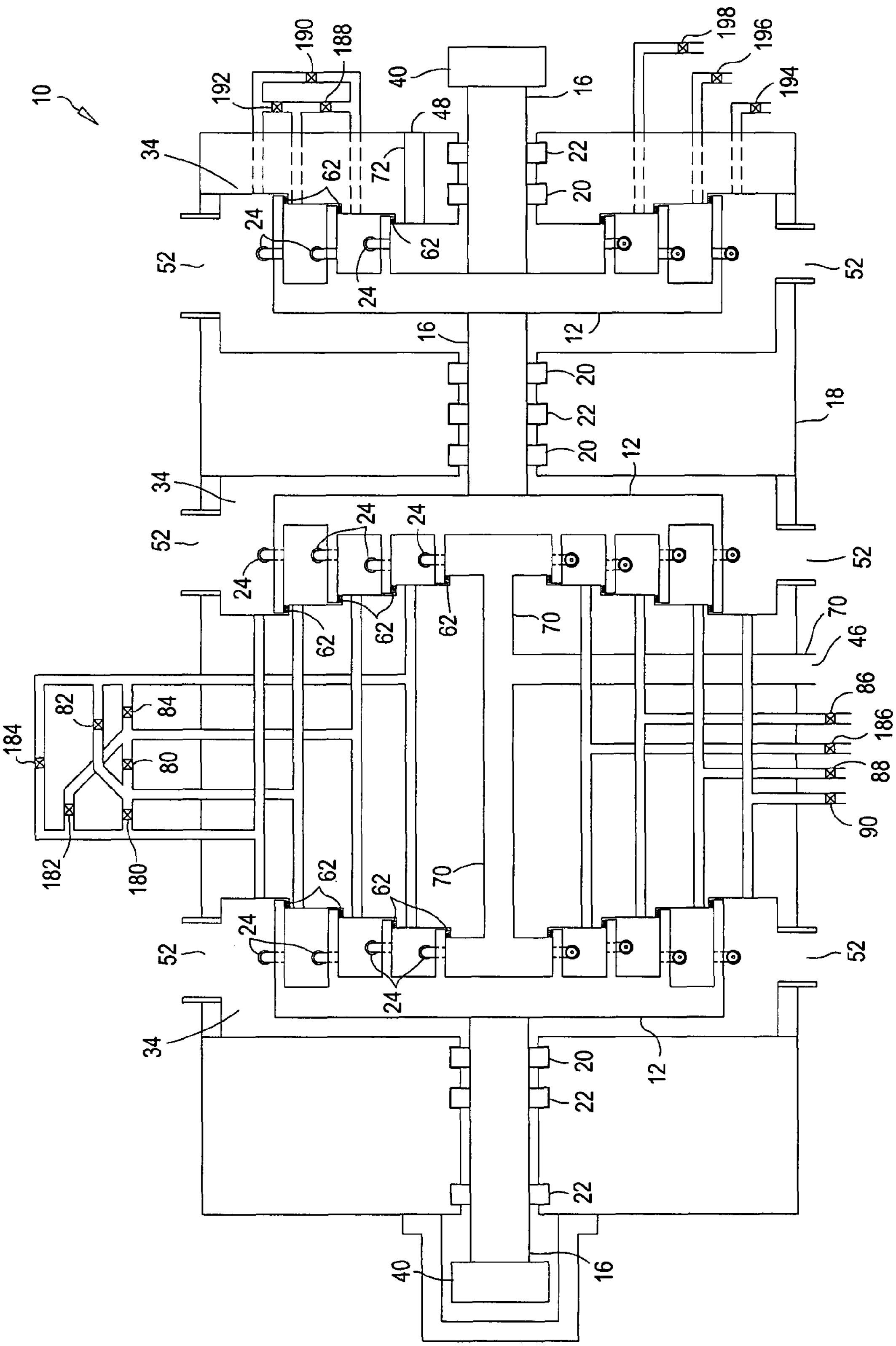
FIGS. 192 and 193 are cross-sectional views of other preferred pressure-compound embodiments of the invention.
Figure 193:
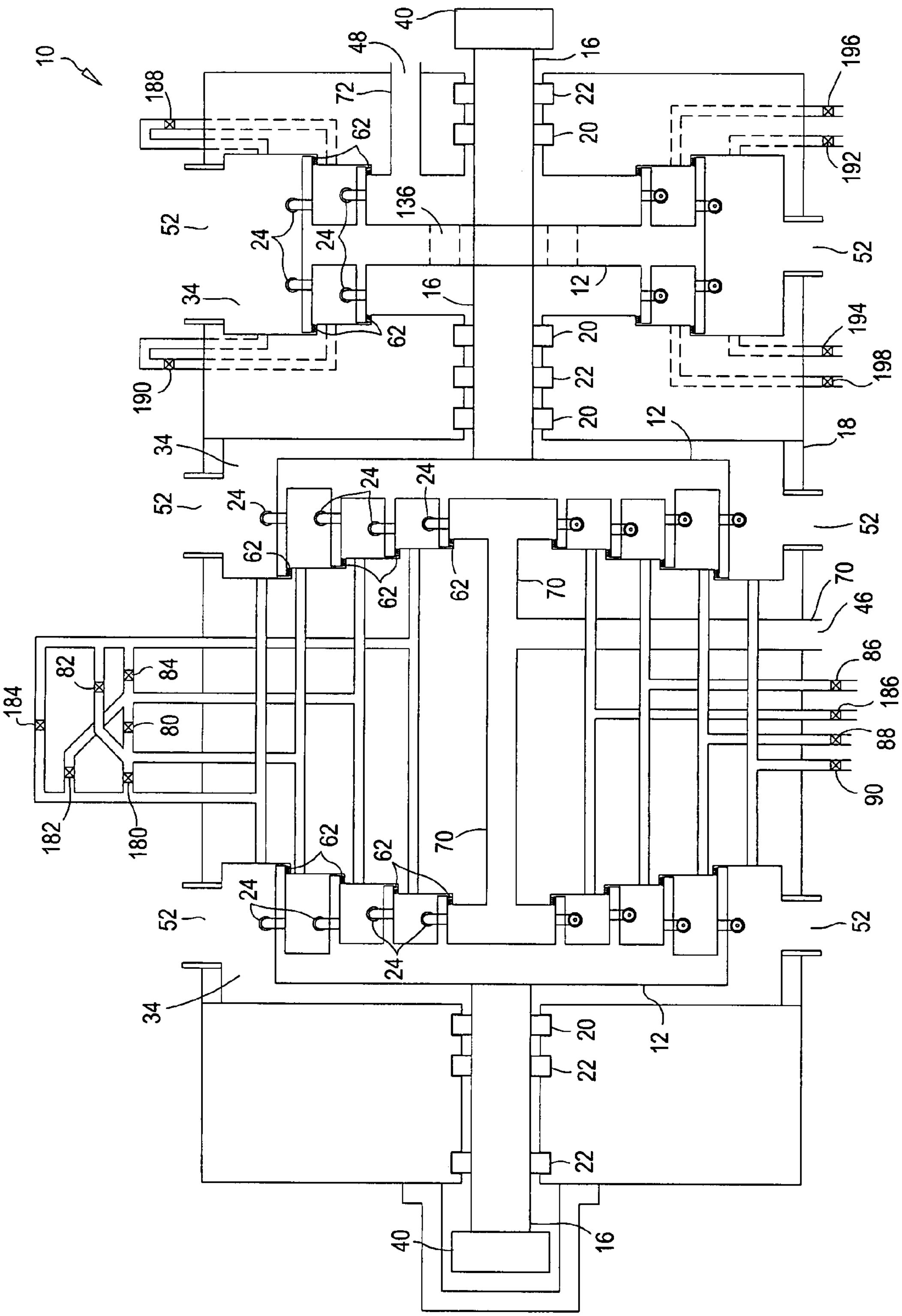
Figure 194:
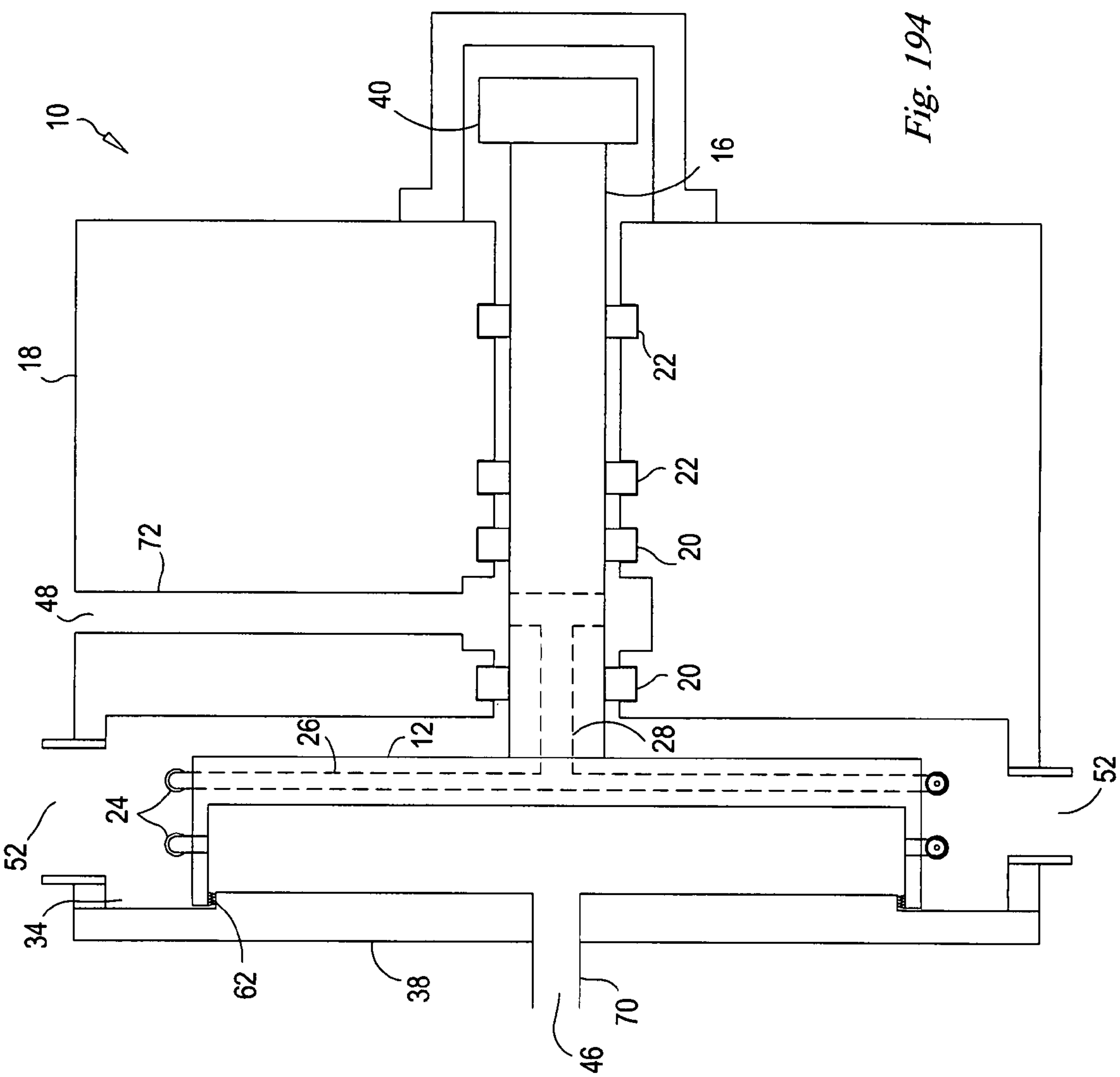
FIGS. 194 and 195 are cross-sectional views of other preferred single stage turbine shaft and rotor embodiments of the invention.

In another scenario, one or more rotor(s) is attached to each end of turbine shaft 16 and, due to the two or more inlet passageways for turbine shaft 16 being segregated by seals, as illustrated in FIG. 7, for example, one inlet fluid is admitted to one of the rotors or rotor sections until such flow rate exceeds the designed efficient flow rate for that particular rotor(s) or rotor section(s) and the excess flow is routed, preferably automatically, to one or more of the additional shaft passageway(s) hydraulically connected to one or more additional rotor(s) or rotor section(s). This maximizes the turbine efficiency and minimizes the capital cost of manufacturing a turbine capable of operating over a wide range of turbine mechanical work or output energy, as aforementioned in the previous paragraph. It is noteworthy that, although FIG. 7 illustrates a turbine shaft capable of accommodating an increased flow rate, as outlined above in this paragraph, non-shaft passageway(s) can substitute for any, or all, shaft passageway(s) in other preferred embodiments, as illustrated in FIGS. 186 and 193, as examples wherein axial force(s) imbalance would not necessarily be introduced, where inlet fluid 48 can merely be the excess of inlet fluid 46, rather than a different fluid substance or thermodynamic condition designated as an inlet fluid 48.

In yet another scenario, different size nozzles and/or different number of nozzles and/or different nozzle attachment location(s) are used. In this instance, one or more additional turbine rotor(s) or rotor section(s) may differ in diametrical and/or axial and/or curvature dimensions and/or cross-sectional shape or combinations thereof, thus, in preferred embodiments, various nozzle(s), set(s) of nozzles, or combustion chamber-nozzle unit(s) can be placed essentially everywhere on turbine rotor(s) or turbine rotor section(s) to produce an almost limitless number of distinct turbine mechanical work or output energies. These distinct turbine mechanical work or output energies are further multiplied by the present invention features such as multiple-fluid, multiple-substance, multiple-phase, multiple-pressure, multiple-temperature, and multiple-stage. Nozzle characteristics, such as pressure ratio, discharge pressure, discharge fluid velocity, to name a few examples, can be optimized to maximize turbine efficiency and output capacities, while minimizing turbine size, structural stresses, thermodynamic stresses, and manufacturing/operational/maintenance/installation costs, and maximizing turbine mechanical work or output energy to which a customer can upgrade. The above concepts are further enhanced when used in conjunction with the aforementioned turbine capabilities regarding (1) the variety of usage of turbine shaft passageway(s) and/or non-shaft passageway(s), and (2) the variety of usage of turbine rotor(s) or rotor section(s), giving the present invention the capability and capacity to satisfy many needs, whether current or future.

In another scenario, combinations of the above scenarios are envisioned. FIG. 1 illustrates, for example, a turbine engine having two rotors, with each rotor comprised of two rotor sections. FIG. 2 illustrates, for example, a turbine having three rotors, with one rotor comprised of two rotor sections. Also, it is easily envisioned from FIGS. 6, 7, 11, 12, 14, 17, 128, 132-136, 141, 142, 144-164, 181-185, 188-191 and 196-214, for examples, that more than one rotor 12 is/can be incorporated into turbine engine 10, i.e., one or more rotor(s) or rotor section(s) on each end of turbine shaft 16. Other combinations of turbine rotors or rotor section(s) are envisioned, including combinations of the above illustrations and including combinations of two or more non-mechanically-connected rotors (FIGS. 83-92, 106, 107, 138-140, 143, 186-189, 192, 193, 212, 218 and 226), in whole or in part, contained therein or discharging into the same, or multiple, turbine chambers.

Figure 18:
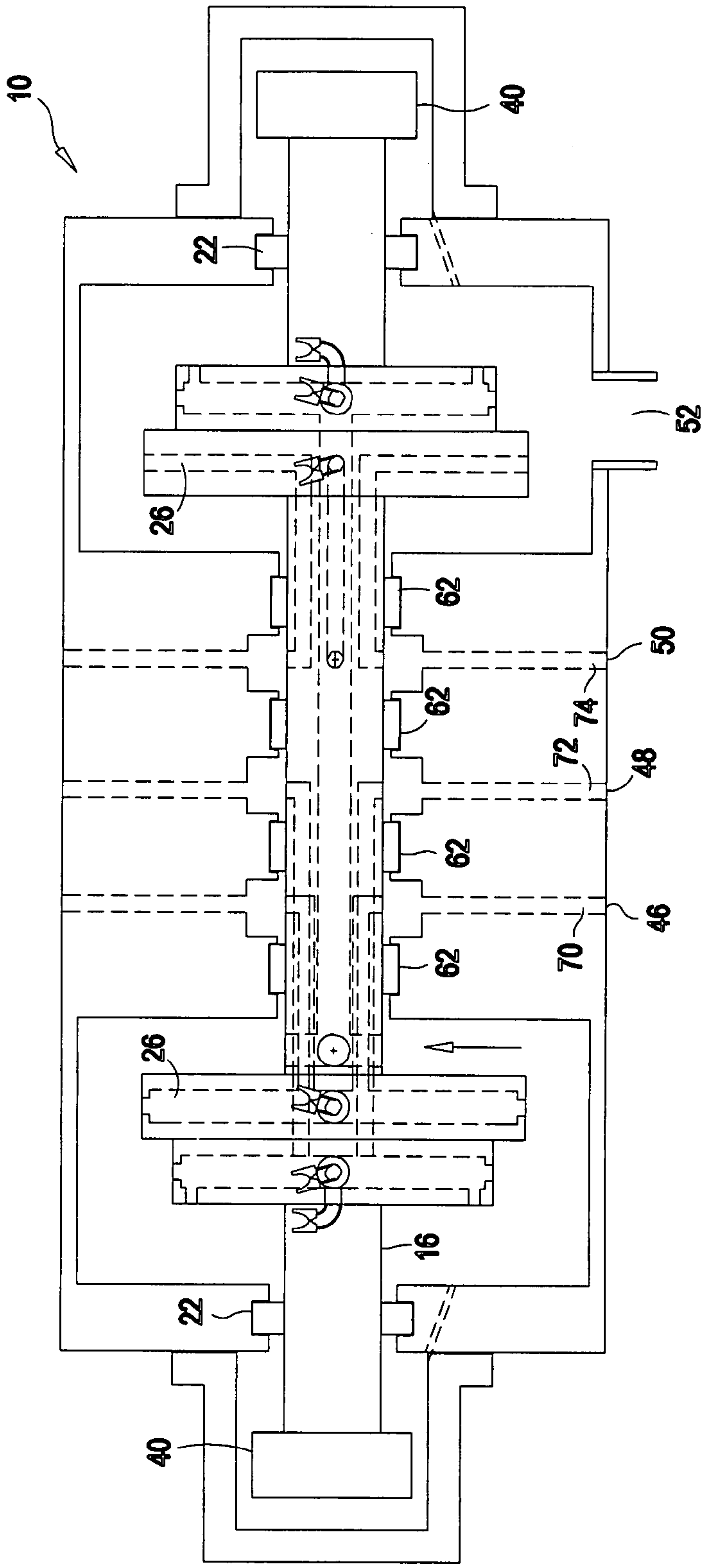
FIG. 18 is a cross-sectional view of a preferred pressure-compound embodiment of the invention.
Figure 19:
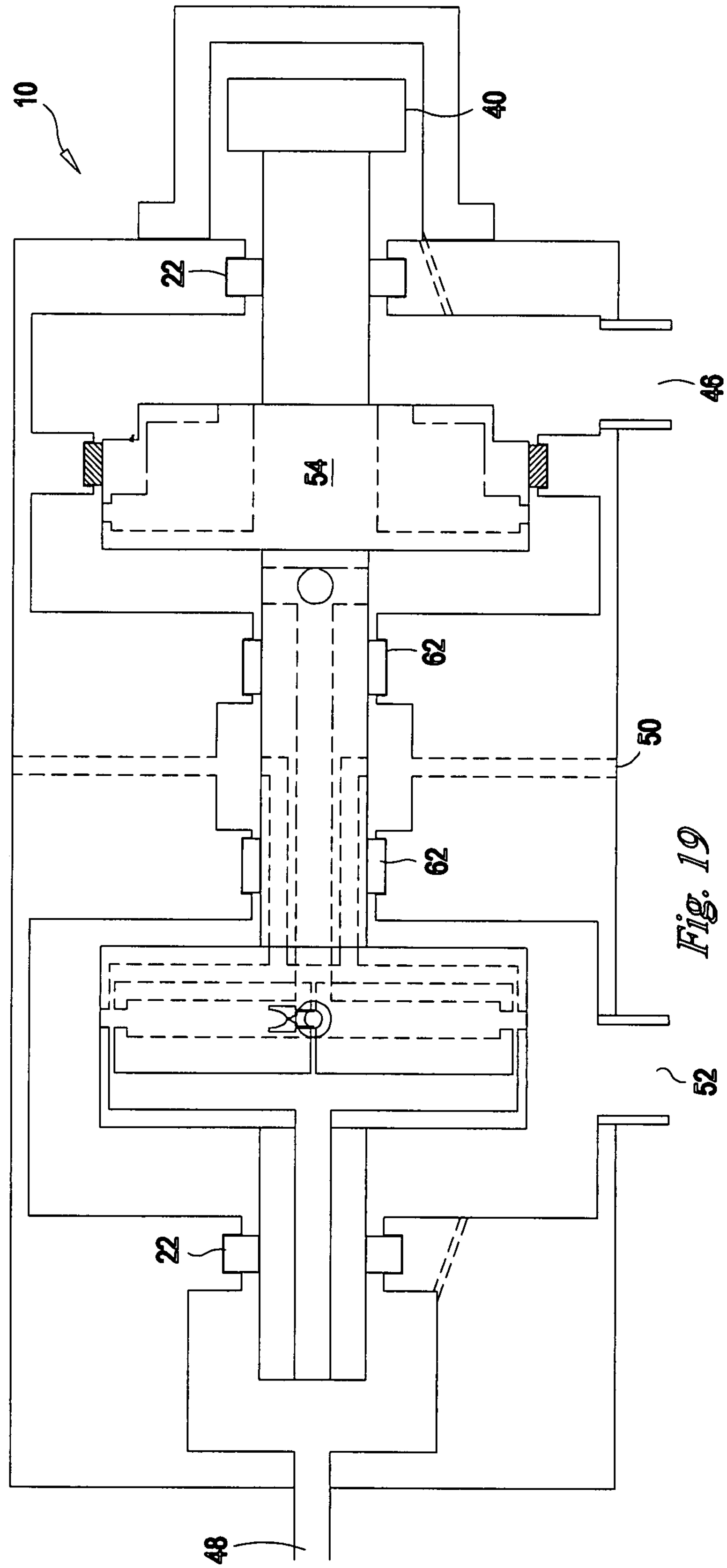
FIG. 19 is a cross-sectional view of a preferred gas turbine embodiment of the invention.

Referring to FIG. 18, another preferred embodiment of the present invention is presented. In this embodiment, first inlet fluid 46 is at a different thermodynamic condition from second inlet fluid 48, but both fluids are comprised of the same substance. For example, first inlet fluid may be high pressure steam and second inlet fluid may be a lower pressure steam/liquid water mixture. Both inlet fluids are routed through separate shaft passageways to different rotor sections of the same turbine rotor. The nozzle(s), or set(s) of nozzles, through which each inlet fluid exits, have different sizes so as to provide a nozzle exit pressure that is the same for both inlet fluids, i.e., the same common pressure of the turbine chamber. Likewise, referring to FIG. 19, first inlet fluid 46 is a different substance from second inlet fluid 48 and a different substance from third inlet fluid 50, with all inlet fluids exiting into the same turbine chamber. Although FIG. 19 illustrates the three inlet fluids passing through the same combustion chamber-nozzle unit(s), or set(s) of combustion chamber-nozzle units, as a preferred embodiment, another preferred embodiment has the third inlet fluid passing through separate nozzle(s), or set(s) of nozzles.

In a similar way, turbine rotor 12 may be comprised of two or more turbine rotor sections, as generally illustrated, for example, in FIGS. 1, 2, 195 and 217. Two or more turbine rotor sections are/can be used in the following situations.

Figure 195:
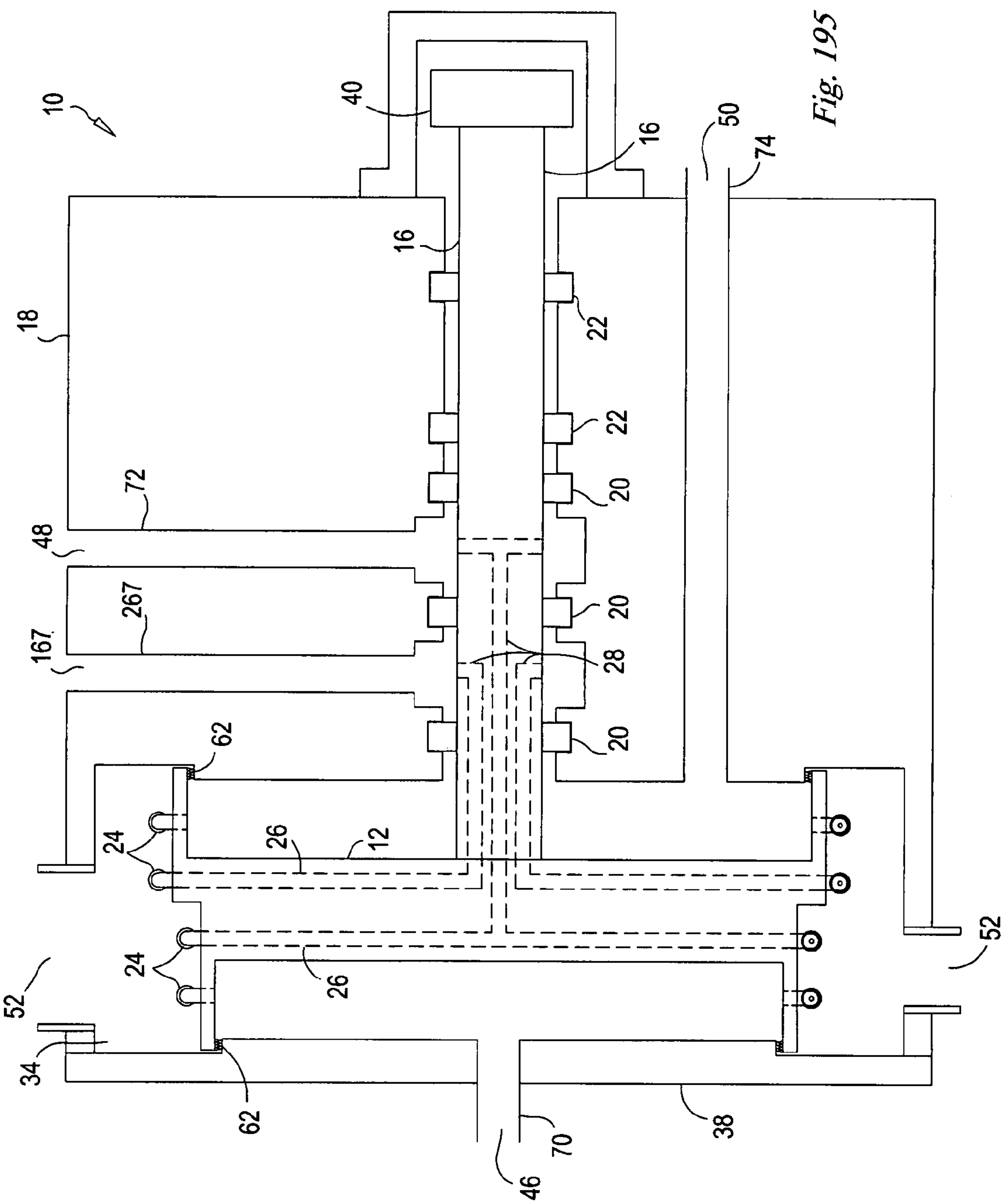
Figure 196:
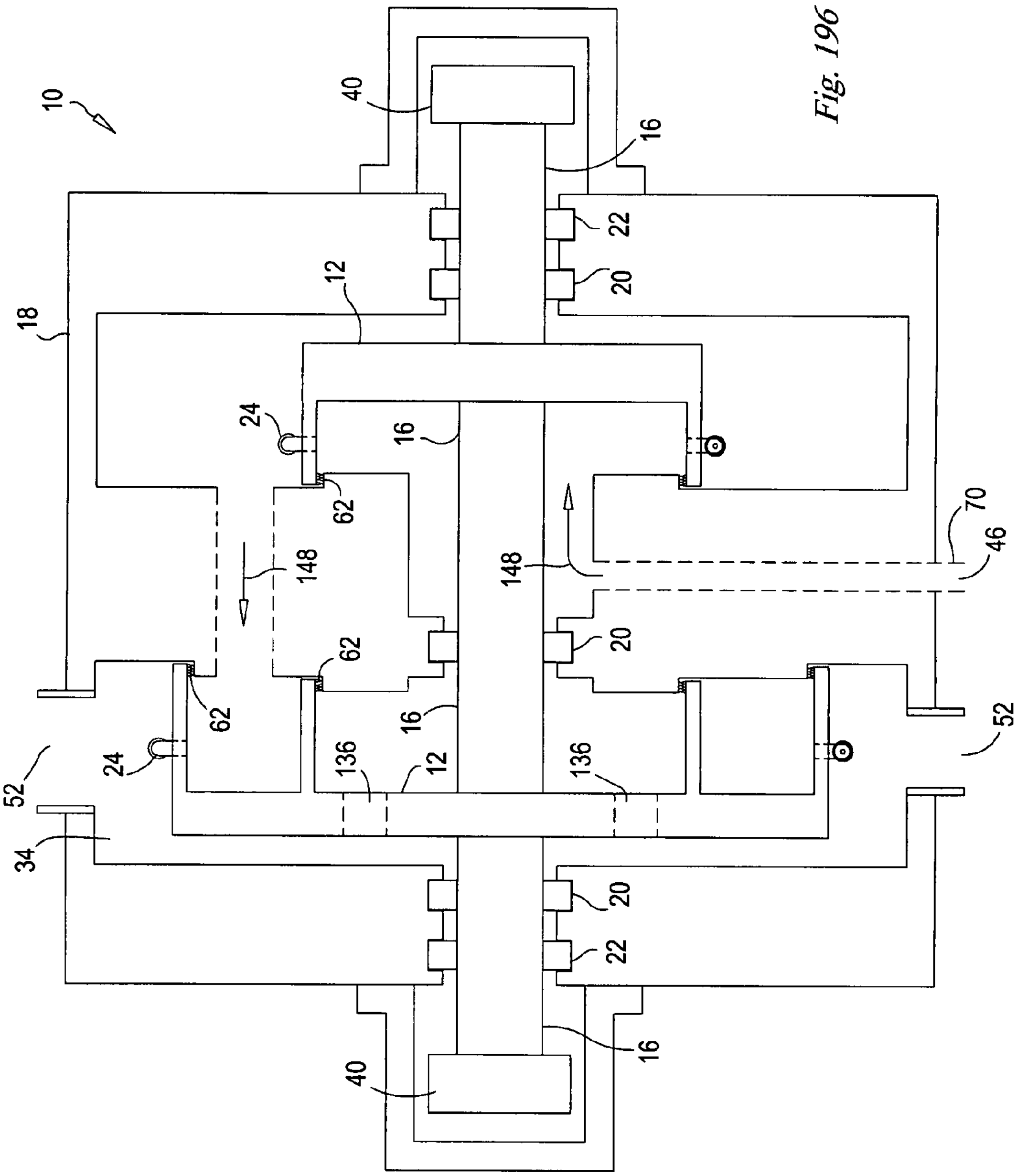
FIGS. 196-214 are cross-sectional views of other preferred pressure-compound embodiments of the invention.
Figure 197:
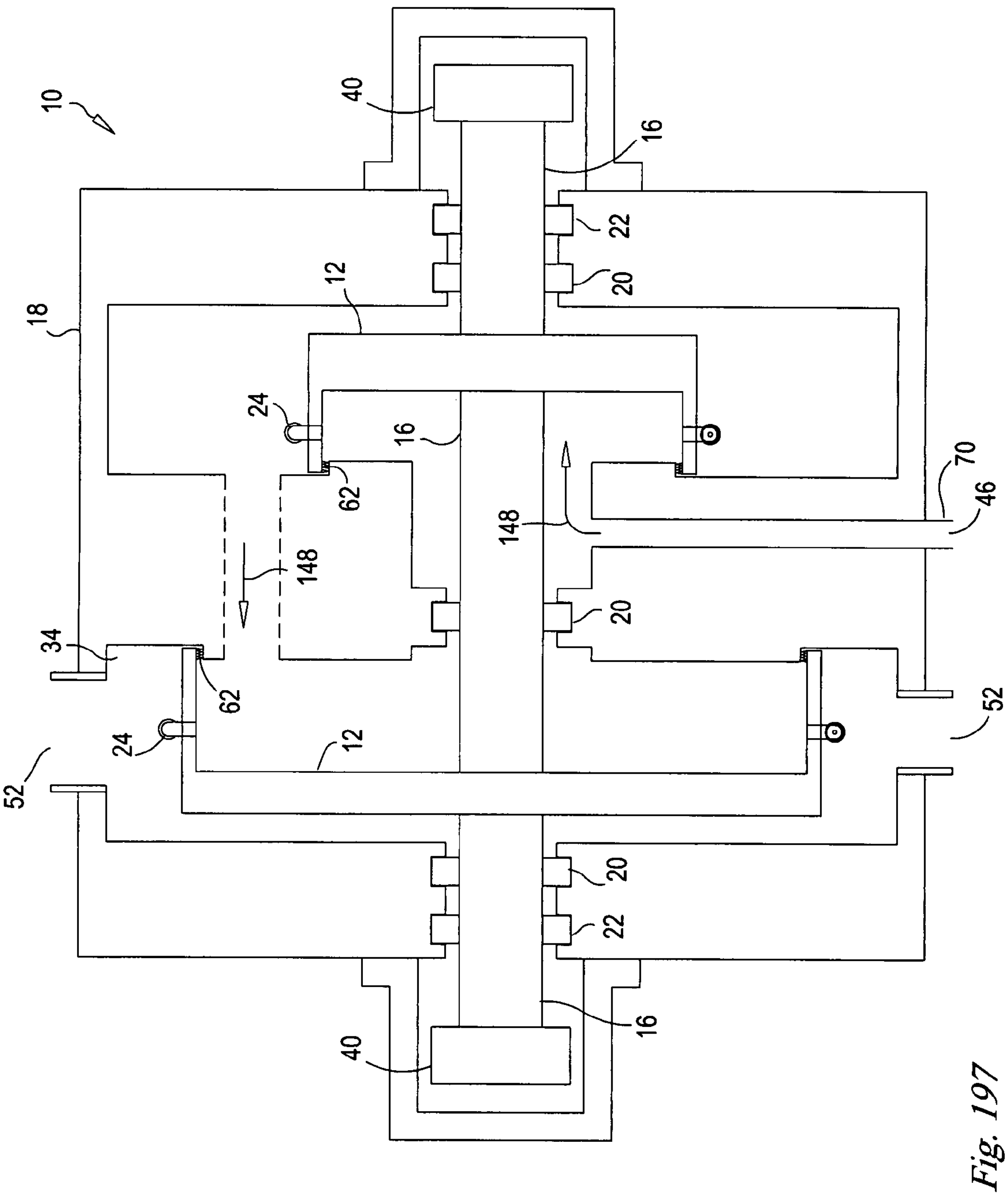
Figure 198:
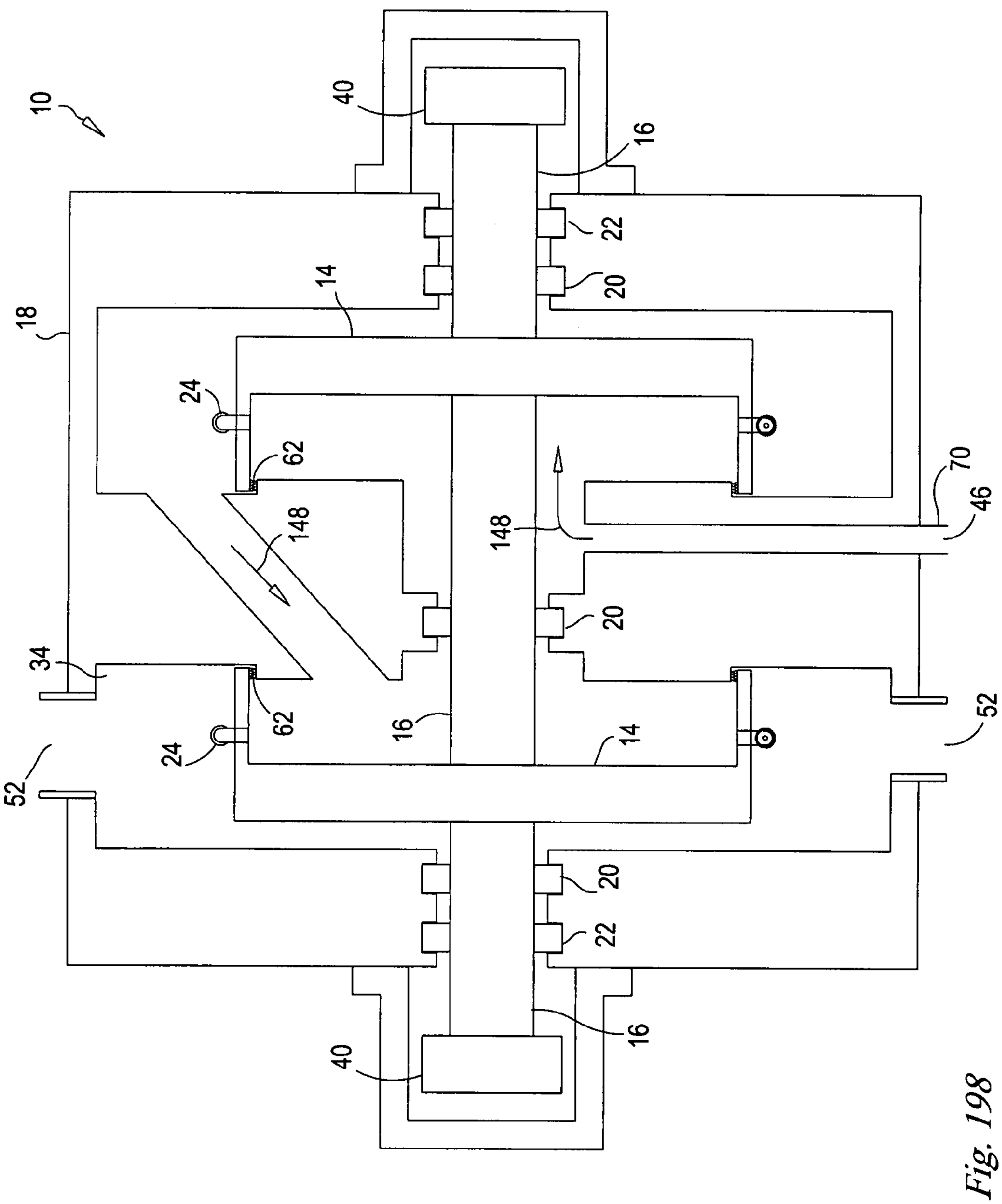
Figure 217:
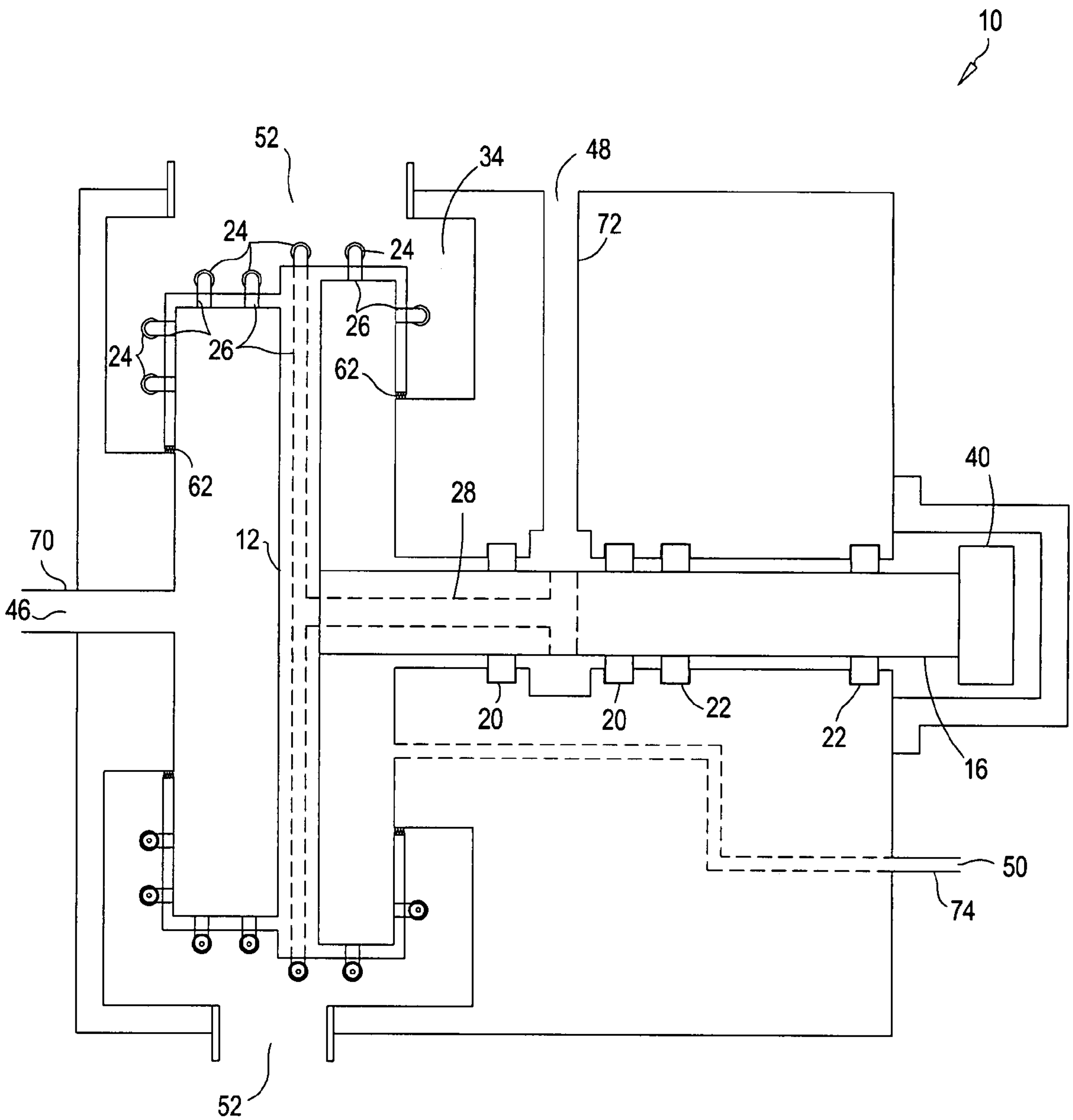

In one situation, in which there are two or more different inlet fluid substances, each inlet fluid can be routed individually to one or more separate turbine rotor section(s), as is envisioned by combining FIGS. 2, 15, 20-22, and as illustrated in FIGS. 195 and 217. These examples illustrate two or more inlet fluid paths, separated by appropriate seals, passing through turbine shaft passage way(s) and/or turbine non-shaft passage way(s), and hydraulically connected to the nozzle(s), set(s) of nozzles, or combustion chamber-nozzle unit(s), through one or more passage way(s) in one or more rotor section(s).

In another situation, when there are two or more inlet fluid(s) of the same substance but with different thermodynamic conditions, each inlet fluid can be routed individually to one or more turbine rotor section(s) of one or more turbine rotor(s), again as is envisioned by combining FIGS. 2, 15, 20 and 21, and as illustrated in FIGS. 195 and 217.

In yet another situation, when a particular inlet fluid flow rate is maximum for one rotor section, one or more additional rotor sections, manufactured as part of a given turbine rotor assembly (as illustrated in FIGS. 23-31 and 33-48) and heretofore secured from use by plug device(s), are made a useful part of a turbine rotor by removing the plug device(s) and installing nozzle(s), set(s) of nozzles, or combustion chamber-nozzle unit(s), thus, accommodating increased/additional flow rate of the particular inlet fluid into the turbine, thereby increasing the turbine mechanical work or output energy. This optimizes the turbine efficiency and greatly minimizes the manufacturing cost for a turbine of unprecedented mechanical work or output energy capacity.

In another situation, when a particular inlet fluid flow rate is maximized for one rotor section and one or more additional rotor section(s), manufactured as part of a given turbine rotor assembly and as illustrated in FIGS. 20-22, 32, and 154, for example, are hydraulically connected through shaft passageway(s) and/or non-shaft passageway(s) to separately sealed fluid inlets, a further increase in the flow rate of the particular inlet fluid into the turbine is routed, preferably automatically, to one or more of the separately sealed fluid inlet(s) that is/are hydraulically connected to nozzle(s), set(s) of nozzles, or combustion chamber-nozzle unit(s) attached to the one or more additional rotor section(s) until the flow rate through this next rotor section(s) is maximized, whereupon additional inlet fluid is routed to subsequent rotor section(s), and so on, to the extent of the number of rotor sections for a given turbine, thereby increasing the turbine mechanical work or output energy, all of which optimizes the turbine efficiency and greatly minimizes the manufacturing and operation/maintenance costs for a turbine of unprecedented mechanical work or output energy capacity.

In a further situation, when there is a need to use different size nozzles or different number of nozzles, one or more additional turbine rotor section(s) may differ in diametrical and/or axial and/or curvature dimensions and/or cross-sectional shape or combination thereof, relative to the dimensions of other rotor section(s).

In another situation, a combination of the above is envisioned. FIG. 1 illustrates, for example, a turbine with two rotors, with each rotor comprised of two rotor sections each. FIG. 2 illustrates, for example, a turbine with three rotors, with one rotor comprised of two rotor sections. Also, it is easily envisioned from FIGS. 20-31 and 33-48, for examples, and as illustrated in FIGS. 195 and 217, for examples, that more than one rotor section is/can be incorporated into turbine engine 10. Other combinations of turbine rotor sections, including combinations of the above illustrations, are envisioned.

In preferred embodiments of the present invention, nozzle(s), portion(s) of nozzle(s), set(s) of nozzles, or combustion chamber-nozzle unit(s), hydraulically connected to the turbine shaft passageway(s) and/or turbine non-shaft passageway(s), are located, in one or more location(s), (1) at, on, at a distance from (through connecting passageway(s)), integral with and/or recessed in the circumferential perimeter(s) of the turbine rotor(s) and/or turbine rotor sections, as illustrated in FIGS. 1, 2, 42-44, 49-72, 83-98, 109, 112, 116-118, 120-128, 132-136, 138-201, 213 and 214, (2) at, on, at a distance from (through connecting passageway(s)), integral with and/or recessed in the radial surface(s) of the turbine rotor(s) and/or rotor section(s), as illustrated in FIGS. 1, 42-44, 57-72, 83-98 and 222-226, (3) at, on, at a distance from (through connecting passageway(s)), integral with and/or recessed in the curved or slanted surface(s) of the turbine rotor(s) and/or rotor section(s), or (4) combination(s) thereof, as illustrated in FIGS. 107, 108, 110, 111, 113-115, 119, 129-131, 202-212 and 215-217. The size, number, shape, and location of nozzle(s), portion(s) of nozzle(s), set(s) of nozzles, or combustion chamber-nozzle unit(s) may vary substantially and vary generally, but not inclusively, as a function of (1) design speed of the turbine shaft, as revolutions per minute (RPM); (2) design characteristics of nozzle(s), portion(s) of nozzle(s), set(s) of nozzles, or combustion chamber-nozzle unit(s), including, but not limited to, Mach number, throat area-to-exit area ratio, inlet pressure-to-exit pressure ratio, exit fluid velocity; (3) anticipated, and unexpected, flow rate(s) for given application(s); (4) anticipated, and unexpected, substance(s) of inlet fluid(s); (5) anticipated, and unexpected, thermodynamic condition(s) of inlet fluid(s); (6) maximum and/or optimal turbine mechanical work or output energy; (7) maximum and/or optimal thermal energy after exiting the turbine; (8) erosive effects; (9) corrosive effects; (10) material composition; (11) operational and maintenance requirements for given application(s); or (12) combination(s) thereof, to name a few. Other functions guiding the selection of size, number and location of nozzle(s), or set(s) of nozzles, are envisioned.

In addition to the size, number and location of nozzle(s), portion(s) of nozzle(s), set(s) of nozzles, or combustion chamber-nozzle unit(s), said nozzle(s) may be equipped with fluid entrance shapes/profiles and/or exit shapes/profiles to enhance and/or control the transitional and/or exit parameters of the fluid(s), as said fluid(s) flow into, through and out of said nozzle(s). Currently, the entrance shape/profile and/or exit shape/profile sizes, contours and configurations are, or can be, determined (specified) using computer software and/or persons skilled in the art, and manufactured in accordance with the appropriate specification. For a single substance exiting said nozzle(s), the fluid entrance shapes/profiles and/or exit shapes/profiles of said nozzle(s) are designed (1) to enhance the efficiency of said nozzle(s) when the desired outcome of the turbine is to maximize the turbine mechanical work or output energy with such enhancement(s) of nozzle efficiency, wherein variations in the degree of enhancement appropriate for turbine applications in which other factors, including thermal energy needs, described herein are also applicable; (2) to control the desired characteristics of the exiting fluid when the exiting fluid is used either in a further process internal to the turbine or in a further process external to the turbine, or a combination thereof; (3) to control the desired thermodynamic conditions of the exiting fluid when the exiting fluid is used either in a further process internal to the turbine or in a further process external to the turbine, or a combination thereof; or (4) a combination thereof. For two or more substances exiting said nozzle(s), the fluid entrance shapes/profiles and/or exit shapes/profiles of said nozzle(s) are preferably designed (1) to enhance the efficiency of said nozzle(s) when the desired outcome of the turbine is to maximize the turbine mechanical work or output energy with such enhancement(s) of nozzle efficiency, wherein variations in the degree of enhancement appropriate for turbine applications in which other factors, including thermal energy needs, described herein are also applicable; (2) to control the desired characteristics of the exiting fluids when the exiting fluids are used either in a further process internal to the turbine or in a further process external to the turbine, or a combination thereof, wherein said control may result in desirable characteristics for one of the exiting fluids at the sacrifice of the other fluid(s) exiting said nozzle(s); (3) to control the desired thermodynamic conditions of the exiting fluids when the exiting fluids are used either in a further process internal to the turbine or in a further process external to the turbine, or a combination thereof, wherein said control may result in desirable thermodynamic conditions for one of the exiting fluids at the sacrifice of the other fluid(s) exiting said nozzle(s); (4) to control the desired characteristics of the exiting fluid(s) when the exiting fluid(s) is/are reaction fluid(s) of two or more inlet fluids, whether said exiting fluid(s) is/are used either in a further process internal to the turbine or in a further process external to the turbine, or a combination thereof, and wherein said control may result in desirable characteristics for one of the exiting fluid(s) at the sacrifice of the other fluid(s), if any, exiting said nozzle(s); (5) to control the desired thermodynamic conditions of the exiting fluid(s) when the exiting fluid(s) is/are reaction fluid(s) of two or more inlet fluids, whether said exiting fluid(s) is/are used either in a further process internal to the turbine or in a further process external to the turbine, or a combination thereof, and wherein said control may result in desirable characteristics for one of the exiting fluid(s) at the sacrifice of the other fluid(s), if any, exiting said nozzle(s); or (6) a combination thereof. For "(4)" and "(5)" in the preceding sentence, said control, either for desired characteristics or desired thermodynamic conditions or both, may be predicated on maintenance (e.g., pH) or environmental issues (e.g., NOx) versus operational issues (e.g., maximum turbine mechanical work or output energy).

Nozzle efficiency changes (either increasing or decreasing) as a function of the changed properties and/or thermodynamic state/condition of the fluid(s) passing through the nozzles. When such changes occur, either intentioned or not, the turbine mechanical work or output energy is affected appropriately. Intentioned changes can be deliberate at the source of inlet fluid(s), or such changes can be deliberate during the passage of said inlet fluid(s) into, through, in or about the turbine engine of the present invention. For example, one example is a nozzle in which the flow and properties can be choked or otherwise upset by flowing additional fluid, whether the same substance or not, into or about the fluid flow path of the nozzle; the locations and amounts of such upsets are envisioned by the applicant. It is also noted that, for any given nozzle, the axis of said nozzle, as said axis transverses the centerline of the passageway through which fluid(s) flow(s), can be linear or non-linear (curved) or combination thereof. For some applications, a non-linear, or partially non-linear, nozzle axis provides, for example, a less turbulent transition of fluid flow from the vectorial fluid flow direction in rotor passageway(s) to the vectorial fluid flow direction in nozzle exit area(s).

Preferably, in addition to the size, number, and location of nozzle(s), portion(s) of nozzle(s), set(s) of nozzles, or combustion chamber-nozzle unit(s), an appropriate nozzle orientation is preferably selected. Nozzle orientation is preferably such that the axis of the nozzle may be acute to the direction that is opposite the tangential direction of rotation 58 of the turbine rotor, acute to a line that traverses through the point of connection of the nozzle to the rotor and that is parallel to the axis of rotation 32 of the turbine shaft, acute to the radial axis (radial surface 66) of the turbine rotor, and/or acute to a tangent to the curvature (spherical) that is opposite the tangential direction of rotation of the turbine rotor. For example, the rotor may be spherical in shape or have another curvature and have nozzles that are mounted at, on, at a distance from (through connecting passageway(s)), integral with and/or recessed in any location on the spherical or other curved surface. FIGS. 1 and 49-58, as examples, illustrate various orientations of nozzle(s) or set(s) of nozzles. Preferably, the longitudinal axis of a given nozzle having an acute angle to the direction that is opposite the tangential direction of rotation 58 or, to the best (nearest) degree, an angle tangentially directed to coincide with a direction opposite the tangential direction of rotation 58 of the turbine rotor can most directly impart the best (highest) absolute value of the velocity vector associated with the fluid exit along said longitudinal axis of the nozzle to develop turbine mechanical work or output energy. However, for such nozzle orientation, due to the limited number of nozzles that can physically be placed at a given radius along the circumferential perimeter of a given diametrical size rotor or rotor section, such that one nozzle does not interfere with the performance of another nozzle or the turbine rotor, in general, the total maximum potential turbine mechanical work or output energy is not achieved.

Figure 55:
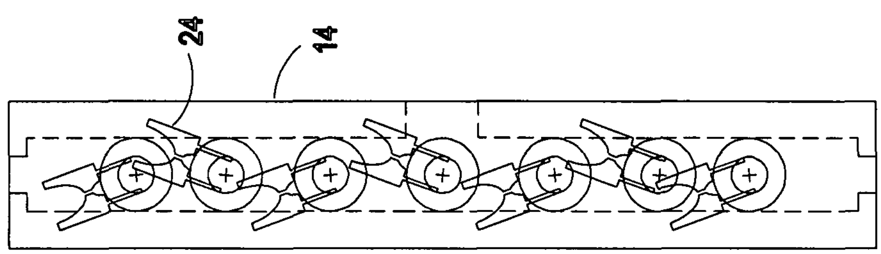
FIG. 55 is a cross-sectional view of the single rotor-section turbine shaft and rotor of another preferred embodiment of the invention.

To achieve a total energy output closer to the maximum potential turbine mechanical work or output energy, the angle of the longitudinal axis of the nozzle is preferably made acute to, or to the best degree in, the same tangential plane of, but opposite to, the tangential direction of rotation 58 of the turbine rotor, and said angle is acute to the radial plane (e.g., radial surface 66) of the turbine rotor, as illustrated herein. FIG. 55, in particular, illustrates the close proximity in which the maximum number of nozzles are/can be placed about the perimeter of a turbine rotor. The greater the number of nozzles, up to a point, the greater the fluid flow rate and, thus, in many instances, the greater the turbine mechanical work or output energy relative to the number of nozzle placement capacities for nozzle(s) having longitudinal axis(es) that is/are only made acute to, or to the best degree in, the same tangential plane of, but opposing, the tangential direction of rotation. In other words, in preferred embodiments, the small decrease in the kinetic energy-to-mechanical work conversion of the velocity vector associated with an acute angle of the longitudinal axis of the nozzle is more than offset by the larger increase in total turbine mechanical work or output energy, for a given size rotor or rotor section, especially when fluid(s) exiting the turbine body 18 are used for thermal energy purposes, whether said purposes are internal or external (e.g., end-user or thermal energy host/customer).

Figure 61:
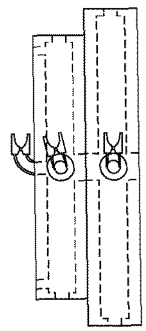
FIG. 61 is a cross-sectional view of the multiple-rotor-section turbine shaft and rotor of another preferred embodiment of the invention.
Figure 62:
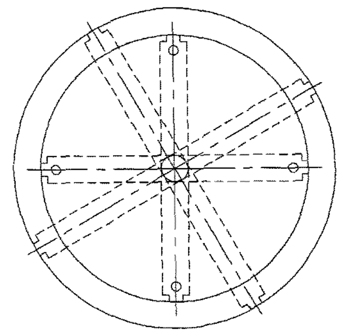
FIG. 62 is a elevation view of the multiple-rotor-section turbine shaft and rotor of another preferred embodiment of the invention of FIG. 61.
Figure 63:
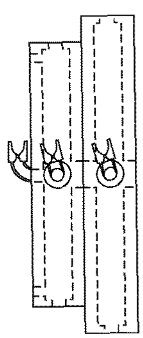
FIG. 63 is a cross-sectional view of the multiple-rotor-section turbine shaft and rotor of another preferred embodiment of the invention.
Figure 64:
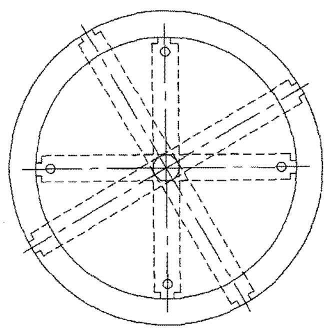
FIG. 64 is a elevation view of the multiple-rotor-section turbine shaft and rotor of another preferred embodiment of the invention of FIG. 63.
Figure 65:
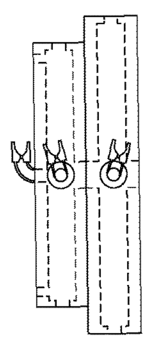
FIG. 65 is a cross-sectional view of the multiple-rotor-section turbine shaft and rotor of another preferred embodiment of the invention.
Figure 66:
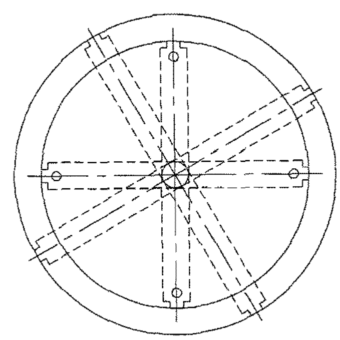
FIG. 66 is a elevation view of the multiple-rotor-section turbine shaft and rotor of another preferred embodiment of the invention of FIG. 65.
Figure 67:
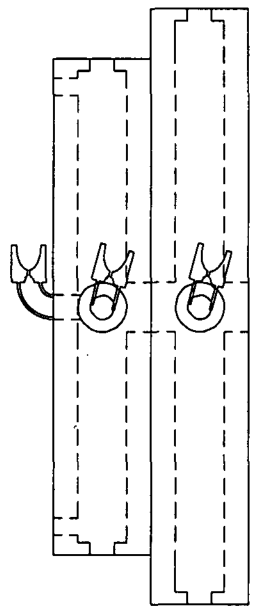
FIG. 67 is a cross-sectional view of the multiple-rotor-section turbine shaft and rotor of another preferred embodiment of the invention.
Figure 68:
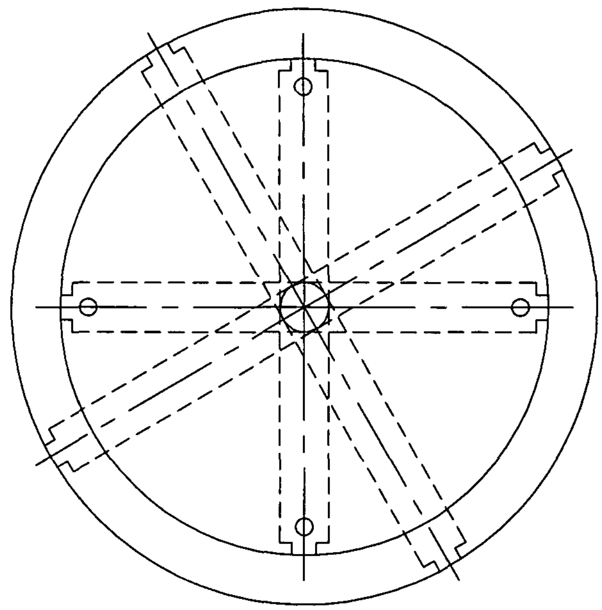
FIG. 68 is a elevation view of the multiple-rotor-section turbine shaft and rotor of another preferred embodiment of the invention of FIG. 67.
Figure 69:
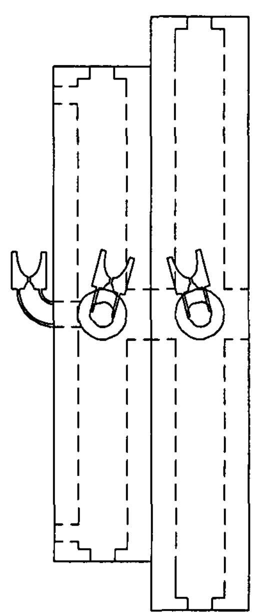
FIG. 69 is a cross-sectional view of the multiple-rotor-section turbine shaft and rotor of another preferred embodiment of the invention.
Figure 70:
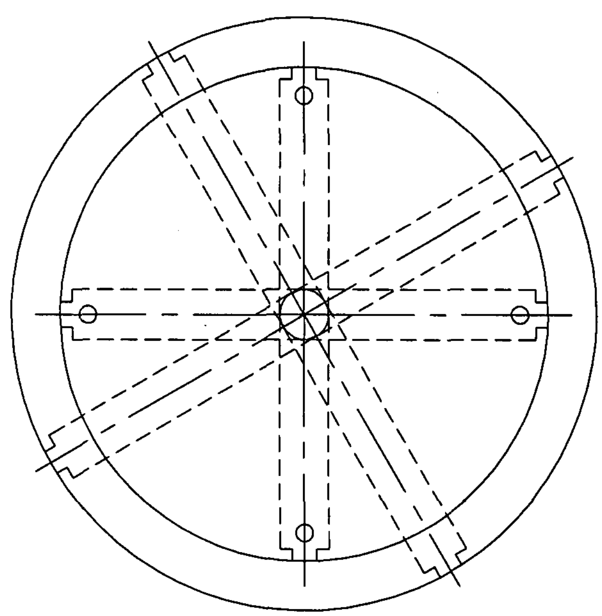
FIG. 70 is a elevation view of the multiple-rotor-section turbine shaft and rotor of another preferred embodiment of the invention of FIG. 69.
Figure 71:
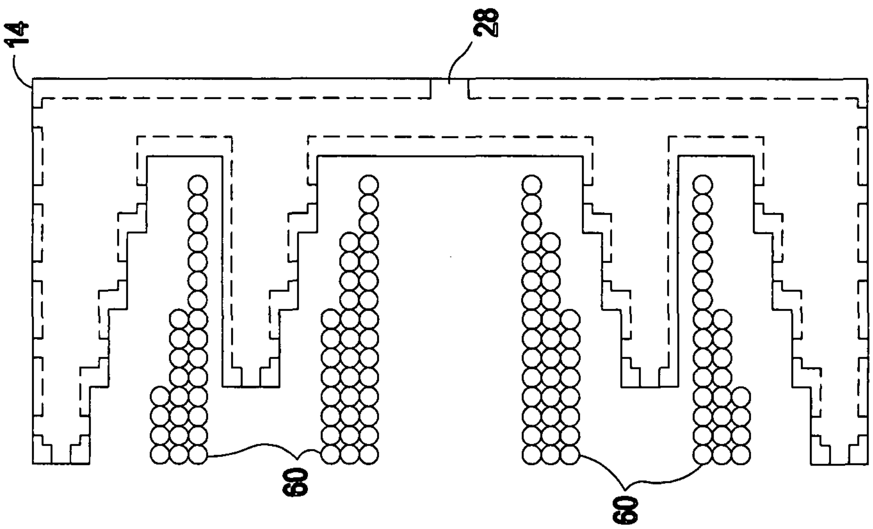
FIG. 71 is a cross-sectional view of the multiple-rotor-section turbine shaft and rotor of another preferred embodiment of the invention.
Figure 72:
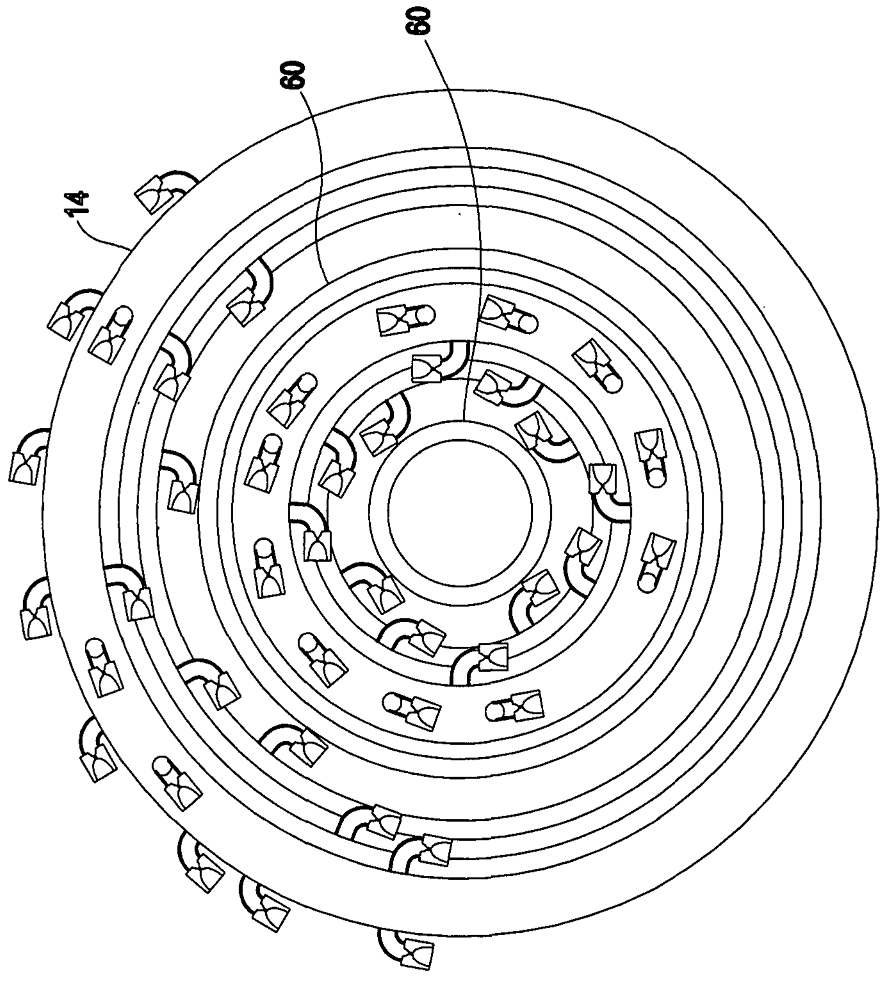
FIG. 72 is a elevation view of the multiple-rotor-section turbine shaft and rotor of another preferred embodiment of the invention of FIG. 71.
Figure 74:
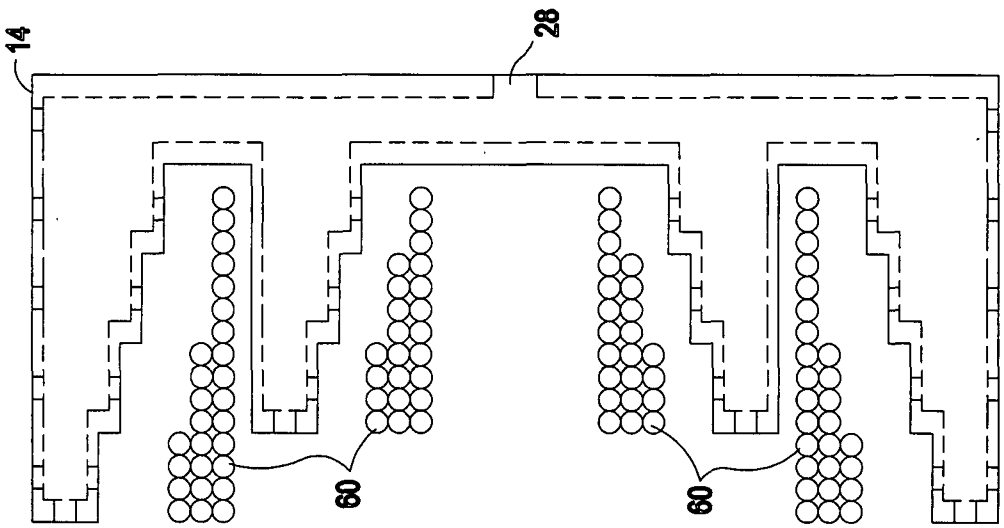
FIGS. 73-76 are cross-sectional views of the multiple-rotor-section turbine shafts and rotors of other preferred embodiments of the invention.
Figure 73:
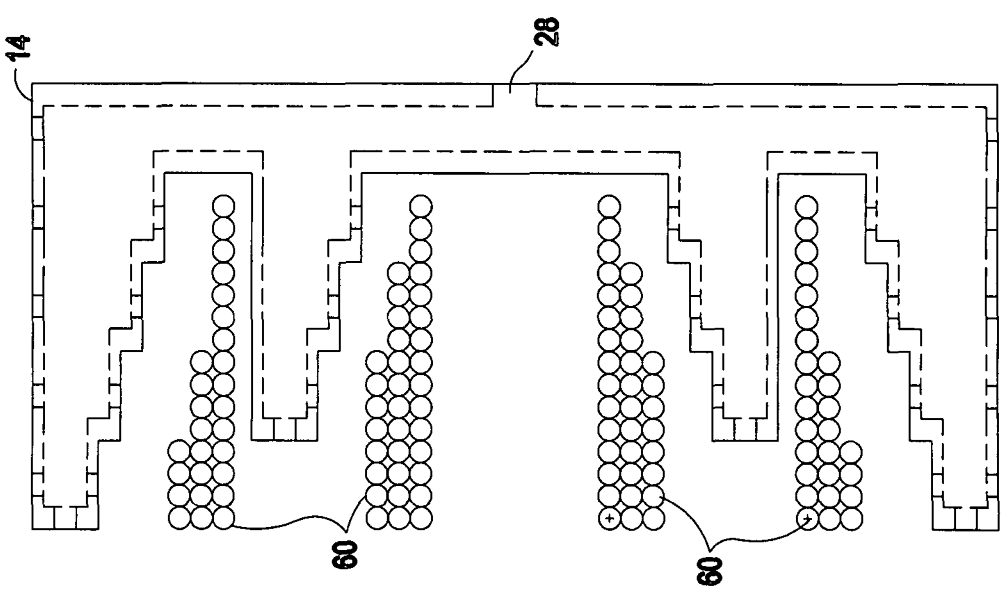
Figure 76:
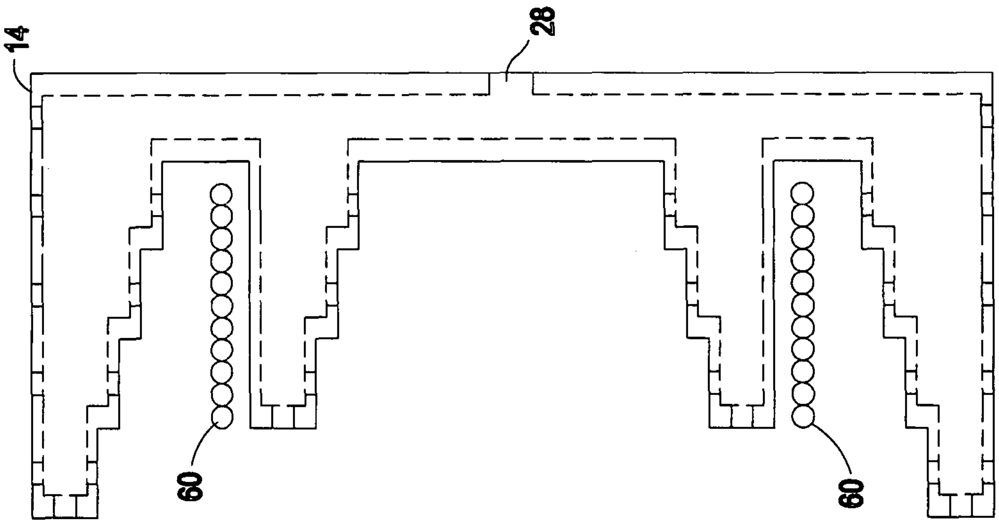
Figure 75:
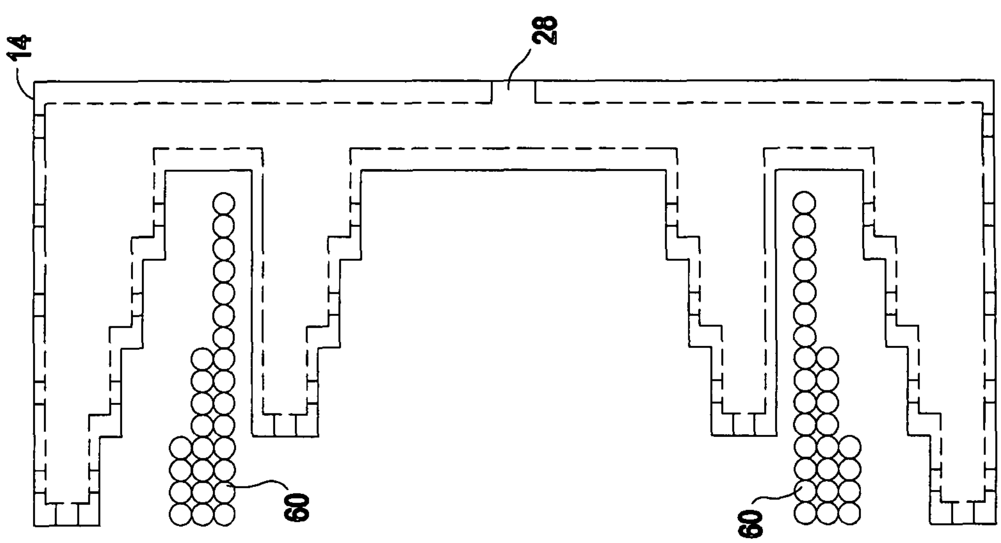
Figure 77:
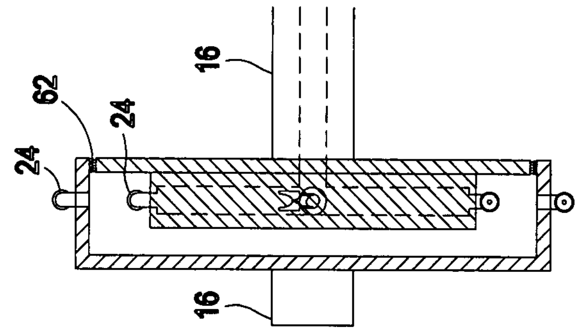
FIG. 77 is a cross-sectional view of a preferred pressure-compound embodiment of the invention.
Figure 78:
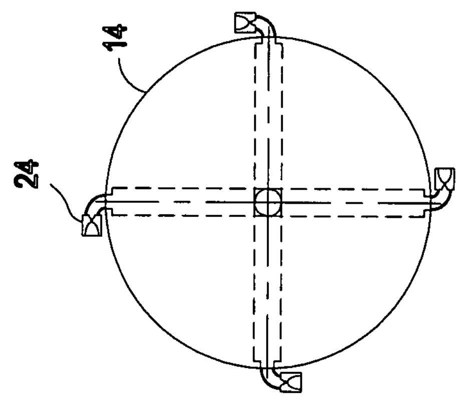
FIG. 78 is a cross-sectional view of one rotor of a preferred pressure-compound embodiment of the invention of FIG. 77.
Figure 79:
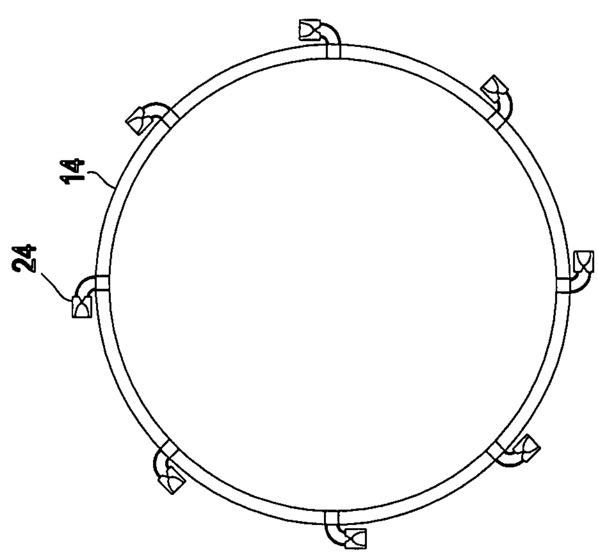
FIG. 79 is a cross-sectional view of another rotor of a preferred pressure-compound embodiment of the invention of FIG. 77.
Figure 80:
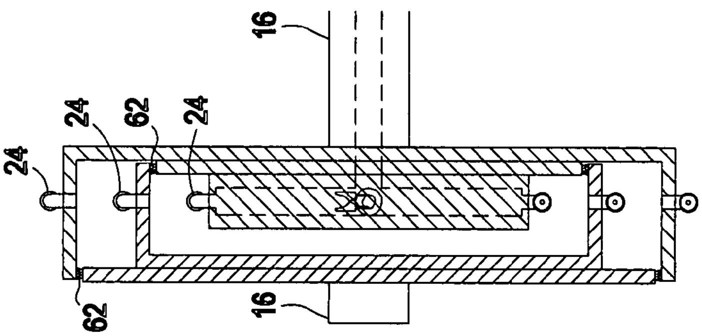
FIG. 80 is a cross-sectional view of a preferred pressure-compound embodiment of the invention.
Figure 81:
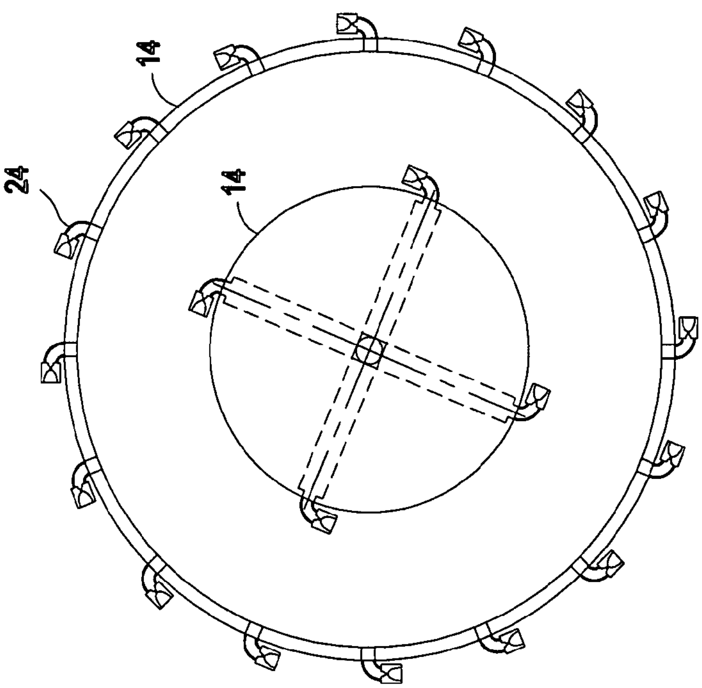
FIG. 81 is a cross-sectional view of one rotor of a preferred pressure-compound embodiment of the invention of FIG. 80.
Figure 82:
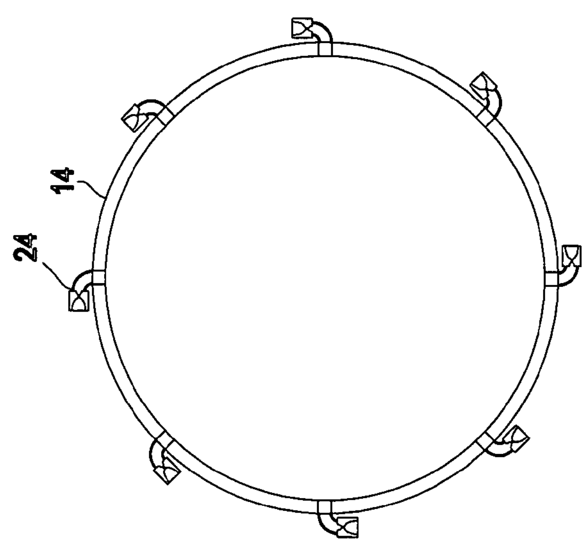
FIG. 82 is a cross-sectional view of the other rotor of a preferred pressure-compound embodiment of the invention of FIG. 80.
Figure 84:
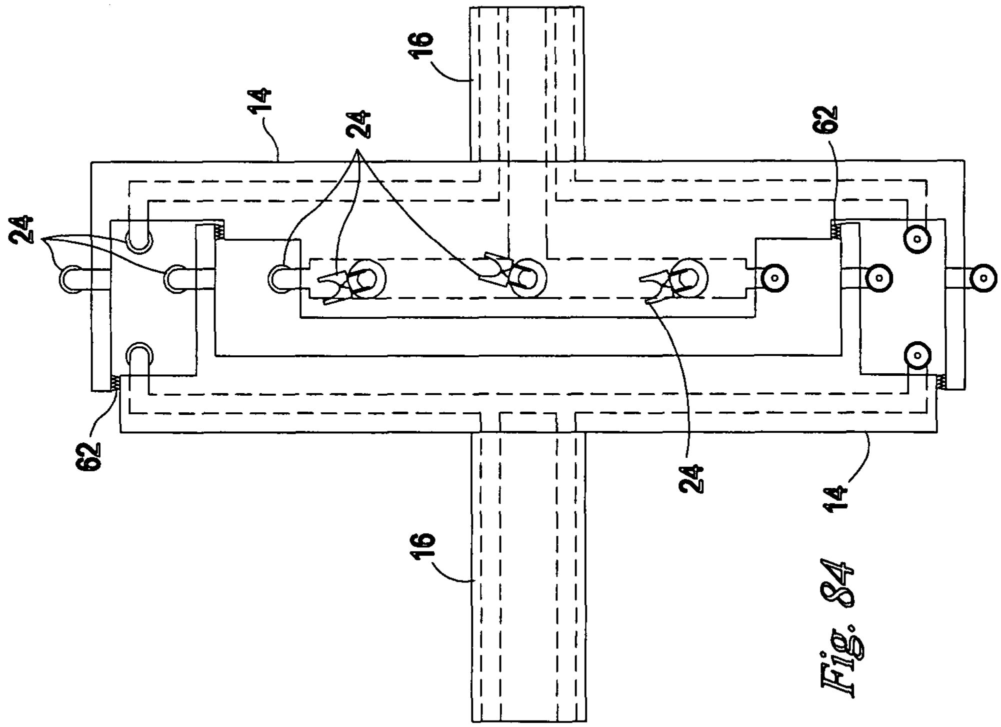
FIG. 84 is a cross-sectional view of a pressure-compound rotor of another preferred embodiment of the invention.
Figure 83:
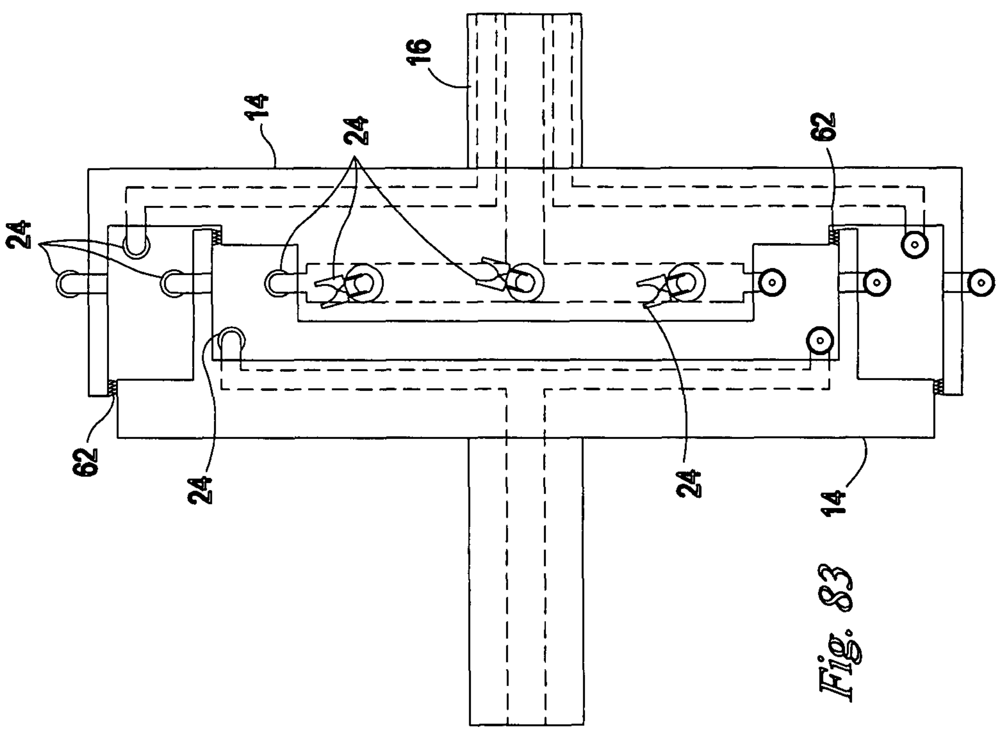
FIG. 83 is a cross-sectional view of a pressure-compound rotor of a preferred embodiment of the invention.
Figure 85:
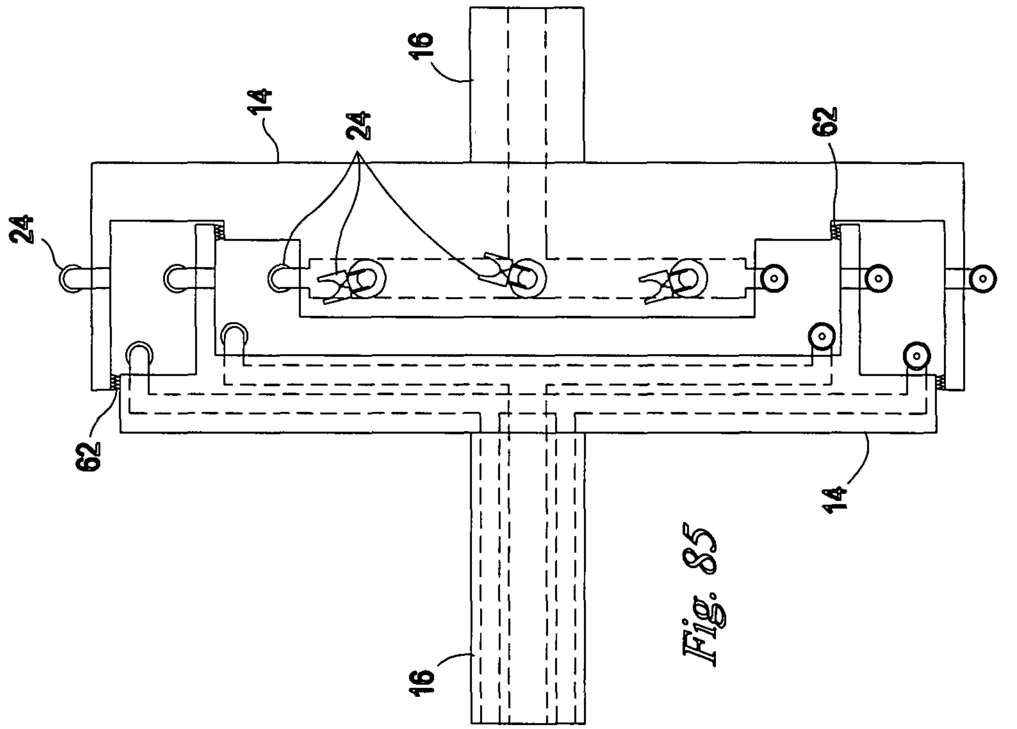
FIG. 85 is a cross-sectional view of a pressure-compound rotor of another preferred embodiment of the invention.
Figure 84A:
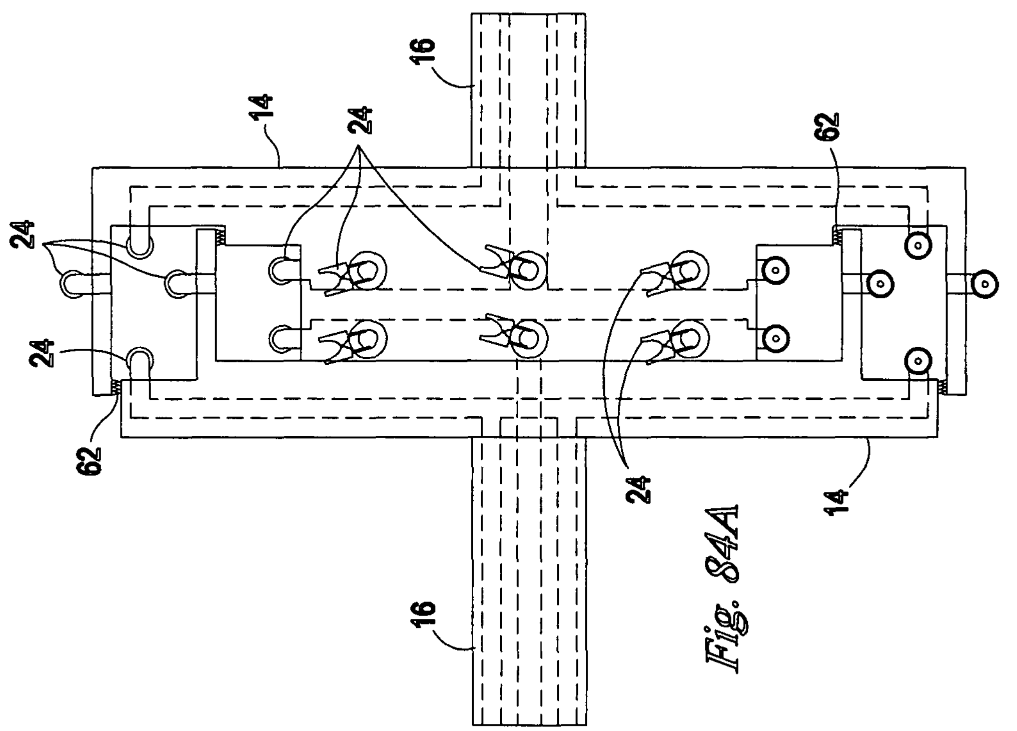
FIG. 84A is a cross-sectional view of a pressure-compound rotor of another preferred embodiment of the invention.
Figure 86:
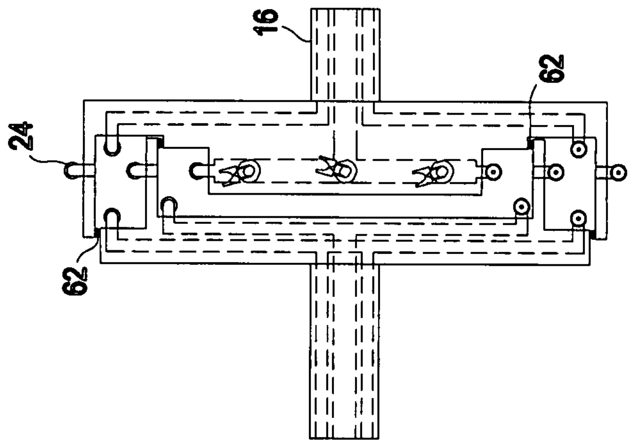
FIG. 86 is a cross-sectional view of a preferred pressure-compound embodiment of the invention.
Figure 87:
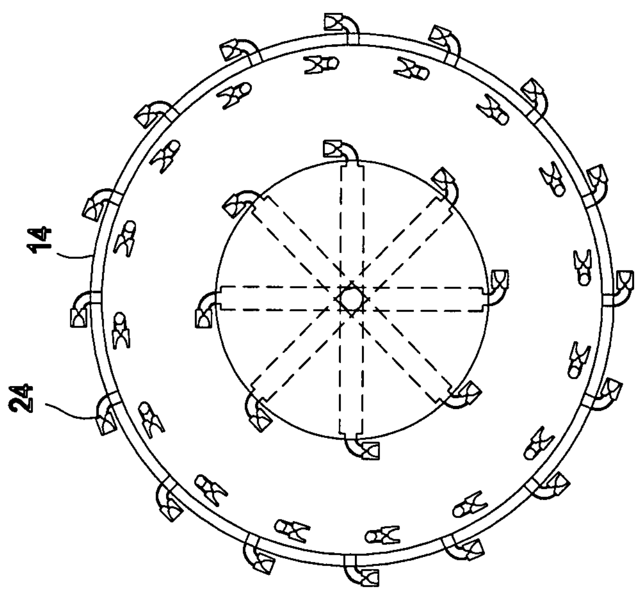
FIG. 87 is a cross-sectional view of one rotor of a preferred pressure-compound embodiment of the invention of FIG. 86.
Figure 88:
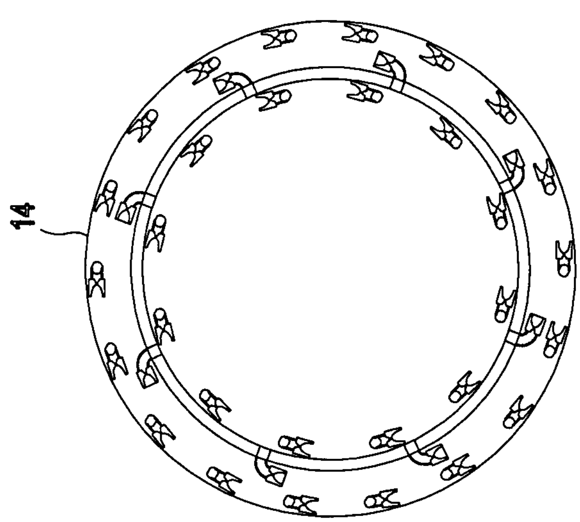
FIG. 88 is a cross-sectional view of the other rotor of a preferred pressure-compound embodiment of the invention of FIG. 86.
Figure 91:
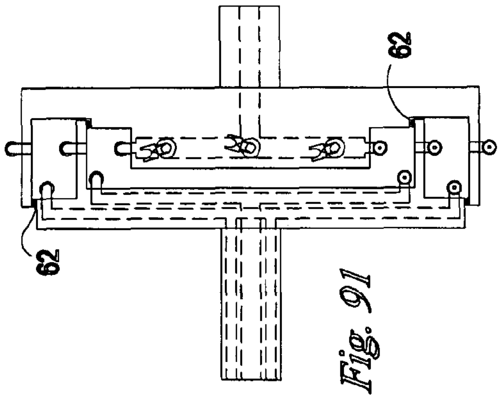
FIGS. 89-91 are cross-sectional views of other preferred pressure-compound embodiments of the invention.
Figure 92:
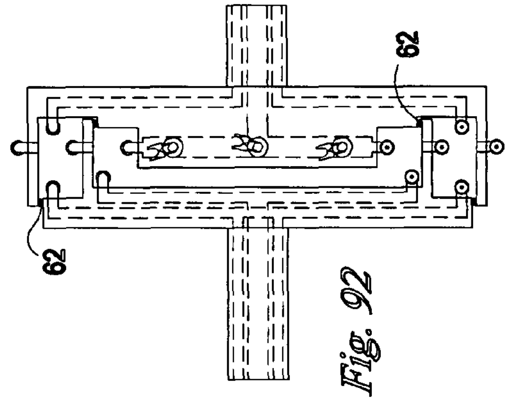
FIG. 92 is a cross-sectional view of a preferred pressure-compound embodiment of the invention.
Figure 90:
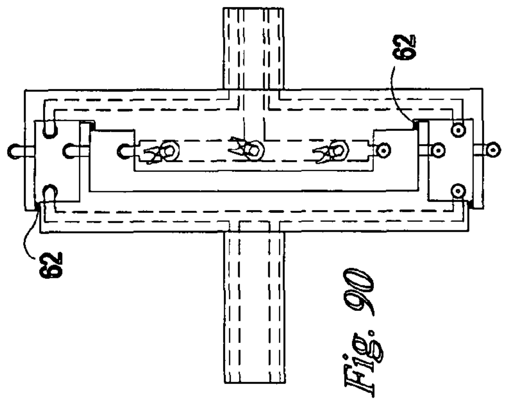
Figure 93:
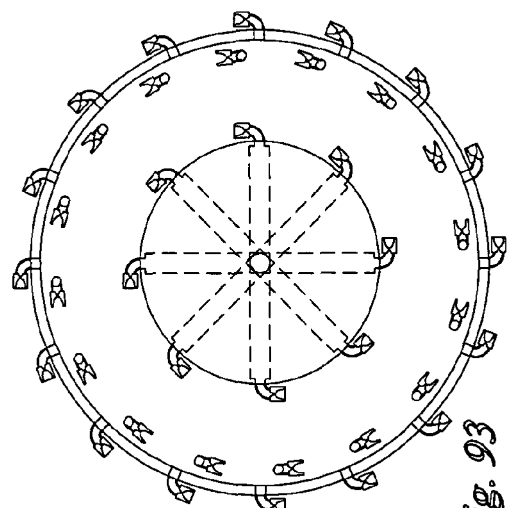
FIG. 93 is a cross-sectional view of one rotor of a preferred pressure-compound embodiment of the invention of FIG. 92.
Figure 89:
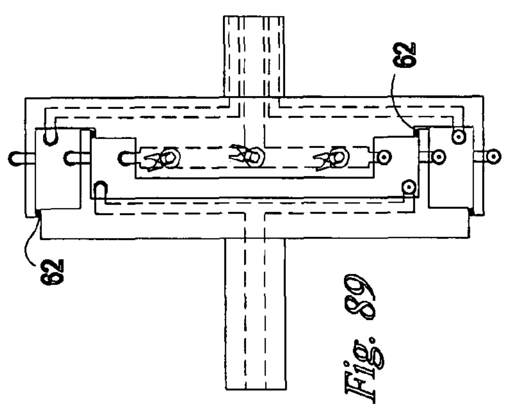
Figure 94:
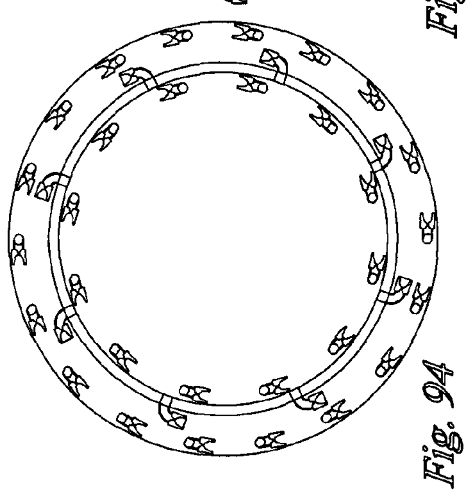
FIG. 94 is a cross-sectional view of the other rotor of a preferred pressure-compound embodiment of the invention of FIG. 92.
Figure 95:
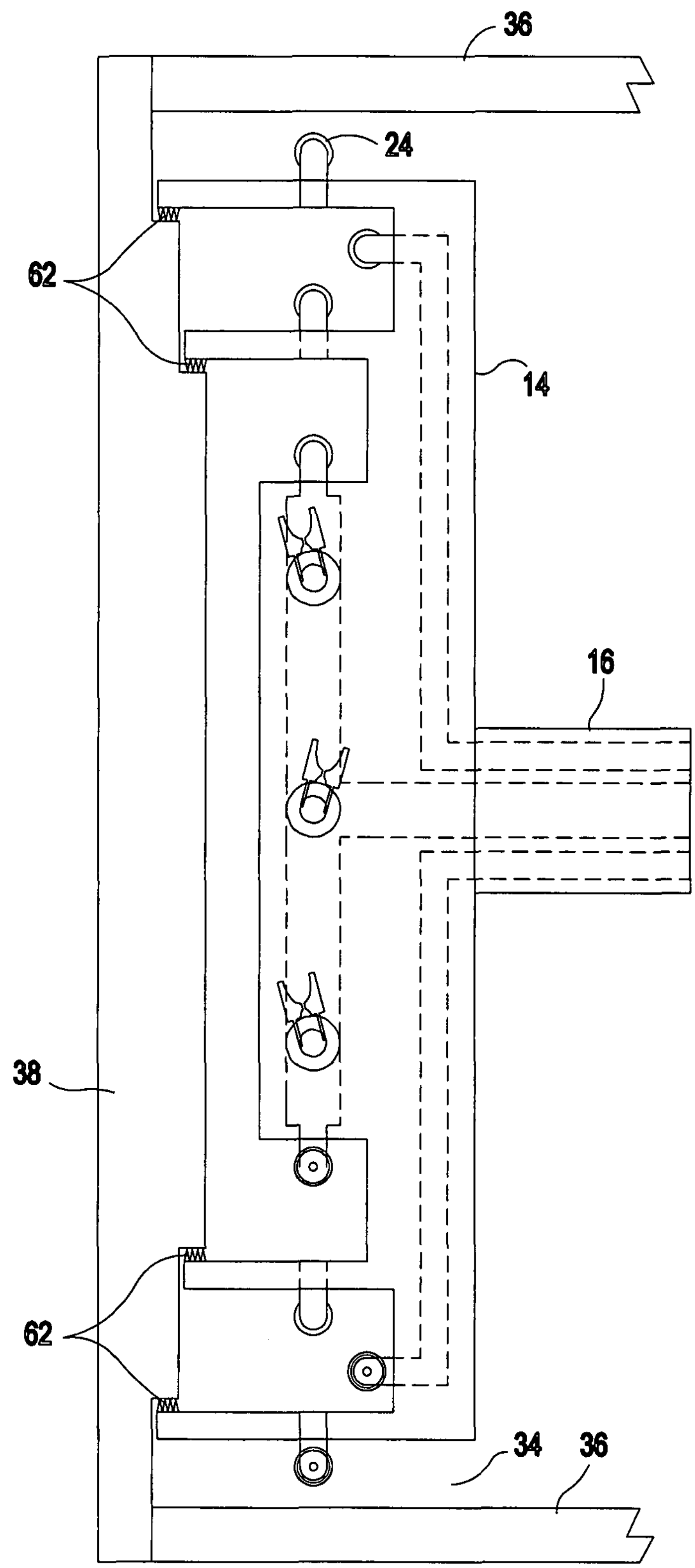
FIGS. 95-98 are cross-sectional views of other preferred pressure-compound embodiments of the invention.

It is noteworthy that, for certain preferred embodiments, one or more turbine rotor(s) and/or turbine rotor section(s) may have nozzle(s) with the nozzle longitudinal axis in the radial plane 66 and forming an acute angle to the direction that is opposite the tangential direction of rotation 58 of the turbine rotor, and one or more other turbine rotor(s) and/or other turbine rotor section(s) may have nozzle(s) with the nozzle longitudinal axis forming an acute angle to the radial plane 66 of the associated turbine rotor, as illustrated in FIG. 61, for example. For other preferred embodiments, two or more turbine rotor(s) and/or turbine rotor section(s) may have nozzle(s) with the nozzle longitudinal axis forming acute angle(s) to radial plane 66 of the associated turbine rotor or turbine rotor section, and such angle(s) are in the same direction, as illustrated in FIGS. 63 and 67, for examples; for such embodiments, typically, there is/are other turbine rotor(s) or turbine rotor section(s) on the turbine shaft with said angle(s) in opposing directions. For still other preferred embodiments, two or more turbine rotor(s) and/or turbine rotor section(s) may have nozzle(s) with the nozzle longitudinal axis forming acute angle(s) to the radial plane 66 of the associated turbine rotor or turbine rotor section, and such angle(s) are in opposing directions, as illustrated in FIGS. 66 and 69, for examples. Likewise, other preferred embodiments of the present invention are envisioned in which the nozzle longitudinal axis forming an acute angle to the direction opposite the tangential direction of rotation 58 of the turbine rotor is combined with any one or two of the other acute angles mentioned in the previous two paragraphs, which provides for any nozzle longitudinal axis angle, relative to a three-dimensional coordinate system, of which further provides for an almost unlimited ability for optimization of fluid conditions, fluid substances, nozzle characteristics, sizing capacities, fluid mixing, turbine stages, turbine efficiency, turbine mechanical work or output energy, and fluids exiting the turbine, to name a few examples, especially when coupled with the cost savings associated with manufacturing, operation, maintenance, installation, and upgradeability. Such nozzle configurations and optimization and associated advantages are envisioned by the applicant. Also noteworthy, on any one or more turbine rotor(s) or turbine rotor section(s), or set(s) of turbine rotors or turbine rotor sections, any, and all, angle(s) may be any combination of differing degrees and differing numbers of nozzles; however, in most preferred, but not necessarily all, applications of the turbine, the resultant axial force associated with said angles and numbers of nozzles is at, or near, zero.

Referring to FIGS. 49-56, preferred embodiments of the present invention comprising a single turbine rotor with only one turbine rotor section are illustrated. For such preferred embodiments, the nozzles are preferably alternately and equally angled in opposite directions relative to the radial plane 66 of the turbine rotor. This arrangement of nozzles provides not only an increased relative number of nozzle placements along the rotor perimeter, but such arrangement also balances axial forces (axial thrust), thus, reducing the size of, or eliminating the need for, a turbine shaft thrust bearing. For other preferred embodiments, the nozzles are alternately grouped (e.g., grouped on alternate sides of a rotor) and equally angled (e.g., each nozzle is angled the same relative to its datum plane), which results in a balance of axial forces (axial thrust). For yet other preferred embodiments, the nozzles are randomly configured (e.g., a 3 on a first side of a rotor, then one on the other side of said rotor, then 2 on the first side and then four on the other side or any other combinations with equal numbers of nozzles on either side) and equally angled, which results in a balance of axial forces. For still other preferred embodiments, the nozzles are randomly configured and not equally angled, which allows for compensation, to provide a balance of axial forces, of different axial forces produced due to (1) different, and varying, density of different substance(s) and/or mixture(s), (2) varying fluid flow rates, (3) varying nozzle fluid exit velocity, due primarily to, but not limited to, varying radial locations of nozzle(s), set(s) of nozzles or combustion chamber-nozzle unit(s), and/or (4) combinations thereof, to name a few examples. This allows for an odd number of nozzles and nonuniform angles (i.e., in which the angles are not all the same).

Referring to FIGS. 1 and 57-70, preferred embodiments of the present invention comprising nozzle longitudinal axis angle configurations for two or more turbine rotors and/or two or more turbine rotor sections are illustrated. The axial thrust balance of turbine rotor(s) and/or turbine rotor section(s) is apparent in FIGS. 59, 60, 65, 66, 69 and 70. For the turbine rotor embodiments illustrated in FIGS. 61-64, 67 and 68, axial thrust is developed by the non-symmetry of the nozzle positions and, as such, these turbine rotors are preferably installed in pairs, with one turbine rotor opposing the other, but not necessarily at equal nozzle longitudinal axis angles (i.e., relative to their datums).

Referring to FIGS. 57, 58 and 42-44, embodiments of the present invention comprising nozzles located on turbine rotor or turbine rotor section circumferential perimeter(s), as well as the radial surface(s) of turbine rotor(s) or turbine rotor section(s) are illustrated. Like the nozzle(s) located on the turbine rotor section circumferential perimeters, the one or more nozzle(s) located on the radial surface(s) are most preferably oriented such that the longitudinal axis of the nozzle is acute to or, to the best degree, parallel to the same tangential plane of, but opposite to, the tangential direction of rotation 58 of the turbine rotor, acute to axis of rotation 32 of turbine shaft 16, and/or acute to the radial plane 66 of the turbine rotor (or to a plane that is parallel to radial plane 66). The radial location of the nozzle(s) located on any given radial surface(s) are preferably placed using the following criteria: (1) all nozzles are located at the same radial distance from the turbine shaft centerline, (2) all nozzles within a set of nozzles are located at the same radial distance from the turbine shaft centerline, (3) two or more sets of nozzles are configured such that each set of nozzles is located at the same radial distance from the turbine shaft centerline or any, or all, set(s) of nozzles are located at different radial distances from the turbine shaft centerline, (4) any, or all, nozzles, whether in sets or otherwise, are configured and located at any radial distance from the turbine shaft centerline. It is apparent that any non-uniform (non-symmetrical) locations of nozzle(s), or set(s) of nozzles, on the radial surface(s) may produce an inherit turbine inertial balance concern and/or sum of shaft moments concern and, therefore, is preferably countered through appropriately and applicable balancing techniques, methods and/or devices.

A turbine rotor or turbine rotor section need not necessarily incorporate nozzle locations on the turbine rotor circumferential perimeter(s), as, in some preferred embodiments, nozzles are located only at, on, at a distance from (through connecting passageway(s)), integral with and/or recessed in a radial surface 66 of turbine rotor 12. Such an arrangement provides as large a turbine rotor diameter as possible, for a given turbine body size and/or shape, while providing a proper clearance in the turbine chamber between the turbine rotor and the turbine body. When, for example, customer space constraints dictate a given size for turbine body 18, maximizing the turbine rotor diametrical dimension, placement of nozzles on radial surfaces minimizes the turbine shaft revolutions per minute (RPM), which, in turn, can positively affect the following items, including, but not limited to, among other things: (1) turbine design criteria, (2) material composition of turbine components and parts, (3) bearing requirements and associated costs, materials, size, quantity, lubrication and lubricants, (4) sealing requirements, (5) cost of turbine-driven peripheral equipment such as generator, pump, gearing assembly, or any other device/user of the turbine mechanical work or output energy, (6) total weight, (7) product (turbine) life cycle, or (8) combinations thereof, many, if not all, of which tend to reduce the manufacturing costs and/or operation/maintenance costs to the customer. FIGS. 114, 115 and 222-226 illustrate preferred embodiments of the present invention that have nozzle(s), set(s) of nozzle(s) and/or combustion chamber-nozzle unit(s) located at, on, at a distance from (through connecting passageway(s)), integral with and/or recessed in a radial surface 66 of turbine rotor 12 and not the outermost circumferential perimeter.

At a fixed RPM, as the radial distance from the turbine shaft centerline increases, the velocity at said distance, expressed as a distance per unit time (such as feet per second), increases. Conversely, at said RPM, as the radial distance from the turbine shaft centerline decreases, the corresponding velocity at said distance decreases. Therefore, for any location of nozzle(s) on a turbine rotor or rotor section, preferred nozzle design characteristics including, but not limited to, Mach number, throat area-to-exit area ratio, inlet pressure-to-exit pressure ratio, to name a few, may be changed so as to optimally match the nozzle exit fluid velocity to the appropriate radial position. With so many possible combinations of locations of nozzles, or set(s) of nozzles, on turbine rotor(s) and/or turbine rotor section(s), for a given turbine engine of the present invention, numerous arrangements/results are possible with regard to turbine efficiencies, turbine output energies (mechanical work or power), turbine size-to-output energy ratios, and turbine weight-to-output energy ratios. Considering the variety of nozzle locations, coupled to the aforementioned varieties associated with turbine shafts, turbine seals, turbine bearings, turbine rotors, and turbine rotor sections, the present invention is advantageously superior, relative to current art, in its offerings to customer applications.

Figure 15:
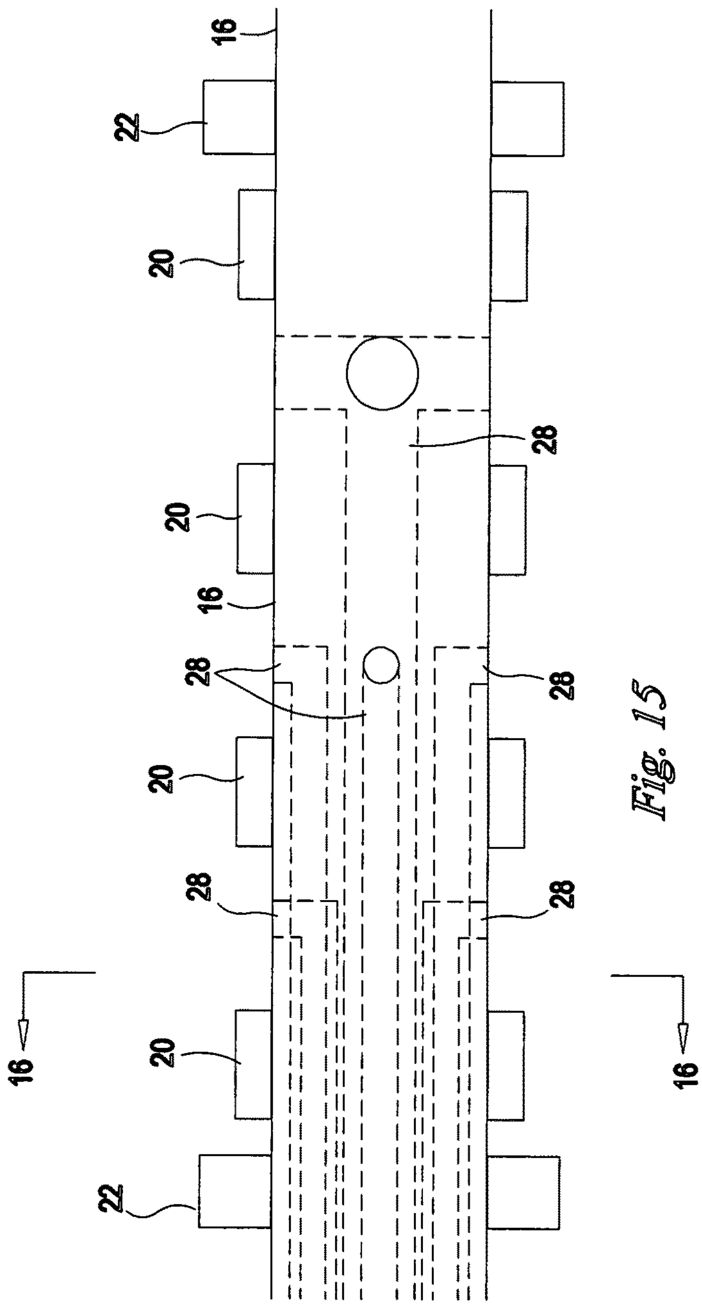
FIG. 15 is a cross-sectional view of the turbine shaft of another preferred embodiment of the invention.
Figure 17:
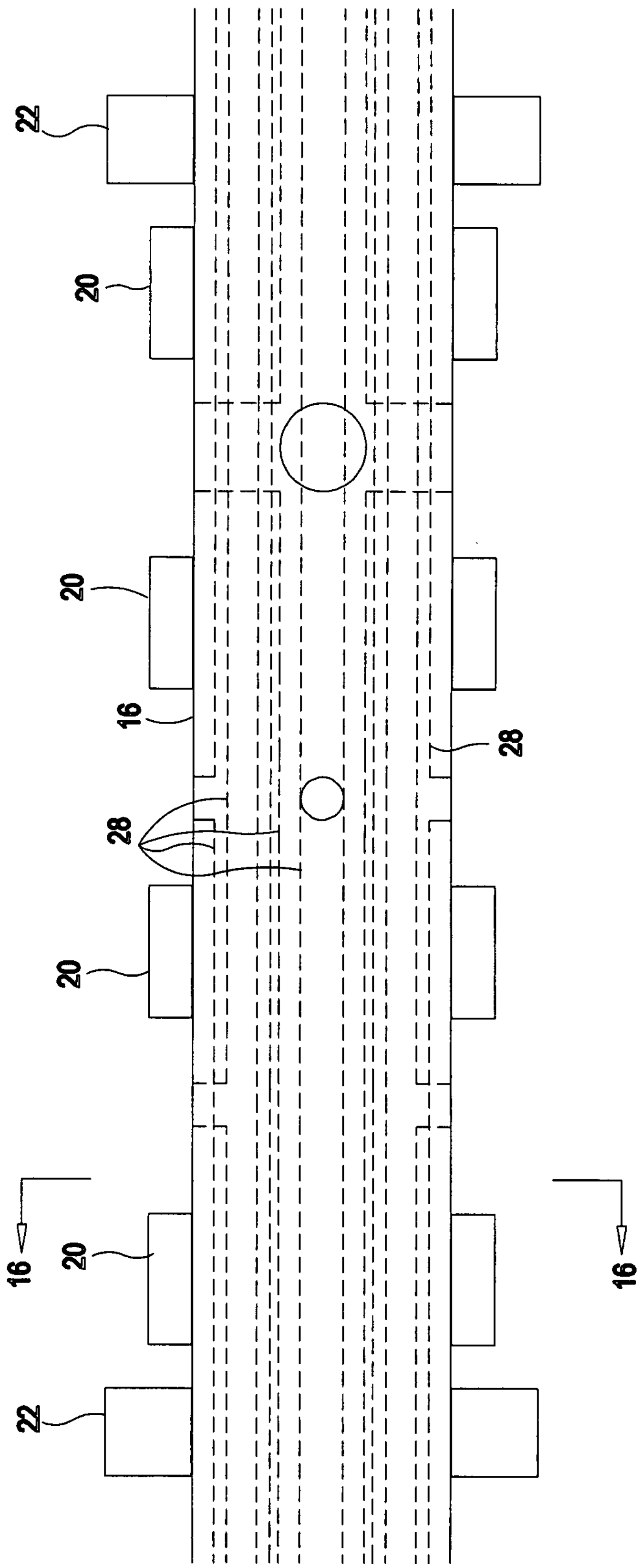
FIG. 17 is a cross-sectional view of the turbine shaft of another preferred embodiment of the invention.
Figure 20:
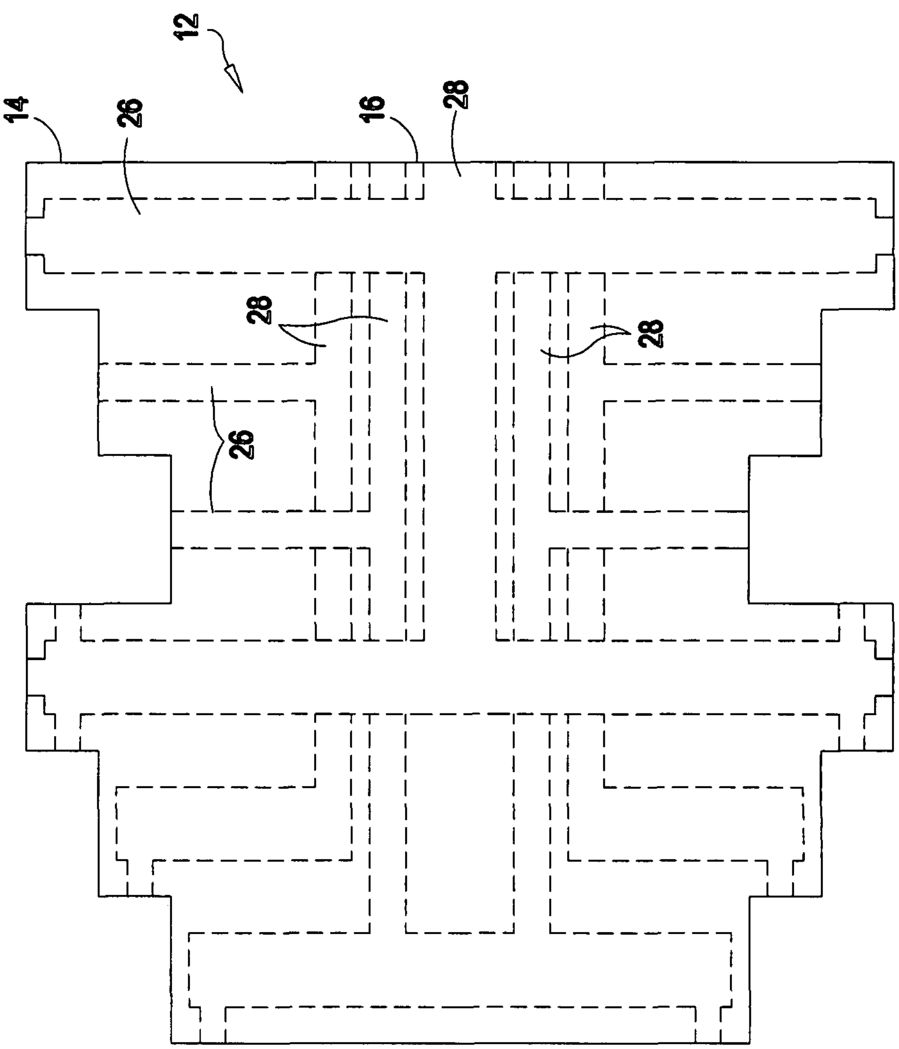
FIG. 20 is a cross-sectional view of the multiple-rotor-section turbine shaft and rotor of another preferred embodiment of the invention.
Figure 22:
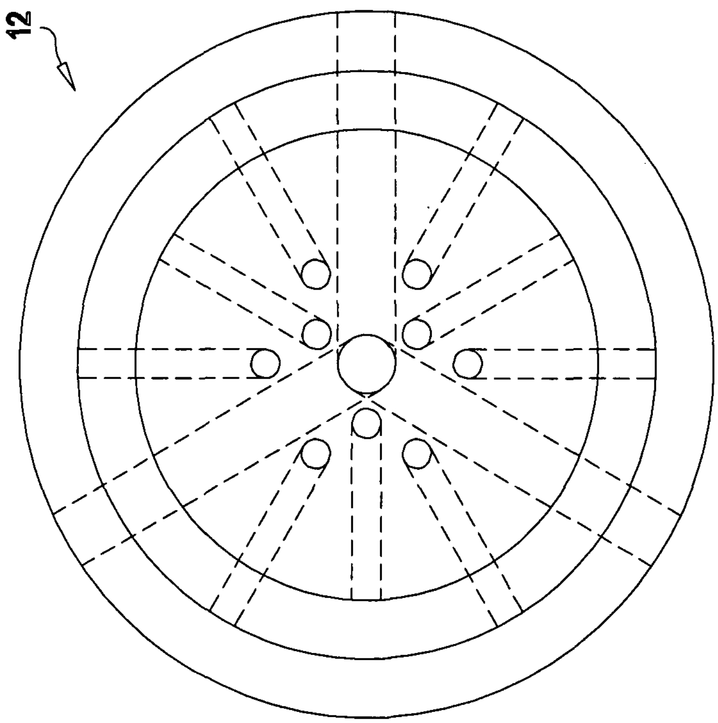
FIG. 22 is a elevation view of the multiple-rotor-section turbine shaft and rotor of another preferred embodiment of the invention of FIG. 21.
Figure 21:
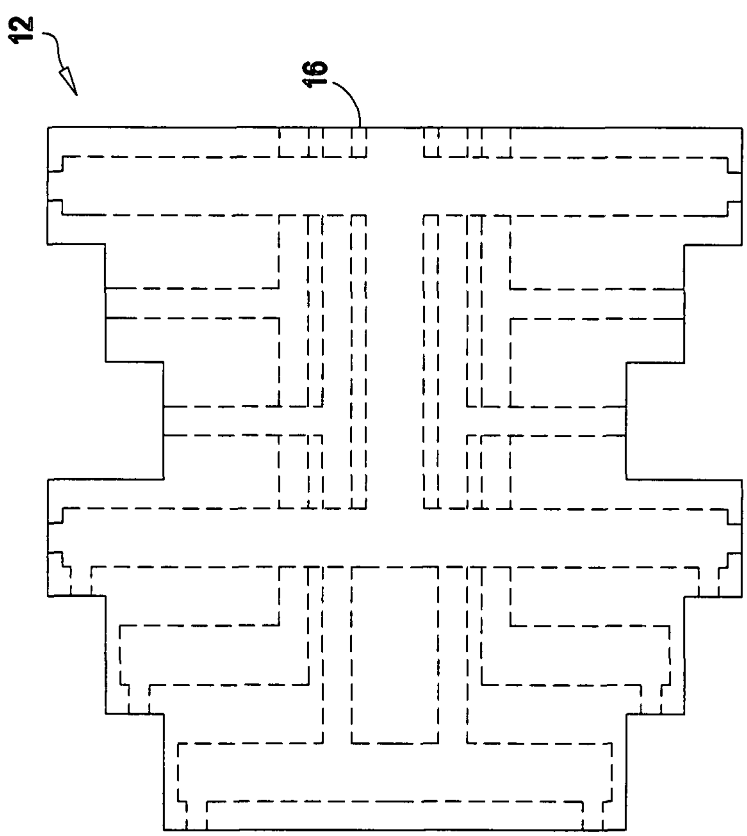
FIG. 21 is a cross-sectional view of the multiple-rotor-section turbine shaft and rotor of another preferred embodiment of the invention.
Figure 25:
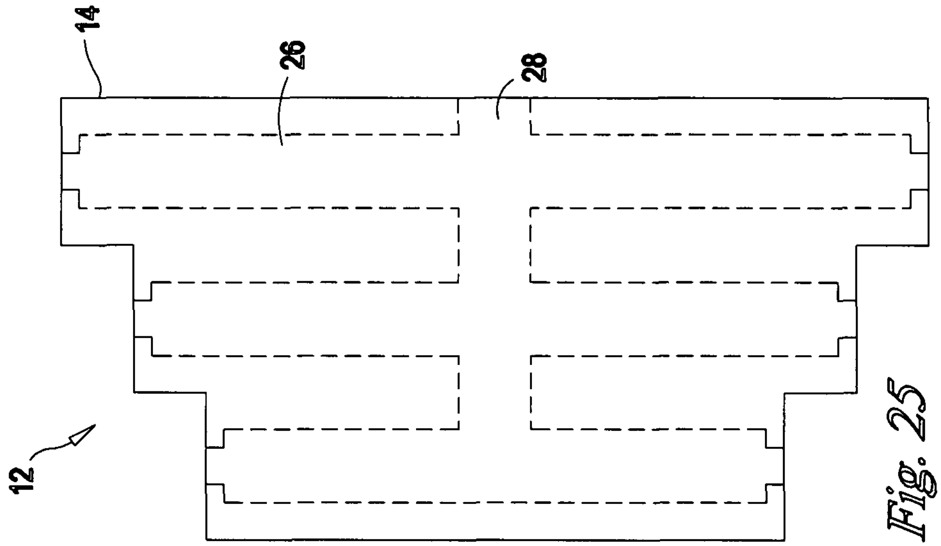
FIGS. 23-25 are cross-sectional views of the multiple-rotor-section turbine shafts and rotors of other preferred embodiments of the invention.
Figure 24:
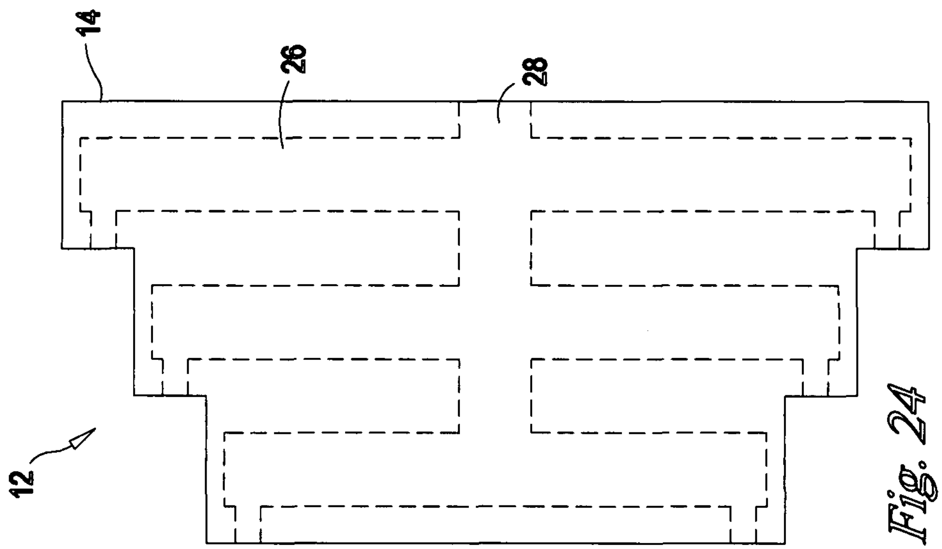
Figure 23:
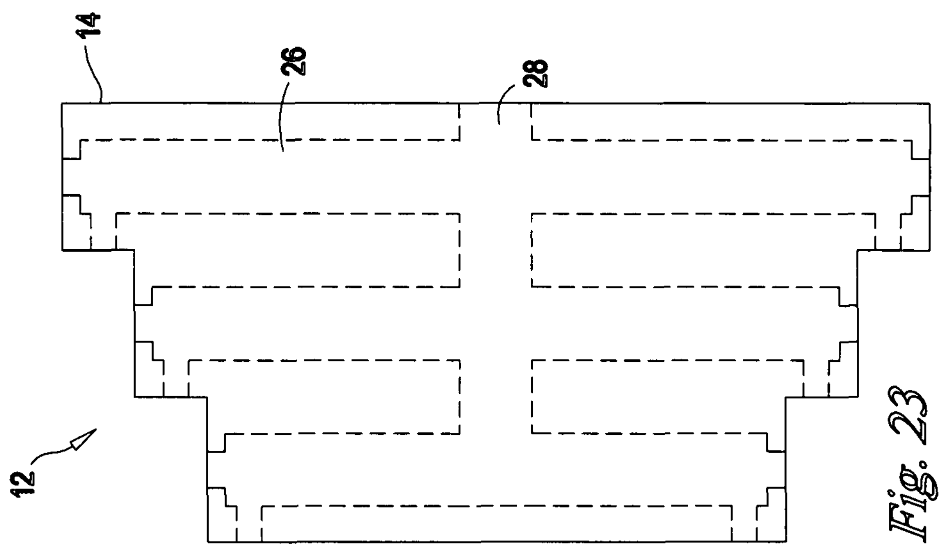
Figure 26:
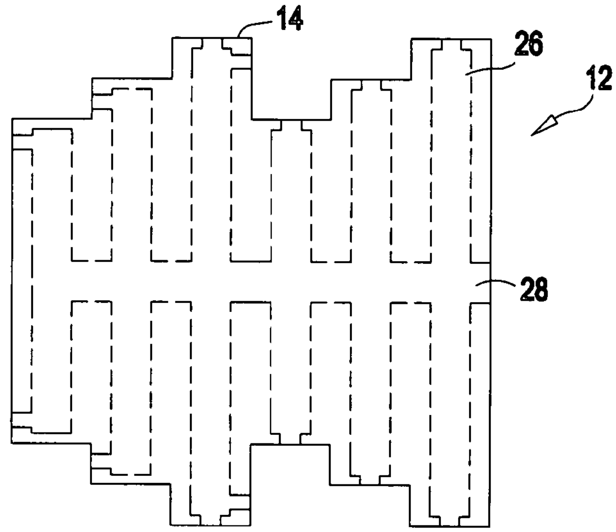
FIGS. 26-28 are cross-sectional views of the multiple-rotor-section turbine shafts and rotors of other preferred embodiments of the invention.
Figure 27:
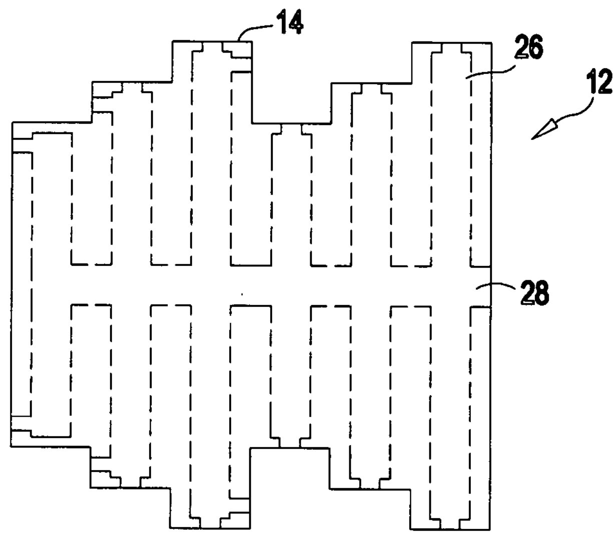
Figure 28:
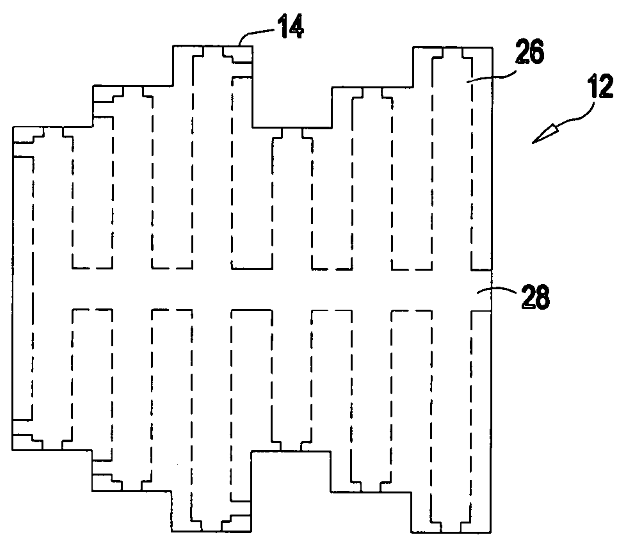
Figure 29:
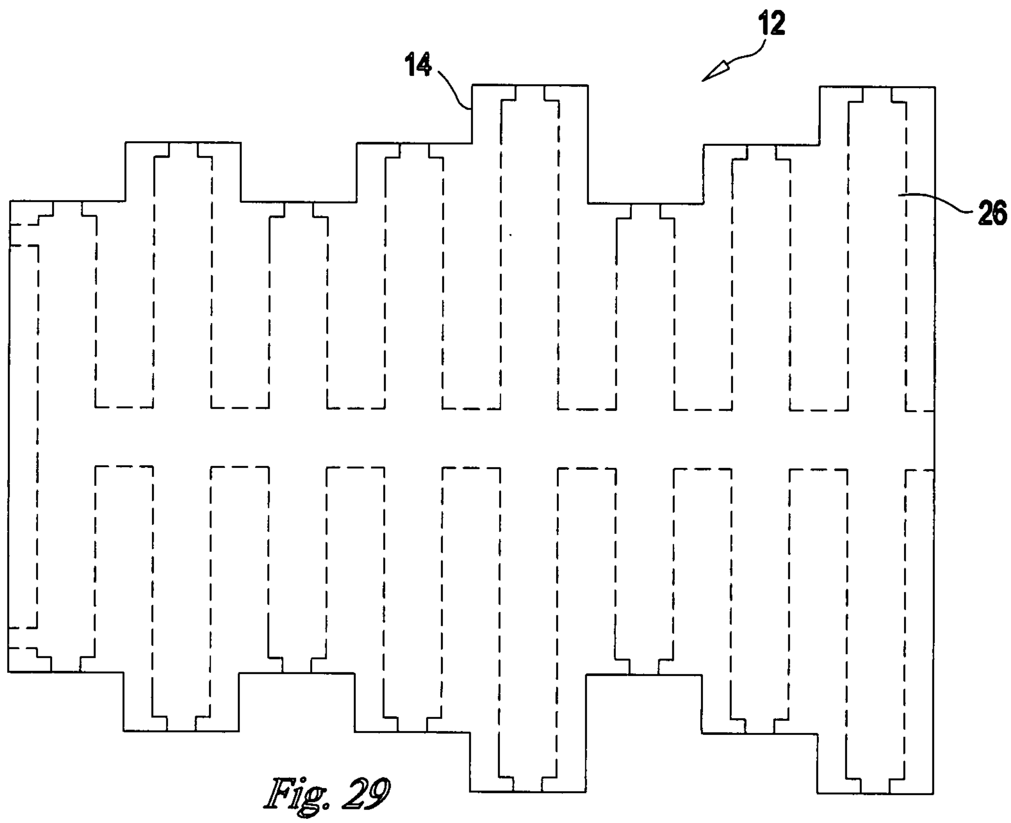
FIG. 29 is a cross-sectional view of the multiple-rotor-section turbine shaft and rotor of another preferred embodiment of the invention.
Figure 30:
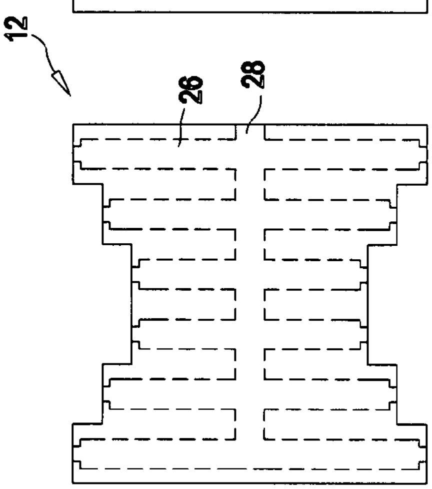
FIGS. 30-35 are cross-sectional views of the multiple-rotor-section turbine shafts and rotors of other preferred embodiments of the invention.
Figure 31:
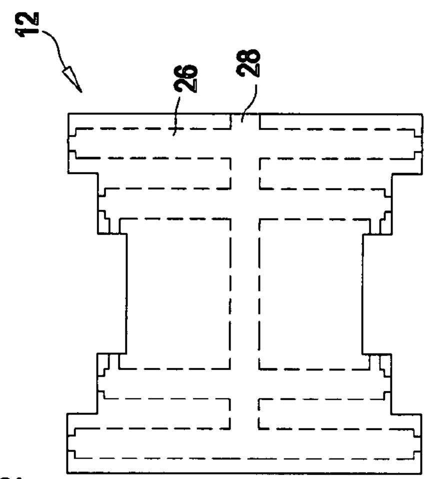
Figure 32:
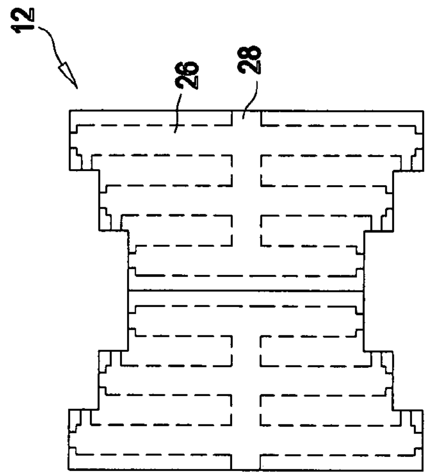
Figure 33:
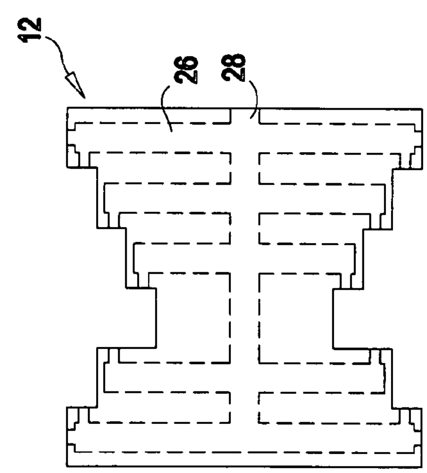
Figure 34:
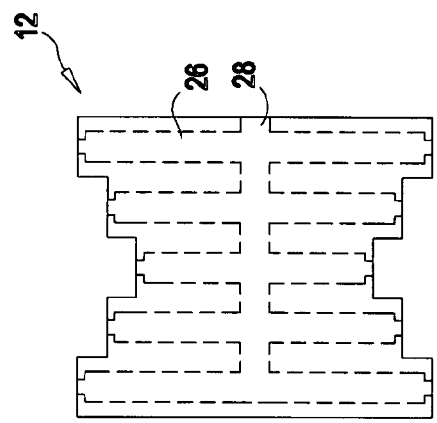
Figure 35:
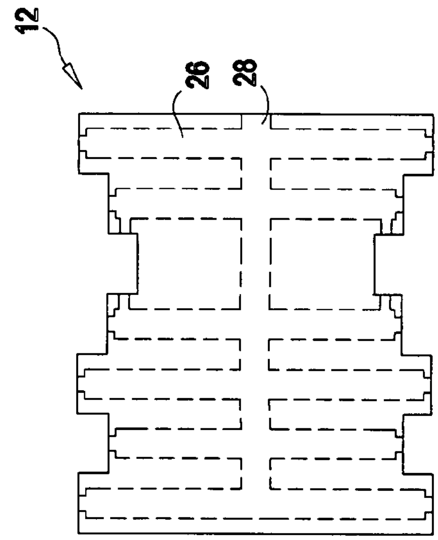
Figure 38:
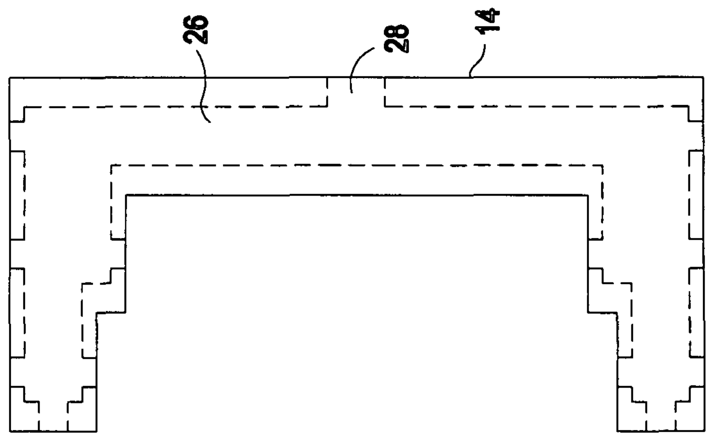
FIGS. 36-41 are cross-sectional views of the multiple-rotor-section turbine shafts and rotors of other preferred embodiments of the invention.
Figure 37:
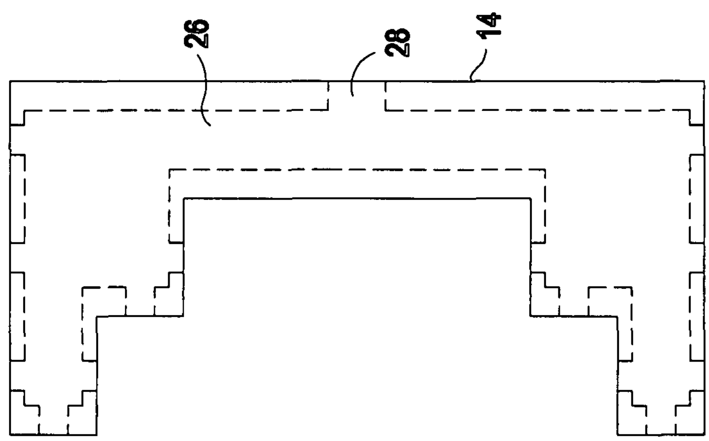
Figure 36:
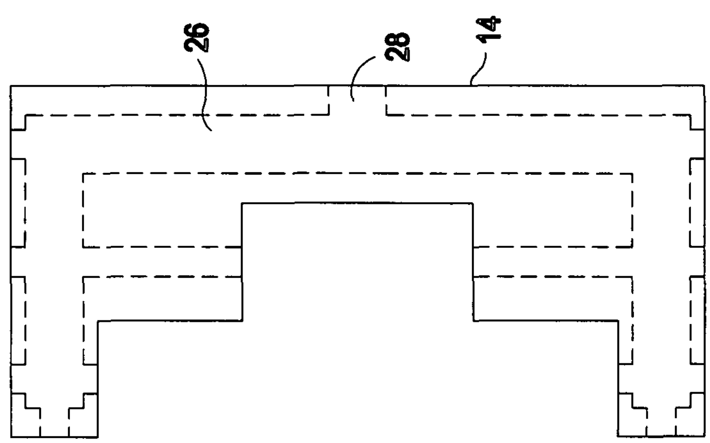
Figure 41:
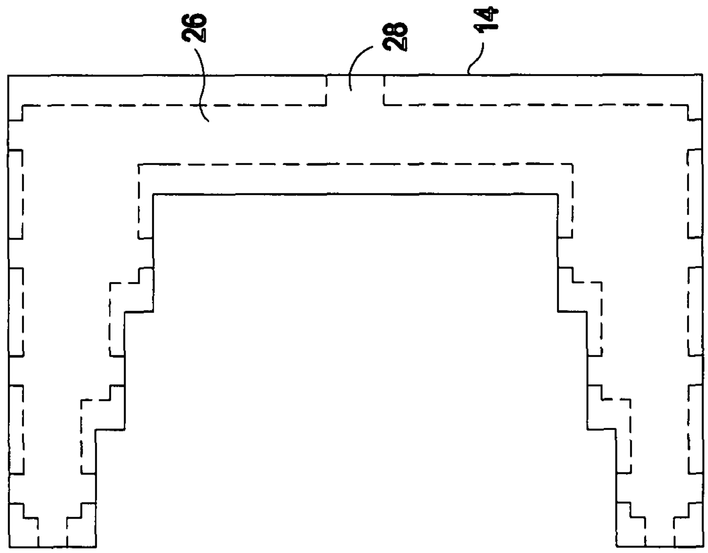
Figure 40:
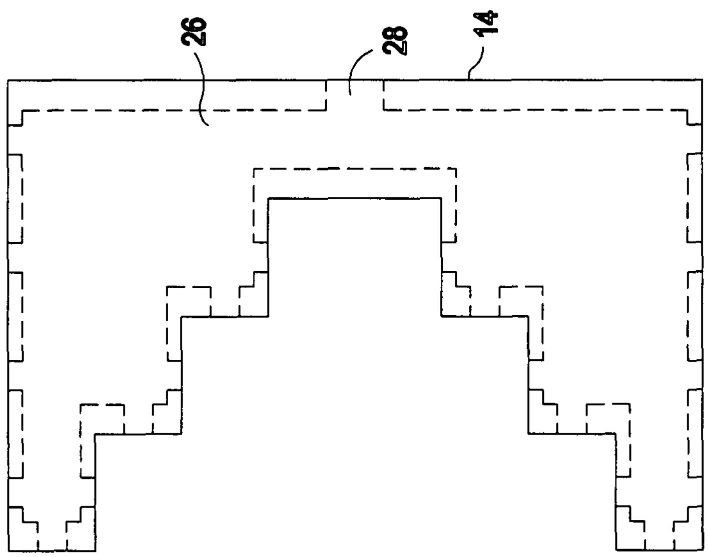
Figure 39:
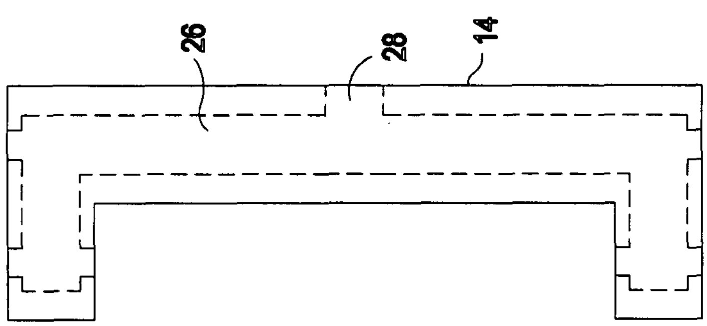
Figure 42:
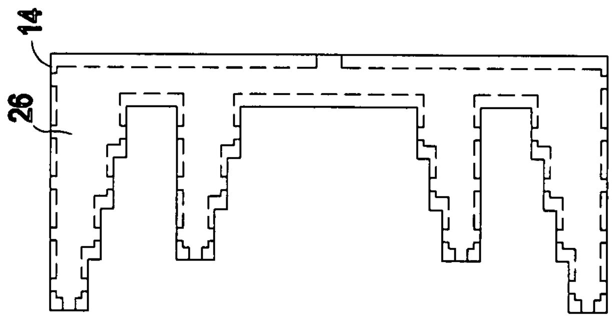
FIG. 42 is a cross-sectional view of the multiple-rotor-section turbine shaft and rotor of another preferred embodiment of the invention.
Figure 43:
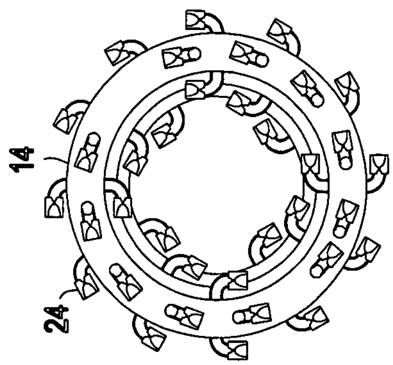
FIG. 43 is a elevation view of a multiple-rotor-section turbine rotor of another preferred embodiment of the invention of FIG. 42.
Figure 44:
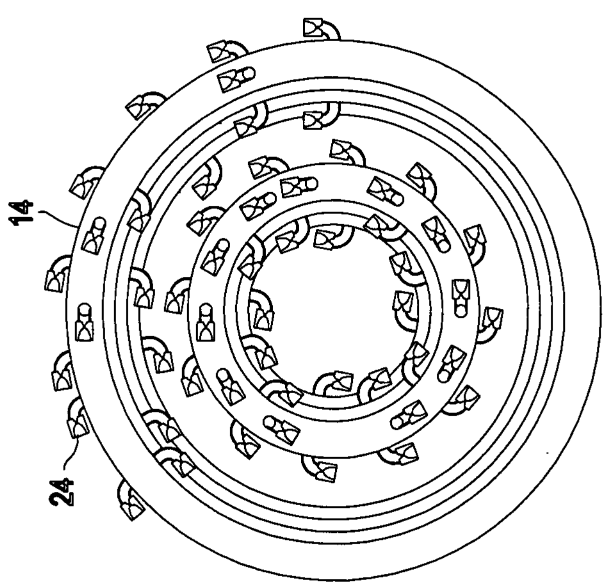
FIG. 44 is a elevation view of a multiple-rotor-section turbine rotor of another preferred embodiment of the invention of FIG. 42.
Figure 45:
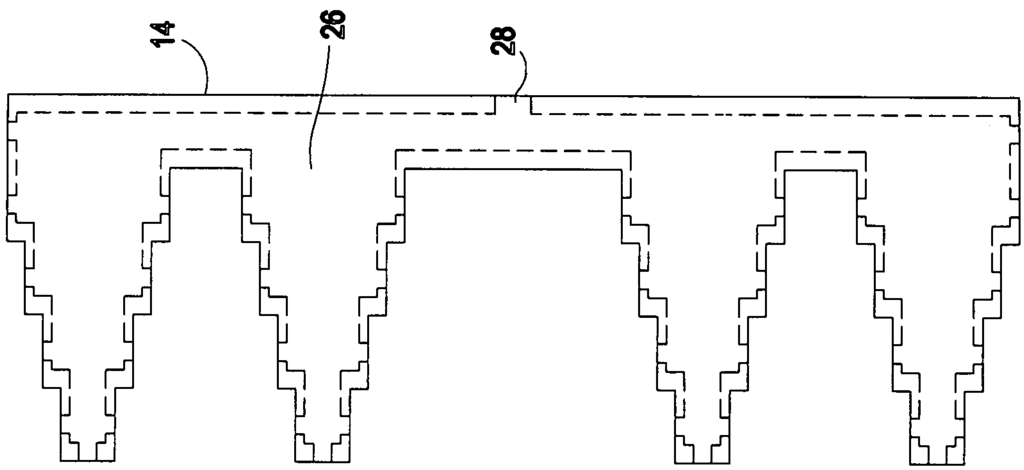
FIGS. 45-46 are cross-sectional views of the multiple-rotor-section turbine shafts and rotors of other preferred embodiments of the invention.
Figure 46:
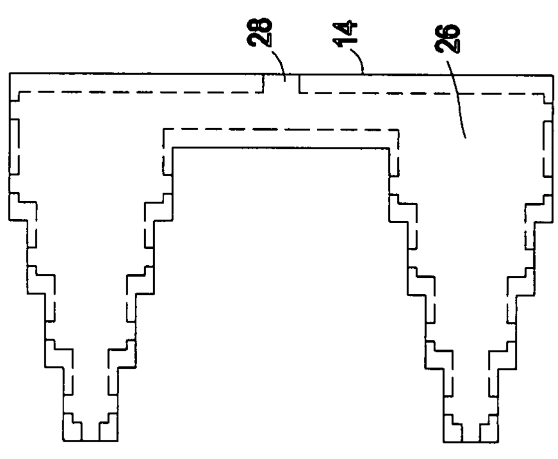
Figure 47:
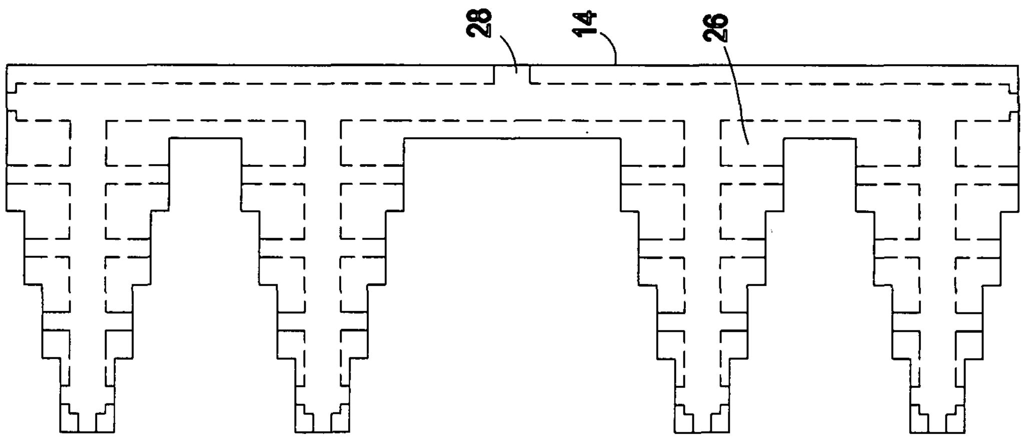
FIGS. 47-48 are cross-sectional views of the multiple-rotor-section turbine shafts and rotors of other preferred embodiments of the invention.
Figure 48:
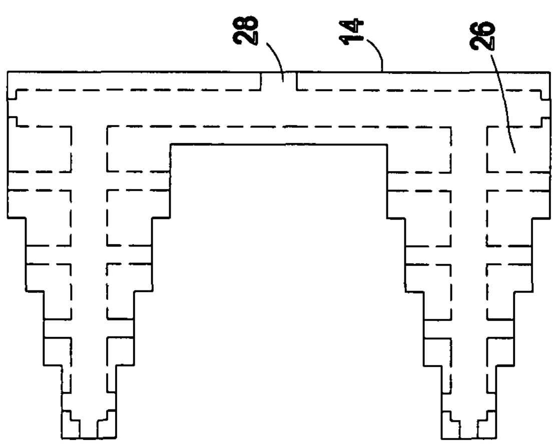
Figure 50:
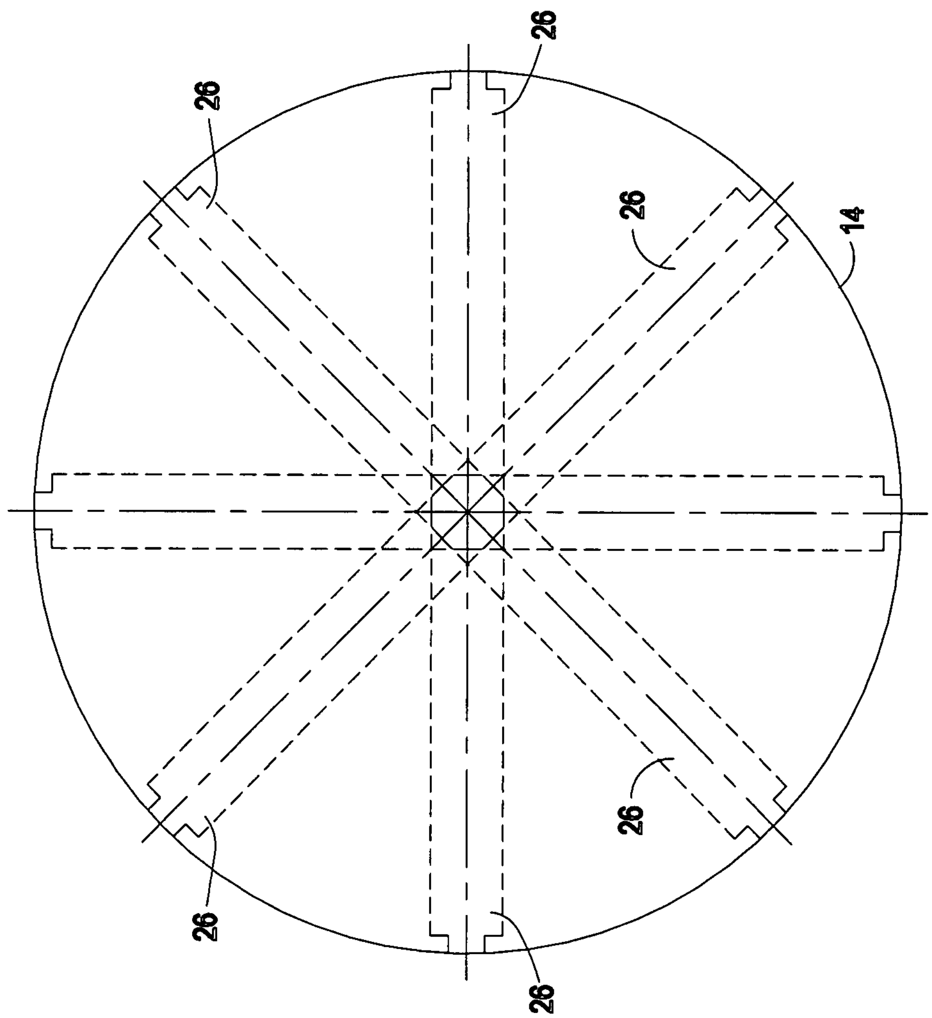
FIG. 50 is a elevation view of the single rotor-section turbine shaft and rotor of another preferred embodiment of the invention of FIG. 49.
Figure 49:
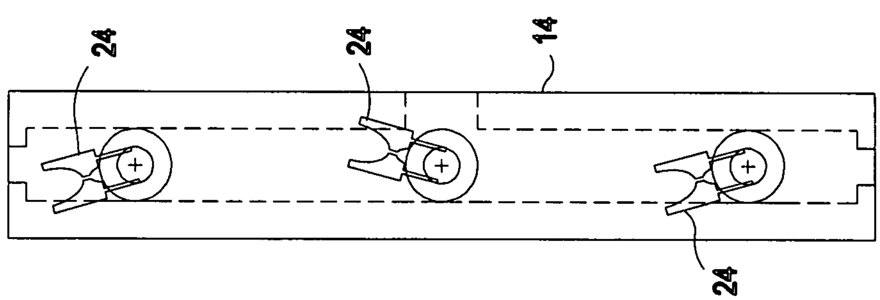
FIG. 49 is a cross-sectional view of the single rotor-section turbine shaft and rotor of another preferred embodiment of the invention.
Figure 52:
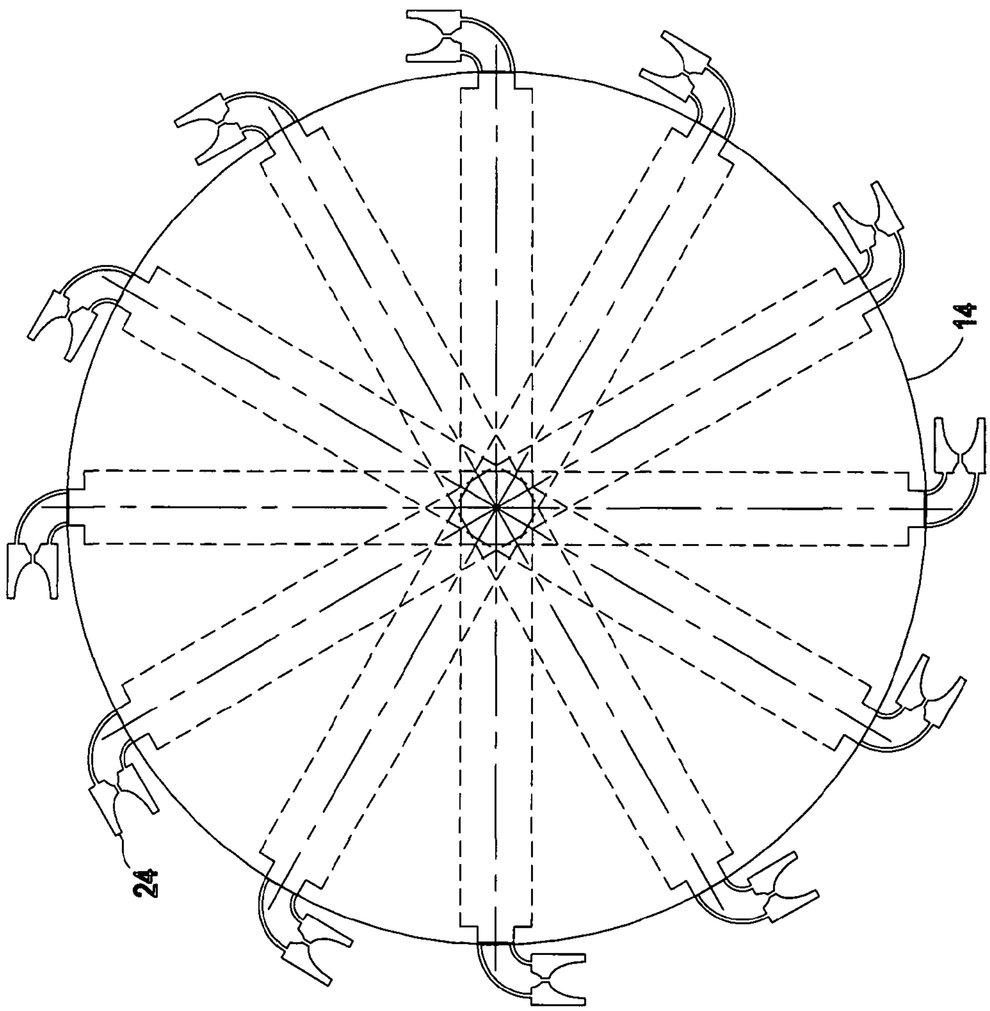
FIG. 52 is a elevation view of the single rotor-section turbine shaft and rotor of another preferred embodiment of the invention of FIG. 51.
Figure 51:
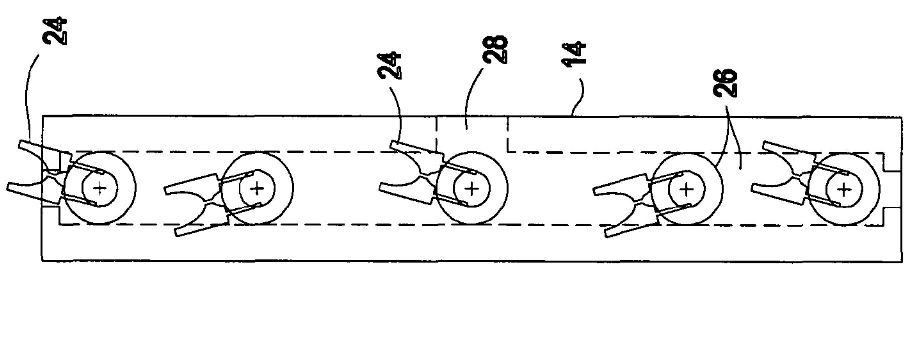
FIG. 51 is a cross-sectional view of the single rotor-section turbine shaft and rotor of another preferred embodiment of the invention.
Figure 54:
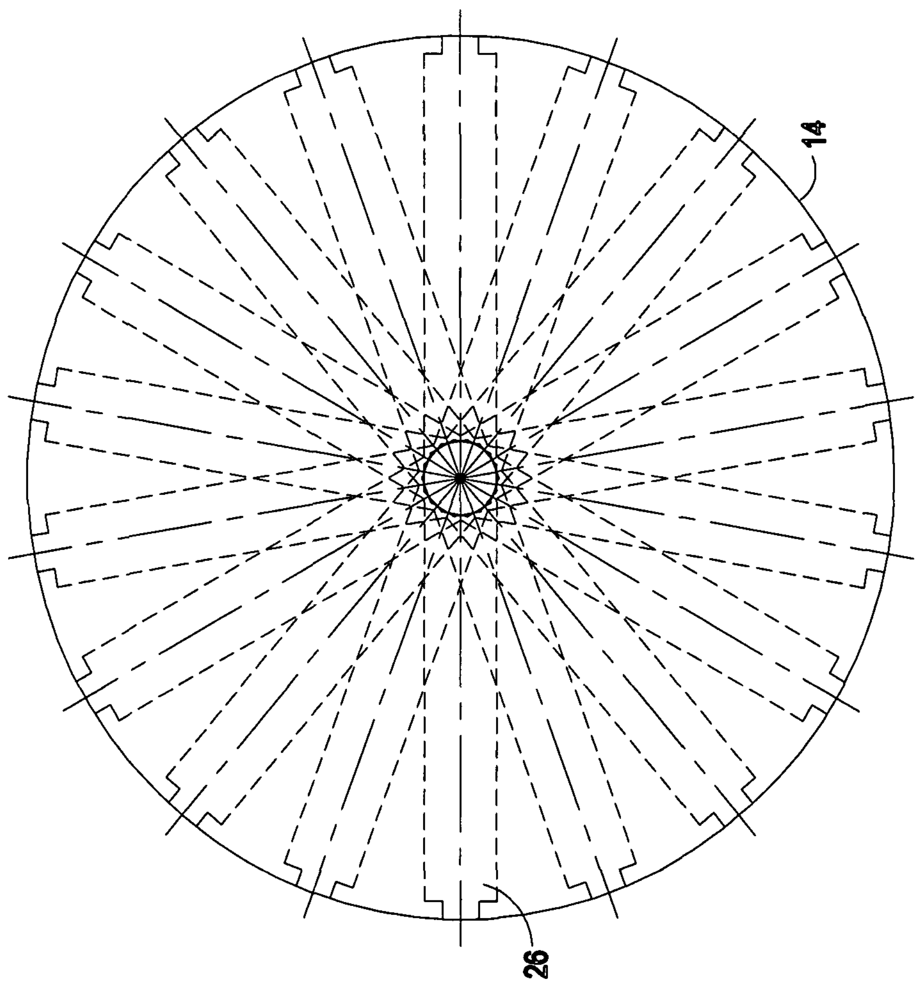
FIG. 54 is a elevation view of the single rotor-section turbine shaft and rotor of another preferred embodiment of the invention of FIG. 53.
Figure 53:
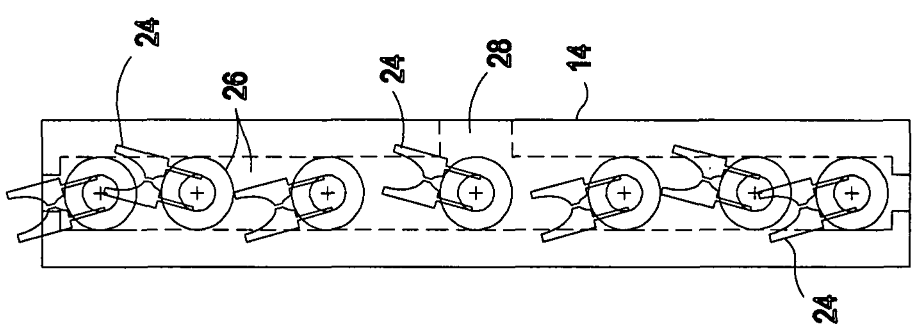
FIG. 53 is a cross-sectional view of the single rotor-section turbine shaft and rotor of another preferred embodiment of the invention.
Figure 56:
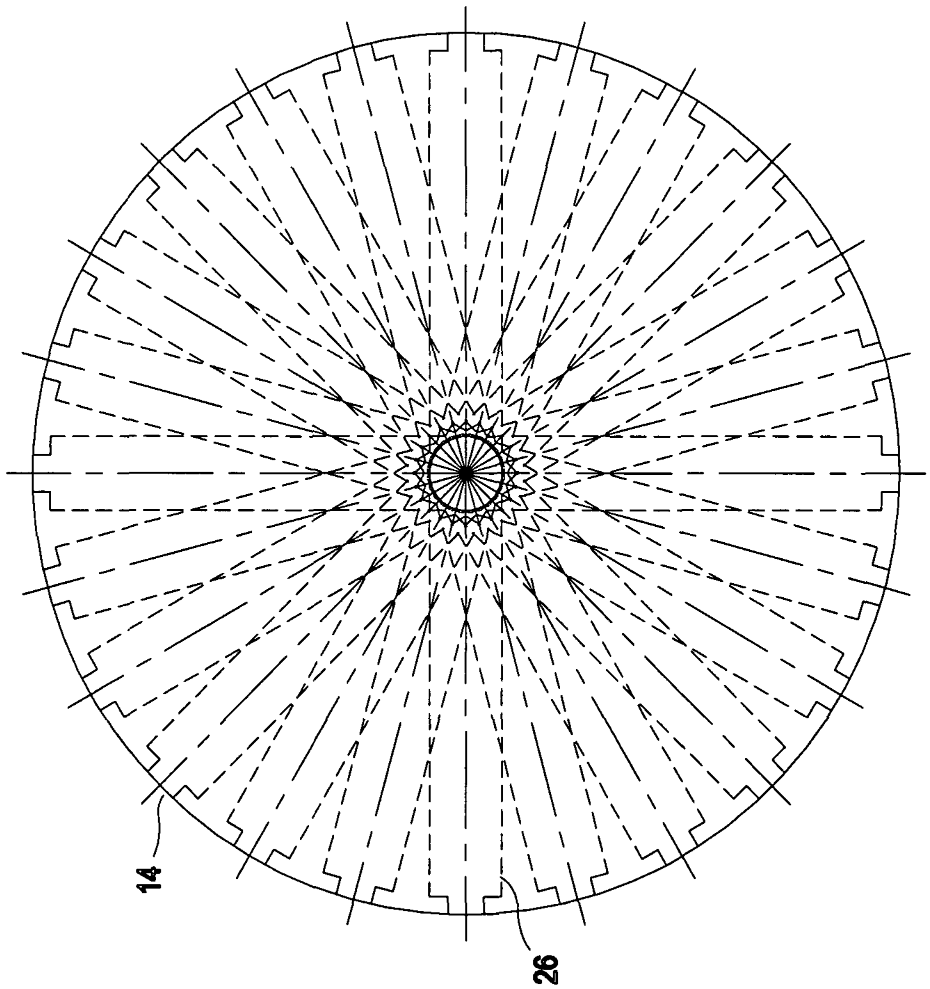
FIG. 56 is a elevation view of the single rotor-section turbine shaft and rotor of another preferred embodiment of the invention of FIG. 55.

Referring to FIGS. 36-48, preferred embodiment(s) of the present invention can have a variety of inside and outside perimeters 64 of turbine rotor(s) and/or turbine rotor section(s), with perimeters at a wide variety of different radial distances from the turbine shaft centerline. Referring to said FIGS. 36-48 and further referring to FIGS. 26-31 and 33-35, owing to the different radial distances, as mentioned earlier, the nozzle fluid exit velocities preferably vary. The passageway(s) for the turbine rotor(s) and/or turbine rotor section(s) are hydraulically connected together, as is/are cited above, or are hydraulically independent, relative to one another, as is illustrated in FIGS. 15 and 20. Even the physical shape of the passageway(s) may be varied as a function of turbine design requirements, manufacturing techniques, maintenance considerations, and/or manufacturing costs.

After exiting the nozzle(s), fluid(s) enter(s) one or more turbine chamber(s) 34 or intermediate chamber(s), which serves to collect the just-expelled fluid(s) and to route said fluid(s) to (1) condenser(s), cooler(s), and/or other heat exchanging/removal devices or equipment, either external or internal (or both) to turbine engine 10, where further energy is extracted from the fluid(s), either for useful or non-useful (or combination of both) purposes, (2) one or more shaft passageway(s), as is illustrated in FIGS. 18, 133, 158-164, 204-210 and 212, for examples, (3) one or more non-shaft passageway(s), as is illustrated in FIGS. 196-203, 211, 213 and 214, for examples, (4) one or more other turbine chamber(s) or intermediate chamber(s), through either one or more internal non-shaft passageway(s) or one or more external non-shaft passageway(s), or both, and said passageways being either controlled/regulated or uncontrolled/unregulated, or both, as to flow rate and/or pressure in or through said passageways, as is illustrated in FIGS. 97, 98, 132, 133, 138-140, 143, 186, 187, 192 and 193, for examples, or (5) combinations thereof. This heat extraction equipment and associated systems can be large, expensive, and operation/maintenance intensive. Background art steam turbine power plants typically use large condenser systems and associated cooling tower systems, with few, if any, opportunities to reduce equipment capital costs or operation/maintenance expenses. However, due to the features of the present invention, the aforesaid costs associated with the removal of energy from the fluid exiting the turbine are significantly reduced, both for capital costs and expenses.

Referring to FIGS. 71, 72, 107 and 108, a preferred embodiment of the present invention comprises one or more condensing/cooling coil bank(s) 60, each of which is located directly at/near the point of exit of fluid(s) from the nozzle(s). At/near said point, the velocity of the fluid(s) exiting the nozzle(s), as kinetic energy, is ideally at or near zero tangential velocity, having completely converted said velocity to turbine mechanical work or output energy, and the exiting fluid(s) is/are immediately available to relinquish quantities of "heat" energy or thermal energy. For nozzle-exiting fluid(s), or portion(s) thereof, that is/are liquid, heat energy can be extracted more rapidly and efficiently, as opposed to background art methods, however, for said fluid(s) that is/are entirely, or largely, liquid, the heat removal process at the cooling bank coil 60 has little-to-no appreciable effect on the turbine chamber pressure, or back-pressure, as there is essentially/practically no change in volume from saturated liquid to subcooled liquid. For nozzle-exiting fluid(s); or portion(s) thereof, that is/are vaporous, latent energy can be extracted more rapidly and efficiently, as opposed to more conventional methods, however, removal of energy at said exit point does reduce the pressure (back-pressure) in turbine chamber 34 (or intermediate chamber(s)) below the pressure it would otherwise be, if said nozzle-exiting fluid vapor is condensed external to, and downstream of, the turbine chamber(s). The reduction in back-pressure results directly from the large volume of the vapor condensing to a small volume of liquid. Reducing the back-pressure, even by small amounts, significantly increases nozzle and turbine efficiencies and/or capacities, as an increased pressure differential provides a greater turbine mechanical work or output energy, and, thus, reduces the capital cost per unit production and increases the revenue by increasing the units of production. A further reduction in capital cost per unit production is realized when considering the reduced size of the turbine chamber(s), and subsequently the turbine, as said chambers need not be designed to hold as large a volume of vapor, and there is a capital cost reduction relative to the smaller size/capacity condensing equipment external to the turbine engine. Additionally, condensing/cooling coils 60 can be used to regulate, or for some applications limit, the back-pressure for any given turbine chamber 34 or intermediate chamber. Although FIGS. 71-76 and 108 illustrate banks of condensing/cooling coils between rotor sections, banks of said coils are/can be located, diametrically, just beyond the farthest most extremity of nozzles, or essentially at any advantageous location.

Also, referring to FIGS. 71-76, 107 and 108, the variations illustrated, as well as other variations, are envisioned by the applicant. The differences in variations/configurations of the cooling bank coil(s) 60 account for, but are not limited to, variations in (1) fluid substance(s), (2) fluid flow rate(s), (3) thermodynamic conditions, (4) nozzle quantities and locations, (5) anticipated/designed load swings, (6) turbine chamber sizing requirements, and/or (7) purposed control of the power plant system (cycle) and/or purposed control of the thermal energy portion thereof, as dictated by needs of the customer, to name a few variations. The cooling medium for condensing/cooling coil 60 is appropriate for the application; however, more than one cooling medium can be used for a given application or a given condensing/cooling coil 60.

With regard to "(7)" from the previous paragraph and as aforementioned in this disclosure, one of the methods, but not necessarily the only method, of controlling the thermodynamic condition of the fluid entering turbine, to affect the turbine mechanical work or output energy, is to control the fluid flow rate passing through the boiler. Varying said fluid flow rate can be accomplished by varying the system pump 126 (one of the four basic components of a power plant system, and as aforementioned and discussed in this disclosure) output. Another method of controlling the fluid flow rate through the system is to control the aforementioned back-pressure, as differing the pressure differential between the pump discharge pressure (assumed to be held constant, for this example method) and said back-pressure will change said flow rate. For a given volume size of a turbine chamber (including aforementioned intermediate chambers), equipped with condensing/cooling coil bank(s), controlling the flow rate of the cooling medium passing through said bank(s), or portion of bank(s), controls the rate at which the enveloped vapor (e.g., steam) condenses, which, in turn, controls the back-pressure. Likewise, condensing/cooling coil bank(s) external to the turbine chamber, or a combination of internal and external, can also assist in the control of the back-pressure. With further regard to "(7)" from the previous paragraph, another benefit of controlling the back pressure is that the saturation (boiling) temperature of the fluid exiting the turbine changes (e.g., a back-pressure of 17 pounds per square inch absolute (psia) has a saturation temperature of approximately 219 degrees Fahrenheit and a back-pressure of 7 pounds per square inch absolute (psia) has a lower saturation temperature of approximately 177 degrees Fahrenheit), which is important for some customers who use said fluid exiting the turbine for thermal energy needs. For example, a customer, who has a need for high temperature dishwashing during the day, may need a lower temperature thermal energy fluid for general heating during the night. From a process control basis, condensing/cooling bank coils, whether (1) internal to the turbine, as described in the foregoing paragraph, (2) external to the turbine, or (3) both, offer a unique opportunity to manage, or more finely control, almost limitless operating scenarios, while reducing/minimizing costs. Obviously, as the back-pressure changes, the kinetic energy changes, as does its conversion to mechanical work. Also, at operating pressure ratios different than the optimal design ratio for the nozzle(s) of present invention, the efficiency of the turbine engine, as a piece of equipment will change. For certain preferred applications, such efficiency changes result in an increase or decrease in quantities of thermal energy. Whether such changes in turbine engine efficiency, which affects electricity production, and thermal energy quantity are beneficial, depends upon the monetary value of the revenue stream associated with the electricity and thermal energy usage. For certain applications, the thermal energy has a higher unitary value than electricity; thus, it is beneficial to provide more thermal energy at the sacrifice of turbine efficiency, and vice versa.

In preferred embodiments, to provide for a degree of inertial balance of turbine shaft 16, if there is only one shaft fluid passageway 28, then the internal shaft passageway is designed to be either a circular or non-circular cross-sectional shape, but annularly centered in the turbine shaft relative to the symmetry of its cross-sectional shape. For turbine shafts into which two or more shaft passageways are incorporated, the internal shaft passageways may be designed to be either a circular or non-circular cross-sectional shape, or combination thereof, but annularly centered in the turbine shaft relative to the overall symmetry of the cross-sectional shape(s) and configuration of the turbine shaft. Turbine shafts and accompanying shaft passageways can be formed by casting, forging, welding (usually special applications), other manufacturing techniques, or combinations thereof.

In preferred embodiments, to provide for a degree of inertial balance of turbine rotor 12, for most applications there are two or more turbine rotor fluid passageways. These turbine rotor fluid passageways are preferably configured as follows: (1) equally spaced (as groups of passageways or individually), (2) equally weighted for passageways of differing cross-sectional areas (sizes), (3) balanced space-weight configuration(s) for non-equally spaced and/or non-equally weighted passageways, or (4) combinations thereof. For some applications, where only one turbine rotor fluid passageway is necessary, an appropriate, amount of initial inertial balance is accomplished in one of, but not limited to, the following manners: (1) removing or adding appropriate weight from the turbine rotor, (2) providing a mirrored passageway that is provided with a non-flow plug, or (3) a combination thereof.

Further, in preferred embodiments, to provide for a degree of inertial balance of turbine rotor 12, nozzles, sets of nozzles and/or combustion chamber-nozzle units, are located in one of, but not limited to, the following manners: (1) equally spaced, for nozzles attached to the turbine rotor at constant radial distances from the turbine shaft axis, (2) the overall sum of the vector products of the mass of each nozzle times its corresponding radial measurement from the shaft axis to the point of its center of mass equals zero, or (3) a combination thereof.

Other means for obtaining inertial balance of the turbine are envisioned by the applicant. Final balance of turbine shafts, turbine rotors, and complete rotating assemblies is generally accomplished by either removing or adding material (weight) to the rotating component(s), as indicated during a dynamic balancing process. Balancing methods and techniques are well known.

Figure 58:
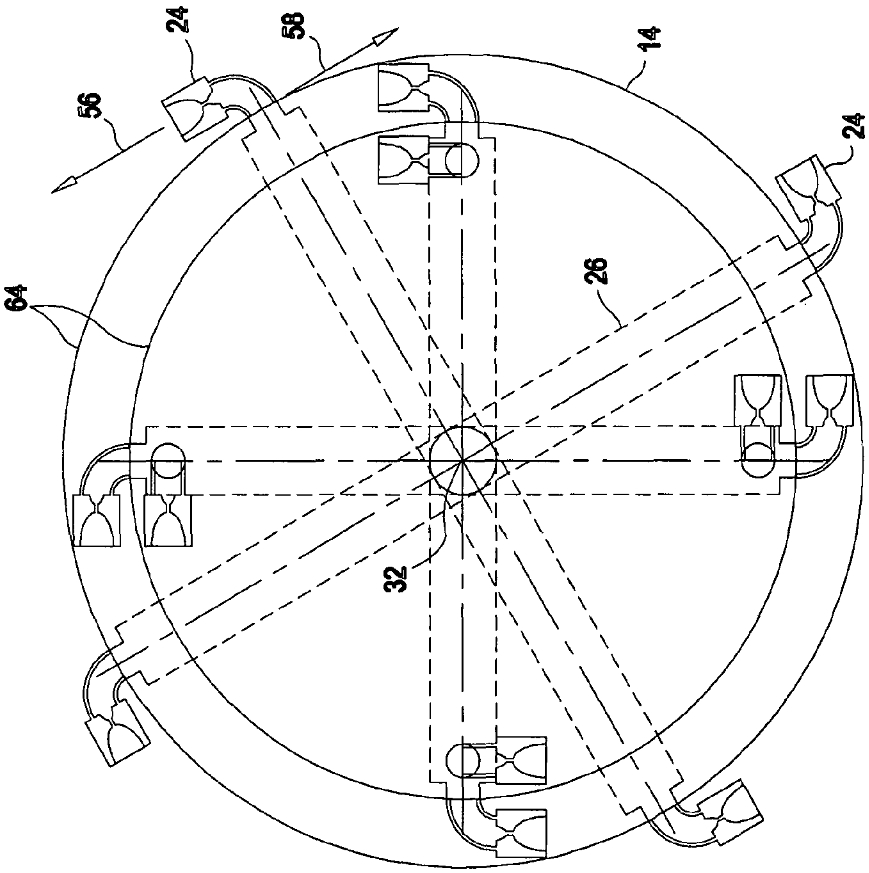
FIG. 58 is a elevation view of the multiple-rotor-section turbine shaft and rotor of another preferred embodiment of the invention of FIG. 57.
Figure 57:
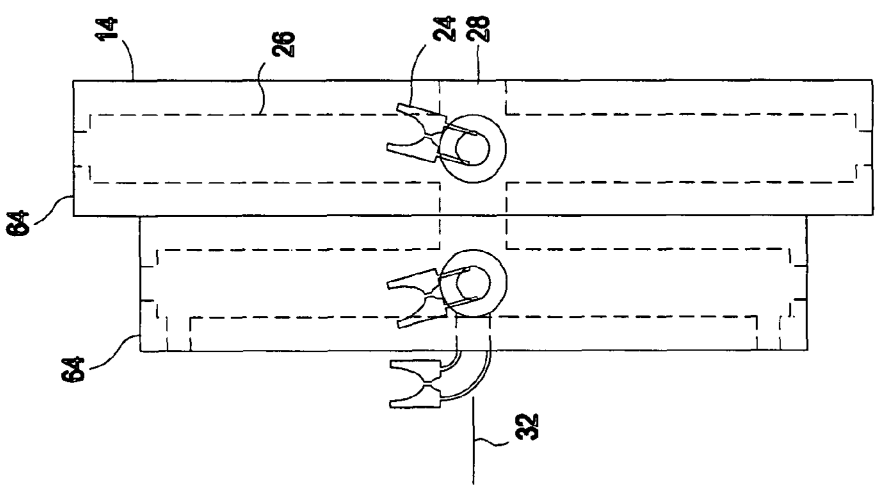
FIG. 57 is a cross-sectional view of the multiple-rotor-section turbine shaft and rotor of another preferred embodiment of the invention.
Figure 59:
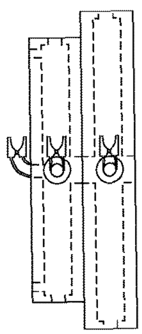
FIG. 59 is a cross-sectional view of the multiple-rotor-section turbine shaft and rotor of another preferred embodiment of the invention.
Figure 60:
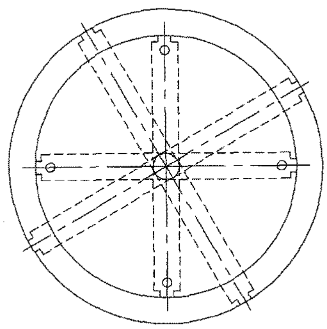
FIG. 60 is a elevation view of the multiple-rotor-section turbine shaft and rotor of another preferred embodiment of the invention of FIG. 59.

In preferred embodiments, the nozzle angles "alpha", "omega", and "theta" are defined on FIGS. 57 and 58 as follows: (1) nozzle angle "alpha" is the vector component angle between the axis of the fluid exiting the nozzle (fluid axis 56) and the plane of the direction opposite the tangential direction of rotation 58 (i.e., a plane parallel to the turbine shaft axis 32 and parallel to the direction opposite the tangential direction of rotation 58 and passing through the location of nozzle 24 at perimeter 64), (2) nozzle angle "omega" is the vector component angle between the axis of the fluid exiting the nozzle (fluid axis 56) and the plane of the turbine rotor section (i.e., the plane perpendicular to turbine shaft axis 32 and passing through turbine rotor perimeter 64), and (3) nozzle angle "theta" is the vector component angle between the axis of the fluid exiting the nozzle (fluid axis 56) and plane of the turbine shaft axis (i.e., the plane passing through turbine shaft axis 32 and passing through the location of nozzle 24 at perimeter 64). These three angles, as vector components, describe three-dimensional angle, as referenced herein.

In a background art turbine, the pressure-compound stages are typically "stacked" axially, in the general direction of flow from the turbine inlet to the turbine exit. For some preferred embodiments of the present invention, pressure-compound stages are also designed to be stacked axially, as illustrated in FIGS. 18, 196-198 and 200-214, for examples. Additionally, for certain preferred embodiments of the present invention, pressure-compound stages are designed to be stacked radially, as illustrated in FIGS. 77-98, 106-108, 112, 113, 117-132, 134-136, 138-157, 167-174, 177-179, 186-193, 218 and 219, for examples. And, for certain preferred embodiments of the present invention, the turbine may be comprised of a combination of axially stacked and radially stacked, pressure-compound stages, as illustrated in FIGS. 133, 158-164 and 199, for examples.

Referring again to FIGS. 18, 196-198 and 200-214, for axially-stacked, pressure-compound stage turbine design, two or more pressure-compound stages are preferably used. The first stage originates at the inlet of shaft passageway(s) or non-shaft passageway(s), through which fluid(s) enter(s) initially, that are hydraulically connected, through one or more rotor passageway(s), to one or more nozzle(s), set(s) of nozzle(s) and/or combustion chamber-nozzle unit(s), on turbine rotor(s) or turbine rotor section(s) contained in one or more turbine chamber(s), with each such turbine chamber 34 being of like pressure, but not necessarily final pressure, and ends with the corresponding turbine chamber(s) into which the fluid(s) exit(s) the nozzle(s), set(s) of nozzle(s) and/or combustion chamber-nozzle unit(s). For such arrangement, and for each subsequent stage(s), the exit pressure of each nozzle of that respective stage is theoretically the same as the turbine chamber pressure in which the nozzle(s) reside(s). The second stage originates at the inlet of shaft passageway(s) or non-shaft passageway(s), through which fluid(s) from the first-stage turbine chamber(s) enter(s), that are hydraulically connected, through one or more rotor passageway(s), to one or more nozzle(s), set(s) of nozzle(s) and/or combustion chamber-nozzle unit(s), on turbine rotor(s) or turbine rotor section(s) contained in one or more turbine chamber(s), with each such turbine chamber 34 being of like pressure, but not necessarily final pressure, and ends with the corresponding turbine chamber(s) into which the fluid(s) exit(s) the nozzle(s), set(s) of nozzle(s) and/or combustion chamber-nozzle unit(s). Additional pressure-compound stage(s), if any, follow(s) the same design and flow routine as aforementioned, however, for each subsequent stage, the downstream pressure is decreased, in appropriate increments, to that pressure which is appropriate for the turbine chamber associated with the last stage (i.e., final pressure or turbine exit pressure or back-pressure).

Referring again to FIG. 18, in this preferred embodiment, initial fluid(s) enter through either first inlet port 70 or second inlet port 72 or both and pass through shaft passageway(s) and passage way(s) in the rotor on the left, exiting into the left-hand (first) turbine chamber. For an application in which first inlet fluid 46 and second inlet fluid 48 are the same substance, but at different thermodynamic conditions, the nozzle(s) or set(s) of nozzles are designed to provide a common nozzle exit discharge pressure. This combined fluid exits the left-hand (first) turbine chamber by passing through shaft passageway(s) to nozzle(s) of the second rotor, on the right of FIG. 18. Third fluid substance 50, at another fluid condition, is/may be routed through third inlet port 74, directly to the right-hand rotor. For either scenario, fluid(s) entering the right-hand rotor pass(es) into the second turbine chamber at a pressure lower than that of the left-hand (first) turbine chamber. On an axial basis, for the FIG. 18 example, there are two pressure changes, using two turbine chambers, thus, the turbine is pressure-compounded. Likewise, another preferred embodiment has first inlet fluid 46 and second inlet fluid 48 as different substances, whether at different thermodynamic conditions or not but compatible when joined, or mixed, or in some applications reacted, in the first turbine chamber, and in like manner, third inlet fluid 50, whether the same as either of the first inlet fluid or the second inlet fluid and whether at either of the same thermodynamic conditions of said two fluids or not, is compatible with the joined or mixed or reacted fluid from the first turbine chamber. Other embodiments comprise more than the two pressure stages and/or more than the three inlet fluids, and as different or the same substance(s), and at different or the same thermodynamic conditions, and as different or the same mixtures, and other such variations.

In another preferred embodiment having a radially-stacked, pressure-compound stage turbine design, two or more pressure stages are incorporated into turbine engine 10. The first stage originates at the inlet of shaft passageway(s) or non-shaft passageway(s), through which fluid enters initially, that is/are hydraulically connected to nozzle(s), set(s) of nozzle(s) and/or combustion chamber-nozzle unit(s) on turbine rotor(s) or turbine rotor section(s), with the exit pressure of each nozzle being of like, but not final, pressure, and ends with the corresponding nozzle-exit chamber, where said nozzle-exit chamber is a turbine chamber or an intermediate chamber and where an intermediate chamber is similar to the turbine chamber but is not, or may not be only, bound by stationary surfaces or walls. Rather, such nozzle-exit chamber, as an intermediate chamber, is bound by (1) surfaces attached to and part of the turbine rotor(s) and/or turbine rotor section(s) incorporated with turbine shaft(s) through which inlet fluid(s) initially flow(s) and also bound by surfaces attached to and part of the turbine rotor(s) and/or turbine rotor section(s) incorporated with another (second) turbine shaft, as illustrated in FIGS. 83-94, 106 and 107, (2) a combination of fixed surfaces/walls and of surfaces attached to and part of turbine rotor(s) and/or turbine rotor section(s), as illustrated in FIGS. 95-98, 108, 112, 113, 117-132, 134-136, 138-164, 167-174, 177-179, 186-193 and 219, or (3) both, as illustrated in FIG. 218.

In a preferred embodiment, the second stage originates at the inlet(s) of passageway(s), located through surface(s) which serve(s) as one or more of the bounding surfaces of the second stage nozzle-exit chamber, or second intermediate chamber, and through which fluid(s) from the first nozzle-exit chamber(s), or first intermediate chamber, are hydraulically connected to nozzle(s), portion(s) of nozzle(s), set(s) of nozzles and/or combustion chamber-nozzle unit(s), located on or about one or more of the surfaces that bound the nozzle-exit chamber of the second stage, or second intermediate chamber, and ends with the corresponding nozzle-exit chamber, or second intermediate chamber. The exit pressure of each second-stage nozzle corresponds to the pressure of the second-stage nozzle-exit chamber(s) into which each second-stage nozzle discharges. Such nozzle exit pressure may or may not necessarily be the final pressure. If said nozzle-exit pressure is the final pressure, then said second intermediate chamber is, in fact, the turbine chamber. Additional pressure-compound stage(s), if any, preferably follow the same design and flow routine as aforementioned in this paragraph, however, for each subsequent stage, the downstream pressure is decreased, in appropriate increments, to that pressure which is appropriate for the nozzle-exit chamber associated with the last stage, which last nozzle-exit chamber is also the corresponding turbine chamber, or last turbine chamber if turbine engine has more than one turbine chamber. In some preferred embodiments of the present invention, fluid(s) entering a given nozzle-exit chamber may be routed (1) through passageway(s) exiting previous nozzle-exit chamber(s), if any, and hydraulically connected to nozzle(s) or set(s) of nozzles, of said given nozzle-exit chamber, (2) through one or more shaft passageway(s) of one turbine shaft section hydraulically connected, through turbine rotor(s) or turbine rotor section(s), to nozzle(s), or set(s) of nozzles, contained in said given nozzle-exit chamber, (3) through one or more shaft passageway(s) (different from "(2)" immediately above) of said one turbine shaft section hydraulically connected, through turbine rotor(s) or turbine rotor section(s), to nozzle(s), or set(s) of nozzles, with such nozzle(s) being other than, and in addition to, the nozzle(s) of "(2)" immediately above and contained in said given nozzle-exit chamber, (4) through one or more shaft passageway(s) of another (second) turbine shaft section hydraulically connected, through turbine rotor(s) or turbine rotor section(s), to nozzle(s), or set(s) of nozzles, contained in said given nozzle-exit chamber, (5) through one or more shaft passageway(s) (different from "(4)" immediately above) of said second turbine shaft section hydraulically connected, through turbine rotor(s) or turbine rotor section(s), to nozzle(s), or set(s) of nozzles, with such nozzle(s) being other than, and in addition to, the nozzle(s) of "(4)" immediately above and contained in said given nozzle-exit chamber, (6) through one or more non-shaft passageway(s) hydraulically connected to said given nozzle-exit chamber, or (7) combinations thereof. In addition to the preferred embodiments illustrated in FIGS. 83-94, 106-108, 126, 128-136, 138-164, 169-174, 177-179, 186-189, 191-193, 218 and 219, for examples, alternative embodiments comprise other combinations and additional pressure stages. In some preferred embodiments of the present invention, in addition to fluid(s) entering a given nozzle-exit chamber and exiting said nozzle-exit chamber through passageway(s) into the next intermediate chamber, or first/next/last turbine chamber, as appropriate, said fluid, at any flow quantity, may exit, whether controlled or uncontrolled, through non-shaft passageway(s) hydraulically connected to said nozzle-exit chamber, as illustrated in FIGS. 97, 98, 132, 133, 138-140, 143, 186, 187, 192 and 193, as examples.

Figure 116:
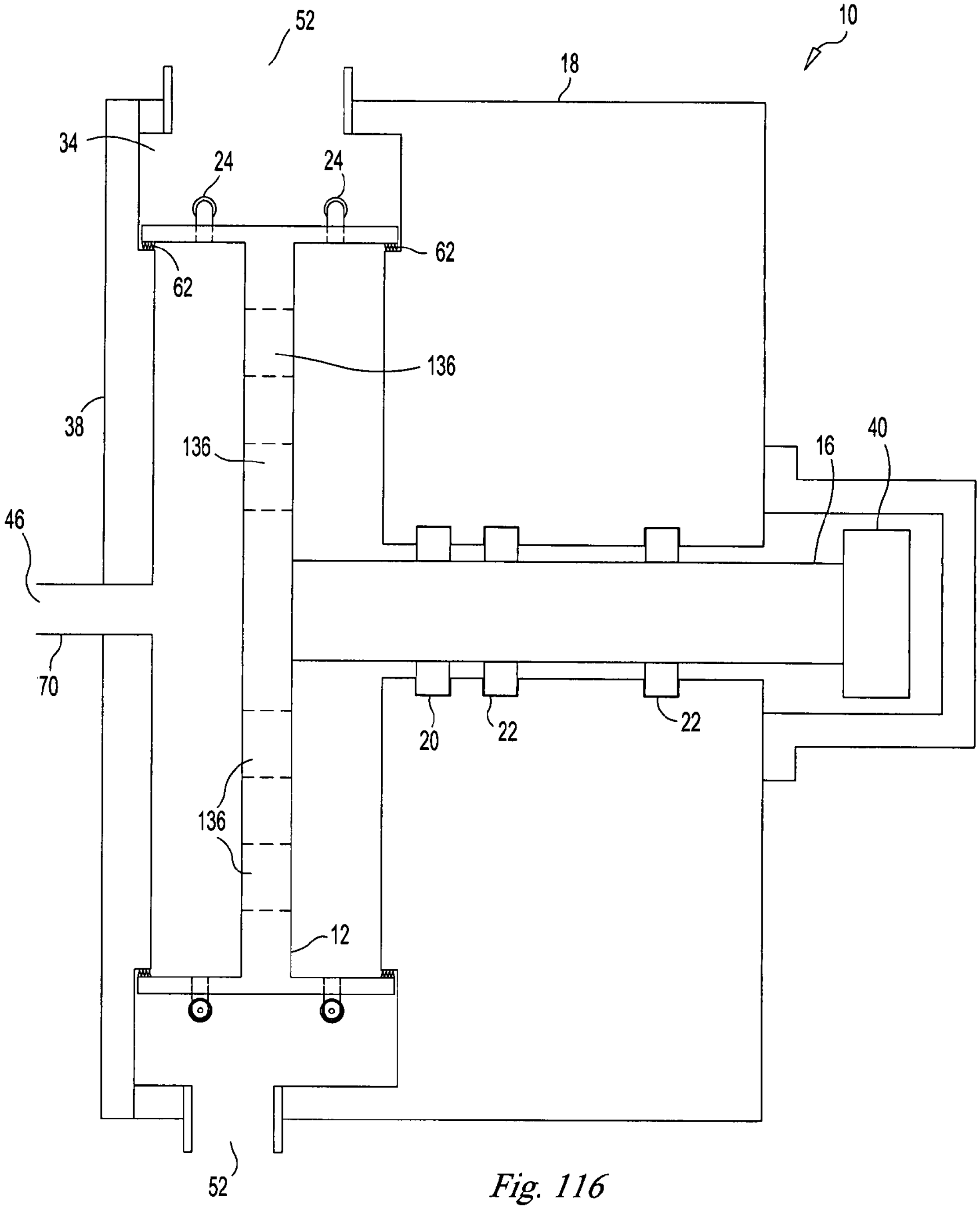
FIG. 116 is a cross-sectional view of the single stage turbine shaft and rotor of another preferred embodiment of the invention.

In addition to axial forces of nozzle(s), portion(s) of nozzle(s), set(s) of nozzle(s) and/or combustion chamber-nozzle unit(s) imparting axial thrust to rotor(s), axial thrust may also be imparted due to fluid pressure differential(s) across rotor surface(s). To reduce, mitigate or eliminate the effect of said differential(s), non-shaft passageway(s), commonly referenced as equalizing hole(s) or equalizing passage(s), are located in rotor(s), typically, the rotor web section(s), as a preferred technique or method. FIGS. 116-125 illustrate preferred embodiments of the present invention using said non-shaft passageway(s), commonly referenced as equalizing hole(s) or equalizing passage(s) 136, in the rotor section(s) of each embodiment. Referring to FIG. 116, a single-pressure-stage turbine engine of the present invention incorporates nozzle(s), portion(s) of nozzle(s), set(s) of nozzle(s) and/or combustion chamber-nozzle unit(s) located at, on, at a distance from (through connecting passageway(s)), integral with and/or recessed in the circumferential perimeter of turbine rotor 12 having equalizing holes/passages 136 located in the rotor's web, wherein inlet fluid 46 can pass from the left-hand side of said rotor web to the right-hand side of same said web; thus, the pressure of inlet fluid 46 is the same on both sides of said rotor web and, therefore, axial force(s) associated with the pressure of inlet fluid 46, acting on the surface area of only one side of turbine rotor 12, is/are otherwise essentially negated, which results in an essential balance of axial forces associated with the pressure/area forces of rotor 12. However, closer observation of FIG. 116, reveals that the left-hand surface area of said web, upon which the pressure of inlet fluid 46 acts, is mathematically larger than the right-hand surface area of said web, upon which the pressure of inlet fluid 46 acts, the difference owing to the shaft cross-sectional area. For applications wherein the shaft size is relatively insignificant, the differences in said left-hand and right-hand surface areas result in minimal or negligible axial thrust force upon the rotor, for which said minimal/negligible axial thrust force is typically, but not necessarily, contained/absorbed with a shaft thrust bearing arrangement and/or incorporated in the strategy associated with nozzle arrangements and directional positions, as discussed previously herein. For applications wherein the shaft size is relatively significant, the differences in said left-hand and right-hand surface areas result in significant axial thrust force upon the rotor, for which said significant axial thrust force can be contained with a shaft thrust bearing arrangement and/or incorporated in the strategy associated with nozzle arrangements and directional positions, or as further described below.

Figure 117:
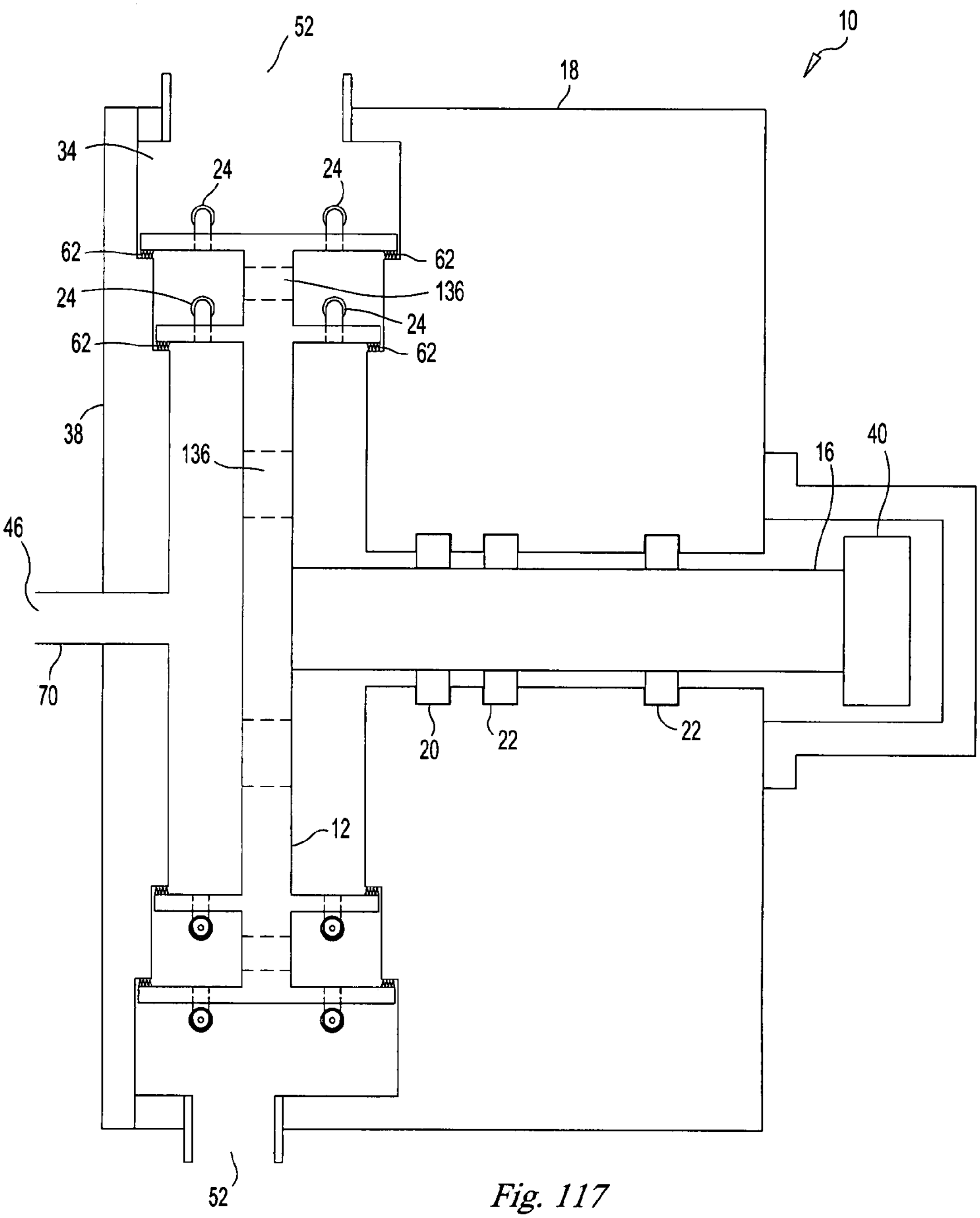
FIGS. 117-134 are cross-sectional views of other preferred pressure-compound embodiments of the invention.
Figure 118:
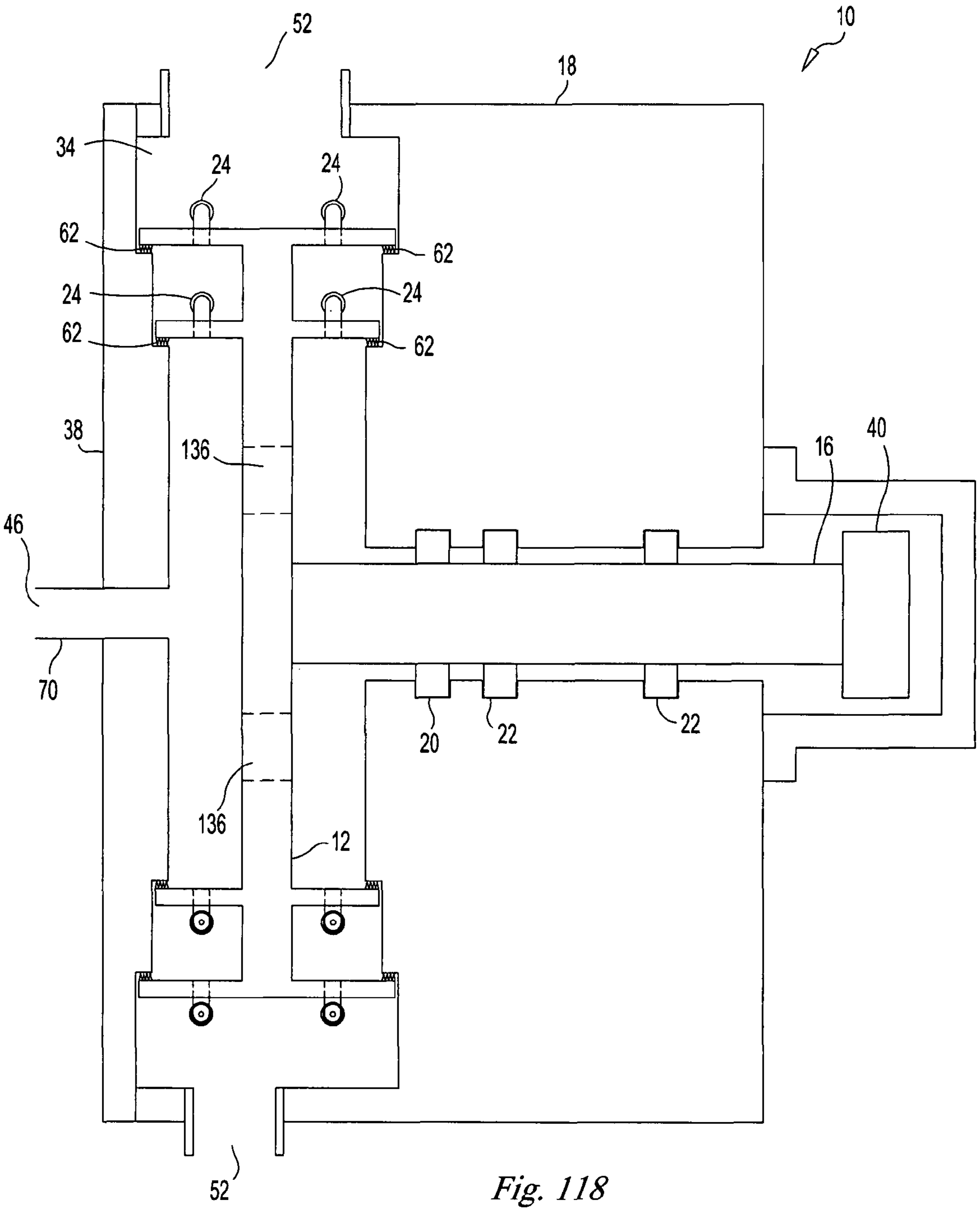
Figure 119:
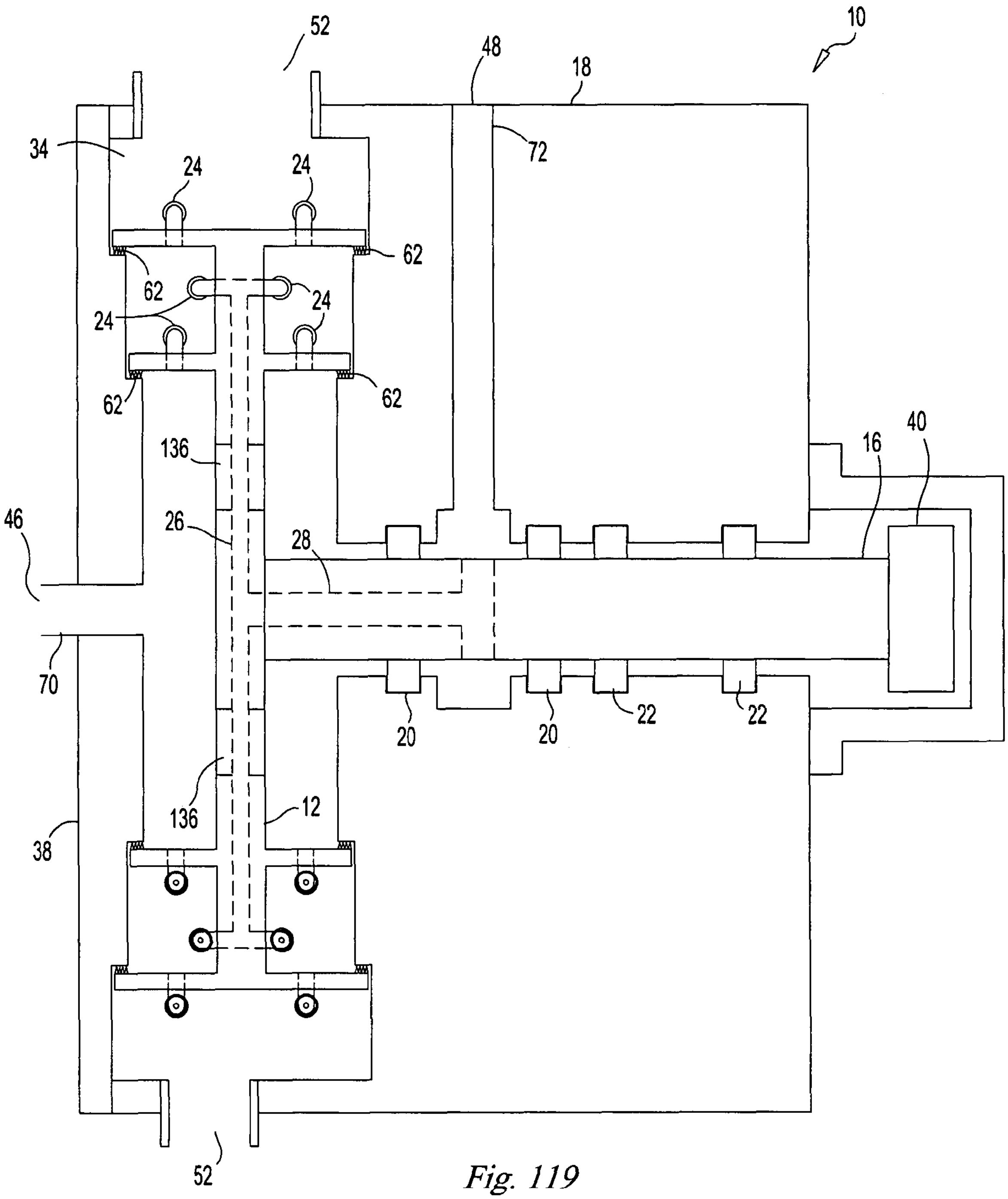
Figure 120:
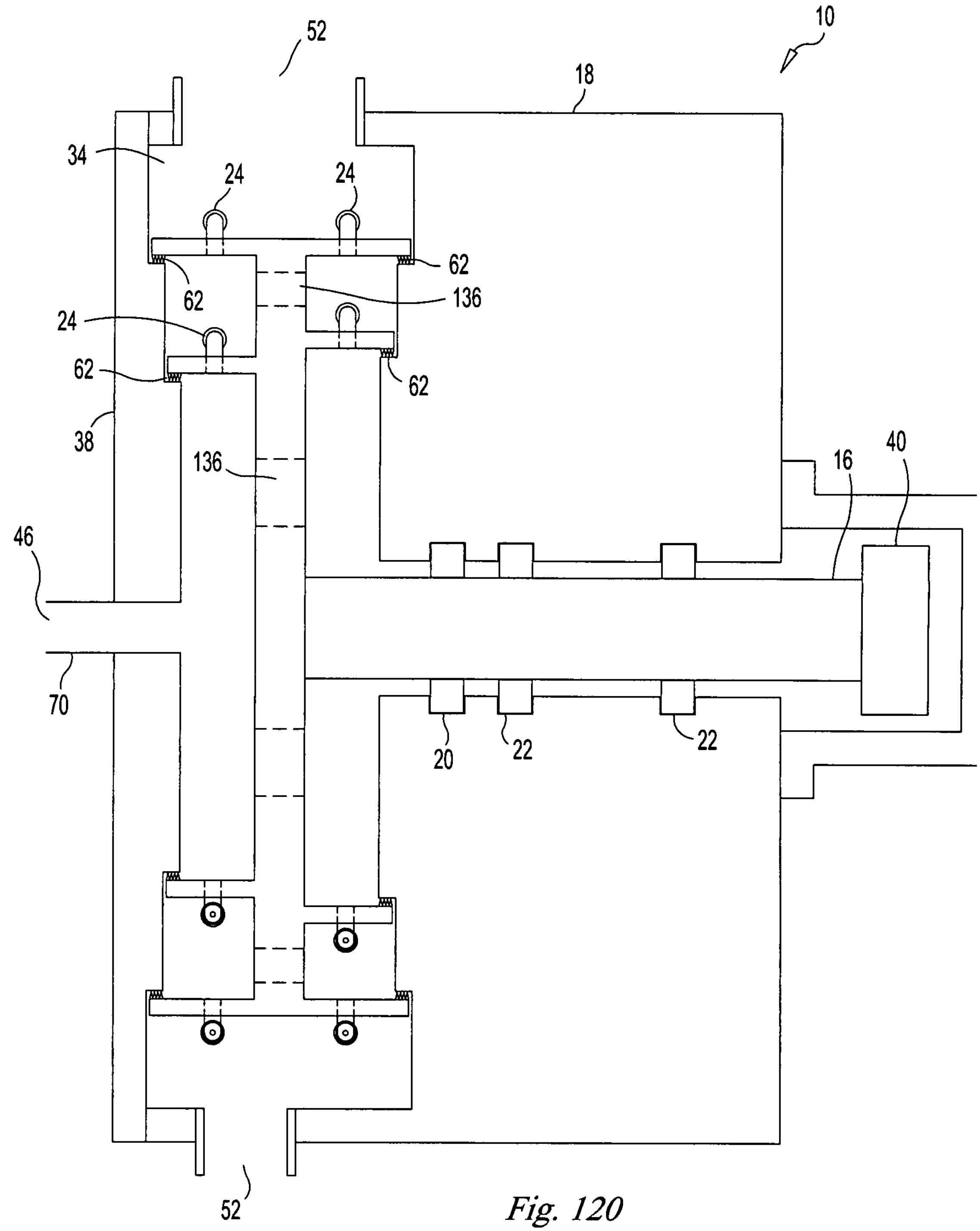
Figure 121:
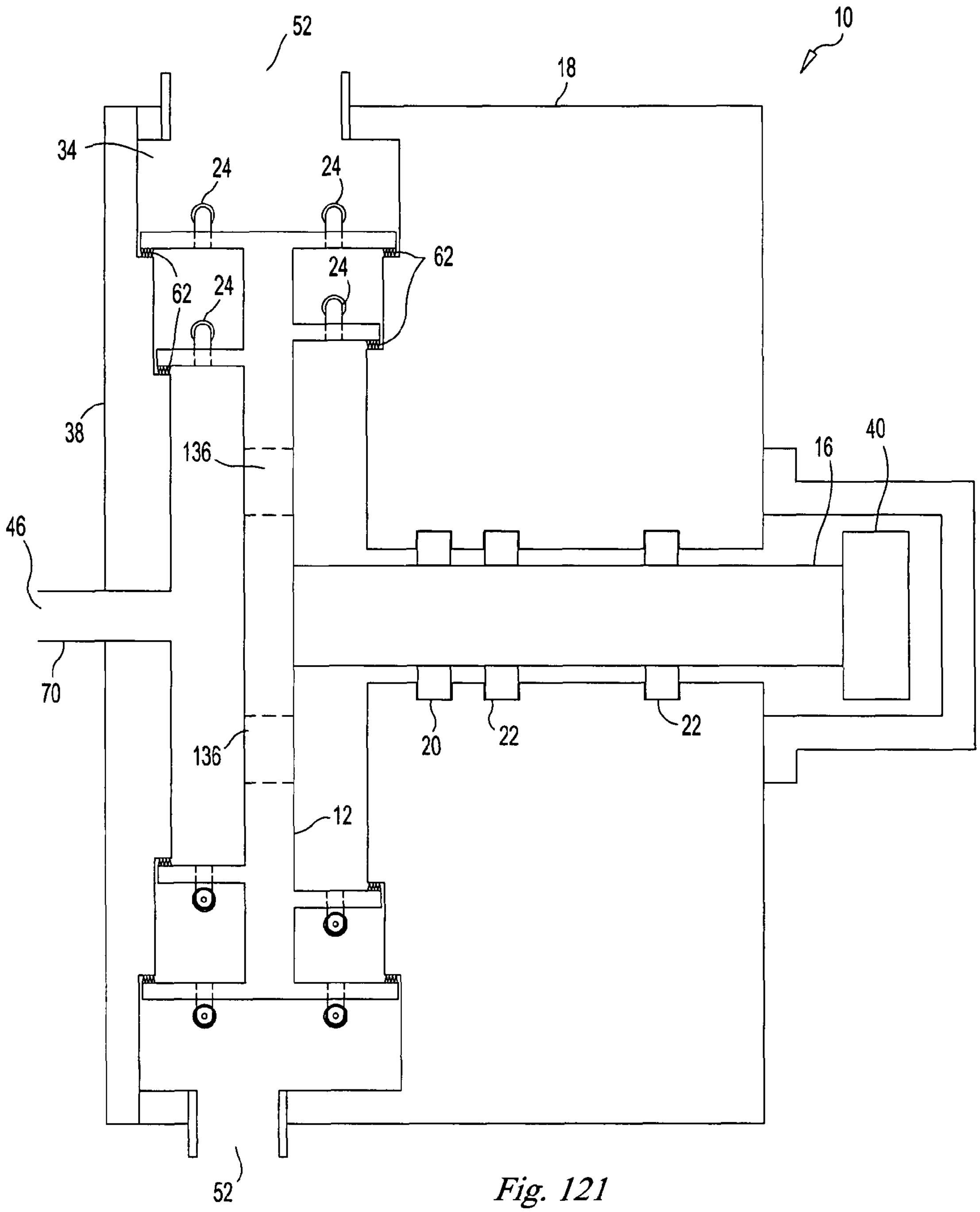
Figure 122:
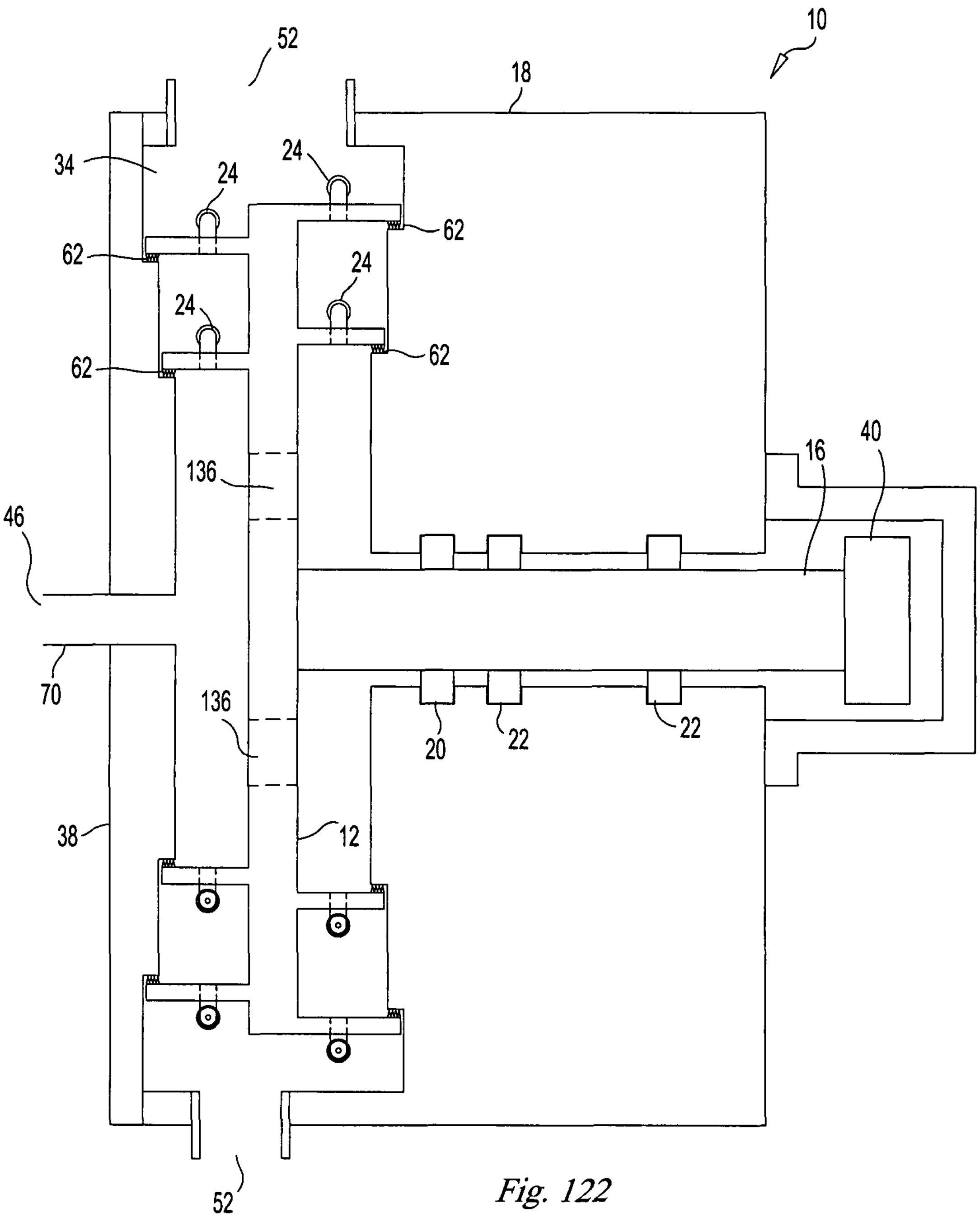
Figure 123:
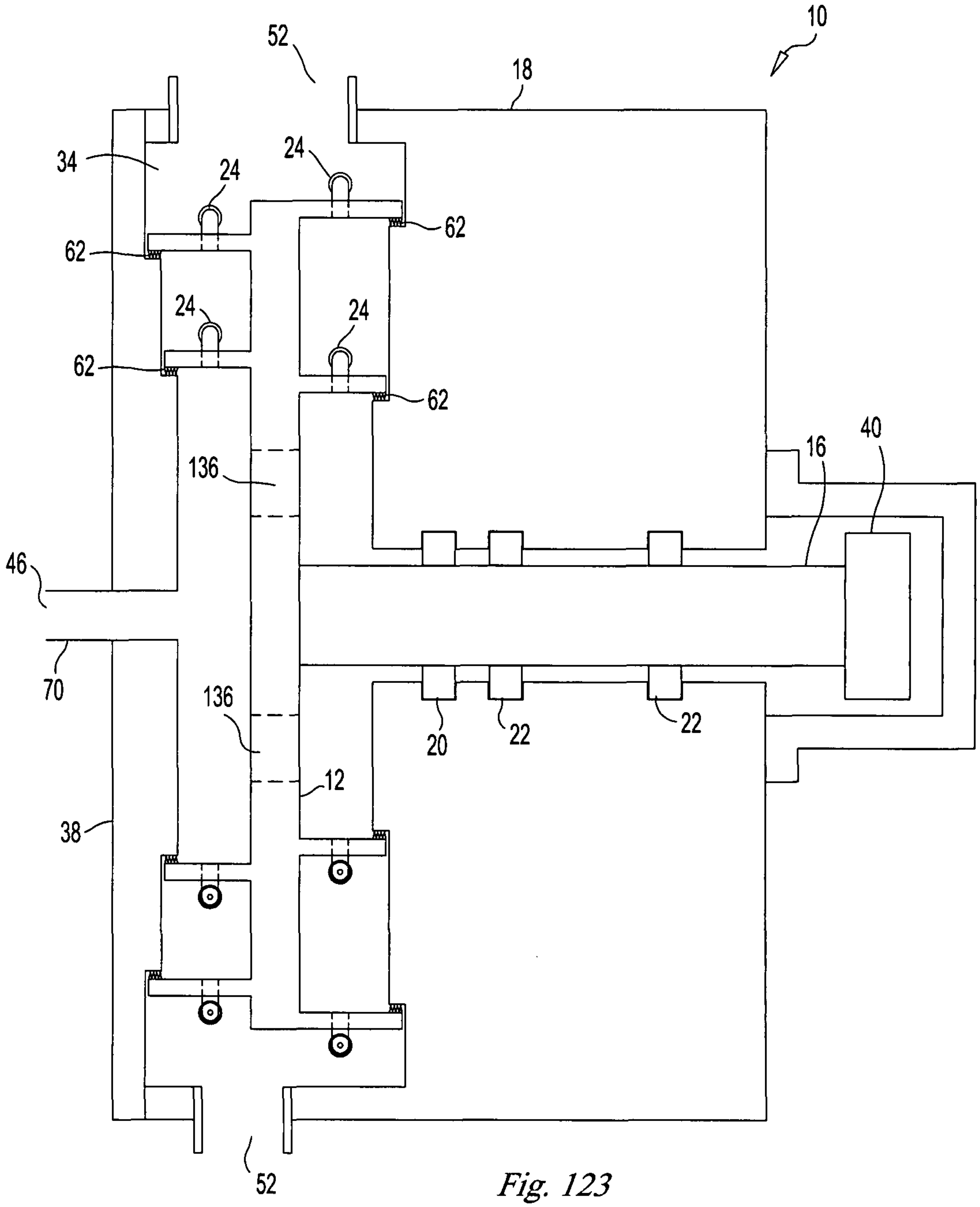
Figure 124:
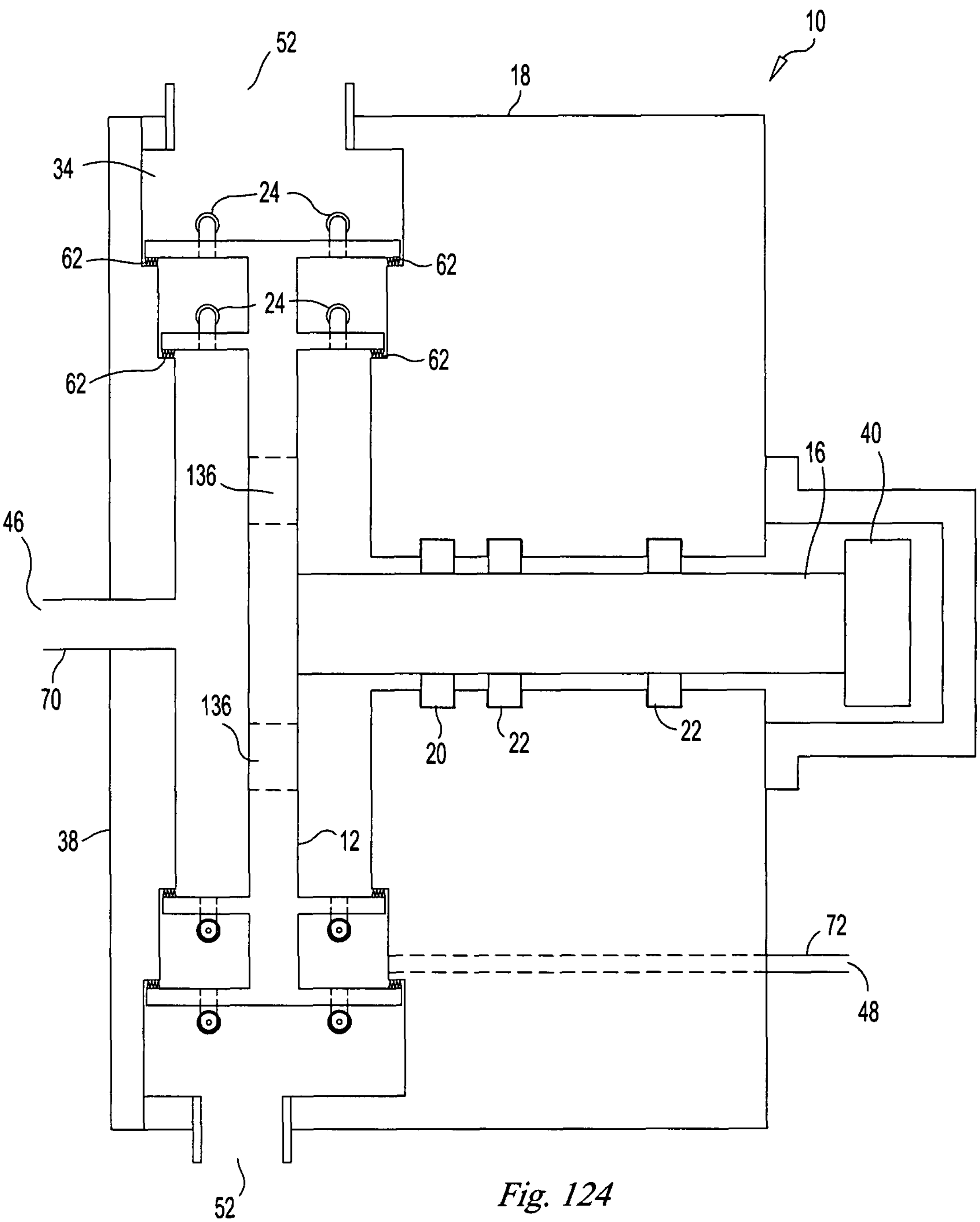
Figure 125:
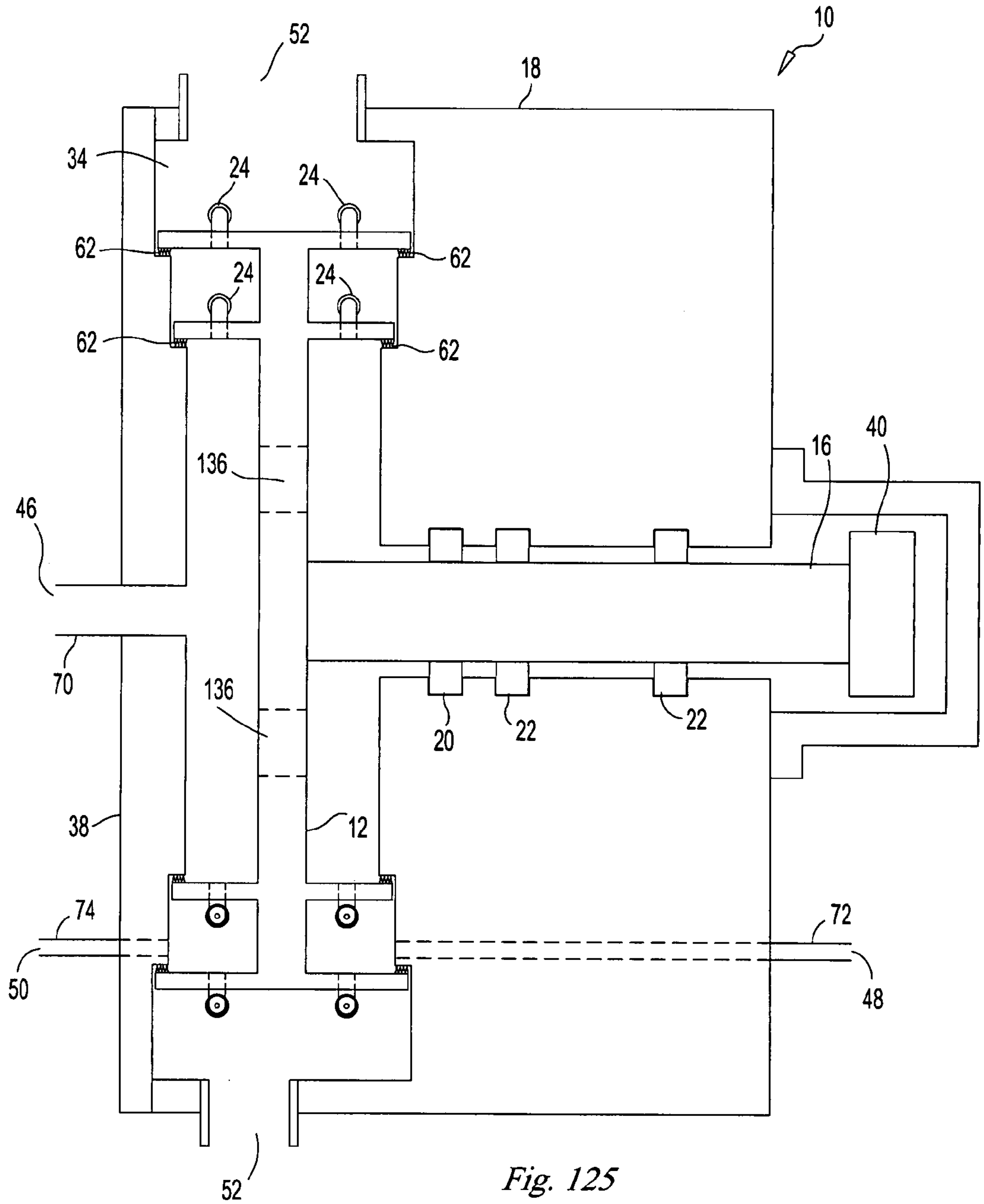
Figure 126:
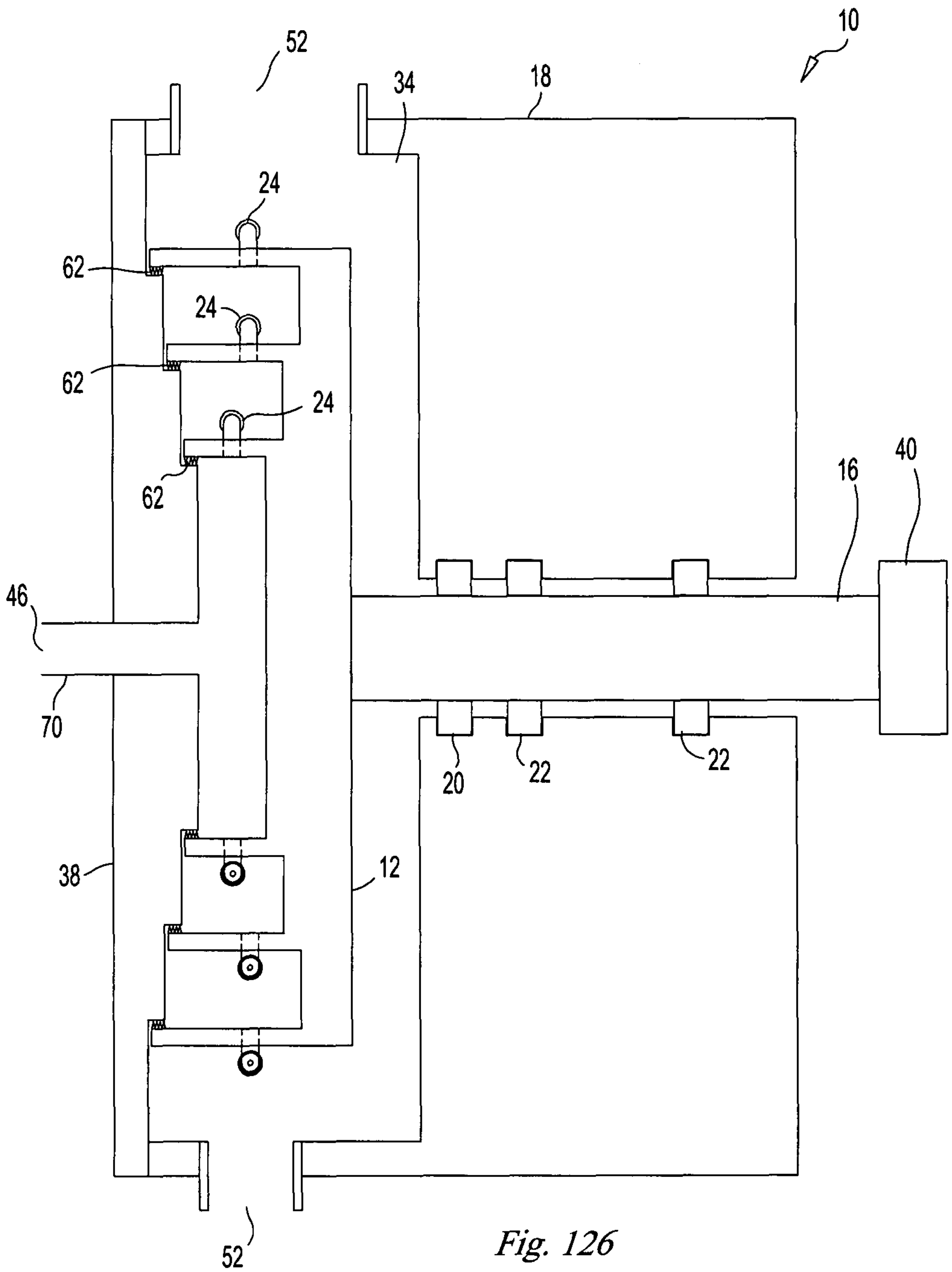
Figure 127:
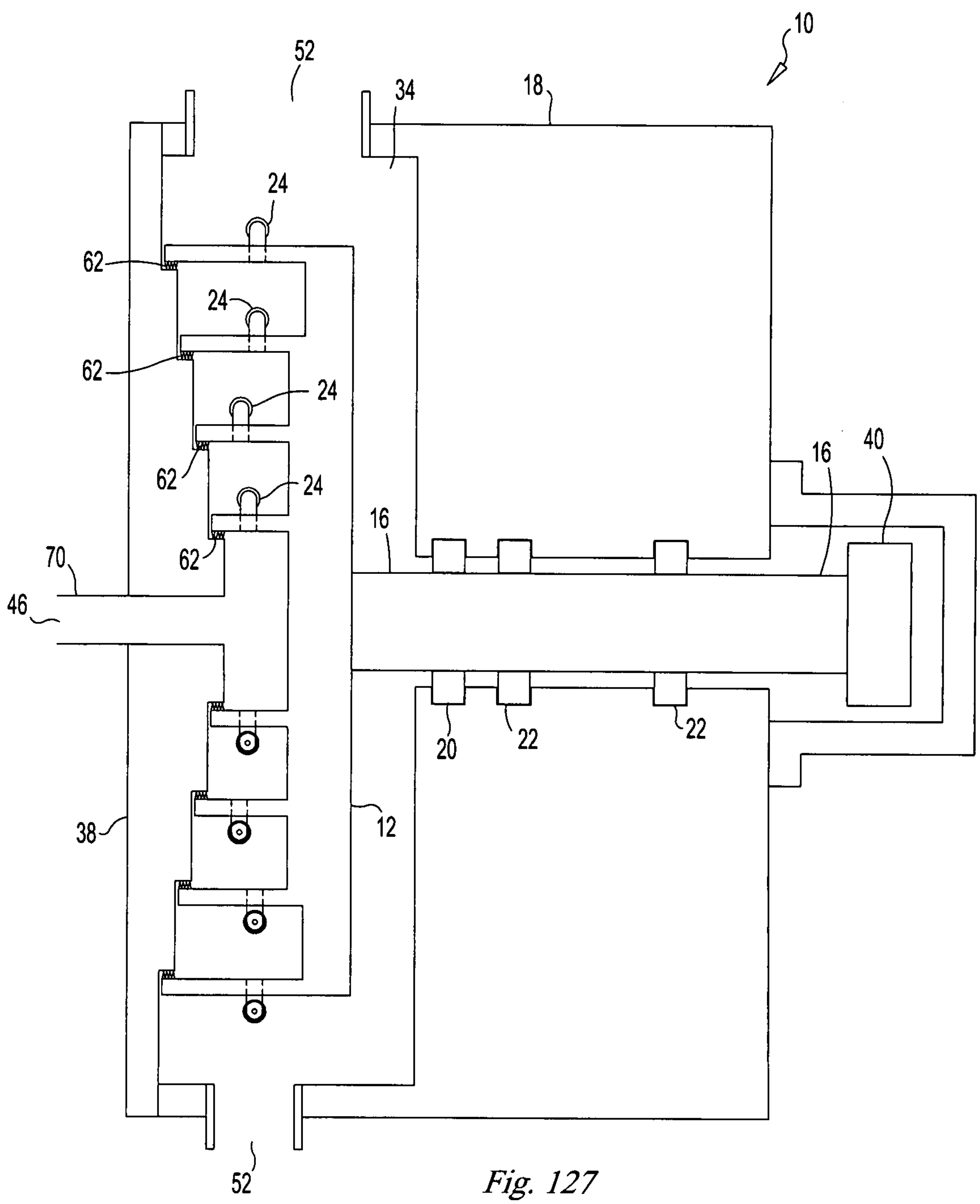
Figure 128:
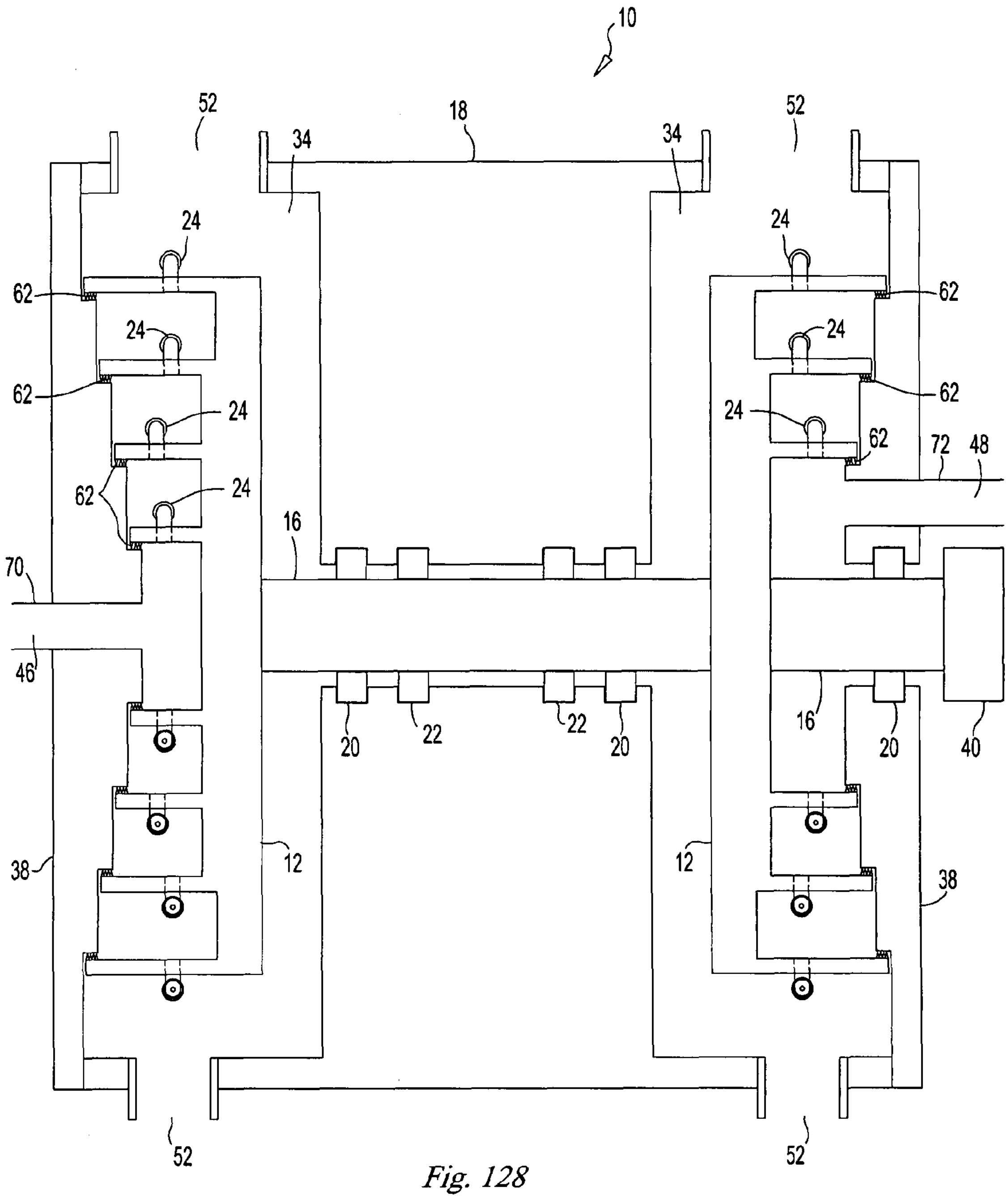
Figure 129:
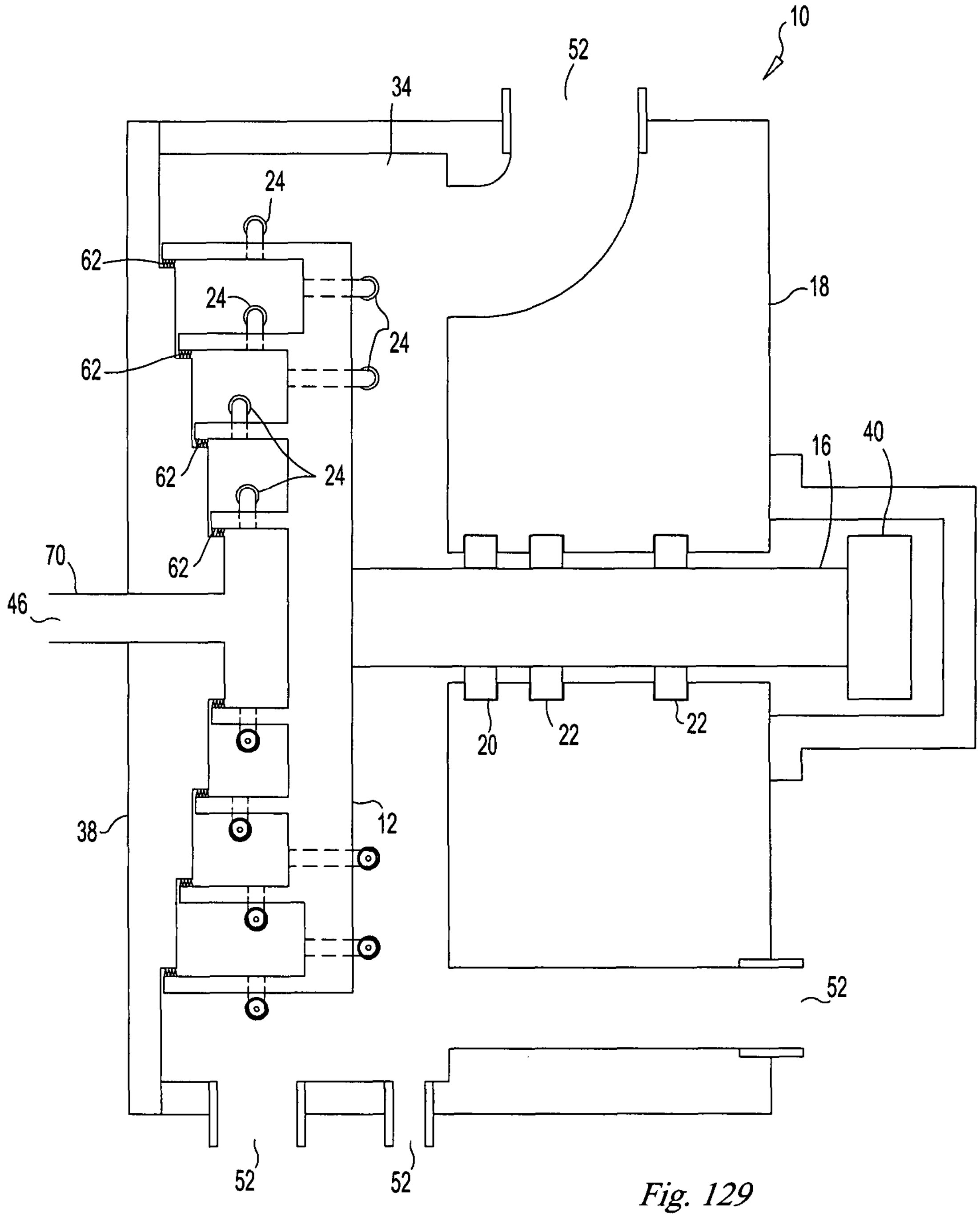
Figure 130:
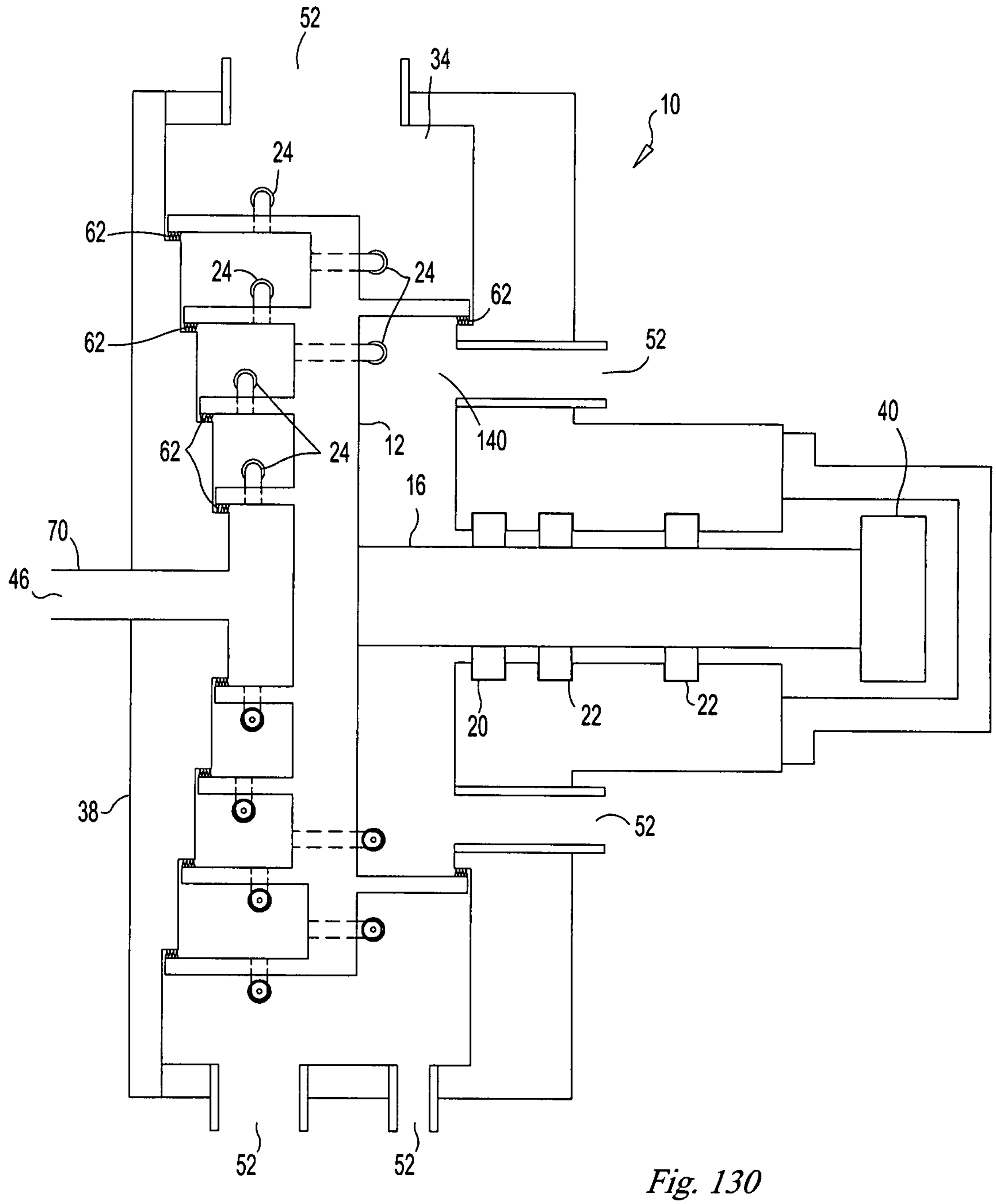
Figure 131:
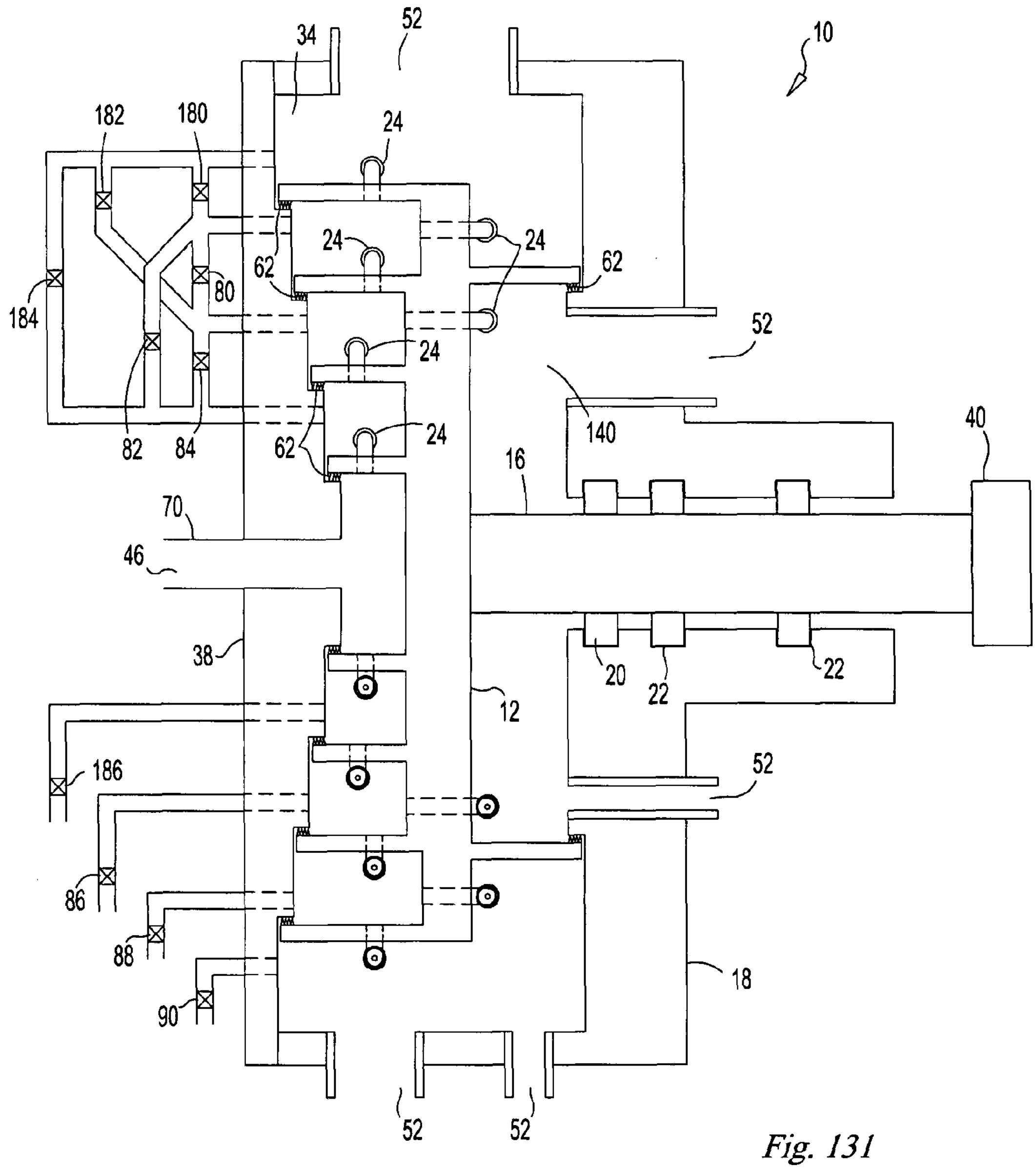
Figure 132:
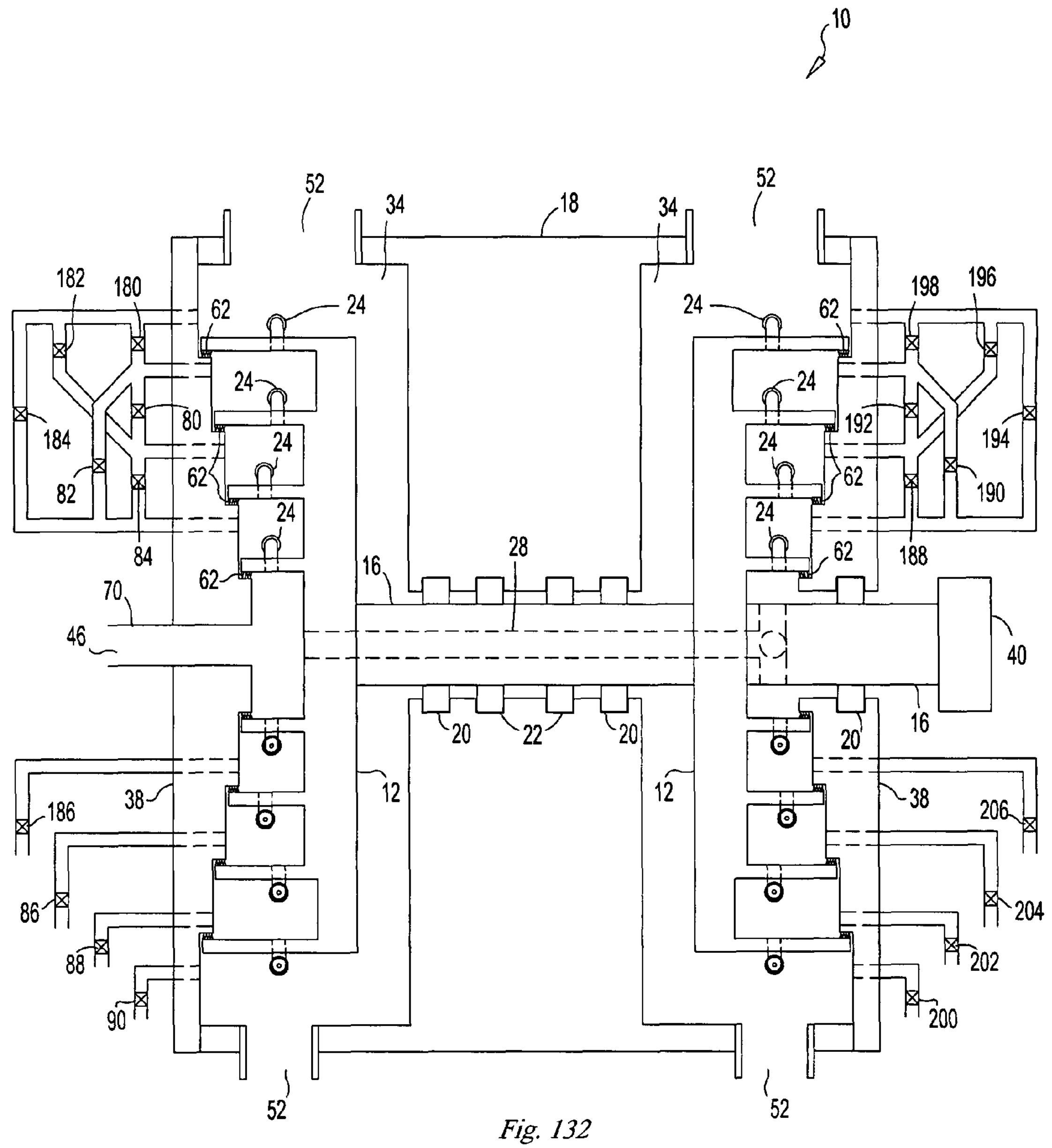
Figure 133:
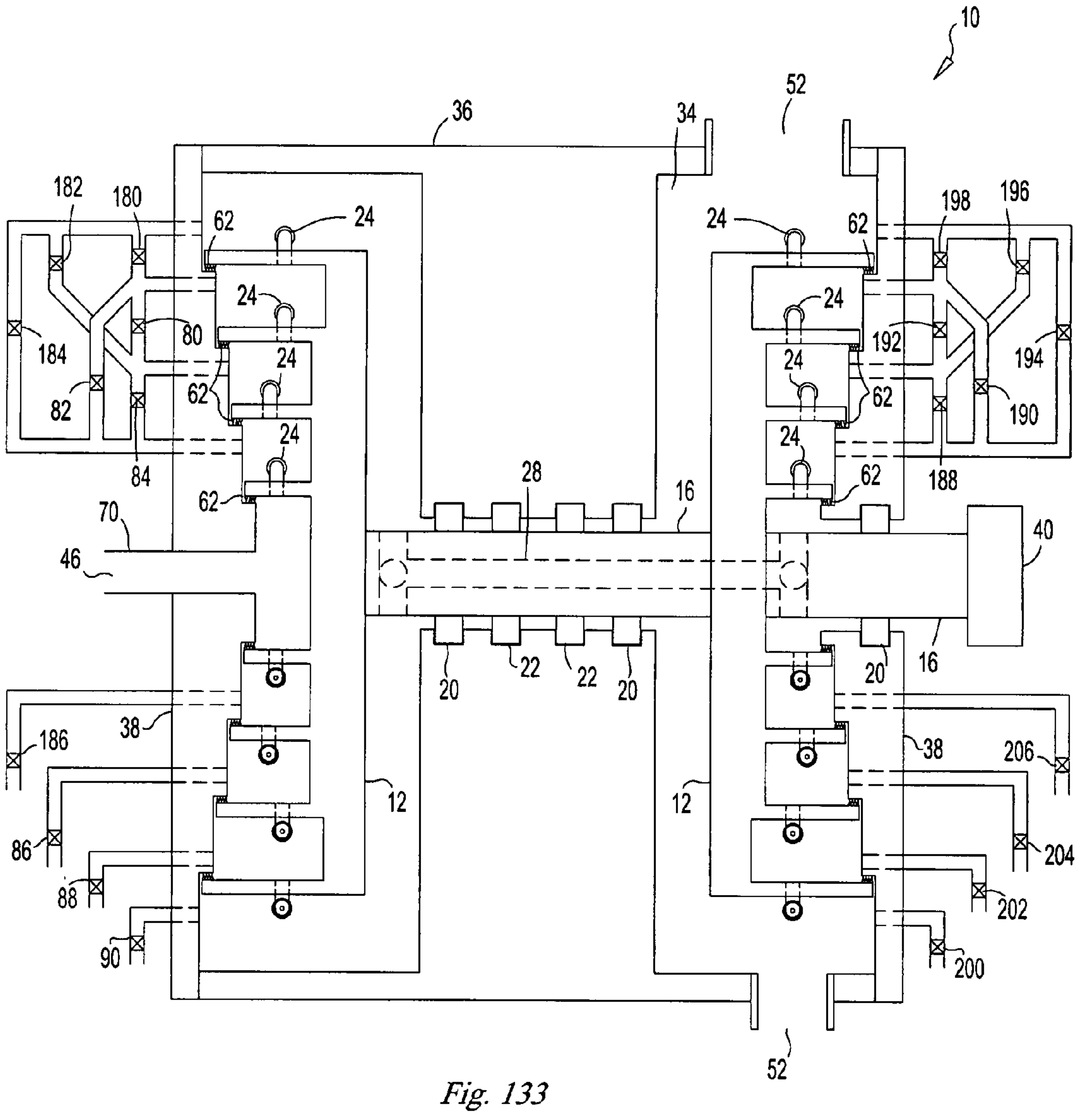
Figure 134:
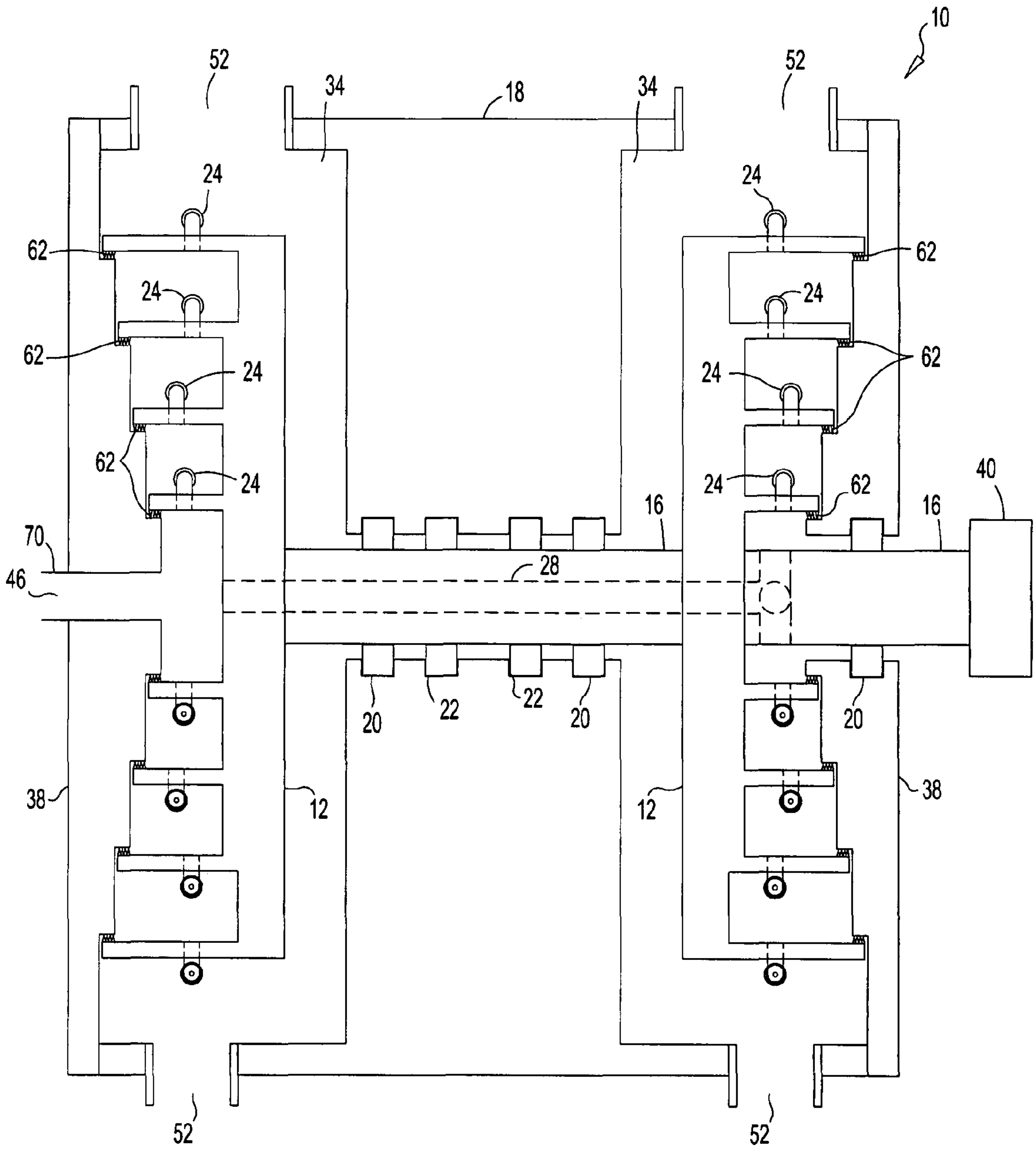
Figure 135:
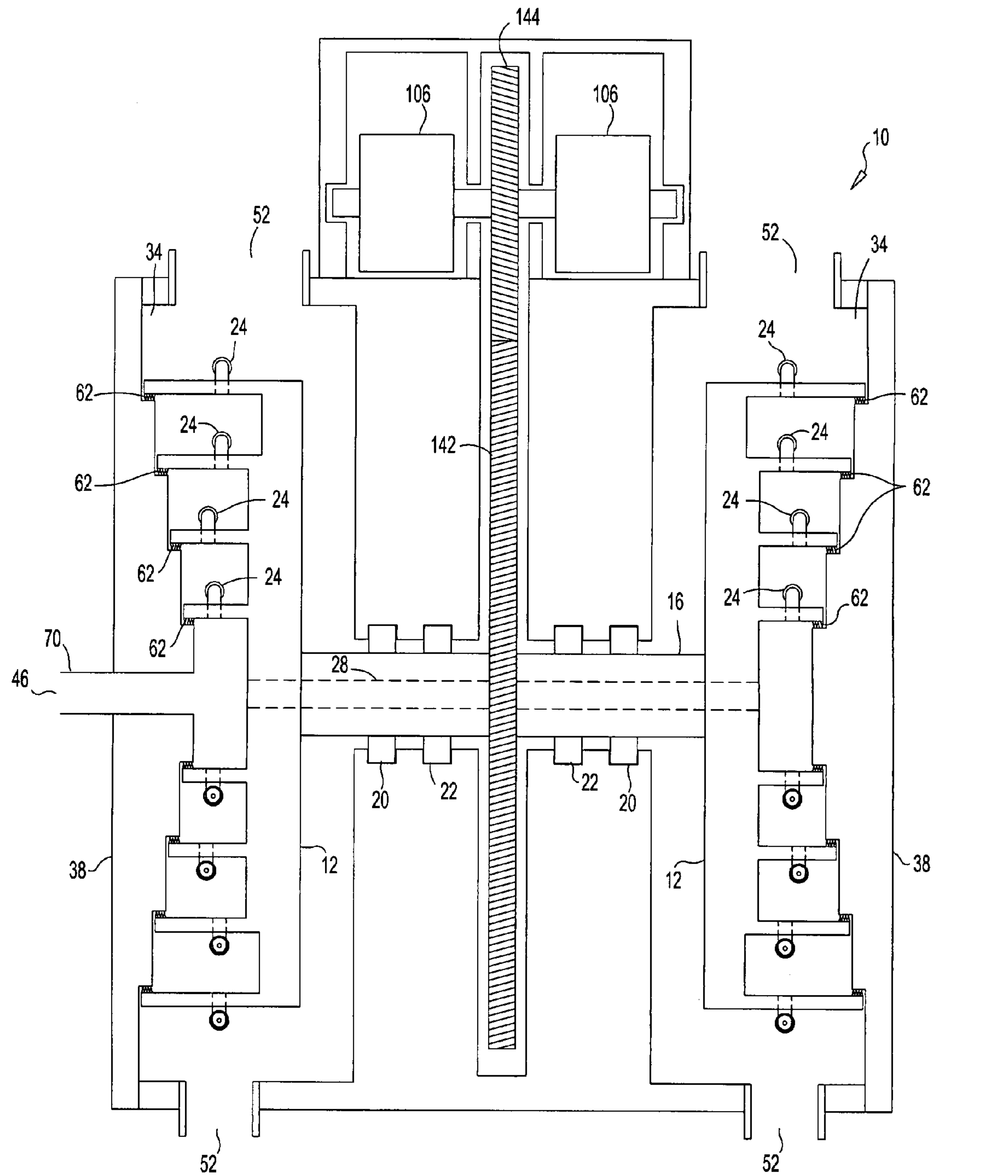
FIGS. 135 and 136 are cross-sectional views of other preferred pressure-compound embodiments of the invention, with generators.
Figure 136:
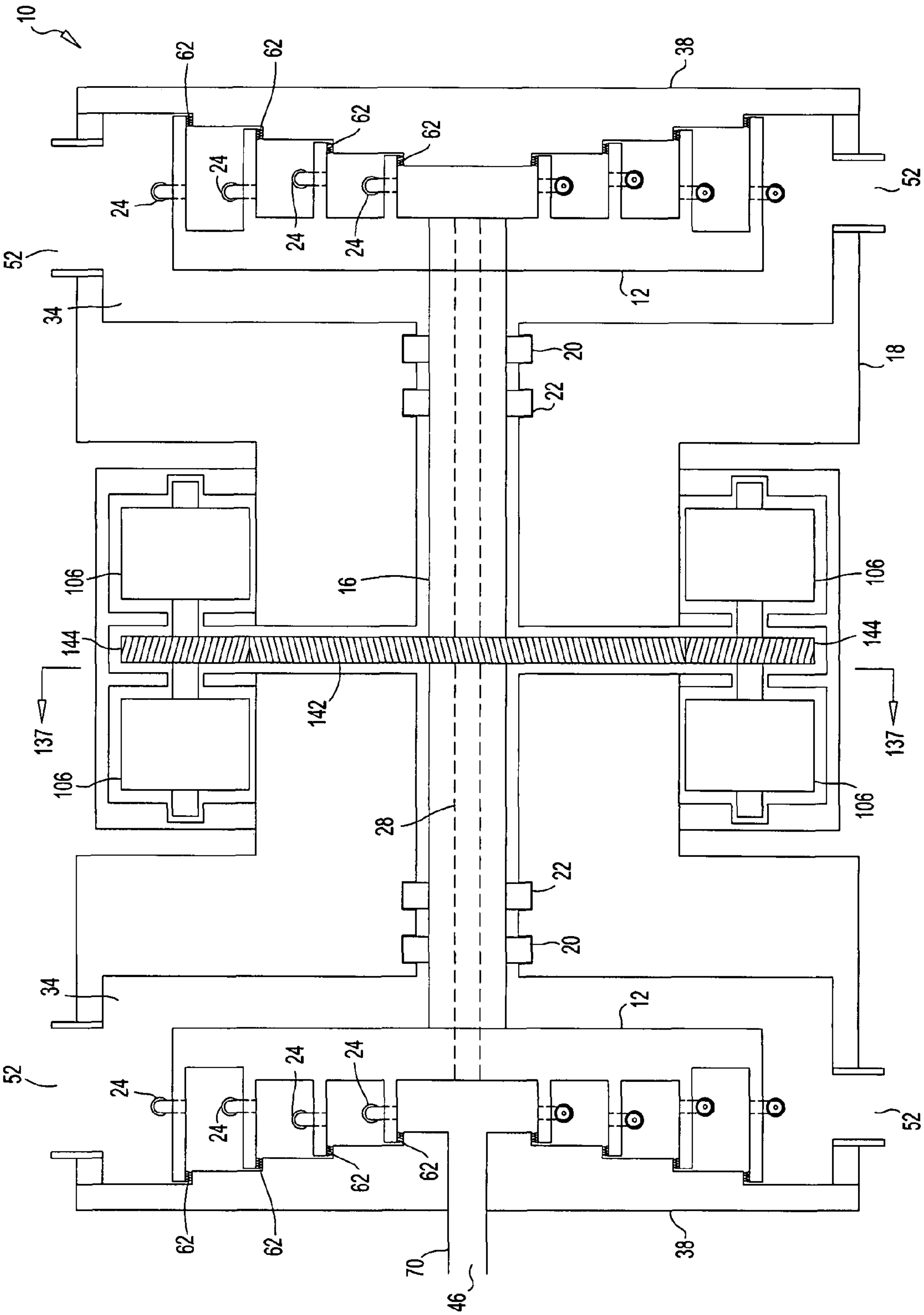
Figure 137:
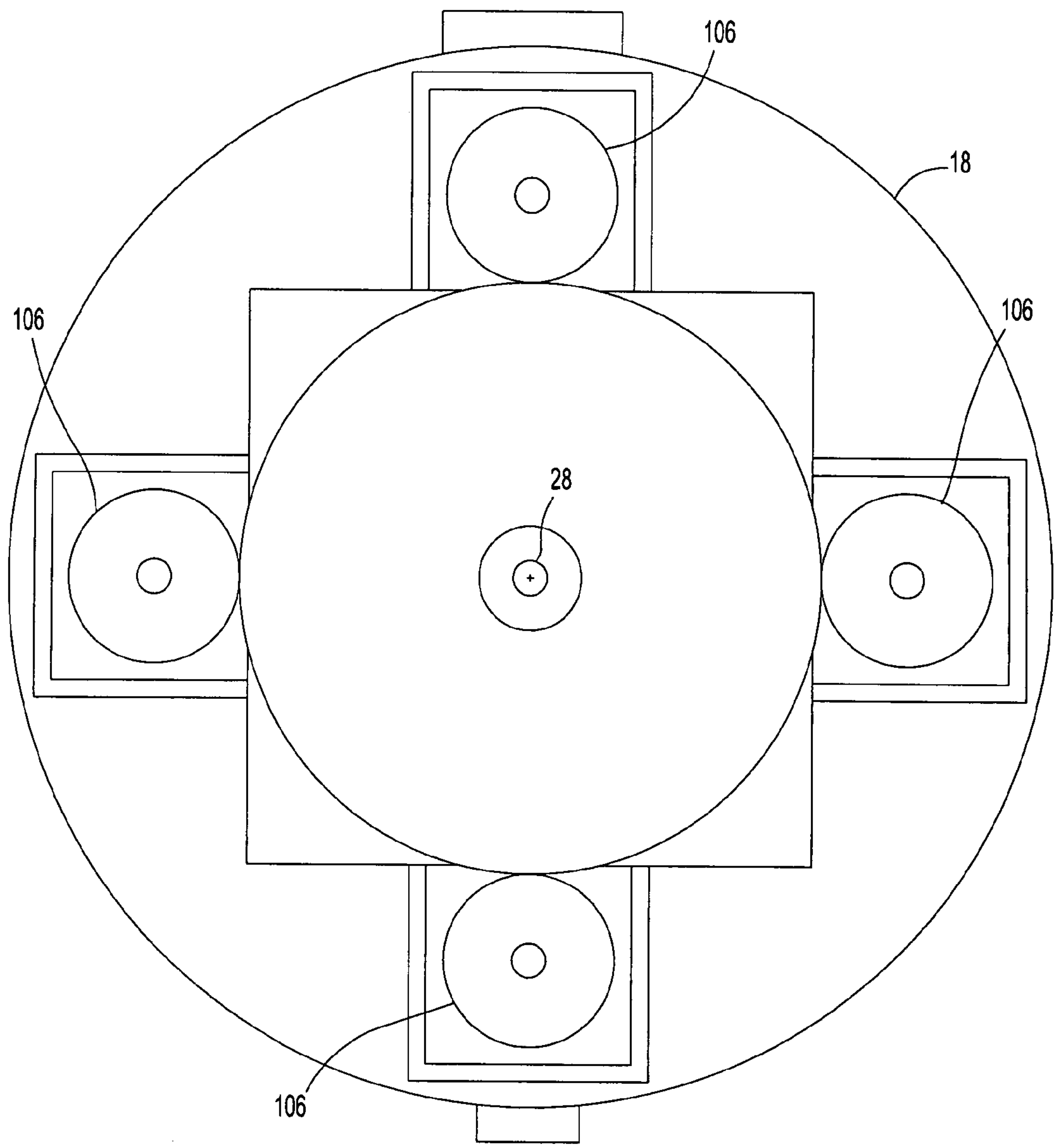
FIG. 137 is a elevation view of the single stage turbine shaft and rotor of another preferred embodiment of the invention of FIG. 136.
Figure 138:
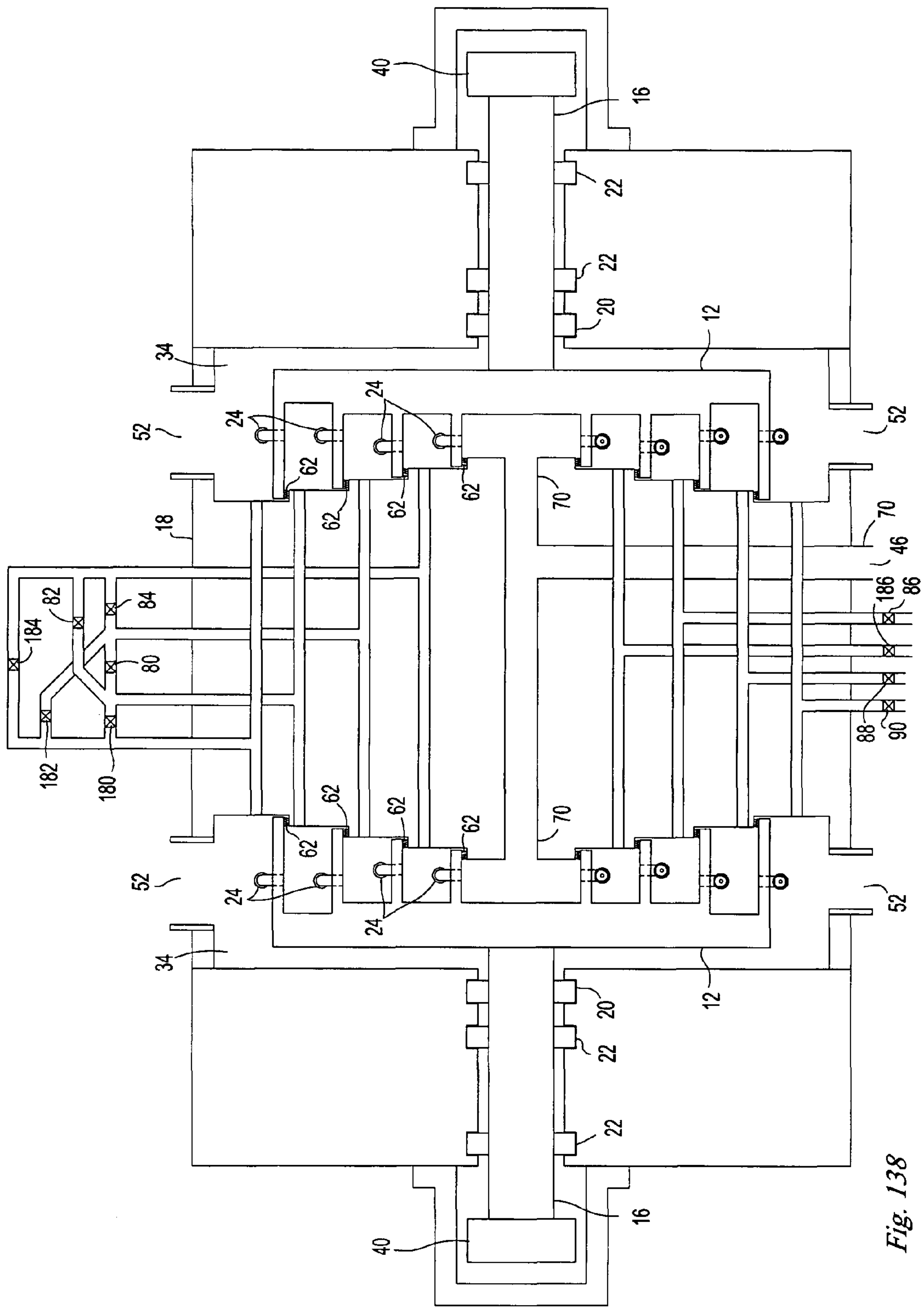
FIGS. 138-143 are cross-sectional views of other preferred pressure-compound embodiments of the invention.
Figure 139:
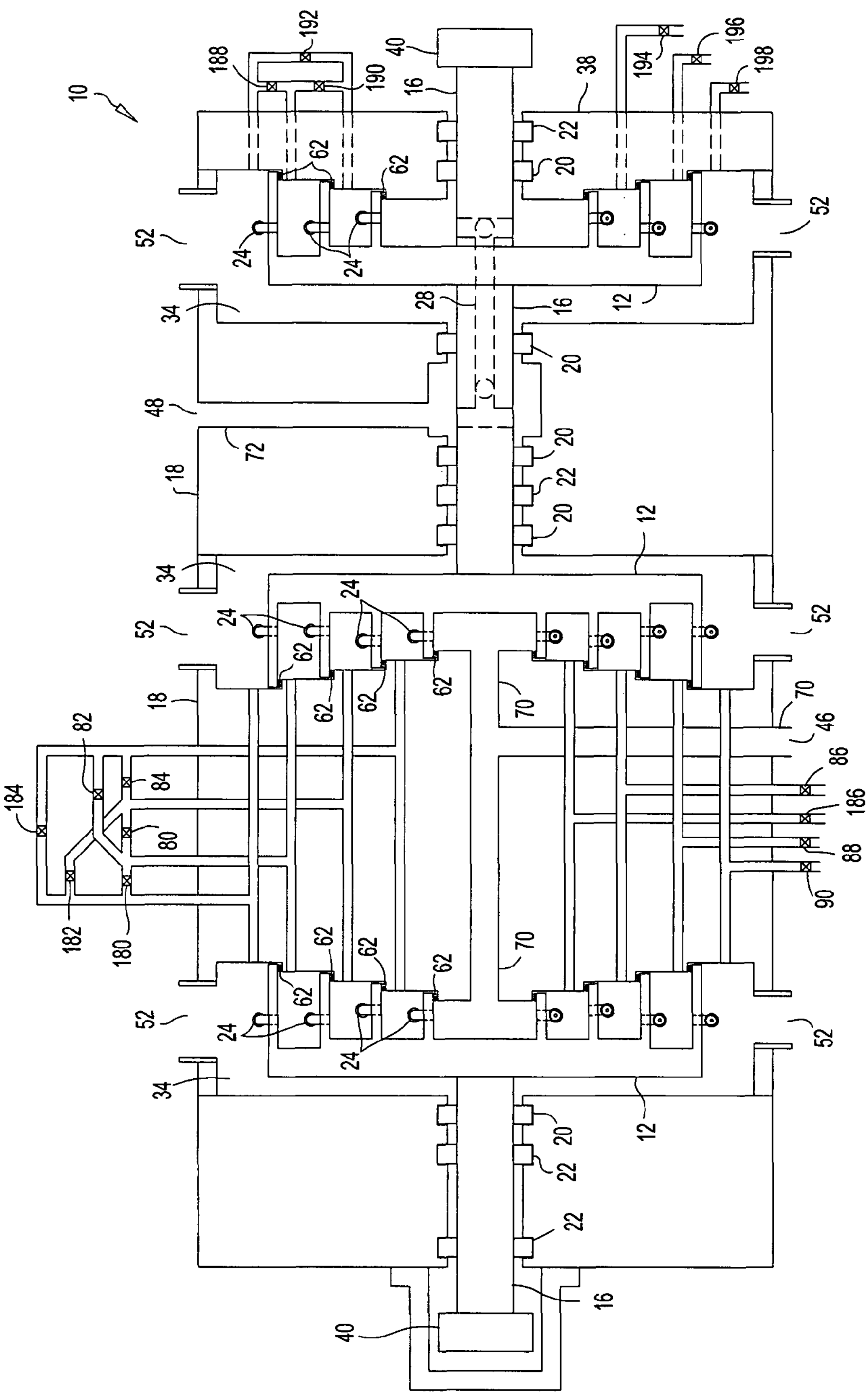
Figure 140:
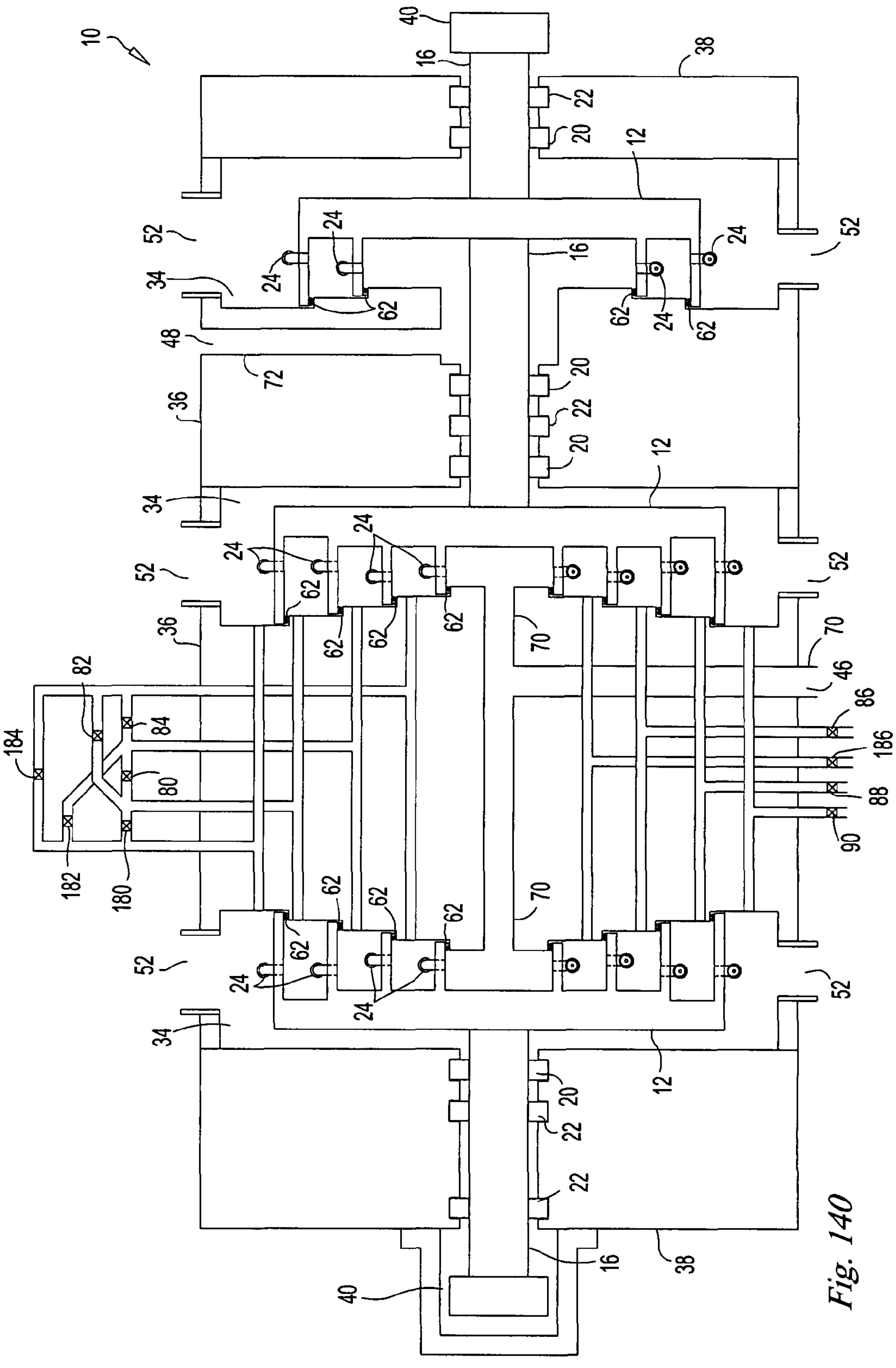

FIG. 117 is similar to FIG. 116, regarding the aforementioned technique/method of equalizing holes/passages, and shaft cross-sectional area consideration, for axial thrust balance, but incorporates a second pressure stage, i.e., a pressure-compound turbine engine, also with equalizing holes/passages in the rotor web section between the right-hand and left-hand intermediate chambers and with equalizing holes/passages in the rotor web section between said intermediate chambers having the same surface area on both sides. FIGS. 118, 124 and 125 are similar to FIG. 117, regarding the aforementioned technique/method of equalizing holes/passages, and shaft cross-sectional area consideration, for axial thrust balance and incorporating a second pressure stage, but there are no equalizing holes/passages in the rotor web section between the right-hand and left-hand intermediate chambers, in which a pressure differential can/may develop. Further to FIG. 118, FIGS. 124 and 125 illustrate the incorporation of additional non-shaft passageway(s) routed to intermediate chamber(s); FIG. 124 illustrates non-shaft passageway(s) associated with the right-hand intermediate chamber, i.e., second inlet fluid 48 and accompanying second inlet port72, and FIG. 125 illustrates non-shaft passageway(s) associated with the right-hand intermediate chamber, second inlet fluid 48 and accompanying second inlet port72, and left-hand intermediate chamber, i.e., third inlet fluid 50 and accompanying third inlet port74. The fluid pressure(s) associated with second inlet fluid 48 and/or third inlet fluid 50 can/may be different and, as different pressures acting in opposite directions on equal surface areas, contribute to the balance of axial forces acting on turbine shaft 16, and, for certain embodiments, may be designed to counter axial thrust effects attributable to the cross-sectional area of the shaft(s). Additionally, and typically as, but not necessarily, the primary reason, the introduction of said second and/or third inlet fluids provide(s) a means of extracting turbine mechanical work or output energy (and/or thermal energy) from lower-pressure fluid stream(s), i.e., a lower pressure relative to first inlet fluid 46. FIG. 119 is similar to FIGS. 118 and 125 except second inlet fluid 48 of FIG. 119 enters, preferably equally, both intermediate chambers through nozzle(s) hydraulically connected, via rotor passageway(s) and shaft passageway(s), to second inlet port 72.

Referring to FIGS. 120-123, to compensate for significant axial thrust effects associated with significant turbine shaft cross-sectional area, as heretofore discussed, these preferred embodiments illustrate several, but not necessarily the only, techniques/methods of locating circumferential perimeters at different diametrical dimensions, so as to (1) cause the sum of the surface areas subject to inlet fluid 46 to be mathematically equal, to the practical degree possible, (2) cause the sum of the products of pressure times surface area, when two or more different pressures are incorporated, to equal zero, to the practical degree possible, and/or (3) combination thereof. Another technique/method of balancing axial thrust is to use two turbine engines, or appropriate components thereof, in a reversed (mirrored) fashion, securely connected or attached to one another to properly counter opposing force(s), as discussed earlier in this disclosure. The principles, techniques and/or methods, as examples, outlined in this and preceding paragraphs regarding axial thrust for embodiments of the present invention also apply to FIGS. 135, 136, 138-140, 143-179, 181-187, 191-193, 196-203, 207, 210, 211, 213-217, 219 and 222, although a zero net axial force on the turbine shaft may not result for each embodiment or application thereof.

Figure 96:
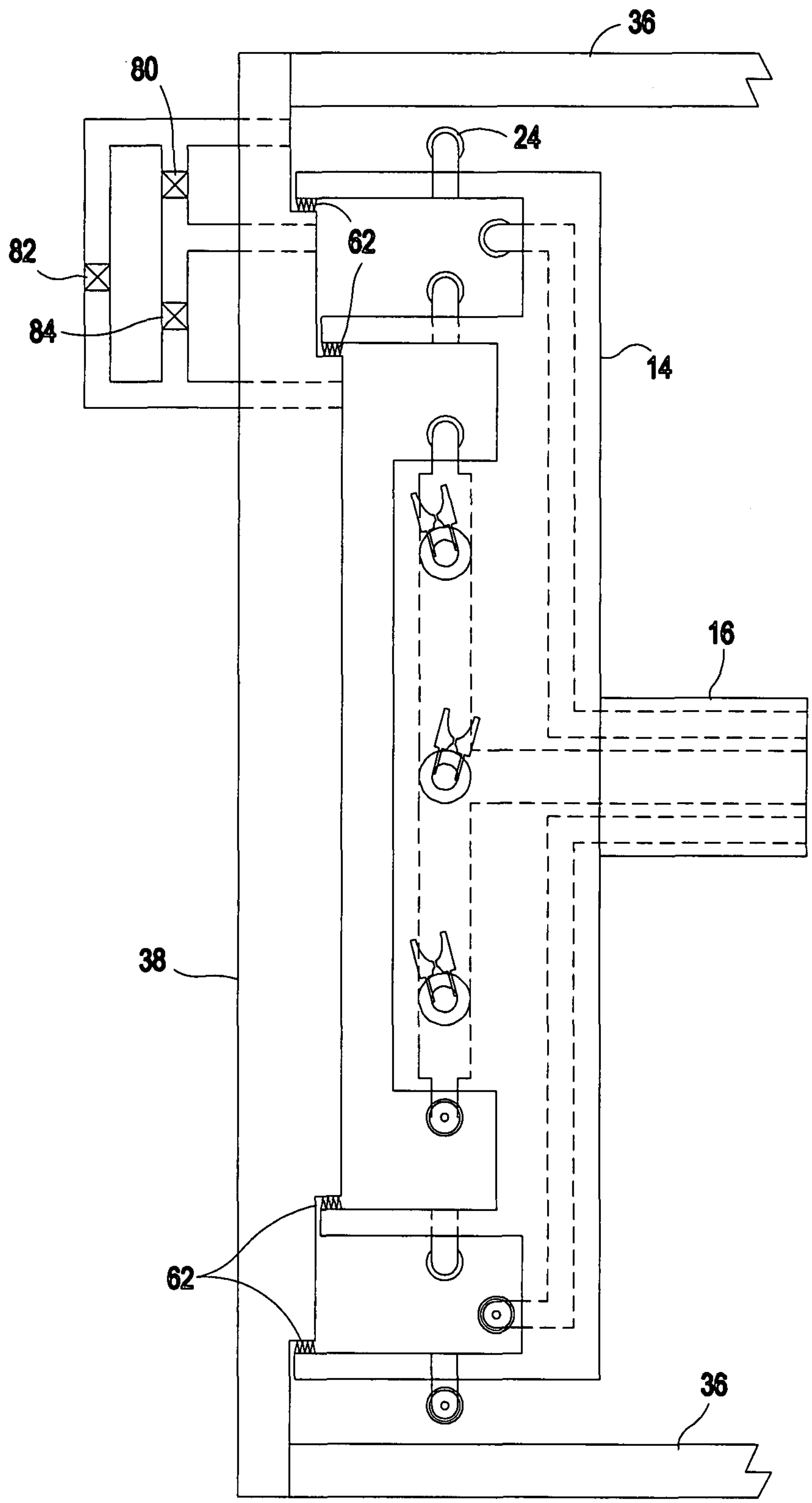

Referring to FIG. 96, externally connected and controlled passageways are provided between any two or more, or all, of the nozzle-exit chambers, including turbine chamber(s) when appropriate. The control system, through sensor devices, preferably monitors, in particular, but not limited to, the pressure of each turbine inlet fluid and each nozzle-exit chamber, and calculates the ratio of one nozzle-exit chamber pressure relative to another nozzle-exit chamber pressure, which, in essence, determines the nozzle pressure ratios of each, and all, nozzles, regardless of the inlet fluid conditions and/or parameters, whether the same for each fluid or not. Based upon the calculated nozzle pressure ratio(s), and associated parameters, the control system automatically adjusts nozzle-exit chamber pressure(s) to attain and maintain the design and/or optimum nozzle pressure ratio(s) for desired operating scenario(s). By manipulating the control valve(s) (e.g., first control valve 80, second control valve 82 and/or third control valve 84) in the aforementioned passageways between any two or more, or all, of the nozzle-exit chambers, including turbine chamber(s), nozzle-exit chamber pressure(s) can be increased or decreased, and nozzle pressure ratios can be maintained and/or regulated or changed, as appropriate for the given turbine and system requirements. Similarly, preferred embodiments similar to those illustrated in FIGS. 132, 133, 138-140, 143, 186, 187, 192 and 192, could incorporate only the controlled passageway(s) as described and purposed in this paragraph, whether internally connected or externally connected. A similar arrangement can be incorporated for the axially-stacked, pressure-compound staging.

Figure 97:
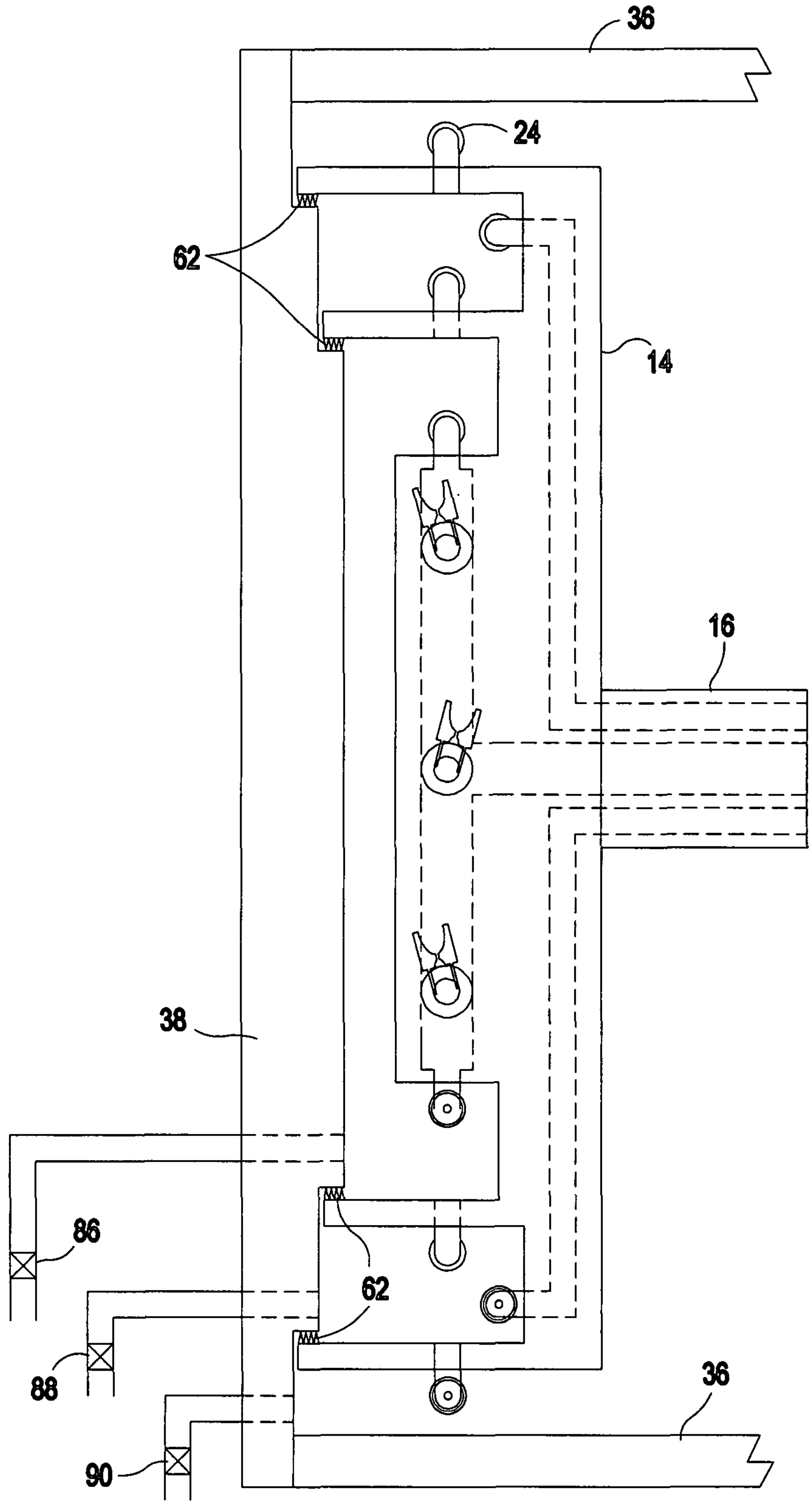
Figure 98:
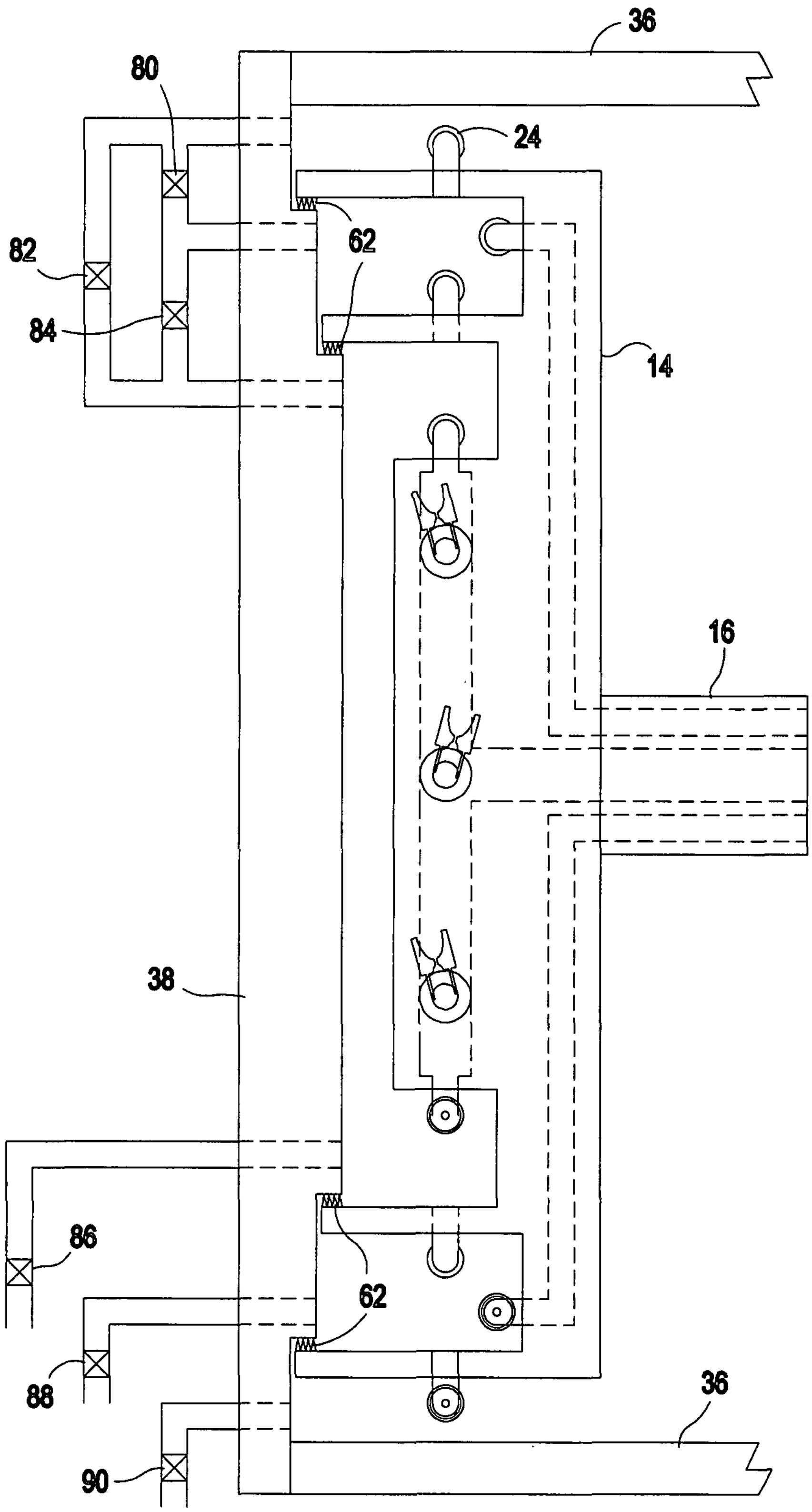

Referring to FIG. 97, externally connected and controlled passageways are provided for any, or all, of the nozzle-exit chambers, including turbine chamber(s) when appropriate. Each passageway is connected at one end to a nozzle-exit chamber and at the other end to (1) an external system, (2) an external part of the power plant system, (3) an external or internal part of the turbine system, or (4) a combination thereof. Fluid flow through the passageway(s) is bidirectional and, as such, fluid is added to nozzle-exit chamber(s) or fluid is removed or extracted from nozzle-exit chamber(s) by means of fourth control valve 86, fifth control valve 88 and/or sixth control valve 90. Reasons for fluid flow through the passageway(s) include, but are not limited to, (1) controlling the pressure in nozzle-exit chamber(s), in a similar or complimentary fashion to the external passageways outlined for FIG. 96 above, (2) increasing/decreasing turbine mechanical work or output energy, (3) increasing/decreasing fluid flow from or to the turbine, or portions of said turbine (e.g., one method of increasing the thermal energy available to customer is to extract fluid from a certain portion of the turbine, for example, an intermediate chamber), (4) providing injection location(s) into the turbine for excess fluid(s), with limited-to-no regard of the thermodynamic condition(s) of such fluid(s), from internal power plant system source(s) or external source(s), (5) providing extraction location(s) to enable flow(s) of fluid(s) from the turbine to internal power plant system source(s) or external source(s), (6) providing a means of controlling internal conditions and parameters of the fluid(s), fluid mixing, and/or fluid reactants, as said fluid(s) transport through the internal fluid process of the turbine, or (7) combinations thereof. All of the reasons stated above, but in particular reasons (4) and (6), provide an unmatched capability for preferred embodiments of the present invention to recover, and extract energy from, many low-quality energy streams, process waste streams, and even some high-quality, but waste, streams, such as fluid(s) from drains, traps, blowdowns, plant warmups and plant shutdowns, gas blowoffs (e.g., refineries and wellheads, to name a few examples), vents, relief valves, for examples, because preferred embodiments of the present invention can receive fluid(s) at essentially any point and at any condition. Similarly, preferred embodiments of FIGS. 132, 133, 138-140, 143, 186, 187, 192 and 192, could incorporate only the controlled passageway(s) as described and purposed in this paragraph, whether internally connected or externally connected.

Referring to FIGS. 98, 132, 133, 138-140, 143, 186, 187, 192 and 193, preferred embodiments of the present invention that comprise a combination of the features discussed above for FIGS. 96 and 97 are presented. Thus, the internal needs of turbine engine 10 are balanced for optimization and efficiency, and external opportunities (e.g., electricity and/or thermal energy) for customer(s) can be satisfied in conjunction with said balance, all designed to control the system or systems, of which they are a part, for maximizing or optimizing business and mechanical concerns such as 1) the revenue-to-expense ratio, 2) the system or cycle efficiency and/or 3) the life expectancy of the equipment and/or system(s), to name a few.

Some preferred embodiments of the multiple-fluid, multiple-substance, multiple-phase, multiple-pressure, multiple-stage turbine engine 10 are comprised of (1) one or more inlet fluid reaction(s) with one or more other inlet fluid(s), (2) one or more inlet fluid reaction(s) with fluid(s) which are interacting and/or passing through other portions or processes of the turbine engine and which are extracted, or partially extracted, to react or interact with such inlet fluid(s), or (3) a combination thereof. These embodiments comprise combustion turbines or gas turbines.

Figure 99:
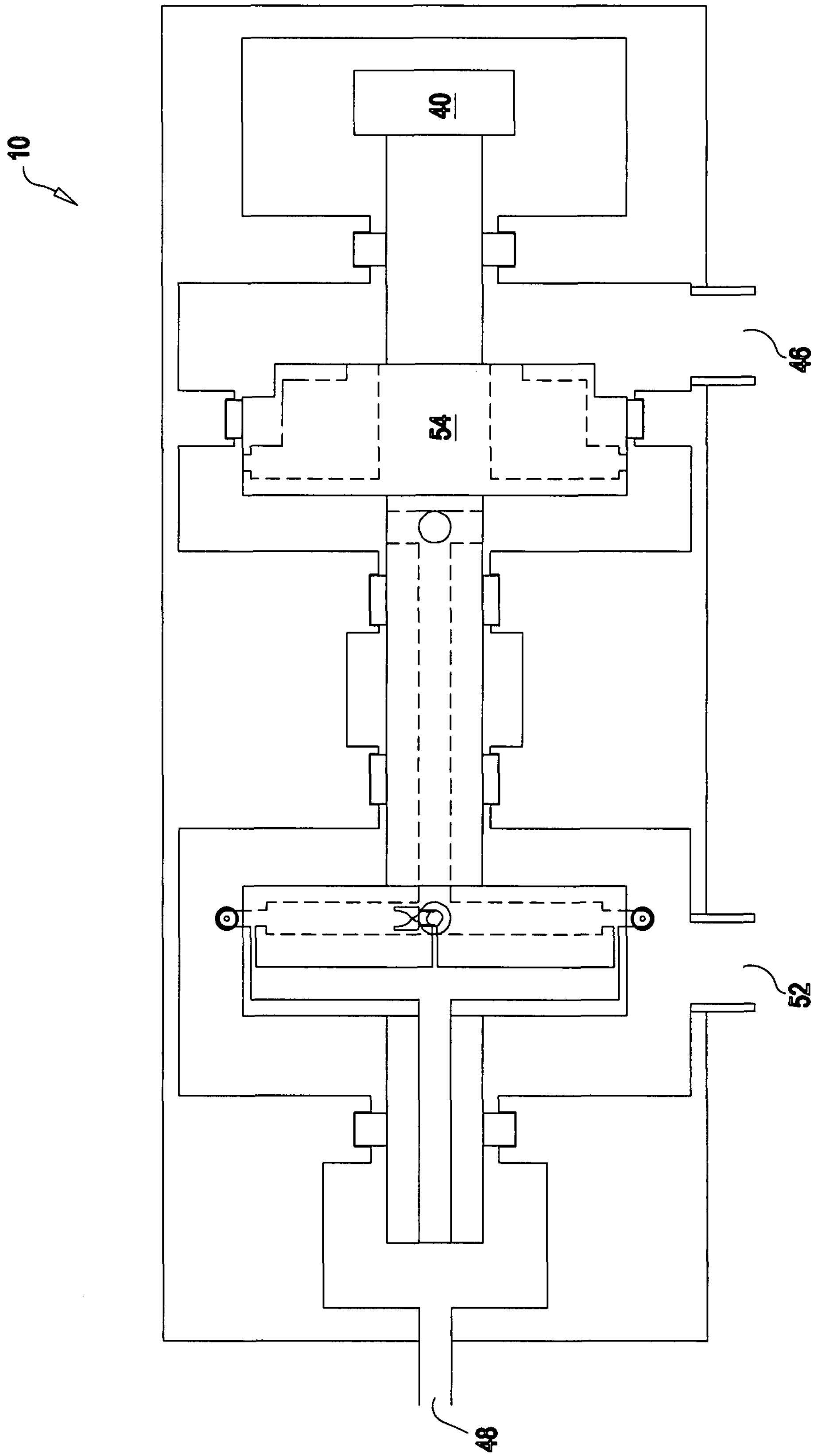
FIG. 99 is a cross-sectional view of a preferred gas turbine embodiment of the invention.
Figure 100:
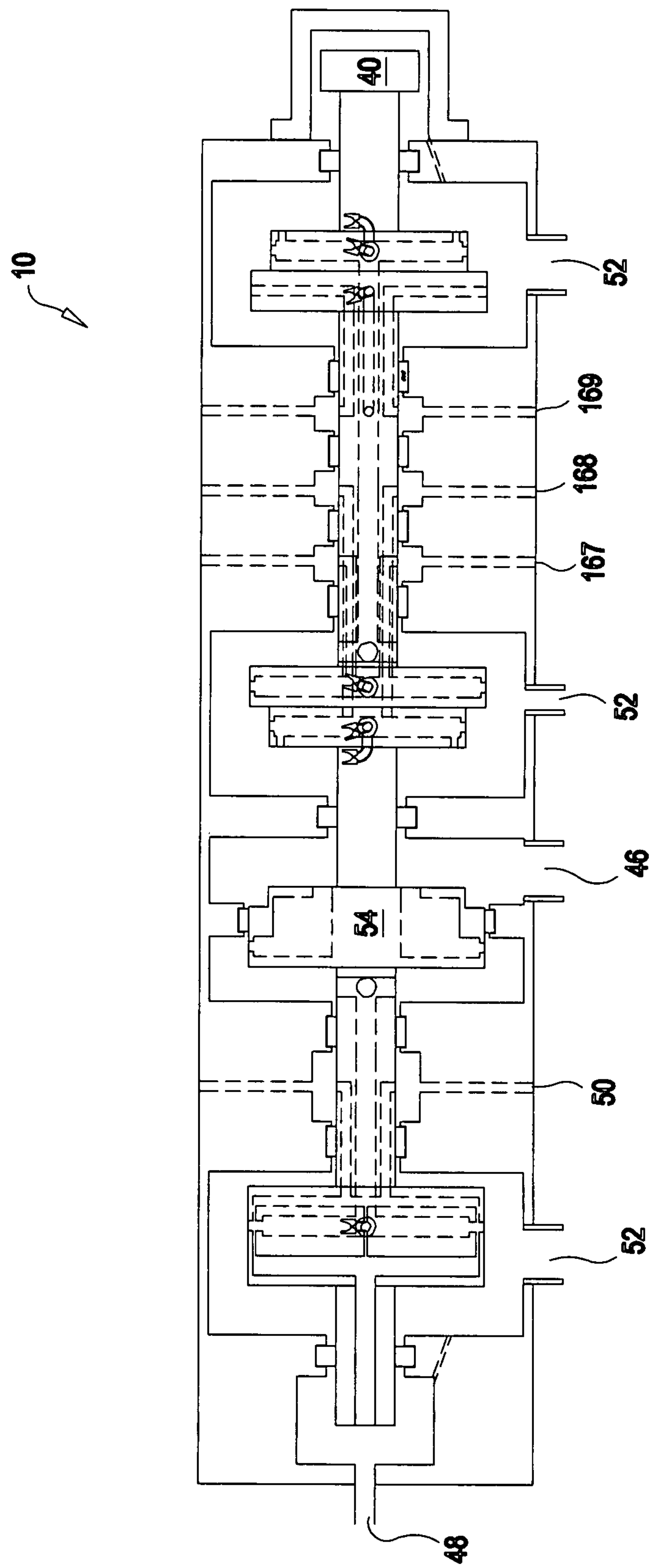
FIGS. 100 and 101 are cross-sectional views of preferred combined cycle embodiments of the invention.
Figure 101:
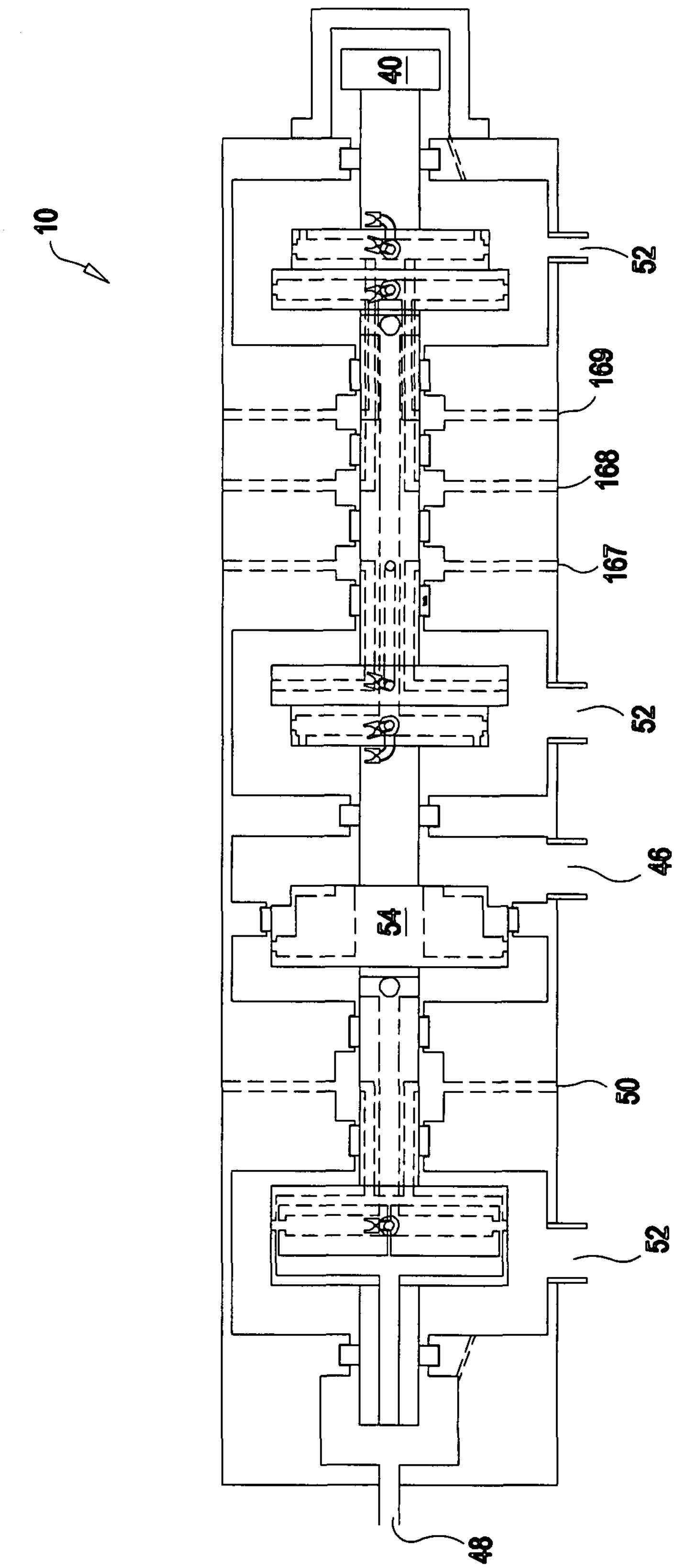
Figure 102:
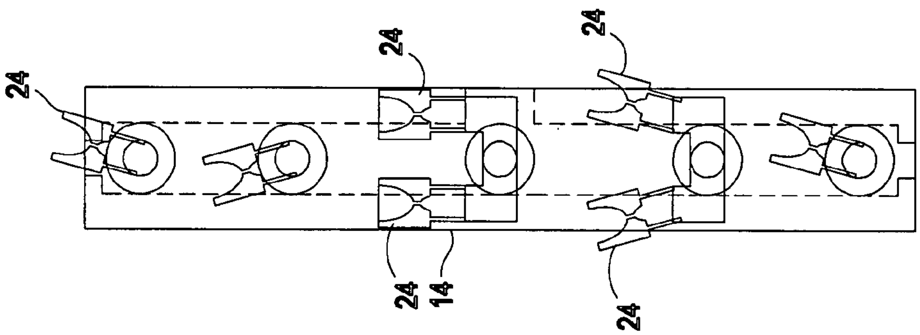
FIG. 102 is a cross-sectional view of the single stage turbine shaft and rotor of another preferred embodiment of the invention.
Figure 103:
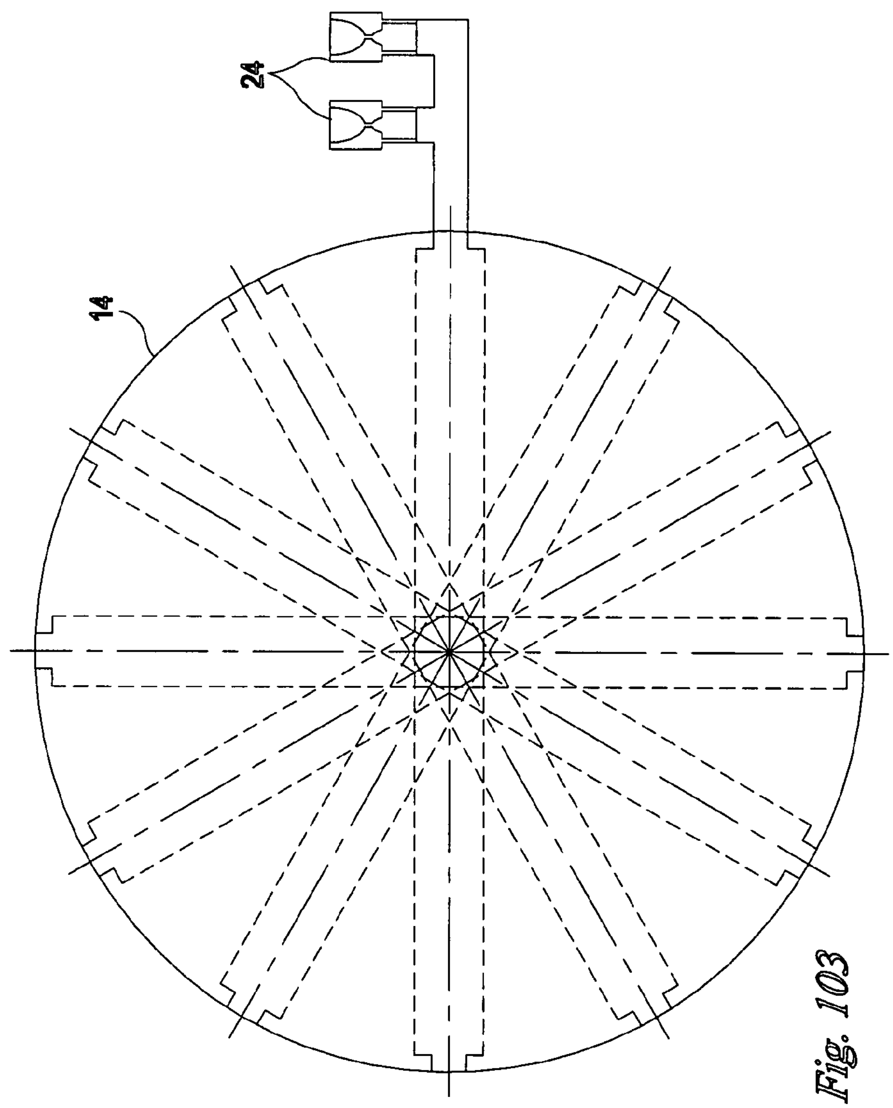
FIG. 103 is a elevation view of the single stage turbine shaft and rotor of another preferred embodiment of the invention of FIG. 102.

Referring to FIG. 99, as an example, a preferred embodiment of the present invention that relies on two inlet fluids is illustrated. First inlet fluid 46 is typically, but not necessarily, a vaporous substance (e.g., ambient air) which enters turbine chamber(s) through passageway(s) in the turbine case, or through shaft passageway(s) as previously described herein, or both the casing and shaft passageway(s). First inlet fluid 46 from this inlet turbine chamber enters compressor section(s) where such fluid is compressed, or increased in pressure, and passes from the compressor discharge section(s) into compressor discharge turbine chamber, which is at a greater pressure than the turbine chamber pressure associated with the compressor inlet. The high pressure first inlet fluid 46 passes from the compressor discharge turbine chamber through either external or internal passageway(s), or both, to nozzle(s), portion(s) of nozzle(s), set(s) of nozzle(s) and/or combustion chamber-nozzle unit(s), hydraulically connected to said passageway(s).

Furtherance to the above description of preferred embodiments, for a first inlet fluid 46 that is a liquid substance (e.g., liquid water) and enters turbine chamber(s) through passageway(s) in the turbine case, or through shaft passageway(s) as previously described herein, or both the casing and shaft passageway(s), the compressor section(s) is/are pump section(s) wherein said first inlet fluid 46 is increased in pressure and passes from the pump discharge section(s) into pump discharge turbine chamber, which is at a greater pressure than the turbine chamber pressure associated with the pump inlet. The high pressure first inlet fluid 46 passes from the pump discharge turbine chamber through either external or internal passageway(s), or both, to nozzle(s), or set(s) of nozzles, hydraulically connected to said passageway(s). Such pump section(s), or multiples thereof, may be incorporated on the turbine shaft, either instead of or coincidental with the compressor(s), which can also be multiples, and further, the fluid(s) from the pump discharge turbine chamber(s) may be routed, through appropriate internal, including but not limited to the turbine shaft, or internal or external non-shaft, or all, passageway(s), to become, in essence, an inlet fluid 50, or additional inlet fluid(s).

As examples, FIGS. 19 and 99 illustrate preferred embodiments of turbine engine 10 wherein an internal passageway is provided through turbine shaft to other rotor(s) or rotor section(s), where said first inlet fluid 46 further passes through associated passageway(s) to nozzles, portion(s) of nozzle(s), set(s) of nozzle(s) and/or combustion chamber-nozzle unit(s), and exits into turbine chamber(s). Second inlet fluid 48 is either vaporous or liquid, or multiple-phase, and passes through associated passageway(s) to the rotor(s) or rotor section(s), hydraulically connected to nozzle(s), portion(s) of nozzle(s), set(s) of nozzle(s) and/or combustion chamber-nozzle unit(s). Second inlet fluid 48 is typically a fuel, such as natural gas, propane, diesel oil, other fossil fuel, hydrogen, for examples, however, second inlet fluid 48 may be substance that can react with other substance(s) at, in, before, after or about its nozzle(s), portion(s) of nozzle(s), set(s) of nozzle(s) and/or combustion chamber-nozzle unit(s), or at, in, before, after or about nozzle(s), portion(s) of nozzle(s), set(s) of nozzle(s) and/or combustion chamber-nozzle unit(s) associated with one or more of the other inlet fluid(s). As examples, FIGS. 19 and 99 illustrate preferred embodiments wherein first inlet fluid 46 at, in, before, after or about the nozzle(s), portion(s) of nozzle(s), set(s) of nozzle(s) and/or combustion chamber-nozzle unit(s) is associated with second inlet fluid 48 nozzle(s), as opposed to providing separate, and distinct, nozzle(s), portion(s) of nozzle(s), set(s) of nozzle(s) and/or combustion chamber-nozzle unit(s) for first inlet fluid 46. As a further, more specific example, when first inlet fluid 46 is ambient air and second inlet fluid 48 is natural gas, with ignition source, a combustion reaction occurs at the nozzle(s), providing high temperature, pressurized vapor for expulsion from nozzle exit area. As other examples, FIGS. 19 and 99 also illustrate preferred embodiments wherein third inlet fluid 50 at, in, before, after or about the nozzle(s) or set(s) of nozzles is associated with second inlet fluid 48, as opposed to providing separate, and distinct, nozzle(s) or set(s) of nozzles for third inlet fluid 50. As further examples, FIGS. 19 and 99 illustrate preferred embodiments wherein the nozzle(s) or set(s) of nozzles associated with third inlet fluid 50 is/are separate, distinct, and, in general, contained within the passageway(s) associated with first inlet fluid 46, so as to provide a venturi jet or eductor effect (i.e., additional compressing or pumping effect) for first inlet fluid 46 as said third inlet fluid 50 passes from its own nozzle. As yet a further, more specific example, when first inlet fluid 46 is ambient air and third inlet fluid 50 is sufficient pressure steam, the desired air flow is accomplished with less compression energy, i.e., less parasitic load to provide air flow and, thus, a greater turbine mechanical work or output energy, or increased turbine efficiency. As a further example, FIGS. 19 and 99 illustrate preferred embodiments wherein the nozzle(s) or set(s) of nozzles associated with third inlet fluid 50 is/are separate, distinct, and, in general, contained within the passageway(s) associated with first inlet fluid 46 to provide a mixture of said inlet fluids 46 and 50, and wherein said mixture is further associated with second inlet fluid 48 nozzles, as opposed to providing separate, and distinct, nozzle(s) or set(s) of nozzles for said mixture.

Referring again to FIG. 19, as another example, a preferred embodiment of the present invention using three inlet fluids is illustrated. Inlet fluids 46 and 48 are as described in the previous paragraphs. Third inlet fluid 50 is either vaporous or liquid, or multiple-phase, and passes through associated passageway(s) to the rotor(s) or rotor section(s), hydraulically connected to nozzle(s), or set(s) of nozzles, which may be at, in, before, after or about nozzle(s), portion(s) of nozzle(s), set(s) of nozzle(s) and/or combustion chamber-nozzle unit(s) associated with first inlet fluid 46 or second inlet fluid 48 or both, or which may be separate, and distinct, from nozzle(s), portion(s) of nozzle(s), set(s) of nozzle(s) and/or combustion chamber-nozzle unit(s) associated with first inlet fluid 46 or second inlet fluid 48. FIG. 19 illustrates a preferred embodiment of turbine engine 10 wherein third inlet fluid 50 interacts with inlet fluids 46 and 48 at, in, before, after or about the nozzle(s), portion(s) of nozzle(s), set(s) of nozzle(s) and/or combustion chamber-nozzle unit(s) associated with second inlet fluid 48. As a furtherance of the aforementioned specific application of a previous paragraph, where first inlet fluid 46, as ambient air, and second inlet fluid 48, as natural gas, for example, engage in a combustion reaction, third inlet fluid 50 is typically vaporous steam or liquid water, or a combination, which is injected in the combustion area to control formation of certain compounds, such as NOx, for example. Third inlet fluid 50 may also be other substance(s), such as ammonia, for example, which is/are used to control formation of certain compounds. In other preferred embodiments, third inlet fluid 50 may be hydraulically connected to separate nozzle(s) or set(s) of nozzles at, in, before, after or about the nozzle(s) or set(s) of nozzles associated with second inlet fluid 48, whereat third inlet fluid 50, again such as ammonia, for example, interacts/reacts with fluid (combustion reaction fluid) exiting the other close proximity nozzle(s), portion(s) of nozzle(s), set(s) of nozzle(s) and/or combustion chamber-nozzle unit(s) and, thus, controlling emissions of certain compounds, such as NOx, again for example. Yet another furtherance of the application of third inlet fluid 50, said third inlet fluid may be provided at one or more locations downstream of nozzle(s), portion(s) of nozzle(s), set(s) of nozzle(s) and/or combustion chamber-nozzle unit(s) associated with second inlet fluid 48.

As a furtherance of the aforementioned specific application(s) of the previous paragraphs, another preferred embodiment is described as follows: (1) first inlet fluid 46 is ambient air or other oxidizer, second inlet fluid 48 is a fuel or other reactant, and third inlet fluid 50 is vaporous steam or liquid water, or a combination; (2) first inlet fluid 46 and third inlet fluid 50 nozzle(s) are arranged/configured as, or in an equivalent manner to, that which is described heretofore regarding the venturi or eductor effect, (3) nozzle(s) associated with second inlet fluid 48 are placed in, at or about the arrangement of first inlet fluid 46 and third inlet fluid 50 nozzle(s) described in "(2)" immediately above, and (4) an ignition source, as further describe in a following paragraph. Other embodiments, include, but are not limited to, a fourth or more inlet fluid, whether as (1) oxidizer(s), (2) fuel(s), (3) substance(s), including hydrogen, for controlling emissions of certain compounds, (4) substance(s) for increasing the turbine mechanical work or output energy, (5) whether multiple rotor(s) or rotor section(s), multiple shafts, and/or multiple turbine chambers, or (6) combinations thereof.

It is noteworthy that the use of third inlet fluid 50, or fourth or fifth or more, for examples, may also provide an element of turbine mechanical work or output energy associated with said inlet fluid's(s') mass, force, reaction, and/or thermodynamic condition, especially when said third inlet fluid 50 is steam, water or combination thereof. For example, when third inlet fluid 50 is vaporous steam or liquid water, or a combination, the reactionary forces associated with said third inlet fluid exiting from its nozzle(s) produces rotary motion which, in turn, translates into an increase in turbine mechanical work or output energy, in addition to said third inlet fluid effects associated with reducing, eliminating, controlling, preventing and/or mitigating pollutants that may otherwise result and/or be discharged into the environment. For another example, when third inlet fluid 50 is a supplemental fuel (i.e., in a dual-fuel embodiment), reaction or combustion of the additional fuel flow quantity results in an increase in turbine mechanical work or output energy. Likewise, for yet another example, when third inlet fluid 50 is a supplemental fuel (i.e., in a dual-fuel embodiment) that is specifically selected for its environmental benefits, such as hydrogen, reaction or combustion of the additional fuel flow quantity results in not only an increase in turbine mechanical work or output energy, but also effects associated with reducing, eliminating, controlling, preventing and/or mitigating pollutants that may otherwise result and/or be discharged into the environment. Other combinations of fuel and non-fuel substances, as well as use of more than three inlet fluids, including combinations of the above arrangements for both hardware and routing, are envisioned by the applicant.

Combined-cycle embodiments incorporate one or more combustion turbine engine(s) of the present invention and one or more non-combustion turbine engine(s) of the present invention, where turbine shaft(s) of said turbine engine(s) are (1) not connected, (2) connected, either rigidly (typically, but not necessarily, bolted) or non-rigidly (typically, but not necessarily, hydraulic, magnetic or flexible coupling device), or (3) combinations thereof. Examples of preferred combined cycle embodiments of the present invention are presented in FIGS. 100, 101 and 144-164, wherein the applicant envisions said embodiments being as a one-shaft (single-shaft, as illustrated), as a two-shaft (dual-shaft) or as more than two shafts configurations or arrangements.

Figure 157:
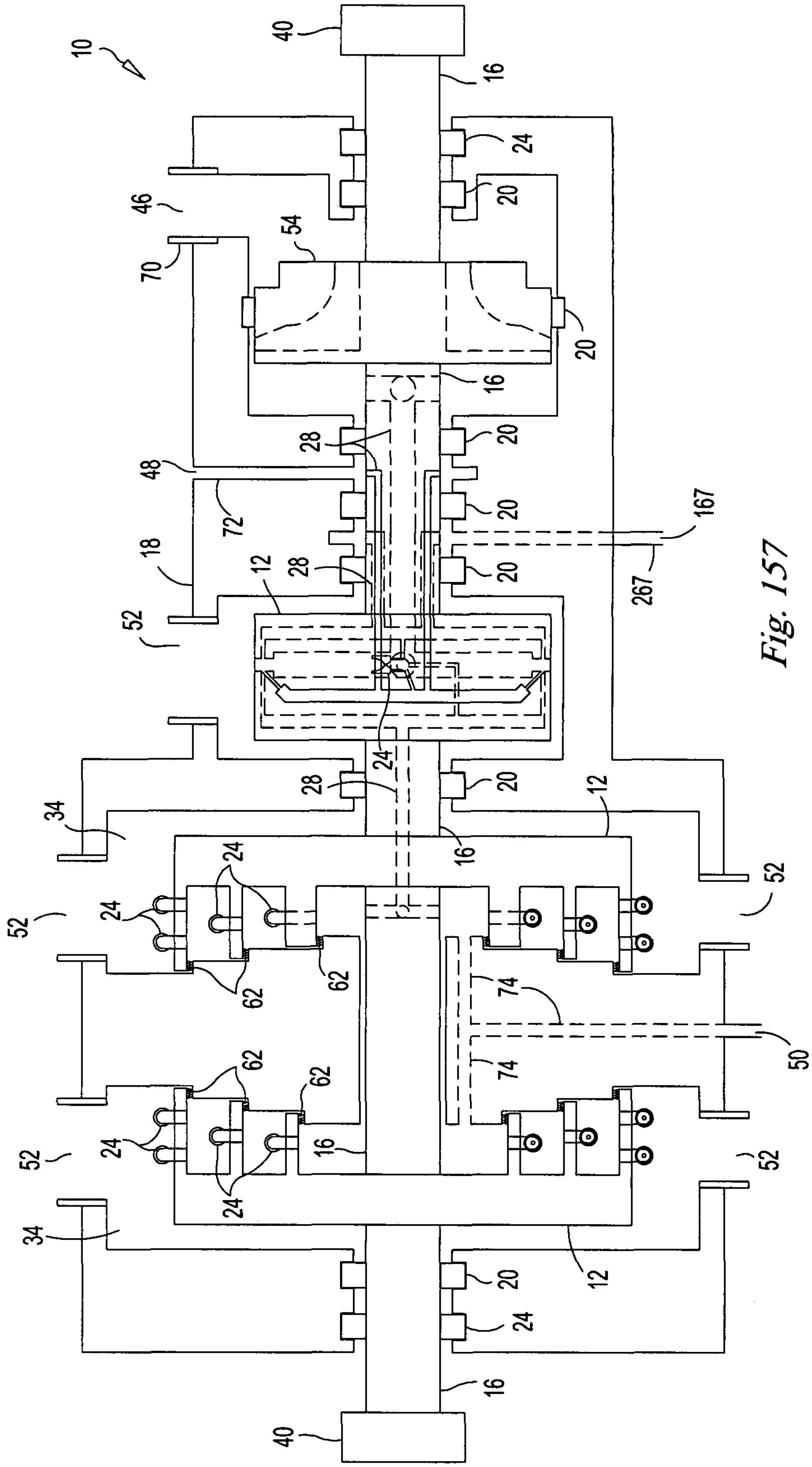
Figure 158:
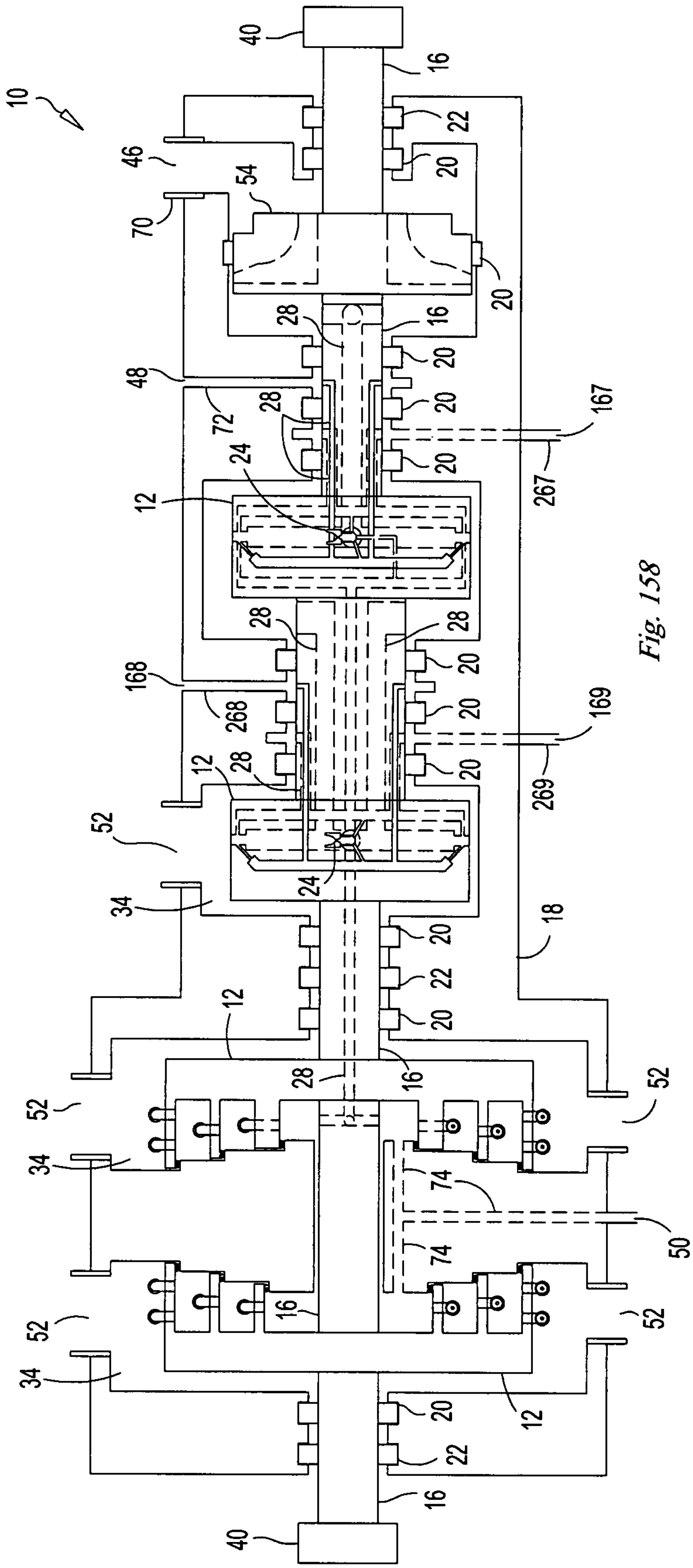
Figure 159:
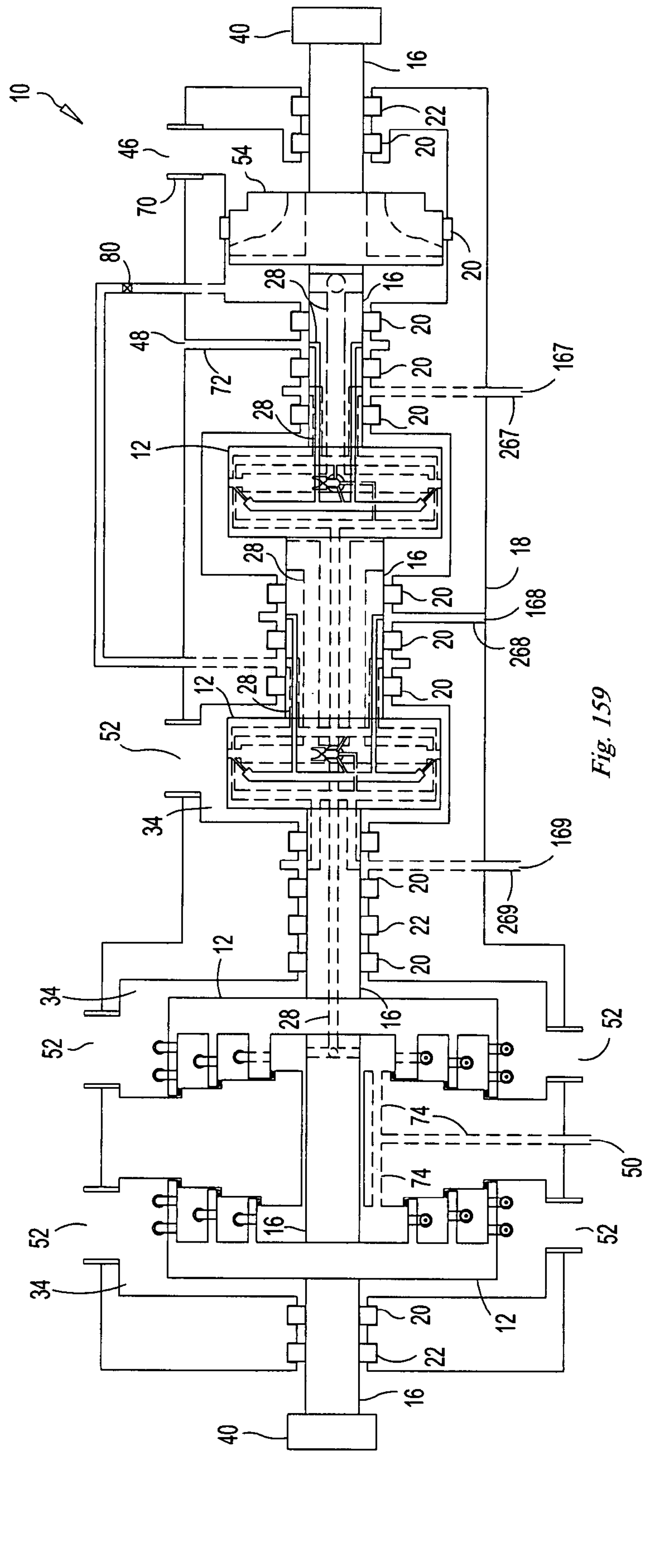
Figure 160:
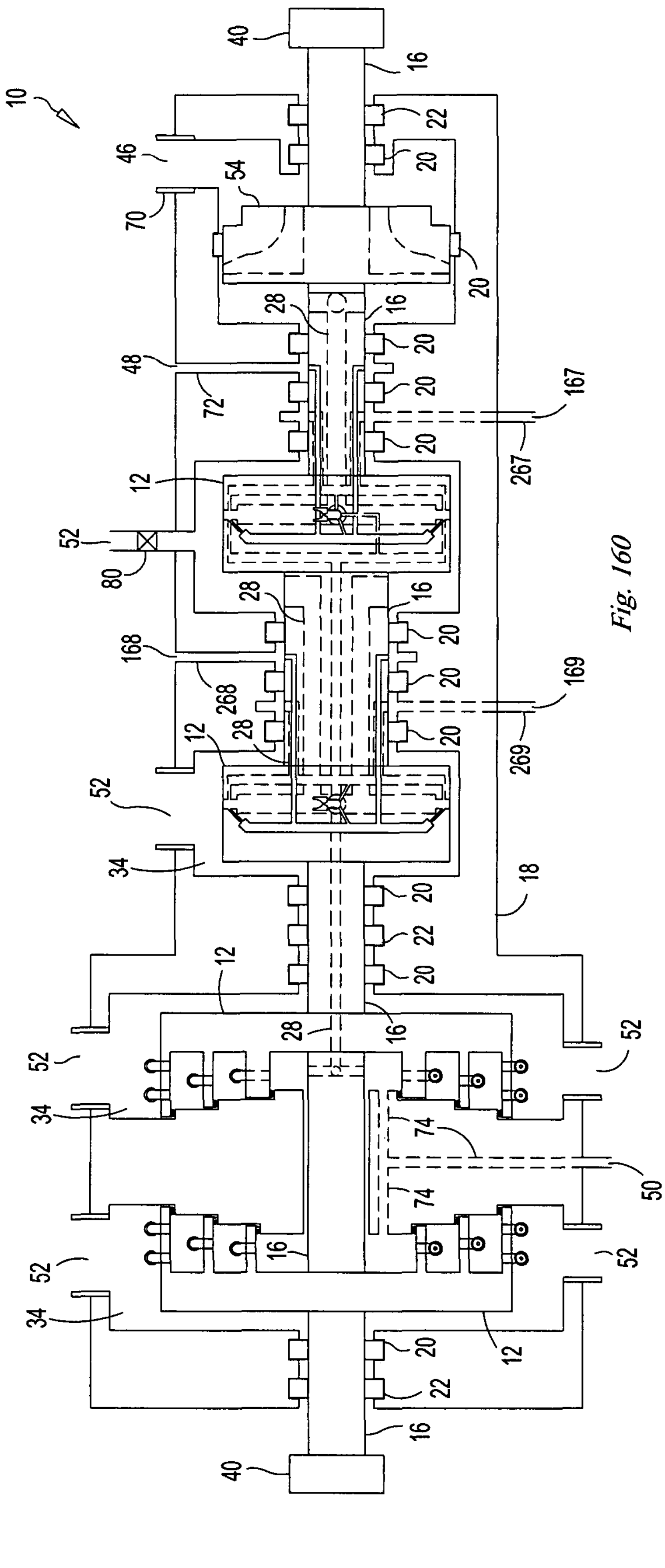
Figure 161:
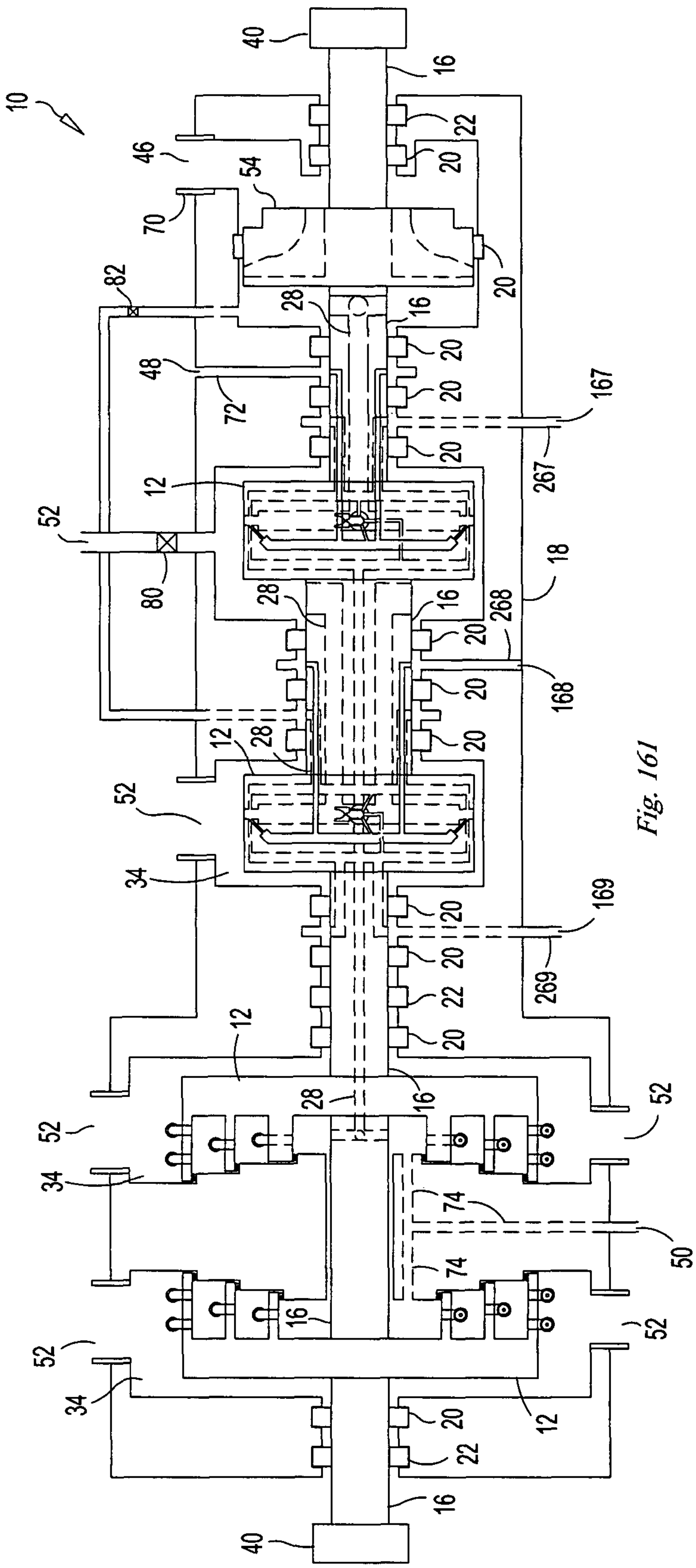
Figure 162:
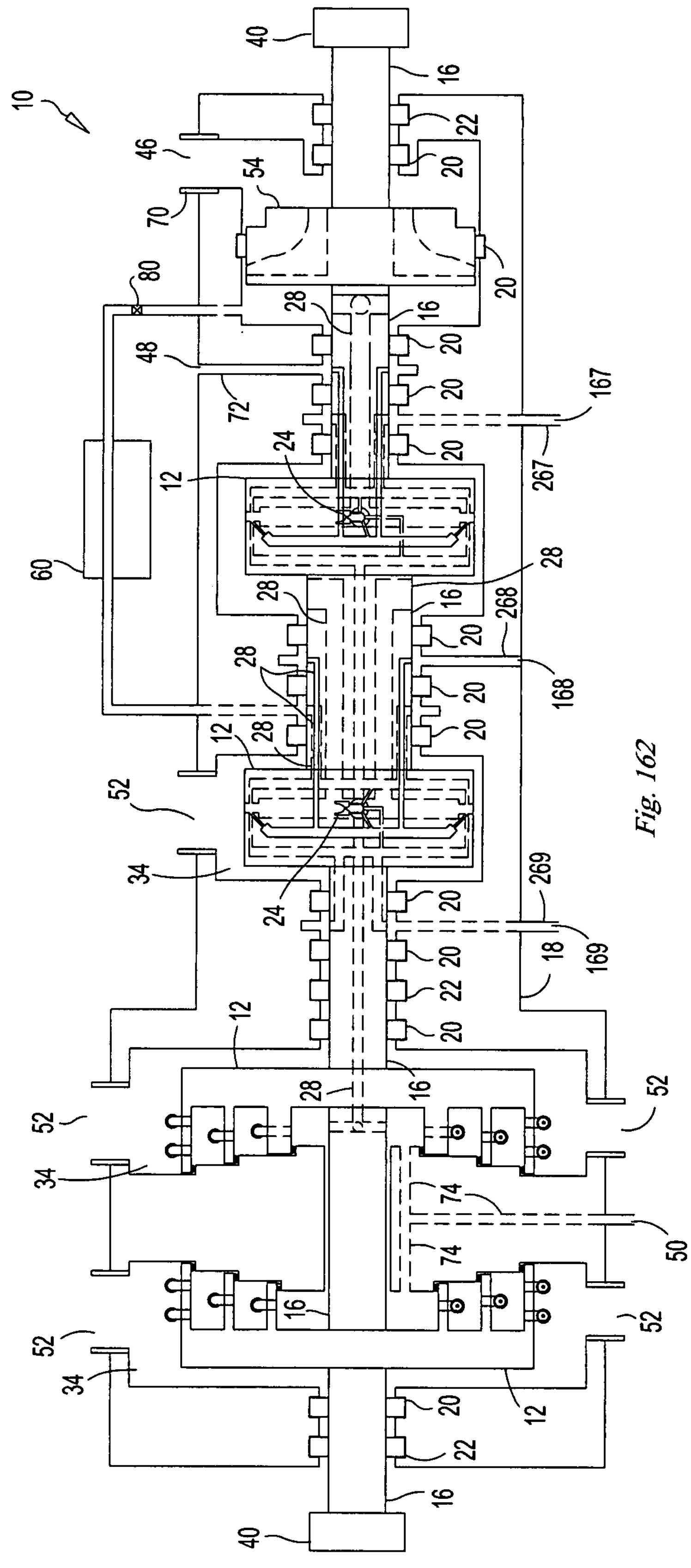
Figure 163:
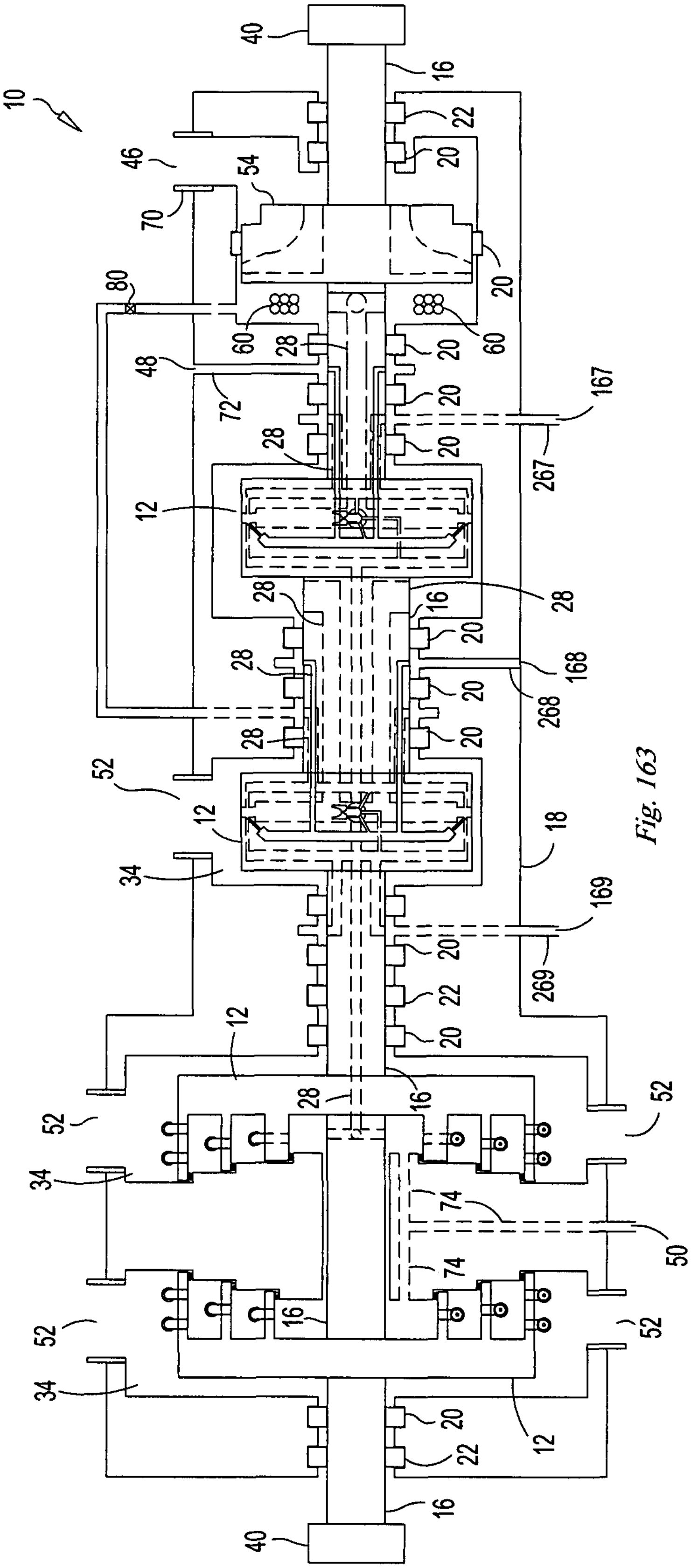
Figure 164:
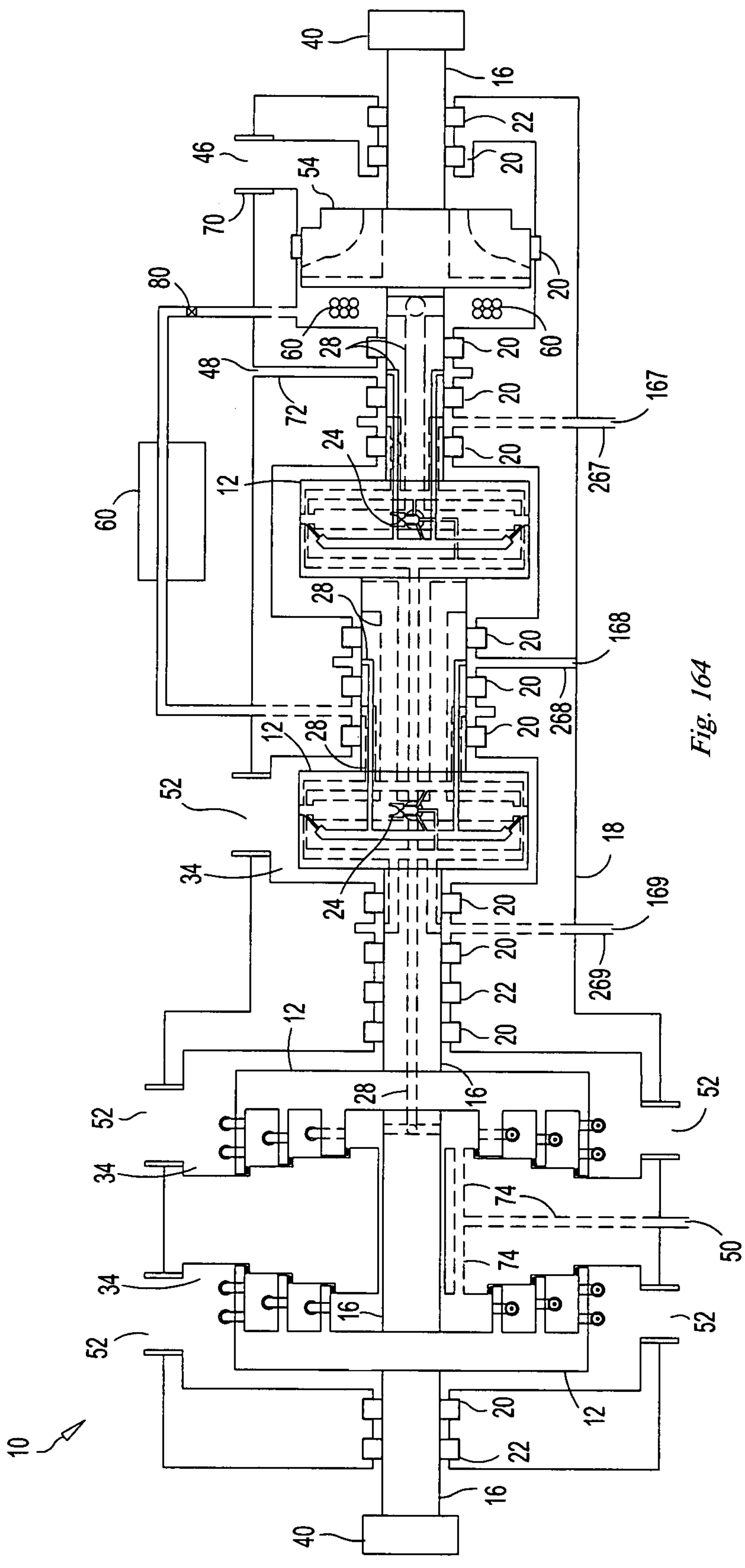
Figure 165:
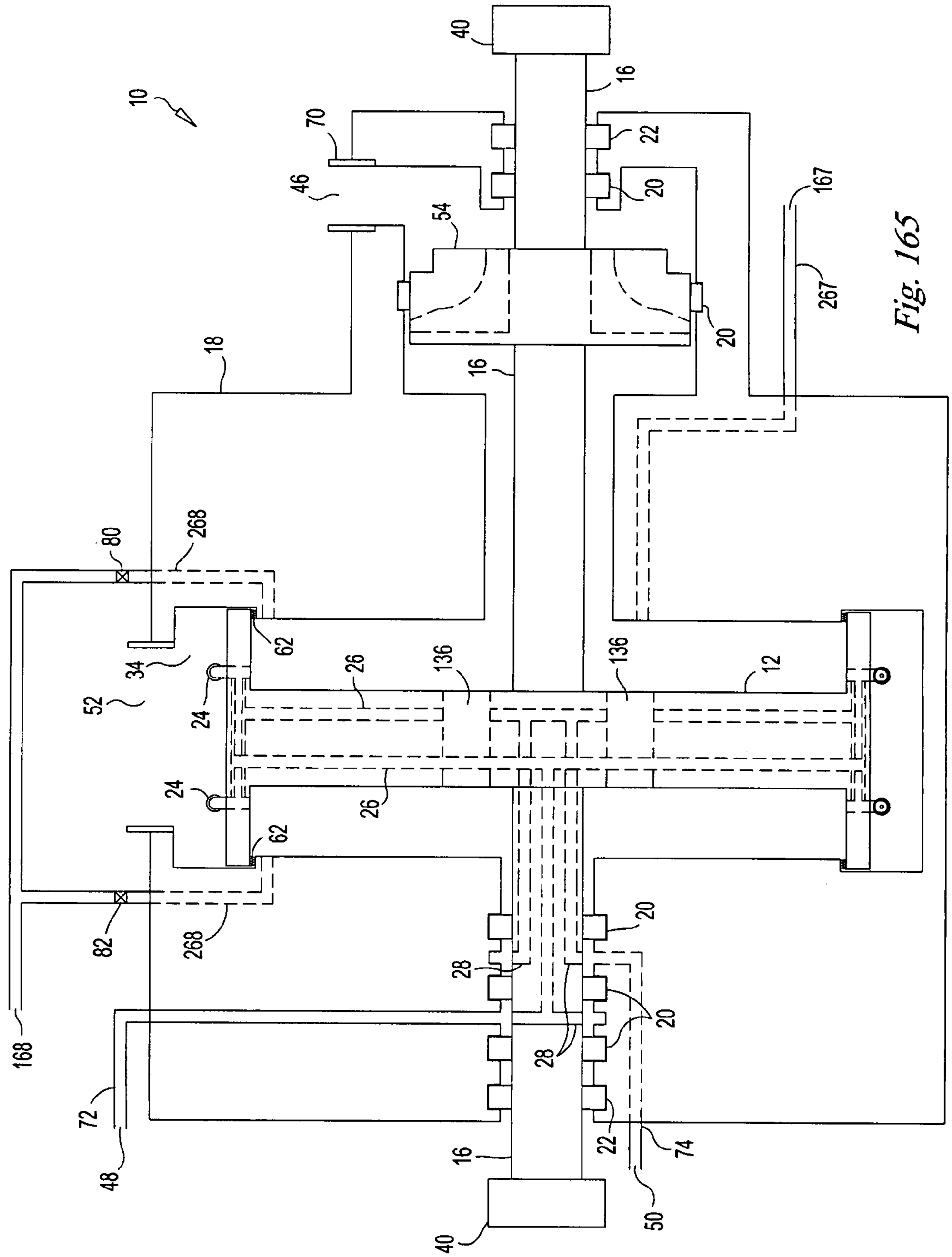
FIGS. 165-185 are cross-sectional views of preferred gas turbine embodiments of the invention.
Figure 166:
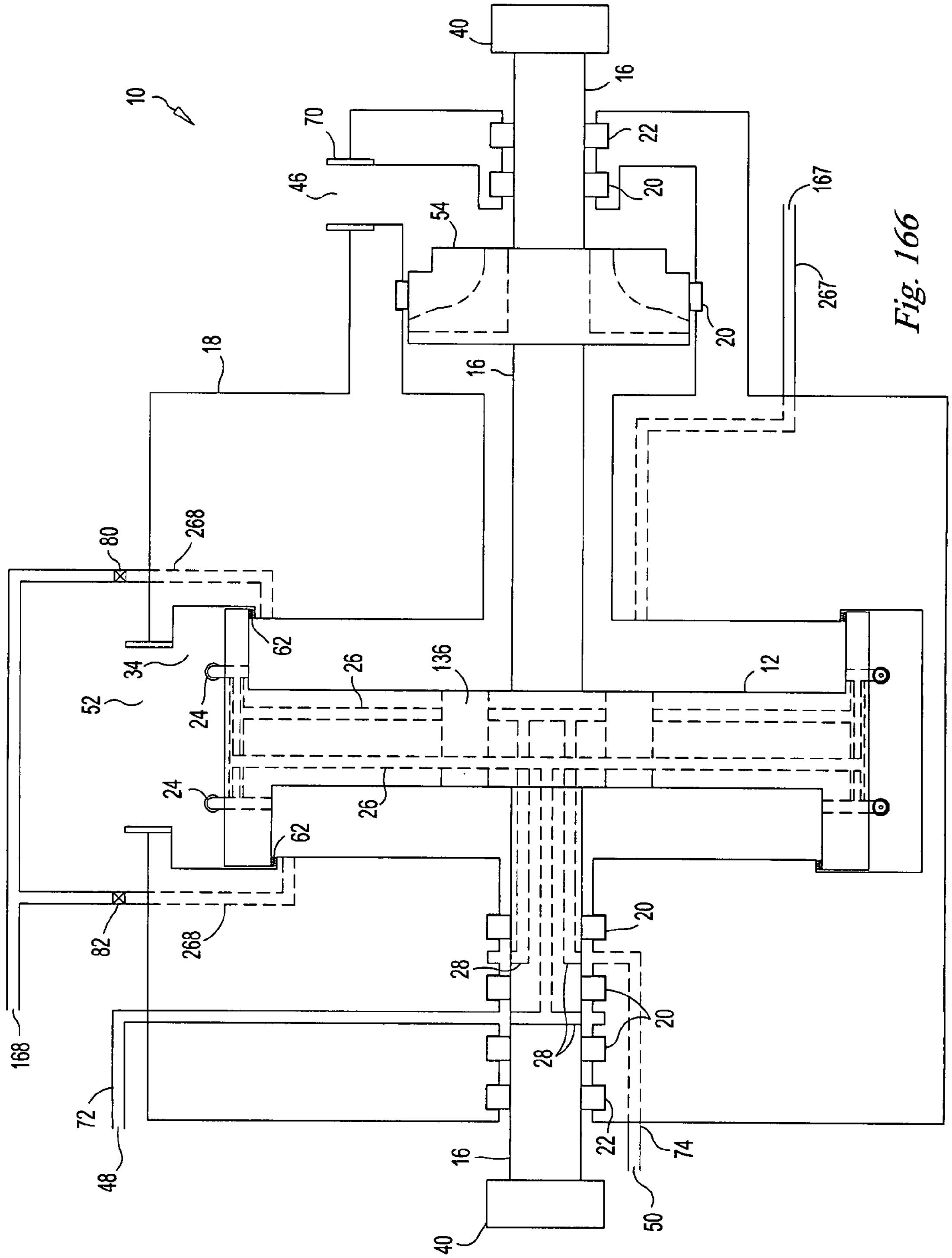
Figure 167:
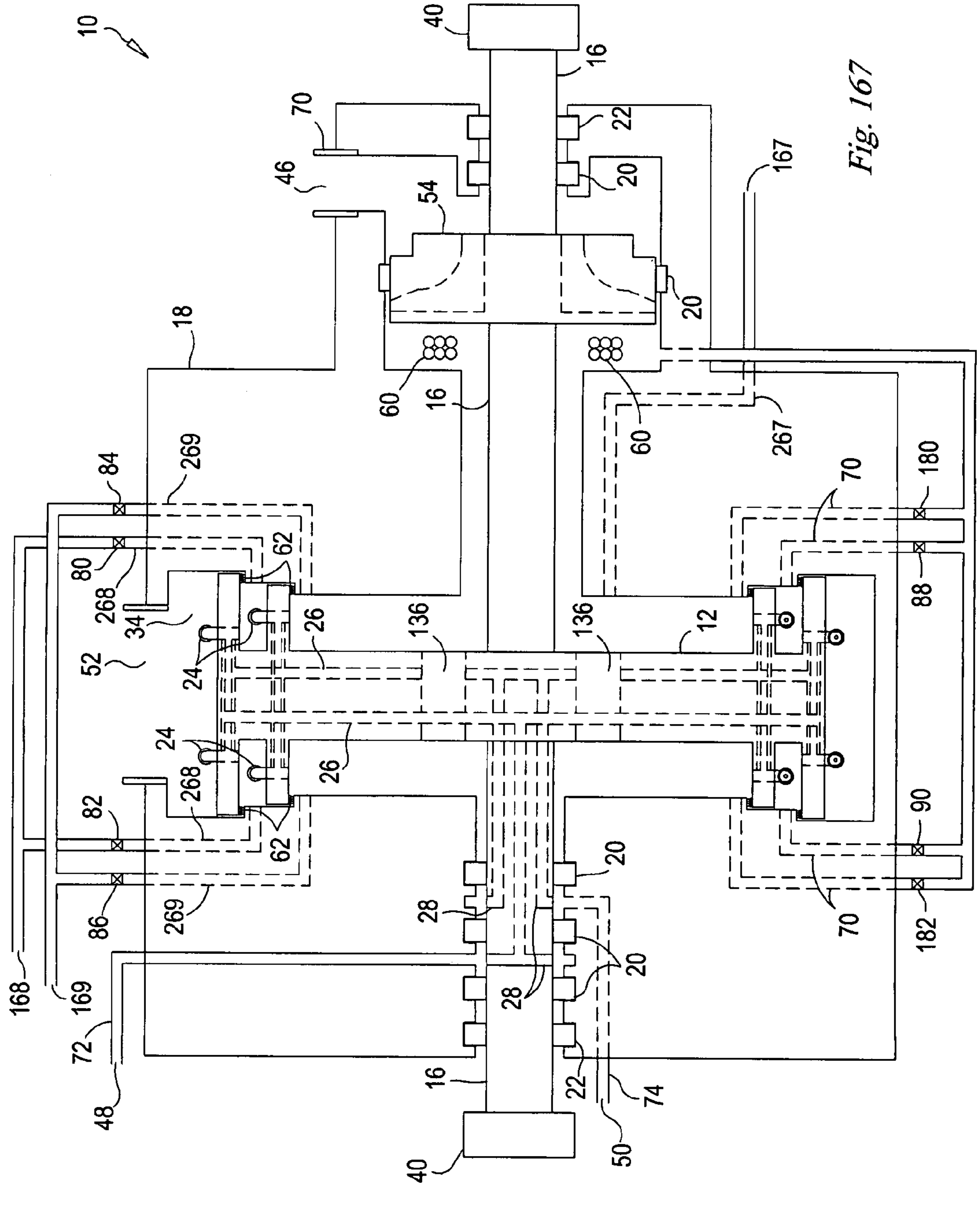
Figure 168:
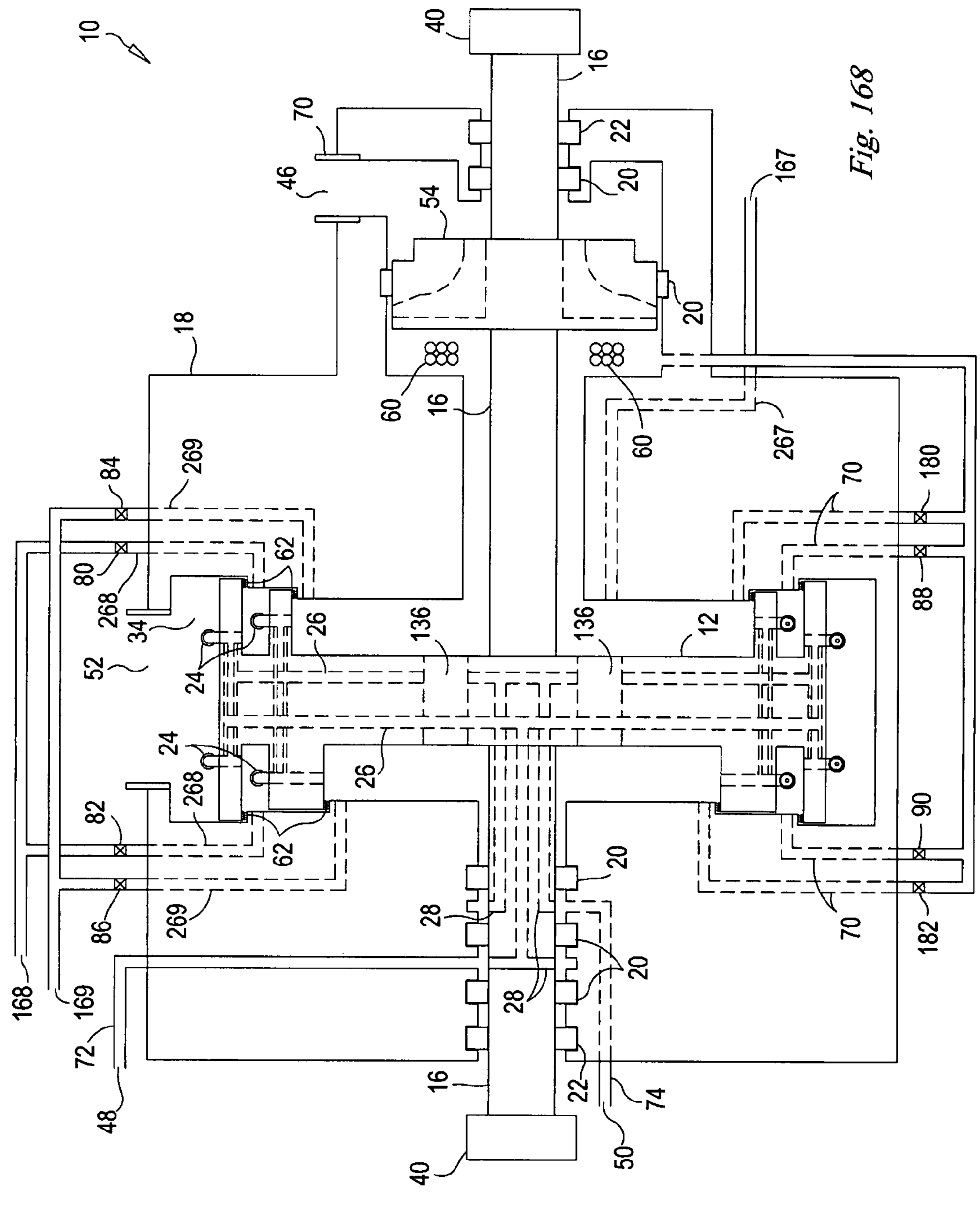
Figure 169:
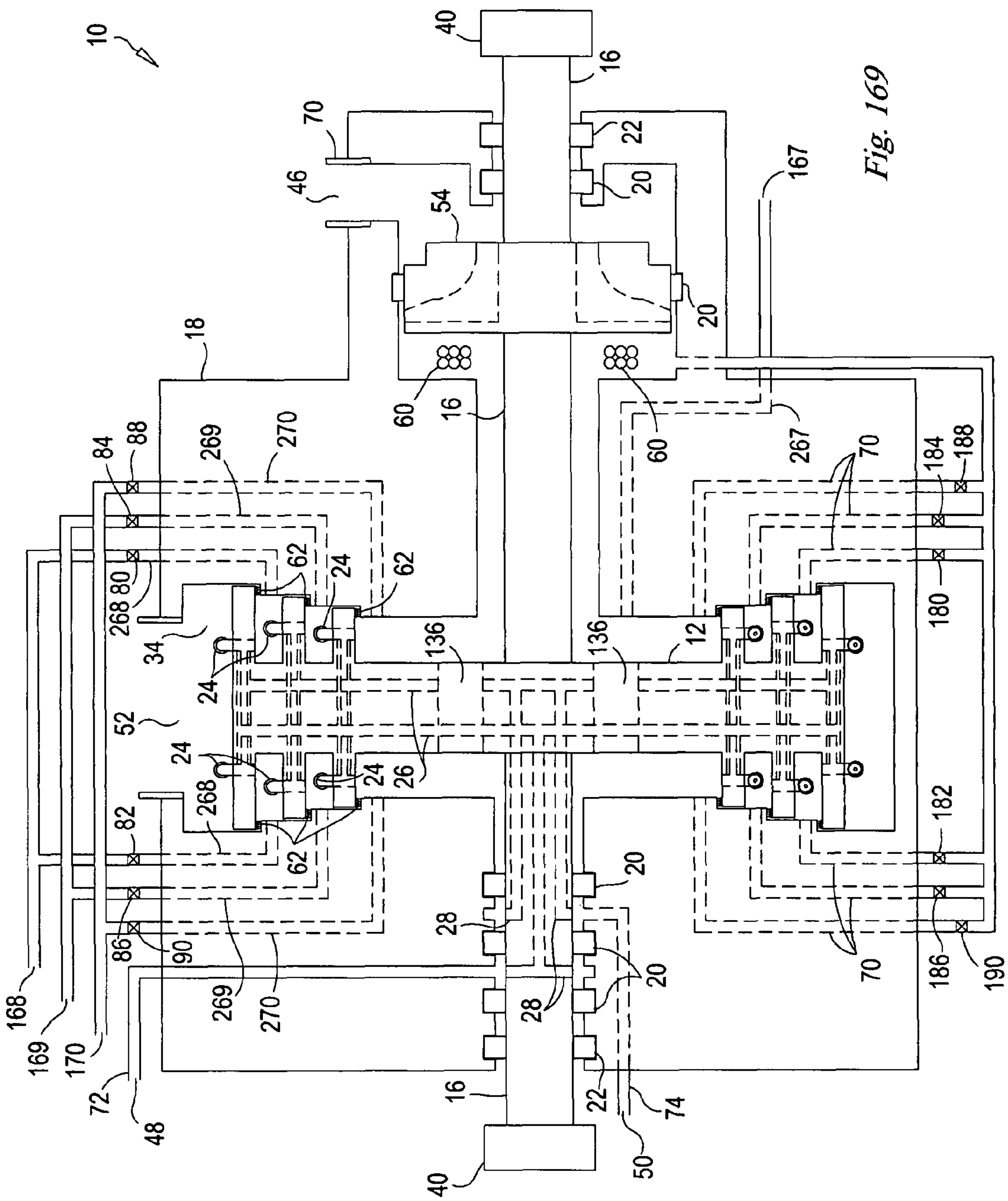
Figure 170:
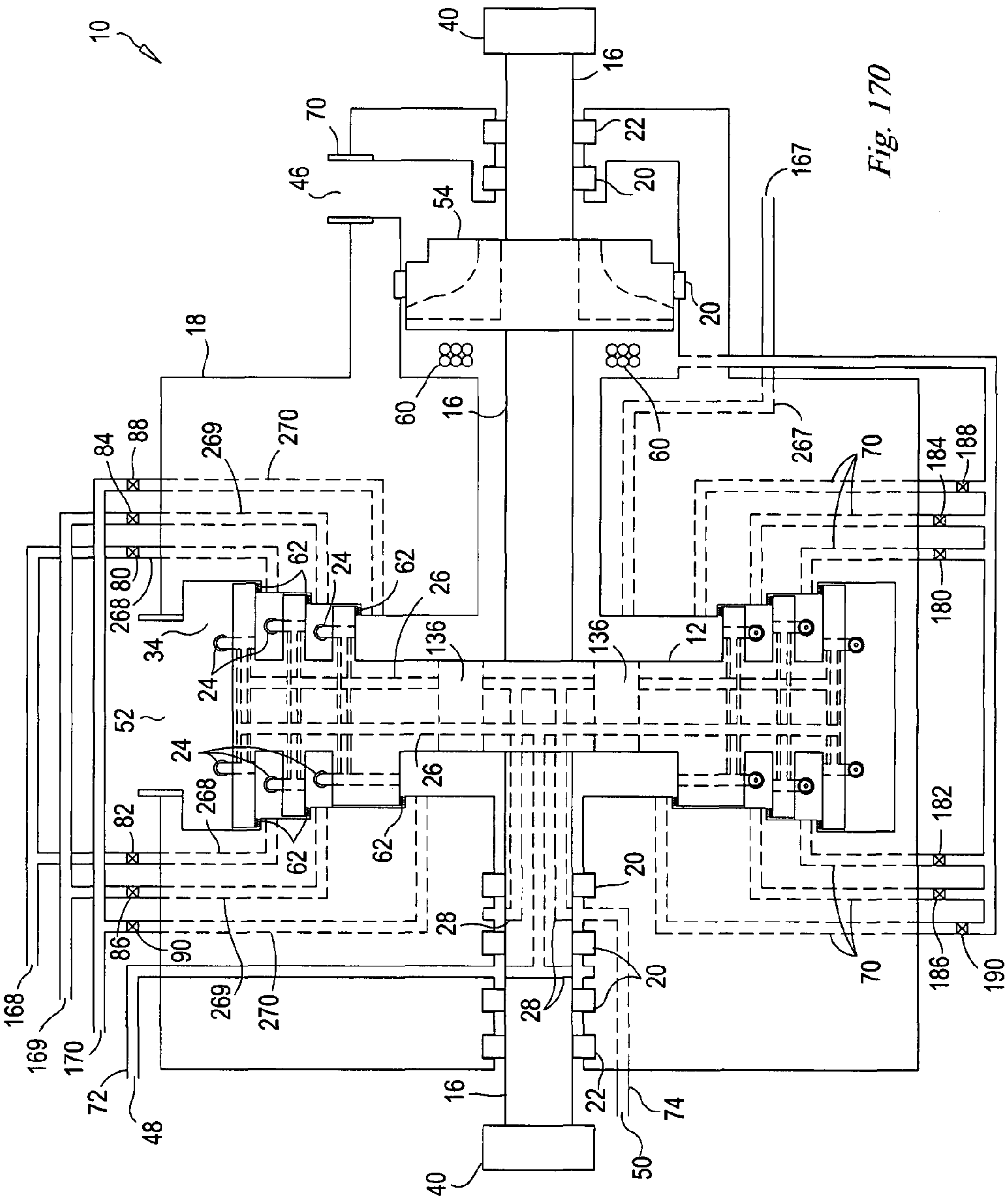
Figure 171:
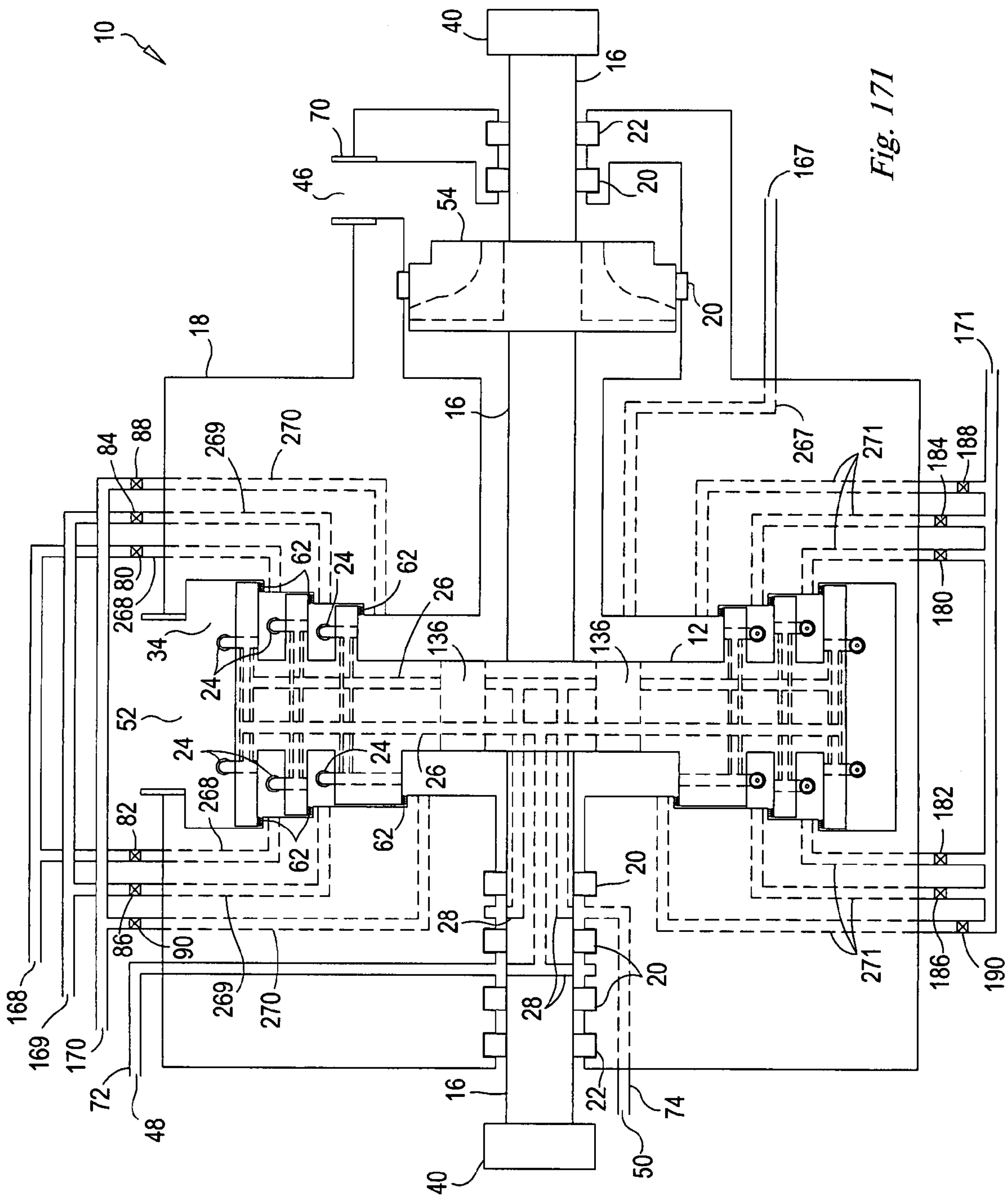
Figure 172:
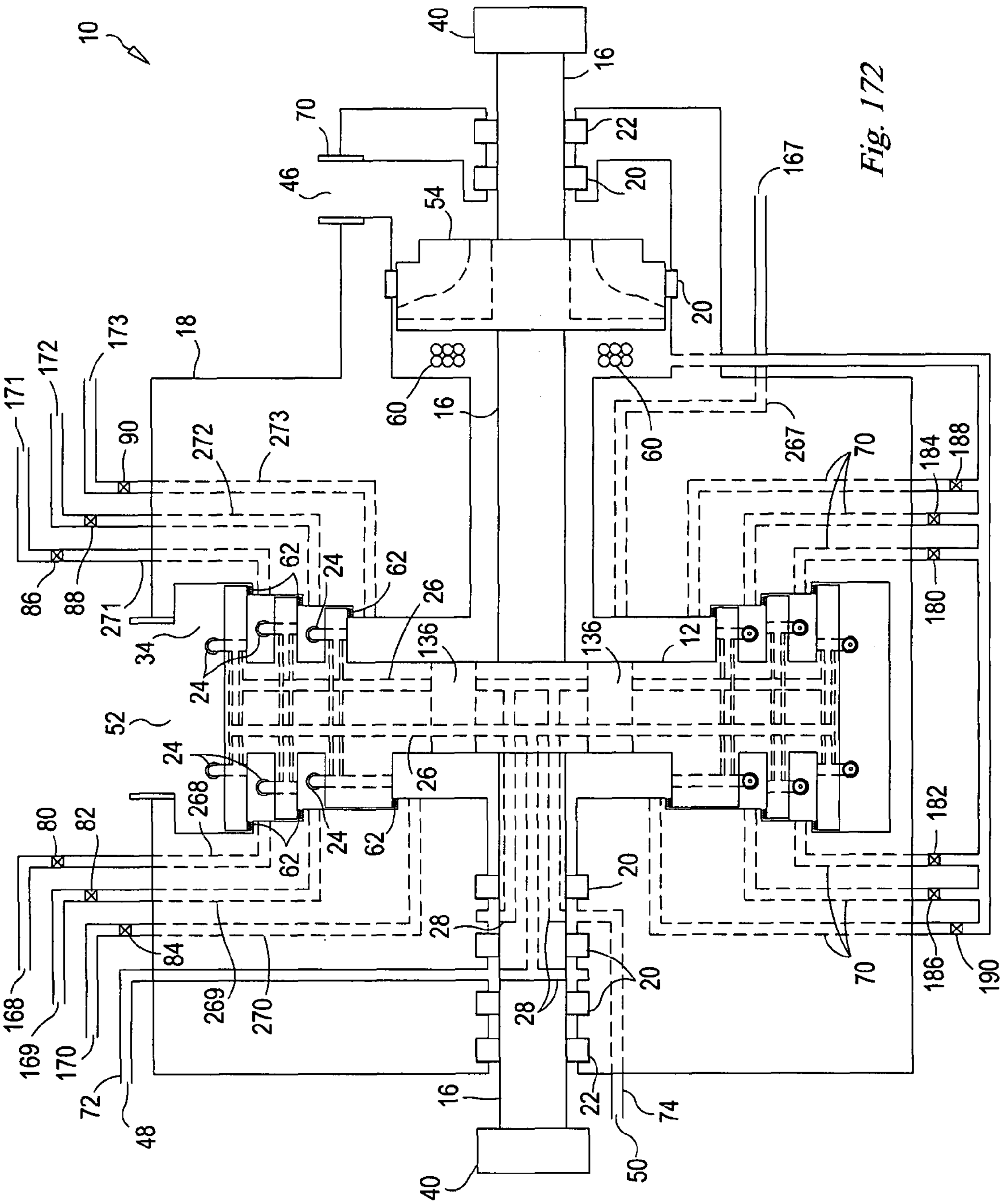
Figure 173:
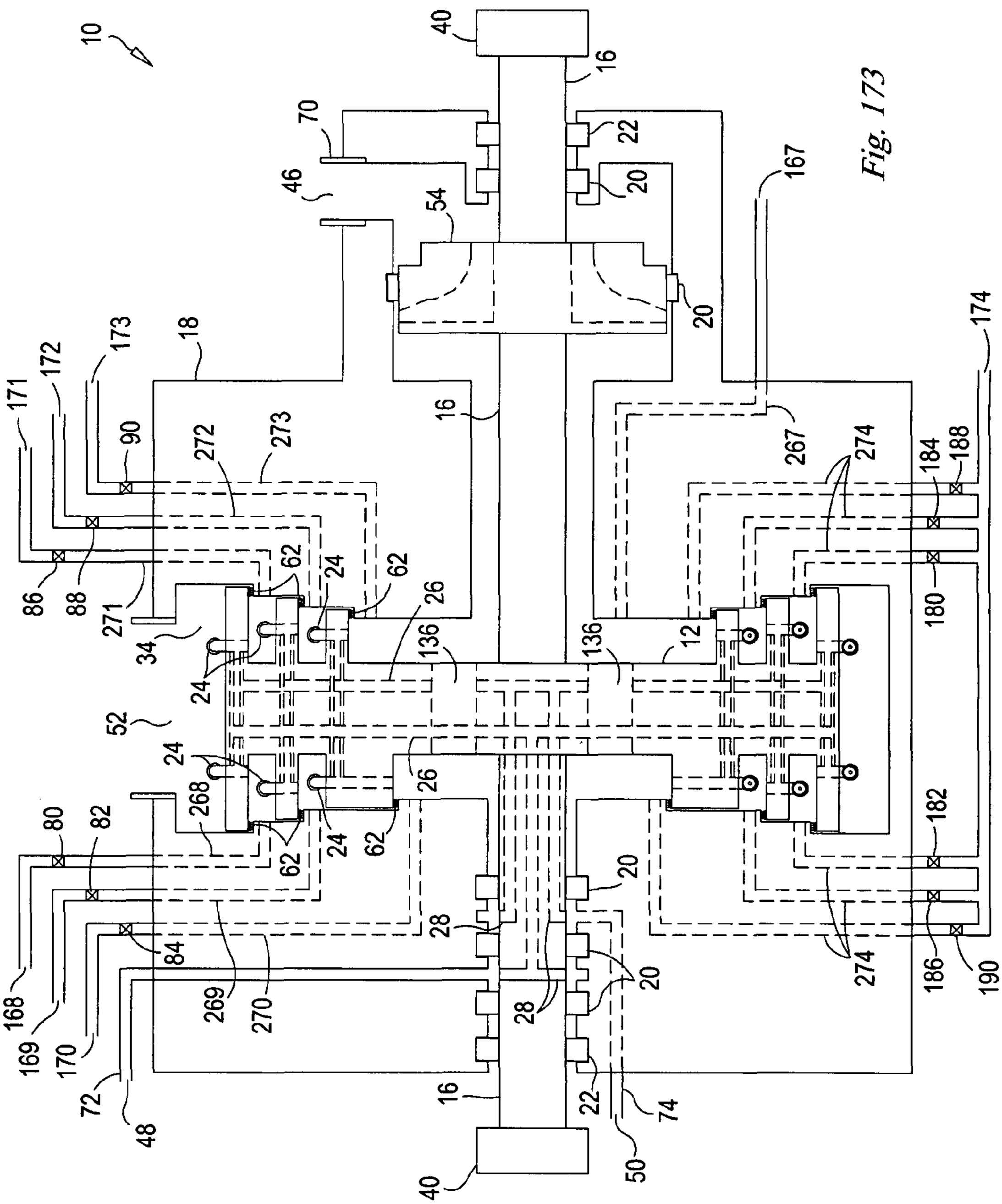
Figure 174:
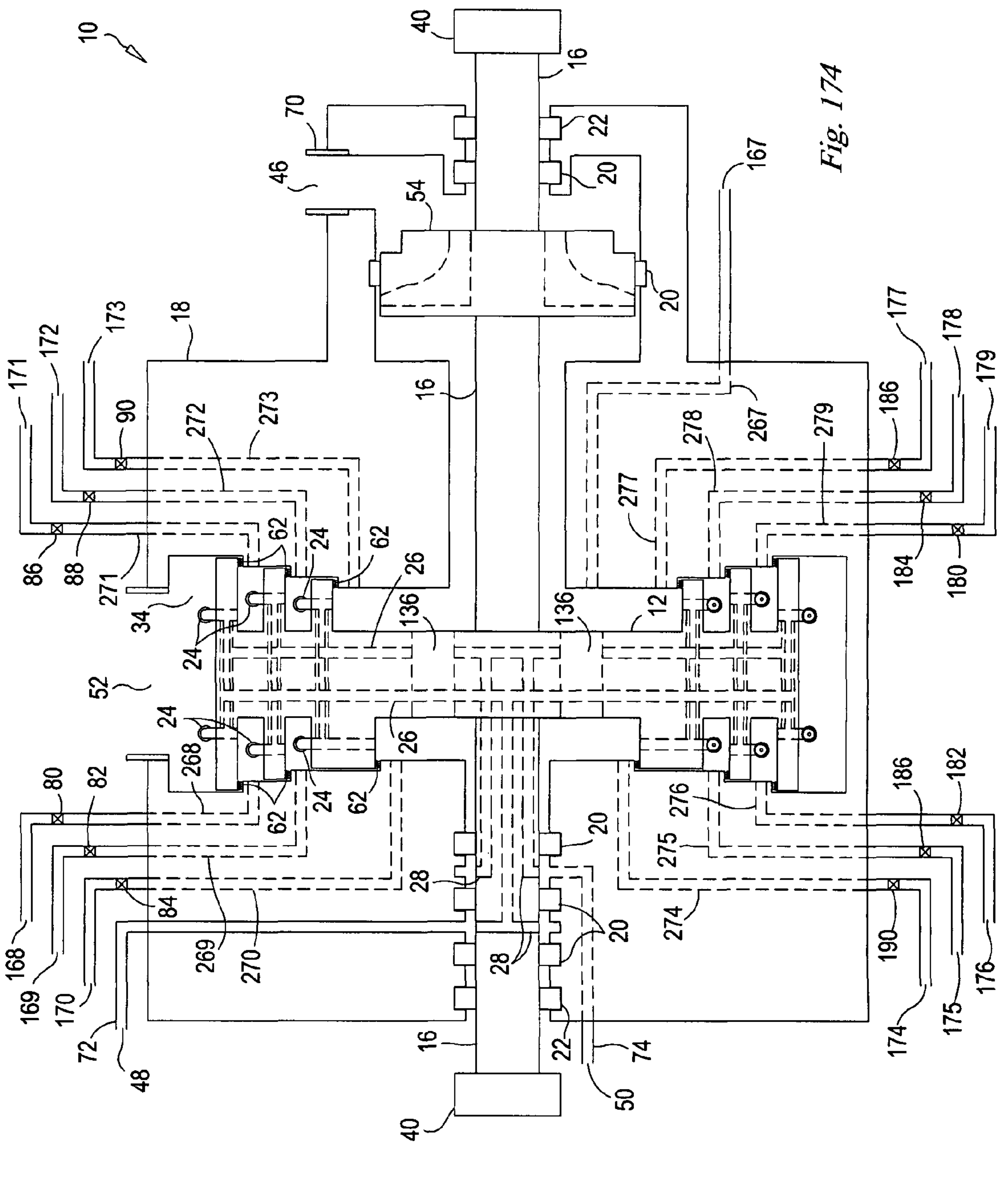
Figure 175:
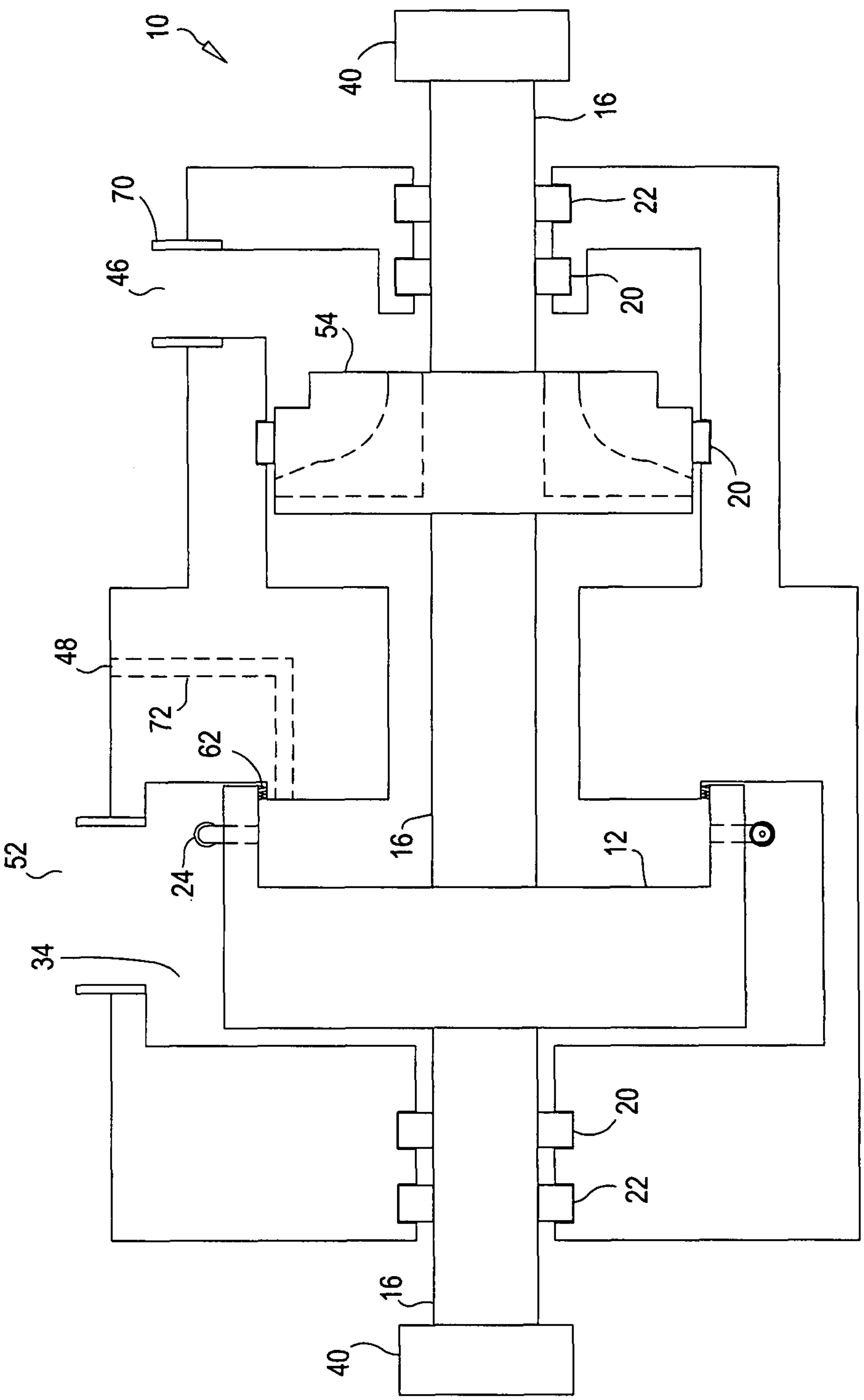
Figure 176:
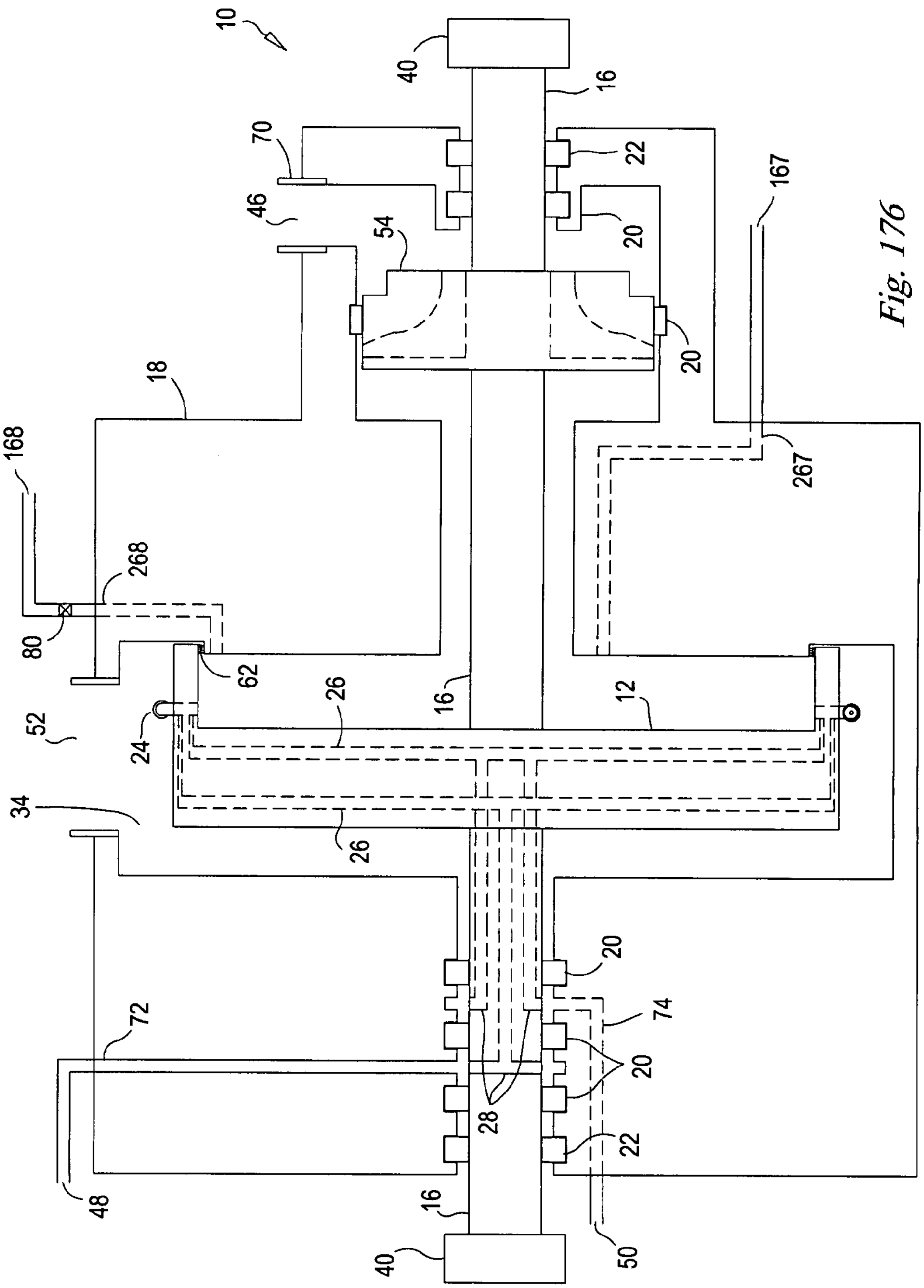
Figure 177:
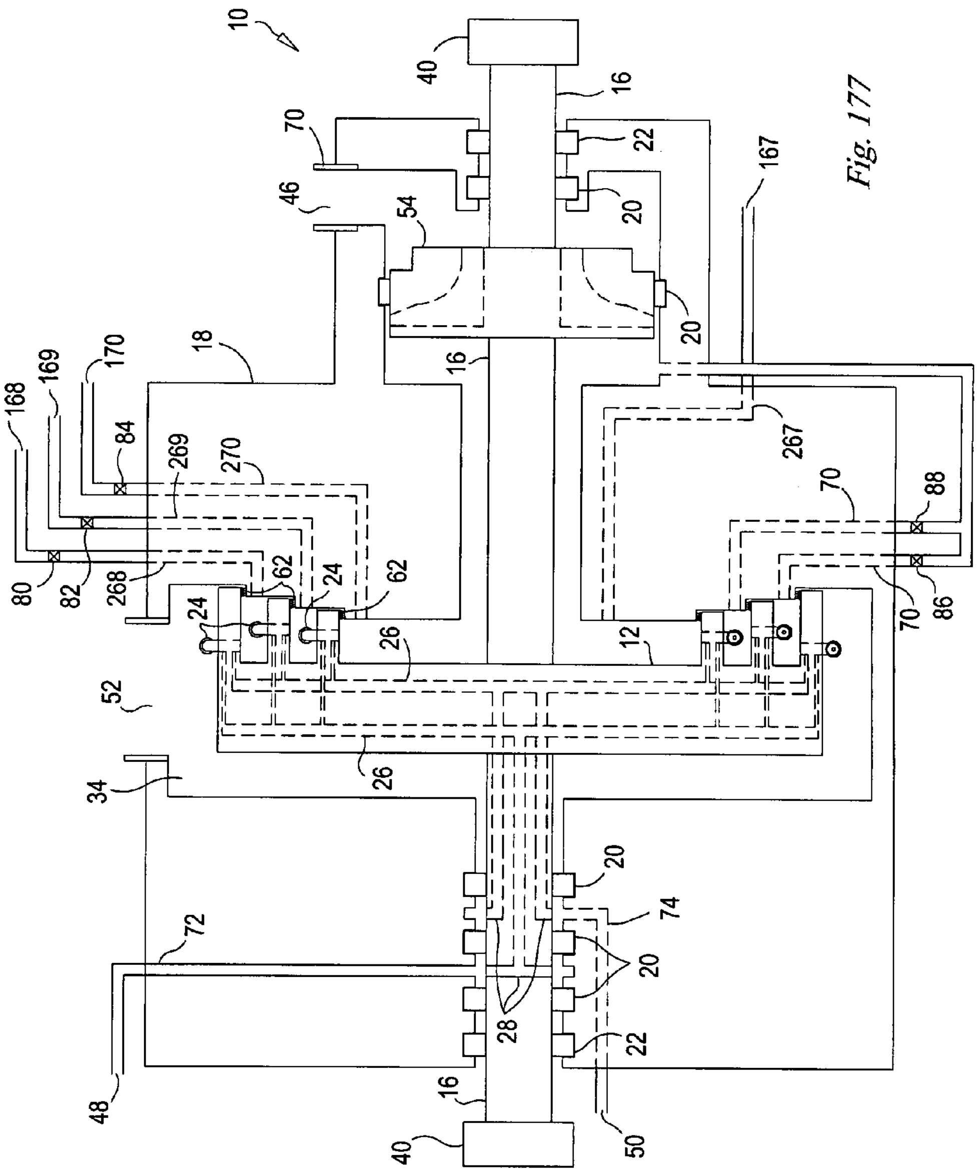
Figure 178:
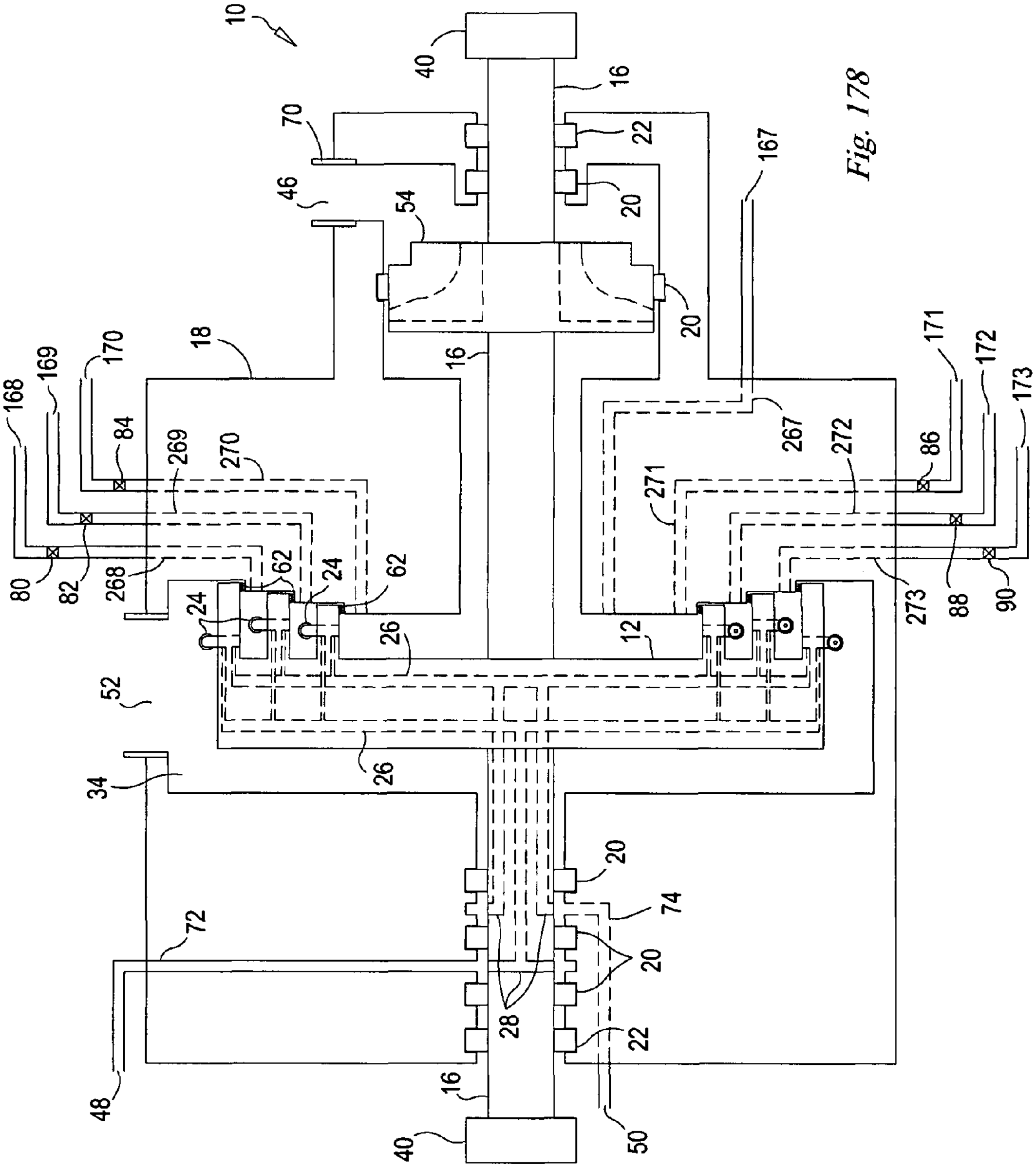
Figure 179:
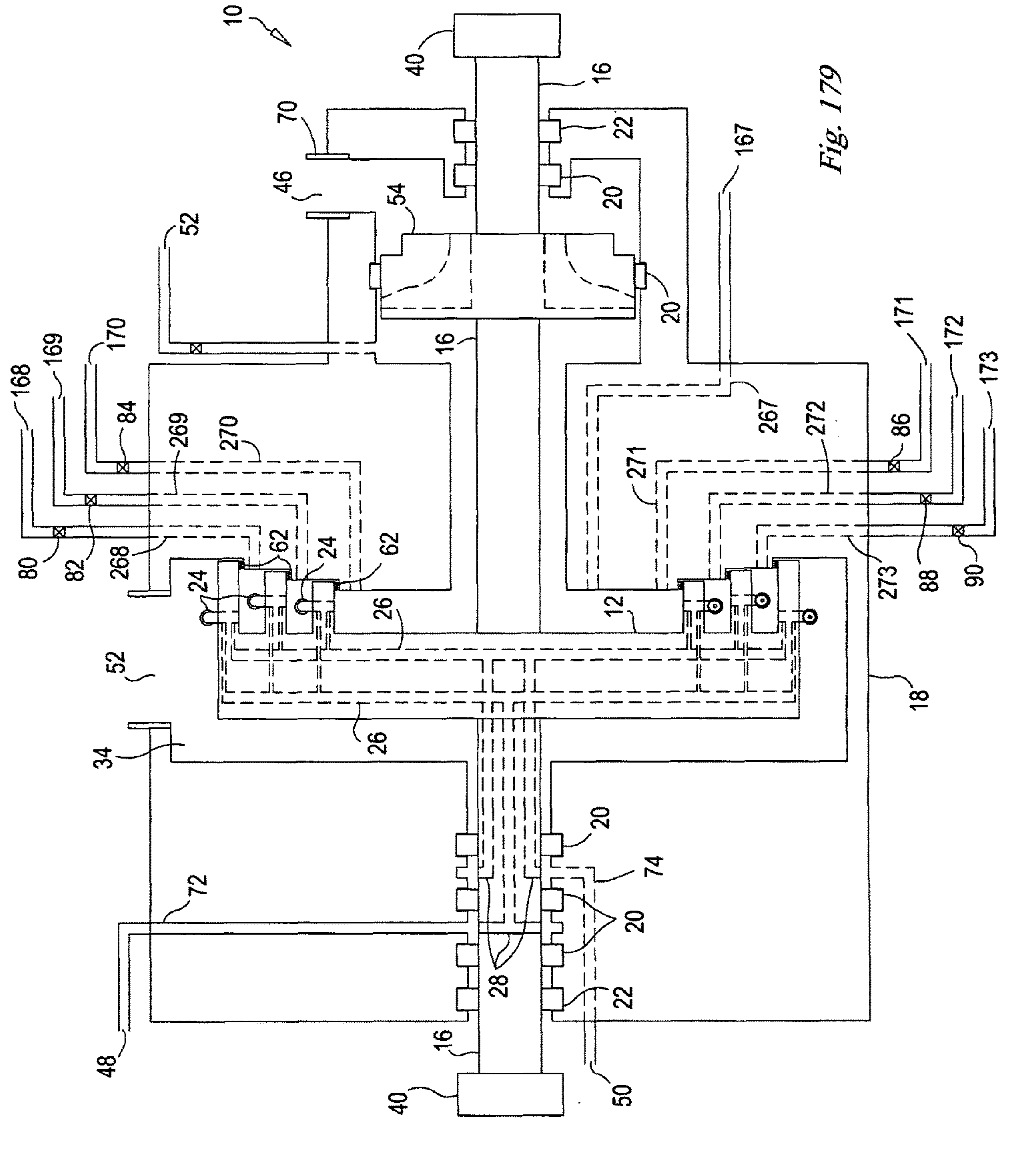
Figure 180:
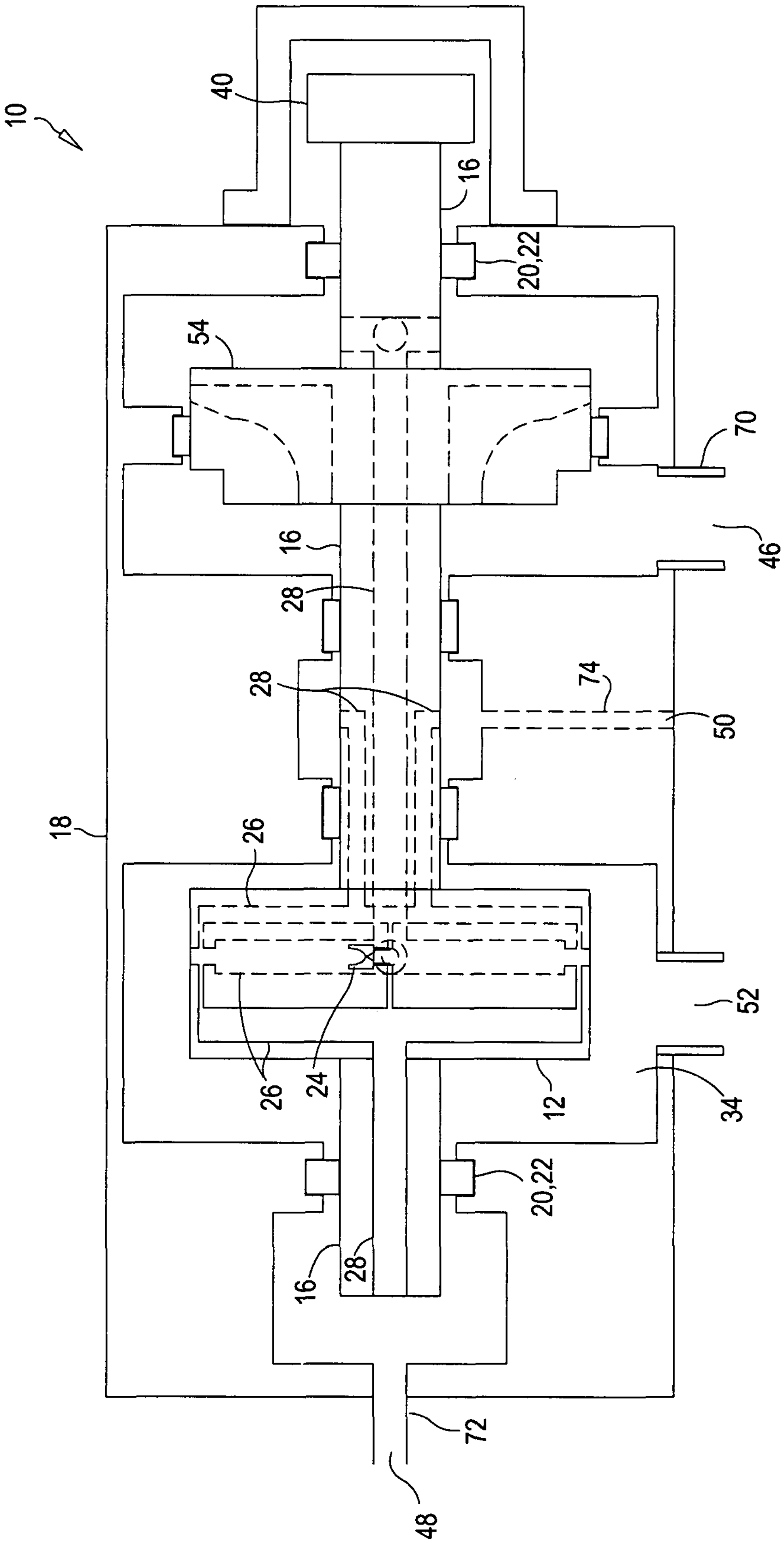
Figure 181:
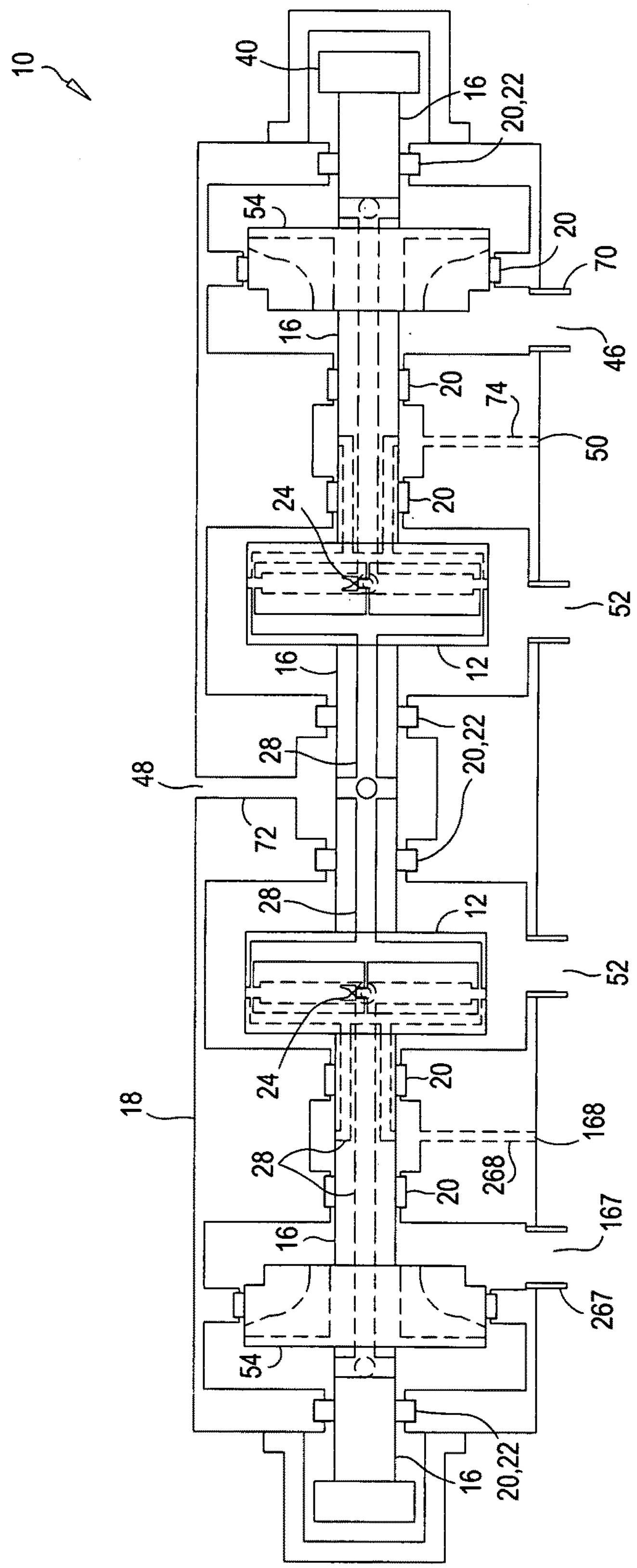
Figure 182:
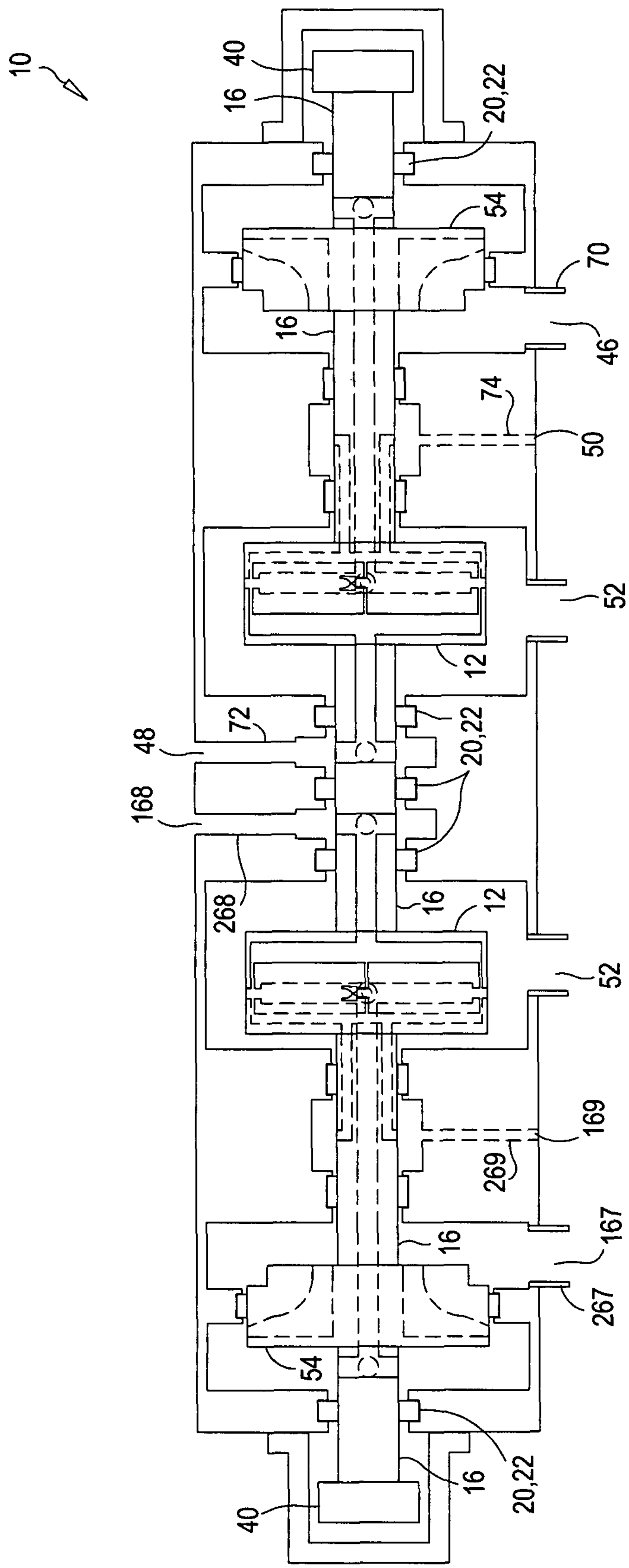
Figure 183:
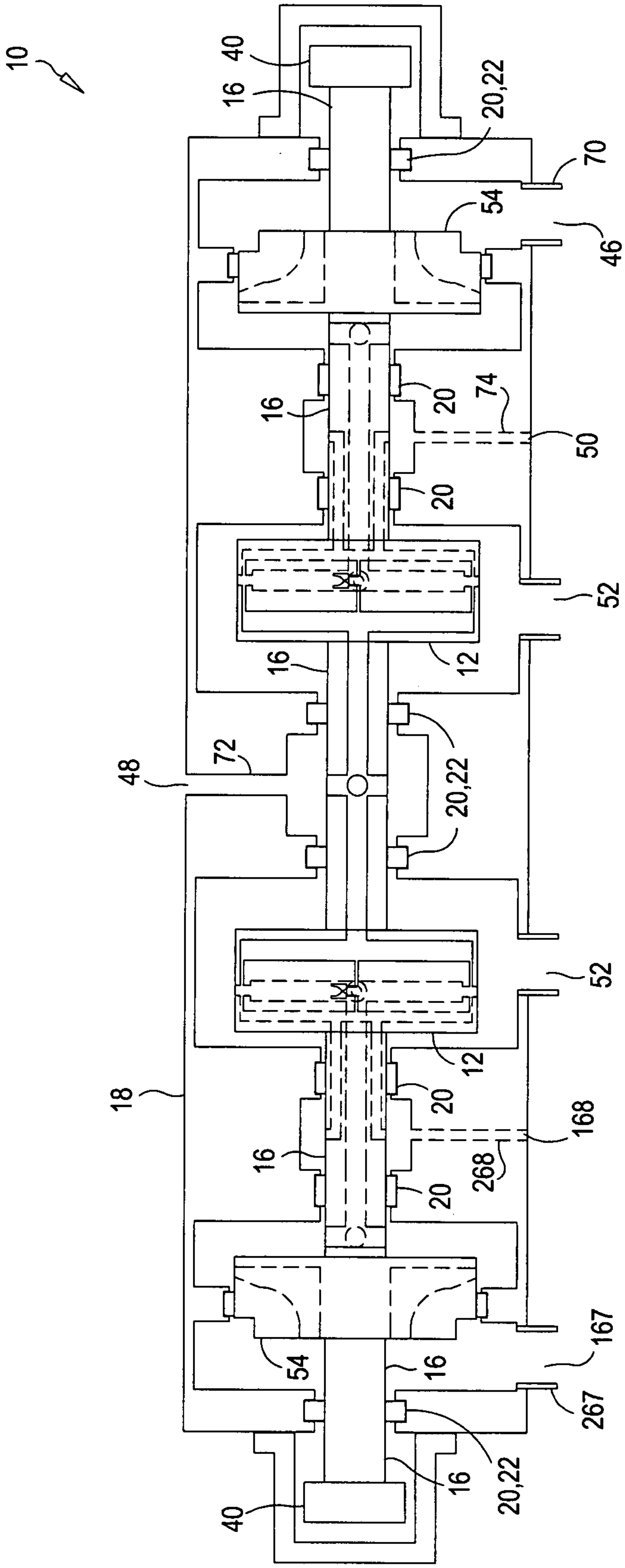
Figure 184:
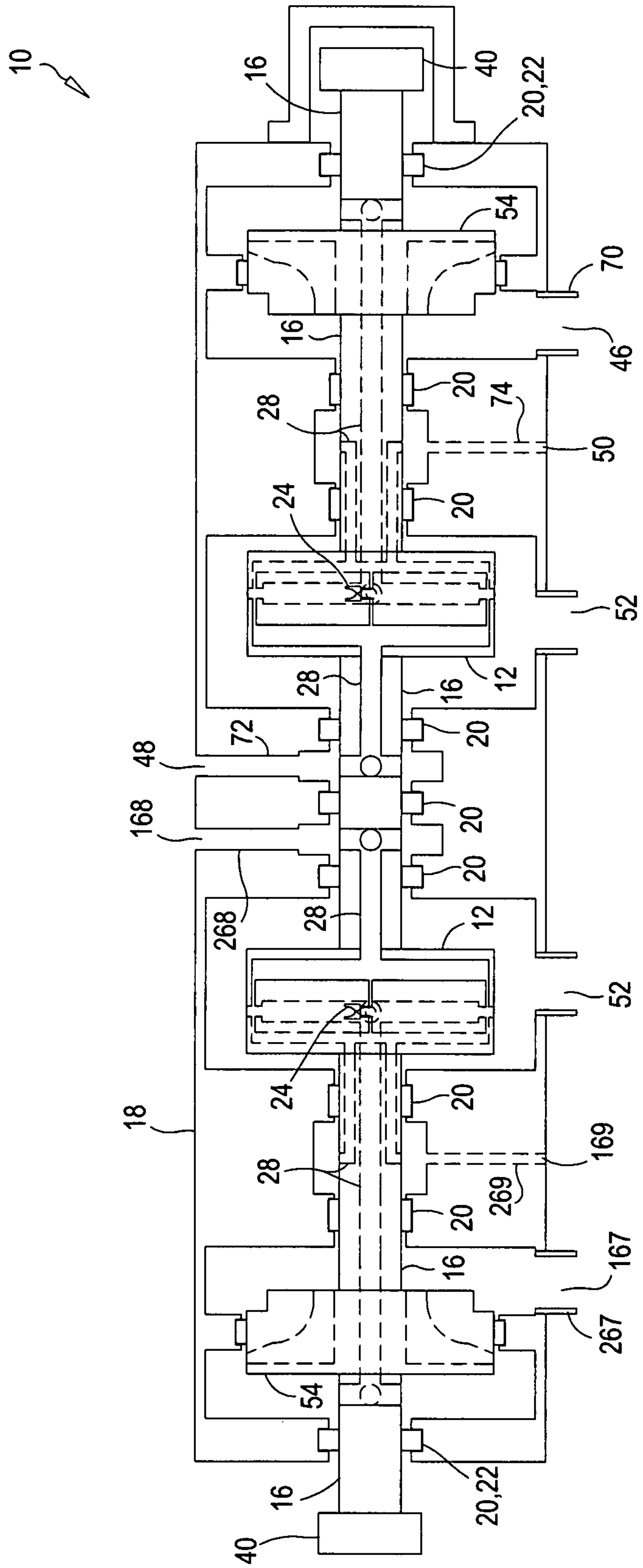
Figure 185:
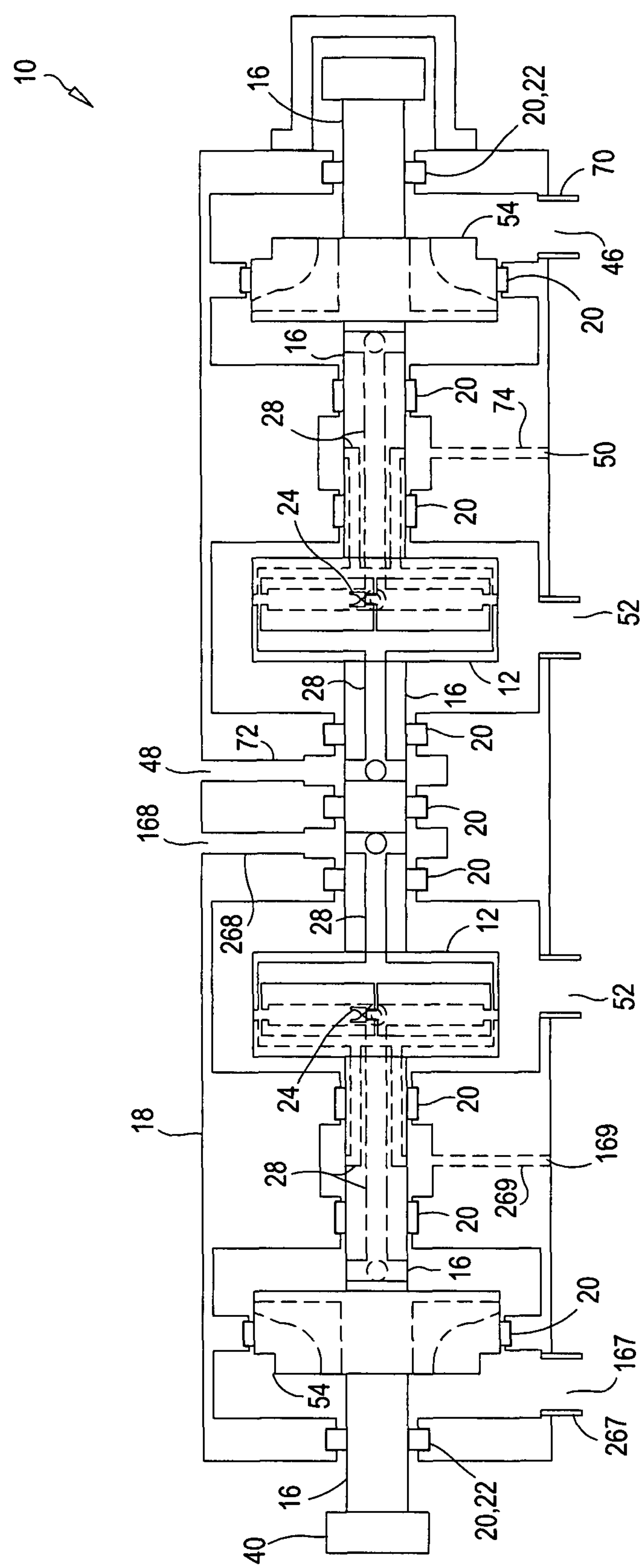

Referring to FIGS. 157-164, preferred combined-cycle embodiments of the present invention that comprise one combustion turbine engine of the present invention and one non-combustion turbine engine of the present invention, wherein said turbine engines are (1) incorporated on or as part of one shaft or (2) if physically different shafts, then coupled in such a manner as to effect being one shaft, are presented. For said embodiments, (1) said non-combustion turbine engine incorporates a non-shaft passageway for third inlet fluid 50, routed to third inlet port 74 which is split to two opposing (mirror-like, but not exactly mirrored, owing to shaft axial thrust considerations) non-combustion turbine engine rotors, and (2) the combustion turbine engine incorporates one turbine rotor (FIG. 157) or two turbine rotors (FIGS. 158-164), where said turbine rotors receive respective inlet fluids via shaft passageways. Referring to FIG. 157, combustion turbine fluids and associated flow paths include (1) first inlet fluid 46, typically, but not necessarily, an oxidizer, flowing through first inlet port 70 to the compressor, as heretofore described, and further flowing through shaft passageway(s) to the rotor 12 of the combustion turbine, through rotor passageway(s) to nozzle(s), portion(s) of nozzle(s), set(s) of nozzle(s) and/or combustion chamber-nozzle unit(s) located at, on, at a distance from (through connecting passageway(s)), integral with and/or recessed in the circumferential perimeter(s) and/or radial surface(s) of said combustion turbine engine rotor, (2) second inlet fluid 48, typically, but not necessarily, a fuel or reactant, flowing through second inlet port 72 and further flowing through shaft passageway(s) to the rotor 12 of the combustion turbine, through rotor passageway(s) to nozzle(s), portion(s) of nozzle(s), set(s) of nozzle(s) and/or combustion chamber-nozzle unit(s) located at, on, at a distance from (through connecting passageway(s)), integral with and/or recessed in the circumferential perimeter(s) and/or radial surface(s) of said combustion turbine engine rotor, wherein, or in the vicinity, said second fluid 48 mixes or reacts, or both, with said first inlet fluid 46, (3) fourth inlet fluid 167, typically, but not necessarily, a fluid purposed for the reduction, elimination, control. prevention and/or mitigation of pollutants that may otherwise result and/or be discharged into the environment, flowing through fourth inlet port 267 and further flowing through shaft passageway(s) to rotor 12 of the combustion turbine, through rotor passageway(s) to nozzle(s), portion(s) of nozzle(s), set(s) of nozzle(s) and/or combustion chamber-nozzle unit(s) located at, on, at a distance from (through connecting passageway(s)), integral with and/or recessed in the circumferential perimeter(s) and/or radial surface(s) of said combustion turbine engine rotor, wherein, or in the vicinity, said fourth fluid 167 mixes or reacts, or both, with said first inlet fluid 46 and/or said second inlet fluid 48, (4) third inlet fluid 50, typically, but not necessarily, a fluid (e.g., steam or steam/liquid water mixture or energy-laden liquid water) which can be expanded through said non-combustion turbine engine to produce turbine mechanical work or output energy, in addition to turbine mechanical work or output energy produced by said combustion turbine engine, flowing through third inlet port 74 and further flowing (a) to the rotors 12 of said non-combustion turbine through rotor passageway(s) to nozzle(s), portion(s) of nozzle(s), set(s) of nozzle(s) and/or combustion chamber-nozzle unit(s) located at, on, at a distance from (through connecting passageway(s)), integral with and/or recessed in circumferential perimeter(s) and/or radial surface(s) of said non-combustion turbine engine rotors, wherein said non-combustion turbine engine rotor is typically, but not necessarily, pressure-compounded, and (b) through shaft passageway(s) to the rotor 12 of the combustion turbine, through rotor passageway(s) to nozzle(s), portion(s) of nozzle(s), set(s) of nozzle(s) and/or combustion chamber-nozzle unit(s) located at, on, at a distance from (through connecting passageway(s)), integral with and/or recessed in the circumferential perimeter(s) and/or radial surface(s) of said combustion turbine engine rotor, wherein, or in the vicinity, said third fluid 50 (i) mixes or reacts, or both, with said first inlet fluid 46, said second inlet fluid 48, said fourth inlet fluid 167, reaction product(s) of said first inlet fluid 46 and said second inlet fluid 48, reaction product(s) of fourth inlet fluid 167 and with reaction product(s) of first inlet fluid 46 and said second inlet fluid 48, or any combinations thereof, and further, wherein said mixing or reacting with said first inlet fluid 46, said second inlet fluid 48 and/or fourth inlet fluid 167, including reaction of reaction product(s) thereof, purposes the reduction, elimination, control. prevention and/or mitigation of pollutants that may otherwise result and/or be discharged into the environment, and/or (ii) purposes as a propellant, thus, adding to or increasing said combustion turbine engine mechanical work or output energy, and/or (5) combinations thereof.

Referring further to FIG. 157, the configuration and physical elements of the rotor of compressor 54 typically, but not necessarily, introduces an axial thrust component to the turbine shaft, in that, first inlet fluid 46, when typically ambient air as an oxidizer, is at a relatively low pressure (say, approximately 15 psia), wherein said first inlet fluid pressure acts against the right-hand surface area (inlet face) of the rotor of compressor 54, and the compressor discharge pressure, associated with first inlet fluid 46 substance, is considerably higher and said discharge pressure acts against the left-hand surface of the rotor of compressor 54. When the product of said inlet pressure times the surface area upon which it acts is different than the product of said discharge pressure times the surface area upon which it acts, a resultant axial force/thrust, relative to the rotor of compressor 54, exists. For a preferred embodiment of FIG. 157, typically, but not necessarily, the combustion turbine rotor experiences little, or no, axial thrust due to the preferred nozzle configuration; thus, for the preferred embodiment of FIG. 157, axial force/thrust associated with the rotor of compressor 54 can be countered through an opposing axial force/thrust associated with the firmly attached non-combustion turbine engine or shaft thrust bearing methods (as previously mentioned), or both. For preferred embodiments of FIGS. 157-164, an opposing axial force/thrust associated with the non-combustion turbine engine is accomplished with differing surface area(s) within the rotor surface area configuration of the non-combustion turbine engine upon which the pressure of third inlet fluid 50 acts, as is illustrated in these FIGS. 157-164 and also illustrated in FIGS. 151, 155 and 156. If the pressure of first inlet fluid 46 is at the desired pressure for appropriate interaction with other inlet fluid(s), at designated locations, then compressor 54 can be eliminated from the embodiment. The source of sufficient/desired pressure for first inlet fluid may be, but not necessarily, an external compressor or the by-product of another process.

Referring to FIGS. 158-164, the illustrated preferred embodiments of the present invention incorporate the fluids, fluid paths and turbine embodiments as said in the preceding paragraph regarding FIG. 157 and incorporate additional fluid(s) and associated fluid path(s) and an additional combustion turbine engine rotor. Fluid inlets to the second (additional) combustion turbine engine rotor 12, include, but are not limited to, the fluid (combined and/or reacted fluids 46, 48, 50 and 167, as previously described) of the turbine chamber associated with the first combustion turbine engine rotor, a fifth inlet fluid 168 and a sixth inlet fluid 169. The fluid (combined and/or reacted fluids 46, 48, 50 and 167, as previously described) of the turbine chamber associated with the first combustion turbine engine rotor would typically be comprised of reacted fluid (e.g., combustion exhaust gas from the burning or reacting of fuel and air/oxidizer), excesses of unused inlet fluids (e.g., unburned fuel and excess air/oxidizer) and/or other inlet fluids (e.g., steam/water), perhaps at different thermodynamic conditions; said first combustion turbine engine turbine chamber fluid is routed to nozzle(s), portion(s) of nozzle(s), set(s) of nozzle(s) and/or combustion chamber-nozzle unit(s) to nozzle(s), portion(s) of nozzle(s), set(s) of nozzle(s) and/or combustion chamber-nozzle unit(s) located at, on, at a distance from (through connecting passageway(s)), integral with and/or recessed in the circumferential perimeter(s) and/or radial surface(s) of second combustion turbine engine rotor, hydraulically connected to one or more second combustion turbine engine rotor passageway(s) to one or more turbine shaft passageway(s) to said first combustion turbine engine turbine chamber. The fifth inlet fluid 168, entering through fifth inlet port 268, passing through turbine shaft passageway(s) and through one or more said rotor passage way(s), hydraulically connects to the nozzle(s), set(s) of nozzles, or combustion chamber-nozzle unit(s) located at, on, at a distance from (through connecting passageway(s)), integral with and/or recessed in the circumferential perimeter(s) and/or radial surface(s) of said second combustion turbine engine rotor, wherein, or in the vicinity, said fifth inlet fluid 168, typically, but not necessarily, a fuel or reactant, mixes or reacts, or both, with said fluid (combined and/or reacted fluids 46, 48, 50 and 167, as previously described) of the turbine chamber associated with the first combustion turbine engine rotor. The sixth inlet fluid 169, entering through sixth inlet port 269, passing through turbine shaft passageway(s) and through one or more rotor passage way(s), hydraulically connects to the nozzle(s), set(s) of nozzles, or combustion chamber-nozzle unit(s) located at, on, at a distance from (through connecting passageway(s)), integral with and/or recessed in the circumferential perimeter(s) and/or radial surface(s) of said second combustion turbine engine rotor, for which said nozzle(s), set(s) of nozzles, or combustion chamber-nozzle unit(s) may or may not be the same as nozzle(s), set(s) of nozzles, or combustion chamber-nozzle unit(s) said in the previous sentence, wherein, or in the vicinity, said sixth inlet fluid 168, typically, but not necessarily, a fluid purposed for the reduction, elimination, control, prevention and/or mitigation of pollutants that may otherwise result and/or be discharged into the environment, mixes or reacts, or both, with said fluid (combined and/or reacted fluids 46, 48, 50 and 167, as previously described) of the turbine chamber associated with the first combustion turbine engine rotor, said fifth inlet fluid and/or reactants thereof. By using fluid(s) of the first combustion turbine engine rotor turbine chamber in second combustion turbine engine nozzle(s), portion(s) of nozzle(s), set(s) of nozzle(s) and/or combustion chamber-nozzle unit(s), a dilution process (e.g., exhaust gas dilution, as discussed heretofore) occurs that aids in the reduction, elimination, control. prevention and/or mitigation of pollutants that may otherwise result and/or be discharged into the environment, in addition to, in certain preferred embodiments, supplemental turbine mechanical work or output energy associated with fifth inlet fluid 168 as a fuel.

In other preferred embodiments, the present invention is a system and a method for generating power. A conventional/traditional steam-turbine power plant comprises four major components: (1) a pump, (2) a boiler, (3) a turbine-generator, and (4) a condenser. In this power plant system, a fluid (water, as a substance) flows in the order just described, wherein the pump discharge is the highest pressure of the system and the pump suction is the lowest pressure of the system. Overall fluid flow is basically a function of pressure differential through the system. Those knowledgeable of conventional/traditional steam-turbine power plants recognize that said pump component is representative, while, in actuality, said pump preferably encompasses the condensate pump, de-aeration vessel, boiler feed pump, to name a few, i.e., the pumping portion of the system.

Figure 104:
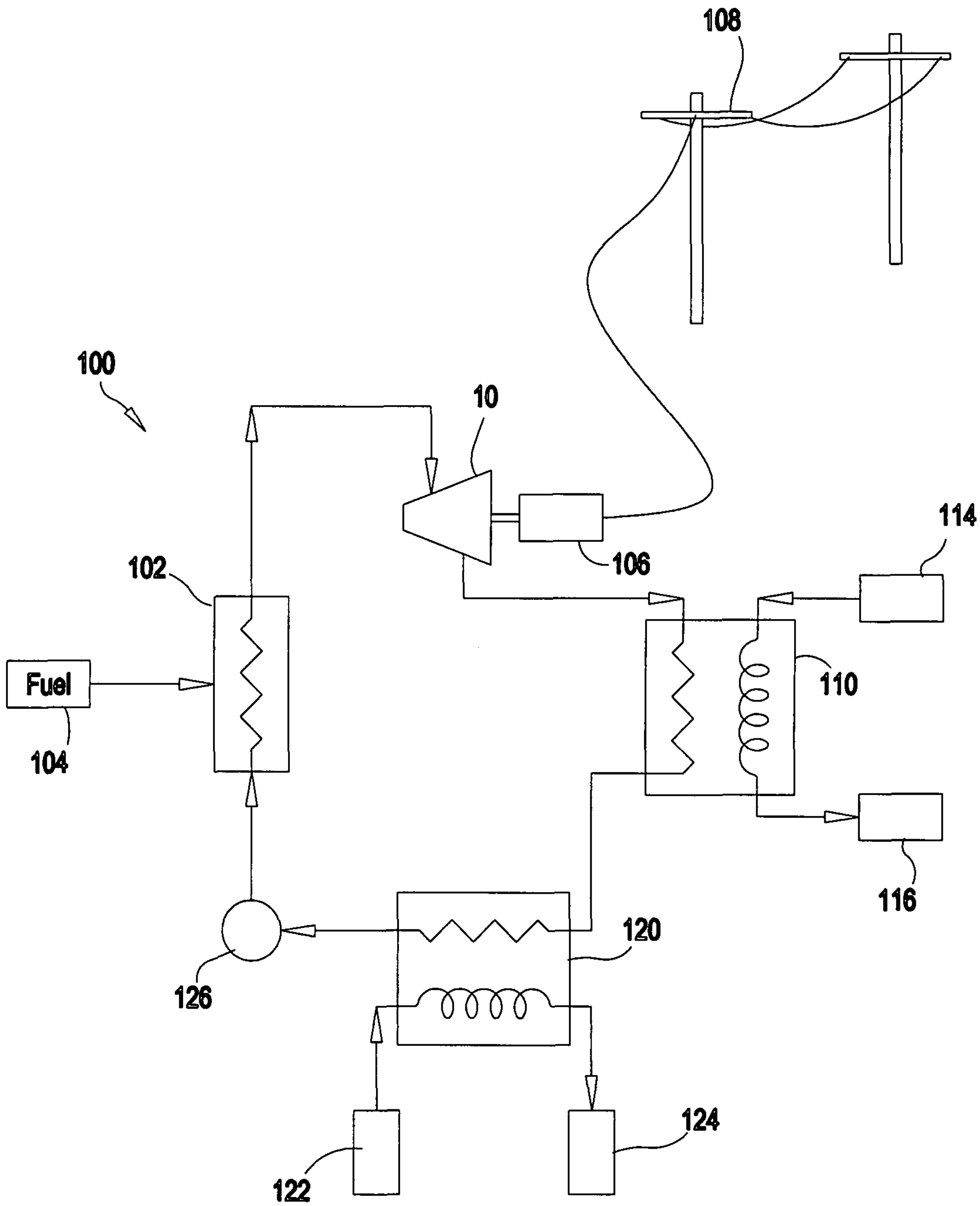
FIG. 104 is a block diagram of a power generation system in accordance with a preferred embodiment of the invention.
Figure 105:
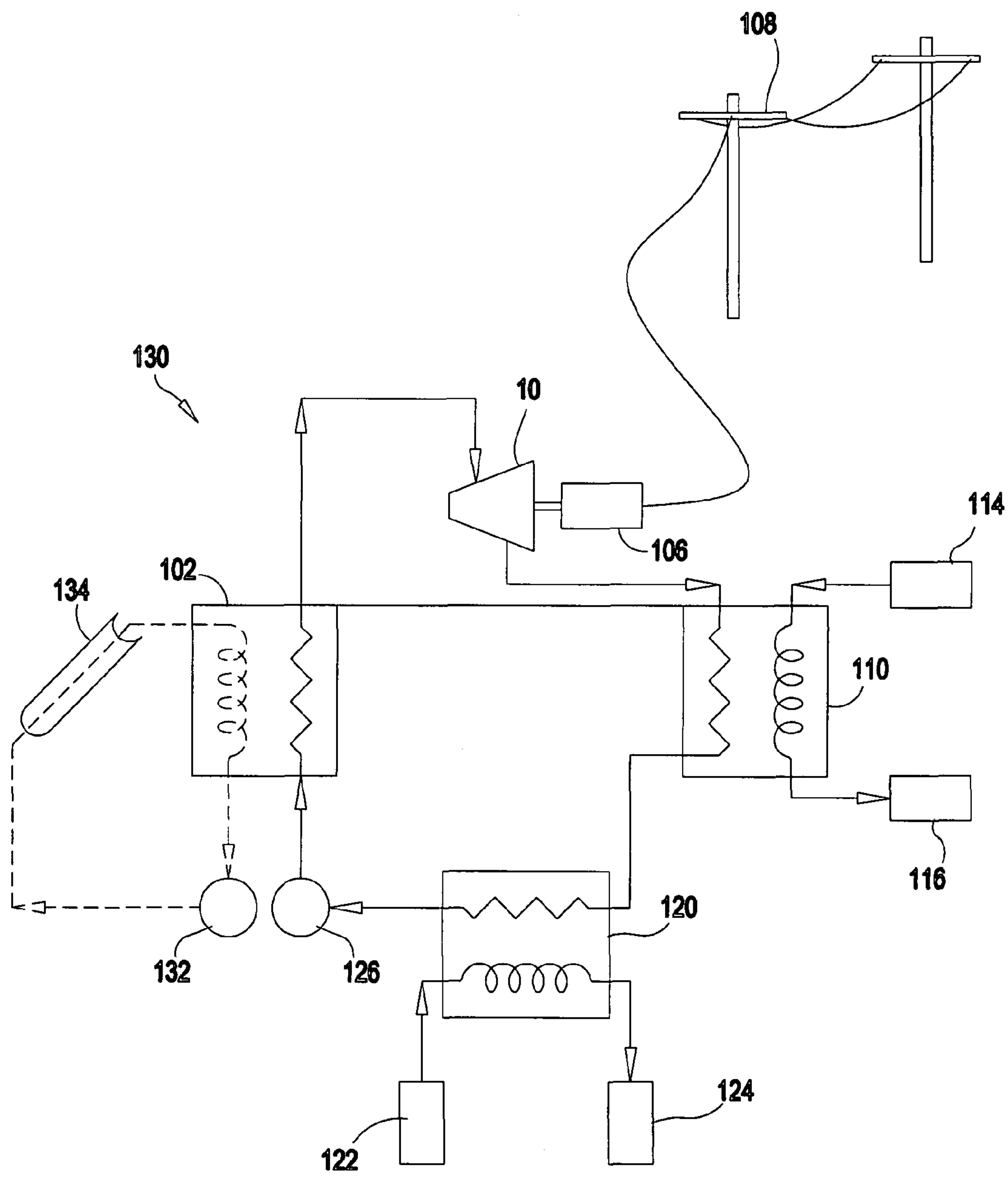
FIG. 105 is a block diagram of a solar power generation system in accordance with a preferred embodiment of the invention.
Figure 106:
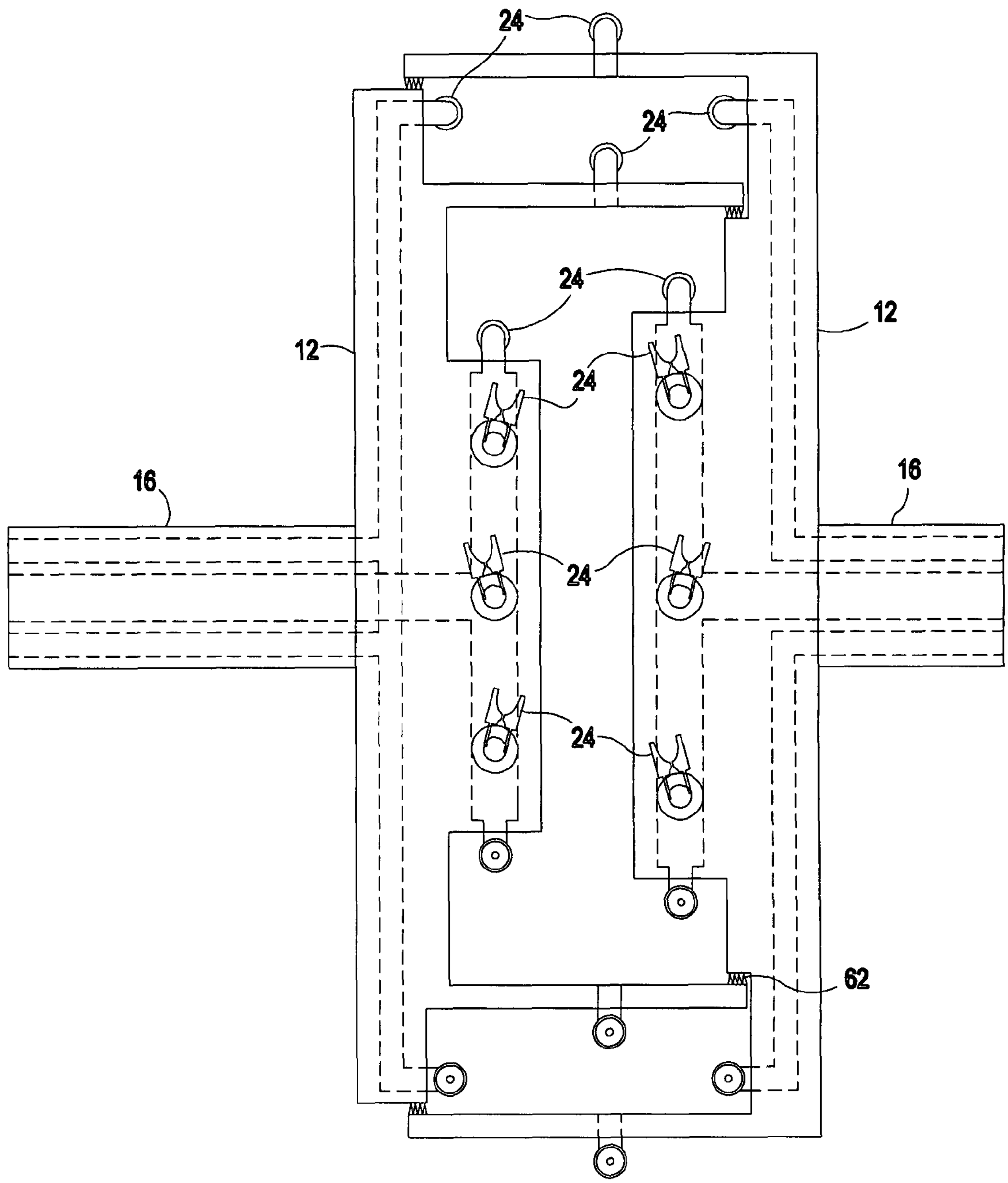
FIG. 106 is a cross-sectional view of a pressure-compound rotor of another preferred embodiment of the invention.
Figure 107:
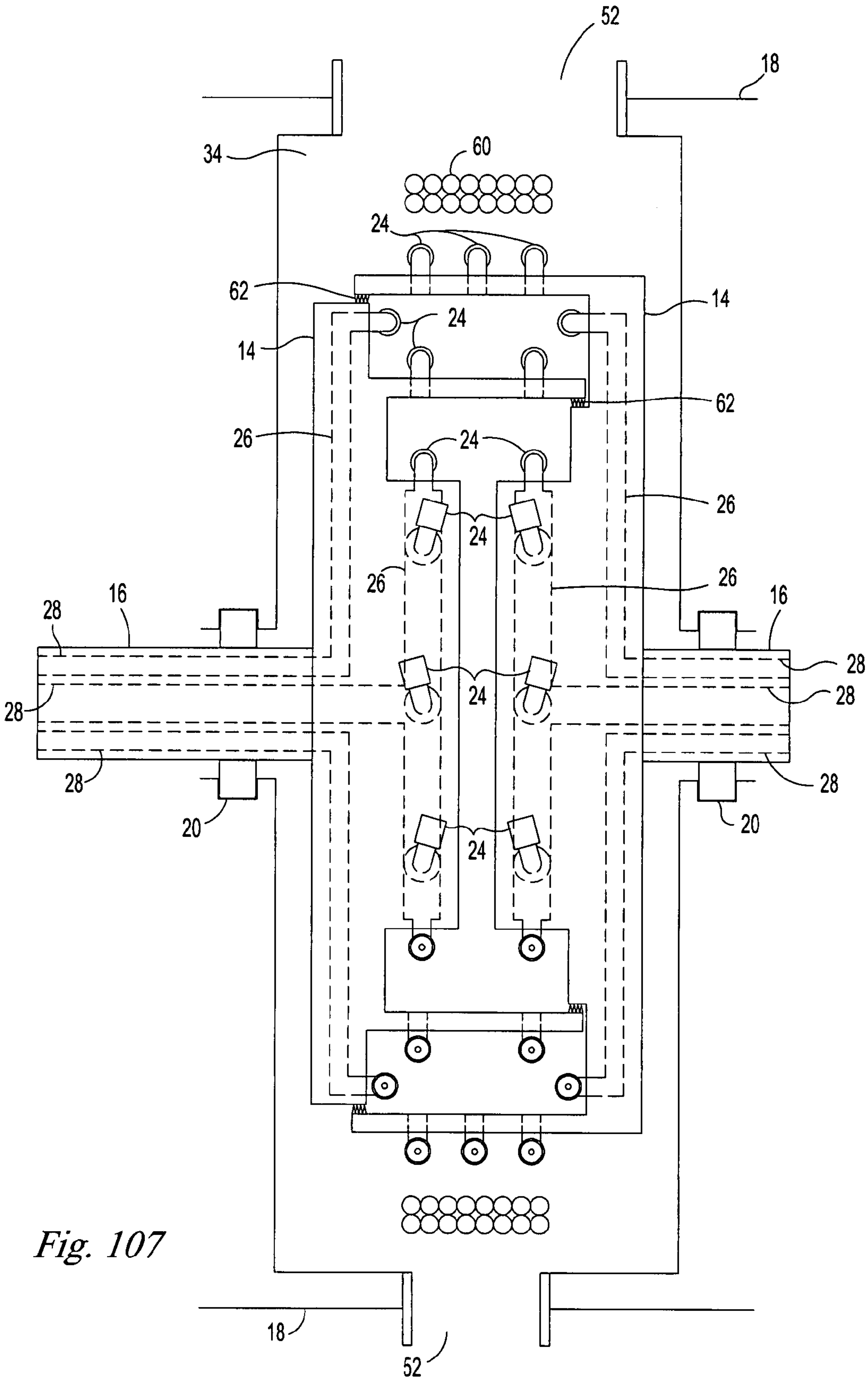
FIG. 107 is a cross-sectional view of a pressure-compound rotor of another preferred embodiment of the invention.
Figure 108:
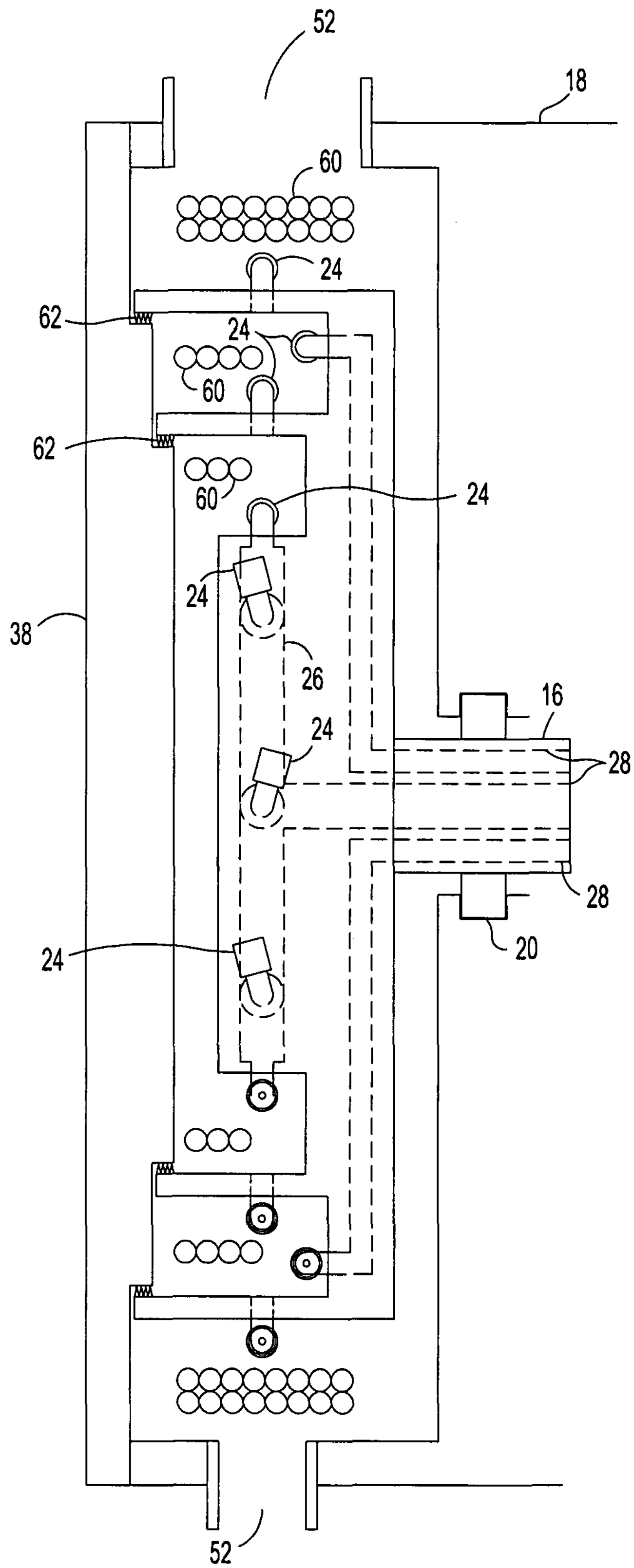
FIG. 108 is a cross-sectional view of a pressure-compound rotor of another preferred embodiment of the invention.

Block diagrams of preferred embodiments of systems for generation and distribution of power that incorporates a turbine engine in accordance with the present invention are presented in FIGS. 104 and 105. Power and/or energy generated by the system, generally as electricity and/or thermal energy, is/are distributed to users by means of distribution system(s). Referring to FIG. 104, the function of pump 126 is essentially to intake low-pressure liquid water, at a relatively low (subcooled) temperature, and increase the pressure to its highest system value, while maintaining it at a relatively cool temperature, i.e., as subcooled liquid. The liquid water travels through the appropriate piping system and ancillary equipment to boiler 102, where the fluid passes through tube and header/drum passageways, in which the transfer of energy from the “fuel” energy source occurs, across the passageway boundaries, to the water contained therein. The transferred energy is imparted to the water fluid, causing the liquid water to first rise in temperature to the saturation (boiling) temperature, then additional transferred energy causes liquid to vaporize, gaining energy but no temperature, and, when applicable, continued transfer of energy to the vapor increases its temperature (superheat).

The liquid water flows from the pump 126 to boiler 102, where the fluid receives energy from the “fuel” source (boiler energy input source). The liquid water is heated to the saturation, or boiling, point temperature where the further addition of energy causes the fluid to vaporize. When sufficient energy is transferred to the fluid, all of the liquid is converted to vapor, i.e., a complete change of state or change of phase occurs (100% quality). Liquid at the boiling temperature is thermodynamically called saturated liquid. Vapor at the boiling temperature is thermodynamically called saturated vapor. Additional energy added to saturated vapor causes the fluid to increase in temperature above the boiling point temperature, and this is thermodynamically called superheated fluid or superheated vapor. Typically, superheated fluid (commonly called superheated steam for a conventional/traditional steam-turbine power plant) flows from power plant boilers, while saturated vapor (commonly called saturated steam for a conventional/traditional steam plant) flows from heating boilers and low-pressure boilers, such as may be located in hospitals, and older office buildings and food process facilities, to name a few examples. The boiler pressure is practically the same as the pump discharge, with a difference owing, essentially, to the resistance-to-flow pressure and back-pressure differentials. It is noteworthy that, for conventional/traditional steam-turbine power plants, two classifications of boilers are typically used. One classification of boiler is drum type, which is traditionally used for sub-critical pressures. The other classification of boiler is once-through type, which is traditionally used for critical pressures and above. Preferred embodiments of the turbine engine of the present invention can use fluid from either type of boiler. Additionally, and most uniquely, said turbine engine can use fluid from a once-through type boiler operating, unconventionally, at sub-critical pressures, including the classification of low-pressure, primarily because of the unique turbine feature of being able to operate using multiple-phase fluid.

In a preferred embodiment, steam from boiler 102 is input to turbine engine 10 which powers generator 106. Generator 106 generates electricity that is distributed to users by means of distribution system 108. In preferred embodiments, exhaust from turbine engine 10 is conveyed to thermal chiller 110 which chills warm water 114 to produce cold water 116. The exhaust can also be used in water heater 120 to heat cool water 122 to produce hot water 124.

Referring to FIG. 105, a solar thermal system 130 has many of the same components as power plant system 100. In solar thermal system 130, however, solar pump 132 is used to circulate a heat exchange fluid through solar collector system 134 and boiler 102.

For background art steam power plants, the fluid flows from the boiler to the turbine (commonly called steam turbine), through which the pressure decreases to practically (close to) the same pressure as the pump suction pressure, with a difference essentially due to the resistance-to-flow pressure and back-pressure differentials. In passing through the turbine, in general, the fluid pressure decrease corresponds relatively to a fluid velocity increase. Such fluid velocity increase is converted to rotary motion of the turbine shaft and, thus, produces a turbine mechanical work or output energy. At the exit of the turbine, the pressure of the fluid has not only decreased to near its lowest pressure, but the temperature of the fluid has decreased to or near the saturation point temperature and perhaps a small decrease in steam quality (say, to 97% quality, for example) has occurred.

Because of the somewhat delicate nature of background art steam turbine blades or buckets, the turbine and its operation are designed to pass essentially only vapor through the turbine. Liquid can have a catastrophic effect on background art steam turbine components, which can result in costly repairs to, and/or replacement of, the background art steam turbine and cause significant loss of revenues.

The low-pressure, essentially saturated vapor (steam) exiting the turbine passes into the condenser, in which a cooling medium is used to extract energy from the saturated vapor and, thus, change its state to that of saturated liquid and then subcooled liquid. Subcooled liquid is a liquid that is several-to-many degrees below the corresponding saturation (boiling) temperature. As the subcooled liquid collects at or near the bottom of the condenser, it flows to the pump suction and the cycle is repeated. The energy received from the condensing fluid in the condenser by the cooling medium is given up, in many instances, to the ambient through the use of devices such as cooling towers.

For a typical background art steam turbine power plant, especially of large utility size, the net electrical energy (commonly called “useful energy”) delivered external to the power plant for customer(s) use is approximately thirty-five (35) percent, plus or minus a few percent, of the equivalent “fuel” source energy delivered in the boiler. This value (the 35 percent) is commonly called the cycle or system efficiency and said efficiency is commonly defined as the “useful” energy (“output”) divided by the “fuel” source energy (“input”). Attempts at increasing this cycle efficiency have included extraction of some of the fluid (steam) as it passes through the turbine and routing it to devices such as in-house feedwater heaters and/or routing it to a customer's process (external to the power plant system) for more efficient use of the thermal energy contained within the fluid. Another method designed to increase the amount of useful energy is to route some of the cooling medium energy (thermal energy), transferred from the power plant fluid, to an external customer for supplemental use. In general, these attempts at increasing the useful energy are commonly called co-generation, which reflects both an electric energy output and useful thermal energy output from the power plant. On a practical basis, due to the relatively large size of background art steam-turbine power plants and, in part, due to the location site, cooling medium thermal energy, especially with regard to available condenser thermal energy, customers, if any, are rather limited in number and capability to effectively use the traditionally enormous quantity of thermal energy.

Because a background art steam turbine must have vapor passing through it for proper operation, a power plant must employ 24/7 operations personnel for safety and equipment needs. This labor cost, in general, limits the minimum size power plant which can bear such costs and remain profitable. Thus, owing to a larger-than-desired size, the potential thermal energy in the condenser component essentially remains untapped for customer use. Therefore, the cycle efficiency of the power plant remains in the range of approximately 35 percent, plus or minus.

Preferred embodiments of the present invention reduce or eliminate some of the economic and safety issues associated with a background art steam-turbine power plant in the following manner: (1) the present invention uses one or more inlet fluid(s) in multiple-phase configuration(s) of either liquid or vapor, or combination thereof, (2) given that the present invention can operate on multiple-phase substance(s), in general, operating with vapor tends to yield a higher turbine efficiency, and subsequently increased turbine mechanical work or output energy, than when operating with liquid, however, for certain applications, it is desirable to reduce the turbine engine efficiency for sake of the production of thermal energy, without catastrophic results, (3) given that the present invention can operate on multiple-phase substance(s), (a) control device(s) and/or control system(s) can specifically operate turbine engine 10 with any turbine inlet fluid substance or thermodynamic condition and/or (b) failed system(s) or turbine control device(s) will not catastrophically destroy the turbine, (4) a turbine inlet fluid thermodynamic condition can be regulated/controlled by controlling and/or regulating the fluid flow through the boiler, for a given (constant) "fuel" source energy input to the boiler, in that increasing the fluid flow decreases the potential for the boiler to generate vapor (steam) and vice versa, (5) a turbine inlet fluid thermodynamic condition can be regulated by controlling and/or regulating the "fuel" source energy input to boiler 102, for a given (constant) fluid flow through the boiler, in that decreasing the "fuel" source energy input decreases the potential for boiler 102 to generate vapor (steam) and vice versa.

It is important to note from feature "(4)" described in the preceding paragraph that the total fluid energy exiting boiler 102, going to turbine 10, remains constant because the "fuel" source energy input is constant. It is equally important to note from feature "(5)" described in the preceding paragraph that the total fluid energy exiting the boiler, going to the turbine, fluctuates as a function of the changing "fuel" source energy input. It is also important to note that for either situation, the turbine mechanical work or output energy fluctuates, however, parameters can be controlled such that both the "fuel" source energy input and the fluid flow are regulated to provide for a constant turbine mechanical work or output energy, with a fluctuating thermal energy quantity, or, for certain embodiments, provide for a constant thermal energy quantity, with a fluctuating turbine mechanical work or output energy, or both. The importance of these features is evident in subsequent paragraphs.

Given that preferred embodiments of the present invention can almost limitlessly change the turbine efficiency and/or the turbine mechanical work or output energy for any "fuel" source energy input condition(s) and/or for any fluid flow conditions and/or substances, the change in turbine efficiency directly affects not only the turbine mechanical work or output energy, but also directly affects the total energy of fluid(s) exiting the turbine. For a given quantity of total energy into turbine engine 10 (i.e., fluid inlet energy), a decrease in turbine mechanical work or output energy results in an increase in the turbine fluid exit energy. Using all, or a portion, of this turbine fluid exit energy as thermal energy for use by customer(s) provides a scenario whereby the useful energy portion of the cycle efficiency calculation increases significantly and, thus, the system or cycle efficiency increases appropriately.

As a specific example, a background art steam-turbine power plant, operating at steady state and at, or near, its optimal conditions, has the following approximate percentages of useful energy (output to customers) and non-useful energy (not output to customers), per one hundred (100) units of "fuel input energy", whether this fuel input energy results from a combustion process in the boiler or from some other "input" energy source (e.g., hot oil from solar heating): (1) assume an energy input into the boiler of 100 units, (2) of this 100 units of energy, approximately 15 units of energy (or 15 percent of the total energy input) is lost through the casing and stack of the boiler, as non-useful energy, (3) of the approximate 85 units of energy leaving the boiler and entering the turbine, approximately 40 units of electrical energy are produced, of which approximately 5 units of energy (or 5 percent of the total energy input) is used internally to sustain the power plant operation, as non-useful energy, thus, providing approximately 35 units of useable/useful energy (or 35 percent of the total energy input) (i.e., useful work or energy available to the customers), and (4) the approximate 45 units of remaining energy (or 45 percent of the total energy input) leaves the turbine and is released to the cooling medium in the condenser/cooling tower system, generally as non-useful energy. Therefore, for this example, 35 percent of the total input energy into the system or cycle is useful energy, while 65 percent of the total input energy into the system or cycle is non-useful energy. Thus, the power plant system (cycle) efficiency is approximately 35 percent.

Compared to a power plant system similar to the one above, but using a turbine of a preferred embodiment of the present invention, the percentages of useful energy and non-useful energy are typically as follows, for the same conditions: (1) again, assume an energy input into the boiler of 100 units, (2) of this 100 units of energy, approximately 15 units of energy (or 15 percent of the total energy input) is lost through the casing and stack of the boiler, as non-useful energy, (3) of the approximate 85 units of energy leaving the boiler and entering the turbine, approximately 40 units of electrical energy are produced, of which approximately 5 units of energy (or 5 percent of the total energy input) is used internally to sustain the power plant operation, as non-useful energy, thus, providing approximately 35 units (i.e., net electrical energy output) of useable/useful energy (or 35 percent of the total energy input) (i.e., useful work or energy available to the customers), and (4) the approximate 45 units of remaining energy (or 45 percent of the total energy input) leaves the turbine and is released to the customers as thermal energy, generally as useful energy. Therefore, for this example, approximately 80 percent of the total input energy into the system or cycle is useful energy, while approximately 20 percent of the total input energy into the system or cycle is non-useful energy. Thus, the power plant system (cycle) efficiency is approximately 80 percent. It is important to note that, for primarily economic reasons, background art steam-turbine power plants are generally large in size, electric generation capacity and, consequently, non-useful energy capacity, which essentially precludes thermal energy users/hosts. With power plant system(s) using turbine engine(s) of the present invention, the size and electric generation capacity can be tailored to the specific needs of the customer or end-user and, thus, thermal energy can be matched and used to afford substantial increases in cycle or system efficiency. Additionally, a wide range of thermal energy-to-electricity ratios is available and can automatically adjust to a customer/end-user demand. Therefore, significant increase in cycle/system efficiency is due, first, to the ability of the present invention to be any size and, second, to the unique features of the present invention in providing safe operation of any-size turbine engine and providing whatever mix of thermal energy and electricity is so desired at any time.

With preferred embodiments of the present invention, especially in applications where all of the turbine fluid exit energy, as thermal energy, is used by customer(s), as the demand for thermal energy changes throughout a period of time, the thermodynamic condition of the turbine inlet fluid can be changed to accommodate the thermal energy demand. The following assumptions and steps outline this process: (1) assume a power plant system and process of the present invention, as described in the previous paragraphs, (2) assume said power plant system is operating at a constant fuel input energy, say, 100 units of energy, (3) assume said power plant system is also operating at 35 units of net electrical energy output, (4) assume said power plant system is also operating at 45 units of thermal energy output, (5) assume said thermal energy of the fluid exiting the turbine is transferred to the working medium of an adsorption chiller, which provides chill water for air conditioning, such that as more thermal energy is transferred to the medium of the adsorption chiller, a greater air conditioning load can be accommodated, (6) assume that the thermal load demand increases from 45 units of energy to 60 units of energy, (7) to increase the thermal energy, the turbine must convert less of the fluid entering the turbine into mechanical work or output energy, thus, a greater quantity of thermal energy exits the turbine, (8) although the total energy quantity into the turbine is constant, for this example, changing the form of this energy from essentially all vapor (steam) to a significant percentage of liquid water, i.e., a two-phase fluid, reduces the turbine mechanical work or output energy and, thus, the turbine (not necessarily the system) is less efficient, (9) although the total energy into the turbine remains essentially constant, the reduction in turbine efficiency occurs (a) because some of the steam energy, which would otherwise be used to develop a force (nozzle thrust) opposite the tangential direction of rotation to produce mechanical work or output energy, is instead used to accelerate and carry the liquid through and out of the nozzle(s), thus, the fluid exiting the turbine has more total energy, and (b) because nozzles designed primarily, or completely, for a vaporous fluid provide less of an effective conversion of the fluid energy entering a nozzle to a corresponding kinetic energy for said fluid when increasingly liquid (decreasing vapor quality) fluid is passed through the nozzle(s), (10) for this example, the increase in thermal energy to 60 units results from a decrease in turbine power (mechanical work or output energy) to 20 units, (11) the decrease in turbine power, and consequential increase in thermal energy, is accomplished, for this example of constant input energy to the boiler, by increasing the flow rate (e.g., in pounds per hr) of the process fluid through the boiler, which consequently decreases the vapor quality of the fluid exiting the boiler and passing to the turbine, and (12) simplistically, the control system for the power plant system and/or the turbine senses thermal load demand changes and responds accordingly to effect the process described above, for example; thus, the thermal energy demand drives the controls of the system and the turbine mechanical work or output energy follows, as appropriate. The above process is especially suited for applications such as office buildings, shopping malls, homes, grocery stores, to name a few, in that, as the daylight hours start, there is a more evenly distributed need between electric and thermal energy. However, as the day heats up and there is less of a need to use artificial light (i.e., lessening of the electrical demand) and a greater need for air conditioning demand (thermal load), the present invention is designed and controlled to provide that capability without being oversized. The range of satisfying customer demand is almost unlimited, as the system can be controlled to deliver (1) essentially no turbine mechanical work or output energy and all useful energy as thermal energy, (2) the maximum turbine mechanical work or output energy possible, with the remainder of the total useful energy being thermal energy, or (3) any scenario of customer need(s) in between. No other equipment or system on the market has that capability or flexibility. A combined heat and power system, using an internal combustion engine, offers a high system efficiency, however, the ratio of the thermal energy-to-electrical energy remains relatively constant, unlike the present invention which has a very large ratio. A wide range of applications and operating scenarios are thus afforded by the present invention.

Figure 148:
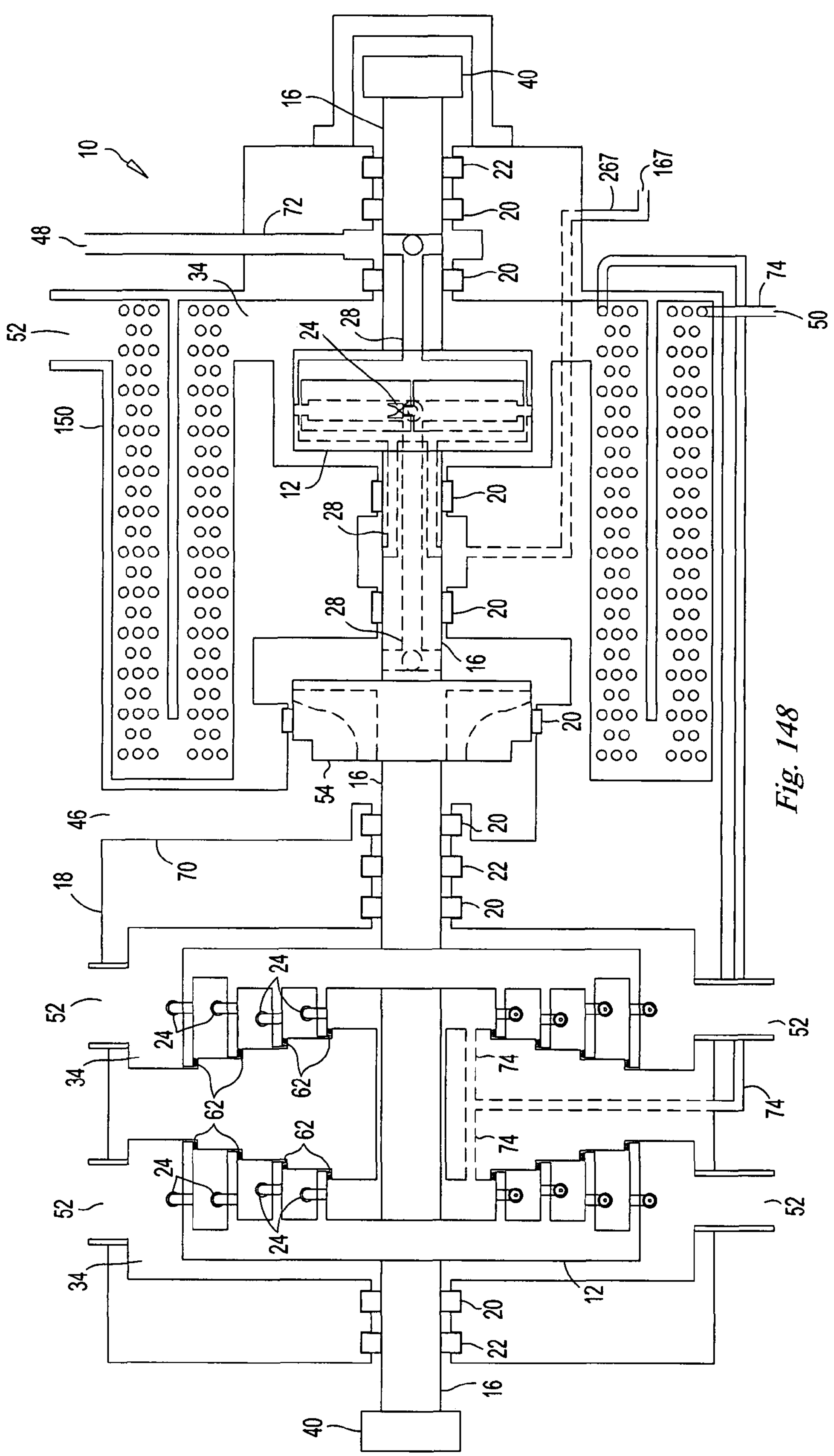
Figure 149:
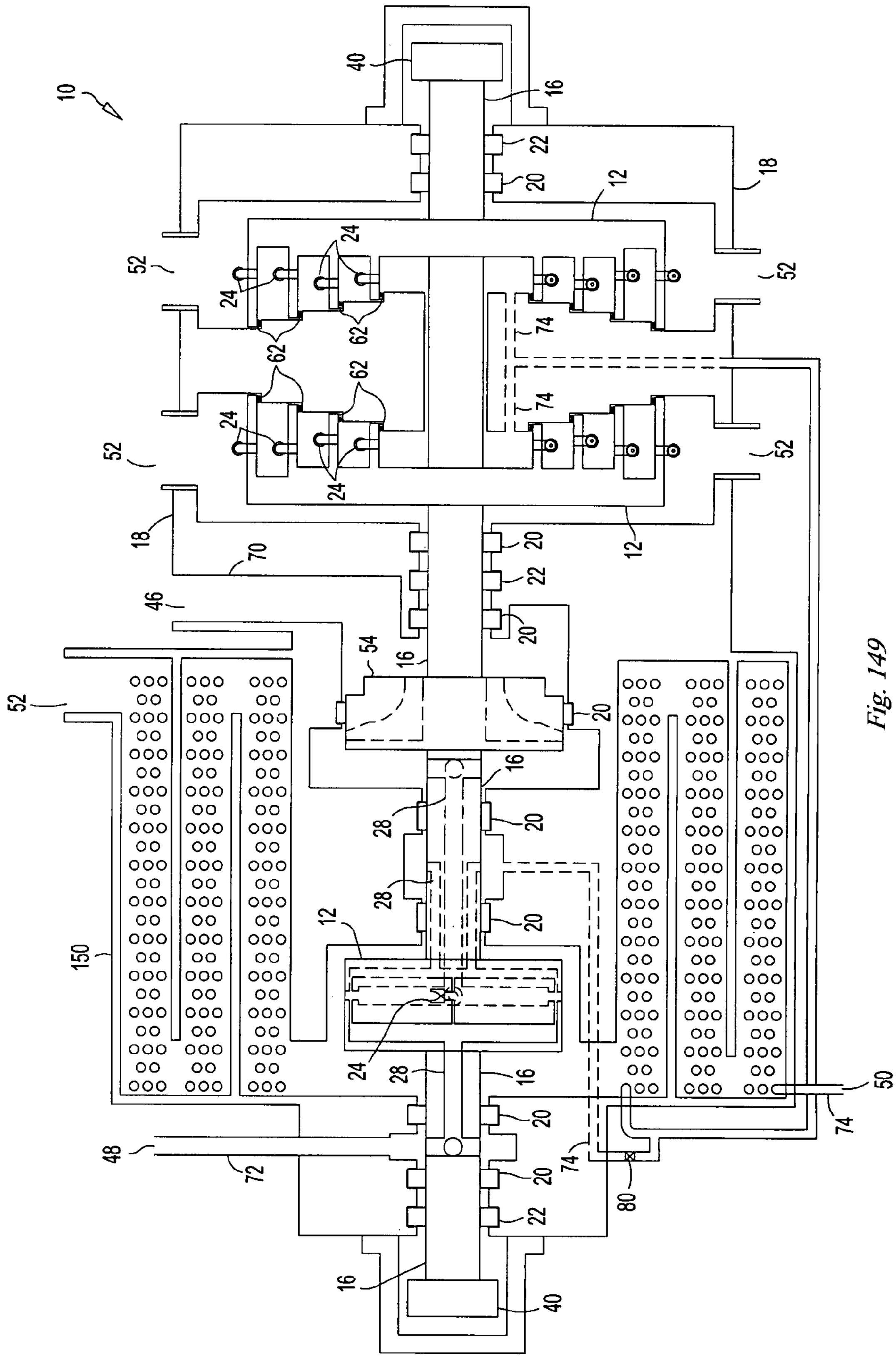
Figure 150:
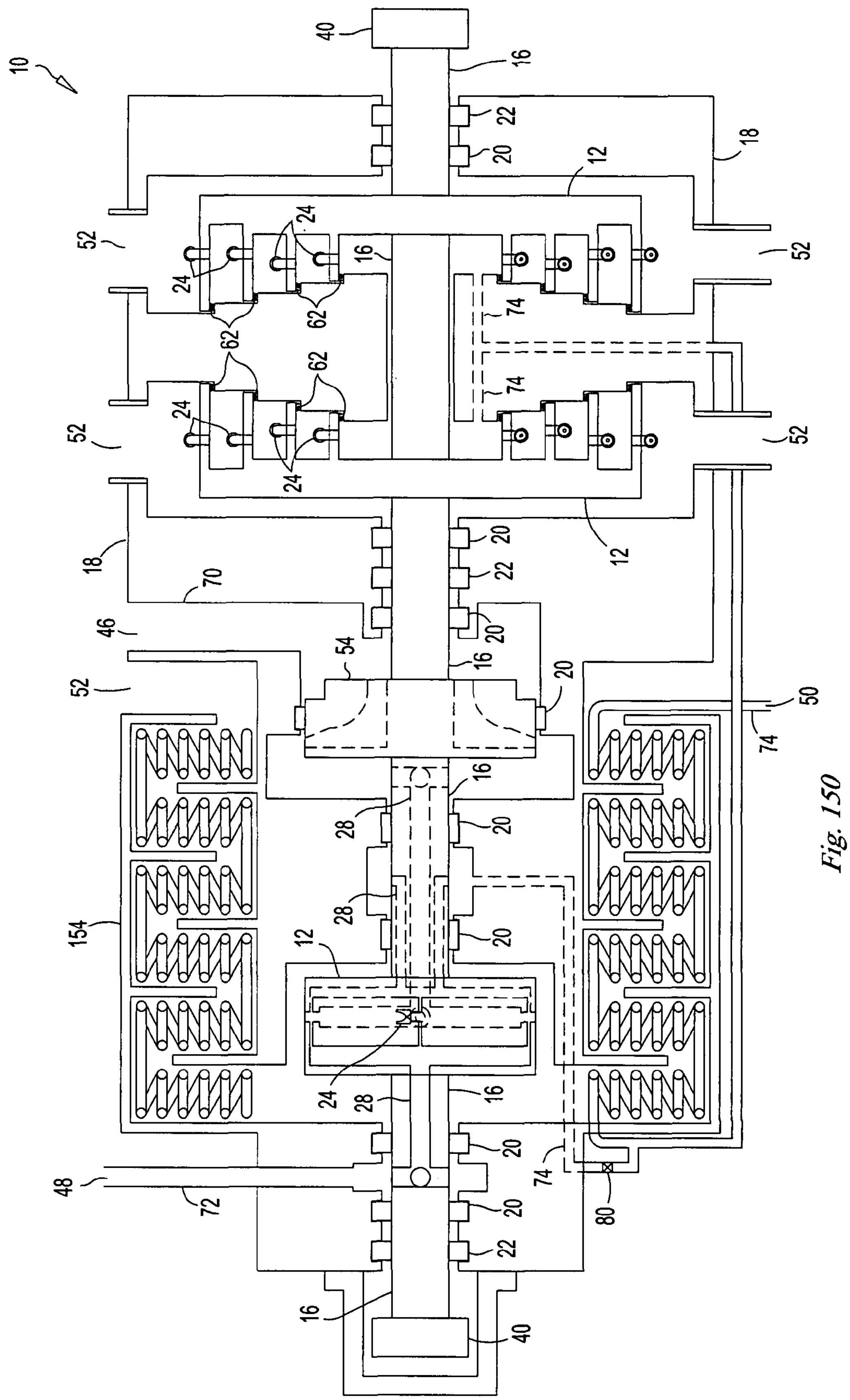
Figure 151:
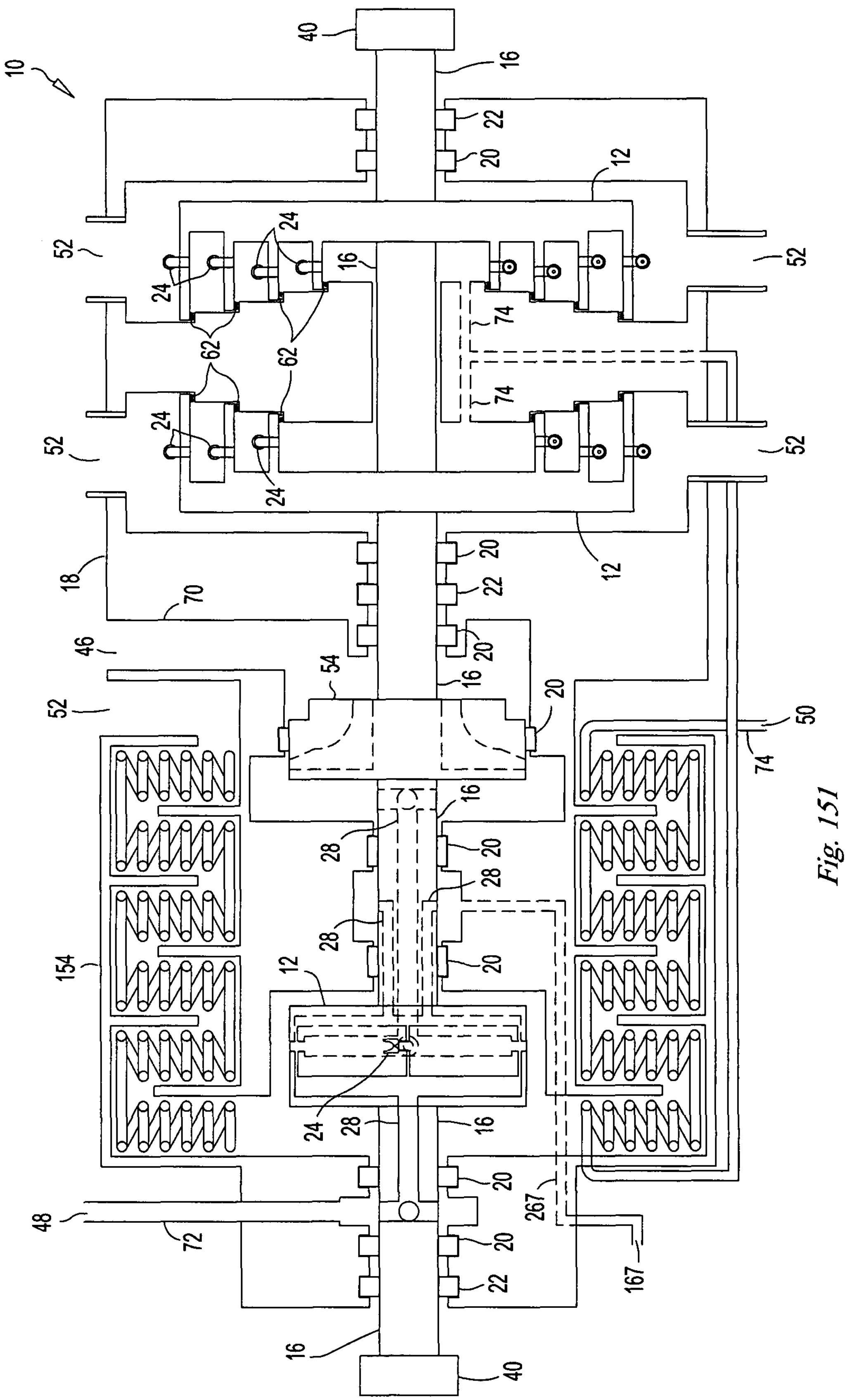
Figure 152:
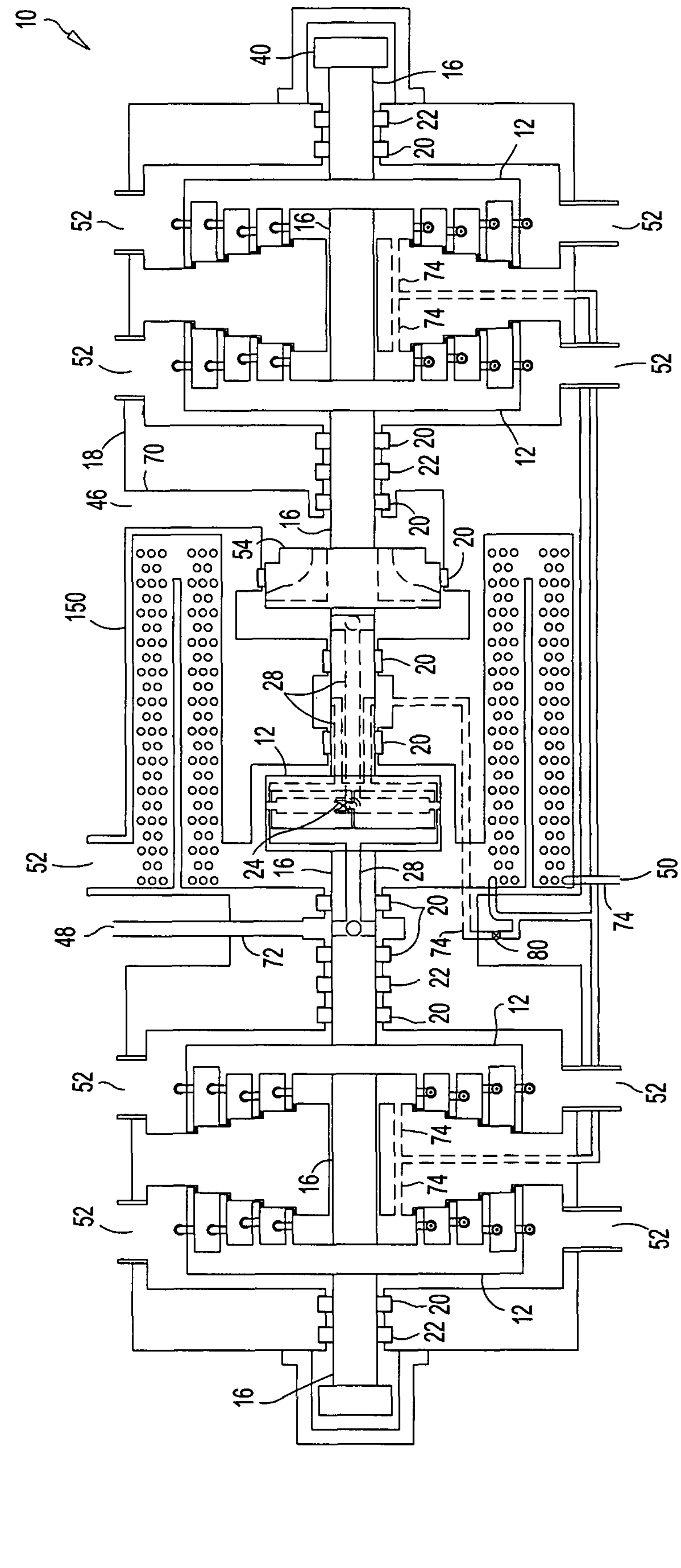
Figure 153:
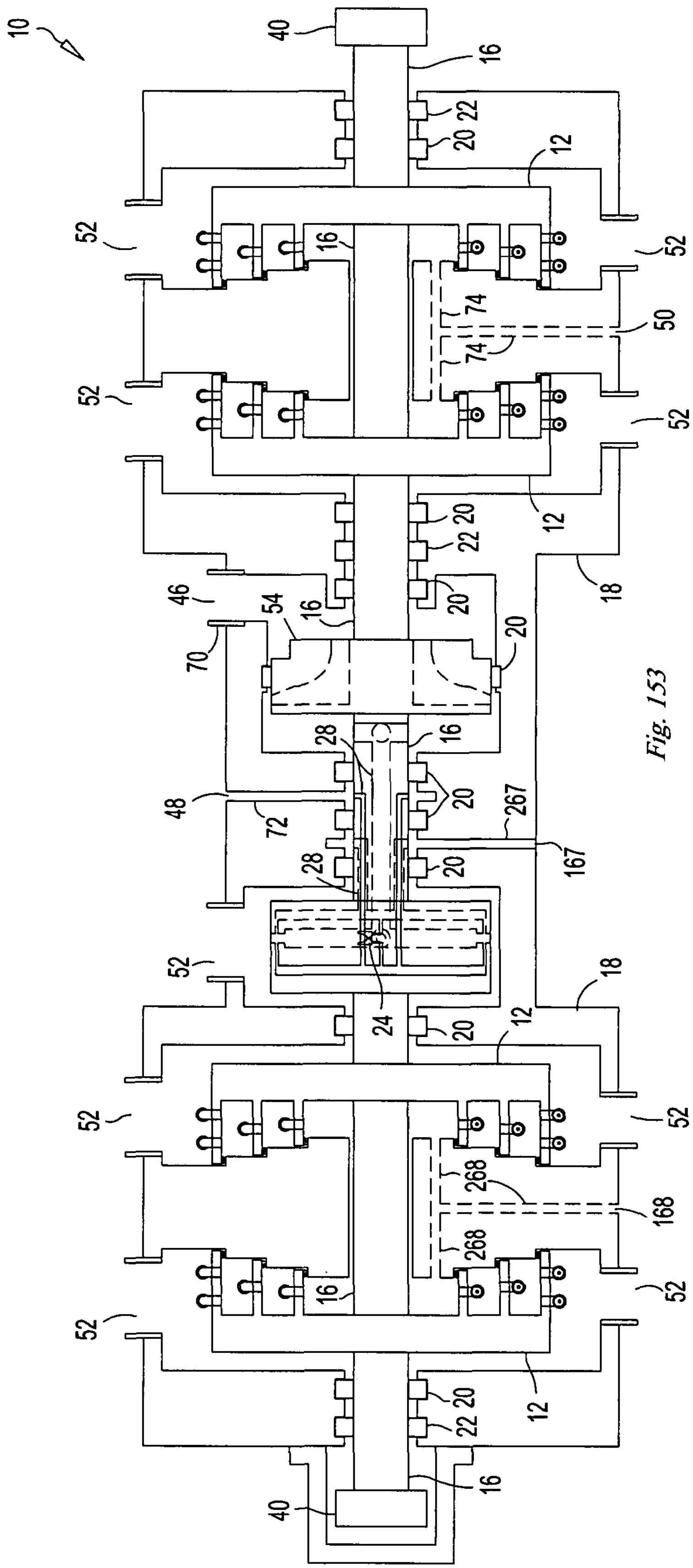
Figure 154:
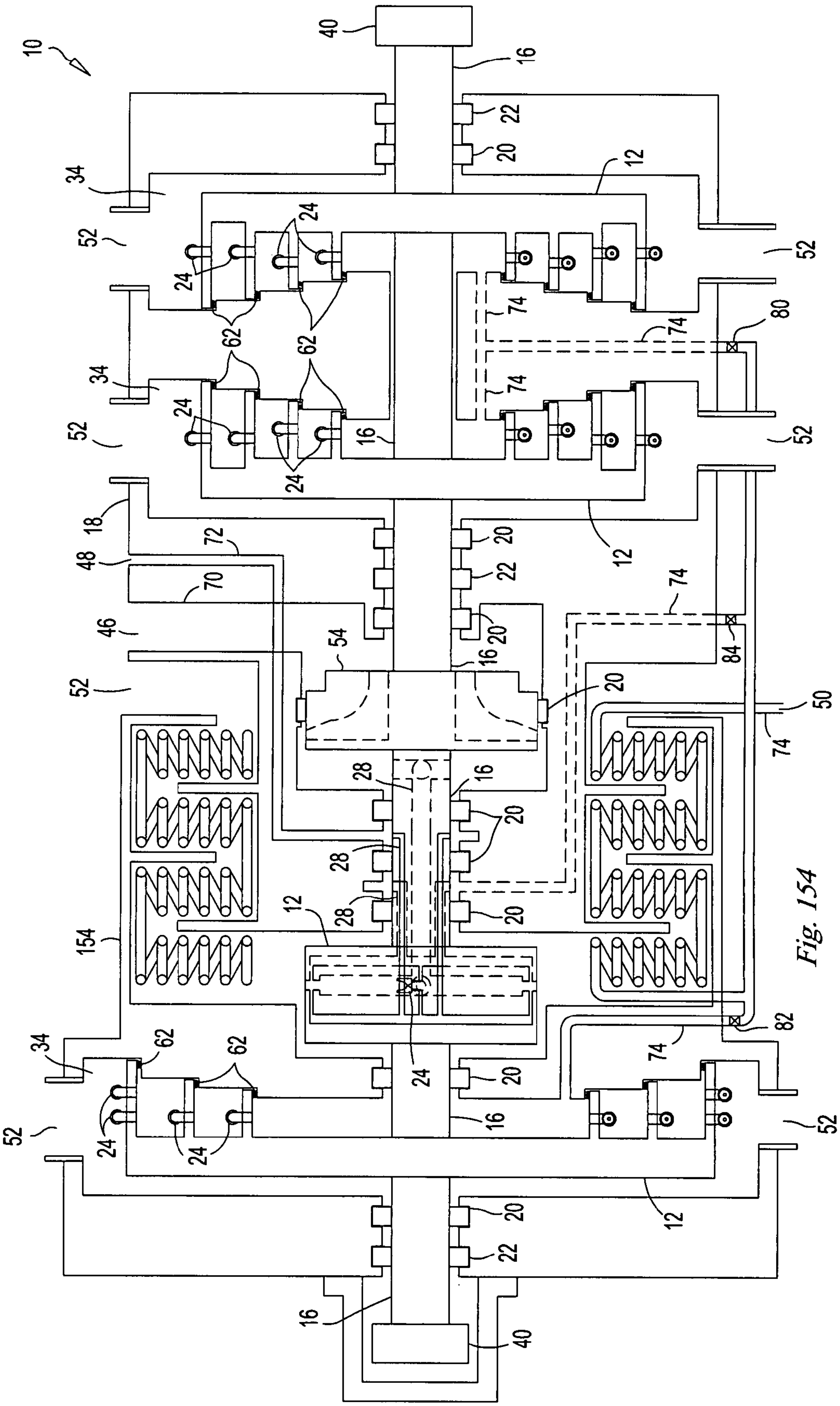
Figure 155:
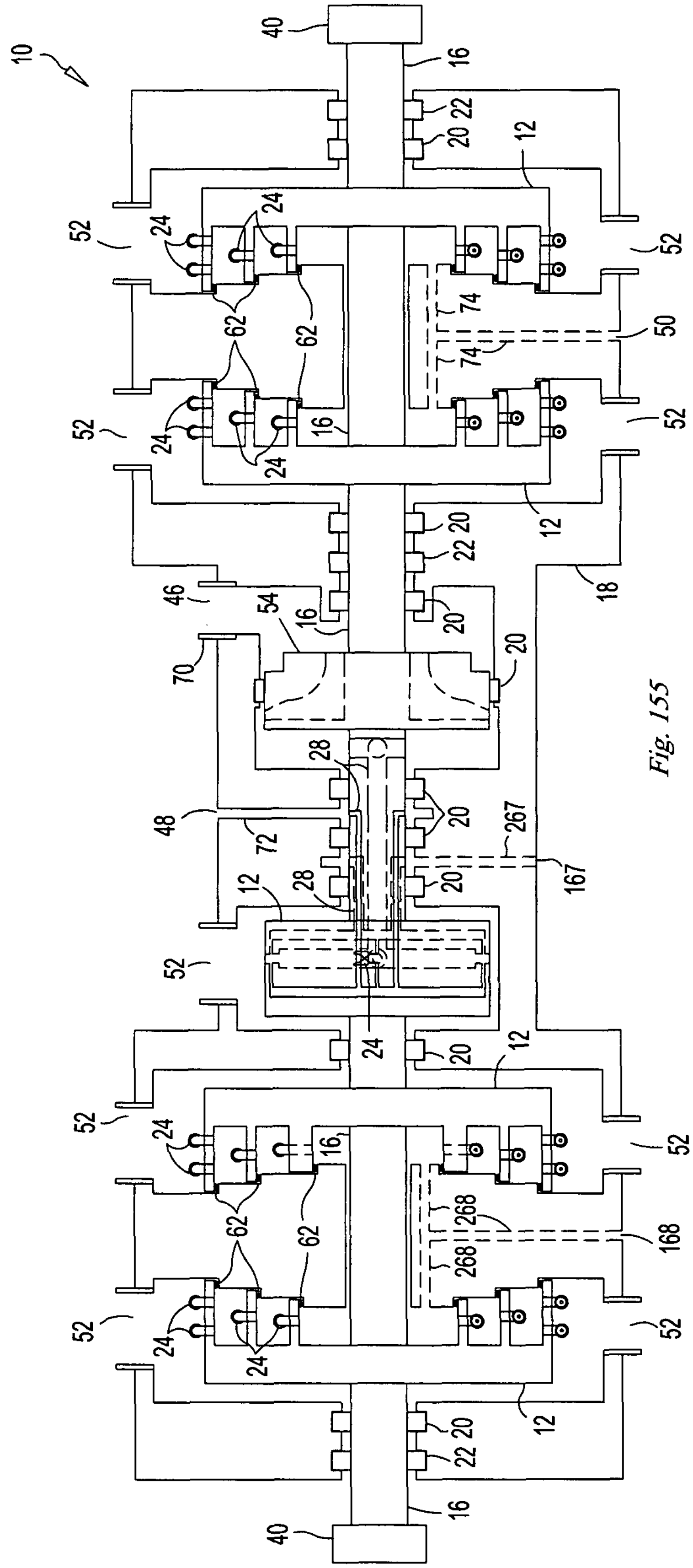
Figure 156:
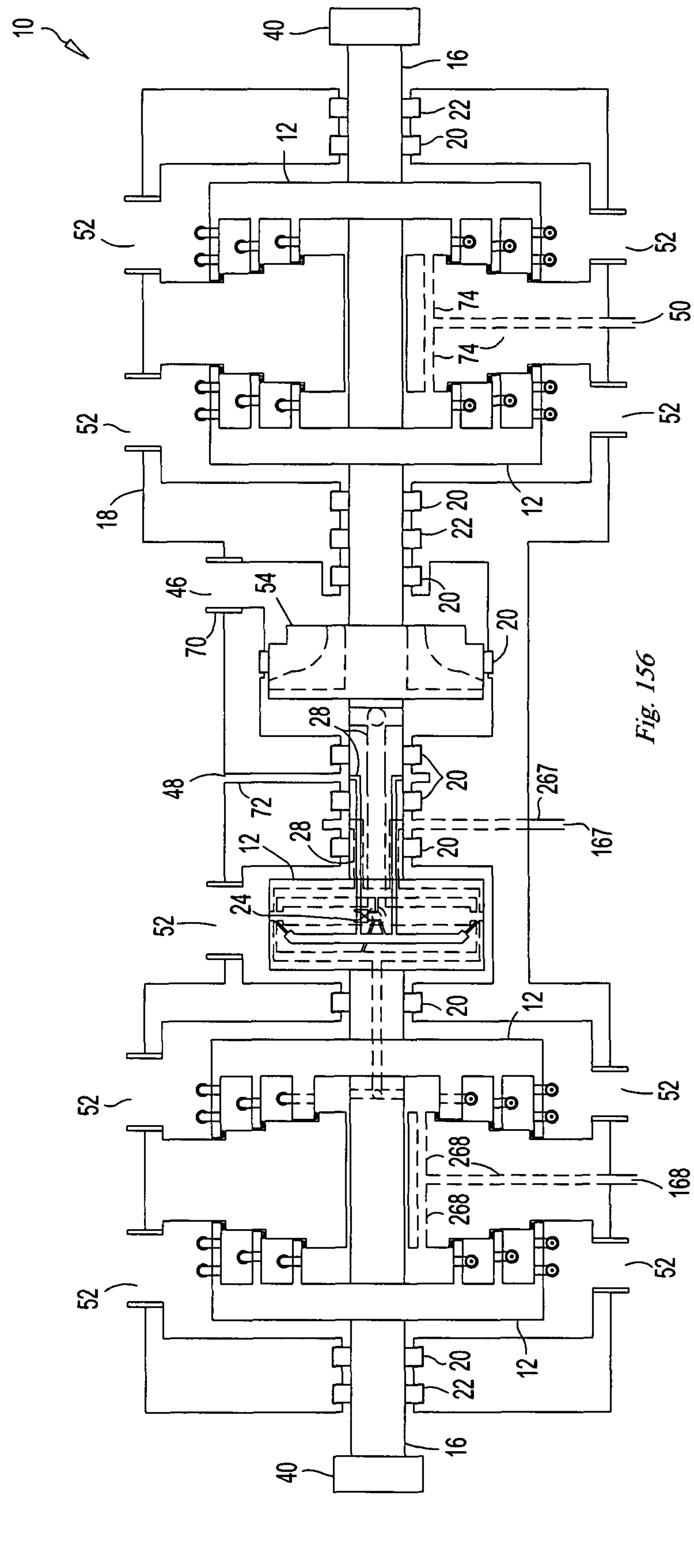

Referring to FIGS. 144-152, preferred combined-cycle embodiments of the present invention that comprise at least one combustion turbine engine of the present invention, at least one non-combustion turbine engine of the present invention and at least one boiler/heat exchanger/heat recovery steam generator (HRSG) unit are presented. Referring to FIG. 148, one combustion turbine engine of the present invention and one non-combustion turbine engine of the present invention are illustrated, wherein a boiler/heat exchanger/heat recovery steam generator (HRSG) preferably encompasses the body of said combustion turbine engine. First inlet fluid 46, typically, but not necessarily, air or oxidizer, and second inlet fluid 48, typically, but not necessarily, fuel or reactant, are as heretofore described and discussed. Fourth inlet fluid 167 is a fluid purposed as a propellant and/or purposed for the reduction, elimination, control, prevention and/or mitigation of pollutants that may otherwise result and/or be discharged into the environment, both of which purposes are as heretofore described and discussed. Said first inlet fluid 46, said second inlet fluid 48 and said fourth inlet fluid 167, interface and/or react in said combustion turbine engine to become the exit fluid (combined and/or reacted fluids 46, 48 and 167, as heretofore described and discussed) of said combustion turbine engine, whereupon said combustion turbine engine exit fluid enters into and passes therefrom first boiler/heat exchanger/heat recovery steam generator (HRSG) 150. Third inlet fluid 50, typically, but not necessarily, steam/liquid water/mixture, is purposed as the inlet fluid to said non-combustion turbine engine, as heretofore described and discussed. However, for said preferred embodiment of FIG. 148, said third inlet fluid 50 serves as the medium, typically, but not necessarily, a liquid, into which energy is exchanged from the exit fluid(s) of combustion turbine engine turbine chamber 34, as said exit fluid and said third inlet fluid 50 pass through said first boiler/heat exchanger/heat recovery steam generator (HRSG) 150. In passing from said first boiler/heat exchanger/heat recovery steam generator (HRSG) 150, third inlet fluid 50 passes into third inlet port 74 at the entrance to said non-combustion turbine engine and passes therethrough in a manner and method, as heretofore described and discussed. The preferred embodiment of the present invention illustrated in FIG. 149 is similar to that of FIG. 148; however, the third inlet fluid 50 outlet of first boiler/heat exchanger/heat recovery steam generator (HRSG) 150 is routed to said non-combustion turbine engine, as described above, and routed into said combustion turbine engine, in lieu of fourth inlet fluid 167 of FIG. 148, but through a similar port to that of fourth inlet port 267 of FIG. 148, and said inlet fluid 50 flow rate into said non-combustion turbine engine is controlled/regulated by first control valve 80. The preferred embodiment of the present invention illustrated in FIG. 150 is similar to that of FIG. 149; however, the first boiler/heat exchanger/heat recovery steam generator (HRSG) 154 is of a different type and/or configuration than first boiler/heat exchanger/heat recovery steam generator (HRSG) 150, i.e., the heat transfer surface(s) (e.g., tubes or plates) are a different, but not necessarily the only alternate, type and/or configuration. FIGS. 144-147 and 152 are preferred embodiments of the present invention with alternative arrangements and configurations to those aforementioned, in particular, but not exclusively, featuring two or more combustion turbine engines, two or more non-combustion turbine engines and/or mirroring of turbine engines and/or turbine engine components. Other embodiments of combined-cycle and/or simple-cycle (combustion turbine engine without an accompanying non-combustion turbine engine), with or without boiler(s)/heat exchanger(s)/heat recovery steam generator(s) (HRSG), are envisioned by the applicant.

As can be envisioned by the foregoing paragraph, preferred embodiments of the present invention have the capability to automatically change the amount of turbine mechanical work or output energy and thermal output energies at the will of the operator and/or automated controls and as demand dictates. Due to the variety of preferred combinations of turbine shaft sections and associated passageway(s), non-shaft passageway(s), turbine rotor(s) and rotor section(s), nozzle configurations and orientations, velocity-compound and pressure-compound staging, multiple-phase and multiple-substance that are available with the present invention, the turbine efficiency spans a wide range of values, far greater than any existing turbine on the market. For maximum potential applications wherein the thermal and electrical loads are fully utilized, the turbine efficiency range is closely coupled to the thermal energy demand. The range of ratios of the thermal energy used to the turbine mechanical work or output energy is unmatched in the marketplace. The costs of such system(s) are also unconventionally less.

In summary, the invention is A multiple-fluid, multiple-substance, multiple-phase, multiple-pressure, multiple-temperature, multiple-stage turbine engine. In preferred embodiments, one or more fluids are supplied by passageways in the turbine shaft or supplied by non-shaft passageways, or both, through rotor passageways to multiple-phase, multiple-fluid, multiple-substance nozzles affixed to one or more perimeters, radial surfaces, axial surfaces, and/or curved or slanted surfaces of the turbine rotor assemblies. The multiple perimeters, radial surfaces, axial surfaces, and/or curved or slanted surfaces of the turbine rotor assemblies are preferably configured and located for multiple inlet and exit velocities of the nozzles, multiple inlet and exit pressures of the nozzles, or combinations thereof. The one or more fluids entering the turbine may each be a substance of single phase, or a substance of multiple phase, or a mix of the single-phase and/or multiple-phase conditions for two or more entrance fluids. Additionally, for two or more entrance fluids, these fluids may be at different thermodynamic conditions or characteristics. Also, for two or more entrance fluids, these fluids may be of different substances, provided that, if two or more of said substances are mixed at, in, before, after, about and/or upon exiting the nozzle(s), portion(s) of nozzle(s), set(s) of nozzles and/or combustion chamber-nozzle, then the resulting mixture has appropriate compatibility, especially where two or more substances are reacted to provide a motive force and/or to enhance an existing motive force and/or to modify or change the reaction, or portion thereof, of two or more mixed substances. The multiple-phase, multiple-substance and/or multi-fluid nozzles may be recessed in the turbine rotor surfaces, located at, on or about the turbine rotor surfaces, be integral with the turbine rotor surfaces, or extend from the turbine rotor surfaces, or combinations thereof. The multiple-phase, multiple-substance and/or multi-fluid nozzles may vary in number and/or size for the multiple rotor surfaces of the turbine. The multiple-phase and/or multi-fluid nozzle(s), portion(s) of nozzle(s), set(s) of nozzles and/or combustion chamber-nozzle unit(s) may be equipped with entrance shapes/profiles and/or exit shapes/profiles configured to enhance the efficiency of the nozzle(s), portion(s) of nozzle(s), set(s) of nozzles and/or combustion chamber-nozzle unit(s). The axis of the nozzle(s), portion(s) of nozzle(s), set(s) of nozzles and/or combustion chamber-nozzle unit(s) can have a three-dimensional acute angle with the direction opposite the tangential direction of rotation of the turbine, a three-dimensional acute angle with a radial axis of the turbine rotor, a three-dimensional acute angle with the axial axis of the turbine rotor (i.e., the axis of rotation of the turbine shaft), or a combination thereof. The axis of the nozzle(s), portion(s) of nozzle(s), set(s) of nozzles and/or combustion chamber-nozzle unit(s) can be linear or curved, or a combination thereof. The vectorial direction of fluid(s) exiting a nozzle exit area may be altered or changed through the use of shroud(s), or other fluid deflection or fluid re-direction device(s)/method(s).

Many variations of the invention will occur to those skilled in the art. Some variations include the features disclosed herein and the figures included herein as examples. Other variations call for foreseeable and unforeseeable modifications of those features. All such variations are intended to be within the scope and spirit of the present invention.

Although some embodiments are shown to include certain features, the applicant specifically contemplates that any feature disclosed herein may be used together or in combination with any other feature on any embodiment of the present invention. It is also contemplated that any feature may be specifically excluded from any embodiment of the present invention.

What is claimed is:

1. A turbine engine comprising:

a turbine engine body having a turbine chamber;

a first shaft mounted in said turbine engine body, said first shaft having a first longitudinal axis, and a first shaft passageway, and a second shaft passageway; and a first turbine rotor mounted on said first shaft and within said turbine chamber, said first turbine rotor having a first portion having a first circumferential perimeter, a second portion having a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted on said first circumferential perimeter, each of which first nozzles having a first nozzle longitudinal axis and being in communication with one of said first rotor passageways and discharging into a first intermediate chamber, a plurality of second nozzles that are mounted on said first radial surface, each of which second nozzles having a second nozzle longitudinal axis and being in communication with one of said second rotor passageways and discharging into a second intermediate chamber, a plurality of third nozzles that are mounted on said second circumferential perimeter, and each of which third nozzles having a third nozzle longitudinal axis and being in communication with said second intermediate chamber and discharging into said turbine chamber;

a second shaft mounted on said turbine engine body, said second shaft having a second longitudinal axis that is coincident with said first longitudinal axis, a third shaft passageway, and a fourth shift passageway;

a second turbine rotor mounted on said second shaft and within said turbine chamber, said second turbine rotor having a third portion having a circumferential perimeter, a second plane of rotation that is perpendicular to said second shaft longitudinal axis, a second radial surface that is parallel to said second plane of rotation, a third radial surface that is parallel to said second plane of rotation, a plurality of third rotor passageways that are in communication with said third shaft passageway, a plurality of fourth rotor passageways that are in communication with said fourth shaft passageway, a plurality of fourth nozzles that are mounted on said third circumferential perimeter, each of which fourth nozzles having a fourth nozzle longitudinal axis and being in communication with said first intermediate chamber and discharging into said second intermediate chamber, a plurality of fifth nozzles that are mounted on said second radial surface, each of which fifth nozzles having a fifth nozzle longitudinal axis and being in communication with one of said third rotor passageways and discharging into said first intermediate chamber, a plurality of sixth nozzles that are mounted on said third radial surface, each of which sixth nozzles having a sixth nozzle longitudinal axis and being in communication with one of said fourth rotor passageways and discharging into said second intermediate chamber.

2. A turbine engine comprising:

a turbine engine body having a turbine chamber;

a first shaft mounted in said turbine engine body, said first shaft having a first longitudinal axis, and a first shaft passageway, and a second shaft passageway;

a first turbine rotor mounted on said first shaft and within said turbine chamber, said first turbine rotor having a first portion having a first circumferential perimeter, a second portion having a second circumferential perimeter, a first plane of rotation that is perpendicular to said shaft longitudinal axis, a first radial surface that is parallel to said plane of rotation, a plurality of first rotor passageways that are in communication with said first shaft passageway, a plurality of second rotor passageways that are in communication with- said second shaft passageway, a plurality of first nozzles that are mounted on said first circumferential perimeter, each of which first nozzles having a first nozzle longitudinal axis and being in communication with one of said first rotor passageways and discharging into a first intermediate chamber; a plurality of second nozzles that are mounted on said first radial surface, each of which second nozzles having a second nozzle longitudinal axis and being in communication with one of said second rotor passageways and discharging into a second intermediate chamber, a plurality of third nozzles that are mounted on said second circumferential perimeter, and each of which third nozzles having a third nozzle longitudinal axis and being in communication with said second intermediate chamber and discharging into said turbine chamber;

a second shaft mounted on said turbine engine body, said second shaft having a second longitudinal axis that is coincident with said first longitudinal axis, a third shaft passageway, and a fourth shaft passageway; and a second turbine rotor mounted on said second shaft and within said turbine chamber, said second turbine rotor having a third portion having a third circumferential perimeter, a fourth portion having a fourth circumferential perimeter, a second plane of rotation that is perpendicular to said second shaft longitudinal axis, a second radial surface that is parallel to said second plane of rotation, a plurality of third rotor passageways that are in communication with said third shaft passageway, a plurality of fourth rotor passageways that are in communication with said fourth shaft passageway, a plurality of fourth nozzles that are mounted on said third circumferential perimeter, each of which fourth nozzles having a fourth nozzle longitudinal axis and being in communication with one of said third rotor passageways and discharging into said first intermediate chamber, a plurality of fifth nozzles that are mounted on said fourth circumferential perimeter, each of which fifth nozzles having a fifth nozzle longitudinal axis and being in communication with said first intermediate chamber and discharging into said second intermediate chamber, a plurality of sixth nozzles that are mounted on said second radial surface, each of which sixth nozzles having a sixth nozzle longitudinal axis and being in communication with one of said fourth rotor passageways and discharging into said second intermediate chamber.

3. A turbine engine comprising:

turbine engine body having a turbine chamber;

a shaft mounted on said turbine engine body, said shaft having a first shaft longitudinal axis, a first shaft passageway, and a second shaft passageway; and a turbine rotor mounted on said shaft and within said turbine chamber, said turbine rotor having a first portion having circumferential perimeter, a first plane of rotation that is perpendicular to said first shaft longitudinal axis, a first radial surface that is parallel to said plane of rotation, a plurality of first rotor passageways that are in communication with said first shaft passageway, a plurality of second rotor passageways that are in communication with said second shaft passageway, a plurality of first nozzles that are mounted on said first circumferential perimeter, a plurality of second nozzles that are mounted on said first radial surface, each of which first nozzles having a first nozzle longitudinal axis, being in communication with one of said first rotor passageways and discharging into a first intermediate chamber, each of which second nozzles having a second nozzle longitudinal axis, being in communication with said first intermediate chamber and discharging into said turbine chamber.

* * * * *